United States Patent [19]

Wenninger et al.

[11] 3,971,925

[45] July 27, 1976

[54] ADAPTABLE PROGRAMMED CALCULATOR HAVING PROVISION FOR PLUG-IN KEYBOARD AND MEMORY MODULES

[75] Inventors: Freddie W. Wenninger; Donald E. Morris; Jindrich Kohoutek; David S. Maitland; Douglas M. Clifford; Louis T. Schulte; John C. Keith, all of Loveland, Colo.

[73] Assignee: Hewlett-Packard Company, Palo Alto, Calif.

[22] Filed: June 6, 1974

[21] Appl. No.: 477,552

Related U.S. Application Data

[63] Continuation of Ser. No. 318,451, Dec. 26, 1972, abandoned.

[52] U.S. Cl. .............................. 235/156; 340/172.5

[51] Int. Cl.[2] ........................................ G06F 15/06

[58] Field of Search ........... 235/156, 159, 160, 164; 340/172.5

[56] References Cited

UNITED STATES PATENTS

| | | | |
|---|---|---|---|
| 3,654,449 | 4/1972 | Boyce | 235/156 |
| 3,760,171 | 9/1973 | Wang et al. | 235/156 |
| 3,839,630 | 10/1974 | Olander, Jr. et al. | 235/156 |

*Primary Examiner*—David H. Malzahn

*Attorney, Agent, or Firm*—Roland I. Griffin; William E. Hein

[57] ABSTRACT

An adaptable calculator is provided by employing five MOS/LSI circuits interconnected by a multiple line bus system. They include (1) a read-only memory circuit group in which subroutines for performing arithmetic and other functions of a basic keyboard input unit are stored; (2) a control and timing circuit for scanning the keyboard, for retaining status information relating to the condition of the calculator or of a particular subroutine, and for generating a next address in read-only memory; (3) an arithmetic and register circuit containing an adder, a group of working registers, a group of data storage registers forming a stack, and a constant storage register; (4) a data storage circuit which provides ten data storage registers, nine of which are employed by the calculator system and one of which is available to the user for storing data; and (5) an input/output (I/O) circuit for enabling the calculator to communicate with various I/O peripheral units such as a typewriter and an X-Y plotter, for performing binary arithmetic by means of a binary arithmetic logic unit contained therein, and for performing various system housekeeping operations.

Input and output units include a keyboard input unit having a receptacle for accommodating a 15-key function block to enlarge the capabilities of the calculator and an 18-column output printer unit for printing intermediate results of calculations, entered data, arithmetic operators, and diagnostic notes. An optional 15-digit seven-segment light emitting diode (LED) output display unit may be inserted into the calculator mainframe. All of these input and output units are included within the calculator itself. An X-Y plotter, a typewriter, a marked sense card reader, an extended data storage memory, a magnetic card reading and recording unit, a ASCII bus for enabling the calculator to communicate with data gathering instruments, and many other peripheral input and output units may also be employed with the calculator.

The calculator may be operated manually by the user from the keyboard input unit or automatically by a program written in user-level language and stored in a plug-in read-only memory unit (ROM), a plug-in programmable read-only memory unit (PROM) or a read/write memory unit associated with a plug-in magnetic card reading and recording unit.

42 Claims, 50 Drawing Figures

CALCULATOR BLOCK DIAGRAM

System Timing Signals

Addressing And Readout Timing

TIMING SIGNALS FOR I/O CIRCUIT $I_1$ ADDRESS FROM C REGISTAR 1001110000
$I_2$ DATA FROM C REGISTAR 1011110000
$I_3$ DATA FROM DATA STORAGE 1011111000

FORMAT FOR USING BCD TO ADDRESS DATA STORAGE REGISTERS

ANODE DRIVER TIMING

SYSTEM MICROPROGRAMMING BLOCK DIAGRAM

FLOW DIAGRAM OF DISPLAY WAIT LOOP

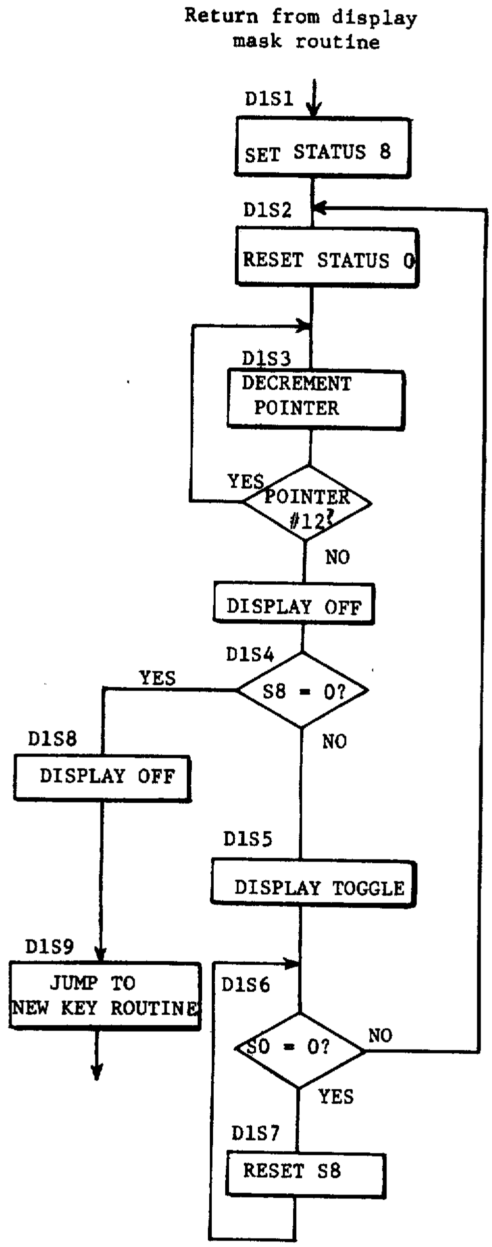

Pointer is at 12 at this time, and the display is off.

Status 8 = 1 indicates "key has been processed"

Status 0 = 1 indicates a key is down

This loop takes 48 word times or about 14.4 msec. It prevents key bounce from executing a function twice.

Check if key is processed. First time S8 = 1 so go to D1S5.

Turn on display to see answer from previous operation.

Check if key down. If no (S0 = 0) reset S8. If yes, return to check S8. At least one pass through D1S7 must be made to insure a key is processed only once.

FIG. 43

OPTION PLUG-IN KEYBOARD FUNCTION BLOCK

ADAPTABLE PROGRAMMED CALCULATOR HAVING PROVISION FOR PLUG-IN KEYBOARD AND MEMORY MODULES

This is a continuation of application Ser. No. 318,451, filed Dec. 26, 1972, now abandoned.

TABLE OF CONTENTS

Title of Section

Background of the Invention
Summary of the Invention
Description of the Drawings
Description of the Preferred Embodiment
System Architecture
Arithmetic and Register Circuit
Read-Only Memory Circuit
Input/Output Circuit
Data Storage Circuit
Clock Driver
LED Display
Output Printer
Power Supply
Plug-In Keyboard Function Block
Plug-In ROM/PROM Option
Data Storage Option
Instruction Set 1
Instruction Set 2
System Microprogramming
Detailed Listing of Routines and Subroutines of Instructions
Calculator Operation
Diagnostic Notes

BACKGROUND OF THE INVENTION

This invention relates generally to calculators and improvements therein and more particularly to calculators which may be easily adapted to meet the specific needs of each user.

Calculators constructed according to the prior art have generally taken one of two approaches toward reducing the labor content of repetitious, routine computational tasks. The first is by means of programmability. The programmable machine has the inherent advantage of program versatility in that it can be programmed to solve problems encountered in nearly all disciplines including mathematics, science, engineering, business, finance, statistics, etc. Unfortunately, this versatility has added significantly to cost. The user is, therefore, paying for considerably more calculating capability and versatility than is required, for instance, in solving repetitive problems related to the same discipline. The approach which has recently been taken to solve this problem is that of a "dedicated" calculator. Such a machine generally has built-in, fixed programming which allows it to handle only a narrow range of problems. Even though these dedicated calculators are less expensive than programmable types, they have a serious shortcoming in that their programs can not be changed.

SUMMARY OF THE INVENTION

The principal object of this invention is to provide an improved programmed calculator that has more capability and flexibility than conventional calculators which are dedicated for solving a narrow range of problems and which is smaller and less expensive than conventional programmable calculators.

Another object of this invention is to provide an adaptable calculator in which programs stored in a read-only memory or programmable read-only memory are written at the user language level rather than the microprogram level, thereby allowing the user to generate or alter such programs without knowledge of the microprogramming language of the calculator.

Another object of this invention is to provide an adaptable calculator in which the user may enlarge the keyboard thereof by plugging into said keyboard a function block containing a plurality of keys together with associated read-only memory, said keys either representing predefined functions or functions definable by the user.

Another object of this invention is to provide an adaptable calculator in which a definable plug-in function block for enlarging the keyboard of the calculator contains a table of microprogram functions and in which such functions, together with additional functions from a microprogram library contained elsewhere in the calculator, may be selectively employed to construct functions or programs to be associated with particular ones of a plurality of keys contained within said function block.

Another object of this invention is to provide an adaptable calculator in which a program stored in a plug-in read-only memory or a plug-in programmable read-only memory can call not only microprogram functions stored within the calculator mainframe, but also microprogram functions stored within a plug-in keyboard function block employed in the calculator.

Another object of this invention is to provide an adaptable calculator in which each key of a user-definable keyboard function block represents a function or program defined, by a read-only memory or programmable read-only memory currently plugged into the calculator, as a sequence of microprogram subroutines which are contained within the calculator mainframe and/or the user-definable function block and which may or may not be represented as keyboard functions.

Another object of this invention is to provide an adaptable calculator in which a user-level program written in a read-only memory or a programmable read-only memory may be run without the availability of keys associated with program writing.

Another object of this invention is to provide an adaptable calculator in which each peripheral input/output unit is interfaced to the calculator by means of a single printed circuit board which contains all necessary hardware and software for driving the peripheral.

Another object of this invention is to provide an adaptable calculator in which the user may designate an automatic decimal point mode for automatically placing the decimal point in entered data at a preselected position.

Another object of this invention is to provide an adaptable calculator in which the user may employ a PER CENT key in combination with data and one or more of the four arithmetic operators.

Another object of this invention is to provide an adaptable calculator in which the user may enter various items of data, each followed by an arithmetic operator and may enter an equal sign following any of the entered arithmetic operators for calculating the result to that point.

Other and incidental objects of this invention will become apparent from a reading of this specification and an inspection of the accompanying drawings.

These objects are accomplished in accordance with the illustrated preferred embodiment of this invention by employing a keyboard input unit, an optional light-emitting diode (LED) display, an output printer, and five MOS/LSI circuits.

The keyboard input unit includes a group of data keys for entering numeric data into the calculator, a group of control keys for controlling the various modes of the calculator and the operations of the output printer, a group of operand keys for designating the mathematical operations to be performed on various items of data, and a group of program keys for controlling the execution of library programs stored within a plug-in read-only memory (ROM) or programmable read-only memory (PROM).

The keyboard also includes a blank section which will accommodate a plug-in function block containing fifteen keys and associated read-only memory. Various function blocks may be dedicated to different disciplines and problem solving areas. For example, a dedicated function block oriented toward statistics includes keys whose representative functions would be helpful in solving statistical problems. Likewise, a mathematics function block would include various mathematical functions available as the result of key actuations. In addition, a user-definable function block may be plugged into the calculator keyboard. This block contains 15 keys, each having a transparent cap which the user may remove for the purpose of inserting a function label. Each of these keys is associated with a particular function or program contained within a plug-in ROM or PROM currently employed with the calculator. Such function or program may then be called by simply actuating the associated key of the user-definable function block.

The optional 15-digit LED output display unit is contained within a plug-in printed circuit board which is automatically accommodated by the calculator.

The 18-column output printer unit is an integral part of the calculator and gives a printed record of entered data, arithmetic operators, calculated results, and diagnostic notes. Printing may be suppressed and otherwise controlled by means of keys on the keyboard input unit.

The MOS/LSI circuits include eight read-only memory circuits in which subroutines for performing various functions are stored. These circuits also supervise program execution and serve to control any peripheral input/output units which may be connected to the calculator. The read-only memory group comprises these eight individual read-only memory circuits which are identical in structure and differ only in the way in which they are programmed.

A control and timing circuit is used for scanning the keyboard, for retaining status information relating to the condition of the calculator or of a particular subroutine, and for generating a next address in read-only memory.

An arithmetic and register circuit contains an adder, a group of working registers, a group of data storage registers forming a stack, and a constant storage register for storing microprogramming level flags associated with various subroutines.

A data storage circuit provides ten data storage registers, five of which are used for parentheses nesting, three of which are used for performing various internal system housekeeping functions at the microprogram level, one of which is a grand total register which may be interrogated by the user, and the last of which is accessible to the user for storing a single item of data.

The last MOS/LSI circuit, the input/output (I/O) circuit, enables the calculator to communicate with various I/O peripheral units such as a typewriter on an X-Y plotter and determines whether the proper peripheral configuration for running a particular program is present. It also includes a binary arithmetic logic unit (ALU) for performing binary arithmetic, a program address counter used in running programs, and the necessary logic circuit for driving the internal printer unit.

The calculator may be operated manually from the keyboard input unit utilizing functions available as keys on the basic keyboard, on a dedicated plug-in function block, or on a user-definable plug-in function block. The calculator may also be operated automatically from a program comprising user-level language instructions and stored in a plug-in read-only memory unit (ROM), a plug-in programmable read-only memory unit (PROM) or a read/write memory unit associated with a plug-in magnetic card reading and recording unit.

DESCRIPTION OF THE DRAWINGS

FIG. 43 is a flow chart of a display wait loop employed in the calculator of FIG. 1.

Description Of The Preferred Embodiment

SYSTEM ARCHITECTURE

Figure 1:
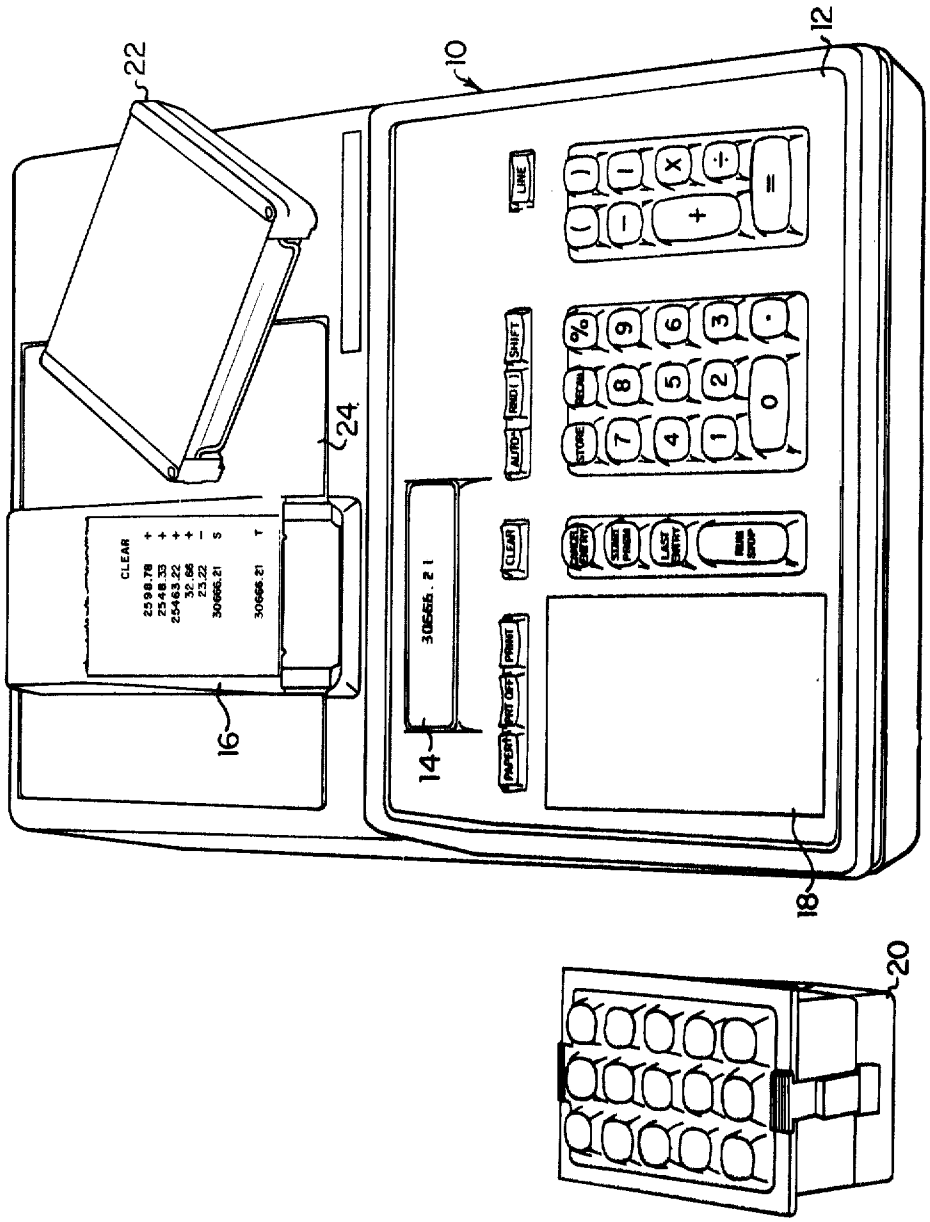
FIG. 1 is a front perspective view of an adaptable calculator according to the preferred embodiment of this invention.
Figure 2:
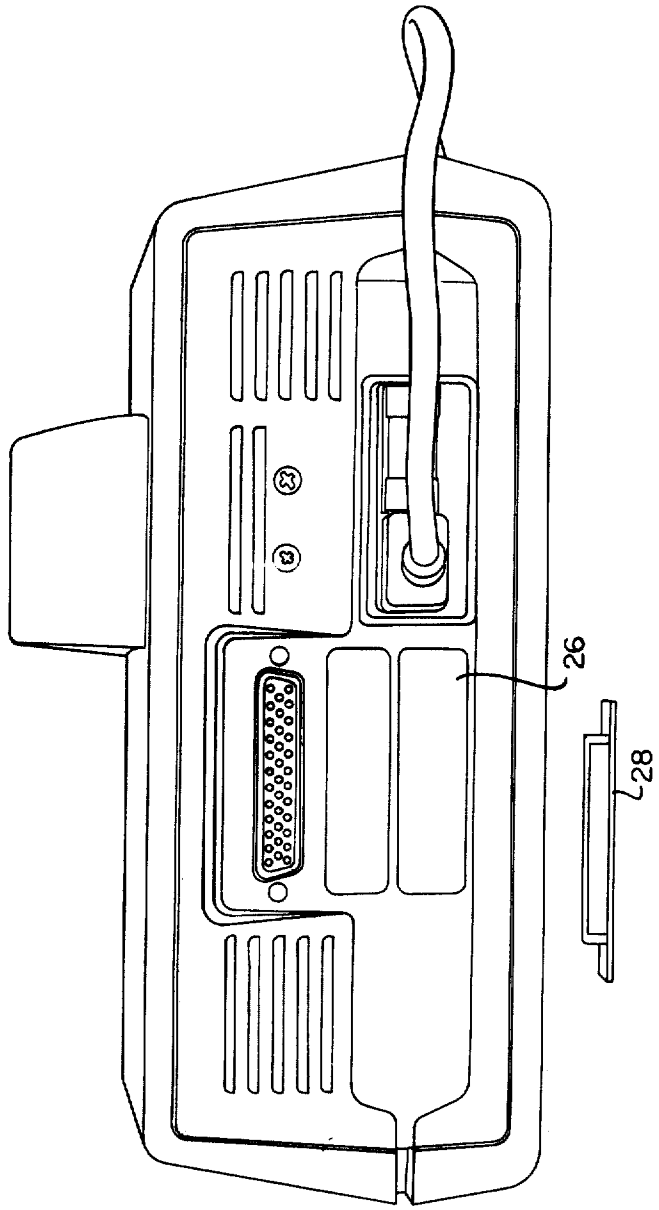
FIG. 2 is a rear perspective view of the adaptable calculator of FIG. 1.

Referring to FIGS. 1 and 2, there is shown a desk top electronic calculator 10 including a keyboard input unit 12 for entering data and instructions into the calculator, an optional seven-segment LED output display unit 14 for displaying each data entry and the results of calculations performed by the calculator. The calculator also includes an 18-column output printer unit 16 for printing intermediate and final results of calculations, entered data, arithmetic operators, and diagnostic notes. Keyboard input unit 12 also includes a covered blank section 18 which will accommodate a 15-key function block 20 for expanding the capabilities of the calculator. Function block 20 may be oriented toward a particular problem solving area in which case its keys will represent functions which are useful in making calculations relating to that discipline. Alternatively, function block 20 may be a user-definable type in which the various keys may be labeled and defined to be functions or programs stored in a ROM or PROM 22 tailored to the requirements of each user. The function or program so defined may then be executed by simply actuating the associated key on the user-definable function block. ROM or PROM 22 may be removably plugged into the calculator by means of hinged top cover 24. The calculator may employ a ROM or PROM 22 without also employing a plug-in function block 20. In such case, the ROM or PROM contains one or more programs which the user may execute from the main keyboard.

As shown in FIG. 2, the calculator also includes three I/O receptacles 26 covered when not in use by receptacle caps 28. These receptacles serve to connect the calculator to various I/O peripheral units such as a typewriter, a marked sense card reader, and X–Y plotter, etc.

Figure 3:
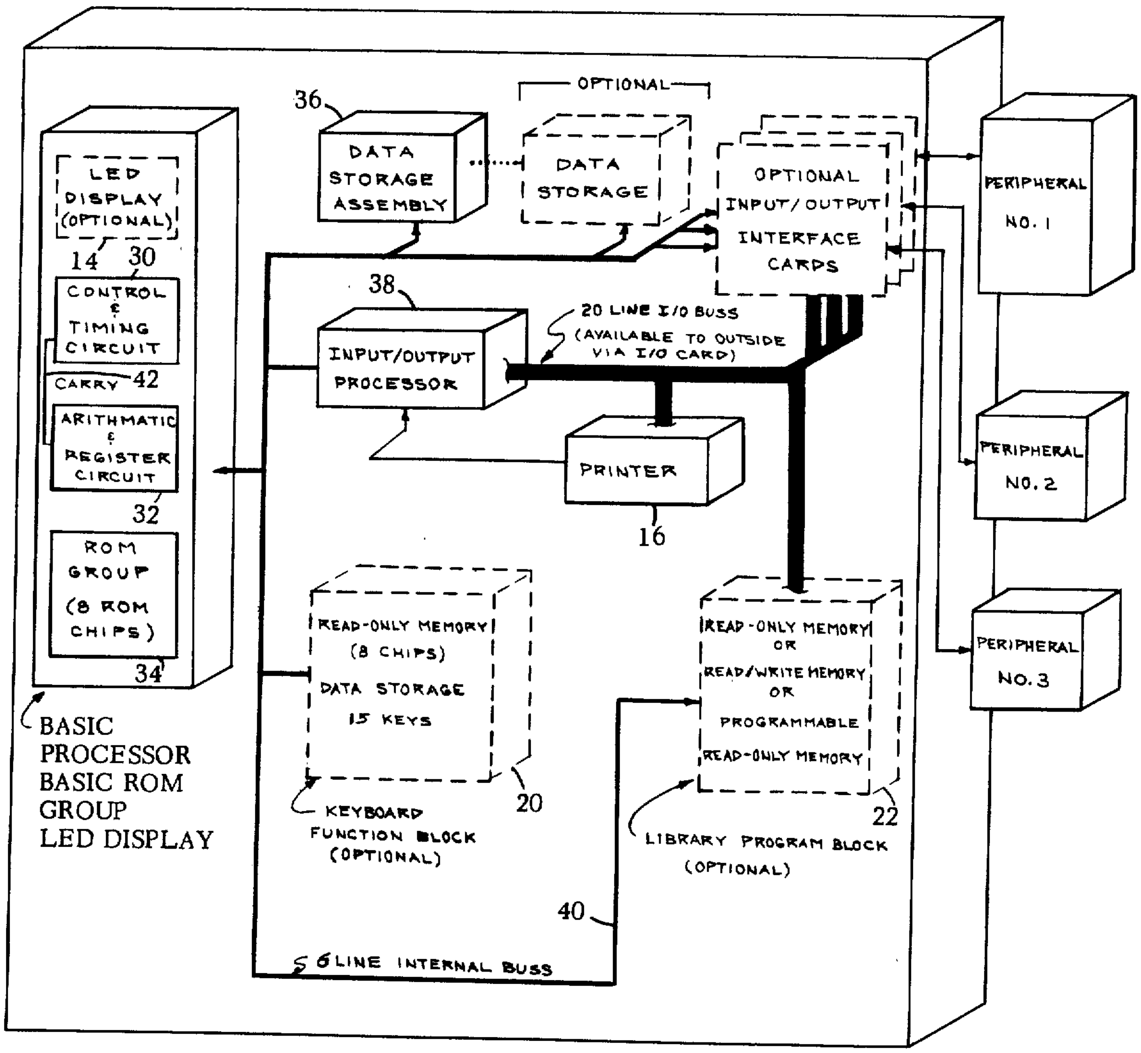
FIG. 3 is a block diagram of the calculator of FIG. 1.

As shown in the overall block diagram of FIG. 3, the calculator also includes an MOS/LSI control and timing circuit 30, an MOS/LSI arithmetic and register circuit 32, eight MOS/LSI read-only memory circuits comprising a read-only memory group 34, an MOS/LSI data storage circuit contained within a data storage assembly 36, and an MOS/LSI input/output circuit contained within an input/output processor 38.

The MOS/LSI circuits are two-phase dynamic types with low thresholds for assuring compatibility with standard TTL bipolar circuits and for operation at very low power levels. They are organized to process 14-digit BCD words in a digit-serial, bit-serial manner. They are also capable of bit-serially processing 56-bit binary words. The maximum bit rate or clock frequency is 200 kilohertz, which gives a word time of 280 microseconds. This means that a floating point addition may be accomplished in 60 milliseconds.

Figure 4:
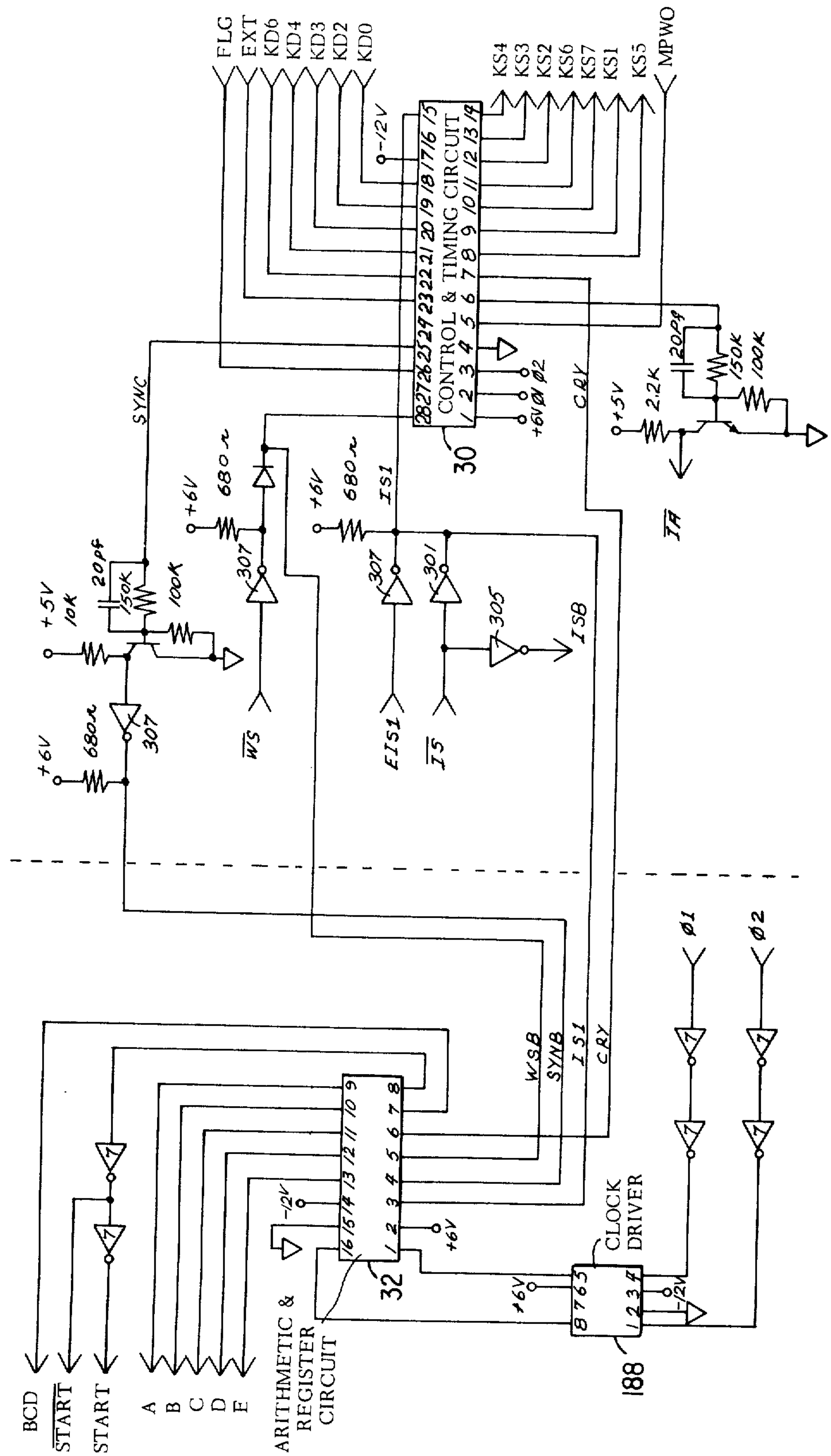
FIG. 4 is a detailed schematic diagram showing the interconnection of the arithmetic and register circuit and the control and logic circuit of FIG. 3.

Control and timing circuit 30, read-only memory (ROM) group 34, arithmetic and register circuit 32, data storage assembly 36, and input/output processor 38 are tied together by a six-line bus 40. This bus comprises a SYNC line, an instruction ($I_s$) line, a word select (WS) line, an instruction address ($I_a$) line, a START line, and a BCD line. All operations occur on a 56-bit ($b_0$–$b_{55}$) word cycle (14 four-bit BCD digits). The timing sequence for some of the interconnecting lines comprising bus 40 are shown in FIG. 4.

The SYNC line carries synchronization signals from control and timing circuit 30 to ROM circuits ϕ–7 in read-only memory group 34 and to arithmetic and register circuit 32 to synchronize the calculator system. It provides one output each word time. This output also functions as a 10-bit wide window ($b_{45}$–$b_{54}$) during which instruction line $I_s$ is active.

The instruction line $I_s$ carries 10-bit instructions from the active read-only memory circuit of ROM group 34 to the other ROMs, to control and timing circuit 30, to data storage assembly 36, and to input/output processor 38, each of which decodes the instructions locally and responds to or acts upon them if they pertain thereto and ignores them if they do not. In order to free instruction bit patterns normally associated with the arithmetic and register circuit and the control and timing circuit, the $I_s$ line is gated prior to being shown to these circuits. For example, the ADD instruction affects arithmetic and register circuit 32 but is ignored by all other circuits. Similarly, the SET STATUS BIT 5 instruction sets status flip-flop 5 in control and timing circuit 30 but is ignored by all other circuits.

The actual implementation of an instruction is delayed one word time from its receipt. For instance, an instruction may require the addition of digit 2 in two of the registers in arithmetic and register circuit 32. The ADD instruction would be received by arithmetic and register circuit 32 during bit times $b_{45}$–$b_{54}$ of word time N+1. Thus, while one instruction is being executed, the next instruction is being fetched.

The WS line carries an enable signal from control and timing circuit 30 or one of the ROM circuits in read-only memory group 34 to arithmetic and register circuit 32 to enable the instruction being executed thereby. Thus, in the example of the previous paragraph, addition occurs only during digit 2 since the adder in the arithmetic and register circuit 32 is enabled by the WS line only during this portion of the word. When the WS line is low the contents of the registers in arithmetic and register circuit 32 are recirculated unchanged. Three examples of WS timing signals are shown in FIG. 4. In the first example, digit position 2 is selected out of the entire word. In the second example, the last 11 digits are selected. This corresponds to the mantissa portion of a floating point word format. In the third example, the entire word is selected. Use of the word select feature allows selective addition, transfer, shifting or comparison of portions of the registers within arithmetic and register circuit 32 with only one basic ADD, TRANSFER, SHIFT or COMPARE instruction. Some customization in the ROM word select fields is available via masking options.

The $I_a$ line serially carries the addresses of the instructions to be read from read-only memory circuits ϕ–7 of ROM group 34. These addresses originate from control and timing circuit 30, which contains an instruction address register that is incremented each word time unless a JUMP SUBROUTINE or a BRANCH instruction is being executed. Each address is transferred to ROMs ϕ–7 during bit times $b_{19}$–$b_{26}$ and is stored in an address register of each ROM. However, only one ROM is active at any given point in time, and only the active ROM responds to an address by outputting an instruction on the $I_s$ line. Control is transferred between the ROM circuits ϕ–7 by a ROM SELECT instruction. This technique allows a single eight-bit address, plus eight special instructions, to address up to eight ROMs of 256 words each.

The START line carries a one-bit pulse which occurs during bit time $b_0$ and is used to synchronize operations of data storage assembly 36 and input/output processor 38 with those of arithmetic and register circuit 32.

The BCD line carries numerical data between arithmetic and register circuit 32, input/output processor 38, and any basic or optional units containing data storage circuits. The format of the data carried on this line is illustrated in FIG. 4.

The CARRY line 42 transmits the status of the carry outputs of the adder in arithmetic and register circuit 32 to control and timing circuit 30. The control and timing circuit uses this information to make conditional branches, dependent upon the numerical value of the contents of the registers in arithmetic and register circuit 32.

Control and timing circuit 30 is organized to scan a five-by-eight matrix of switches in search of an interconnection that designates actuation of a key. Any type of metal-to-metal contact may be used as a key. Bounce problems associated with keyboard switch contact are overcome by programmed lockouts in a key entry routine. Each key has an associated six-bit code. To accommodate more than the 40-key maximum represented by the five-by-eight matrix scanner included in the control and timing circuit, an additional keyboard multiplexor circuit is provided. This circuitry is shown in detail in FIG. 8.

A standard power supply circuit contains a power-on circuit which supplies a signal for forcing the calculator to start up in a known condition when power is supplied thereto. A line switch on the calculator keyboard controls the application of operating power. The primary outputs of the calculator are a built-in printer 44 and an optional plug-in LED display unit 46.

CONTROL AND TIMING CIRCUIT

Figure 6:
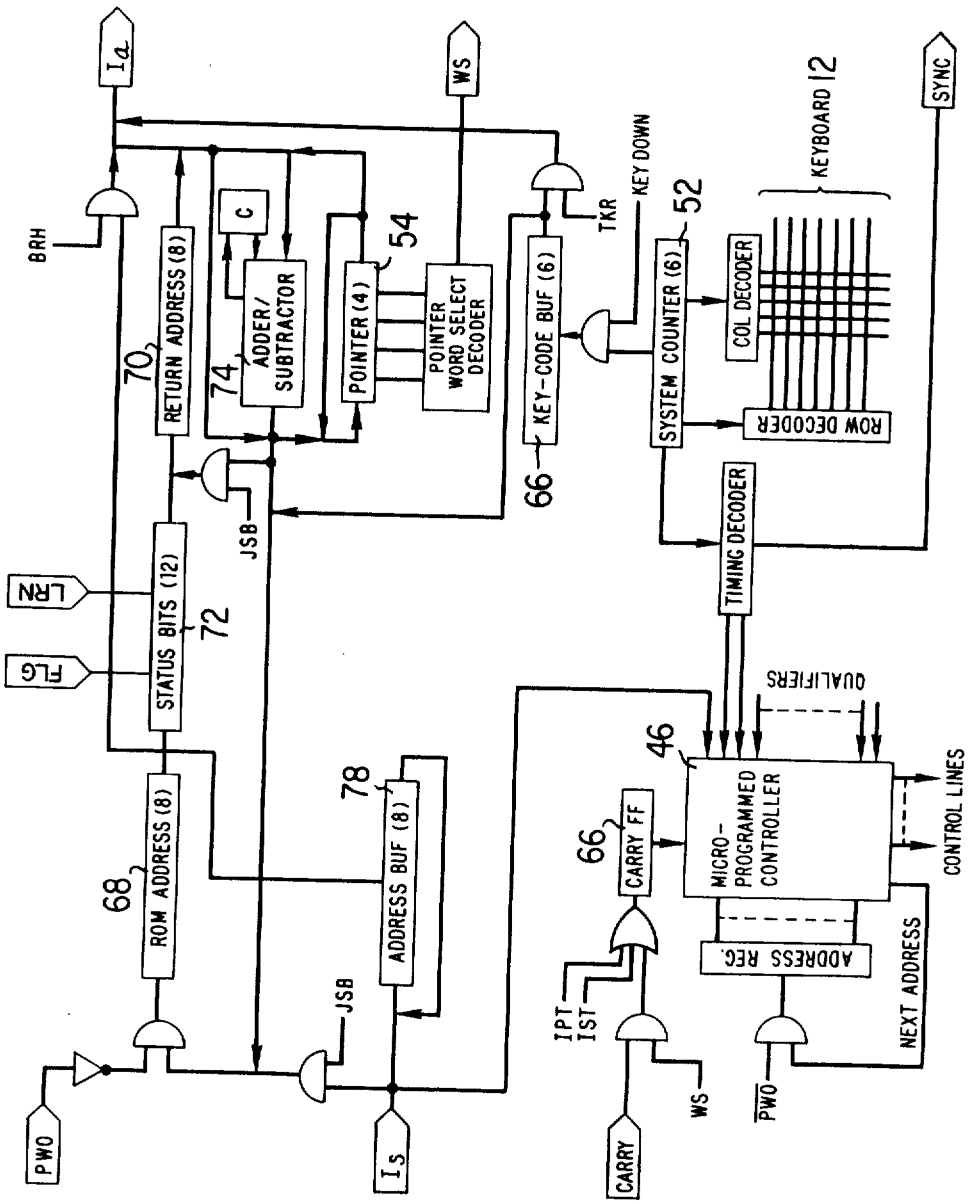
FIG. 6 is a block diagram of the control and timing circuit of FIG. 3.

Referring now to FIGS. 4 and 6, control and timing circuit 30 contains the master system counter 52, scans the keyboard 12, retains status information about the system or the condition of an algorithm, and generates the next ROM address. It also originates the subclass of word select (WS) signals which involve the pointer 54, a four-bit counter that points to one of the register digit positions.

The control unit of control and timing circuit 30 is a microprogrammed controller 56 comprising a 58 word (25 bits per word) control ROM, which receives qualifier or status conditions from throughout the calculator and sequentially outputs signals to control the flow of data. Each bit in this control ROM either corresponds to a single control line or is part of a group of N bits encoded into $2^N$ mutually exclusive control lines and decoded external to the control ROM. At each phase 2 clock a word is read from the control ROM as determined by its present address. Part of the output is then fed back to become the next address.

Several types of qualifiers are checked. Since most commands are issued only at certain bit times during the word cycle, timing qualifiers are necessary. This means the control ROM may sit in a wait loop until the appropriate timing qualifier becomes true, then move to the next address to issue a command. Other qualifiers are the state of the pointer register, the PWO (power on) line, the CARRY flip-flop, and the state of each of the 12 status bits.

Since the calculator is a serial system based on a 56 bit word, a six-bit system counter 52 is employed for counting to 56. Several decoders from system counter 52 are necessary. The SYNC signal is generated during bit times $b_{45}$–$b_{54}$ and transmitted to the arithmetic and register circuit 32 and all ROM groups present in the calculator system. Other timing qualifiers are sent to the microprogrammed control ROM 56 as mentioned in the previous paragraph.

Figure 7:
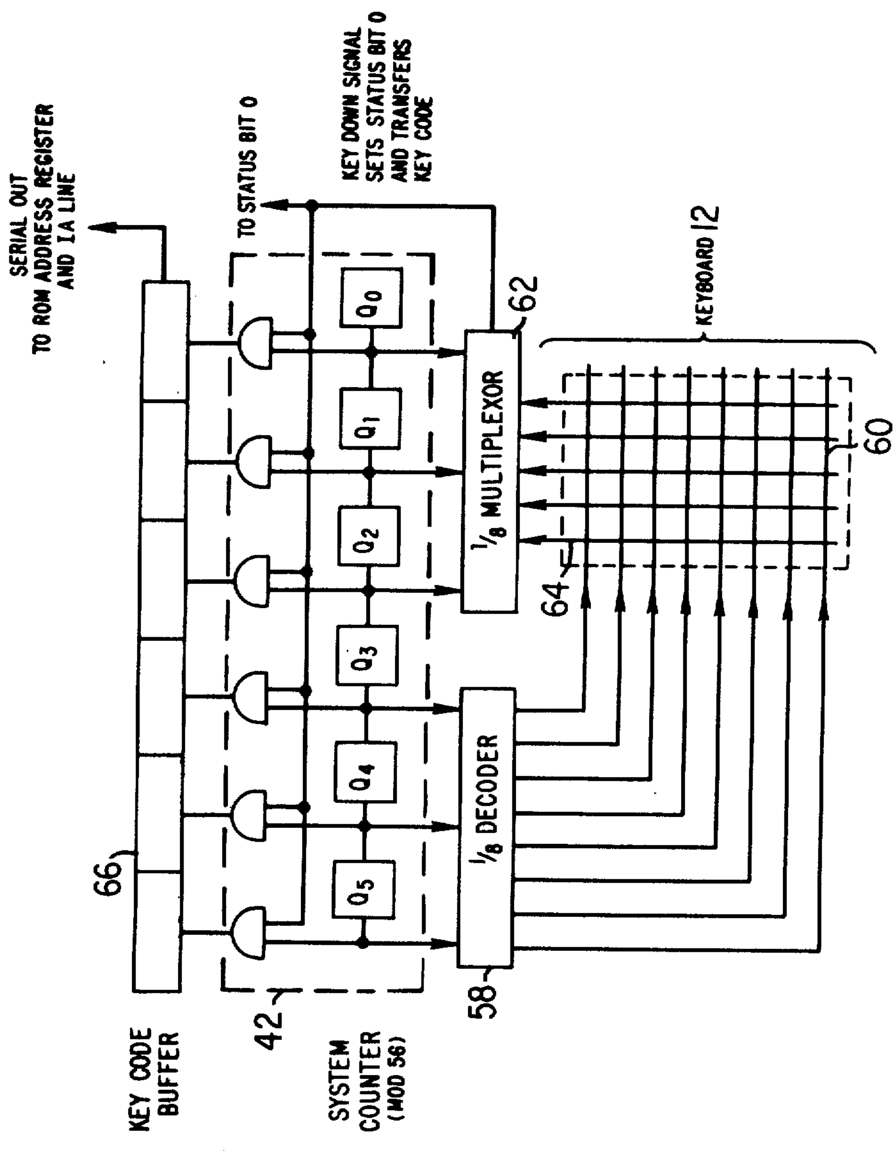
FIG. 7 is a more detailed block diagram of the keyboard scanning circuitry of FIG. 6.

System counter 52 is also employed as a keyboard scanner as shown in FIG. 7. The three most significant bits of system counter 52 go to a one-of-eight decoder 58, which sequentially selects one of the keyboard row lines 60. The least significant three bits of the system counter count modulo seven and go to a one-of-five multiplexor 62, which sequentially selects one of the keyboard column lines 64 (during 16 clock times no key is scanned). The multiplexor output is called the key down signal. If a contact is made at any intersection point in the five-by-eight matrix (by depressing a key), the key down signal will become high for one state of system counter 52 (i.e., when the appropriate row and column lines are selected). The key down signal will cause that state of the system counter to be saved in key code buffer 66. This six-bit code is then transferred to the ROM address register 68 and becomes a starting address for the program which services the key that was down (two leading zero bits are added by hardware so an eight-bit address exists). Thus, during each state of system counter 52, the decoder-multiplexor combination 58 and 62 is looking to see if a specific key is down. If it is, the state of the system counter becomes a starting address for execution of that key function (note that 16 of the 56 states are not used for key codes). By sharing the function of the system counter and using a keyboard scanning technique directly interfaced to the MOS circuitry, circuit complexity is reduced significantly.

Figure 8:
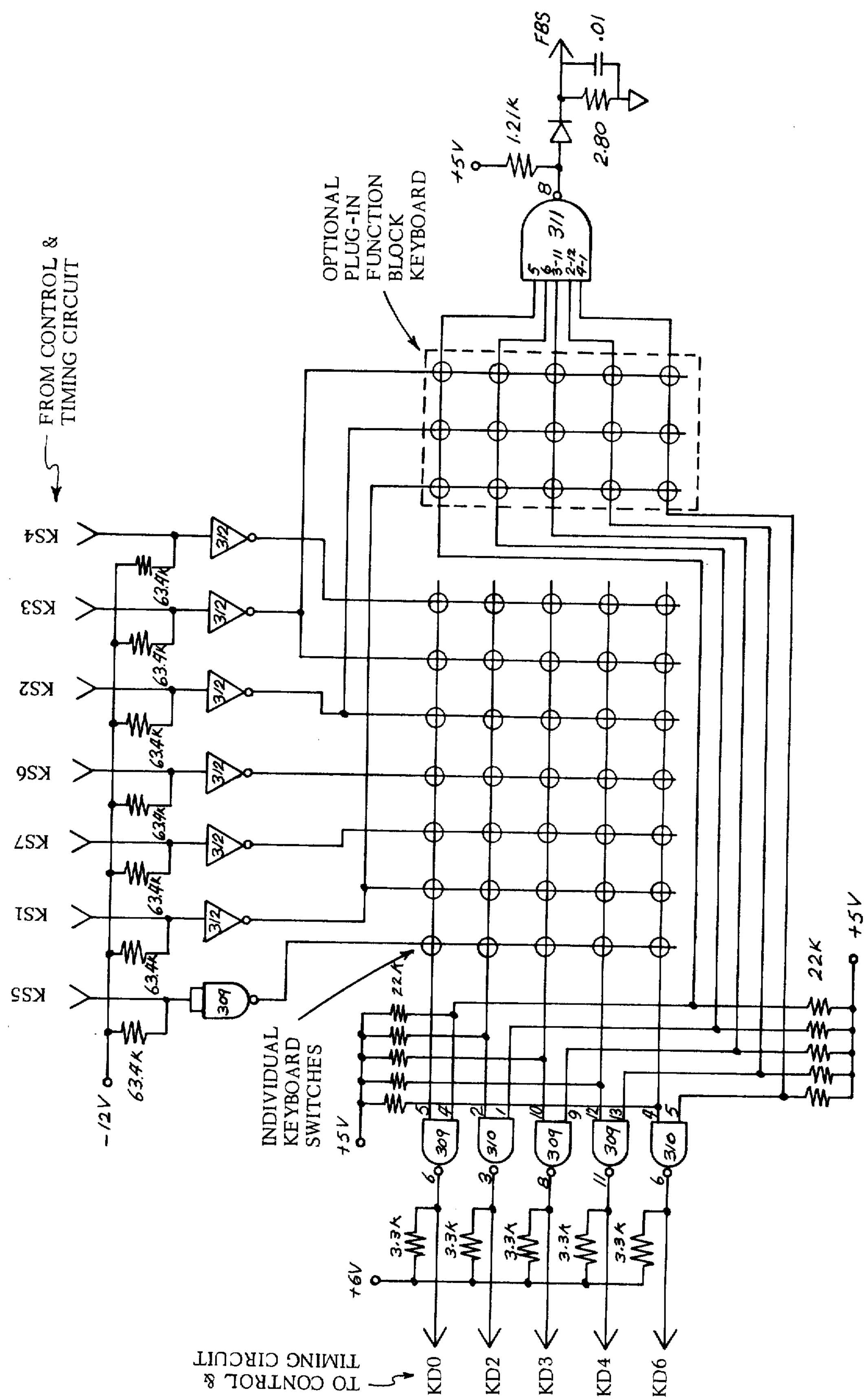
FIG. 8 is a detailed schematic diagram of the keyboard circuitry of FIG. 7.

While the control and timing circuit 30 is capable of scanning 40 keys without the use of additional logic circuitry, the calculator keyboard 12 may be optionally configured with 50 keys. The additional keyboard multiplexing circuitry required to increase the scanning capacity of the control and timing circuit to 50 keys is shown in FIG. 8.

A 28-bit shift register which circulates twice each 56-bit word time is employed in the control and timing circuit of FIG. 6. These 28 bits are divided into three functional groups, namely the main ROM address register 68 (eight bits), the subroutine return address register 70 (eight bits), and the status register 72 (twelve bits).

The main read-only memories $\phi$–7 each contain 256 words of ten bits each, thereby requiring an eight-bit address. This address circulates through a serial adder/subtractor 74 and is incremented during bit times $b_{47}$–$b_{54}$ (except in the case of BRANCH and JUMP SUBROUTINE instructions, for which the eight-bit address field of the ten-bit instruction is substituted for the current address). The next address is transmitted over the $I_a$ line to each of the main ROMs $\phi$–7 during bit times $b_{19}$–$b_{26}$.

The status register 72 contains 12 bits or flags which are used to keep track of the state of the calculator. Such information as whether the decimal point has been hit, the minus sign set, etc. must be retained in the status bits. In each case the calculator remembers past events by setting an appropriate status bit and asking later if it is set. A yes answer to a status interrogation will set the carry flip-flop 76 as indicated by control signal IST in FIG. 6. Any status bit can be set, reset, or interrogated while circulating through the adder 74 in response to the appropriate instruction.

The instruction set allows one level of subroutine call. The return address is stored in the eight-bit return address register 70. Execution of a JUMP SUBROUTINE instruction stores the incremented present address into return address register 70. Execution of the RETURN instruction retrieves this address for transmission over the $I_a$ line. Gating is employed to interrogate the 28 bits circulating in the shift register 68-72 for insertion of addresses at the proper time as indicated by the JSB control signal in FIG. 6.

An important feature of the calculator system is the capability to select and operate upon a single digit or a group of digits (such as the exponent field) from the 14-digit registers. This feature is implemented through the use of a four-bit pointer 54 which points to the digit of interest. Instructions are available to set, increment, decrement, and interrogate pointer 54. The pointer is incremented or decremented by the same serial adder/subtractor 74 used for addresses. A yes answer to the IS POINTER N instruction will set the carry flip-flop 76 via control signal IPT in FIG. 6.

Figure 5:
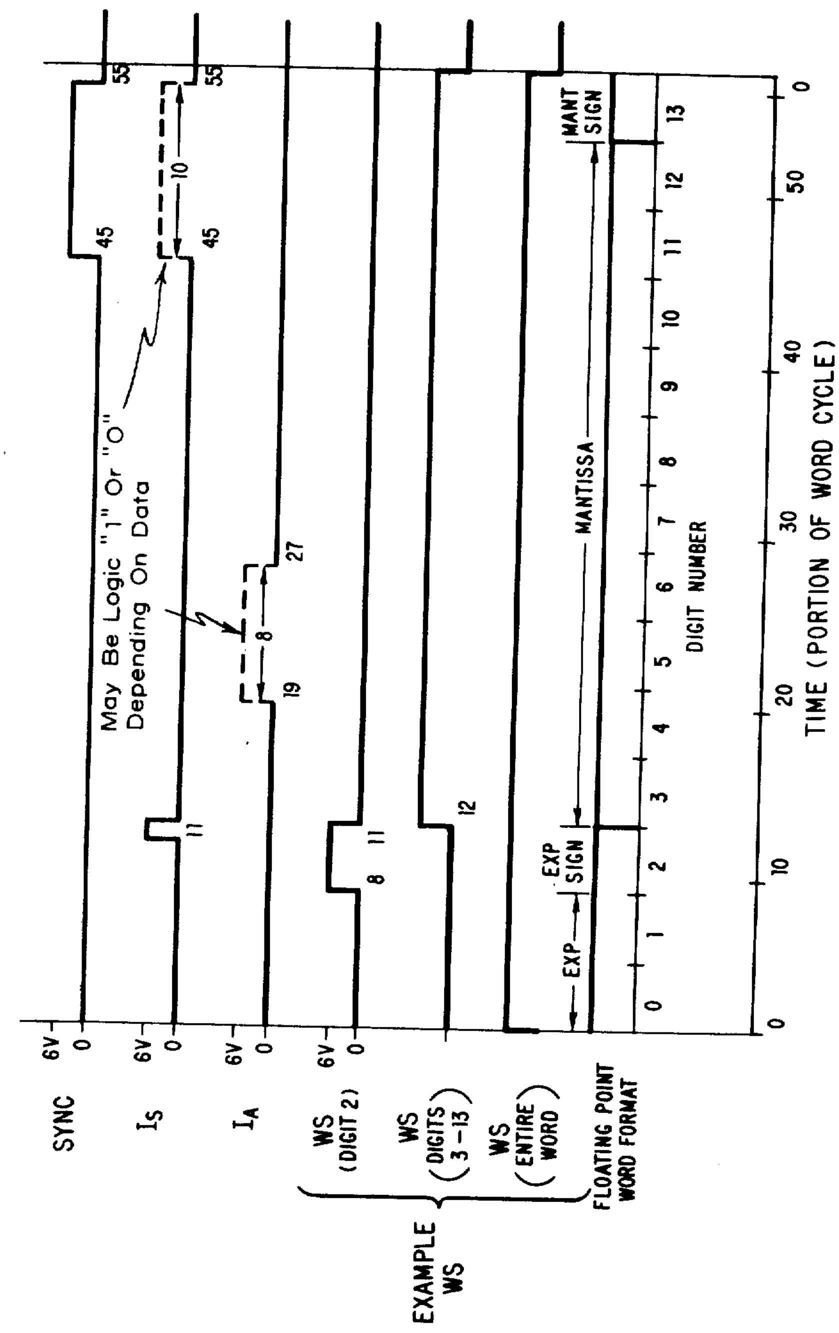
FIG. 5 is a waveform diagram illustrating the timing sequence of the interconnecting busses of FIG. 3.

The word select feature was discussed above in connection with FIGS. 3 and 5. Some of the word select signals are generated in control and timing circuit 30, namely those dependent on pointer 54, and the remainder in the main read-only memories $\phi$–7. The pointer word select options are (1) pointer position only and (2) pointer position and all less significant digits. For instance, assume the mantissa signs of the numbers in the A and C registers of arithmetic and register circuit 32 are to be exchanged. The pointer would be set to position 13 (last position) and the A EXCHANGE C instruction with a pointer position word select field would be given. If all of the word except the mantissa signs are to be exchanged, the A EXCHANGE C instruction would be given with the pointer set at 12 and the word select field set to pointer and less significant digits. The control and timing circuit word select (WS) output is OR connected with the ROM word select output and transmitted to arithmetic and register circuit 32.

Any carry signal out of the adder in arithmetic and register circuit 32, with word select also high, will set carry flip-flop 76. This flip-flop is interrogated during the BRANCH instruction to determine if the existing address should be incremented (yes carry) or replaced by the branch address (no carry). The branch address is retained in an eight-bit address buffer 78 and gated to the $I_a$ line by the BRH control signal.

The power-on signal is used to synchronize and preset the starting conditions of the calculator. It has two functions, one of which is to get the address of control ROM 56 set to a proper starting state, and the other of which is to get the system counter 52 in control and timing circuit 30 synchronized with the counter in each main ROM $\phi$–7. As the system power comes on, the PWO signal is held at a logical 1 (0 volts in this system) for at least one second. This allows system counter 52 to make at least one pass through bit times $b_{45}$–$b_{54}$ when SYNC is high, thereby setting main ROM $\phi$ active and the rest of the ROMs inactive. When PWO goes to a logical 0 (+6 volts), the address of control ROM 56 is set to 000000 where proper operation can begin.

ARITHMETIC AND REGISTER CIRCUIT

Figure 9:
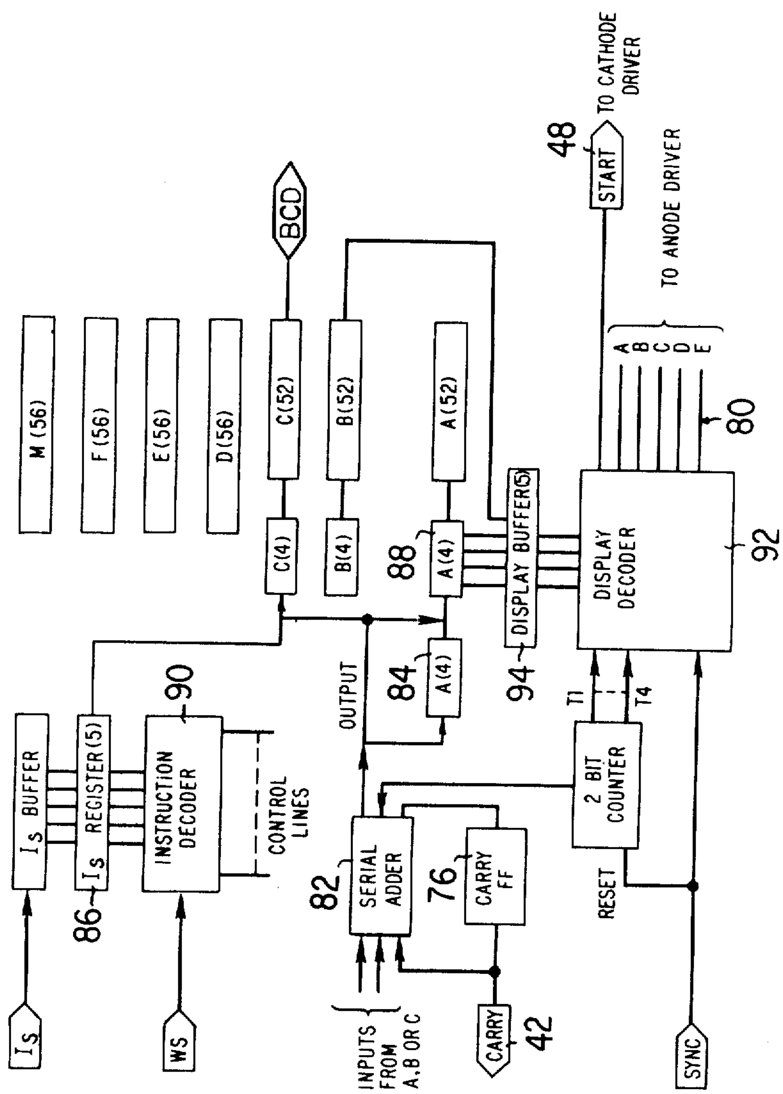
FIG. 9 is a block diagram of the arithmetic and register circuit of FIG. 3.

Arithmetic and register circuit 32 shown in FIG. 9 provides the arithmetic functions and a portion of the data storage for the calculator. It is controlled by the WS, $I_s$, and SYNC lines and receives instructions from the ROMs $\phi$–7 over the $I_s$ line, sends information back to control and timing circuit 30 via the CARRY line 42, partially decodes the display information before transmitting it via output lines 80 to the anode driver of output display unit 14, and provides a START pulse to the cathode driver of output display unit 14 for synchronizing the display, said START pulse also being used for synchronizing the input/output processor and all data storage circuits employed in the calculator.

Arithmetic and register circuit 32 contains seven 14-digit (56-bit) dynamic registers A–F and M and a serial BCD adder/subtractor 82. Actual data paths, not shown in FIG. 9 due to their complexity, are discussed below and shown in FIG. 10. The power and flexibility of an instruction set is determined to a great extent by the variety of data paths available. One of the advantages of a serial structure is that additional data paths are not very costly (only one additional gate per path). The structure of arithmetic and register circuit 32 is optimized for the type of algorithms required by the calculator.

Figure 10:
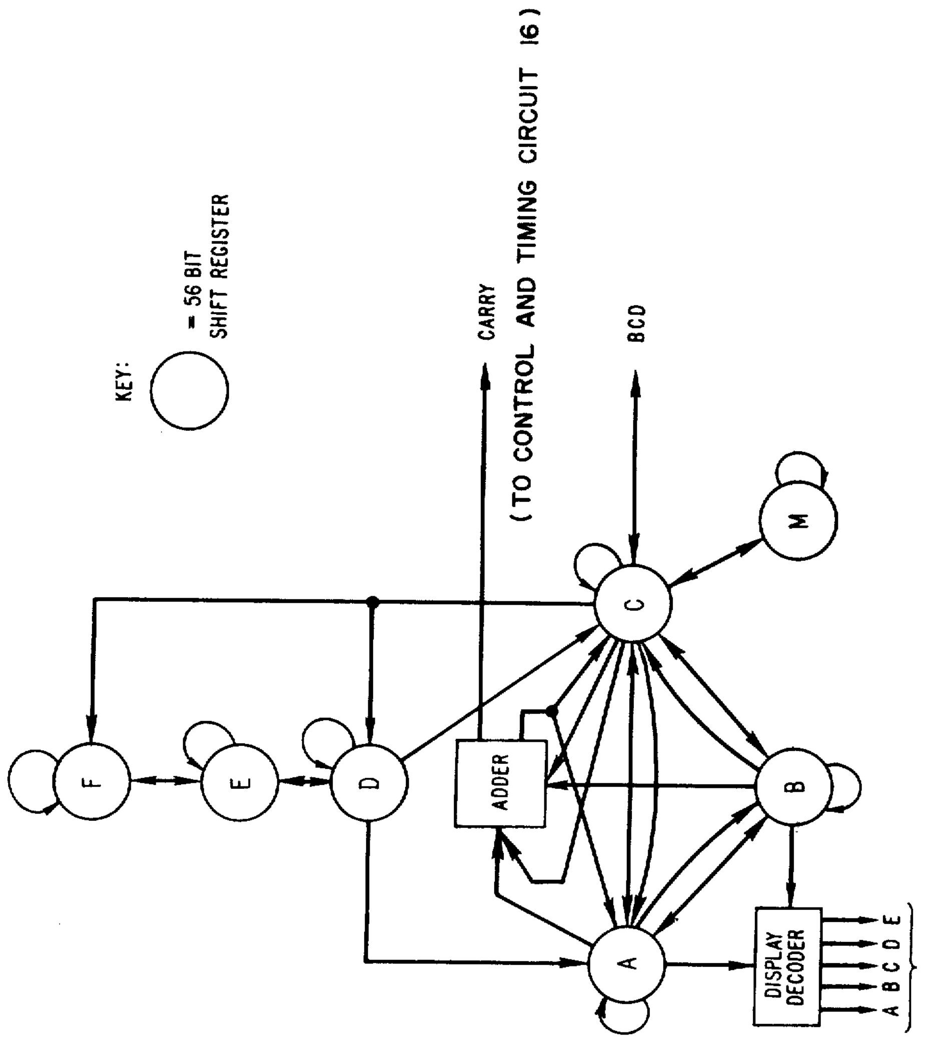
FIG. 10 is a path diagram of the actual data paths for the registers A–F and M of FIG. 9.

The seven registers A–F and M can be divided into three groups: (1) the working registers A, B, and C with C also being the bottom register of a four-register stack; (2) the next three registers D, E, and F in the stack; and (3) a separate storage register M communicating with the other registers through register C only. In FIG. 10, which shows the data paths connecting all the registers A–F and M, each circle represents the 56-bit register designated by the letter in the circle. In the idle state (when no instruction is being executed in arithmetic and register circuit 32) each register continually circulates since with dynamic MOS registers information is represented by a charge on a parasitic capacitance and must be continually refreshed or lost. This is represented by the loop re-entering each register.

Registers A, B, and C can all be interchanged. Either register A or C is connected to one adder input, and either register B or C to the other. The adder output can be directed to either register A or C. Certain instructions can generate a carry via carry flip-flop 76 which is transmitted to control and timing circuit 30 to determine conditional branching. Register C always holds a normalized version of the displayed data.

In the stack formed by registers C, D, E and F a ROLL DOWN instruction is executed by the following transfers: F → E → D → C → D. A STACK UP instruction is executed by the following transfers: $\circlearrowleft$C → D → E → F. Thus, it is possible to transfer a register and also let it recirculate so that, in the last example, the contents of C are not lost. The structure and operation of a stack such as this are further described in copending U.S. Patent Application Ser. No. 257,606 entitled IMPROVED PORTABLE ELECTRONIC CALCULATOR, filed on May 30, 1972, by David S. Cochran et al., and issued on Dec. 25, 1973, as U.S. Pat. No. 3,781,820.

In serial decimal adder/subtractor 82 a correction (addition of 6) to a BCD sum must be made if the sum exceeds nine (a similar correction for subtraction is necessary). It is not known if a correction is needed until the first three bits of the sum have been generated. This is accomplished by adding a four-bit holding register 84 ($A_{60}$–$A_{57}$) and inserting the corrected sum into a portion 88 ($A_{56}$–$A_{53}$) of register A if a carry is generated. This holding register 84 is also required for the SHIFT A LEFT instruction. One of the characteristics of a decimal adder is that non-BCD codes, such as 1101, are not allowed. They will be modified if circulated through the adder. The adder logic is minimized to save circuit area. If four-bit codes other than 0000–1001 are processed, they will be modified. This is no constraint for applications involving only numeric data (however, if ASCII codes, for instance, are operated upon, incorrect results will be obtained).

Arithmetic and register circuit 32 receives the instruction during bit times $b_{45}$–$b_{54}$. Of the ten types of instructions hereinafter described, arithmetic and register circuit 32 must respond to only two types, namely ARITHMETIC & REGISTER instructions and DATA ENTRY/DISPLAY instructions. ARITHMETIC & REGISTER instructions are coded by a 10 in the two least significant bits of $I_s$ register 86. When this combination is detected the most significant five bits are saved in $I_s$ register 86 and decoded by instruction decoder 90 into one of 32 instructions.

The ARITHMETIC & REGISTER instructions are active or operative only when the word select signal (WS) generated in one of the ROMs $\phi$–7 or in control and timing circuit 30 is a logical one. For instance, suppose the instruction A+C→ C, MANTISSA WITH SIGN ONLY is called. Arithmetic and register circuit 32 decodes only A+C → C. It sets up registers A and C at the inputs to adder 82 and, when WS is high, directs the adder output to register C. Actual addition takes place only during bit times $b_{12}$ to $b_{55}$ (digits 3–13) since for the first three digit times the exponent and exponent sign are circulating and are directed unchanged back to their original registers. Thus, the word select signal is an INSTRUCTION ENABLE in arithmetic and register circuit 32 (when it is a logical 1, instruction execution takes place, and when it is a logical 0, recirculation of all registers continues).

The DATA ENTRY/DISPLAY instructions, except for digit entry, affect an entire register (the word select signal generated in the active ROM is a logical 1 for the entire word cycle).

Some of these instructions are: UP STACK, DOWN STACK, MEMORY, EXCHANGE M ←→ C, DISPLAY ON, or DISPLAY TOGGLE. A detailed description of their execution is given hereinafter.

Figure 11:
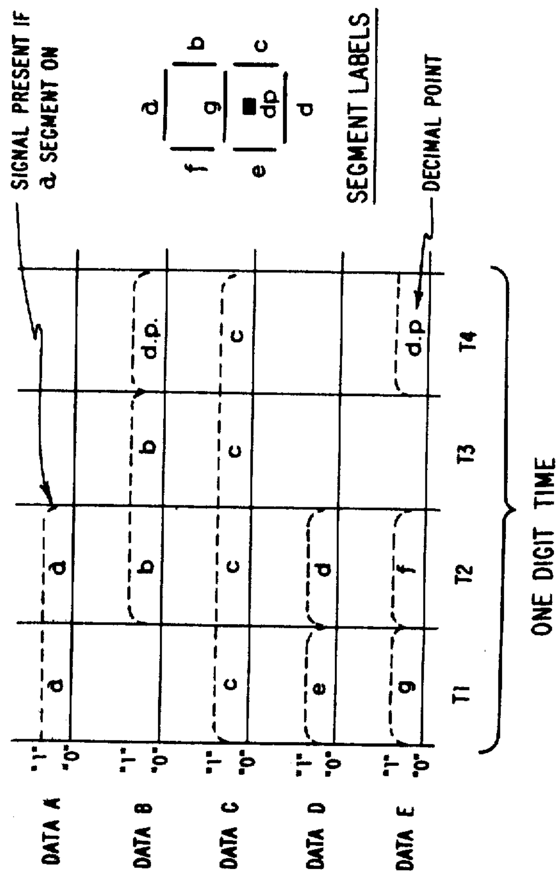
FIG. 11 is a waveform diagram illustrating the output signals for the display decoder outputs A–E of FIGS. 9 and 10.
Figure 12:
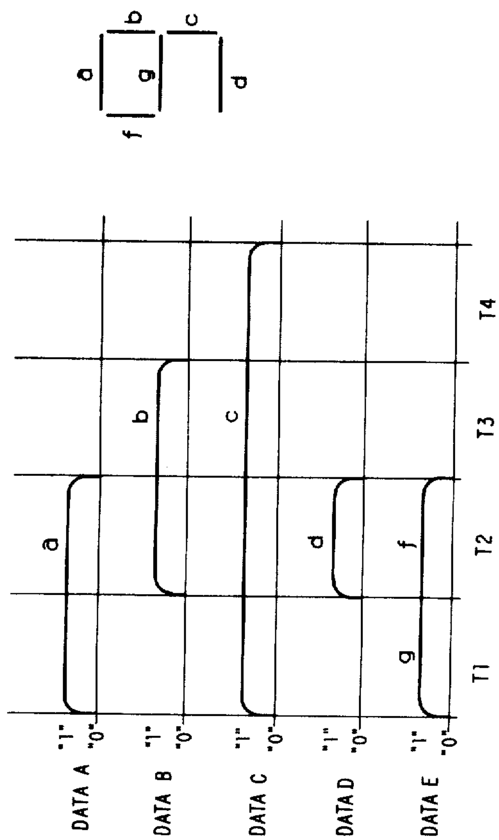
FIG. 12 is a waveform diagram illustrating the actual signals on the display decoder outputs A–E of FIGS. 9 and 10 when the digit 9 is decoded.

For greater power savings, display decoder 92 is partitioned to partially decode the BCD data into seven segments and a decimal point in arithmetic and register circuit 32 by using only five output lines (A–E) 80 with time as the other parameter. Information for seven segments (*a–g*) and a decimal point (*dp*) are time shared on the five output lines A–E. The output wave forms for output lines A–E are shown in FIG. 11. For example, output line D carries the segment *e* information during $T_1$ (the first bit time of each digit time) and the segment *d* information during $T_2$ (the second bit time of each digit time); output E carries the segment *g* information during $T_1$, the segment *f* information during $T_2$, and the decimal point (*dp*) during $T_4$. The actual signals which would appear if the digit 9 were decoded are shown in FIG. 12. The decoding is completed in the anode driver of output display unit 14 as explained hereinafter.

The registers in arithmetic and register circuit 32 hold fourteen digits comprising ten mantissa digits, the mantissa sign, two exponent digits, and the exponent sign. Although the decimal point is not allocated a register position, it is given a full digit position in the output display. This apparent inconsistency is achieved by using both the A and B registers to hold display information. The A register is set up to hold the displayed number with the digits in the proper order. The B register is used as a masking register with the digit 9 inserted at the decimal point location. When the anode driver of output display unit 14 detects a decimal point code during $T_4$, it provides a signal to the cathode driver of the output display unit directing a move to the next digit position. One digit and the decimal point share one of the fourteen digit times. The digit 9 mask in register B allows both trailing and leading zeros to be blanked (i.e., by programming nines into the B register). Use of all three working registers for display (i.e., the C register to retain the number in normalized form, the A register to hold the number in the displayed form, and the B register as a mask) allows the calculator to have both a floating point and a scientific display format at the expense of only a few more ROM states.

The display blanking is handled as follows. At time $T_4$ the BCD digit is gated from register A into display buffer 94. If this digit is to be blanked, register B will contain a nine (1001) so that at $T_4$ the end bit ($B_{01}$) of the B register will be a one (an eight would therefore also work). The input to display buffer 94 is OR connected with $B_{01}$ and will be set to 1111 if the digit is to be blanked. The decimal point is handled in a similar way. A two (0010) is placed in register B at the decimal point location. At time $T_2$ the decimal point buffer flip-flop is set by $B_{01}$. Any digit with a one in the second position will set the decimal point (i.e., 2, 3, 6, or 7).

Figure 13:
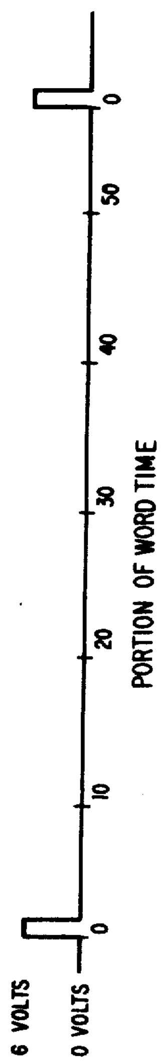
FIG. 13 is a waveform diagram illustrating the timing of the START signal generated by the display decoder of FIG. 9.

Display decoder 92 also applies a START signal to line 48. This signal is a word synchronization pulse, which resets the digit scanner in the cathode driver of output display unit 14 to assure that the cathode driver will select digit 1 when the digit 1 information is on outputs A, B, C, D, and E. The timing for this signal is shown in FIG. 13.

One other special decoding feature is required. A minus sign is represented in tens complement notation or sign and magnitude notation by the digit 9 in the sign location. However, the display must show only a minus sign (i.e., segment *g*). The digit 9 in register A in digit position 2 (exponent sign) or position 13 (mantissa sign) must be displayed as minus. The decoding circuitry uses the pulse on the $I_s$ line at bit time $b_{11}$ (see FIG. 5) to known that the digit 9 in digit position 2 of register A should be a minus and uses the SYNC pulse to know that the digit 9 in digit position 13 of register A should also be a minus. The pulse on the $I_s$ line at bit time $b_{11}$ can be set by a mask option, which allows the minus sign of the exponent to appear in other locations for other uses of the calculator circuits.

READ-ONLY MEMORY CIRCUIT

Figure 16:
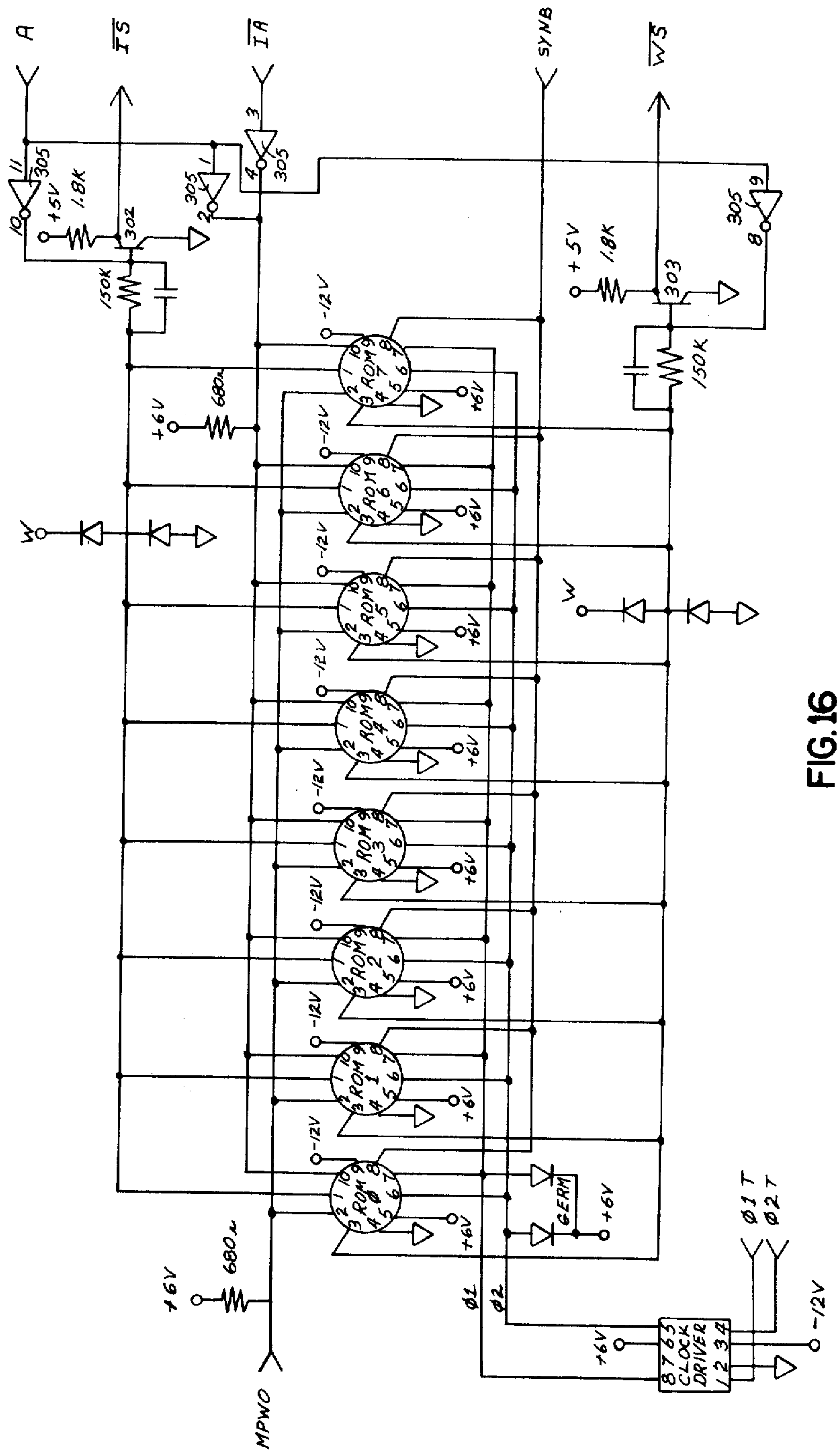
FIG. 16 is a detailed schematic diagram of the read-only memory group of FIG. 3.
Figure 17:
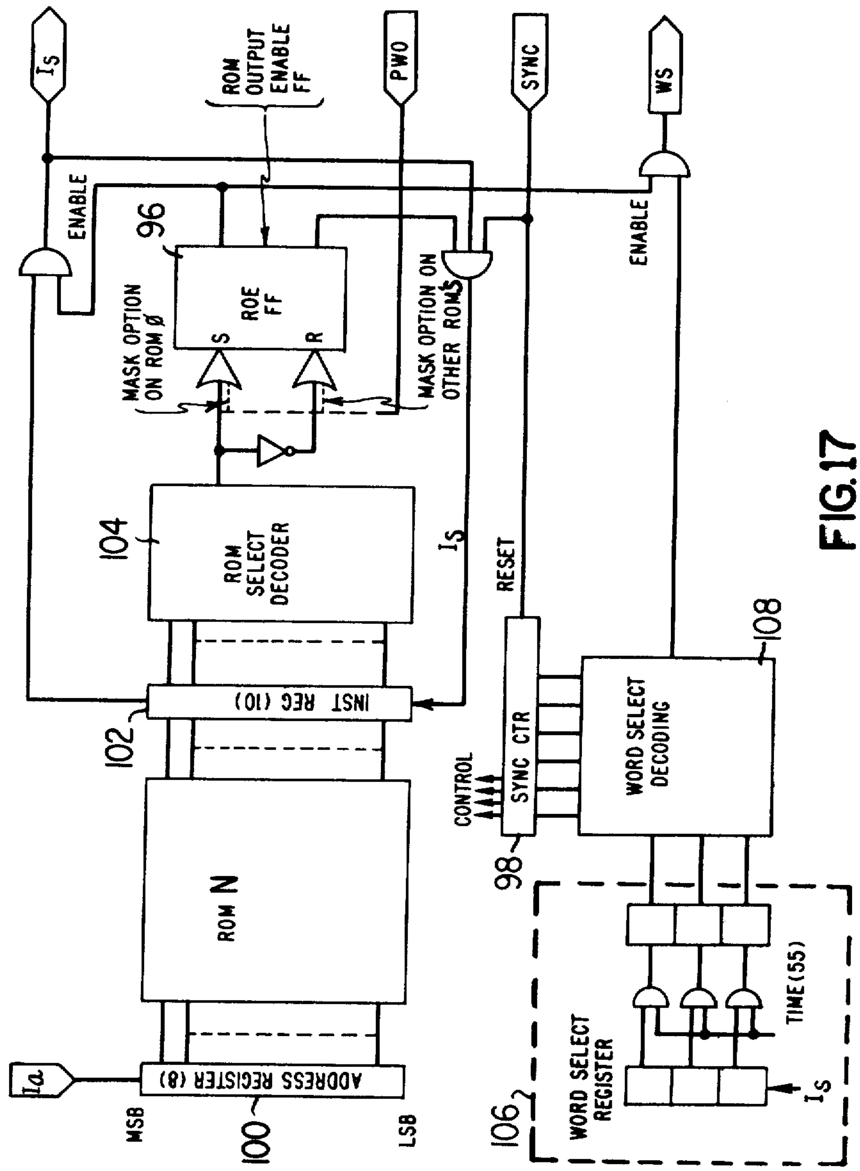
FIG. 17 is a block diagram of one of the read-only memory circuits $\phi$–7 of FIG. 16.

ROM group 34, as shown in FIG. 3, contains eight individual MOS read-only memory circuits, labeled $\phi$–7. These circuits store the subroutines required for executing various functions of the calculator system. Each ROM circuit contains 256 ten-bit words, which means a total of 15,360 bits available in the entire ROM group. A detailed diagram of ROM group 34, showing each of the ROM circuits $\phi$–7, is given in FIG. 16. A block diagram of one of the ROM circuits is shown in FIG. 17. Since the ROM circuits $\phi$–7 are identical except for the way in which they are programmed, only one circuit is shown in the block diagram.

In addition to ROM group 34 contained within the basic calculator, other ROM groups may be present in a particular calculator configuration by virtue of their presence in various ones of the calculator options. For example, each plug-in keyboard function block contains a ROM group, as does the data storage option and each peripheral input/output interface card.

Figure 44:
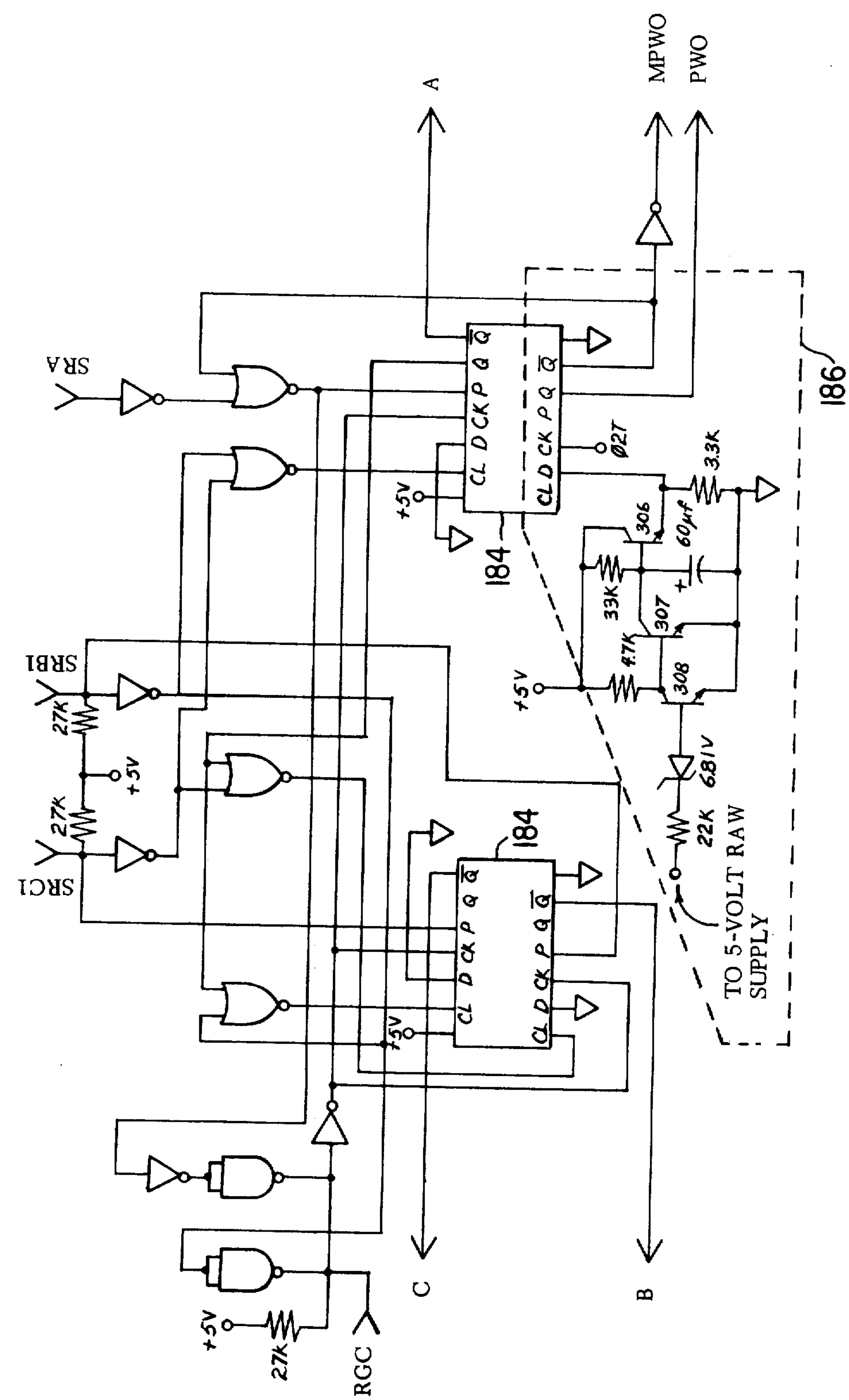
FIG. 44 is a detailed schematic diagram of the ROM group select circuitry contained within the calculator.

FIG. 44 shows in detail the circuitry required for selecting the ROM group required to perform each given function. The heart of this circuitry is a set of three flip-flops whose outputs are designated A, B, and C. Each of these flip-flops comprises one-half of a dual D-type flip-flop package 184. Several logic gates are employed for controlling the states of these flip-flops. Outputs A, B, and C are connected to ROM group 34 in the main system, the function block ROM group, and the data storage option ROM group, respectively. These outputs control the clamping gates of their respective ROM groups.

The ROM group associated with each peripheral input/output interface card is responsible for controlling itself and, therefore, includes its own flip-flop. At the time such a ROM group is turned on, the selected peripheral I/O unit will place a negative-true pulse on the line labeled RGC in FIG. 44. This causes flip-flops A, B, and C to be reset.

FIG. 44 also includes power-on circuitry 186 which provides a signal (PWO) for initializing all of the calculator hardware. PWO will remain low for approximately 1.5 seconds after the power supplies are fully active. This guarantees that the printer motor has come up to speed and that the printer sector counter in the I/O circuit has been synchronized with the printer. In summary, the PWO signal performs the following functions:

1. Inhibits spurious printer operation during start-up
2. Resets printer circuitry contained within the I/O circuit
3. Selects instruction set 1
4. Selects basic system ROM group (ROM group A)
5. Turns on ROM $\phi$ in each ROM group
6. Insures that the first ROM address given after termination of the PWO signal is address zero Basically, each ROM circuit within main system ROM group 34 of FIG. 16 responds to a serial address input with a serial address output. During every 56-bit word time, an address is inputted, least significant bit first, from bit $b_{19}$ through bit $b_{26}$. Every ROM $\phi$–7 in the system receives this same eight-bit address and, from bit time $b_{45}$ through $b_{54}$, attempts to output onto the $I_s$ line. However, a ROM enable (ROE) flip-flop 96 in each ROM insures that no more than one ROM actually sends an instruction on the $I_s$ line at the same time.

Figure 19:
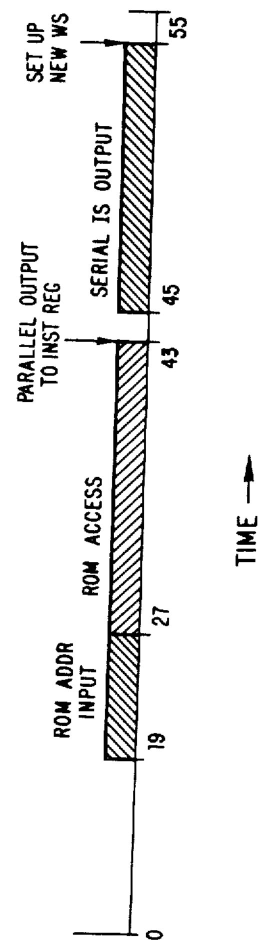
FIG. 19 is a timing diagram illustrating the important timing points for a typical addressing sequence.

All output signals are inverted so that the steady-state power dissipation is reduced. The calculator circuits are P-channel MOS. Thus, the active signals that turn on a gate are the more negative. This is referred to as negative logic, since the more negative logic level is the logical 1. As mentioned above, a logical 0 is +6 volts and a logical 1 is 0 volts. The signals on the $I_a$ and $I_s$ lines are normally at logical 0. However, when the output buffer circuits are left at logical 0 they consume more power. A decision was therefore made to invert the signals on the $I_a$ and $I_s$ outputs and re-invert the signals at all inputs. Thus, signals appear at the $I_a$ and $I_s$ outputs as positive logic. The oscilloscope pattern that would be seen for instruction 1101 110 011 from state 11 010 101 is shown in FIG. 19.

The serial nature of the calculator circuits requires careful synchronization. This synchronization is provided by the SYNC pulse, generated in control and timing circuit 30 and existing during bit times $b_{45}$–$b_{54}$. Each ROM has its own 56-state counter 98, synchronized to the system counter 52 in control and timing circuit 30. Decoded signals from this state counter 98 open the input to the address register 100 at bit time $b_{19}$, clock $I_s$ out at bit time $b_{45}$, and provide other timing control signals.

As the system power comes on, the PWO signal is held at 0 volts (logical 1) for at least one second. The PWO signal is wired (via a masking option) to set ROM enable (ROE) flip-flop 96 on main ROM $\phi$ and to reset it on all other ROMs. Thus, when operation begins, ROM $\phi$ will be the only active ROM. In addition, control and timing circuit 30 inhibits the address output during start-up so that the first ROM address will be zero. The first instruction must be a JUMP SUBROUTINE to get the address register 68 in control and timing circuit 30 loaded properly.

Figure 18:
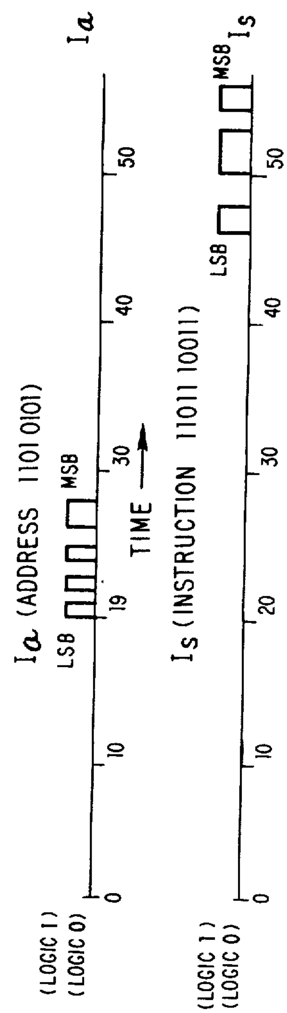
FIG. 18 is a waveform diagram illustrating a typical address signal and a typical instruction signal.

FIG. 18 shows the important timing points for a typical addressing sequence. During bit times $b_{19}$–$b_{26}$ the address is received serially from control and timing circuit 30 and loaded into address register 100 via the $I_a$ line. This address is decoded, and at bit time $b_{44}$ the selected instruction is gated in parallel into the $I_s$ register 102. During bit times $b_{45}$–$b_{54}$ the instruction is read serially onto the $I_s$ line from the active ROM (i.e., the ROM with the ROM enable flip-flop set).

Control is transferred between ROMs by a ROM SELECT instruction. This instruction will turn off ROE flip-flop 96 on the active ROM and turn on ROE flip-flop 96 on the selected ROM. Implementation is dependent upon the ROE flip-flop being a master-slave flip-flop. In the active ROM, the ROM SELECT instruction is decoded by a ROM select decoder 104 at bit time 44, and the master portion of ROE flip-flop 96 is set. The slave portion of ROE flip-flop 96 is not set until the end of the word time ($b_{55}$). In the inactive ROMs the instruction is read serially into the $I_s$ register 102 during bit times $b_{45}$–$b_{54}$ and then decoded, and the ROE flip-flop 96 is set at bit time $b_{55}$ in the selected ROM. A masking option on the decoding from the three least significant bits of the $I_s$ register 102 allows each ROM to respond only to its own code.

The six secondary word select signals are generated in the main ROMs $\phi$–7. Only the two word select signals dependent upon the POINTER come from control and timing circuit 30. The word select of the instruction is retained in the word select register 106 (also a master-slave). If the first two bits are 01, the instruction is of the arithmetic type for which the ROM must generate a word select gating signal. At bit time $b_{55}$ the next three bits are gated to the slave and retained for the next word time to be decoded into one of six signals. The synchronization counter 98 provides timing information to the word select decoder 108. The output WS signal is gated by ROE flip-flop 96 so only the active ROM can output on the WS line, which is OR connected with all other ROMs and also control and timing circuit 30. As discussed above, the WS signal goes to arithmetic and register circuit 32 to control the portion of a word time during which an instruction is active.

Figure 20:
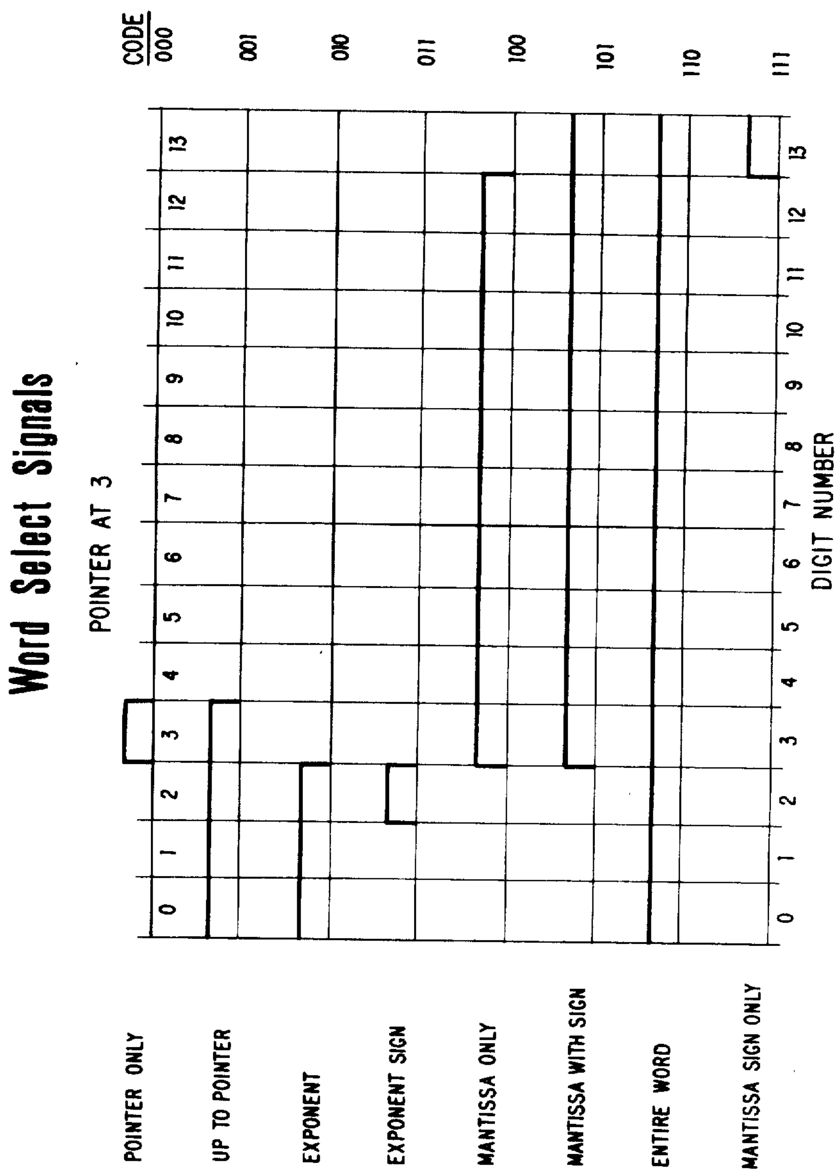
FIG. 20 is a waveform diagram illustrating the word select signals generated in the control and timing circuit of FIGS. 3 and 6 and in the read-only memory circuits ϕ–7 of FIG. 3 and 17.

The six ROM-generated word select signals used in the calculator are shown in FIG. 20. Read-only memories $\phi$–7 output a single pulse on the $I_s$ line at bit time $b_{11}$ to denote the exponent minus sign time. This pulse is used in the display decoder of arithmetic and register circuit 32 to convert a 9 into a displayed minus sign. The time location of this pulse is a mask option on the ROM.

INPUT/OUTPUT CIRCUIT

Figure 21:
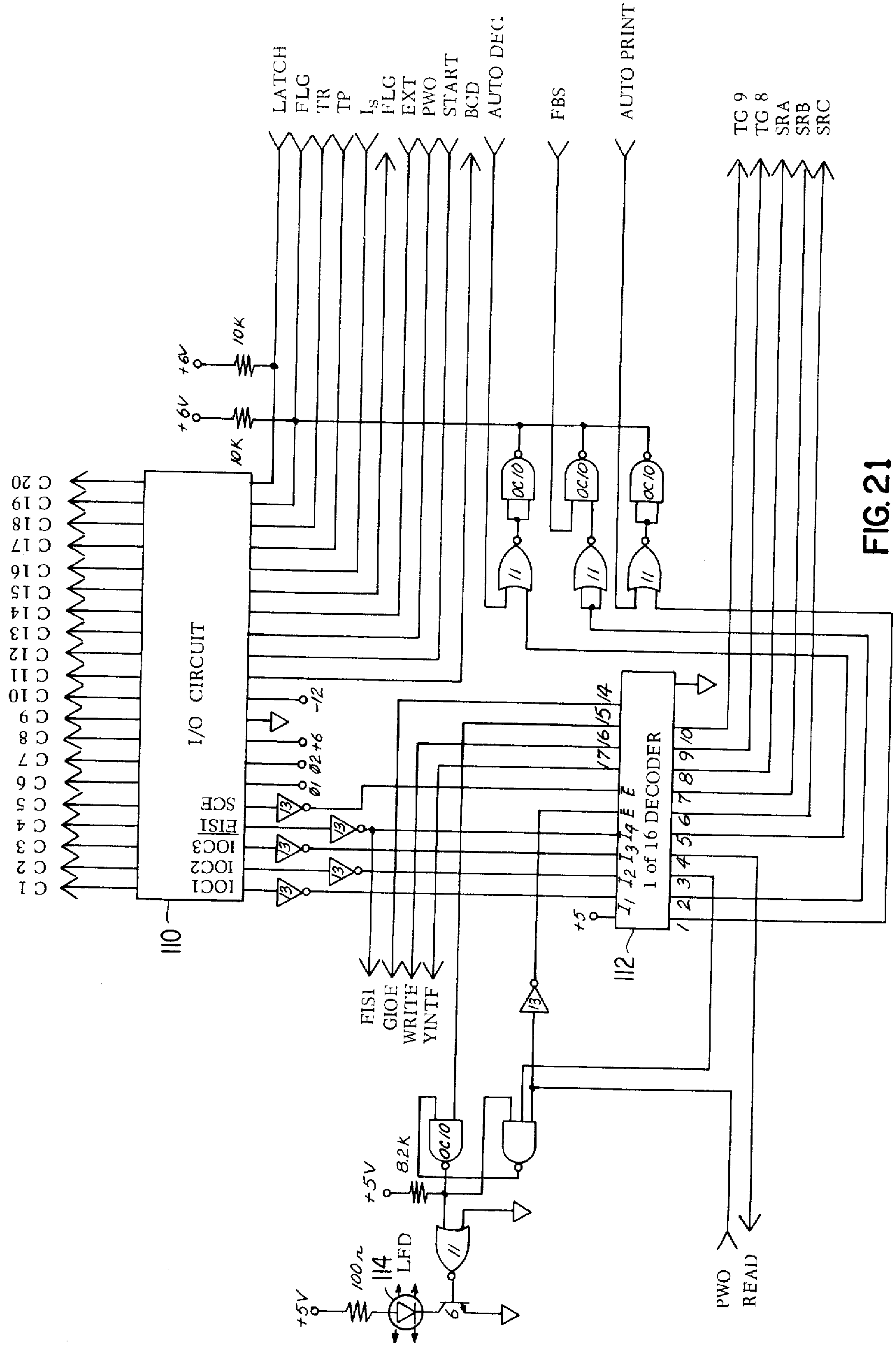
FIG. 21 is a detailed schematic diagram of the input-/output (I/O) processor of FIG. 3.

The input/output (I/O) processor 38 of FIG. 3 is shown in more detail in FIG. 21. It includes an MOS/LSI input/output circuit 110, a one-of-16 decoder 112, and various other logic gates. The I/O processor serves as a binary arithmetic logic unit, drives the printer unit (Seiko model 102), and controls the flow of instructions and addresses between the arithmetic and register circuit, the control and timing circuit, and the read-only memory group.

I/O processor 38 is linked to the arithmetic and register circuit and the control and timing circuit by eight signals, which are (1) input clock phase ($\phi_1$), (2) output clock phase ($\phi_2$), (3) power on (PWO), (4) instruction line ($I_s$), (5) timing (START), (6) data bus (BCD), (7) flag line (FLG), and (8) alternate ROM address input (EXT).

I/O circuit 110 includes twenty outputs (C1–C20) comprising parallel data signals used by the printer unit. C13 controls the printer solenoid for column 13. C19 and C20 control the PRINT, STANDBY, ADVANCE PAPER, and RED commands. Outputs C9–C18 are employed as memory address lines when a ROM, PROM, or read/write memory is plugged into the calculator. Output lines C1–C8 are bidirectional and are used as inputs when the LATCH line is grounded. Output lines C1–C18, along with the LATCH and GIOE lines, are available at each I/O peripheral slot to be used as needed by each peripheral unit, as directed by the interface software associated with each such peripheral unit.

The EISI line of FIG. 21 is used as a gate control for the instruction line $I_s$. It also comprises one of the inputs, along with lines IOC1, IOC2, and IOC3, to one-of-16 decoder 112. Switching transients might be expected to appear as the various IOC lines change state. To eliminate this problem, a decoder strobe signal SCE is issued by I/O circuit 110. By means of this technique, a total of 14 different command signals are received from decoder 112 as pulses of approximately 200 microsecond duration. These signals are described in the table below.

| Decoder Pin No. | Function |
|---|---|
| 1 | Interrogate PRINT OFF key |
| 2 | Interrogate function block keyboard flag |
| 3 | Turn on busy light |
| 4 | READ command for plug-in ROM or PROM |
| 5 | Interrogate AUTO DECIMAL key |
| 6 | Select ROM group for data storage option |
| 7 | Select ROM group for function block |
| 8 | Return control to main ROM group |
| 9 | TG8 (reserved for control of peripherals) |
| 10 | TG9 (reserved for control of peripherals) |
| 14 | General I/O device enable |
| 15 | Turn off busy light |

-continued

| Decoder Pin No. | Function |
|---|---|
| 16 | WRITE command for read/write memory |
| 17 | YINTF instruction reserved for control of peripherals |

Light emitting diode (LED) 114 shown in FIG. 21 is used as a busy light. When lit, it indicates that the calculator is busy and cannot accept keyboard commands. The busy light will be turned on at the onset of the power-on sequence, during execution of one of the routines involving exponentiation, or during execution of a library program. Upon completion of any of these functions the busy light will be turned off, and the calculator will then accept keyboard entries.

The status of the PRINT OFF and AUTO DECIMAL keys as well as the FPS line, which originates in the keyboard multiplexor, is examined by decoder 112. If the appropriate signal is present the FLG' line will be pulled low for approximately 200 microseconds. The FLG' line may be used by the interface circuitry associated with various input/output peripheral units.

Input lines TP and TR to I/O circuit 110 are timing signals received from the printer.

Figure 22A:
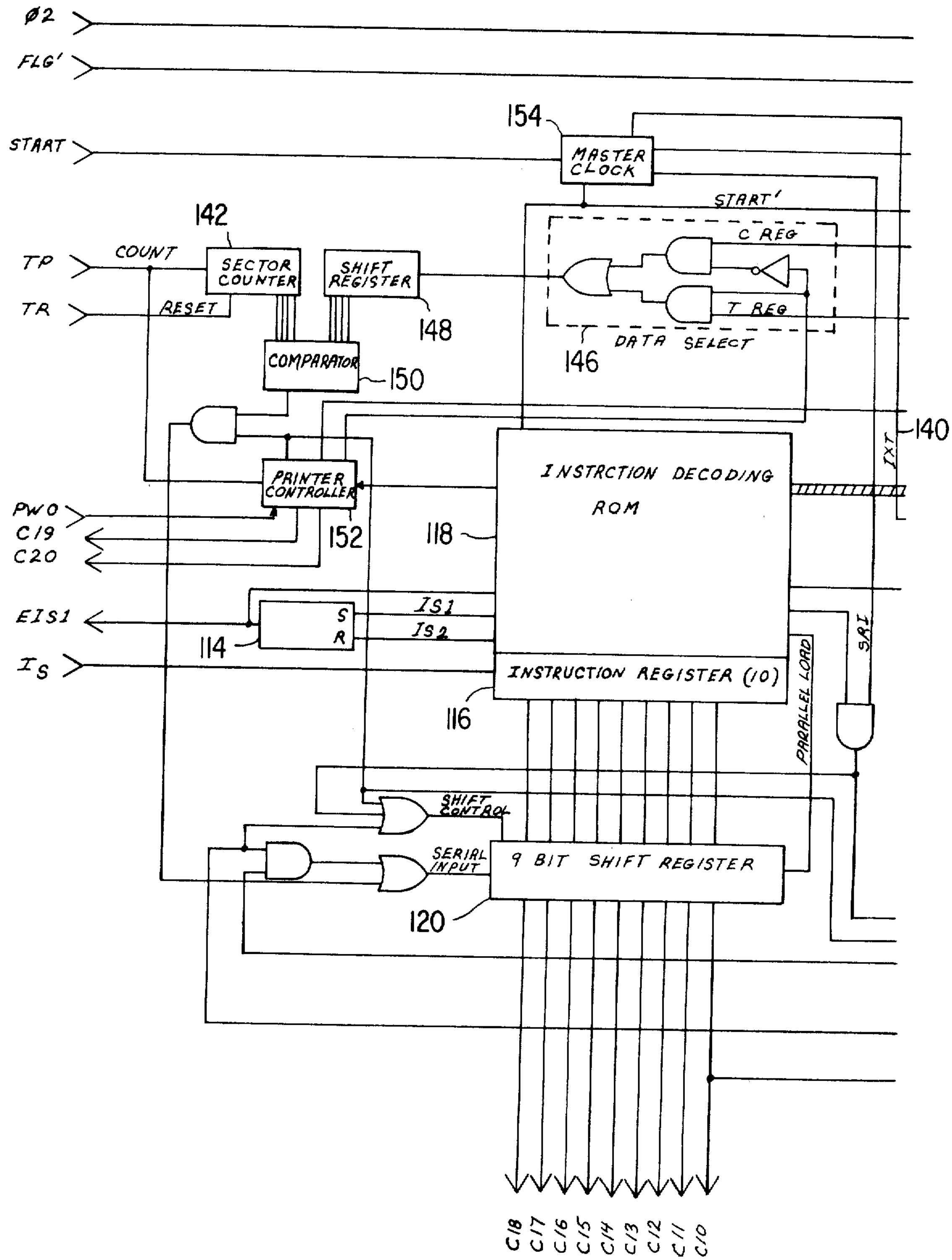
FIGS. 22A–B are a block diagram of the I/O circuit of FIG. 21.
Figure 22B:
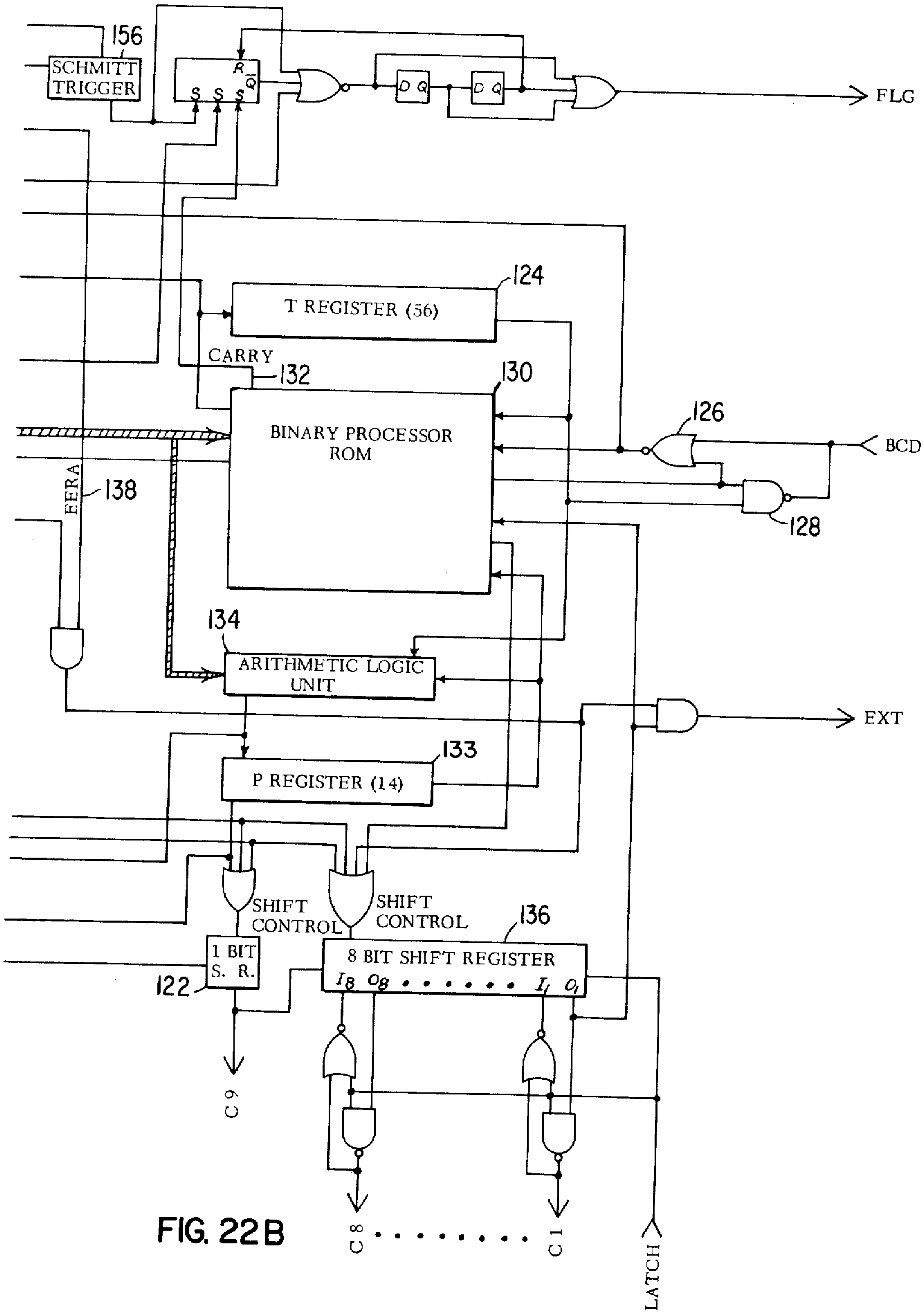
Figure 23:
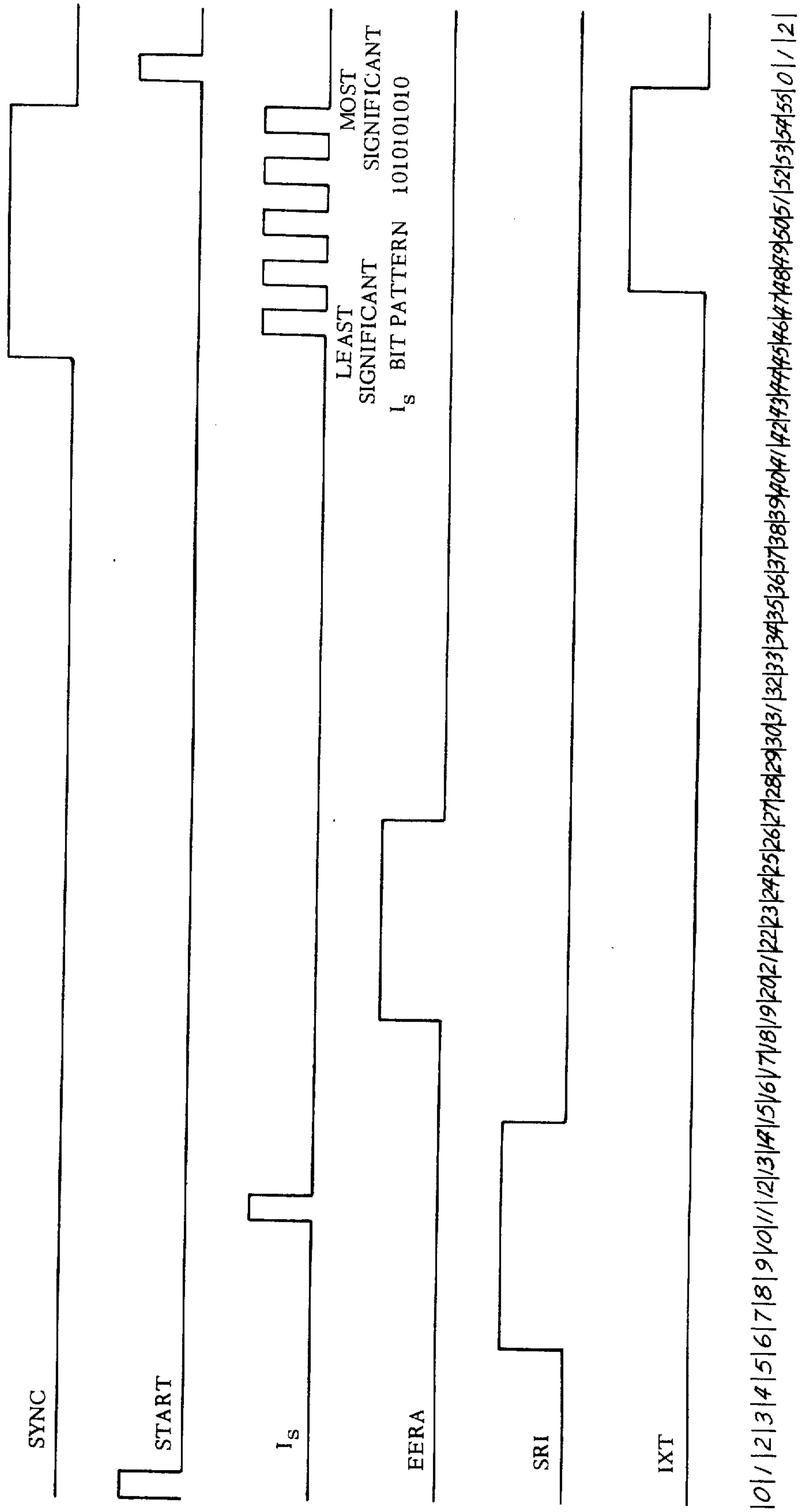
FIG. 23 is a waveform diagram illustrating the timing relationship between the SYNC, START, EERA, $I_S$, SRI, and IXT signals of the I/O circuit of FIG. 22.

The MOS input/output circuit 110 of FIG. 21 is shown in detail in the block diagram of FIGS. 22A–B. An instruction set switching scheme has been implemented in the I/O circuit to achieve greater efficiency.

The instruction lines of the read-only memories φ–7 of ROM group 34 are tied directly to the $I_s$ input to the I/O circuit. The I/O circuit issues a signal EIS1. When this signal is high, the instruction lines of the ROM circuits are fed to the $I_s$ line going to the control and timing circuit 30 and the arithmetic and register circuit 32. When EIS1 is low, the $I_s$ line going to the control and timing circuit and the arithmetic and register circuit is held low, and the I/O circuit is enabled to give instructions with the same bit patterns as used normally by the control and timing circuit and the arithmetic and register circuit. Since the I/O circuit has the ability to remember in which instruction set mode it is operating, it doesn't try to execute those instructions designated as IS2 instructions when the calculator is in the IS1 mode. The power-on (PWO) line to the I/O circuit insures that the I/O circuit powers up in the IS1 instruction set. When IS1 is executed, the internal IS2 instruction flip-flop 114 is reset, which implies that EIS1 will go high and the I/O circuit will accept only those instructions whose bit patterns are the same in all instruction sets. When IS2 is executed, EIS1 will go low, and the IS2 instruction flip-flop 114 will be set.

The input/output circuit includes an instruction register 116 which converts the serial instruction coming from ROM group 34 on the $I_s$ line to a parallel instruction for decoding by instruction decoding ROM 118. Nine-bit shift register 120 and one-bit shift register 122 serve as an output register for the I/O circuit.

I/O circuit 110 also includes a 56-bit shift register 124, called the T-register. This register serves as the primary working register when the I/O circuit is called upon to perform binary arithmetic operations. Logic gates 126 and 128 form a bidirectional buffer for the BCD line, allowing binary data to be inputted to or outputted from the I/O circuit by means of the BCD line. Binary processor ROM 130 serves as an arithmetic logic unit for performing all the basic binary operations on the contents of the T-register. It also helps control data transfers into the T-register. In performing binary arithmetic with the I/O circuit, a carry on line 132 may result from a particular operation. This condition causes a signal on the FLG line and sets status bit eleven in the control and timing circuit 30.

I/O circuit 110 further comprises a 14-bit register 133, known as the P-register. This register is available to the user as a 14-bit storage register, but is generally employed by the calculator system as a program counter. The 14 least significat bits in the T-register 124 can be loaded into the P-register 133, without altering the contents of T-register 124. The contents of P-register 133 can be loaded into the 14 least significant bits of T-register 124 by means of the PTT instruction. In this case, the 42 most significant bits of the T-register and the entire contents of the P-register are unaltered.

The PINC instruction performs a binary increment on the number stored in the P-register. Not only is the incremented binary number placed in P-register 133, but also the ten least signficant bits of the incremented number are loaded sequentially onto the output lines C9–C18. The PDEC instruction is similar to PINC except that the binary number stored in the P-register is decremented by one. The instructions PINC and PDEC have a common restriction in that if the decimal equivalent of the number in the P-register exceeds 1,023, the number displayed on output lines C9–C18 will not only have an insufficient number of bits, but the bit displayed on line C18 will always be logical 1. Arithmetic logic unit 134 is employed to perform the increment and decrement operations called for by PINC and PDEC.

The parallel data output lines C1–C18 are low power TTL compatible. Lines C1–C8 may be used to either input or output data, whereas lines C9–C18 are outputs only. When the LATCH input line to the I/O circuit is high, lines C1–C8 become outputs, and when LATCH is low, these lines become inputs The data found on C1–C8 when LATCH is held low is transferred into the output buffer register 136. After LATCH is released the data loaded will remain as an output on lines C1–C8.

The data on lines C1–C8 may be operated on by two instructions, EERA and IXT. These instruction lines are shown as 138 and 140, respectively, in FIGS. 22A–B. The instruction EERA is understood by both the control and timing circuit 30 and the I/O circuit 110. When this instruction is executed, the eight-bit word on lines C1–C8 is sent serially on the EXT output line and during the same period of time as the addresses are sent to ROM group 34. Control and timing circuit 30 recognizes the EERA command and transfers the data from its EXT input line to its IA output line. In this way the next ROM address is obtained from the I/O circuit. After executing EERA, bits C1–C8 will contain the same data (either zeros or ones) as bit C9.

The instruction IXT exchanges the data on lines C1–C8 with the eight most significant bits of T-register 124. The remaining bits of T-register 124, as well as lines C9–C18 of the I/O register 120, are unaltered.

I/O circuit 110 also contains the necessary logic circuitry and memory for driving printer unit 16, which is a Seiko model 102. This printer has 18 columns and a choice of 13 characters per column. It includes a rotating print drum having 13 sectors. Two timing signals are required from the printer as inputs to I/O circuit 110. They are labeled on FIGS. 22A–B as TP and TR and are clocked with phase two of the clocks.

During operation the print drum is continually rotating, and the current sector of the printer is continually noted by sector counter 142. During the portion of time that the printer is enabled the end of each sector is marked by a flag pulse which sets status bit eleven in control and timing circuit 30. The method of obtaining a print begins with the construction of a printer mask in C-register 144 of arithmetic and register circuit 32 and T-register 124 of I/O circuit 110. The columns 1–4 of the printer (right to left) are printed according to the data in the C-register. Each digit position is filled with a hexadecimal number (O–15) which represents the sector to be printed. A hexadecimal 13, 14 or 15 will leave a blank in the given column position. Printing is best accomplished when the numeric entries on the print drum coincide with their respective sector numbers. The four least significant digits of T-register 124 are loaded in a similar manner for columns 15–18.

The RED instruction preceding the print subroutine shifts the ribbon into the red printing position. The ribbon will remain in that position until a paper advance occurs. A paper advance instruction (ADV) is used to terminate each print sequence. The putput format for driving the printer is such that during the period of time that the printer is enabled a logical zero on lines C1–C18 indicates that the column solenoid under consideration should be energized. The outputs on lines C19 and C20 control the modes of operation of the printer as shown in the table below.

| C19 | C20 | Mode |
|---|---|---|
| Low | Low | Printer Standby |
| Low | High | Energize Ribbon Solenoid |
| High | Low | Energize Paper Solenoid |
| High | High | Enable Printing Solenoids |

The portion of I/O circuit 110 which relates to the printer also includes a four-bit shift register 148 which receives data to be printed from either T-register 124 of I/O circuit 110 or C-register 144 of arithmetic and register circuit 32 and presents it in parallel form to comparator 150. Data select logic circuitry 146 transmits data from either the C-register or the T-register to shift register 148. Comparator 150 functions to compare the current sector count received from sector counter 142 with the output of shift register 148 to determine when the print drum is in the proper position to print each particular data item. Printer controller 152 receives printer-related instructions from instruction decoding ROM 118 and, in response thereto, controls the print sequence.

I/O circuit 110 further comprises a master clock 154 which supplies the required timing signals within the I/O circuit. Also included is Schmitt trigger 156 which receives FLG' signals from peripheral input/output units employed with the calculator and properly gates these with clock signal $\phi 2$ from control and timing circuit 30.

DATA STORAGE CIRCUIT

Figure 24:
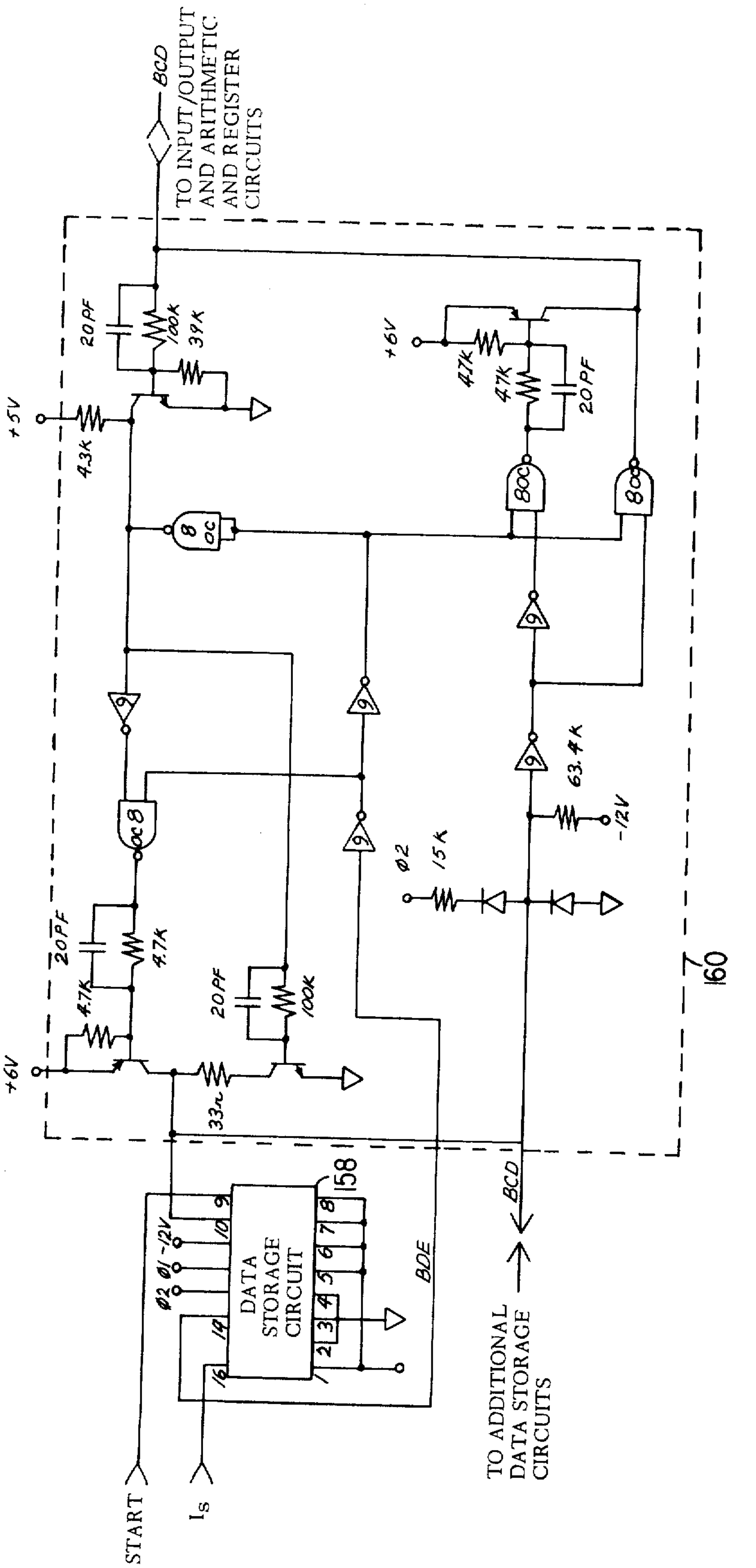
FIG. 24 is a detailed schematic diagram of the data storage assembly of FIG. 3.

The data storage assembly 36 of FIG. 3 is shown in more detail in FIG. 24. It includes an MOS/LSI data storage circuit 158 and a bidirectional amplifier 160. Data storage circuit 158 contains ten data storage registers. In addition to the single data storage circuit employed in the calculator as basically configured, the user may optionally configure the calculator to include additional data storage. Also, data storage circuits are included as integral components within the optional plug-in keyboard function blocks and the optional peripheral input/output interface cards associated with various peripheral I/O units which might be employed with the calculator.

The BCD lines associated with the arithmetic and register circuit 32 and the I/O circuit 110 are directly connected to each other and could, in turn, be directly connected to as many as three additional data storage circuits. Bidirectional amplifier 160 is provided to drive the excessive capacitance seen by the BCD line when more than three data storage circuits are employed. Since the BCD line carries binary data in both directions, amplifier 160 must have bidirectional capability. In order to control the direction of data flow through the amplifier, a steering signal (BDE) is required. Normally, this signal will be low (logical 0), in which case the BCD line from arithmetic and register circuit 32 and I/O circuit 110 is the input, while the BCD line connected to the data storage circuits is the output.

A DATA STORAGE TO C-REGISTER instruction (DSTC) is decoded by all the data storage circuits present in the current configuration of the calculator. This would include the data storage circuit in the basic calculator as well as those currently employed in a keyboard function block, optional data storage, and peripheral input/output interface cards. Even though only the previously addressed data storage circuit executes the DSTC instruction, all of the data storage circuits present will respond by bringing the BDE line to a logical 1 level during the entire word in which the data transfer occurs. By using this technique only the BDE line from the single data storage circuit in the basic calculator is required to control the direction of amplifier 160 for all of the data storage circuits.

Figure 25A:
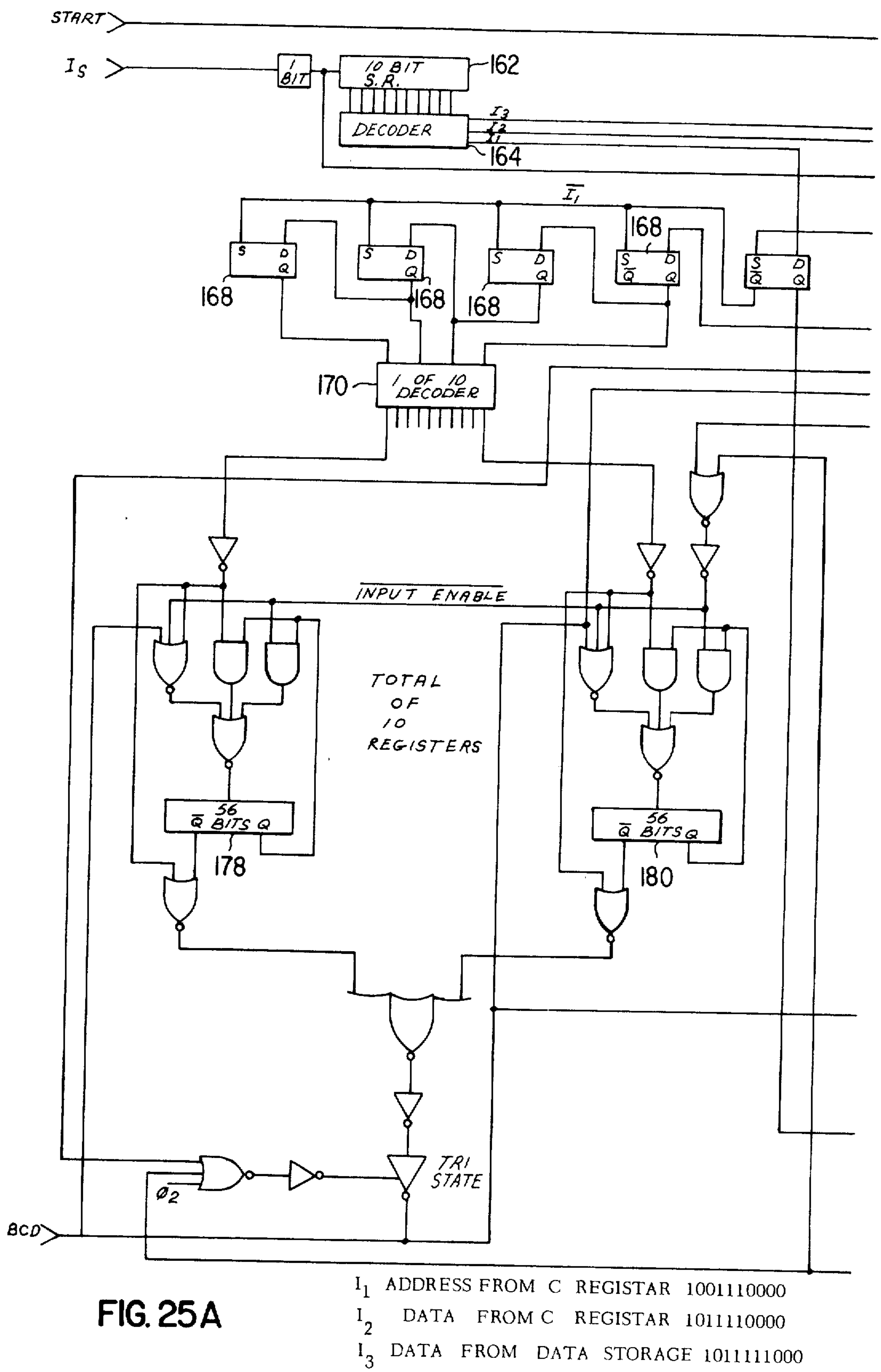
FIGS. 25A–B are a block diagram of the data storage circuit of FIG. 24.
Figure 25:
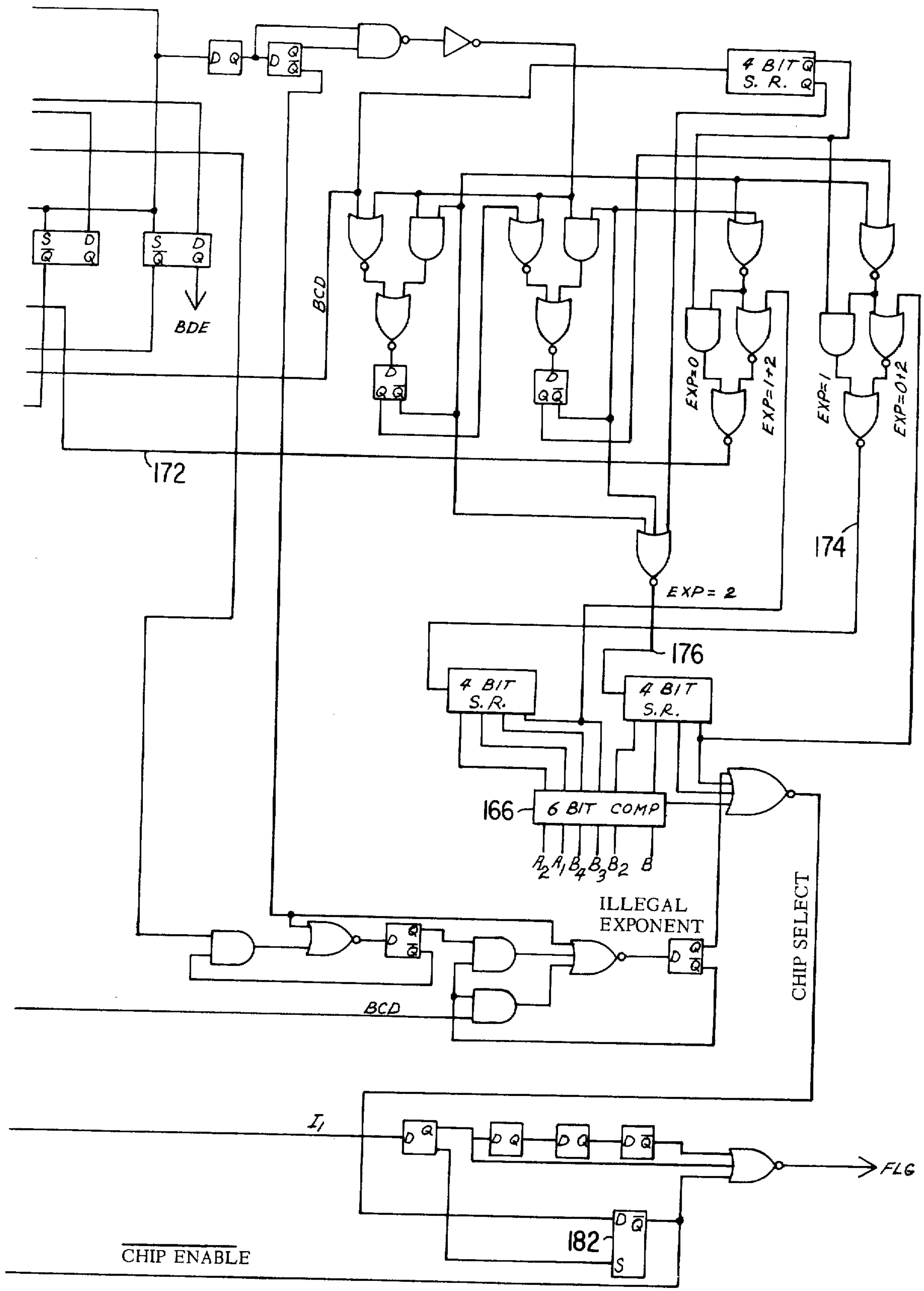

The MOS data storage circuit 158 of FIG. 24 is shown in detail in the block diagram of FIGS. 25A–B. Data storage circuit 158 recognizes three separate instructions which are received directly from the read-only memory circuits via the $I_s$ line. These include (1) ADDRESS FROM C-REGISTER TO DATA STORAGE (ATDS), (2) DATA FROM C-REGISTER TO DATA STORAGE (DTDS), and (3) READ FROM DATA STORAGE INTO C-REGISTER (DSTC). These serial instructions are received by a 10-bit shift register 162, converted into a 10-bit parallel signal, and transmitted to instruction decoder 164.

The contents of the C-register in arithmetic and register circuit 32 are continuously displayed on the BCD line, except when one of the above instructions is issued. When a data transfer instruction occurs, that instruction will only be executed if there exists at least one data storage register which has previously been enabled. Once enabled, a register will remain enabled until another data transfer instruction is issued which addresses a different register.

The designation of each register comprises two separate parts The ten registers within each data storage circuit are numbered 0, 1, 2 . . . 8, 9. The data storage circuits within a particular calculator configuration are themselves numbered 0, 1, 2, 3 . . . 62, 63. Each data storage circuit may be coded in any combination, thereby eliminating the necessity of different data storage circuits for association with different addresses.

The circuit address bits, in ascending order of significance, are designated as B1, B2, B3, B4, A1, A2. If bits B1–B4 are considered as a hexadecimal number, then only 10 of the 16 possible combinations are allowable BCD characters. Normal addresses are those utilizing the ten allowable BCD codes for bits B1–B4. The special addresses are the remaining combinations. Normal register addresses are designated by $0 \leq D_3D_2D_1 \leq 399$, where all three digits are allowable BCD numbers. If $D_2$ is restricted to the hexadecimal numbers ten through sixteen, then 240 addresses are available.

To address a data storage circuit it is necessary to enter the binary (or BCD) code of the appropriate circuit number into the A and B inputs to six-bit comparator 166. For example, to establish the register addresses for a circuit as 130 through 139 would mean that the circuit should be identified as circuit 13. The BCD code for 13 is 01 0011. Therefore, the inputs to comparator 166 would be as shown below.

A2 = 0
A1 = 1
B4 = 0
B3 = 0
B2 = 1
B1 = 1

The address decoding logic of the data storage circuits is capable of handling floating point addresses. In order that an address be accepted by a data storage circuit the exponent must be either +0, +1 or +2. The sign of the mantissa is always ignored by a data storage circuit. In addition, the addresses are truncated to the next lowest integer. For example, the numbers −3.79, 3.1854, +3.00, and −3.00 would, as addresses, enable register three. If an exponent equal to zero is given, only the most significant digit of the mantissa will be interrogated to determine a register number in the range 0–9. If an exponent equal to +1 is found, the two most significant digits of the mantissa are interrogated to determine a register number in the range 0–99. When an exponent equal to +2 is encountered in an address, the three most significant digits of the mantissa are interrogated and checked for a number in the range 0–399.

I/O circuit also includes four sample and hold flip-flops 168 for storing the desired register (0–9) within a particular data storage circuit. A one-of-10 decoder 170 actually selects the desired register within the circuit. An exponent = 0 line 172, an exponent = 1 line 174, and an exponent = 2 line 176 serve to indicate whether the exponent of a floating point number used as an address was decoded a 0, 1, or 2, respectively. For purposes of illustration only two of the 10 56-bit storage registers comprising each data storage circuit have been shown in FIGS. 25A–B as items 178 and 180. All 10 of the registers are identical in construction. Also included within data storage circuit 158 is a sample and hold flip-flop 182 for remembering whether or not a register previously addressed is located within a given dta storage circuit.

Figure 26:
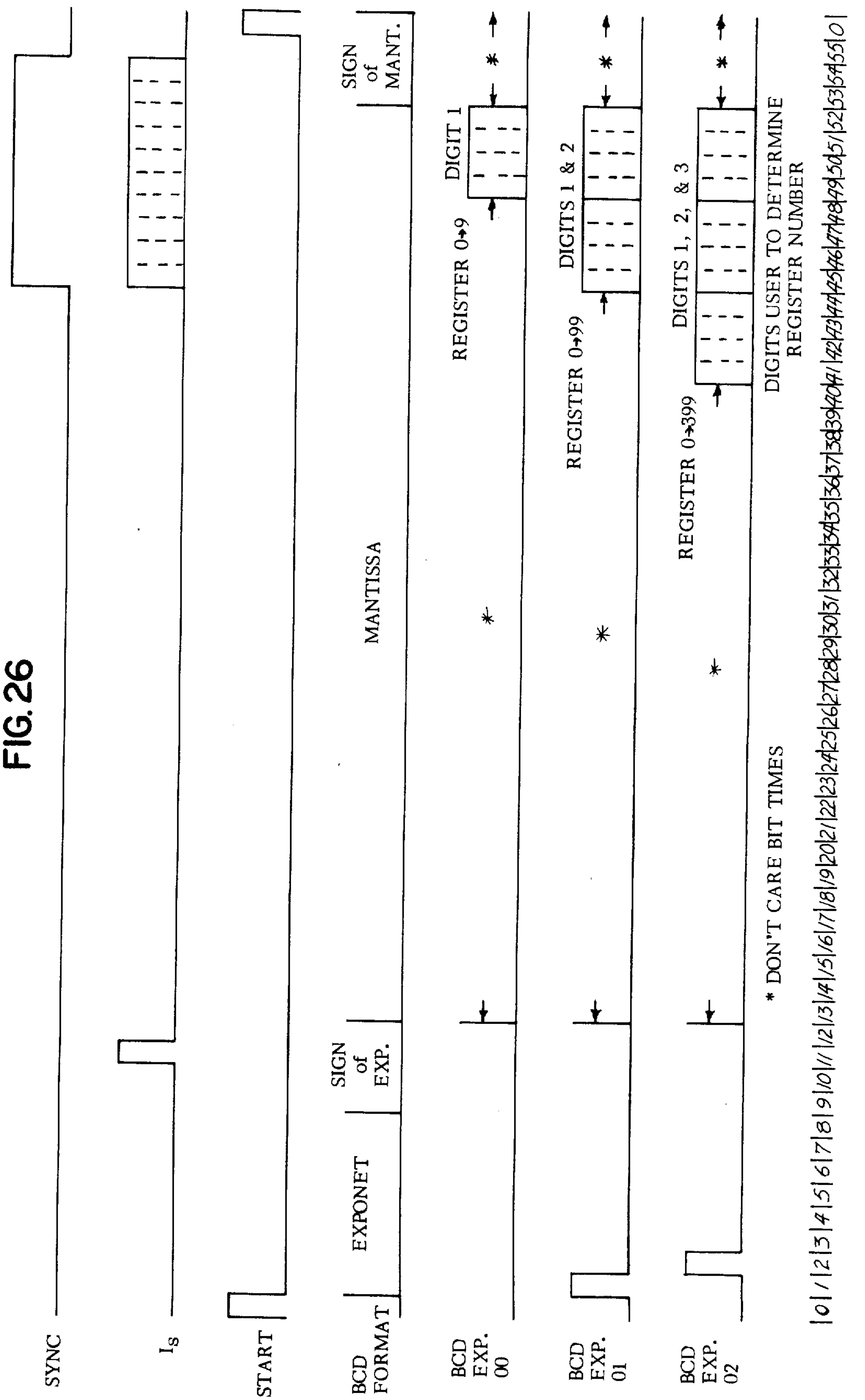
FIG. 26 is a waveform diagram illustrating the timing relationship between the SYNC, START, $I_S$, and BCD signals of the data storage circuit of FIG. 25.

Several signals associated with data storage circuit 158 and their relative waveforms with respect to a 56-bit word time are shown in FIG. 26.

CLOCK DRIVER

Figure 14:
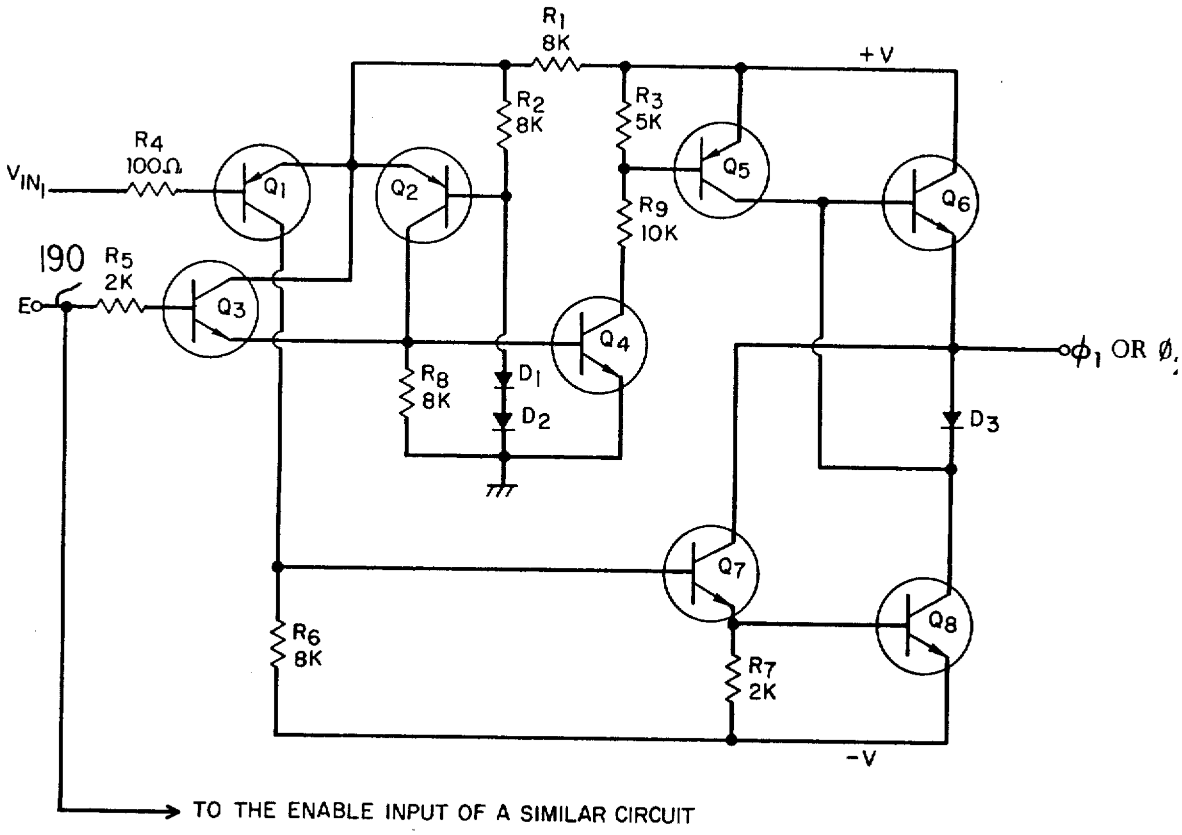
FIG. 14 is a schematic diagram of the clock driver of FIG. 4.
Figure 15:
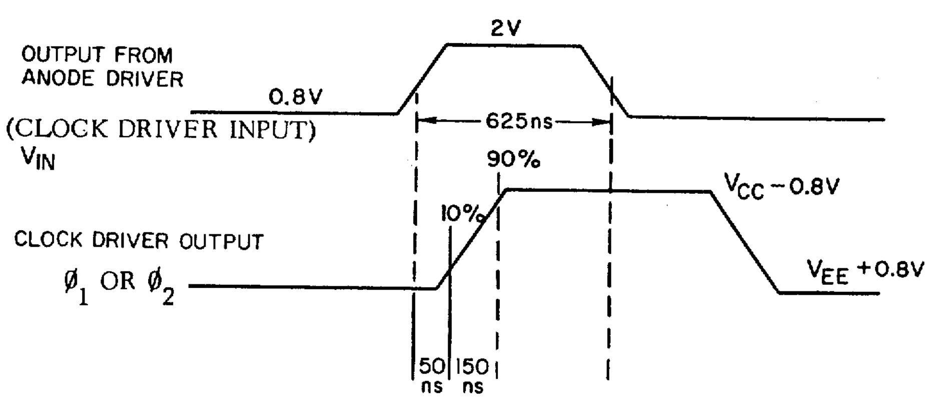
FIG. 15 is a waveform diagram illustrating the timing relationship between the input and output signals of the clock driver of FIG. 14.
Figure 40:
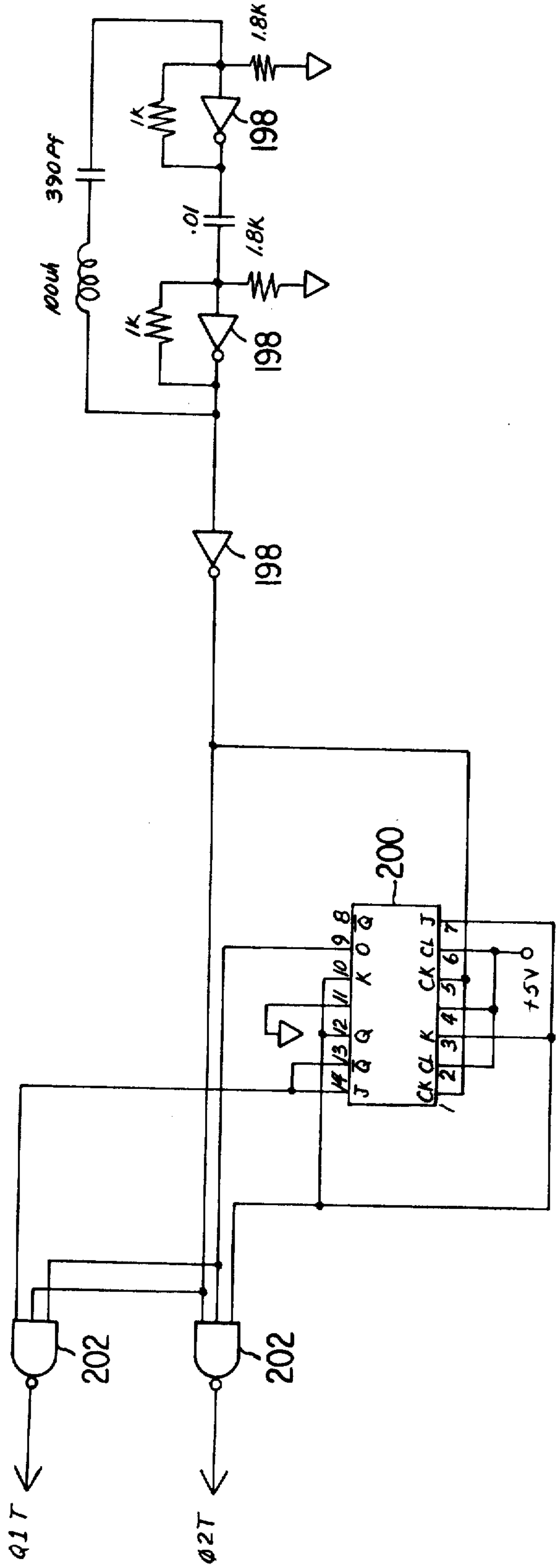
FIG. 40 is a schematic diagram of a system clock generator employed by the calculator in the absence of the LED display option.

A bipolar clock driver 188, one phase of which is shown in FIG. 14, requires less than 25 milliwatts of power and can drive loads up to three hundred picoforads with a voltage swing of +7 to −14 volts. An ENABLE input 190 allows both outputs $Q_1$ and $Q_2$ to be held to $V_{CC}$, the MOS logical 0. This is an effective means of strobing the clock. During DC operation, the transistor pair $Q_1$–$Q_2$ allows only one of the output transistor pairs $Q_5$–$Q_6$ or $Q_7$–$Q_8$ to conduct. Diode $D_3$ prohibits conduction from transistor $Q_6$ to transistor $Q_8$ during transient operation. Thus, the only possible transient short circuit current must flow from transistor $Q_5$ to transistor $Q_7$. However, the limited current handling capability of $Q_5$ (a lateral PNP) limits this current to less than 5 milliamps peak. The input signals for clock driver 188 are generated on the anode driver of optional output display unit 14, or, if the display unit is not employed in the calculator, then by means of the clock generator circuitry shown in FIG. 40. The outputs of the clock driver are connected to each of the MOS/LSI circuits in the calculator. The timing relationship of the input and output signals of the clock driver circuit are shown in FIG. 15.

LED DISPLAY

Figure 29:
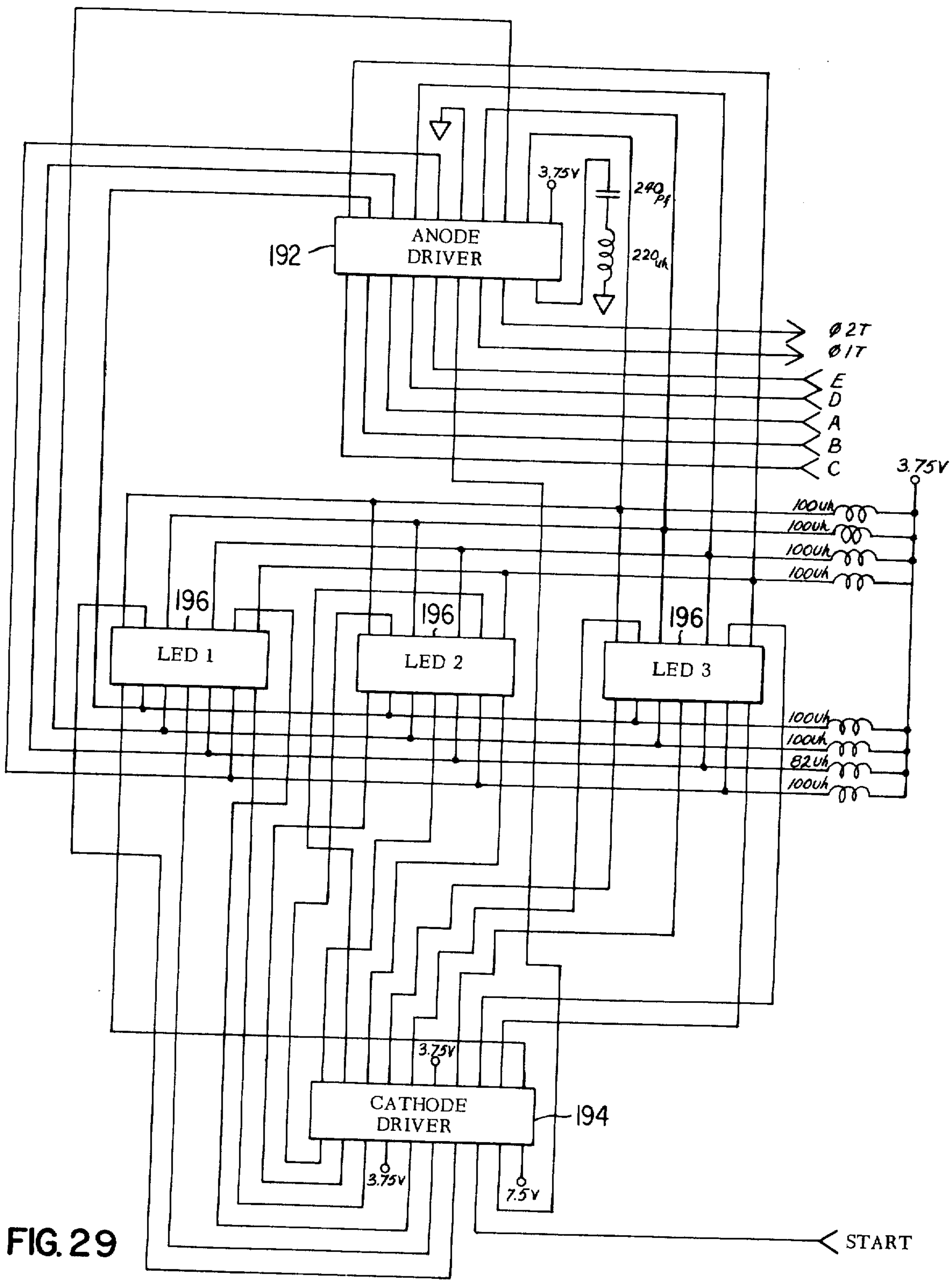
FIG. 29 is a block diagram of the LED display of FIG. 3.

An optional plug-in light emitting diode (LED) output display unit 14 may be employed with the calculator. As shown in the block diagram of FIG. 29, the display unit comprises an anode driver 192, a cathode driver 194, and three 5-digit LED clusters 196.

The display unit employs an inductive drive technique which is inherently efficient because of the absence of components representing large power losses. The only dissipation is created by the parasitic resistances and the saturated transistor switches. An inductive driver like that used in the calculator is shown and described in copending U.S. patent application Ser. No. 202,475 entitled LIGHT EMITTING DIODE DRIVER, filed on Nov. 26, 1971, by Donald K. Miller, and issued on Aug. 28, 1973, as U.S. pat. No. 3,755,697.

Figure 36:
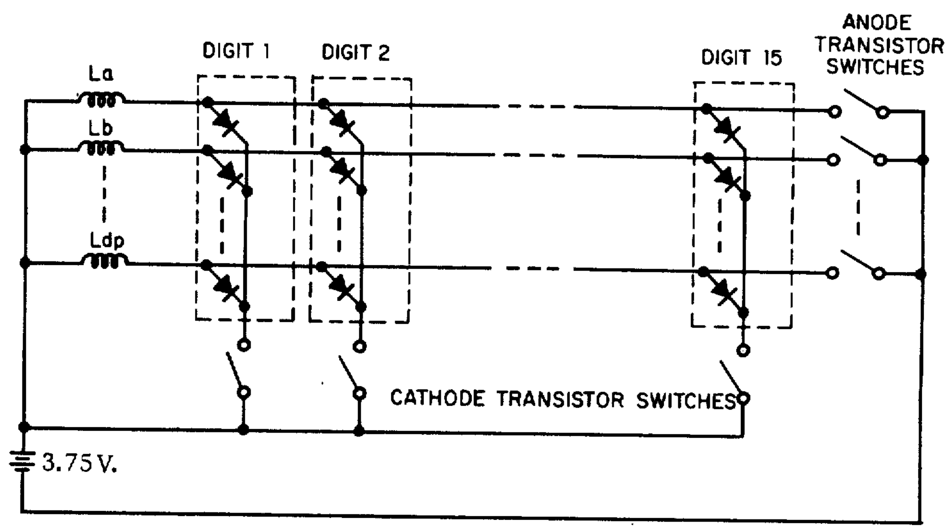
FIG. 36 is a schematic diagram of the LED display of FIG. 3.
Figure 37:
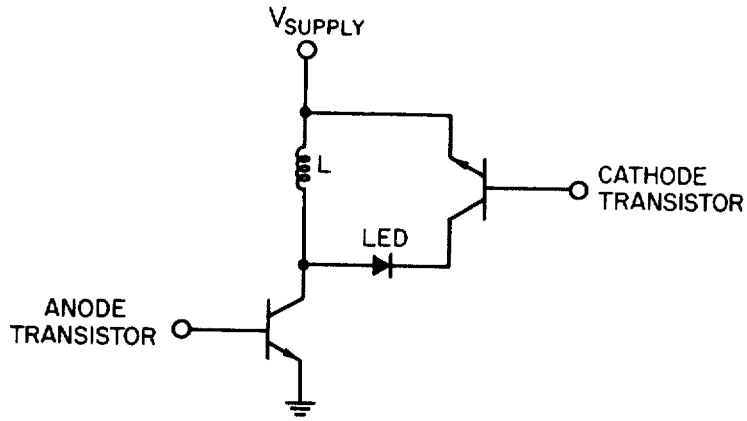
FIG. 37 is a schematic diagram of one segment of the LED display of FIGS. 3 and 36.
Figure 38:
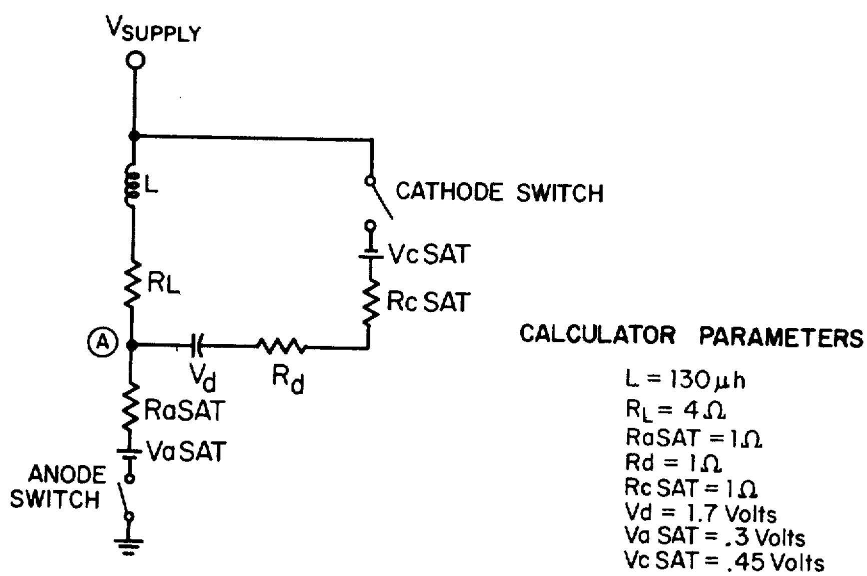
FIG. 38 is an equivalent piecewise-linear model for the circuitry of FIG. 37.
Figure 39:
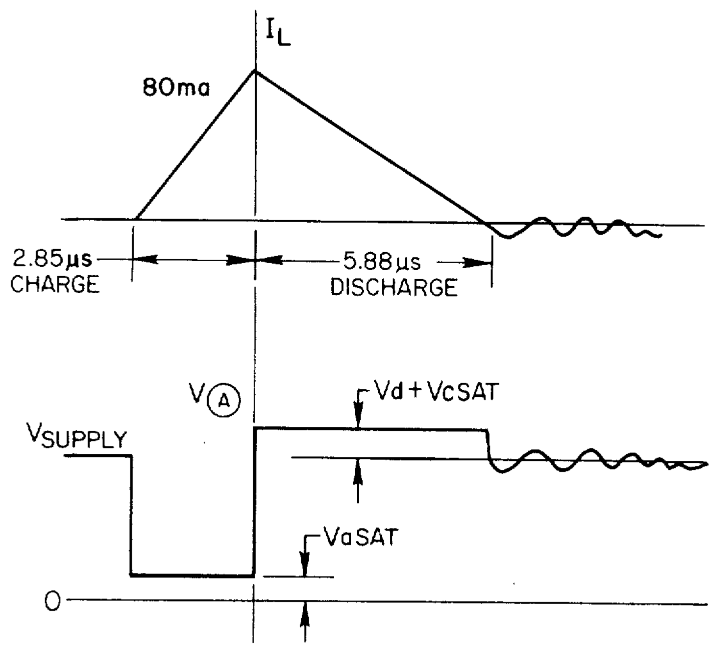
FIG. 39 is a waveform diagram illustrating the inductor current and LED anode voltages associated with the circuitry of FIG. 37.

The display circuitry used in the calculator is shown in FIG. 36. It comprises an 8 × 15 array of LEDs in which the eight rows are scanned by the anode driver and the 15 columns by the cathode driver. A simplified circuit diagram for a segment of the display involving one LED is shown in FIG. 37. The equivalent piecewise-linear circuit model is shown in FIG. 38. An analysis of this model shows the inductor current buildup and discharge to be nearly linear for the parameters used in the calculator. The discharge-time to charge-time ratio is approximately:

$$\frac{t_{discharge}}{t_{charge}} \quad \frac{V_s - V_{asat}}{V_d + V_{csat}} = \frac{3.8 - 0.1}{1.6 + 0.2} = \frac{3.7}{1.8} = 2.06$$

FIG. 38 shows the inductor current for a basic calculator clock frequency of 175 KHz. The average LED current can be calculated from the formula $$\begin{aligned} Ave\ I_{LED} &= \text{pulse current} \times \text{duty cycle} \\ &= (\tfrac{1}{2} \times 80\ ma) \quad \frac{5.88\ \text{sec}}{\frac{1}{175} KHz \times 56} \\ &= \frac{(80)(5.88)(.175)}{(2)(56)} = .735\ ma \end{aligned}$$

The worse case display power (i.e., 13 figure eights and two minus signs) is about 110 milliwatts. FIG. 38 also shows the ringing inherent in the inductor drive technique.

The display information is partially decoded in arithmetic and register circuit 32 and completely decoded into eight signals, representing seven character segment plus a decimal point, within bipolar anode driver 192 of output display unit 14.

As discussed above, anode driver 192 includes the basic clock generator for the calculator. In the event the optional display unit is not employed, the clock signals are derived from separate clock generator circuitry located elsewhere in the basic calculator. This separate clock generator circuitry is shown in detail in FIG. 40. The low power TTL inverters 198 and the associated passive elements form an oscillator whose frequency is, under worst case conditions, always less than or equal to 720 kilohertz. The oscillator output is a square wave. Duel J–K master-slave flip-flop 200 operates on the output of the oscillator to provide output signals comprising 360 kilohertz and 180 kilohertz square waves. The resulting clock phase signals $\phi$1T and $\phi$2T appearing at the outputs of gates 202 are identical to the signals generated by the clock generator portion of anode driver 192.

Figure 30:
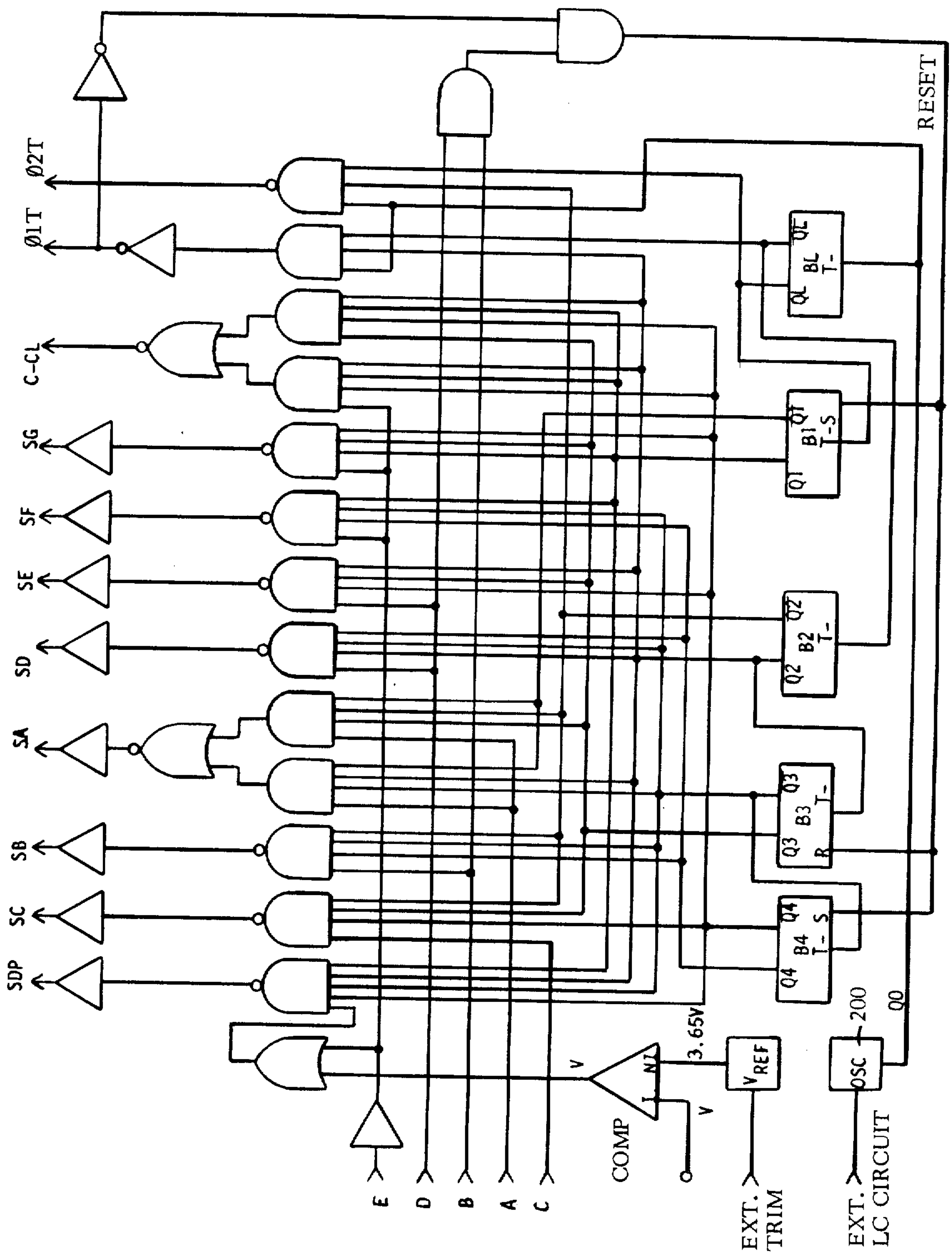
FIG. 30 is a logic diagram of the anode driver of FIG. 29.
Figure 31:
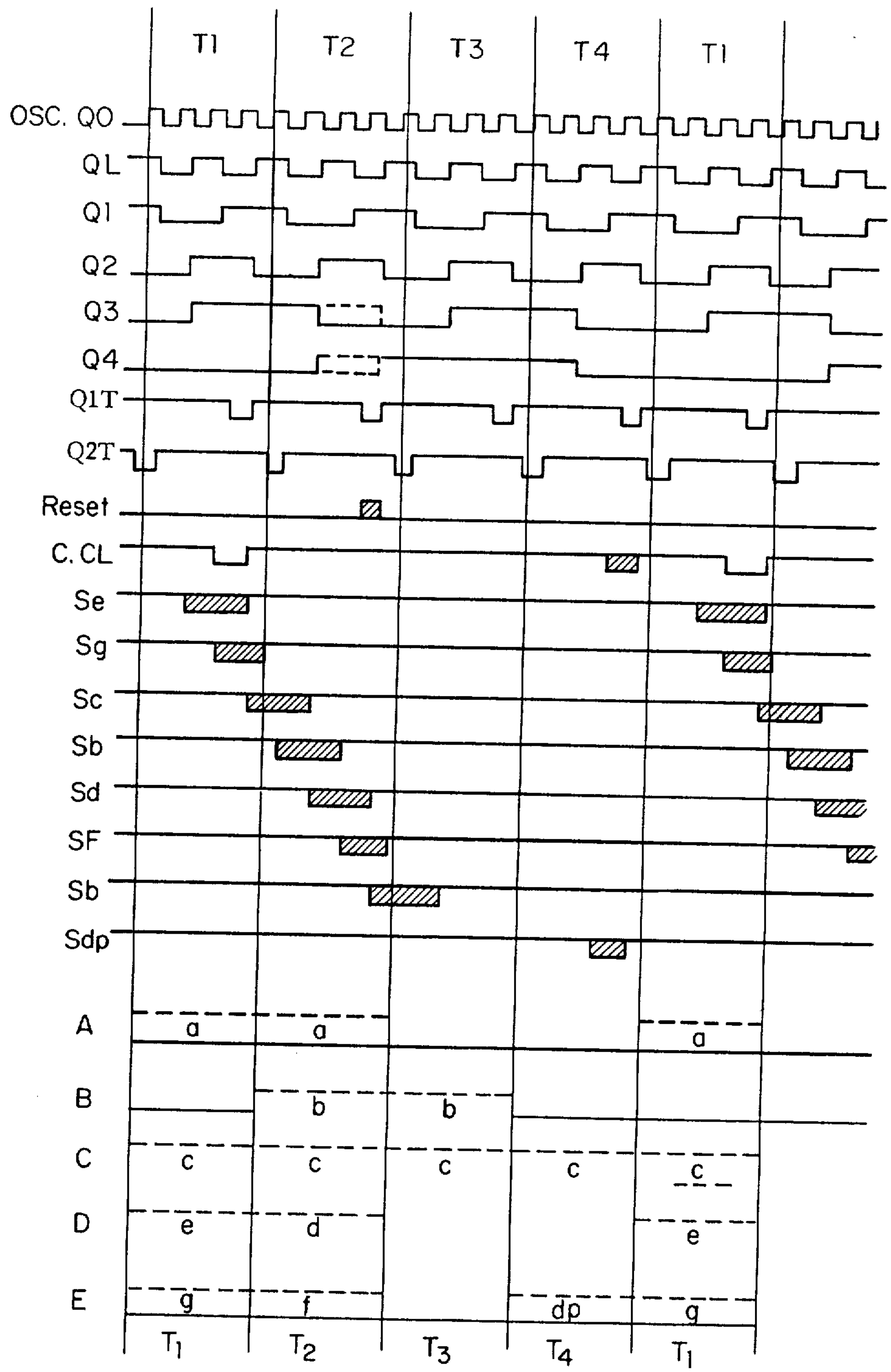
FIG. 31 is a waveform diagram illustrating the timing relationship between various signals associated with the anode driver of FIGS. 29 and 30.

A logic diagram of the anode driver 192 is shown in FIG. 30. The clock generator portion thereof uses an external LC circuit to set the oscillator frequency at a nominal 800 kilohertz rate. Flip-flops B1 and B2 are clocked off alternate phases of flip-flop B1 to provide two 200 kilohertz square waves as shown in FIG. 31. Flip-flop B3 is clocked from flip-flop B2 and in turn clocks flip-flop B4 to provide further division of the basic clock frequency of approximately 200 kilohertz. The two-phase clock signals $\phi$1T and $\phi$2T are generated from flip-flops BL and B1 and the 800 kilohertz oscillator 200. These signals are on for 625 nanoseconds and are separated by 625 nanoseconds, as shown in FIG. 31. A periodic counter-clock signal (CCL) is also derived from the anode driver 192 and is sent to cathode driver 194 once each digit time. The trailing edge of this signal causes the display to step to the next digit.

The display consists of fifteen characters while the basic calculator word cycle consists of 14 digits. The extra character is the decimal point. As explained above, a BCD two is placed in register B at the digit position of the decimal point. The display decoder 92 in arithmetic and register circuit 32 indicates this by a signal on outputs B and E during bit time $T_4$ (see FIG. 11). When this condition is decoded by the anode driver, the decimal point is excited and an extra counter clock signal is given to step the display to the next position (see FIGS. 31, 32, and 33). Therefore, all remaining digits in register A are displaced one digit in the display.

Figure 32:
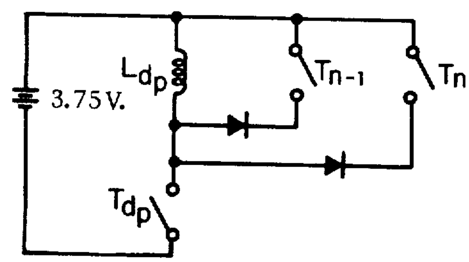
FIG. 32 is a schematic diagram of the basic inductive drive circuit for one of the light emitting diodes employed in the LED display of FIGS. 3 and 29.
Figure 33:
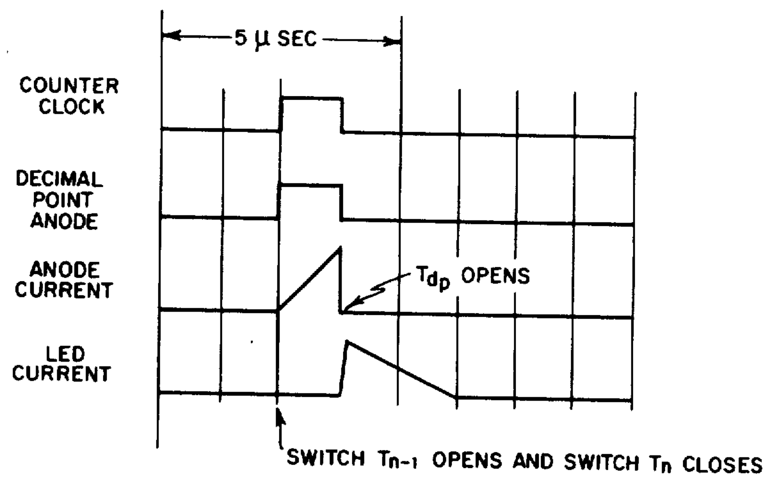
FIG. 33 is a waveform diagram illustrating the timing relationship between the decimal point drive signals for the LED display of FIGS. 3 and 29.

FIGS. 32 and 33 show the simplified circuit and the timing relationship for the decimal point. The timing is critical since all the inductor current in segment *b* (the last to be excited) must be decayed before the counter clock signal is given to step to the next digit, or the remaining current would be discharged through the wrong digit and a faint lighting of segment *b* on the same digit with the decimal point would occur. The decimal point insertion technique is the reason all other seven segments are excited during the first half of the digit time. The decimal point charging time is one-half that of the other segments. The decimal point segment receives the same current in one-half the time and is one-half as bright as the other segments.

Figure 34:
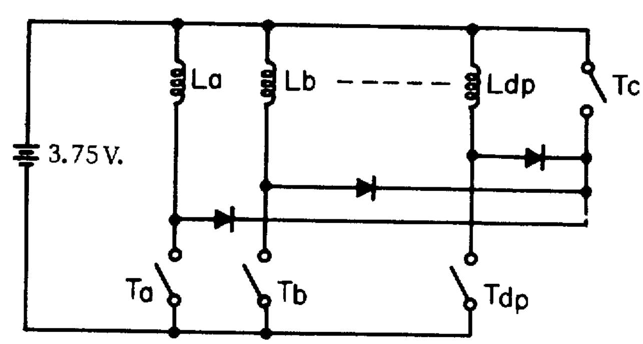
FIG. 34 is a schematic diagram of the inductive drive circuit for one digit of the LED display of FIGS. 3 and 29.

As described above, an inductive circuit method of driving the light emitting diodes is employed. Basically, the method involves using the time required for current to build up in an inductor to limit current, rather than using a resistor as is normally the case with LED displays. This saves power since the only lossy components in the drive system are the parasitic inductor and transistor resistances. The drive circuit for one digit is shown in FIG. 34. Assuming the cathode transistor switch $T_c$ is closed, an anode switch $T_a$ is closed for 2.5 microseconds, allowing the current to build up to a value $I_p$ along a nearly triangular waveform (the early part of an exponential buildup). When anode switch $T_a$ is opened, the current is dumped through the LED, decaying in about 5 microseconds. The anodes are strobed according to the sequence in FIG. 31. The primary reason for sequentially exciting the anodes is to reduce the peak cathode transistor current. Since the decay time is approximately twice the buildup time, it works out that the peak cathode current is about 2.5 times the peak current in any segment. The LEDs are more efficient when excited at a low duty cycle. This means high currents for short periods (80 ma. anode current, 250 ma. cathode current). FIG. 31 also shows the relationship between the anode strobing sequence and the display output signals (A–E) from arithmetic and register circuit 32.

Figure 35:
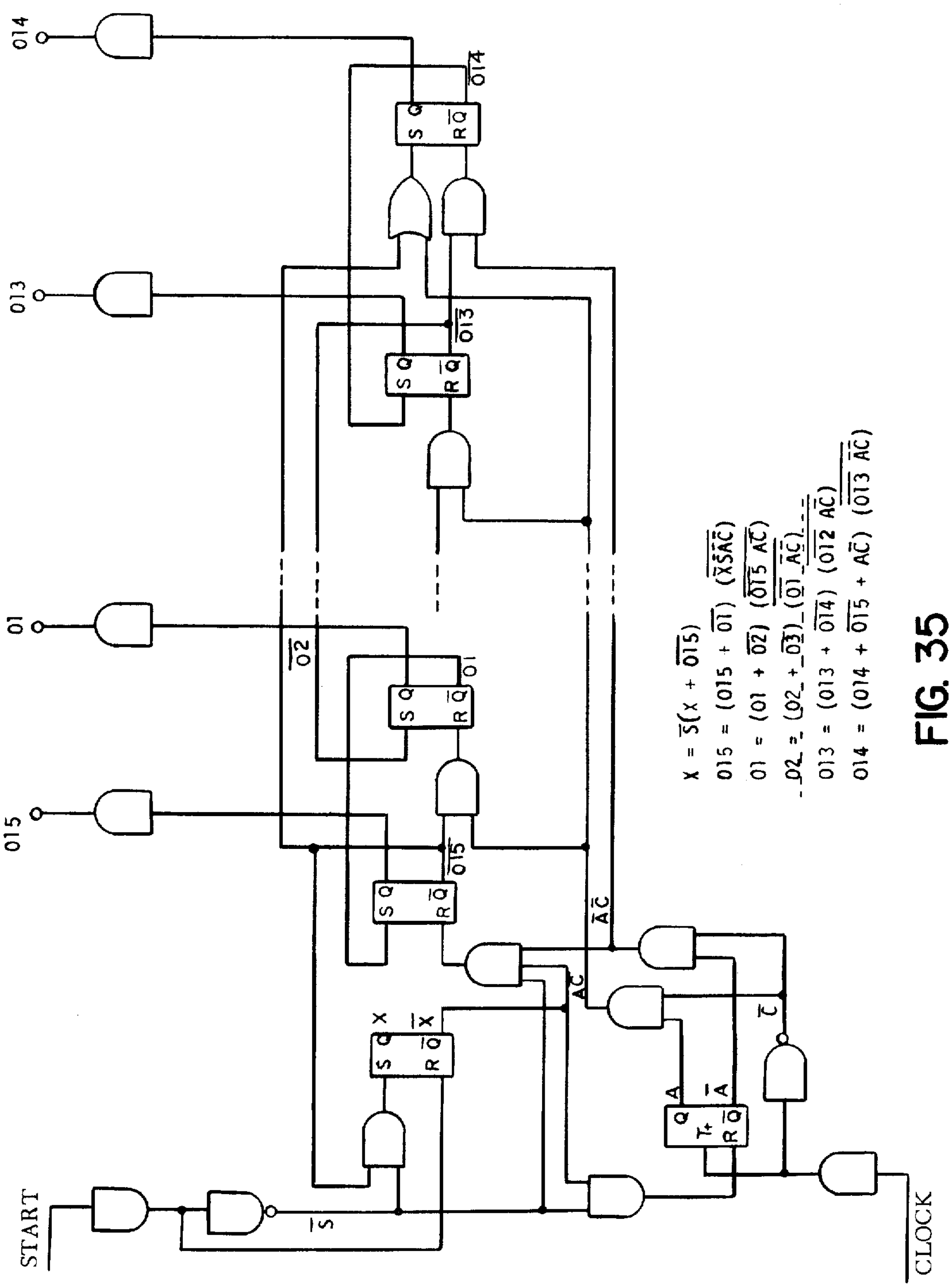
FIG. 35 is a logic diagram of the cathode driver of FIG. 29.

The cathode driver 194 of output display unit 14 comprises a 15-position shift register for scanning the 15-digit display once each word time. This scanning operation moves from digit to digit in response to counter clock signals from the anode driver. Once each word time a START signal arrives from arithmetic and register circuit 32 to restart the procedure. A block diagram of cathode driver 194 is shown in FIG. 35.

OUTPUT PRINTER

As discussed above, primary control for output printer unit 16 is provided within MOS/LSI input/output circuit 110. However, some additional circuitry outside the I/O circuit is provided to perform timing and driving functions relative to the output printer.

Figure 27:
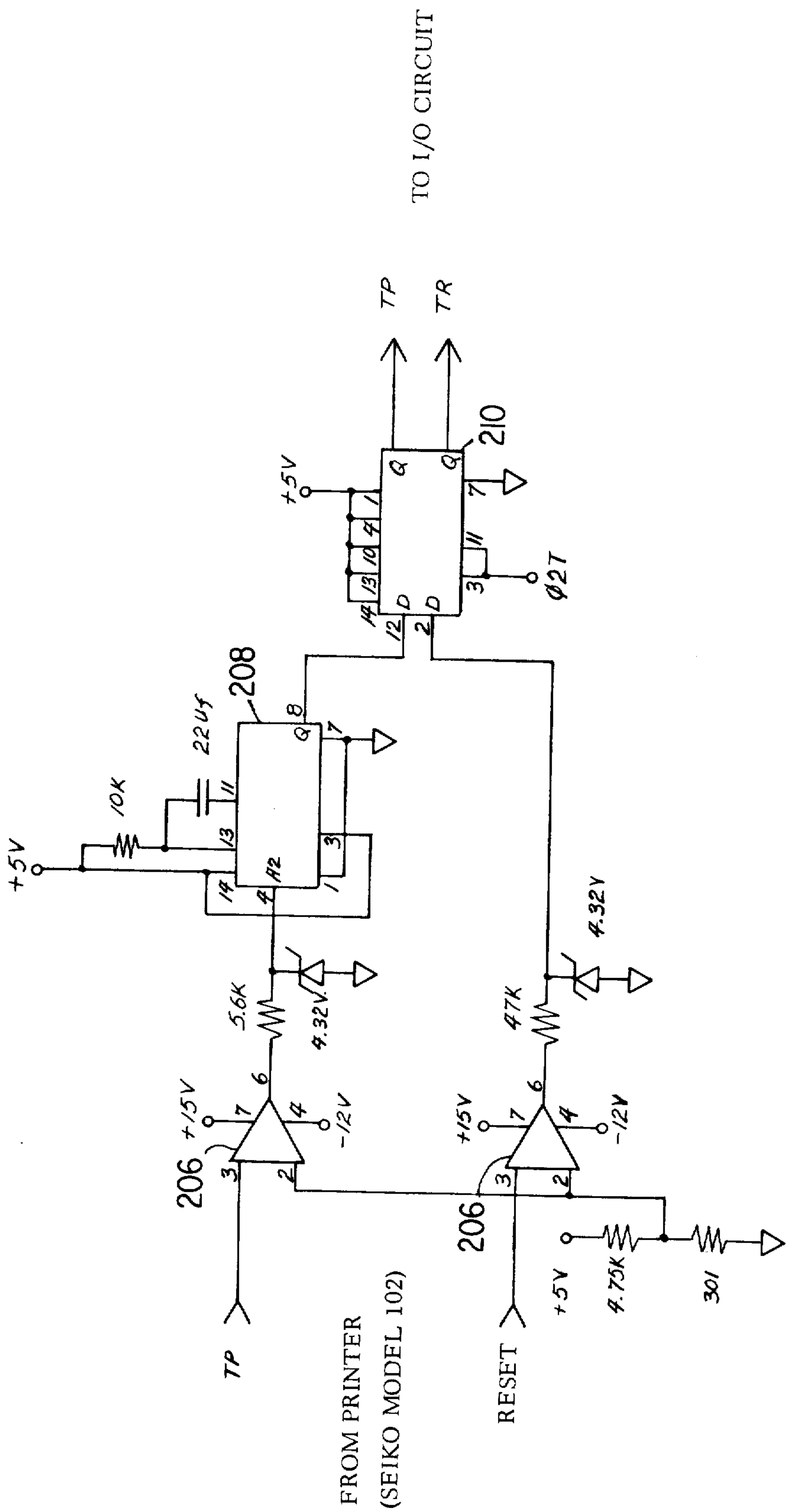
FIG. 27 is a detailed schematic diagram of the timing circuitry associated with the printer of FIG. 3.

FIG. 27 is a detailed schematic diagram of the printer timing circuitry. I/O circuit 110 requires a pulse train (TP) from the printer which denotes the sector divisions as the print drum rotates. Between sectors twelve and zero of the print drum, a RESET signal is given by the printer to the printer timing circuitry, which responds by issuing a signal (TR) to the I/O circuit for resetting sector counter 142.

Since both RESET and TP are derived from a magnetic pick up within the printer, they have very slow rise and fall times. In addition, they are very low level signals. The printer timing circuitry of FIG. 27 operates on these signals to present them in better form to the I/O circuit. Operational amplifiers 206 serve as level detectors. In order to mask the problem of spurious pulses resulting from the fact that signal TP has very little magnitude, a retriggerable monostable multivibrator 208 is provided to receive the output signal of operational amplifier 206. Since both signals TP and TR must be received by I/O circuit 110 in synchronization with phase 2 of the clock signal, a dual D-type flip-flop 210 is provided.

Figure 28:
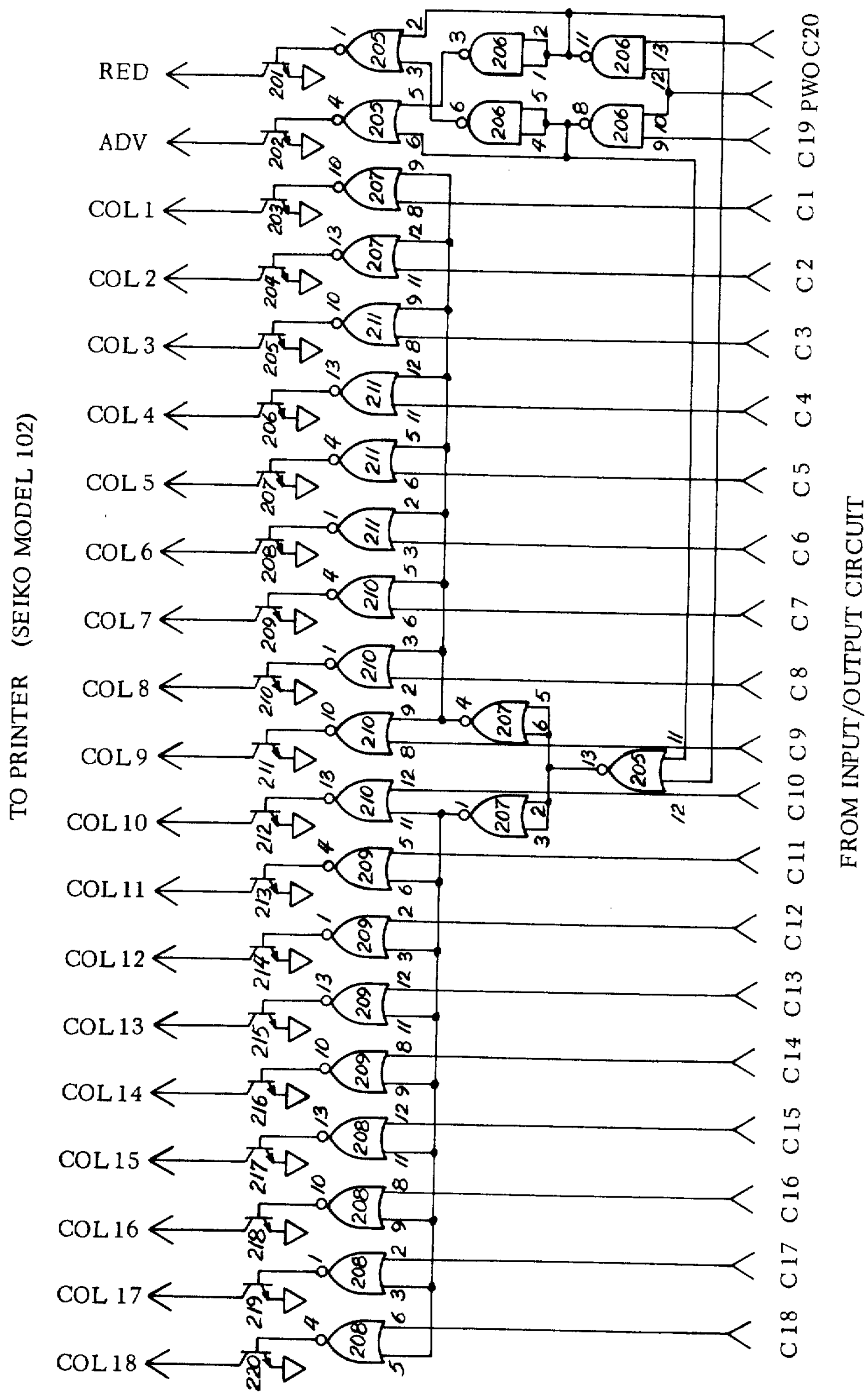
FIG. 28 is a detailed schematic diagram of the driver circuitry associated with the printer of FIG. 3.

The printer drive circuitry of FIG. 28 simply accepts the low level TTL signals of the I/O circuit 110 for interfacing to the various solenoids of printer 16, which require higher power levels for operation.

POWER SUPPLY

Figure 41:
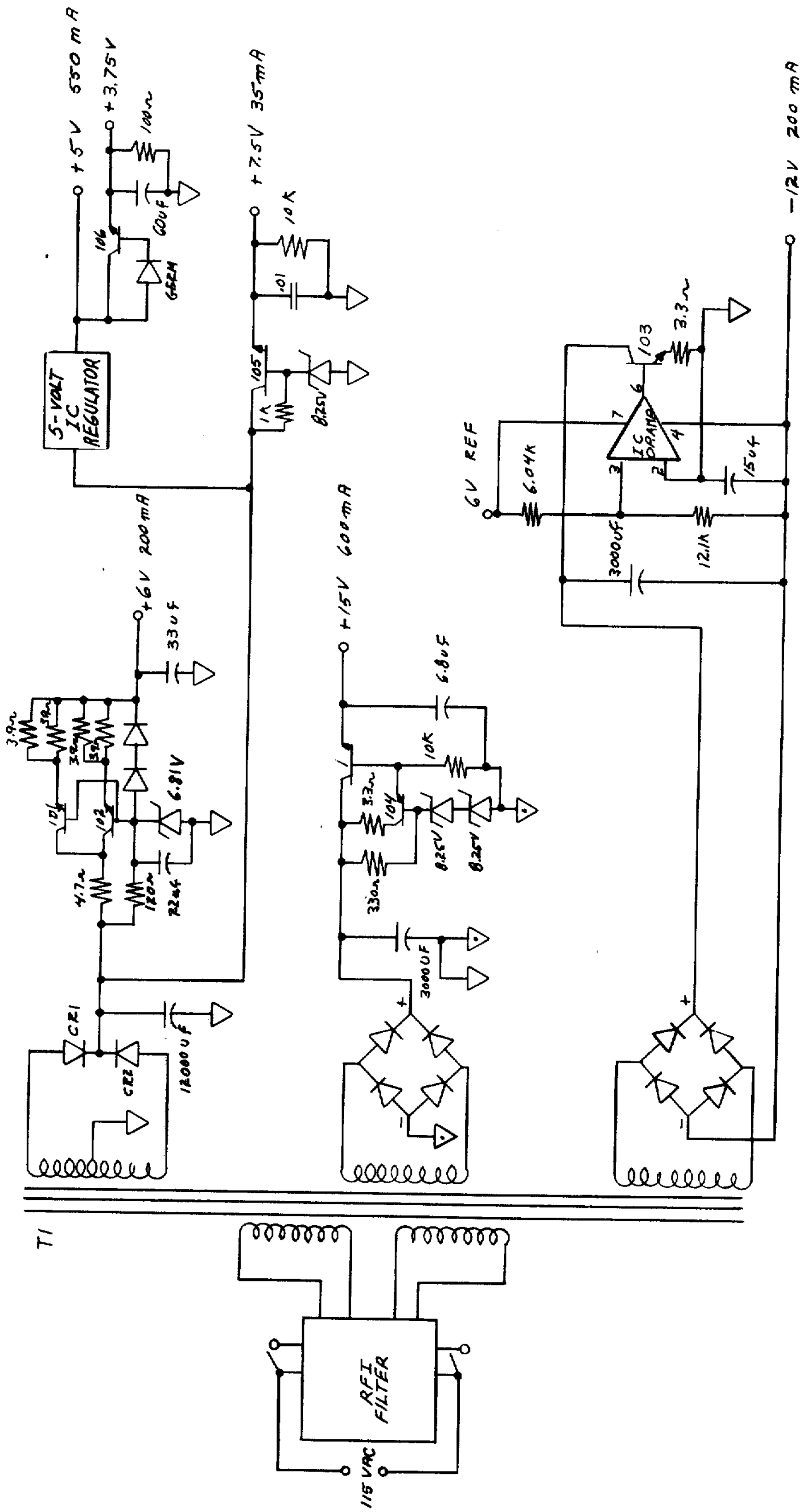
FIG. 41 is a schematic diagram of a power supply system which may be employed by the calculator of FIG. 1.

The calculator power supply system, shown in detail in FIG. 41, is constructed according to conventional practices and delivers +6 volts, +15 volts, +5 volts, +7.5 volts, and −12 volts to the various calculator circuits.

PLUG-IN KEYBOARD FUNCTION BLOCK

Figure 45:
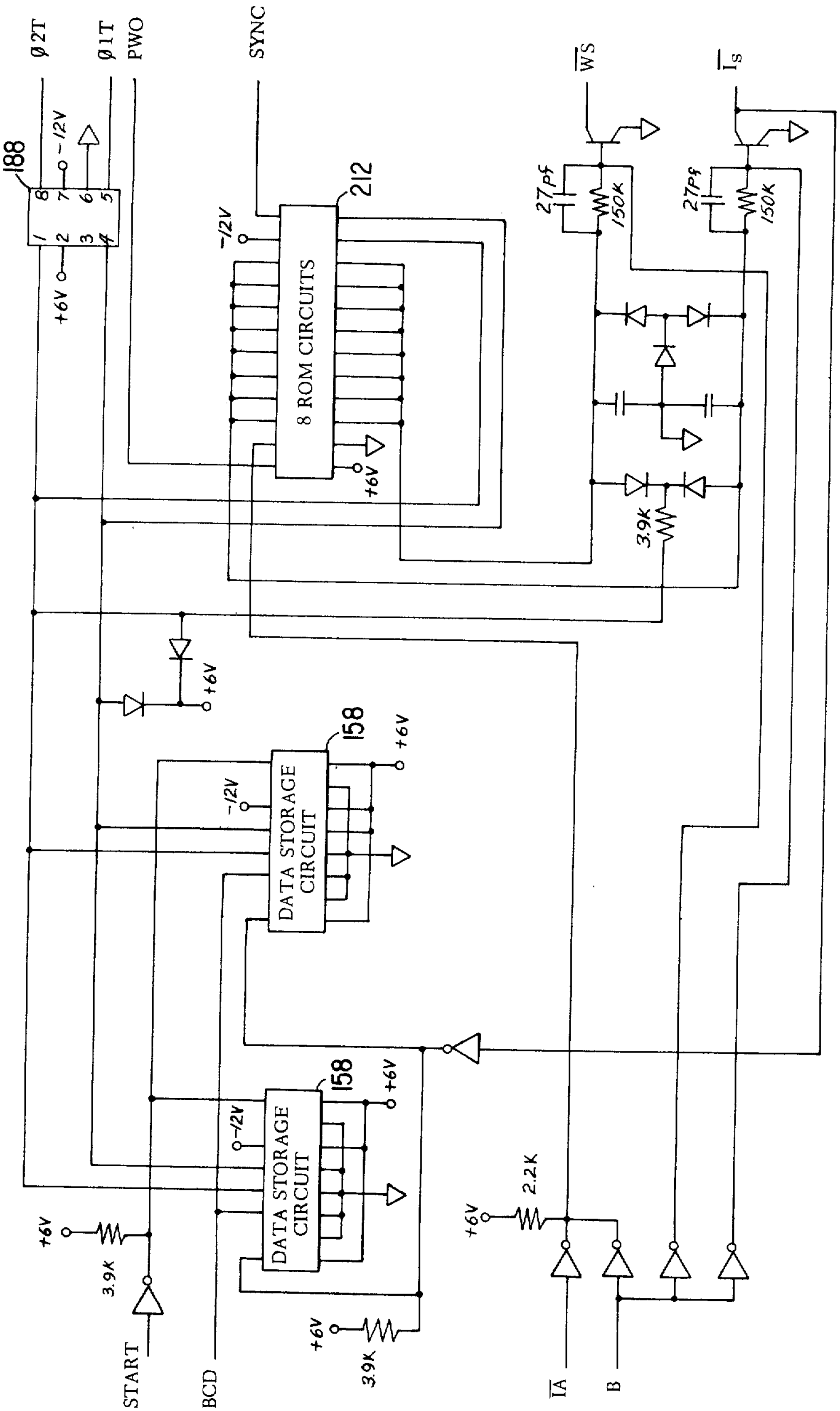
FIG. 45 is a detailed schematic diagram of a plug-in keyboard function block which may be employed in the calculator of FIG. 1.

FIG. 45 shows a detailed schematic diagram of the circuitry comprising each plug-in keyboard function block. Each such block contains two MOS/LSI data storage circuits 158 which are constructed and accessed by the calculator microprograms as described above. Also included are eight MOS/LSI read-only memory circuits which form a ROM group 212. Again, these circuits are identical to those of the basic calculator except for their bit patterns, which are set forth in the instruction listing at a later point in this specification. The function block circuitry also includes a bipolar clock driver 188 which is identical to that described above.

PLUG-IN ROM/PROM OPTION

Figure 46:
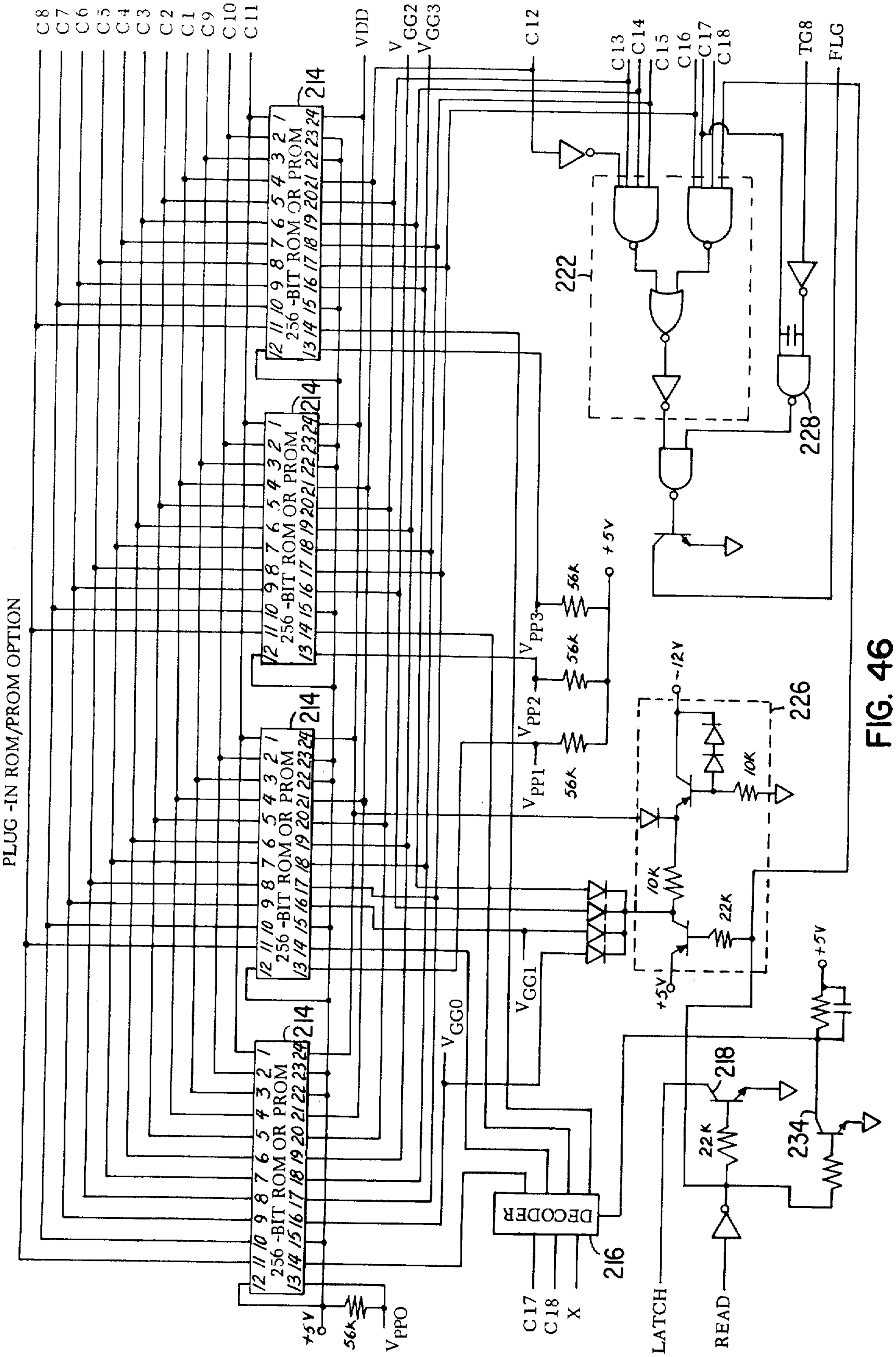
FIG. 46 is a detailed schematic diagram of an optional plug-in ROM/PROM which may be employed in the calculator of FIG. 1.

As described above, the user may employ with the calculator a plug-in ROM or PROM containing library programs written in user level language. These programs may be executed by the user from the keyboard. A detailed schematic diagram of each plug-in ROM/PROM is given in FIG. 46. Included are four conventional 256-bit read-only memories or programmable read-only memories 214, in which are stored the instructions comprising the library program. The advantage of using a programmable read-only memory (PROM) lies in the fact that the program instructions may be modified. A decoder 216 selects which of the ROMs or PROMs 214 is to be addressed, based on the two most significant bits of the total address. Transistor switch 218, in response to a READ instruction, pulls the LATCH input of I/O circuit 110 low, thereby allowing data from the ROMs or PROMs 214 to be loaded into the I/O circuit. Logic circuitry 222 issues a flag to I/O circuit 110 whenever a given address exceeds the memory capacity of the ROM/PROM option currently employed. Transistor switch 224 provides an output, delayed in time from that of transistor 218, for enabling decoder 216. Regulator circuitry 226 provides additional regulation of two of the power supply voltages as they are applied to the ROM/PROM circuitry. Logic gate 228 is employed by some plug-in keyboard function blocks to determine if the program stored in ROM or PROM 214 is proprietary, in which case program listing is prohibited.

DATA STORAGE OPTION

Figure 47:
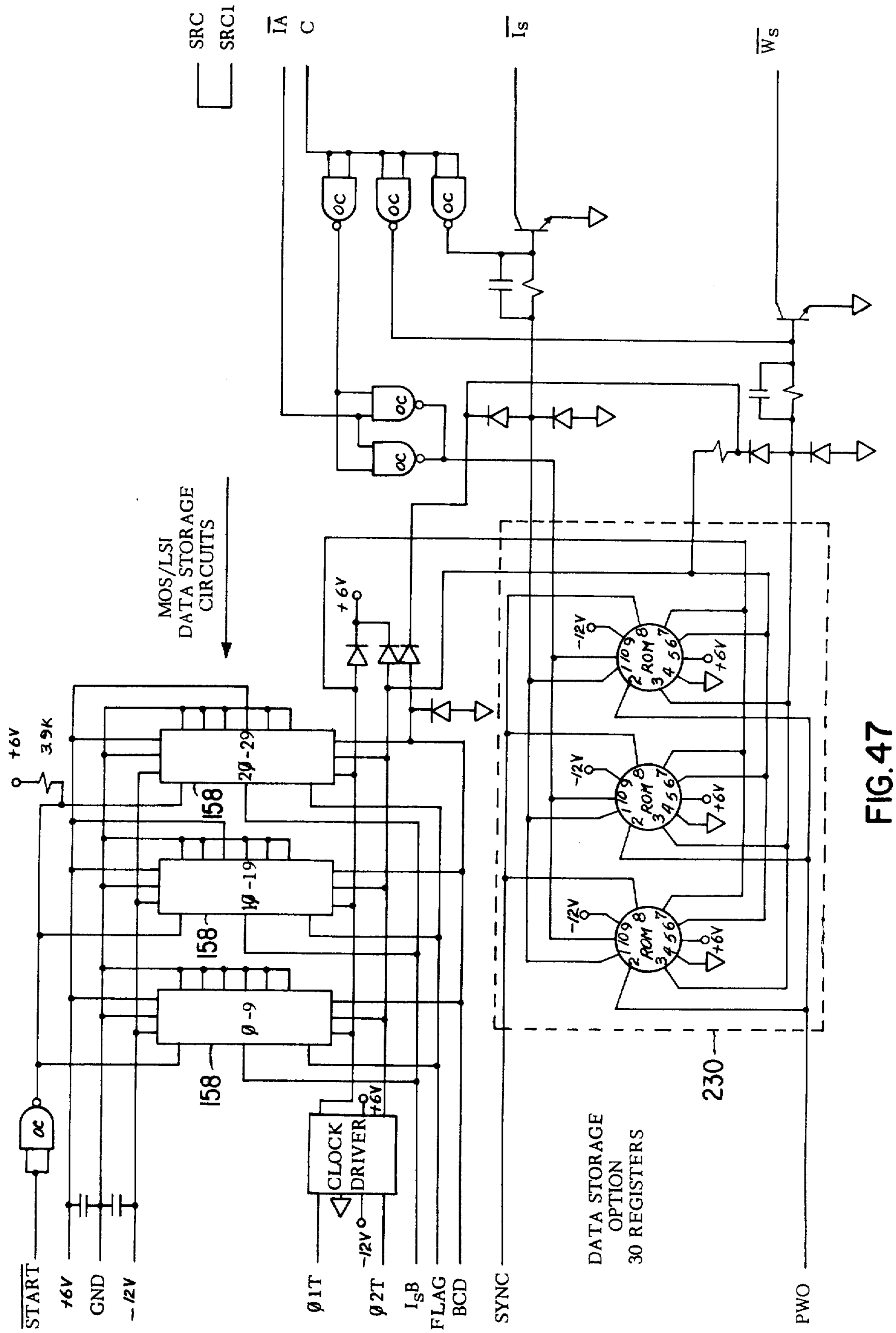
FIG. 47 is a detailed schematic diagram of an optional data storage unit which may be plugged into the calculator of FIG. 1.

The optional plug-in data storage, described above, is shown in detailed schematic form in FIg. 47. Each increment of plug-in data storage comprises 30 registers, which are provided by three MOS/LSI data storage circuits 158. These circuits are identical in construction and function to that described in detail earlier in this specification. Three MOS/LSI read-only memory circuits, like those described in detail earlier in this specification, comprise a ROM group 230. The bit patterns for these individual ROM circuits are contained in the instruction listing below. The data storage option also includes a clock driver 232 as described above.

INSTRUCTION SET 1

Every function performed by the calculator is implemented by a sequence of one or more ten-bit instructions stored in the ROMs $\phi$–7 of read-only memory group 34 or one of the ROM groups in a keyboard function block 20, an optional data storage unit, or one of the optional input/output interface cards. The serial nature of the MOS calculator circuits allows the instruction bits to be decoded from least significant bit to most significant bit (right to left) serially. If the first bit is a one, the instruction is either a subroutine jump or a conditional branch as selected by the second bit, with eight bits remaining for an address. The next largest set of instructions, the arithmetic set, starts with a zero followed by a one (right to left), leaving eight bits for encoded instructions.

With three exceptions, instruction set 1 includes those instructions executed by the arithmetic and register circuit, the control and timing circuit, and the read-only memory circuits. These three exceptions are represented by three instructions within instruction set 1 which are executed by the data storage circuit. The mnemonics and associated bit patterns for these three instructions are as follows:

| MNEMONIC | BIT PATTERN |
|---|---|
| DSTC | 1 0 1 1 1 1 1 0 0 0 |
| ATDS | 1 0 0 1 1 1 0 0 0 0 |
| DTDS | 1 0 1 1 1 1 0 0 0 0 |

These instructions are discussed in detail in the portion of this specification above which deals with the MOS/LSI data storage circuit.

The 10 different types of instructions comprising instruction set 1 are shown in the following table.

TABLE OF INSTRUCTION TYPES (X = DON'T CARE)

| TYPE | AVAILABLE INSTRUCTIONS | NAME | FIELDS |
|---|---|---|---|
| 1 | 256 (ADDRESSES) | JUMP SUBROUTINE | SUBROUTINE ADDRESS (8) 0 1 |
| | 256 (ADDRESSES) | CONDITIONAL BRANCH | BRANCH ADDRESS 1 1 |
| 2 | 32 × 8 = 256 | ARITHMETIC/REGISTER | OPERATION CODE (5) WORD SELECT (3) 1 0 |
| 3 | 64 (37 used) | STATUS OPERATIONS | N (4) F (2) 0 1 0 0; $I_5I_4$ $I_3$ $I_2$ $I_1$ $I_0$ |
| | | SET BIT N | F = 00 |
| | | INTERROGATE N | F = 01 |
| | | RESET N | F = 10 |
| | | CLEAR ALL | F = 11 (N = 0000) |

-continued

TABLE OF INSTRUCTION TYPES (X = DON'T CARE)

| TYPE | AVAILABLE INSTRUCTIONS | NAME | FIELDS |
|---|---|---|---|
| | | | 4 2 |
| 4 | 64 (30 used) | POINTER OPERATIONS | P F 1 1 0 0 |
| | | SET POINTER TO P | F = 00 |
| | | INTERROGATE P | F = 10 |
| | | DECREMENT P | F = 01 } P = XXXX |
| | | INCREMENT P | F = 11 } P = XXXX |
| | | | 4 2 |
| 5 | 64 (20 used) | DATA ENTRY/DISPLAY | N F 1 0 0 0 |
| | | LOAD CONSTANT | F = 01 |
| | | $I_x$ → A | F = 1X (N = XX01) |
| | | BCD INPUT TO C-REGISTER | F = 1X (N = XX11) |
| | | STACK INSTRUCTIONS | F = 10 N = (---0) |
| | | AVAILABLE | F = 00 |
| | | | 3 2 |
| 6 | 32 (11 used) | ROM SELECT, MISC. | N F 1 0 0 0 0 |
| | | SELECT ROM N | F = 00 |
| | | KEYBOARD ENTRY | F = 10 (N = XX1) |
| | | EXTERNAL ENTRY | (N = XX0) |
| | | SUBROUTINE RETURN | F = 01 (N = XXX) |
| | | | 4 |
| 7 | 16 | (RESERVED FOR | X X X X 1 0 0 0 0 0 |
| | | PROGRAM STORAGE | 3 |
| 8 | 8 | MOS CIRCUIT) | X X X 1 0 0 0 0 0 0 |
| 9 | 7 | AVAILABLE | X X X 0 0 0 0 0 0 0 |
| 10 | 1 | NO OPERATION (NOP) | 0 0 0 0 0 0 0 0 0 0 |

There are two type 1 instructions, JUMP SUBROUTINE and CONDITIONAL BRANCH. They are decoded only by control and timing circuit 30. No word select is generated and all registers in arithmetic and register circuit 32 merely recirculate. The object of the JUMP SUBROUTINE instruction is to move to a new address in ROM and to save the existing address, incremented by one, as a return address. The last instruction in a subroutine must be a RETURN to continue the program where it was left previously.

As discussed above, control and timing circuit 30 contains a 28-bit shift register 68–72 which holds the current 8-bit ROM address and also has eight bits of storage for one return address (see FIG. 6). During bit times $b_{47}$–$b_{54}$ the current ROM address flows through the adder 74 and is incremented by one. Normally this address is updated each word time. However, if the first two bits of the instruction, which arrive at bit times $b_{45}$–$b_{46}$, are 10, the incremented current address is routed to the return address portion 70 of the 28-bit shift register, and the remaining eight bits of the instruction, which are the subroutine address, are inserted into the address portion 68. These data paths with the JSB control line are shown in FIG. 6. In this way the return address has been saved and the jump address is ready to be transmitted to the ROM at bit times $b_{19}$–$b_{26}$ of the next word time.

The most frequently used instruction is the CONDITIONAL BRANCH, which, based upon data or system status, implements the decision-making capability of the calculator. In the calculator system described here this instruction also functions as an unconditional branch.

The format of the CONDITIONAL BRANCH instruction, as shown in the instruction table above, is two ones followed by an 8-bit branch address. The instruction is received at bit times $b_{45}$–$b_{54}$. The last eight bits of the instruction are stored in the address buffer register 78 (See FIG. 6). During the next word time the carry flip-flop 76 is checked at bit time $b_{19}$. If the carry flip-flop was set during the previous word time, the current ROM address is transmitted to the ROMs φ–7. If the carry flip-flop was not set, the branch address is read from the address buffer register 78 onto the $I_a$ line and loaded into the ROM address register 100 (see FIG. 17). Thus, the instruction causes a branch if there is no carry. There are three ways the carry flip-flop 76 can be set: (1) by a carry generated in the arithmetic and register circuit 32; (2) by a successful interrogation of the pointer position; and (3) by a successful interrogation of one of the 12 status bits. An example is given in the table below.

EXAMPLE OF CONDITIONAL BRANCH EXECUTION

| WORD | ADDRESS RECEIVED AT ROM | INSTRUCTION SENT BY ROM | INSTRUCTION EXECUTED | RESULT |
|---|---|---|---|---|
| N−1 | P | INCREMENT SIGN DIGIT | — | — |
| N | P+1 | CONDITIONAL BRANCH TO ADDRESS Q | INCREMENT SIGN DIGIT | CARRY GENERATED IF A-REGISTER NEGATIVE |
| N+1 | P+2 | CONTENTS OF P+2 | CONDITIONAL BRANCH | SEND P+2 |
| | or | or | | or |
| | Q | CONTENTS OF Q | | SEND Q |

A typical test condition is to determine the sign of a number. Suppose at address P in the program a branch to location Q is desired if the sign of A is positive, while program execution is to continue if the sign is negative. In the example give in the table above, the instruction INCREMENT THE A-REGISTER, WORD SELECT OF SIGN DIGIT ONLY is given at location P. During word time N-1 the instruction is received by arithmetic and register circuit 32 and is executed at word time N (the same word time when the CONDITIONAL BRANCH instruction is received by control and timing circuit 30). If the sign of A is negative, there will be a nine in the sign digit. Incrementing this position will generate a carry and set the carry flip-flop 76 in control and timing circuit 30. Since the instruction causes a branch if no carry is generated, the program execution will jump to location Q only if the sign is positive (i.e., was a zero), otherwise execution continues at P+2.

Note that during word time N+1 the calculator did nothing more than select which of two addresses to send next (all registers merely recirculate). Performing a branch actually takes two word cycles to execute; one to ask a question and set the carry flip-flop 76 if the answer is YES, and the other to test if the carry flip-flop was set and transmit the proper address. In many cases, asking the question is an arithmetic operation (i.e., A+B → A) which must be performed anyway. In this case, the branch requires only one extra instruction.

Contrary to most instruction sets, this set has no unconditional branch instruction. However, since an ordinary JUMP is one of the most frequently used instructions, the CONDITIONAL BRANCH is also used to effect an unconditional branch or jump by insuring that the carry flip-flop 76 is reset when an unconditional branch is desired. This is the reason the sense of the CONDITIONAL BRANCH is branch on no carry. The carry flip-flop 76 is reset during execution of every instruction except ARITHMETIC (type 2) and INTERROGATION OF POINTER or STATUS (types 3 and 4). Since only ARITHMETIC and INTERROGATION instructions can set the carry flip-flop 76, the constraint is not severe. The JUMP SUBROUTINE instruction can also be used as an unconditional branch if the previous return address does not need to be saved. In summary, CONDITIONAL BRANCH can be used as an unconditional branch provided the state of the carry flip-flop 76 is known to be reset (i.e., provided the conditional branch does not follow an arithmetic or an interrogation of pointer or status instruction).

ARITHMETIC & REGISTER (type 2) instructions apply to the arithmetic and register circuit 32 only. There are thirty-two ARITHMETIC & REGISTER instructions divided into eight classes encoded by the left most five bits of the instruction. Each of these instructions can be combined with any of eight word select signals to give a total capability of two hundred fifty-six instructions. The 32 ARITHMETIC & REGISTER instructions are listed in the table below.

TABLE OF TYPE TWO INSTRUCTIONS
(in order of binary code)

| CODE | INST | CODE | INST |
|---|---|---|---|
| 0 0000 | 0-B | 1 0000 | A-B |
| 0 0001 | 0 → B | 1 0001 | B←→C |
| 0 0010 | A-C | 1 0010 | SHIFT C RIGHT |
| 0 0011 | C-1 | 1 0011 | A-1 |
| 0 0100 | B → C | 1 0100 | SHIFT B RIGHT |
| 0 0101 | 0-C → C | 1 0101 | C+C → C |
| 0 0110 | 0 → C | 1 0110 | SHIFT A RIGHT |
| 0 0111 | 0-C-1 → C | 1 0111 | 0 → A |
| 0 1000 | SHIFT A LEFT | 1 1000 | A-B → A |
| 0 1001 | A → B | 1 1001 | A←→B |
| 0 1010 | A-C → C | 1 1010 | A-C → A |
| 0 1011 | C-1 → C | 1 1011 | A-1 → A |
| 0 1100 | C → A | 1 1100 | A+B → A |
| 0 1101 | 0-C | 1 1101 | A←→C |
| 0 1110 | A+C → C | 1 1110 | A+C → A |

-continued

TABLE OF TYPE TWO INSTRUCTIONS
(in order of binary code)

| CODE | INST | CODE | INST |
|---|---|---|---|
| 0 1111 | C+1 → C | 1 1111 | A+1 → A |

KEY: A,B,C are registers, → means goes into, ←→ means interchange

The eight classes of ARITHMETIC & REGISTER instructions together with a parenthetical indication of the number of instructions within each class are as follows:

(1) CLEAR(3)
(2) TRANSFER/EXCHANGE(6)
(3) ADD/SUBTRACT(7)
(4) COMPARE(6)
(5) COMPLEMENT(2)
(6) INCREMENT(2)
(7) DECREMENT (2)
(8) SHIFT(4)

There are three CLEAR instructions. These instructions are 0 → A, 0 → B, and 0 → C. They are implemented by simply disabling all the gates entering the designated register. Since these instructions can be combined with any of the eight word select options, it is possible to clear a portion of a register or a single digit.

There are six TRANSFER/EXCHANGE instructions. These instructions are A → B, B → C, C → A, A ←→ B, B ←→ C, and C ←→ A. This variety permits data in registers A, B, and C to be manipulated in many ways. Again, the power of the instruction must be viewed in conjunction with the word select option. Single digits may be exchanged or transferred.

There are seven ADD/SUBTRACT instructions which use the adder circuitry 82. They are A±C → C, A±B → A, A±C → A, and C+C → C. The last instruction can be used to divide by five. This is accomplished by first adding the number to itself via C+C → C, then multiplying by two, then shifting right one digit, and dividing by 10. The result is a divide by five. The algorithm is used in the square root routine.

There are six COMPARE instructions. These instructions are always followed by a CONDITIONAL BRANCH. They are used to check the value of a register or a single digit in a register without modifying or transferring the contents thereof. These instructions (type 2) may easily be found in the instruction table above since there is no transfer arrow present. They are:

(1) O—B (Compare B to zero)
(2) A—C (Compare A and C)
(3) C—1 (Compare C to one)
(4) O—C (Compare C to zero)
(5a—b A-B (Compare A and B)
(6) A—1 (Compare A to one)

If, for example, it is desired to branch if B is zero (or any digit or group of digits is zero as determined by WS) the O—B instruction is followed by a CONDITIONAL BRANCH. If B was zero, no carry (or borrow) would be generated and the branch would occur. Again, it is easy to compare single digits or a portion of a register by appropriate word select options.

There are two COMPLEMENT instructions. The number representation system in the calculator is sign and magnitude notation for the mantissa, and tens complement notation in the exponent field. Before numbers can be subtracted, the subtrahend must be tens-complemented (i.e., O—C → C). Other algorithms require the nines complement (i.e., O—C—1 → C).

There are four INCREMENT/DECREMENT instructions. They are A±1 → A and C±1 → C.

There are four SHIFT instructions. All three registers A, B, and C may be shifted right, while only A may be shifted left. The ARITHMETIC & REGISTER instruction set is summarized by class in the table below.

TABLE OF TYPE TWO INSTRUCTIONS
(divided by class)

| CLASS | INSTRUCTION | CODE |
|---|---|---|
| 1) CLEAR | 0 → A | 10111 |
| | 0 → B | 00001 |
| | 0 → C | 00110 |
| 2) TRANSFER/ EXCHANGE | A → B | 01001 |
| | B → C | 00100 |
| | C → A | 01100 |
| | A ↔ B | 11001 |
| | B ↔ C | 10001 |
| | C ↔ A | 11101 |
| 3) ADD/SUBTRACT | A+C → C | 01110 |
| | A–C → C | 01010 |
| | A+B → A | 11100 |
| | A–B → A | 11000 |
| | A+C → A | 11110 |
| | A–C → A | 11010 |
| | C+C → A | 10101 |
| 4) COMPARE | 0–B | 00000 |
| | 0–C | 01101 |
| | A–C | 00010 |
| | A–B | 10000 |
| | A–1 | 10011 |
| | C–1 | 00011 |
| 5) COMPLEMENT | 0–C → C | 00101 |
| | 0–C–1 → C | 00111 |
| 6) INCREMENT | A+1 → A | 11111 |
| | C+1 → C | 01111 |
| 7) DECREMENT | A–1 → A | 11011 |
| | C–1 → C | 01011 |
| 8) SHIFT | Sh A Right | 10110 |
| | Sh B Right | 10100 |
| | Sh C Right | 10010 |
| | Sh A Left | 01000 |

The 28-bit shift register 68–72 in control and timing circuit 30 contains 12 status bits or flags used to remember conditions of an algorithm or some past event (e.g., that the decimal point key has already been depressed). These flags may be individually set, reset, or interrogated or all bits may be cleared (reset simultaneously). The format for the STATUS OPERATION instructions (type 3) given in the instruction type table above is repeated below.

TABLE OF STATUS INSTRUCTION DECODING

| BIT NO. | $I_9$ $I_8$ $I_7$ $I_6$ | $I_5$ $I_4$ | $I_3$ | $I_2$ $I_1$ $I_0$ |
|---|---|---|---|---|
| FIELD | N | F | 0 | 1 0 0 |

| F | INSTRUCTION |
|---|---|
| 0 0 | SET FLAG N |
| 0 1 | INTERROGATE FLAG N |
| 1 0 | RESET FLAG N |
| 1 1 | CLEAR ALL FLAGS (N=0000) |

If status bit N is one when the INTERROGATE N instruction is executed, the CARRY flip-flop 76 in control and timing circuit 30 will be set. The status bit will remain set. INTERROGATE is always followed by a CONDITIONAL BRANCH instruction. The effective form of the INTERROGATE instruction is IF STATUS BIT N=0, THEN BRANCH or IF STATUS BIT N ≠ 1, THEN BRANCH. The reason for this negative orientation is that all branches occur if the test is false (i.e., carry flip-flop=0), a result derived from combining conditional and unconditional branches under one instruction.

Status bit 0 is set when a key is depressed. If cleared it will be set every word time as long as the key is down.

A four-bit counter 54 in control and timing circuit 30 functions as a pointer or marker to allow arithmetic instructions to operate on a portion of a register. Instructions are available to set and interrogate the pointer at one of fourteen locations or to increment or decrement the present position. The pointer instruction decoding is given in the table below.

TABLE OF POINTER INSTRUCTION DECODING

| BIT NO. | 9 8 7 6 | 5 4 | 3 | 2 1 0 |
|---|---|---|---|---|
| FIELD | P | F | 1 | 1 0 0 |

| F | INSTRUCTION | |
|---|---|---|
| 00 | SET POINTER TO P | |
| 10 | INTERROGATE IF POINTER AT P | |
| 01 | DECREMENT POINTER | P = XXXX i.e., don't care |
| 11 | INCREMENT POINTER | P = XXXX i.e., don't care |

As with the STATUS INTERROGATE instruction, the carry flip-flop 76 is set if the pointer is at P when the INTERROGATE IF POINTER AT P instruction is executed. Like the status interrogation, the actual question is in the negative form IF P ≠ N, THEN BRANCH. This instruction would be followed by a CONDITIONAL BRANCH. In a math routine the pointer allows progressive operation on a larger and larger portion of a word. After each iteration through a loop, the pointer is decremented (or incremented) and then tested for completion to force another iteration or a jump out of the loop.

The DATA ENTRY & DISPLAY instructions (type 5) are used to enter data into arithmetic and register circuit 32, manipulate the stack and memory registers, and blank the display. Sixteen instructions in this set are not recognized by any of the existing circuits and are, therefore, available for other external circuits that might be employed with other embodiments of the calculator. The table below contains a detailed listing of the DATA ENTRY & DISPLAY instructions.

TABLE OF TYPE 5 INSTRUCTIONS (X = don't care, which in this context means the instruction does not depend on this bit; either a 1 or a 0 here will cause the same execution.)

$I_9\ I_8\ I_7\ I_6\ I_5\ I_4$ 1 0 0 0

| $I_9$ | $I_8$ | $I_7$ | $I_6$ | $I_5$ | $I_4$ | INSTRUCTION |
|---|---|---|---|---|---|---|
| 0000 → 1111 | | | | 0 | 0 | 16 Available Instructions |
| N 0000 → 1001 | | | | 0 | 1 | Enters 4-bit code N into C Register at pointer position (LOAD CONSTANT) |
| 0 | 0 | 0 | 0 | 1 | X | DISPLAY TOGGLE |
| 0 | 0 | 1 | 0 | 1 | X | EXCHANGE MEMORY, C → M → C |
| 0 | 1 | 0 | 0 | 1 | X | UP STACK, C → C → D → E → F |
| 0 | 1 | 1 | 0 | 1 | X | DOWN STACK, F → F → E → D → A |
| 1 | 0 | 0 | 0 | 1 | X | DISPLAY OFF |
| 1 | 0 | 1 | 0 | 1 | X | RECALL MEMORY, M → M → C |
| 1 | 1 | 0 | 0 | 1 | X | ROTATE DOWN, C → F → E → D → C |
| 1 | 1 | 1 | 0 | 1 | X | CLEAR ALL REGISTERS 0 → A,B,C,D,E,F,M |
| X | X | 0 | 1 | 1 | X | $I_S$ → A register (56 bits) |
| X | X | 1 | 1 | 1 | X | BCD → C register (56 bits) |

The first set of 16 possible instructions ($I_5I_4 = 00$) in the table above is not used by the calculator.

The next instruction ($I_5I_4 = 01$) in this table is called the LOAD CONSTANT (LDC) or DIGIT ENTRY instruction. When this instruction is executed, four bits in $I_9$–$I_6$ will be inserted into the C-register at the location of the pointer, and the pointer will be decremented. This allows a constant, such as $\pi$ (pi), to be stored in read-only memory and then transferred to arithmetic and register circuit 32. To transfer a 10-digit constant requires only 11 instructions (one to preset the pointer). Several exceptions exist in the use of this instruction. When used with the pointer in position 13, it cannot be followed by an ARITHMETIC & REGISTER instruction (i.e., type 2 or 5 instructions). With P = 12, LOAD CONSTANT can be followed by another LOAD CONSTANT but not by any other type 2 or 5 instructions. When used with the pointer in position 14, the LOAD CONSTANT instruction has no effect. However, when P = 12 and LOAD CONSTANT is followed by a type 2 or 5 instruction, position 13 in the C-register is modified. Loading non-digit codes, (1010–1111) is not allowed since they will be modified when passing through the adder.

The next set of instructions ($I_6\ I_5\ I_4 = 01X$) in the type 5 instruction table above includes two DISPLAY instructions and six STACK or MEMORY instructions. The display flip-flop in arithmetic and register circuit 32 controls blanking of all the LEDs. When it is reset, the 1111 code is set into the display buffer 94, which is decoded so that no segments are on. There is one instruction to reset this flip-flop ($I_9\ I_8\ I_7 = 100$) and another to toggle it (000). The toggle feature is convenient for blinking the display.

The remaining type 5 instructions include two affecting memory (EXCHANGE C ←→ M and RECALL M → C), three affecting the stack (UP, DOWN, and ROTATE DOWN), one general CLEAR, one for loading register A from the line $I_S$ ($I_7\ I_6\ I_5 = 011$), and one for loading the C-register from the BCD line (111). Neither of the last two instructions depends on bits $I_9$, $I_8$, or $I_4$. The $I_S$ → A instruction is designed to allow a key code to be transmitted from a program storage circuit to arithmetic and register circuit 32 for display. The entire 56 bits are loaded, although only two digits of information are of interest. The BCD → C instruction allows data input to arithmetic and register circuit 32 from a data storage circuit or the I/O circuit.

The ROM SELECT and other type six instructions are denoted by the pattern 10000 in instruction bits $I_4$–$I_0$. The decoding table for these instructions is shown below.

TABLE OF TYPE 6 INSTRUCTIONS

| CIRCUIT AFFECTED | $I_9I_8I_7I_6I_5I_4I_3I_2I_1I_0$ | INSTRUCTION |
|---|---|---|
| ROM | 0 0 0 0 0 1 0 0 0 0<br>↓ 0 0 1 0 0 0 0<br>1 1 1 0 0 1 0 0 0 0 | ROM SELECT, ONE OF EIGHT AS SPECIFIED IN BITS $I_9$ - I |
| CONTROL & TIMING | X X X 0 1 1 0 0 0 0 | SUBROUTINE RETURN |
| | X X 0 1 0 1 0 0 0 0 | EXTERNAL KEY CODE ENTRY TO CONTROL & TIMING CIRCUIT |
| | X X 1 1 0 1 0 0 0 0 | KEYBOARD ENTRY |
| DATA STORAGE | 1 X 0 1 1 1 0 0 0 0 | SEND ADDRESS FROM C-REGISTER INTO DATA STORAGE CIRCUIT |
| | 1 0 1 1 1 1 0 0 0 0 | SEND DATA FROM C-REGISTER INTO DATA STORAGE CIRCUIT |

The ROM SELECT instruction allows transfer of control from one ROM to another. Each ROM has a masking option which is programmed to decode bits $I_9$–$I_7$. A SELECT ROM 3 instruction read from ROM 1 will reset the ROE flip-flop 96 in ROM 1 and set the ROE flip-flop 96 in ROM 3. The address is incremented in control and timing circuit 30 as usual. Thus, if SELECT ROM 3 is in location 197 in ROM 1, the first instruction read from ROM 3 will be location 198.

Bits $I_6I_5 = 01$ designate a SUBROUTINE RETURN (RET) instruction. There are eight bits of storage in the 28-bit shift register 68–72 of control and timing circuit

30 for retaining the return address when a JUMP SUBROUTINE instruction is executed. This address has already been incremented so execution of RET is simply a matter of outputting the address on the $I_a$ line at bit times $b_{19}$–$b_{26}$ and also inserting it into the ROM address portion 68 of the shift register. It is also still retained in the return address portion 70.

A key code is entered into control and timing circuit 30 by depressing a key on the keyboard. A key depression is detected by a positive interrogation of status bit 0. During a computation the keyboard is locked out because this status bit would ordinarily not be interrogated until a return to the display loop. The actual key depression saves the state of the system counter, which is also the key code, in the key code buffer 66 (see FIG. 6) and also sets status bit 0. Execution of the KEYBOARD ENTRY instruction routes the key code (six bits) in the key code buffer 66 onto the $I_a$ line and into ROM address register 68 at bit times $b_{19}$–$b_{26}$. The most significant two bits $b_{25}$ and $b_{26}$ are set to zero so that a KEYBOARD ENTRY instruction always jumps to one of the first 64 states.

Then a loop is used as a time delay to wait out any key bounce. In DIS4, status bit 8 (S8) is checked. The first time through the algorithm it must be 1 since it was set in DIS1 to indicate that the key has been processed. In state DIS5 the display is turned on. Actually, the display is toggled since it must previously have been off. There is no separate instruction for turning on the display. At this time the answer appears to the user. In DIS6, status bit 0 (S0) is checked to see if a key is down. If not (i.e., S0=0), the previous key has been released and status bit 8 (S8) is reset to 0 (DIS7). The machine is now ready to accept a new key since the previous key has been processed and released. The algorithm cycles through DIS6 and DIS7 waiting for a new key. This is the basic wait cycle of the calculator. If S0 = 1 in DIS6, the key which is down may be the old key (i.e., the one just processed) or a new key. This can be determined upon return to DIS4 where status bit 8 (S8) is checked. If a new key is down (S8=0), execution jumps to DIS8, the display is blanked, and a jump out is made to service the key. A listing of the algorithm is given in the table below.

TABLE OF WAIT LOOP ALGORITHM

| LABEL | OPERATION | COMMENT |
|---|---|---|
| DIS1: | 1 → S8 | SET STATUS 8 |
| DIS2: | 0 → S0 | RESET STATUS 0 |
| DIS3: | P-1 → P | DECREMENT POINTER, |
| | IF P # 12 | 48 WORD LOOP (3 × 16) |
| | THEN GO TO DIS3 | TO WAIT OUT KEY BOUNCE |
| | DISPLAY OFF | |
| DIS4: | IF S8 # 1 | IF KEY NOT PROCESSED, |
| | THEN GO TO DIS8: | LEAVE ROUTINE |
| DIS5: | DISPLAY TOGGLE | TURN ON DISPLAY |
| DIS6: | IF S0 # 1 | IF KEY UP, RESET |
| | THEN GO TO DIS7: | S8 AND WAIT |
| | GO TO DIS2: | KEY DOWN, CHECK IF SAME KEY |
| DIS7: | 0 → S8 | INDICATE KEY NOT PROCESSED |
| | GO TO DIS6: | BACK TO WAIT FOR KEY |
| DIS8: | | BLANK DISPLAY |
| DIS9: | KEYS → ROM ADDRESS | JUMP TO START OF PROGRAM TO PROCESS KEY THAT WAS DOWN |
| | ↓ | |
| | CONTINUE | |

Two algorithms will now be discussed to further illustrate the instruction set. The first of these algorithms is a display wait loop which is employed after a key has been processed and while waiting for another key to be actuated. The second of these algorithms is a floating point multiply operation.

A flow diagram of the display wait loop is shown in FIG. 43. This loop is entered after a keystroke has been processed, register A has been properly loaded with the number to be displayed, and register B contains the display mask as discussed above. Two flags or status bits are required. Status bit 0 (S0) is hardwired in control and timing circuit 30 to be automatically set whenever a key is down. Status bit 8 (S8) is used in this program to denote the fact that the key which is presently down has already been processed since a routine may be finished before the key is released. In states DIS1 and DIS2, these two status bits are initialized.

The floating point multiply algorithm multiplies $x$ times $y$, where register C contains $x$ in scientific notation and register D contains $y$. When the multiply key is depressed the wait loop algorithm will jump to a ROM address corresponding to the first step of the multiply algorithm because of the way the instruction KEYS → ROM ADDRESS (state DIS9 in FIG. 43) is executed. The key code actually becomes the next ROM address. At this time the contents of registers A–D are indicated by the following:

Register A contains the floating point form of $x$
Register B contains the display mask for $x$
Register C contains the scientific form of $x$
Register D contains the scientific form of $y$ The algorithm for executing floating multiply is given in the table below. The letters in parentheses indicate word select options as follows:

| | |
|---|---|
| P = POINTER POSITION | M = MANTISSA FIELD WITHOUT SIGN |
| WP = UP TO POINTER POSITION | MS = MANTISSA WITH SIGN |
| X = EXPONENT FIELD | W = ENTIRE WORD |
| XS = EXPONENT SIGN | S = MANTISSA SIGN ONLY |

TABLE OF FLOATING POINT MULTIPLY ALGORITHM

| LABEL | OPERATION | COMMENT |
|---|---|---|
| MPY1: | STACK → A | TRANSFER y TO A. DROP STACK. |
| MPY2: | A+C → C(X) | ADD EXPONENTS TO FORM EXPONENT OF ANSWER. |
| | A+C → C(S) | ADD SIGNS TO FORM SIGN |
| | IF NO CARRY GO TO MPY3 | OF ANSWER |
| | 0 → C(S) | CORRECT SIGN IF BOTH NEGATIVE. |
| MPY3: | 0 → B (W) | CLEAR B, THEN TRANSFER |
| | A → B (M) | MANTISSA OF y. |
| | 0 → A(W) | PREPARE A TO ACCUMULATE PRODUCT. |
| | 2 → P | SET POINTER TO LSD (LEAST SIGNIFICANT DIGIT) MULTIPLIER (MINUS 1). |
| MPY4: | P+1 → P | INCREMENT TO NEXT DIGIT. |
| MPY5: | A+B → A(W) | ADD MULTIPLIER MANTISSA TO PARTIAL |
| | C−1 → C(P) | PRODUCT C(P) TIMES. WHEN C(P)=0, |
| | IF NO CARRY GO TO MPY5 | STOP AND GO TO NEXT DIGIT. |
| | SHIFT RIGHT A(W) | SHIFT PARTIAL PRODUCT RIGHT. |
| | IF P # 12 | CHECK IF MULTIPLY IS COMPLETE |
| | THEN GO TO MPY4 | (IS POINTER AT MSD). |
| | IF A (P) > 1 | CHECK IF MSD = 0. IF SO MUST |
| | THEN GO TO MPY6 | SHIFT LEFT AND CORRECT EXPONENT. |
| | SHIFT LEFT A(M) | MULTIPLY BY 10 AND DECREMENT EXPONENT. |
| | C−1 → C(X) | |
| MPY6: | C+1 → C(X) | ALWAYS DO THIS TO CORRECT FOR FACTOR OF 10 TOO SMALL. |
| | A → B(XS) | DUPLICATE EXTRA PRODUCT DIGITS |
| | A+B → A (XS) | ADD 11th DIGITS. |
| | IF NO CARRY GO TO MPY7 | IF SUM LESS THAN 10, THEN DONE. |
| | A+1 → A(M) | IF SUM MORE THAN 10, ADD 1. |
| | IF NO CARRY GO TO MPY7 | IF ANSWER WAS NOT ALL 9s, THEN DONE. |
| | A+1 → A(P) | IF ANSWER WAS ALL 9s ADD 1 |
| | C+1 → C(X) | AND INCREMENT EXPONENT. |
| MPY7: | A EXCHANGE C(M) | GET ANSWER MANTISSA INTO C. |
| | GO TO MASK 1 | GO TO ROUTINE TO POSITION THE ANSWER IN A AND MAKE THE PROPER MASK IN B. |

INSTRUCTION SET 2

Whereas the instructions contained within instruction set 1 are those executed by the arithmetic and register circuit, control and timing circuit, read-only memory circuits, and data storage circuit, instruction set 2 comprises those instructions executed by the input/output (I/O) circuit.

In some instances the same bit pattern may be representative of an instruction within instruction set 1 as well as an instruction within instruction set 2. This situation requires that the various calculator circuits be made aware of the instruction set under which an instruction is given. In view of this requirement, an IS1 or IS2 mode instruction is issued to designate that instructions which follow are to be taken from either instruction set 1 or instruction set 2, respectively. Following the execution of an IS2 instruction, the arithmetic and register circuit and the control and timing circuit are inhibited from responding to subsequent instructions, since they will be instruction set 2 types.

The instructions comprising instruction set 2 are described in the following table, with bit patterns shown in ascending order of significance from right to left.

TABLE OF INSTRUCTIONS (INSTRUCTON SET 2)

| MNEMONIC | BIT PATTERN | DESCRIPTION |
|---|---|---|
| ISL | 1001000000 | ENABLE INSTRUCTION SET 1 |
| IS2 | 0101000000 | ENABLE INSTRUCTION SET 2 |
| TTC | 0111111000 | T-REGISTER → C-REGISTER |
| CTT | 0111110000 | C-REGISTER → T-REGISTER |
| XOR | 0010001000 | T-REGISTER EXCLUSIVE OR C-REGISTER → T-REGISTER |
| IOR | 0011001000 | T-REGISTER INCLUSIVE OR C-REGISTER → T-REGISTER |
| AND | 0010101000 | T-REGISTER LOGICAL AND C-REGISTER → T-REGISTER |
| ADD | 0001101000 | T-REGISTER LOGICAL AND C-REGISTER → T-REGISTER |
| SLT | 0100001000 | SHIFT T-REGISTER LEFT ONE BIT |
| SRT | 0101001000 | SHIFT T-REGISTER RIGHT ONE BIT |
| TINC | 1100001000 | INCREMENT T-REGISTER BY ONE |
| TDEC | 1101001000 | DECREMENT T-REGISTER BY ONE |
| YBC | 1110001000 | INTERROGATE BINARY CARRY |
| EERA | 0001010000 | EXTERNAL ENTRY TO ROM A |
| IXT | 0100101000 | I/O REGISTER←→T-REGISTER |
| CCS | 1111110000 | COMPARE C-REGISTER WITH SECTOR COUNTER |
| TCS | 1101110000 | COMPARE T-REGISTER WITH SECTOR COUNTER |
| PRE | 0101110000 | PRINTER ENABLE |
| ADV | 0011110000 | ADVANCE PAPER |
| RED | 0001110000 | PREPARE FOR RED PRINT |
| TTP | 1000000000 | LOAD T-REGISTER INTO PROGRAM COUNTER |
| PTT | 1000101000 | LOAD PROGRAM COUNTER INTO T-REGISTER |
| PINC | 0111000000 | INCREMENT PROGRAM COUNTER BY ONE |

-continued

TABLE OF INSTRUCTIONS (INSTRUCTON SET 2)

| MNEMONIC | BIT PATTERN | DESCRIPTION |
|---|---|---|
| PDEC | 1001001000 | DECREMENT PROGRAM COUNTER BY ONE |
| RMGRA | 0000100000 | SELECT ROM GROUP A |
| RMGRB | 0010100000 | SELECT ROM GROUP B |
| RMGRC | 0100100000 | SELECT ROM GROUP C |
| YADP | 0110100000 | INTERROGATE AUTO DECIMAL POINT SWITCH |
| READ | 1000100000 | READ PROGRAM MEMORY |
| SBL | 1010100000 | SET BUSY LIGHT |
| YFKB | 1100100000 | INTERROGATE FUNCTION BLOCK KEYBOARD FLAG |
| YPOC | 1110100000 | INTERROGATE PRINT-ON COMMAND FLAG |
| YINTF | 0000100000 | INTERROGATE FLAG |
| WRITE | 0010100000 | WRITE PROGRAM INSTRUCTION |
| RBL | 0100100000 | RESET BUSY LIGHT |
| GIOE | 0110100000 | GENERAL I/O ENABLE |
| ELON | 1010100000 | ERROR LIGHT ON |
| TG9 | 1100100000 | GENERAL I/O INSTRUCTION 1 |
| TG8 | 1110100000 | GENERAL I/O INSTRUCTION 2 |

SYSTEM MICROPROGRAMMING

Figure 42:
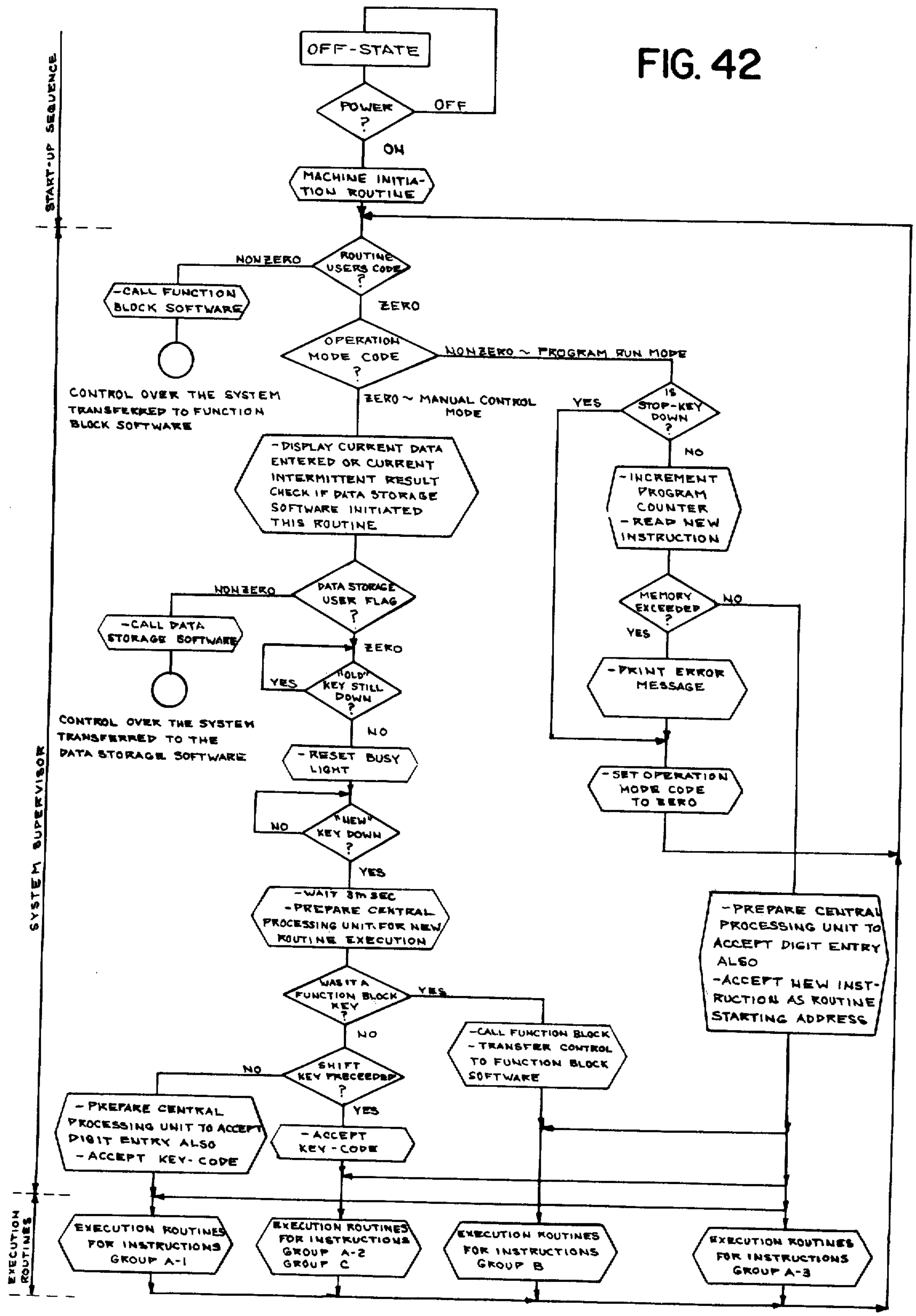
FIG. 42 is a flow chart of the overall microprograming system employed with the calculator of FIG. 1.

Referring to FIG. 42, there is shown a flow chart of the overall calculator microprogramming. A detailed listing of the routines shown in this diagram is given later in this specification. The start-up sequence begins by placing the calculator power switch in the "on" position. This forces the control and timing circuit to enable ROM group A and to activate address 000 on ROM A-$\phi$. The instruction located at this address commences execution of the machine initiation routine. The purposes of this routine are to clear all working registers, clear the status bits register, place the calculator in the manual control mode, set the numeric output format to fixed point with two decimal places, call the initiation routines associated with peripheral I/O units, and indicate the status of the calculator system by printing CLEAR on the output printer unit.

Upon completion of the machine initiation routine, control is passed to the system supervisor routines. The first tests are routine user code and operation mode code. A nonzero routine code causes control of the system to be transferred to the keyboard function block routines issuing ROM group B call instructions. If the result of the user code test is zero, the operation mode test is activated. A zero result indicates manual control mode, whereas a nonzero result indicates the program run mode.

In the manual control mode, the contents of the C-register in the arithmetic and register circuit are formatted for numeric output, the appropriate display mask is built, and the display is switched on. A nonzero data storage user flag results in control being transferred to the data storage routines. If this flag test is zero, control remains in the main system. If the key previously depressed is in the down position, the calculator system remains in a wait loop until that key is released. Releasing a key at this point indicates completion of the previous execution routine and forces the calculator into an idle loop, waiting for a new key to be depressed.

When a new key is depressed, a special flag is set in the status bit register which causes the calculator to exit the wait loop. After approximately 3 milliseconds of delay the central processor is prepared for execution of a new routine by resetting some pointer flags and by properly allocating data to various registers. The short time delay is used to eliminate any problems associated with bouncing keyboard switch contacts. If the currently depressed key is associated with a keyboard function block, control is transferred to the function block routines. If the currently depressed key is preceded by the SHIFT key, control is then transferred to ROM A-6 where execution routines for instructions from ROM A-2 and ROM group C have their beginning points. Otherwise, the central processor is prepared to accept a digit entry by resetting the A-register. Execution routines contained in ROM A-1 are now called.

In the program run mode, a test is first made to determine if the STOP key has been depressed. If it has, the proper flags are changed to indicate a mode change from program run to manual control, after which control is transferred to the system supervisor starting point. If the STOP key has not been depressed, the program counter is incremented, and a new instruction is read from program memory. If the program memory has not been exceeded, the central processor is prepared to accept a digit entry and to accept a new instruction as the starting address for a routine. In the event memory capacity is exceeded during an increment step, an error routine is called which results in an error message being printed. At the same time, the calculator is returned to manual control and microprogramming control is transferred to the beginning point of the system supervisor.

Figure 48:
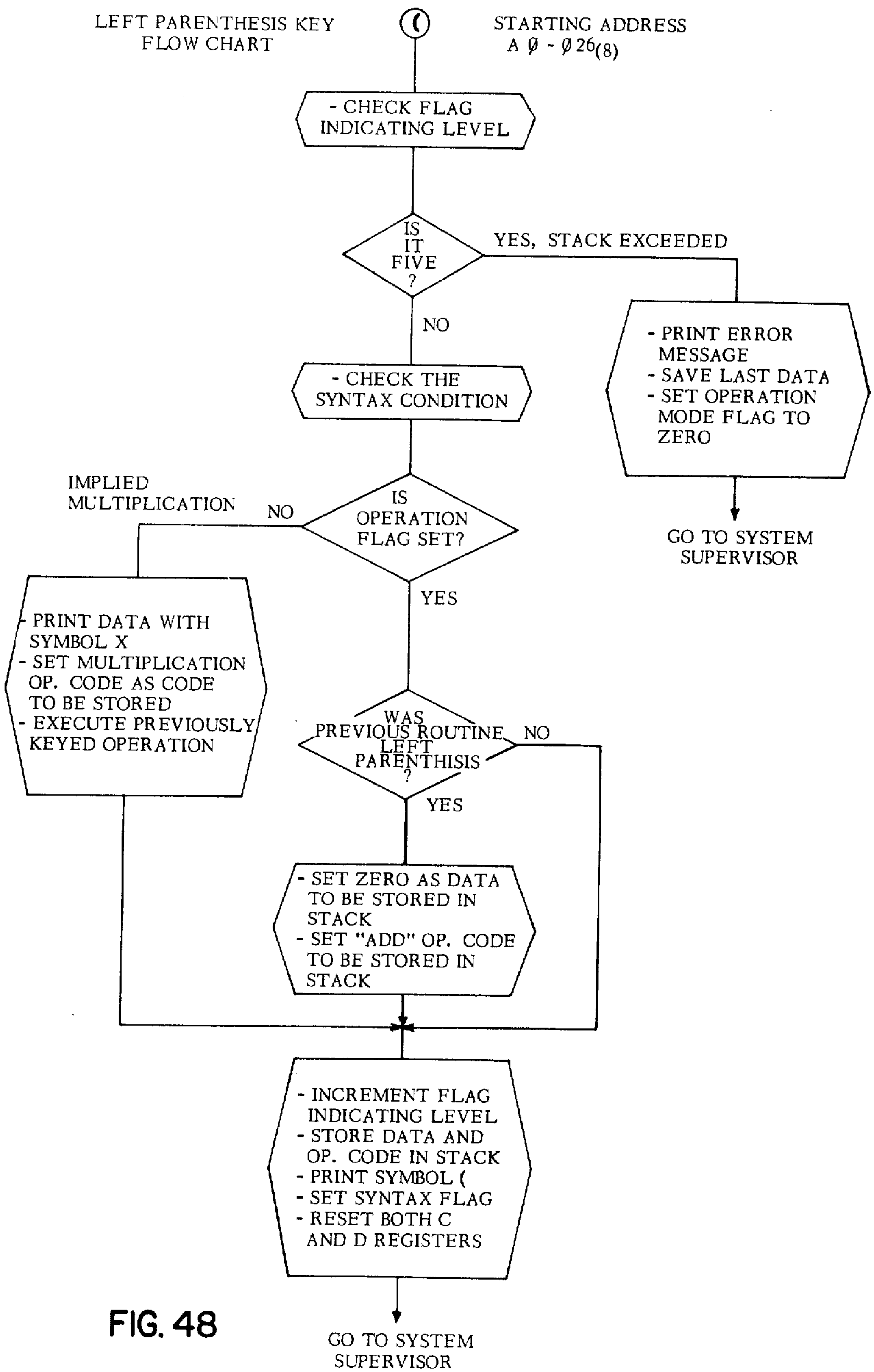
FIG. 48 is a flow chart showing the microprograming steps involved in an open parenthesis routine employed in the calculator.

Each execution routine is associated with a particular instruction from the machine language. All of these routines are described in detail below in that portion of the instruction listings which deals with ROM A-$\phi$ through A-7. The routine associated with the left parenthesis key is shown in flow chart form at FIG. 48.

DETAILED LISTING OF ROUTINES AND SUBROUTINES OF INSTRUCTIONS

A complete listing of all of the routines and subroutines of instructions employed by the calculator and of all of the constants employed by these routines and subroutines is given below. The listing includes all routines and subroutines employed by the calculator as basically and optionally configured. All of these routines, subroutines, and constants are stored in the individual ROM circuits within each ROM group, as indicated at the top of the first page associated with each ROM group. Each line of listing associated with each ROM circuit is separately numbered in the first column from the left-hand side of each page. This facilitates reference to different parts of the listing. Each address within each of the ROM circuits is represented in octal form by four digits in the second column from the left-hand side of each page. Branching addresses are represented in octal form by four digits in the fourth column from the left-hand side of each page. The bit pattern of each instruction or constant is represented as ten bits in the fourth column from the left-hand side of each page. Labels associated with particular ones of the instructions are located in the fifth column from the left-hand side of each page. A mnemonic representation for each of the instructions is shown in the sixth column from the left-hand side of each page. Labels associated with the branch instructions are represented in the seventh column from the left-hand side of each page. Explanatory comments are given in the remaining portion of each page.

MAIN UNIT LISTING (ROM A-0)

```
CURR  BRAN   OPERATION CODE
ADDR  ADDR   BIT PATTERN

0000         0 000 110 100  LPWO1   CLS              CLEAR ALL STATUS BITS
0001  0114   0 100 110 101          JSB     LPWO2    GO TO I/O SOFTWARE PWON
0002         1 110 101 000  LPWO3   CLR              CLEAR ALL REGISTERS
0003         0 010 100 000          RMGRB            CALL I.BLK SOFTWARE FOR REDEFINITION
0004         1 101 001 100          PT13             PREPARE OP FLAG LOAD
0005  0210   0 000 100 011          BRN     LPOW4    SET IT TO 2
0006         0 000 101 000  LSRT2   DSTO             SWITCH THE DISPLAY ON
0007         1 010 101 000          MTC              PREPARE INTERNAL FLAG VECTOR
0010         0 010 011 000  LPOW4   LDC2             LOAD OP FLAG OR NONZERO OPMODE FLAG
0011         0 010 010 000  LRES3   ROM 1
0012  0213   1 000 101 111  LDIV1   BRN     LDIV2    GO TO DIVIDE ROUTINE
0013  0210   1 000 100 011  LMUL1   BRN     LMUL2    GOTO MULTIPLICATION ROUTINE
0014  0163   0 111 010 001  LPOW1   JSB     LPRS1    PREPARE DATA AND BLANK FOR PRINT
0015  0205   1 000 010 111          BRN     LPOW2    BRANCH TO CONTINUE
0016         1 000 101 110  LRIP1   W,BXC            SAVE DATA TEMPORARILY IN B-REG
0017  0031   0 001 100 111          BRN     LRIP2    BRANCH TO CONTINUE
0020  0163   0 111 010 001  LPOL1   JSB     LPRS1    PREPARE DATA AND BLANK FOR PRINT
0021         0 110 010 000          ROM 3
0022         0 101 000 100  LDEC1   SS5              DECIMAL POINT ENTRY, SET D.P. KEY FLAG
0023         1 000 101 110  LDIG0   W,BXC            DIGIT 0 ENTRY, STORE DATA IN B-REG
0024         1 010 101 000          MTC              PREPARE INT. FLG. VECTOR FOR TEST
0025  0071   0 011 100 111          BRN     LDGT1    PREPARE ROM SWITCH
0026         0 110 010 000  LPAR1   ROM 3
0027  0176   0 111 111 101  LRESC   JSB     LPRT0    JUMP TO FORCED PRINT ROUTINE
0030         0 010 010 000          ROM 1            SWITCH TO ROM 1 AGAIN
0031         0 100 010 000  LRIP2   ROM 2            SWITCH TO ROM2
0032         1 111 101 010  LDIG3   X,AP1A           DIGIT 3 ENTRY
0033         1 111 101 010  LDIG2   X,AP1A           DIGIT 2 ENTRY
0034         1 111 101 010  LDIG1   X,AP1A           DIGIT 1 ENTRY
0035  0023   0 001 001 111          BRN     LDIG0    GO TO DIGIT0 ENTRY
0036  0146   0 110 011 011  LPER1   BRN     LPERA    PERCENT ROUTINE BEGINNING POINT
0037         0 110 010 000  LPERY   ROM 3
0040  0163   0 111 010 001  LADD1   JSB     LPRS1    PREPARE DATA AND BLANK FOR PRINT
0041  0202   1 000 001 011          BRN     LADD2    BRANCH TO CONTINUE
0042         1 111 101 010  LDIG6   X,AP1A           DIGIT 6 ENTRY
0043         1 111 101 010  LDIG5   X,AP1A           DIGIT 5 ENTRY
0044         1 111 101 010  LDIG4   X,AP1A           DIGIT 4 ENTRY
0045  0032   0 001 101 011          BRN     LDIG3    GO TO DIGIT 3 ENTRY
0046  0061   0 011 000 111  LRTX1   BRN     LXTM10   RECALL, GO TO COMMON PART WITH STORE
0047         0 010 100 000  LFBLK1  RMGRB            SWITCH TO ROM GROUP 3
0050  0163   0 111 010 001  LSUB1   JSB     LPRS1    PREPARE DATA AND BLANK FOR PRINT
0051  0344   1 110 010 011          BRN     LSUB2    BRANCH TO CONTINUE
0052         1 111 101 010  LDIG9   X,AP1A           DIGIT 9 ENTRY
0053         1 111 101 010  LDIG8   X,AP1A           DIGIT 8 ENTRY
0054         1 111 101 010  LDIG7   X,AP1A           DIGIT 7 ENTRY
0055  0042   0 010 001 011          BRN     LDIG6    GO TO DIGIT 6 ENTRY
0056  0163   0 111 010 001  LXTM1   JSB     LPRS1    PREPARE DATA NAD BLANK FOR RPINT
0057  0173   0 111 110 001          JSB     LPRT3    PREPARE SYMBOL AND PRINT
0060         1 001 000 100          SS9              SET "STORE" ROUTINE FLAG
0061         0 100 010 000  LXTM10  ROM 2
0062  0271   1 011 100 111  LCONT1  BRN     LCONT2
0063  0321   1 101 000 111  LENTR   BRN     LSLE1    LAST ENTRY KEYCODE ACCEPTED
0064  0355   1 110 111 001  LSRT1   JSB     LKYUP1   WAIT FOR KEY RELEASE
0065  0006   0 000 011 011          BRN     LSRT2
0066  0260   1 011 000 011  LCEN1   BRN     LCEN2
0067         0 010 010 000  LRND2   ROM 1            SWITCH TO ROM 1
0070         1 100 010 000  LSHFT1  ROM 6
0071         0 010 010 000  LDGT1   ROM 1            SWITCH TO ROM 1
0072  0067   0 011 011 111  LRND1   BRN     LRND2    ROUND KEY ROUTINE BEGINNING
0073         0 100 000 100  LRES1   SS4              SET AUX FLAG TO INDICATE RESET ROUTINE
0074         1 011 001 100  LRES2   PT11             SET POINTER TO AVOID OP.MODE CHANGE
0075  0162   0 111 001 011          BRN     LRESB
0076  0222   1 001 001 101  LPRX1   JSB     LPRX2      STORE RETURN VECTOR
0077  0165   0 111 011 001          JSB     LPRT9      AFTER RETURN LOAD SYMBOL # AND PRINT
0100         0 010 010 000          ROM 1            GO TO ROUTINE EXIT
0101         1 010 101 000  LSUP10  MTC              PREPARE INT. FLG. VECTOR
0102         1 110 101 110          W,AXC            RESTORE DATA IN C-REG
0103         0 111 001 100          PT7              PREPARE ROUTINE USER CODE TEST
0104         1 101 100 010          P,AM1A           IS IT ZERO?
0105  0047   0 010 011 111          BRN     LFBLK1   NO: GO TO FUNCTION BLOCK
0106  0111   0 100 100 111          BRN     LSUP2    YES: STAY IN MAIN UNIT
0107         0 110 001 110  LSUP1   W,CTA
0110  0101   0 100 000 111          BRN     LSUP10
0111         1 100 001 100  LSUP2   PT12             PREPARE OP. MODE TEST
0112         1 101 100 010          P,AM1A           IS IT ZERO?
0113  0261   1 011 000 111          BRN     LRUN1    NO: GO TO PROGRAM RUN DIRECTOR
0114  0147   0 110 011 111          BRN     LMAN1    YES: GO TO MANUAL CONTROL DIRECTOR
0115         0 101 000 000  LPWO2   IS2
0116  0037   0 010 000 001          LIO     100      LOAD CHANNEL 1 SELECT CODE
0117         0 110 100 000          GIOE             I/O CHANNEL CALL
0120         0 101 000 000          IS2
0121  0077   0 100 000 001          LIO     200      LOAD CHANNEL 2 SELECT CODE
0122         0 110 100 000          GIOE             I/O CHANNEL CALL
0123         0 101 000 000          IS2
0124  0177   1 000 000 001          LIO     400      LOAD CHANNEL 3 SELECT CODE
0125         0 110 100 000          GIOE             I/O CHANNEL CALL
0126         1 001 000 000          IS1
0127  0141   0 110 000 111          BRN     LPWO8
0130  0367   1 111 011 111  LPOLF   BRN     LPOLG
0131         1 100 010 000  LPCHS   ROM 6            CHANGE SIGN ROUT.BEGINNING
0132         1 000 101 110  LRIP8   W,BXC            SAVE DATA TEMPORARILY IN B-REG
0133         0 110 010 000          ROM 3
```

MAIN UNIT LISTING (ROM A-0)—Continued

| CURR ADDR | BRAN ADDR | OPERATION CODE BIT PATTERN | | | | |
|---|---|---|---|---|---|---|
| 0134 | | 0 101 000 000 | LPAGE | IS2 | | CALL NEXT PAGE ROUTINE BEGINNING |
| 0135 | 0027 | 0 000 100 001 | | LIO | 020 | SET PROPER SELECT CODE |
| 0136 | | 0 110 100 000 | | GIOE | | ACTIVATE PAGING HARDWARE |
| 0137 | | 1 001 000 000 | | IS1 | | |
| 0140 | 0107 | 0 100 011 111 | | BRN | LSUP1 | |
| 0141 | | 1 011 010 100 | LPWOA | YS11 | | IS I/O FLAG SET ? |
| 0142 | 0202 | 0 000 001 011 | | BRN | LPWO3 | NO,CONTINUE IN PWON ROUTINE |
| 0143 | 0273 | 1 011 101 111 | | BRN | LTRA1 | I/O DEVICE NOT FOUND,GO TO ERROR ROUTINE |
| 0144 | 0163 | 0 111 010 001 | LPERZ | JSB | LPRS1 | . |
| 0145 | 0037 | 0 001 111 111 | | BRN | LPERY | |
| 0146 | | 0 100 010 000 | LPERA | ROM 2 | | |
| 0147 | | 0 100 010 000 | LPAN1 | ROM 2 | | SWITCH TO ROM 2 |
| 0150 | 0152 | 0 110 101 011 | LJMPB | BRN | LJMPR | JUMP RELATIVE BACKWARD |
| 0151 | | 0 100 010 000 | LSCOT | ROM 2 | | ALLOWS TO REACH BEHIND DSP. ROUTINE FROM OUTSIDE |
| 0152 | | 0 100 000 100 | LJMPF | SS4 | | JUMP RELATIVE FORWARD |
| 0153 | 0227 | 1 001 011 111 | | BRN | LJMP1 | |
| 0154 | | 0 111 101 010 | LCOD5 | X,CP1C | | START TO GENERATE 5 FOR SECOND OP. CODE DIGIT |
| 0155 | | 0 111 101 010 | LCOD4 | X,CP1C | | START TO GENERATE 4 FOR SECOND OP. CODE DIGIT |
| 0156 | | 0 111 101 010 | LCOD3 | X,CP1C | | START TO GENERATE 3 FOR SECOND OP. CODE DIGIT |
| 0157 | | 0 111 101 010 | LCOD2 | X,CP1C | | START TO GENERATE 2 FOR SECODE OP. CODE DIGIT |
| 0160 | | 0 111 101 010 | LCOD1 | X,CP1C | | START GENERATE 1 FOR SECOND OP. CODE DIGIT |
| 0161 | | 1 000 010 000 | LCOD0 | ROM 4 | | USE ZERO FOR SECOND OP. CODE DIGIT |
| 0162 | | 1 010 101 000 | LRESA | MTC | | GET INT.FLG.VECTOR FOR UPDATE |
| 0163 | 0011 | 0 000 100 111 | | BRN | LRES3 | |
| 0164 | | 1 110 010 000 | LPRS1 | ROM 7 | | ROUTINE BEGINNING FOR OUTPUT"BLANK" |
| 0165 | | 0 000 110 000 | LPRSB | RETURN | | END OF THE SUBROUTINE (ORIG.DATA IS IS A-REG) |
| 0166 | | 0 111 100 010 | LPRT9 | P,CP1C | | LOAD PRINT CODE FOR SYMBOL # |
| 0167 | | 0 111 100 010 | LPRT8 | P,CP1C | | LOAD PRINT CODE FOR SYMBOL |
| 0170 | | 0 111 100 010 | LPRT7 | P,CP1C | | LOAD PRINT CODE FOR SYMBOL |
| 0171 | | 0 111 100 010 | LPRT6 | P,CP1C | | LOAD PRINT CODE FOR SYMBOL |
| 0172 | | 0 111 100 010 | LPRT5 | P,CP1C | | LOAD PRINT CODE FOR SYMBOL |
| 0173 | | 0 111 100 010 | LPRT4 | P,CP1C | | LOAD PRINT CODE FOR SYMBOL < |
| 0174 | | 0 111 100 010 | LPRT3 | P,CP1C | | LOAD PRINT CODE FOR SYMBOL > |
| 0175 | | 0 111 100 010 | LPRT2 | P,CP1C | | LOAD PRINT CODE FOR SYMBOL = |
| 0176 | | 0 111 100 010 | LPRT1 | P,CP1C | | LOAD PRINT CODE FOR SYMBOL X |
| 0177 | | 1 110 010 000 | LPRT0 | ROM 7 | | LOAD PRINT CODE FOR SYMBOL + |
| 0200 | | 1 000 010 000 | LINTE2 | ROM 4 | | |
| 0201 | | 1 000 010 000 | LYLE2 | ROM 4 | | |
| 0202 | 0176 | 0 111 111 101 | LADD2 | JSB | LPRT0 | PREPARE SYMBOL + AND PRINT |
| 0203 | 0160 | 0 111 000 011 | | BRN | LCOD1 | GO TO LOAD SECOND OP. CODE DIGIT |
| 0204 | 0144 | 0 110 010 011 | | BRN | LPERZ | |
| 0205 | 0171 | 0 111 101 001 | LPOW2 | JSB | LPRT5 | PREPARE SYMBOL AND PRINT |
| 0206 | 0154 | 0 110 110 011 | | BRN | LCOD5 | GO TO LOAD SECOND OP. CODE DIGIT |
| 0207 | | 0 110 010 000 | LLABL | ROM 3 | | LABEL HEAD ROUTINE BEGINNING (OEC=87 |
| 0210 | 0163 | 0 111 010 001 | LMUL2 | JSB | LPRS1 | PREPARE DATA AND BLANK FOR PRINT |
| 0211 | 0175 | 0 111 111 001 | | JSB | LPRT1 | PREPARE SYMBOL X AND PRINT |
| 0212 | 0156 | 0 110 111 011 | | BRN | LCOD3 | GO TO LOAD SECOND OP. CODE DIGIT |
| 0213 | 0163 | 0 111 010 001 | LDIV2 | JSB | LPRS1 | PREPARE DATA AND BLANK FOR PRINT |
| 0214 | 0170 | 0 111 100 101 | | JSB | LPRT6 | PREPARE SYMBOL AND PRINT |
| 0215 | 0155 | 0 110 110 111 | | BRN | LCOD4 | GO TO LOAD SECOND OP. CODE DIGIT |
| 0216 | 0176 | 0 111 111 101 | LPERB | JSB | LPRT0 | GO TO PRINT SUBROUTINE |
| 0217 | | 0 110 010 000 | LPERO | ROM 3 | | |
| 0220 | | 1 010 100 000 | LPRTZ | SBL | | SET BUSY LIGHT . |
| 0221 | | 0 000 110 000 | LPRTB | RETURN | | END OF THE SUBROUTINE |
| 0222 | 0132 | 0 101 101 011 | LRIPC | BRN | LRIPB | |
| 0223 | | 1 110 010 000 | LPRX2 | ROM 7 | | SWITCH TO ROM7 PRINT SUBROUTINES |
| 0224 | | 1 001 000 100 | LJSAC | SS9 | | JUMP TO SUBROUTINE: LABEL IN C-REG |
| 0225 | | 1 000 000 100 | LJSAP | SS8 | | JUMP TO SUBROUTINE: LABEL IN PROGRAM |
| 0226 | | 0 001 000 100 | LJSBA | SS1 | | JUMP TO SUBROUTINE: GIVEN BY ADDRESS |
| 0227 | | 0 101 000 100 | LJMP1 | SS5 | | SET COMMON JUMP FLAG |
| 0230 | | 1 100 010 000 | LJMPS | ROM 6 | | COMMON START FOR PROGRAM JUMPS |
| 0231 | 0163 | 0 111 010 001 | LMTXB | JSB | LPRS1 | PREPARE DATA AND BLANK FOR PRINT |
| 0232 | 0172 | 0 111 101 101 | | JSB | LPRT4 | PREPARE SYMBOL AND PRINT |
| 0233 | | 0 010 010 000 | | ROM 1 | | ROUTINE EXIT |
| 0234 | 0176 | 0 111 111 101 | LEOL2 | JSB | LPRT0 | GO TO PRINT |
| 0235 | | 0 110 010 000 | | ROM 3 | | |
| 0236 | | 0 110 010 000 | LGRND | ROM 3 | | GRAND TOTAL ROUTINE BEGINNING |
| 0237 | | 0 010 100 000 | LTABP | RMGRA | | TABLE FUNCTION IN PRGM.RUN MODE |
| 0240 | | 0 010 100 000 | LFBC01 | RMGRA | | F.B. FUNCTION 01 BEGINNING |
| 0241 | | 0 010 100 000 | LFBC02 | RMGRA | | F.B. FUNCTION 02 BEGINNING |
| 0242 | | 0 010 100 000 | LFBC03 | RMGRA | | F.B. FUNCTION 03 BEGINNING |
| 0243 | | 0 010 100 000 | LFBC04 | RMGRA | | F.B. FUNCTION 04 BEGINNING |
| 0244 | | 0 010 100 000 | LFBC05 | RMGRA | | F.B. FUNCTION 05 BEGINNING |
| 0245 | | 0 010 100 000 | LFBC06 | RMGRA | | F.B. FUNCTION 06 BEGINNING |
| 0246 | | 0 010 100 000 | LFBC07 | RMGRA | | F.B. FUNCTION 07 BEGINNING |
| 0247 | | 0 010 100 000 | LFBC08 | RMGRA | | F.B. FUNCTION 08 BEGINNING |
| 0250 | | 0 010 100 000 | LFBC09 | RMGRA | | F.B. FUNCTION 09 BEGINNING |
| 0251 | | 0 010 100 000 | LFBC10 | RMGRA | | F.B. FUNCTION 10 BEGINNING |
| 0252 | | 0 010 100 000 | LFBC11 | RMGRA | | F.B. FUNCTION 11 BEGINNING |
| 0253 | | 0 010 100 000 | LFBC12 | RMGRA | | F.B. FUNCTION 12 BEGINNING |
| 0254 | | 0 010 100 000 | LFBC13 | RMGRA | | F.B. FUNCTION 13 BEGINNING |
| 0255 | | 0 010 100 000 | LFBC14 | RMGRA | | F.B. FUNCTION 14 BEGINNING |
| 0256 | | 0 010 100 000 | LFBC15 | RMGRA | | F.B. FUNCTION 15 BEGINNING |
| 0257 | 0305 | 1 100 010 111 | | BRN | LERRA | F.B.SOFTWARE NOT READY |
| 0260 | | 0 010 010 000 | LCEN2 | ROM 1 | | |
| 0261 | | 0 000 010 100 | LRUN1 | YS0 | | IS ANY KEY DOWN ? |
| 0262 | 0301 | 1 100 000 111 | | BRN | LRUN2 | NO : CONTINUE IN PROGRAM RUN MODE |
| 0263 | | 0 010 101 000 | LSTOP | CXM | | STOP ROUTINE BEGINNING,GET INT.FLG.VECTOR |
| 0264 | | 0 011 000 010 | | P,ZTC | | SET MANUAL CONTROL FLAG |
| 0265 | | 0 010 101 000 | LSTP1 | CXM | | RESTORE DATA,STORE NEW INT.FLG.VECTOR |
| 0266 | 0107 | 0 100 011 111 | | BRN | LSUP1 | GO TO SUPERVISOR |
| 0267 | | 1 100 010 000 | LOOXS | ROM 6 | | 1/X ROUTINE |
| 0270 | | 1 100 010 000 | LEXPS | ROM 6 | | EXP ROUTINE |
| 0271 | 0355 | 1 110 111 001 | LCONT2 | JSB | LKYUP1 | WAIT FOR KEY RELEASE |
| 0272 | | 0 010 010 000 | | ROM 1 | | |
| 0273 | | 1 011 100 100 | LTRA1 | RS11 | | RESET EXTERNAL FLAG |
| 0274 | | 1 110 010 000 | | ROM 7 | | GO TO PRINT MESSAGE |
| 0275 | | 0 001 100 110 | LIFZ1 | M,CM1 | | CHECK VALUE OF MANTISSA |
| 0276 | 0220 | 1 000 000 011 | | BRN | LINTE2 | NONZERO: CONDITION NOT MET |
| 0277 | 0314 | 1 100 110 011 | | BRN | LINTE1 | ZERO: CONDITION MET |
| 0300 | 0355 | 1 110 111 001 | LSTEP | JSB | LKYUP1 | WAIT FOR KEY RELEASE |
| 0301 | | 0 111 000 000 | LRUN2 | PINC | | INCREMENT PRGM.COUNTER AND LOAD ADDR. |
| 0302 | | 1 000 100 000 | | READ | | READ NEW INSTRUCTION |
| 0303 | | 1 011 010 100 | | YS11 | | EXTERNAL FLAG? |
| 0304 | 0307 | 1 100 011 111 | | BRN | LOKY1 | NO, O.K. |
| 0305 | | 1 000 101 110 | LERRA | W,BXC | | YES: TROUBLE: STORE DATA |
| 0306 | 0273 | 1 011 101 111 | | BRN | LTRA1 | |
| 0307 | | 1 011 101 110 | LOKY1 | W,ZTA | | PREPARE A-REG TO ACCEPT DIGIT |
| 0310 | | 0 001 010 000 | | EFRA | | ACCEPT NEW INSTRUCTION |

MAIN UNIT LISTING (ROM A-0) – Continued

| LINE # | CURR ADDR | BRAN ADDR | OPERATION CODE BIT PATTERN | | | | |
|---|---|---|---|---|---|---|---|
| 204 | 0311 | 0263 | 1 011 001 111 | | BRN | LSTOP | |
| 205 | 0312 | | 0 001 111 110 | LIFP1 | S.CM1 | | CHECK SIGN OF MANTISSA |
| 206 | 0313 | 0200 | 1 000 000 011 | | BRN | LINTE2 | NEGATIVE: CONDITION NOT MET |
| 207 | 0314 | | 1 001 000 100 | LINTE1 | SS9 | | POSITIVE: CONDITION MET |
| 208 | 0315 | 0200 | 1 000 000 011 | | BRN | LINTE2 | |
| 209 | 0316 | | 0 110 111 110 | LIFM1 | S.ZMC | | CHECK SIGN OF MANTISSA |
| 210 | 0317 | 0200 | 1 000 000 011 | | BRN | LINTE2 | POSITIVE: CONDITION NOT MET |
| 211 | 0320 | 0314 | 1 100 110 011 | | BRN | LINTE1 | NEGATIVE: CONDITION MET |
| 212 | 0321 | | 1 001 000 100 | LSLE1 | SS9 | | SET LAST ENTRY FLAG ROUTINE BEGINNING |
| 213 | 0322 | 0201 | 1 000 000 111 | LYLE1 | BRN | LYLE2 | INTERROGATE LAST ENTRY FLAG ROUT. BEGINNING |
| 214 | 0323 | 0163 | 0 111 010 001 | LDSPH | JSB | LPRS1 | DATA STORAGE DATA ADJ.ROUTINE |
| 215 | 0324 | | 0 100 100 000 | | RMGRC | | RETURN TO DATA STORAGE SOFTVARE |
| 216 | 0325 | | 0 100 100 000 | LLIST | RMGRC | | LIST DATA |
| 217 | 0326 | | 0 100 100 000 | LCLRR | RMGRC | | CLEAR DATA |
| 218 | 0327 | | 0 100 100 000 | LDSIN | RMGRC | | D.S.INCREMENT |
| 219 | 0330 | | 0 100 100 000 | LDSDE | RMGRC | | D.S.DECREMENT |
| 220 | 0331 | | 0 100 100 000 | LSTOR | RMGRC | | STORE DIRECT BEGINNING |
| 221 | 0332 | | 0 100 100 000 | LSTOA | RMGRC | | ACCUMULATE + BEGINNING |
| 222 | 0333 | | 0 100 100 000 | LSTOM | RMGRC | | ACCUMULATE - BEGINNING |
| 223 | 0334 | | 0 100 100 000 | LSTOT | RMGRC | | ACCUMULATE X BEGINNING |
| 224 | 0335 | | 0 100 100 000 | LSTOD | RMGRC | | ACCUMULATE / BEGINNING |
| 225 | 0336 | | 0 100 100 000 | LRECL | RMGRC | | RECALL DIRECT BEGINNING |
| 226 | 0337 | | 0 100 100 000 | LEXCH | RMGRC | | EXCHANGE DIRECT |
| 227 | 0340 | | 0 100 100 000 | LDECT | RMGRC | | DECREMENT AND TEST IF ZERO |
| 228 | 0341 | 0305 | 1 100 010 111 | | BRN | LERRA | |
| 229 | 0342 | | 0 001 000 100 | LRTRN | SS1 | | RETURN ROUTINE BEGINNING |
| 230 | 0343 | 0230 | 1 001 100 011 | | BRN | LJMPS | |
| 231 | 0344 | 0167 | 0 111 100 001 | LSUB2 | JSB | LPRT7 | PREPARE SYMBOL - AND PRINT |
| 232 | 0345 | 0157 | 0 110 111 111 | | BRN | LCOD2 | GOTO LOAD SECOND OP. CODE DIGIT |
| 233 | 0346 | | 1 001 000 100 | LSETF | SS9 | | SET PROGRAM FLAG # BEGINNING.SET AUX.FLG. |
| 234 | 0347 | | 0 010 101 000 | LIFFL | CXM | | IF PROGRAM FLAG # BEGINNING.GET INT.F.VECT. |
| 235 | 0350 | | 1 011 001 100 | | PT11 | | PREPARE DIGIT INTERPRETATION CODE FLAG |
| 236 | 0351 | | 0 011 011 000 | | LDC3 | | SET IT TO THREE |
| 237 | 0352 | 0265 | 1 011 010 111 | | BRN | LSTP1 | |
| 238 | 0353 | | 1 001 000 100 | LGTLC | SS9 | | GO TO LABEL GIVEN BY C-REG |
| 239 | 0354 | | 1 000 000 100 | LGTLP | SS8 | | GO TO LABEL GIVEN BY PROGRAM |
| 240 | 0355 | 0227 | 1 001 011 111 | LGTAD | BRN | LJMP1 | GO TO ADDRESS GIVEN BY PROGRAM |
| 241 | 0356 | | 0 000 010 100 | LKYUP1 | YS0 | | IS THE KEY STILL DOWN ? |
| 242 | 0357 | 0220 | 1 001 000 011 | | BRN | LPRTZ | NO.GO TO SUBROUTINE END |
| 243 | 0360 | | 0 000 100 100 | | RS0 | | YES. RESET FLAG |
| 244 | 0361 | 0356 | 1 110 111 011 | | BRN | LKYUP1 | STAY IN WAIT-LOOP |
| 245 | 0362 | | 1 100 010 000 | LTWWS | ROM 6 | | X/12 ROUTINE |
| 246 | 0363 | | 0 010 010 000 | LPADV | ROM 1 | | PAPER ADVANCE BEGINNING POINT |
| 247 | 0364 | 0163 | 0 111 010 001 | LFOLA | JSB | LPRS1 | PREPARE DATA AND "BLANK" FOR PRINT |
| 248 | 0365 | | 0 000 111 100 | | PLS | | PREPARE SYMBOL CODE LOAD |
| 249 | 0366 | | 1 011 011 000 | | LDC11 | | R |
| 250 | 0367 | | 1 111 011 000 | LEOLG | LDC15 | | BLANK |
| 251 | 0370 | 0176 | 0 111 111 101 | | JSB | LPRT0 | GO TO PRINT |
| 252 | 0371 | | 0 100 010 000 | | ROM 2 | | SWITCH BACK TO ROM2 |
| 253 | 0372 | | 0 011 010 000 | LRANC | TKRA | | ACCEPT KEYCODE |
| 254 | 0373 | 0162 | 0 111 001 011 | LEND | BRN | LRES8 | PROGRAM END ROUTINE BEGINNING |
| 255 | 0374 | | 1 100 010 000 | LLOGS | ROM 6 | | LOG ROUTINE |
| 256 | 0375 | | 1 100 010 000 | LLNS | ROM 6 | | LN ROUTINE |
| 257 | 0376 | | 1 100 010 000 | LIOPC | ROM 6 | | I/O CALL BEGINNING |
| 258 | 0377 | 0305 | 1 100 010 111 | LMEMT | BRN | LERRA | MEMORY LOCATION NOT FOUND |

MAIN UNIT LISTING (ROM A-1)

| LINE # | CURR ADDR | BRAN ADDR | OPERATION CODE BIT PATTERN | | | | |
|---|---|---|---|---|---|---|---|
| 3 | 0000 | | 0 110 010 100 | LNXT1 | YS6 | | IS DEC. POINT FLAG ALREADY SET? |
| 4 | 0001 | 0206 | 1 000 011 011 | | BRN | LNXT1A | NO |
| 5 | 0002 | | 0 101 010 100 | | YS5 | | YES: IS IT DEC. POINT KEY AGAIN |
| 6 | 0003 | 0137 | 0 101 111 111 | | BRN | LNXT2 | NO |
| 7 | 0004 | | 0 011 001 110 | LNXT4 | W.ZTC | | YES: TROUBLE: SET ZERO FOR NEW DATA |
| 8 | 0005 | | 0 000 110 100 | | CLS | | CLEAR ALL STATUS BITS |
| 9 | 0006 | 0043 | 0 010 001 111 | | BRN | LSUPR | GO TO SUPERVISOR |
| 10 | 0007 | | 1 111 101 010 | LNXT10 | X.APIA | | INCREMENT EXPONENT BY ONE |
| 11 | 0010 | | 0 000 000 000 | | NOP | | TO ELIMINATE POSSIBLE CARRY |
| 12 | 0011 | 0217 | 1 000 111 111 | | BRN | LNXT9 | CONTINUE IN INCREMENT LOOP |
| 13 | 0012 | | 0 011 010 010 | LRESA | WP.ZTC | | RESET REST OF THE C-REG |
| 14 | 0013 | | 0 111 110 000 | | CTT | | STORE NEW INT. FLG VECTOR IN T-REG TEMP |
| 15 | 0014 | 0254 | 1 010 110 101 | | JSB | LPAPA | CALL PAPER ADVANCE SUBROUTINE |
| 16 | 0015 | 0220 | 0 001 000 011 | | BRN | LRES8 | GO TO RESET INTERNAL DATA STORAGE REGS. |
| 17 | 0016 | 0254 | 1 010 110 101 | LPAD1 | JSB | LPAPA | CALL PAPER ADVANCE SUBROUTINE |
| 18 | 0017 | 0106 | 0 100 011 011 | | BRN | LDIGF | GO TO SUPERVISOR |
| 19 | 0020 | | 0 100 010 000 | LRESR | ROM 2 | | TO COMMON ADRESS PART GENERATOR |
| 20 | 0021 | | 1 001 110 000 | LRES3 | ATDS | | CALL INT. D.S.R. |
| 21 | 0022 | | 0 010 101 000 | | CXM | | STORE ADDRESS TEMPORARILY IN M-REG.ZERO IN C |
| 22 | 0023 | | 1 011 110 000 | | DTDS | | CLEAR GIVEN DSR |
| 23 | 0024 | | 0 010 101 000 | | CXM | | RESTORE ADDRESS IN C-REG.ZERO IN M-REG |
| 24 | 0025 | | 0 101 100 010 | | P.CMIC | | DECREMENT CURRENT ADDR. AND CECK IF CARRY |
| 25 | 0026 | 0021 | 0 001 000 111 | | BRN | LRES3 | NO. CONTINUE IN DSR RESET LOOP |
| 26 | 0027 | | 1 110 010 000 | | ROM 7 | | YES. FINISHED. SWITCH TO ROM 7 |
| 27 | 0030 | 0316 | 1 101 111 011 | LFPRA | BRN | LFPR1 | |
| 28 | 0031 | 0244 | 1 010 010 011 | LRESD | BRN | LRESS | CONTINUE |
| 29 | 0032 | | 0 101 000 000 | LRESP | IS2 | | PREPARE P-REG RESET |
| 30 | 0033 | | 1 000 000 000 | | TTP | | ZEROS INTO P-REG |
| 31 | 0034 | | 1 001 001 000 | | PDEC | | ONE'S INTO P-REG AND I/O-REG (LEFT PART) |
| 32 | 0035 | | 0 101 101 000 | | SR1 | | ONE'S INTO I/O-REG DATA PART |
| 33 | 0036 | | 1 001 000 000 | | IS1 | | END |
| 34 | 0037 | | 0 000 110 100 | LRSHR | CLS | | CLEAR ALL STATUS BITS |
| 35 | 0040 | | 0 011 000 100 | | SS3 | | SET OP-FLAG |
| 36 | 0041 | 0043 | 0 010 001 111 | | BRN | LSUPR | GO TO SET FIRST ENTRY DIGIT FLAG |
| 37 | 0042 | | 0 000 110 100 | LSUPA | CLS | | CLEAR ALL STATUS BITS |
| 38 | 0043 | | 0 111 000 100 | LSUPR | SS7 | | SET FIRST ENTRY DIGIT FLAG |
| 39 | 0044 | 0106 | 0 100 011 011 | | BRN | LDIGF | |
| 40 | 0045 | | 1 001 100 100 | LFIN2 | RS9 | | RESET FLAG IF SET |
| 41 | 0046 | | 1 000 100 100 | | RS8 | | RESET FLAG IF SET |
| 42 | 0047 | | 0 110 100 100 | | RS6 | | RESET FLAG IF SET |
| 43 | 0050 | | 0 101 100 100 | | RS5 | | RESET FLAG IF SET |
| 44 | 0051 | | 0 100 100 100 | | RS4 | | RESET FLAG IF SET |
| 45 | 0052 | | 0 001 100 100 | | RS1 | | RESET FLAG IF SET |

MAIN UNIT LISTING (ROM A-1) – Continued

| CURR ADDR | BRAN ADDR | OPERATION CODE BIT PATTERN | | | | |
|---|---|---|---|---|---|---|
| 0053 | 0043 | 0 010 001 111 | | BRN | LSUPB | GO TO SUPERVISOR |
| 0054 | | 0 101 100 010 | LDGT2 | P.CMIC | | IS IT "ONE" |
| 0055 | 0251 | 1 010 100 111 | | BRN | LDGT3 | NO: CONTINUE IN THE TEST |
| 0056 | | 0 000 011 000 | | LDC0 | | YES: RESET DIGIT INTERPRET CODE TO ZERO |
| 0057 | | 0 000 001 100 | | PT0 | | PREPARE DIGIT ALIGNMENT SHIFT COUNTER |
| 0060 | 0157 | 0 111 000 001 | | JSB | LSHFT | |
| 0061 | | 0 101 010 100 | | YS5 | | WAS DEC. POINT KEY DOWN? |
| 0062 | 0313 | 1 100 101 111 | | BRN | LRND5 | NO. IT WAS DIGIT KEY |
| 0063 | | 1 001 011 000 | | LDC9 | | YES. SET SCI. NOT. FORMAT DPL. FLAG |
| 0064 | 0322 | 1 101 001 011 | | BRN | LRND6 | |
| 0065 | | 0 111 111 010 | LCOU1 | XS.CP1C | | INCREMENT COUNTER |
| 0066 | | 0 111 110 000 | | CTT | | RESTORE COUNT TO T REG |
| 0067 | | 0 000 110 000 | | RETURN | | |
| 0070 | | 0 010 101 000 | LRNDA | CXM | | FETCH INT. FLG. VECTOR FOR UPDATE |
| 0071 | 0202 | 1 000 001 011 | | BRN | LRND3 | CONTINUE IN ROUND() ROUTINE |
| 0072 | | 1 011 001 100 | LDGTA | PT11 | | PREPARE DIGIT INTERPRETATION CODE FOR TEST |
| 0073 | | 0 101 100 010 | | P.CMIC | | IS IT ZERO? |
| 0074 | 0054 | 0 010 110 011 | | BRN | LDGT2 | NO. CONTINUE IN THE TEST |
| 0075 | | 0 010 001 110 | | W.BTC | | YES:IT IS DATA ENTRY:RESTORE DATA IN C-REG |
| 0076 | | 0 011 100 100 | | RS3 | | RESET OP. FLAG |
| 0077 | | 0 010 100 100 | LFSTT | RS2 | | RESET LEFT FAR. FLAG |
| 0100 | 0107 | 0 100 011 111 | | BRN | LFST8 | |
| 0101 | 0235 | 1 001 110 111 | LPRX3 | BRN | LPRX8 | |
| 0102 | | 1 001 101 010 | LFST1 | X.AM1 | | WAS ZERO ENTERED? |
| 0103 | 0117 | 0 100 111 111 | | BRN | LFST2 | NO: IT IS NONZERO DIGIT |
| 0104 | 0042 | 0 010 001 011 | | BRN | LSUPA | YES: USE "ZERO" FOR NEW DATA |
| 0105 | | 0 111 000 110 | LDIGZ | W.APCC | | BUILD "NEW" DATA IN C REG |
| 0106 | | 0 000 010 000 | LDIGF | ROM 0 | | GO TO LSUP1 |
| 0107 | | 0 111 010 100 | LFST8 | YS7 | | IS THIS FIRST ENTRY DIGIT? |
| 0110 | 0200 | 0 000 000 011 | | BRN | LNXT1 | NO: GO TO "NEXT DIGIT" ROUTINE |
| 0111 | | 0 011 001 110 | | W.ZTC | | YES: SET "ZERO" FOR "OLD" DATA |
| 0112 | | 0 111 110 000 | | CTT | | STORE ZERO AS DISPLAY COUNT |
| 0113 | 0174 | 0 111 110 011 | | BRN | LFST9 | |
| 0114 | | 0 000 110 100 | LFST7 | CLS | | YES: CLEAR ALL STATUS BITS: ZERO=NEW DATA |
| 0115 | | 0 110 000 100 | | SS6 | | SET DEC. POINT FLAG |
| 0116 | 0106 | 0 100 011 011 | | BRN | LDIGF | GOTO RETURN TO SUPERVISOR |
| 0117 | | 0 111 100 100 | LFST2 | RS7 | | RESET FIRST ENTRY DIGIT FLAG |
| 0120 | | 0 001 001 100 | | PT1 | | PREPARE LEFT ALIGNMENT SHIFT COUNTER |
| 0121 | 0157 | 0 111 000 001 | | JSB | LSHFT | |
| 0122 | | 0 110 100 000 | LFST31 | YADP | | IS AUTO D.P. FLAG SET ? |
| 0123 | | 1 011 010 100 | | YS11 | | IS IT? |
| 0124 | 0131 | 0 101 100 111 | | BRN | LFST5 | NO: IT IS NORMAL ENTRY |
| 0125 | | 1 011 100 100 | | RS11 | | YES: RESET EXTERNAL FLAG |
| 0126 | | 1 010 101 000 | | MTC | | PREPARE DPL-FLAG FOR CHECK |
| 0127 | | 0 101 100 010 | LFST4 | P.CMIC | | TEST DECREMENT |
| 0130 | 0177 | 0 111 111 111 | | BRN | LFST6 | NON ZERO(NO CARRY): GO TO EXP. DECREMENT |
| 0131 | | 1 010 101 000 | LFST5 | MTC | | CARRY. DECREMENTING IS FINISHED |
| 0132 | | 1 010 001 100 | | PT10 | | GENERATE NUMBER OF ADJUSTMENT SHIFTS |
| 0133 | | 1 001 011 000 | | LDC9 | | NEEDED FOR NEXT ENTRY DIGIT |
| 0134 | | 0 010 101 000 | | CXM | | STORE NEW INT. FLAG VECTOR |
| 0135 | | 1 110 101 110 | | W.AXC | | SEND NEW DATA TO C-REGISTER |
| 0136 | 0106 | 2 100 011 011 | | BRN | LDIGF | GO TO RETURN TO SUPERVISOR |
| 0137 | | 0 110 100 110 | LNXT2 | M.ZMC | | CHECK IF MANTISSA IS ZERO |
| 0140 | 0147 | 0 110 011 111 | | BRN | LNXT3 | YES |
| 0141 | | 1 000 101 110 | LNXT13 | W.BXC | | NO. STORE DATA TEMPORARILY IN B-REG |
| 0142 | | 1 010 101 000 | | MTC | | PREPARE INT. FLAG VECTOR FOR TEST |
| 0143 | | 1 010 001 100 | | PT10 | | NUMBER OF NEEDED ALIGNMENT SHIFTS |
| 0144 | | 0 001 100 010 | | P.CM1 | | IS IT ZERO? |
| 0145 | 0165 | 0 111 010 111 | | BRN | LNXT6 | NO START WITH ALIGNMENT |
| 0146 | 0307 | 1 100 011 111 | | BRN | LNXT80 | |
| 0147 | | 0 101 101 010 | LNXT3 | X.CMIC | | DECREMENT EXPONENT BY ONE |
| 0150 | | 0 001 001 100 | | PT1 | | PREPARE UNDERFLOW CHECK |
| 0151 | | 0 110 110 010 | | WP.ZMC | | CHECK IF UNDERFLOW |
| 0152 | 0224 | 0 000 010 011 | | BRN | LNXT4 | UNDERFLOW: GO TO "TROUBLE" EXIT |
| 0153 | 0157 | 0 111 000 001 | | JSB | LSHFT | |
| 0154 | | 0 110 011 110 | | S.CTA | | COPY SIGN TO A-REG |
| 0155 | | 0 110 001 010 | | X.CTA | | COPY EXPONENT TO A-REG |
| 0156 | 0313 | 1 100 100 101 | | JSB | LCOU | |
| 0157 | 0131 | 0 101 100 111 | | BRN | LFST5 | GO TO "FIRST DIGIT" OUTPUT |
| 0160 | | 0 100 001 110 | LSHFT | W.SLA | | ALIGNMENT SHIFT |
| 0161 | | 0 000 111 100 | | PLS | | |
| 0162 | | 1 101 101 100 | | YP13 | | ARE SHIFTS COMPLETED |
| 0163 | 0160 | 0 111 000 011 | | BRN | LSHFT | NO. CONTINJE |
| 0164 | | 0 000 110 000 | | RETURN | | YES. FINISHED |
| 0165 | | 0 100 001 010 | LNXT6 | X.SLA | | PREALIGNMENT SHIFT |
| 0166 | | 0 100 001 110 | LNXT7 | W.SLA | | ALIGNMENT SHIFT |
| 0167 | | 0 101 100 010 | | P.CMIC | | ALIGNMENT FINISHED? |
| 0170 | 0166 | 0 111 011 011 | | BRN | LNXT7 | NOT YET |
| 0171 | | 1 010 101 000 | | MTC | | YES. FETCH INT. FLG. VECTOR FOR UPDATE |
| 0172 | | 0 101 100 010 | | P.CMIC | | DECREMENT NUMBER OF ALIGNMENT SHIFTS |
| 0173 | 0305 | 1 100 010 111 | | BRN | LNXT8 | |
| 0174 | | 0 101 010 100 | LFST9 | YS5 | | IS THIS DECIMAL POINT KEY ROUNTINE |
| 0175 | 0102 | 0 100 001 011 | | BRN | LFST1 | NO. IT IS DIGIT ENTRY |
| 0176 | 0114 | 0 100 110 011 | | BRN | LFST7 | YES |
| 0177 | | 1 101 101 010 | LFST6 | X.AM1A | | DECREMENT DATA EXPONENT BY ONE |
| 0200 | | 0 000 000 000 | | NOP | | TO ELIMINATE POSSIBLE CARRY |
| 0201 | 0127 | 0 101 011 111 | | BRN | LFST4 | CONTINUE IN DECREMENT LOOP |
| 0202 | | 1 011 001 100 | LRND3 | PT11 | | PREPARE DIGIT INTERPRETATION CODE FLAG |
| 0203 | | 0 001 011 000 | | LDC1 | | SET IT TO ONE |
| 0204 | | 0 010 101 000 | LCONT3 | CXM | | STORE UPDATED INT. FLG. VECTOR. RESTORE DATA |
| 0205 | 0106 | 0 100 011 011 | | BRN | LDIGF | GO TO SUPERVISOR |
| 0206 | | 0 110 100 000 | LNXT18 | YADP | | IS AUTO D.P. FLG. SET ? |
| 0207 | | 1 011 010 100 | | YS11 | | IS IT? |
| 0210 | 0302 | 1 100 001 011 | | BRN | LNXT14 | NO |
| 0211 | | 1 011 100 100 | | RS11 | | YES: RESET EXTERNAL FLAG |
| 0212 | | 0 101 010 100 | | YS5 | | IS THIS DEC. POINT KEY ROUTINE? |
| 0213 | 0223 | 1 001 001 111 | | BRN | LNXT11 | NO: IT IS A DIGIT |
| 0214 | | 1 110 101 110 | | W.AXC | | YES. STORE CURRENT DATA IN A-REG |
| 0215 | | 1 010 101 000 | | MTC | | PREPARE INT. FLG. VECTOR FOR TEST |
| 0216 | | 1 101 001 100 | | PT13 | | PREPARE DPL FLG FOR TEST |
| 0217 | | 0 101 100 010 | LNXT9 | P.CMIC | | DECREMENT AND TEST IF CARRY OCCURRED |
| 0220 | 0007 | 0 000 011 111 | | BRN | LNXT10 | NO CARRY. CONTINUE IN EXP. INCREMENT |
| 0221 | | 1 110 101 110 | | W.AXC | | CARRY: FINISHED: RESTORE DATA IN C-REG |
| 0222 | 0114 | 0 100 110 011 | | BRN | LFST7 | GO TO D.P. FLAG OUTPUT |
| 0223 | | 0 111 101 010 | LNXT11 | X.CP1C | | INCREMENT CURRENT EXPONENT BY ONE |
| 0224 | | 0 101 111 010 | | XS.CM1C | | DECREMENT CODE FOR SIGN OF EXP. |
| 0225 | | 0 110 111 010 | | XS.ZMC | | IS IT ZERO NOW ? |
| 0226 | 0204 | 0 000 010 011 | | BRN | LNXT4 | OVERFLOW: GO TO "TROUBLE" EXIT |
| 0227 | | 0 111 111 010 | | XS.CP1C | | NO.RESTORE ORIG VALUE |
| 0230 | | 0 000 000 003 | | NOP | | TO ELIMINATE POSSIBLE CARRY |

MAIN UNIT LISTING (ROM A-1) – Continued

| CURR ADDR | BRAN ADDR | OPERATION CODE BIT PATTERN | | | | |
|---|---|---|---|---|---|---|
| 0231 | 0141 | 0 110 000 111 | | BRN | LNXT13 | NO OVERFLOW DETECTED |
| 0232 | | 0 010 011 000 | LEOLR | LDC2 | | |
| 0233 | | 0 000 010 000 | LEOLZ | ROM 0 | | |
| 0234 | | 0 000 110 100 | | CLS | | CLEAR STATUS BITS |
| 0235 | | 0 010 001 110 | LPRXB | W.BTC | | RESTORE ORIGINAL DATA IN C-REGISTER |
| 0236 | | 0 110 100 100 | | RS6 | | RESET D.P. FLAG |
| 0237 | 0241 | 1 010 000 111 | | BRN | LPRXL | GO TO TEST |
| 0240 | 0235 | 1 001 110 111 | LEOLF | BRN | LPRXB | GO TO COMMON PATH WITH PRINT X ROUTINE |
| 0241 | | 0 010 010 100 | LPRXL | YS2 | | IS L.PAR FLAG SET? |
| 0242 | 0043 | 0 010 001 111 | | BRN | LSUPB | GO TO SET FIRST ENTRY DIGIT FLAG AND SUPERVISOR |
| 0243 | | 0 110 010 000 | | ROM 3 | | RETURN TO LEFT PARENTHESIS ROUTINE |
| 0244 | | 0 011 001 110 | LRESS | W.ZTC | | CLEAR C-REG |
| 0245 | | 0 111 110 000 | | CTT | | CLEAR T-REG |
| 0246 | | 0 100 010 100 | | YS4 | | IS THIS RESET ROUTINE? |
| 0247 | 0032 | 0 001 101 011 | | BRN | LRESP | NO, GO TO PRGM. COUNTER RESET |
| 0250 | 0037 | 0 001 111 111 | | BRN | LRSHB | YES, SKIP PRGM. COUNTER RESET |
| 0251 | | 0 101 100 010 | LDGT3 | P.CMIC | | IS IT TWO? |
| 0252 | 0265 | 1 011 010 111 | | BRN | LDGT4 | NO: CONTINUE |
| 0253 | | 0 000 011 000 | | LDC0 | | YES: IT IS I/O CALL: RESET O.I. CODE TO ZERO |
| 0254 | 0365 | 1 111 010 111 | | BRN | LDGT30 | GO TO I/O CHANNEL SELECT AND CALL ROUTINE |
| 0255 | | 0 101 110 000 | LPAPA | PRE | | PRINTER MECH. ENABLE |
| 0256 | | 1 011 010 100 | | YS11 | | FLAG? |
| 0257 | 0255 | 1 010 110 111 | | BRN | LPAPA | NO: WAIT |
| 0260 | 0277 | 1 011 111 111 | | BRN | LPAD2 | YES: CONTINUE |
| 0261 | | 0 011 010 100 | LCENA | YS3 | | INTERROGATE OP.FLAG |
| 0262 | 0004 | 0 000 010 011 | | BRN | LNXT4 | NOT SET.GO TO CLEAR C-REG |
| 0263 | 0043 | 0 010 001 111 | | BRN | LSUPB | SET.DO NOTHING |
| 0264 | | 1 000 010 000 | LFLG1 | ROM 4 | | |
| 0265 | | 0 101 100 010 | LDGT4 | P.CMIC | | IS IT THREE? |
| 0266 | 0361 | 1 111 000 111 | | BRN | LDGT5 | NO: CONTINUE |
| 0267 | 0264 | 1 011 010 011 | | BRN | LFLG1 | YES.GO TO ACCEPT PRGM.FLAG NUMBER |
| 0270 | | 0 001 000 100 | LPRINA | SS1 | | SET SHIFT KEY ROUTINES AUX.FLG |
| 0271 | | 1 111 011 000 | | LDC15 | | |
| 0272 | 0336 | 1 101 111 011 | | BRN | LFPR1 | |
| 0273 | | 0 010 101 000 | LCONTA | CXM | | PREPARE INT.FLG.VECTOR FOR UPDATE |
| 0274 | | 0 001 011 000 | | LDC1 | | SET PRGM.RUN MODE FLAG |
| 0275 | 0376 | 1 111 111 011 | | BRN | LCONT39 | |
| 0276 | 0045 | 0 010 010 111 | LFINA | BRN | LFIN2 | GO TO RESET FLAGS |
| 0277 | | 1 011 100 100 | LPAD2 | RS11 | | RESET EXT FLAG |
| 0300 | | 0 011 110 000 | | ADV | | PAPER ADVANCE |
| 0301 | | 0 000 110 000 | | RETURN | | SUBROUTINE END |
| 0302 | | 0 101 010 100 | LNXT14 | YS5 | | IS THIS DEC. POINT KEY ROUTINE? |
| 0303 | 0223 | 1 001 001 111 | | BRN | LNXT11 | NO, ACCEPT DIGIT |
| 0304 | 0114 | 0 100 110 011 | | BRN | LFST7 | YES, GO TO D.P. FLAG OUTPUT |
| 0305 | | 0 010 101 000 | LNXT8 | CXM | | STORE NEW INTERNAL FLAG VECTOR |
| 0306 | 0310 | 1 100 100 101 | | JSR | LCOU | |
| 0307 | | 0 010 001 110 | LNXT80 | W.BTC | | RESTORE OLD DATA IN C REG |
| 0310 | 0105 | 0 100 010 111 | | BRN | LDIGZ | |
| 0311 | | 0 111 111 000 | LCOU | TTC | | GET DISPLAY COUNT |
| 0312 | 0065 | 0 011 010 111 | | BRN | LCOU1 | |
| 0313 | | 0 011 011 000 | LRND5 | LDC3 | | LOAD THREE FOR TEST |
| 0314 | | 0 000 111 100 | | PLS | | RESTORE POINTER |
| 0315 | | 1 111 000 010 | | P.APCA | | IS DIGIT GREATER THAN SIX |
| 0316 | 0321 | 1 101 000 111 | | BRN | LDPT3 | NO, RESTORE IT |
| 0317 | | 0 110 011 000 | | LDC6 | | YES, SET DIGIT TO SIX |
| 0320 | 0322 | 1 101 001 011 | | BRN | LRND6 | |
| 0321 | | 0 101 000 010 | LDPT3 | P.AMCC | | |
| 0322 | | 0 101 100 100 | LRND6 | RS5 | | RESET D.P. KEY FLAG IF SET |
| 0323 | | 0 010 101 000 | | CXM | | STORE NEW INT. FLG. VECTOR IN M-REG |
| 0324 | | 0 010 001 110 | | W.BTC | | RESTORE DATA IN C-REG |
| 0325 | 0106 | 0 100 011 011 | | BRN | LDIGF | GO TO LSUP1 |
| 0326 | | 0 100 101 110 | LCLAA | W.ATB | | COPY LABEL BACK INTO B-REG |
| 0327 | | 1 011 010 110 | | MS.SRA | | PREALIGNMENT |
| 0330 | | 1 011 010 110 | | MS.SRA | | PREALIGNMENT |
| 0331 | | 0 100 010 110 | LCLA1 | MS.SLA | | ALIGNMENT SHIFT |
| 0332 | | 1 101 101 010 | | X.AM1A | | DECREMENT EXPONENT |
| 0333 | 0331 | 1 101 100 111 | | BRN | LCLA1 | NO CARRY: ALIGNMENT CONTINUE |
| 0334 | | 1 110 101 110 | | W.AXC | | GET ADJUSTED LABEL INTO C-REG |
| 0335 | | 1 100 010 000 | | ROM 6 | | CARRY: ALIGNMENT FINISHED |
| 0336 | | 0 000 001 100 | LFPR1 | PT0 | | PREPARE SECTOR COUNTER |
| 0337 | | 0 101 110 000 | | PRE | | PRINTER ENABLE |
| 0340 | | 1 011 010 100 | LFPR2 | YS11 | | FLAG? |
| 0341 | 0340 | 1 110 000 011 | | BRN | LFPR2 | NO, WAIT |
| 0342 | | 1 011 100 100 | | RS11 | | YES: RESET EXTERNAL FLAG |
| 0343 | | 1 111 110 000 | | CCS | | RIGHT PART OF THE PRINTER MASK |
| 0344 | | 1 101 110 000 | | TCS | | LEFT PART OF THE PRINTER MASK |
| 0345 | | 0 000 111 100 | | PLS | | INCREMENT SECTOR COUNTER |
| 0346 | | 1 101 101 100 | | YP13 | | LAST SECTOR? |
| 0347 | 0340 | 1 110 000 011 | | BRN | LFPR2 | NO |
| 0350 | | 1 011 010 100 | LFPR3 | YS11 | | YES, FLAG? |
| 0351 | 0350 | 1 110 100 011 | | BRN | LFPR3 | NO, WAIT |
| 0352 | | 1 011 100 100 | | RS11 | | YES, RESET EXTERNAL FLAG |
| 0353 | | 0 011 110 000 | | ADV | | PAPER ADVANCE |
| 0354 | | 0 001 010 100 | | YS1 | | IS SHIFT KEY ROUT.AUX.FLG. SET ? |
| 0355 | 0366 | 1 111 011 011 | | BRN | LFPR4 | |
| 0356 | | 0 001 100 100 | | RS1 | | RESET SHIFT KEY ROUTINES AUX.FLG. |
| 0357 | | 0 010 001 110 | | W.BTC | | |
| 0360 | | 1 100 010 000 | | ROM 6 | | SWITCH TO ROM 6 |
| 0361 | | 1 100 010 000 | LDGT5 | ROM 6 | | |
| 0362 | 0367 | 1 111 011 111 | LEOLD | BRN | LEOLK | |
| 0363 | | 0 000 000 000 | | DUMMY | | |
| 0364 | 0016 | 0 000 111 011 | LPADA | BRN | LPAD1 | GO TO PAPER ADVANCE ROUTINE |
| 0365 | | 0 100 010 000 | LDGT30 | ROM 2 | | GO TO I/O CHANNEL SELECT AND CALL ROUTINE |
| 0366 | | 1 110 010 000 | LFPR4 | ROM 7 | | |
| 0367 | | 1 010 000 100 | LEOLK | SS10 | | SET SECOND PRINT FLAG |
| 0370 | | 1 000 010 100 | | YS8 | | IS RIGHT PARENTHESIS FLAG SET? |
| 0371 | 0232 | 1 001 101 011 | | BRN | LEOLR | |
| 0372 | | 0 000 111 100 | | PLS | | YES.PREPARE SYMBOL LOAD |
| 0373 | | 0 011 011 000 | | LDC3 | | SYMBOL FOR RIGHT PAR.) |
| 0374 | | 1 111 011 000 | | LDC15 | | BLANK |
| 0375 | 0233 | 1 001 101 111 | | BRN | LEOLZ | GO TO COMMON PART |
| 0376 | | 0 000 101 000 | LCONT39 | DST0 | | SWITCH THE DISPLAY ON |
| 0377 | 0204 | 1 000 010 011 | | BRN | LCONT3 | |

MAIN UNIT LISTING (ROM A-2)

```
CURR  BRAN   OPERATION CODE
ADDR  ADDR   BIT PATTERN

0000         0 000 010 000            ROM 0              GO TO ROM 0 AFTER ROM GROUP SWITCH
0001         1 100 001 100  LIDS1     PT12               PREPARE SPEC. ADDR. CODE LOAD
0002         0 011 001 110  LIDS2     W.ZTC              ZERO TO C-REG
0003         0 111 101 110            W.CP1C             SET EXPONENT TO "ONE"
0004         1 111 011 000            LOC15              LOAD SPEC. ADDR. FOR INT. D.S.
0005         0 000 110 000            RETURN             END OF SUBROUTINE
0006         1 010 101 000  LRIP3     MTC                GET INT. FLAG VECTOR FOR TEST
0007         1 001 001 100            PT9                PREPARE LEVEL INDICATOR FOR TEST
0010         0 101 100 010            P.CM1C             CHECK IF LEVEL INDICATOR IS ZERO
0011  0241   1 010 000 111            BRN     LRIPA      IT IS NOT ZERO. CONTINUE
0012         1 110 010 000  LRIP4     ROM 7              SWITCH TO ROM7
0013         0 000 111 100  LRES69    PLS                RESTORE PROPER POINTER VALUE
0014  0020   0 001 000 011            BRN     LRES6      PREPARE RETURN TO RESET ROUTINE
0015         1 000 000 100  LRIP5     SS8                SET RIGHT PARENTHESIS FLAG
0016         0 010 001 110            W.BTC              RESTORE DATA IN  C-REG
0017         0 000 010 000            ROM 0              GO TO COMMON PATH WITH "EQUAL" ROUTINE
0020         0 010 010 000  LRES6     ROM 1              GO TO RESET ROUTINE
0021  0047   0 010 100 001  LRESE     JSB     LIDS10     GO TO ADDRESS GENERATING SUBROUTINE
0022  0354   1 110 110 011            BRN     LRES9
0023         0 110 100 000  LDSP50    YADP               IS AUTO DEC. PT. SET?
0024         1 011 010 100            YS11
0025  0027   0 001 011 111            BRN     LDSP5      NO.  GO TO NORMAL PATH
0026         0 010 001 100            PT2                YES. SET POINTER FOR ALL OF MANTISSA
0027         0 010 101 100  LDSP5     YP2                IS ALL OF MANTISSA TO BE DISPLAYED
0030  0315   1 100 110 111            BRN     LDSP51
0031  0126   0 101 011 011            BRN     LDSP6      YES. POINTER IS SET
0032  0006   0 000 011 011            BRN     LRIP3
0033         1 100 100 000  LMAN6     YFKB               INTERROGATE F. BL. KBD. AND SET BUSY LIGHT
0034         1 011 010 100            YS11               IS IT?
0035  0167   0 111 011 111            BRN     LMAN7      NO
0036         1 100 010 000            ROM 6              GO TO CALL F.BLK.SOFTWARE
0037         1 011 010 100  LCLO3     YS11               CHECK IF SINGLE OPERAND  OP. FLAG IS SET
0040  0267   1 011 011 111            BRN     LCLOA
0041         0 010 010 000  LMTX3     ROM 1              GO TO LSUPA
0042         0 010 010 000  LCLO6     ROM 1              GO TO SUPERVISOR
0043         1 010 100 100  LMAN9     RS10               RESET SHIFT KEY FLAG
0044         1 100 010 000            ROM 6              GO TO ROM 6
0045         0 011 011 000  LBAK1     LOC3               MASK.PART 2
0046         1 111 011 000            LOC15              MASK.PART 3
0047  0356   1 110 111 011            BRN     LBAK2
0050         1 110 101 000  LIDS10    CLR                CLEAR ALL REGISTERS
0051  0001   0 000 000 111            BRN     LIDS1
0052         1 011 101 110  LALFA     W.ZTA              PREPARE C-REG FOR MESSAGE
0053         0 111 000 000  LALF1     PINC               INCREMENT PRGM COUNTER
0054         0 000 011 100            PRS                DECREMENT COUNTER
0055         0 110 101 100            YP6                FINISHED?
0056  0053   0 010 101 111            BRN     LALF1      NO: CONTINUE
0057         1 100 010 000            ROM 6              YES: GO TO ROM 6 TO CONTINUE
0060  0263   1 011 001 111  LCLOP     BRN     LCLOB
0061         0 000 000 000            DUMMY
0062  0000   0 000 000 101  LXTMA     JSB     LIDS1      JUMP TO INT. D.S. ADDRESS GENERATOR
0063         1 001 011 000            LOC9               CONSTANT REGISTER ADDRESS
0064         1 001 110 000            ATOS               D.S. CALL
0065         1 001 010 100            YS9                CHECK IF "STORE" ROUTINE  FLAG IS SET
0066  0364   1 111 010 011            BRN     LMTX2      NOT SET GO TO "RECALL" ROUTINE
0067         0 010 001 110            W.BTC              SET. RESTORE DATA IN C-REG
0070         1 011 110 000            DTOS               STORE DATA IN D.S.
0071  0041   0 010 000 111            BRN     LMTX3      GO TO ROUTINE EXIT
0072         1 000 101 000  LDSP1     DSOF               SWITCH THE DISPLAY OFF
0073         0 110 001 110            W.CTA                COPY DATA INTO A-REG FOR ADJUSTMENT
0074         0 100 101 110            W.ATB                STORE ORIG. DATA TEMPORARILY IN B-REG.
0075         1 011 000 100            SS11                 SET "DISPLAY ROUTINE" FLAG
0076         1 010 101 000            MTC                  GET INTERNAL FLAG VECTOR FOR TEST
0077         1 110 010 000            ROM 7                GO TO COMMON PART WITH PRINT SUBROUTINE
0100         0 110 111 010  LOFL2     XS.ZMC             CHECK SIGN OF THE RESULT EXPONENT
0101  0204   1 000 010 011            BRN     LCLO1      ZERO: POSITIVE. RESULT IS O.K.
0102         0 010 101 010            X.ZMCC             CARRY: CONTINUE TEST: EXPONENT COMPLEMENTED
0103         0 101 111 010            XS.CM1C            SIGN CODE DECREMENT
0104  0251   1 010 100 111            BRN     LOFL3      NO CARRY. TROUBLE
0105  0110   0 100 100 011            BRN     LCLOY      CARRY.NEG.RESULTS.O.K.
0106         0 000 010 000  LSSUP     ROM 0              GO TO SUPERVISOR
0107  0106   0 100 011 011            BRN     LSSUP      ACCEPT KEYCODE FROM OUTSIDE
0110         1 110 101 110  LCLOY     W.AXC              RESTORE DATA IN C-REG
0111  0204   1 000 010 011            BRN     LCLO1      GO TO CLOSING ROUTINE
0112  0213   1 000 101 111  LDSPZ     BRN     LDSPA      GO TO GENERATE DISPLAY MASK
0113         1 011 000 100  LIOS1     SS11               SET I/O CALL FLAG
0114         0 000 010 000            ROM 0              GO TO I/O CALL SEQUENCE
0115         1 100 001 100  LDSPP     PT12               PREPARE SEARCH FOR LEADING ZEROS
0116         1 001 100 010  LDSP3     P.AM1                ZERO?
0117  0177   0 111 111 111            BRN     LDSP4        NO: END OF THE SEARCH
0120         0 001 100 010            P.CM1                YES: DEC. POINT?
0121  0177   0 111 111 111            BRN     LDSP4        YES: END OF THE SEARCH
0122         1 001 011 000            LOC9                 NO: LOAD CODE FOR "BLANK"
0123  0116   0 100 111 011            BRN     LDSP3        SEARCH ROUTINE
0124         0 101 111 010  LDSP52    XS.CM1C            DECREMENT DISPLAY COUNTER
0125  0027   0 001 011 111            BRN     LDSP5      CONTINUE
0126         1 100 101 000  LDSP6     ONR                RESTORE MASK TO C REG
0127         0 101 110 010            WP.CM1C              INSERT CODES FOR "BLANK"
0130         1 000 101 110            W.BXC                ORIG. DATA BACK TO C-REG: MASK TO B-REG
0131         0 110 011 110            S.CTA                COPY ORIG. SIGN TO A-REG
0132         0 101 010 100            YS5                  SCI. NOTATION FORMAT?
0133  0144   0 110 010 011            BRN     LDSP8        NO
0134         0 000 110 010            WP.ZTB             YES.CHANGE MASK TO DISPLAY ALL
0135         0 110 001 010            X.CTA                COPY ORIG. EXPONENT TO A-REG
0136         0 110 111 010            XS.ZMC               CHECK IF EXPONENT IS NEGATIVE
0137  0143   0 110 001 111  LWAIT     BRN     LDSP9        NO. IT IS POSITIVE. O.K.
0140         0 001 001 100            PT1                  YES. PREPARE COMPLEMENT
0141         0 010 110 010            WP.ZMCC            COMPLEMENT OF THE EXPONENT
0142         1 110 110 010            WP.AXC               ORIG. EXPONENT BACK TO C-REG: COMPL. TO A-REG
0143         0 101 100 100  LDSP9     RS5                  RESET SCI. NOT. FORMAT FLAG
0144         0 000 101 000  LDSP8     DSTO                 DISPLAY ON
0145         1 011 100 100  LDSP7     RS11               RESET DISPLAY FLAG
0146         0 000 110 000            RETURN             END OF THE DISPLAY ROUTINE
0147  0321   1 101 000 111  LPERD     BRN     LPERO
0150  0071   0 011 101 001  LMANB     JSB     LDSP1      JUMP TO DISPLAY SUBROUTINE
```

MAIN UNIT LISTING (ROM A-2) – Continued

| CURR ADDR | BRAN ADDR | OPERATION CODE BIT PATTERN | | | | |
|---|---|---|---|---|---|---|
| 0151 | | 0 100 100 000 | | RMGRC | | |
| 0152 | | 0 000 100 100 | LMAN2 | RS0 | | |
| 0153 | | 0 000 010 100 | | YS0 | | IS THE "OLD" KEY STILL DOWN? |
| 0154 | 0156 | 0 110 111 011 | | BRN | LMAN3 | NO, CONTINUE |
| 0155 | 0152 | 0 110 101 011 | | BRN | LMAN2 | YES, WAIT |
| 0156 | | 0 101 000 000 | LMAN3 | IS2 | | |
| 0157 | | 0 100 100 000 | | RBL | | RESET BUSY LIGHT |
| 0160 | | 1 001 000 000 | | IS1 | | |
| 0161 | | 0 000 010 100 | LMAN4 | YS0 | | NEW KEY DOWN? |
| 0162 | 0161 | 0 111 000 111 | | BRN | LMAN4 | NO,WAIT |
| 0163 | 0136 | 0 101 111 101 | | JSB | LWAIT | YES,GO TO DO NOTHING |
| 0164 | | 1 100 001 100 | | PT12 | | SET PROPER POINTER |
| 0165 | 0033 | 0 001 101 111 | | BRN | LMAN6 | YES |
| 0166 | | 0 000 000 000 | | DUMMY | | |
| 0167 | | 1 010 010 100 | LMAN7 | YS10 | | WAS SHIFT KEY SET ? |
| 0170 | 0370 | 1 111 100 011 | | BRN | LMAN8 | NO,GO TO ROM 0 |
| 0171 | 0043 | 0 010 001 111 | | BRN | LMAN9 | YES |
| 0172 | | 1 010 010 100 | LCLO2 | YS10 | | CHECK IF SECOND PRINT FLAG IS SET |
| 0173 | 0037 | 0 001 111 111 | | BRN | LCLO3 | NO |
| 0174 | | 0 100 010 100 | LCLO7 | YS4 | | CHECK IF RIGHT PARENTHESIS FLAG IS SET |
| 0175 | 0312 | 1 100 101 011 | | BRN | LEOLT | |
| 0176 | 0221 | 1 001 000 111 | | BRN | LRPAR | YES,CONTINUE IN RIGHT PARENTHESIS ROUTINE |
| 0177 | | 0 100 101 000 | LDSP4 | CTS | | SAVE MASK IN D REG |
| 0200 | | 1 011 100 100 | | RS11 | | |
| 0201 | | 0 111 111 000 | LDSP40 | TTC | | GET DISPLAY COUNTER IN C REG |
| 0202 | 0023 | 0 001 001 111 | | BRN | LDSP50 | |
| 0203 | | 0 000 010 000 | LPER3 | ROM 0 | | |
| 0204 | | 0 001 010 100 | LCLO1 | YS1 | | CHEKC IF ODD-AUX-FLG IS SET |
| 0205 | 0263 | 1 011 001 111 | | BRN | LCLO8 | NO, NORMAL PATH |
| 0226 | | 0 101 111 110 | | S,CM1C | | YES,SET NEGATIVE SIGN OF THE RESULT |
| 0207 | | 0 001 100 100 | | RS1 | | YES, RESET FLAG |
| 0210 | 0263 | 1 011 001 111 | | BRN | LCLO8 | |
| 0211 | | 1 100 101 000 | LLDDZ | DNR | | RESTORE PREVIOUS RESULT IN C-REG |
| 0212 | 0172 | 0 111 101 011 | | BRN | LCLO2 | |
| 0213 | | 0 011 001 110 | LDSPA | W,ZTC | | START TO GENERATE DISPLAY MASK |
| 0214 | | 0 000 111 100 | | PLS | | ADJUST DEC. POINT LOCATION POINTER |
| 0215 | | 0 010 011 000 | | LOC2 | | SET DISPLAY MASK CODE FOR DEC. POINT |
| 0216 | 0115 | 0 100 110 111 | | BRN | LDSPP | |
| 0217 | | 0 000 000 000 | | DUMMY | | |
| 0220 | | 1 110 010 000 | LER20 | ROM 7 | | |
| 0221 | | 0 000 010 000 | LRPAR | ROM 0 | | |
| 0222 | | 0 000 000 000 | | DUMMY | | |
| 0223 | | 0 000 000 000 | | DUMMY | | |
| 0224 | | 0 000 000 000 | | DUMMY | | |
| 0225 | | 0 001 100 110 | LOFL1 | M,CM1 | | CHECK IF MANTISSA IS ZERO |
| 0226 | 0100 | 0 100 000 011 | | BRN | LOFL2 | NO: CONTINUE TEST |
| 0227 | 0253 | 1 010 101 111 | | BRN | LOFL4 | YES: GO TO SET ZERO FOR RESULT |
| 0230 | | 0 000 010 000 | LMTX20 | ROM 0 | | |
| 0231 | | 0 100 010 100 | LJAB2 | YS4 | | ADDRESS MODIFICATION NEEDED ? |
| 0232 | 0333 | 1 101 101 111 | | BRN | LRET3 | NO |
| 0233 | | 0 101 000 000 | | IS2 | | YES |
| 0234 | | 1 000 101 000 | | PTT | | CURRENT ADDRESS FOR MODIFICATION |
| 0235 | | 0 001 101 000 | | ADD | | DODIFICATION BY BINARY ADDITION |
| 0236 | | 1 001 000 000 | | IS1 | | PREPARE MASK-OUT BITS 11 TO 16 |
| 0237 | | 0 000 011 000 | | LOC0 | | MASK,PART 1 (POINTER WAS 3 ) |
| 0240 | 0045 | 0 010 010 111 | | BRN | LBAK1 | |
| 0241 | | 0 011 010 100 | LRIPA | YS3 | | CHECK IF OP. FLG. IS SET |
| 0242 | 0015 | 0 000 110 111 | | BRN | LRIP5 | NO CARRY, O.K., IT IS NOT ZERO, CONTINUE |
| 0243 | | 1 101 001 100 | | PT13 | | YES, SET POINTER TO GENERATE PROPER MESS. |
| 0244 | 0220 | 1 001 000 011 | | BRN | LER20 | |
| 0245 | | 0 100 101 000 | LFOLC | CTS | | SAVE RESULT |
| 0246 | 0000 | 0 000 000 101 | | JSB | LIDS1 | GENERATE ADDRESS |
| 0247 | | 1 000 011 000 | | LOC8 | | |
| 0250 | | 1 110 010 000 | | ROM 7 | | |
| 0251 | | 0 001 111 010 | LOFL3 | XS,CM1 | | CHECK SIGN OF EXP. AGAIN |
| 0252 | 0353 | 1 110 101 111 | | BRN | LOFL5 | NO CARRY, I.E. OVERFLOW DETECTED |
| 0253 | | 0 011 001 110 | LOFL4 | W,ZTC | | CARRY: UNDERFLOW: SET ZERO FOR RESULT |
| 0254 | | 0 000 000 000 | | NOP | | TO ELIMINATE CARRY CAUSED BY THE HARDWARE |
| 0255 | 0263 | 1 011 001 111 | | BRN | LCLO8 | GO TO THE CLOSING PART OF THE ROUTINE |
| 0256 | | 0 000 000 000 | | DUMMY | | |
| 0257 | | 0 000 000 000 | | DUMMY | | |
| 0260 | | 0 000 000 000 | | DUMMY | | |
| 0261 | | 0 110 010 000 | LCLOG | ROM 3 | | |
| 0262 | 0306 | 1 100 011 011 | LADJ7 | BRN | LADJ17 | |
| 0263 | | 0 110 010 100 | LCLO8 | YS6 | | CHECK IF L-FLAG IS SET |
| 0264 | 0172 | 0 111 101 011 | | BRN | LCLO2 | NO |
| 0265 | | 1 011 110 000 | LLDDA | DTDS | | STORE RESULT IN D.S. |
| 0266 | 0211 | 1 000 100 111 | | BRN | LLDDZ | |
| 0267 | | 0 100 101 000 | LCLOA | CTS | | COPY C TO D-REGISTER |
| 0270 | | 0 010 101 000 | LCLO5 | CXM | | GET INT. FLG VECTOR AND STORE RESULT IN M-REG |
| 0271 | | 1 110 101 110 | | W,AXC | | PREPARE INT. FLAG VECTOR FOR UPDATING |
| 0272 | | 0 011 001 100 | | PT3 | | SET POINTER TO INDICATE OP. CODE |
| 0273 | | 0 100 010 010 | | WP,SLA | | "NEW" OP. CODE TRANSFERRED |
| 0274 | | 0 100 010 010 | | WP,SLA | | TO OP. CODE "TO BE EXECUTED" NEXT |
| 0275 | | 1 110 101 110 | | W,AXC | | UPDATED INT. FLG. VECTOR TO C-REG |
| 0276 | | 0 010 101 000 | | CXM | | RESTORE RESULT IN C-REG: INT. FLG VECTOR TO M-REG. |
| 0277 | | 0 100 010 100 | | YS4 | | INTERROGATE AUX. FLAG |
| 0300 | 0303 | 1 100 001 111 | | BRN | LCLOM | TECHNICAL BRANCH |
| 0301 | | 1 000 101 110 | | W,BXC | | |
| 0302 | 0261 | 1 011 000 111 | | BRN | LCLOG | |
| 0303 | | 0 000 110 100 | LCLOM | CLS | | CL. ALL FLAGS(FOR TWO OP. ROUTINES) |
| 0304 | | 0 011 000 100 | | SS3 | | SET OP. FLAG |
| 0305 | 0042 | 0 010 001 011 | | BRN | LCLO6 | GO TO ROUTINE EXIT |
| 0306 | | 1 010 111 010 | LADJ17 | XS,CPCC | | CHECK IF ROUND UP IS NEEDED |
| 0307 | 0376 | 1 111 111 011 | | BRN | LADJ18 | NO |
| 0310 | | 0 111 100 110 | | M,CP1C | | YES |
| 0311 | 0376 | 1 111 111 011 | | BRN | LADJ18 | |
| 0312 | | 0 011 010 100 | LEOLT | YS3 | | IS OP.FLG.SET ? |
| 0313 | 0363 | 1 111 001 111 | | BRN | LEQL3 | NO |
| 0314 | 0270 | 1 011 100 011 | | BRN | LCLO5 | YES |
| 0315 | | 0 000 011 100 | LDSP51 | PRS | | DECREMENT POINTER |
| 0316 | | 0 111 010 100 | | YS7 | | IS THIS A DATA ENTRY |
| 0317 | 0124 | 0 101 010 011 | | BRN | LDSP52 | YES, CONTINUE TEST |
| 0320 | 0027 | 0 001 011 111 | | BRN | LDSP5 | NO, CONTINUE DECREMENT |
| 0321 | | 0 110 100 000 | LPERO | YADP | | CHECK IF AUTO D.P. FLAG SET |
| 0322 | | 1 011 010 100 | | YS11 | | IS IT SET? |
| 0323 | 0203 | 1 000 001 111 | | BRN | LPER3 | NO, GO TO NORMAL PATH |
| 0324 | | 1 011 100 100 | | RS11 | | YES, RESET EXTERNAL FLAG |
| 0325 | | 0 111 010 100 | | YS7 | | IS IT MANUAL DATA ENTRY |

MAIN UNIT LISTING (ROM A-2)—Continued

| LINE # | CURR ADDR | BRAN ADDR | OPERATION CODE BIT PATTERN | | | | |
|---|---|---|---|---|---|---|---|
| 217 | 0326 | 0330 | 1 101 100 011 | | BRN | LPER32 | YES |
| 218 | 0327 | 0203 | 1 000 001 111 | | BRN | LPER3 | NO: GO TO NORMAL PATH |
| 219 | 0330 | | 0 110 010 100 | LPER32 | YS6 | | WAS DEC POINT SET? |
| 220 | 0331 | 0335 | 1 101 110 111 | | BRN | LPER33 | NO: |
| 221 | 0332 | 0203 | 1 000 001 111 | | BRN | LPER3 | YES: GO TO NORMAL PATH |
| 222 | 0333 | | 1 000 000 000 | LRET3 | TTP | | NEW ADDRESS INTO PRGM.COUNTER |
| 223 | 0334 | | 1 100 010 000 | | ROM 6 | | |
| 224 | 0335 | | 0 110 001 110 | LPER33 | W.CTA | | STORE DATA TEMP IN A-REG (FOR PROCESSING) |
| 225 | 0336 | | 1 010 101 000 | | MTC | | GET INT.FLG.VECTOR FOR TEST |
| 226 | 0337 | | 1 101 001 100 | | PT13 | | PREPARE D.P.L. FLAG TEST |
| 227 | 0340 | 0342 | 1 110 001 011 | | BRN | LPER35 | |
| 228 | 0341 | | 1 111 101 010 | LPER34 | X.AP1A | | INCREMENT EXPONENT |
| 229 | 0342 | | 0 101 100 010 | LPER35 | P.CM1C | | DECREMENT D.P.L. FLAG |
| 230 | 0343 | 0341 | 1 110 000 111 | | BRN | LPER34 | NO CARRY |
| 231 | 0344 | | 1 110 101 110 | | W.AXC | | RESTORE ADJUSTED DATA IN C-REG |
| 232 | 0345 | 0203 | 1 000 001 111 | | BRN | LPER3 | |
| 233 | 0346 | | 0 000 000 000 | | DUMMY | | |
| 234 | 0347 | | 1 001 101 010 | LDGTC | X.AM1 | | CHECK ENTERED DIGIT |
| 235 | 0350 | 0113 | 0 100 101 111 | | BRN | LIOS1/ | NO CARRY, CALLI/O |
| 236 | 0351 | | 0 000 001 100 | | PT0 | | CARRY, START ALPHA ROUTINE |
| 237 | 0352 | 0052 | 0 010 101 011 | | BRN | LALFA | |
| 238 | 0353 | | 1 110 010 000 | LDFL5 | ROM 7 | | |
| 239 | 0354 | | 1 000 011 000 | LRES9 | LDC8 | | PREPARE HIGHEST D.S. ADDR. TO BE RESET |
| 240 | 0355 | 0013 | 0 000 101 111 | | BRN | LRES69 | GO TO RESTORE POINTER |
| 241 | 0356 | | 1 111 011 000 | LPAK2 | LDC15 | | MASK.PART 4 |
| 242 | 0357 | | 0 101 000 000 | | IS2 | | |
| 243 | 0360 | | 0 010 101 000 | | AND | | MASK- OUT BITS 11 THROUGH 16 |
| 244 | 0361 | | 1 001 000 000 | | IS1 | | |
| 245 | 0362 | 0333 | 1 101 101 111 | | BRN | LRET3 | |
| 246 | 0363 | | 0 000 010 000 | LFOL3 | ROM 0 | | SWITCH TO ROM0 |
| 247 | 0364 | | 1 011 111 000 | LMTX2 | DSTC | | READ DATA OUT OF D.S. INTO C-REG |
| 248 | 0365 | 0230 | 1 001 100 011 | | BRN | LMTX20 | |
| 249 | 0366 | | 0 010 101 000 | LDGTA | CXM | | STORE UPDATED INT.FLG.VECTOR |
| 250 | 0367 | 0347 | 1 110 011 111 | | BRN | LDGTC | |
| 251 | 0370 | | 1 011 101 110 | LMAN8 | W.ZTA | | PREPARE A-REG TO ACCEPT DIGIT |
| 252 | 0371 | | 0 000 010 000 | | ROM 0 | | GO TO ACCEPT KEYCODE |
| 253 | 0372 | | 0 011 001 110 | LEOLB | W.ZTC | | PREPARE ZERO IN C-REG |
| 254 | 0373 | | 0 100 101 000 | | CTS | | LOAD IT INTO D-REG |
| 255 | 0374 | | 0 010 001 110 | | W.BTC | | RESTORE DATA IN C-REG |
| 256 | 0375 | 0245 | 1 010 010 111 | | BRN | LEOLC | DO A ACC + |
| 257 | 0376 | | 1 110 010 000 | LADJ18 | ROM 7 | | |
| 258 | 0377 | 0204 | 1 000 010 011 | | BRN | LCL01 | |

MAIN UNIT LISTING (ROM A-3)

| LINE # | CURR ADDR | BRAN ADDR | OPERATION CODE BIT PATTERN | | | | |
|---|---|---|---|---|---|---|---|
| 3 | 0000 | | 0 000 000 000 | | DUMMY | | |
| 4 | 0001 | | 0 010 001 110 | LERR37 | W.BTC | | RESTORE ORIG DATA DAMAGED BY TEST |
| 5 | 0002 | 0221 | 1 001 000 111 | | BRN | LERR30 | |
| 6 | 0003 | | 0 101 100 010 | LERR33 | P.CM1C | | DECREMENT LAST INT. DIGIT |
| 7 | 0004 | 0271 | 1 011 100 111 | | BRN | LERR34 | NO CARRY, TEST CONTINUE |
| 8 | 0005 | | 0 001 000 100 | | SS1 | | CARRY, ODD, SET ODD-AUX. FLAG |
| 9 | 0006 | 0010 | 0 000 100 011 | | BRN | LG001 | |
| 10 | 0007 | | 1 010 010 000 | LG002 | ROM 5 | | |
| 11 | 0010 | | 0 000 111 110 | LG001 | S.ZTB | | |
| 12 | 0011 | | 0 010 001 110 | | W.BTC | | |
| 13 | 0012 | | 1 100 001 100 | | PT12 | | |
| 14 | 0013 | 0007 | 0 000 011 111 | | BRN | LG002 | |
| 15 | 0014 | | 1 001 001 110 | LCLA3 | W.SRC | | PREPARE LABEL HEAD LOADING |
| 16 | 0015 | | 1 001 001 110 | | W.SRC | | PREPARE LABEL HEAD LOADING |
| 17 | 0016 | | 1 101 001 100 | | PT13 | | PREPARE LABEL HEAD LOADING |
| 18 | 0017 | | 1 000 011 000 | | LDC8 | | LOAD 8 |
| 19 | 0020 | 0025 | 0 001 010 111 | | BRN | LCLA4 | BRANCH (HARDWARE NOP) |
| 20 | 0021 | | 1 000 010 000 | LEE00 | ROM 4 | | |
| 21 | 0022 | | 1 000 010 100 | | YS8 | | IS IT EQUAL ROUTINE ? |
| 22 | 0023 | 0062 | 0 011 001 011 | | BRN | LEOLP | YES,GO TO LEVEL TEST |
| 23 | 0024 | 0021 | 0 001 000 111 | | BRN | LEE00 | NO, SKIP LEVEL TEST |
| 24 | 0025 | | 0 111 011 000 | LCLA4 | LDC7 | | LOAD 7 |
| 25 | 0026 | 0372 | 1 111 101 011 | | BRN | LCLA20 | |
| 26 | 0027 | | 1 000 101 110 | LPARA | W.BXC | | SAVE DATA TEMPORARILY IN B-REG |
| 27 | 0030 | | 1 010 101 000 | | MTC | | GET IN. FLG. VECTOR FOR TEST |
| 28 | 0031 | | 1 001 001 100 | | PT9 | | PREPARE LEVEL INDICATOR FOR TEST |
| 29 | 0032 | | 1 110 100 010 | | P.AXC | | LEVEL INDICATOR TO A-REG |
| 30 | 0033 | | 0 101 011 000 | | LDC5 | | LIMIT SET TO C-REG |
| 31 | 0034 | | 0 000 111 100 | | PLS | | POINTER ADJUSTMENT |
| 32 | 0035 | | 0 001 000 010 | | P.AMC | | COMPARISON |
| 33 | 0036 | 0371 | 1 111 100 111 | | BRN | LSER1 | NO CARRY, IT IS FIVE, GO TO ERROR ROUTINE |
| 34 | 0037 | 0310 | 1 100 100 011 | | BRN | LPAR2 | CARRY, IT IS LESS THAN FIVE, CONTINUE |
| 35 | 0040 | 0212 | 1 000 101 011 | LPERA | BRN | LPER2 | PREPARE SYMBOL FOR PRINT |
| 36 | 0041 | | 0 010 010 000 | LFIN2 | ROM 1 | | GO TO LSUPA |
| 37 | 0042 | | 0 010 010 000 | LFIN3 | ROM 1 | | GO TO SUPERVISOR LSUPB |
| 38 | 0043 | | 1 000 101 110 | LPER3 | W.BXC | | RESTORE RESULT IN C-REG |
| 39 | 0044 | | 0 101 101 010 | | X.CM1C | | DECREMENT DATAEXPONENT |
| 40 | 0045 | | 0 101 101 010 | | X.CM1C | | BY TWO |
| 41 | 0046 | | 1 000 101 110 | | W.BXC | | GET INT. FLG VECTOR BACK TO C-REG |
| 42 | 0047 | | 1 001 001 110 | | W.SRC | | OP. CODE ALIGNMENT SHIFT |
| 43 | 0050 | | 1 001 001 110 | | W.SRC | | OP. CODE ALIGNMENT SHIFT |
| 44 | 0051 | | 0 110 100 100 | | RS6 | | |
| 45 | 0052 | | 0 101 110 010 | | WP.CM1C | | IS IT ZERO? |
| 46 | 0053 | 0352 | 1 110 101 011 | | BRN | LPER4 | NO, CONTINUE TEST |
| 47 | 0054 | | 0 010 001 110 | LFIN1 | W.BTC | | YES, FINISHED, RESTORE DATA IN C-REG |
| 48 | 0055 | 0041 | 0 010 000 111 | | BRN | LFIN2 | |
| 49 | 0056 | | 1 011 001 100 | LGT2 | PT11 | | PREPARE ADDRESS |
| 50 | 0057 | | 1 000 011 000 | | LDC8 | | |
| 51 | 0060 | 0110 | 0 100 100 101 | | JSB | LDSC20 | |
| 52 | 0061 | 0071 | 0 011 100 111 | | BRN | LGT3 | |

MAIN UNIT LISTING (ROM A-3)—Continued

```
CURR  BRAN  OPERATION CODE
ADDR  ADDR  BIT PATTERN

0062        0 010 101 000  LEOLP    CXM              GET INT.FLG.VECTOR FOR TES
0063        1 001 001 100           PT9              PREPARE PAR.LEVEL INDICATOR TES
0064        0 001 100 010           P.CM1            IS IT ZERO?
0065  0203  1 000 001 111           BRN     LERRG    NO.TROUBLE
0066        0 010 101 000           CXM              YES.O.K. RESTORE C-REG
0067        1 010 001 100           PT10
0070  0021  0 001 000 111           BRN     LEE00    LEVEL TEST FINISHED
0071        1 110 010 000  LGT3     ROM 7
0072        1 001 010 100  LPRS60   YS9              SI SHIFT KEY ROUTINE FLAG SET ?
0073  0347  1 110 011 111           BRN     LPRS61   NO
0074        1 001 100 100           RS9              YES: RESET IT
0075        1 011 001 100           PT11             PREPARE POINTER TO LOAD SYMBOL CODE
0076        1 100 010 000           ROM 6            GO BACK
0077        1 100 010 000  LLAH1    ROM 6            GO TO LABEL HEAD ROUTINE BEGINNIN
0100        1 010 101 000  LDSC1    MTC              GET INT. FLG. VECTOR FOR UPDATE
0101        1 001 001 100           PT9              PREPARE LEVEL INDICATOR FOR INCREMENT
0102        0 111 100 010           P.CPIC           INCREMENT LEVEL INDICATOR BY ONE
0103        0 110 001 110           W.CTA            COPY IT INTO A-REG (FOR ADDR. GEN.)
0104        0 010 101 000  LDSC2    CXM              STORE IT BACK IN M-REG
0105        0 100 001 110           W.SLA            PREPARE LEVEL IND. FOR ADDRESS
0106        0 100 001 110           W.SLA
0107        1 110 101 110           W.AXC
0110        1 010 001 100           PT10
0111        0 011 010 010  LDSC20   WP.ZTC
0112        0 111 101 110           W.CPIC
0113        0 011 011 110           S.ZTC
0114        1 100 001 100           PT12
0115        1 111 011 000           LDC15
0116        1 001 110 000           ATDS
0117        1 011 100 100           RS11
0120        1 100 001 100           PT12
0121        0 000 110 000           RETURN           END OF THE SUBROUTINE
0122        1 000 010 100  LCODZ    YS8              CHECK IF RIGHT PAR.FLG IS SET
0123  0376  1 111 111 011           BRN     LCOD0
0124        0 100 000 100           SS4              YES.SET RIGHT PAR.AUX.FLAG
0125  0376  1 111 111 011           BRN     LCOD0    NO.NORMAL V KEY PATH
0126        0 011 000 100  LPAR6    SS3              SET OP.FLAG
0127  0322  1 101 001 011           BRN     LPAR3
0130        0 101 110 010  LPERS    WP.CMIC          IS IT TWO?
0131  0054  0 010 110 011           BRN     LFIN1    NO: FINISHED
0132        1 011 000 100  LFER6    SS11             YES: SET SINGLE OP. FLAG
0133        1 000 010 000           ROM 4            GO TO MULTIPLICATION ROUTINE LMUL3
0134        1 010 101 000  LRIPD    MTC              GET INT. FLG. VECTOR FOR UPDATE
0135        0 110 001 110           W.CTA            COPY IN INTO A-REG
0136        1 001 001 100           PT9              PREPARE LEVEL INDICATOR
0137  0240  1 010 000 011           BRN     LRIPX    TECHNOCAL BRANCH
0142        1 100 010 000  LGRT2    ROM 6
0141        1 100 101 000  LRIPY    DNR
0142        1 011 111 000           DSTC             READ DATA OUT OF THE STACK
0143        0 100 101 000           CTS              SEND IT TO D-REG
0144  0153  0 110 110 001           JSB     LDSC3    PREPARE OP.CODE STACK
0145        1 001 001 110           W.SRC            OP.CODE STACK
0146        1 001 001 110           W.SRC            UP
0147        1 011 110 000           DTDS             STORE UPDATED OP. CODE STACK IN D.S.
0150        1 010 101 000           MTC              GET INT. FLG. VECTOR FOR UPDATE
0151        1 110 110 010           WP.AXC           GET OLD OP. CODE INTO INT. FLG. VECTOR
0152        0 010 101 000           CXM              STORE UPDATED INT. FLG. VECTOR
0153  0254  0 010 110 011           BRN     LFIN1    GO TO ROUTINE CLOSING PART
0154        0 011 001 110  LDSC3    W.ZTC
0155        0 111 101 110           W.CPIC
0156        1 111 011 000           LDC15
0157        1 001 110 000           ATDS             CALL D.S.
0160        1 011 100 100           RS11             RESET FLAG
0161        1 011 111 000  LDSC40   DSTC             READ CURRENT OP. CODE STACK TO C-REG
0162        0 110 001 110           W.CTA            OP. CODE STACK TO A-REG FOR UPDATE
0163  0246  1 010 011 011           BRN     LDSC30
0164        0 000 010 000  LPRS62   ROM 0
0165        1 100 010 000  LCLAB    ROM 6
0166        0 100 001 100  LERR36   PT4              SET POINTER FOR "NOTE 09"
0167  0377  1 111 111 111           BRN     LERRZ
0170        1 100 101 000  LERR31   DNR
0171        0 100 101 000           CTS              COPY Y BACK TO D-REG
0172        0 001 111 010  LERR40   XS.CM1           CHECK EXPONENT SIGN
0173  0254  1 010 110 011           BRN     LERR32   NOT INTEGER. ERROR
0174        0 001 001 100           PT1              CARRY. POSITIVE EXP. COUTINUE
0175        0 001 100 010           P.CM1            CHECK EXPONENTS MOST SIGNIFICANT DIGIT
0176  0010  0 000 100 011           BRN     LG001    NONZERO. EVEN INTEGER
0177        0 110 001 010           X.CTA            ZERO. TEST CONTINUE. COPY EXP TO A-REG
0200        0 011 001 010           X.ZTC
0201        1 100 001 100           PT12             PREPARE PROPER POINTER
0202  0227  1 001 011 111           BRN     LERR55
0203        0 010 101 000  LERRG    CXM              RESTORE INT.FLG.VECTOT IN M-REG
0204  0245  1 010 010 111           BRN     LEEFE
0205        0 010 001 110  LIMP1    W.ATC            RESTORE DATA IN C-REG
0206        0 100 002 100           SS4              SET AUX. FLAG
0207        0 000 010 000           ROM 0            GO TO MULTIPLICATION ROUTINE (LMUL2)
0210  0077  0 011 111 111  LLAHA    BRN     LLAH1    GO TO LABEL HEAD ROUTINE BEGINNIN
0211        0 000 000 000           DUMMY
0212        0 000 111 100  LPER2    PLS
0213        0 100 011 000           LDC4             %
0214        1 111 011 000           LDC15            BLANK
0215        0 000 010 000           ROM 0
0216        0 011 001 100  LERB     PT3              SET POINTER FOR "NOTE 08"
0217  0377  1 111 111 111           BRN     LERRZ
0220  0343  0 010 001 111  LPERC    BRN     LPER3
0221        1 011 010 100  LERR30   YS11             IS IT SINGLE OP. OPERATION?
0222  0170  0 111 100 011           BRN     LERR31   NO. IT IS X  Y
0223  0166  0 111 011 011           BRN     LERR36   YES.IT IS LG OR LOG ROUTINE
0224  0371  1 111 100 111  LERIA    BRN     LSER1    GOTO NOTE 05 MESSAGE
0225        0 101 000 100  LPAR5    SS5              SET AUXILIARY FLAG
0226        1 110 010 000           ROM 7            SWITCH TO ROM 7
0227        0 000 011 100  LERR55   PRS              POINTER DECREMENT
0230        1 101 101 010           X.AM1A           DECREMENT EXPONENT
0231  0227  1 001 011 111           BRN     LERR55   NO CARRY. CONTINUE IN DECR
0232        0 001 110 010           WP.CM1           CARRY. POINTER ADJUSTED. CHECK TAIL
0233  0254  1 010 110 011           BRN     LERR32   NONZERO TAIL: NOT INTEGER
0234        0 000 111 100           PLS              CARRY. ZERO TAIL: INTEGER. CHECK CONT
0235  0271  1 011 100 111           BRN     LERR34
```

MAIN UNIT LISTING (ROM A-3) -- Continued

| CURR ADDR | BRAN ADDR | OPERATION CODE BIT PATTERN | | | | |
|---|---|---|---|---|---|---|
| 0236 | 0122 | 0 101 001 011 | LCODW | BRN | LCODZ | |
| 0237 | 0140 | 0 110 000 011 | LGRT1 | BRN | LGRT2 | |
| 0240 | | 0 101 100 010 | LRIPX | P.CMIC | | DECREMENP LEVEL INDICATOR |
| 0241 | 0143 | 0 100 010 001 | | JSB | LDSC2 | STORE IT AND CALL D.S.STACK |
| 0242 | 0141 | 0 110 000 111 | | BRN | LRIPY | |
| 0243 | | 0 000 000 000 | | DUMMY | | |
| 0244 | 0322 | 1 101 001 011 | LPRXH | BRN | LPAR3 | GO TO LPAR3 |
| 0245 | | 1 110 010 000 | LFFEF | ROM 7 | | |
| 0246 | | 0 100 001 110 | LDSC30 | W.SLA | | |
| 0247 | | 0 100 001 110 | | W.SLA | | DOWN |
| 0250 | | 0 011 001 100 | | PT3 | | PREPARE OP. CODE MANIPULATION |
| 0251 | | 0 000 110 000 | | RETURN | | END OF THE SUBROUTINE |
| 0252 | | 0 011 001 110 | LCLOM | W.ZTC | | SET ZERO FOR RESULT |
| 0253 | | 0 100 010 000 | LCLOD | ROM 2 | | |
| 0254 | | 1 000 101 110 | LERR32 | W.BXC | | SEND EXP.TO B I MANT. TO C-REG |
| 0255 | | 0 100 101 000 | | CTS | | STORE MANTISSA IN STACK |
| 0256 | 0216 | 1 000 111 011 | | BRN | LERR | |
| 0257 | | 0 111 110 000 | LCLA6 | CTT | | COPY IT INTO T-REG |
| 0260 | | 1 000 010 000 | | TTP | | LOAD ZEROS FROM T-REG TAIL INTO PRGM.COUNTER |
| 0261 | 0165 | 0 111 010 111 | | BRN | LCLA8 | |
| 0262 | 0126 | 0 101 011 011 | LIMPA | BRN | LPAR6 | GO TO LEFT PAR.ROUTINE |
| 0263 | | 1 011 010 100 | | YS11 | | IS IT SINGLE OP. OPERATION? |
| 0264 | 0364 | 1 111 010 011 | | BRN | LERR25 | NO: GO TO CHECK VALUE OF Y |
| 0265 | | 1 000 010 100 | | YS8 | | IS IT LOG? |
| 0266 | 0275 | 1 011 110 111 | | BRN | LERR24 | NO. SET ONE FOR RESULT |
| 0267 | | 1 101 001 100 | | PT13 | | SET POINTER FOR "NOTE 12" |
| 0270 | 0363 | 1 111 001 111 | | BRN | LERR39 | |
| 0271 | | 0 101 100 010 | LERR34 | P.CMIC | | DECREMENT LAST INT. DIGIT |
| 0272 | 0303 | 0 000 001 111 | | BRN | LERR33 | NO CARRY TEST CONTINUE |
| 0273 | 0010 | 0 000 100 011 | | BRN | LG001 | CARRY EVEN. GO TO NORMAL OP. |
| 0274 | 0214 | 0 000 110 011 | LCLAC | BRN | LCLA3 | |
| 0275 | | 0 011 001 110 | LERR24 | W.ZTC | | |
| 0276 | | 1 100 001 100 | | PT12 | | |
| 0277 | | 0 001 011 000 | | LDC1 | | |
| 0300 | 0253 | 1 010 101 111 | | BRN | LCLOD | |
| 0301 | | 0 000 110 100 | LPARZ | CLS | | CLEAR ALL STATUS BITS |
| 0302 | | 1 100 101 000 | | DNR | | PREPARE D-REG RESET |
| 0303 | | 0 011 001 110 | | W.ZTC | | CLEAR C-REG |
| 0304 | | 0 100 101 000 | | CTS | | ZERO TO D-REGISTER |
| 0305 | | 0 010 000 100 | | SS2 | | SET LEFT PAR. FLG. |
| 0306 | | 0 011 000 100 | | SS3 | | SET OP. FLAG |
| 0307 | 0042 | 0 010 001 011 | | BRN | LFIN3 | GO TO ROUTINE EXIT |
| 0310 | | 0 011 010 100 | LPAR2 | YS3 | | CHECK OP. FLAG |
| 0311 | 0205 | 1 000 010 111 | | BRN | LIMP1 | NOT SET: GO TO IMPLY MULTIPLICATION |
| 0312 | | 0 010 010 100 | | YS2 | | SET. CHECK LEFT PAR. FLAG |
| 0313 | 0126 | 0 101 011 011 | | BRN | LPAR6 | NOT SET.GO TO PRINT DATA |
| 0314 | | 1 010 101 000 | | MTC | | SET. NESTED PARENTHESES. GET INT. FLG. VECTOR |
| 0315 | | 0 011 001 100 | | PT3 | | GENERATE OP. CODE TO BE STORED |
| 0316 | | 0 000 011 000 | | LDC0 | | |
| 0317 | | 0 001 011 000 | | LDC1 | | SET ADD. AS OP CODE |
| 0320 | | 0 010 101 000 | | CXM | | STORE NEW INT. FLG. VECTOR IN M-REG |
| 0321 | | 0 000 101 110 | | W.ZTA | | SET "ZERO" FOR DATA TO BE STORED |
| 0322 | 0077 | 0 100 000 001 | LPAR3 | JSB | LDSC1 | GO TO INCR. LEV. IND. AND SEND DATA TO STACK |
| 0323 | | 1 100 101 000 | | DNR | | RESTORE DATA IN C REG |
| 0324 | | 1 011 110 000 | | DTOS | | STORE DATA IN D.S. STACK |
| 0325 | 0153 | 0 110 110 001 | | JSB | LDSC3 | PREPARE OP. CODE STACK |
| 0326 | | 1 010 101 000 | | MTC | | INT. FLG. VECTOR OUT |
| 0327 | | 1 001 010 010 | | WP.SRC | | PREPARE OP. CODE TO BE EXECUTED |
| 0330 | | 1 001 010 010 | | WP.SRC | | TO BE STACKED |
| 0331 | | 1 110 101 010 | | X.AXC | | ADD NEW OP. CODE TO STACK |
| 0332 | | 1 110 111 010 | | XS.AXC | | NEW OP. CODE STACK IN A-REG |
| 0333 | | 0 011 010 010 | | WP.ZTC | | CLEAR OP. CODES IN INT. FLG. VECTOR |
| 0334 | | 0 010 101 000 | | CXM | | STORE NEW INT. FLG. VECTOR IN M-REG |
| 0335 | | 1 110 101 110 | | W.AXC | | NEW OP. CODE STACK IN C-REG |
| 0336 | | 1 011 110 000 | | DTOS | | STORE NEW OP. CODE STACK IN D.S. |
| 0337 | | 1 101 001 100 | | PT13 | | |
| 0340 | | 1 111 011 000 | LPAR4 | LDC15 | | BLANKS |
| 0341 | | 1 111 101 100 | | YP15 | | |
| 0342 | 0340 | 1 110 000 011 | | BRN | LPAR4 | |
| 0343 | | 0 111 110 000 | | CTT | | GET BLANKS INTO T-REG |
| 0344 | | 1 011 001 100 | | PT11 | | |
| 0345 | | 0 010 011 000 | | LDC2 | | LOAD CODE FOR SYMBOL ( |
| 0346 | 0225 | 1 001 010 111 | | BRN | LPAR5 | GO TO FORCED PRINT ROUTINE |
| 0347 | | 0 001 100 100 | LPRS61 | RS1 | | |
| 0350 | | 1 010 100 100 | | RS10 | | |
| 0351 | 0164 | 0 111 010 011 | | BRN | LPRS62 | |
| 0352 | | 0 101 110 010 | LPER4 | WP.CMIC | | IS IT ONE? |
| 0353 | 0130 | 0 101 100 011 | | BRN | LPER5 | NO. CONTINUE IN TEST |
| 0354 | 0132 | 0 101 101 011 | | BRN | LPER6 | YES. GO TO COMMON PATH |
| 0355 | | 0 011 001 110 | LERR26 | W.ZTC | | |
| 0356 | | 0 101 101 110 | | W.CMIC | | |
| 0357 | | 0 011 011 110 | | S.ZTC | | |
| 0360 | | 1 000 100 100 | | RS8 | | |
| 0361 | | 0 000 001 100 | | PT0 | | |
| 0362 | | 1 110 010 000 | | ROM 7 | | |
| 0363 | | 1 110 010 000 | LERR39 | ROM 7 | | |
| 0364 | | 1 100 101 000 | LERR25 | DNR | | GET Y FOR TEST |
| 0365 | | 0 001 111 110 | | S.CMI | | |
| 0366 | 0355 | 1 110 110 111 | | BRN | LERR26 | Y IS NEGATIVE |
| 0367 | | 1 000 100 100 | | RS8 | | TO AVOID COLISION WITH RPAR.ROUTINE |
| 0370 | 0252 | 1 010 101 011 | | BRN | LCLOM | |
| 0371 | | 1 110 010 000 | LSER1 | ROM 7 | | SWITCH TO ROM 7 |
| 0372 | | 1 000 001 100 | LCLA20 | PT8 | | PREPARE TRUNCATION |
| 0373 | | 0 011 010 010 | | WP.ZTC | | TRUNCATE FRACTIONAL PART OF LABEL NUMBER |
| 0374 | | 0 110 001 110 | LCLA5 | W.CTA | | STORE MASTER LABEL IN A-REG |
| 0375 | 0257 | 1 010 111 111 | | BRN | LCLA6 | |
| 0376 | | 1 000 010 000 | LCODW | ROM 4 | | |
| 0377 | | 1 110 010 000 | LERRZ | ROM 7 | | |

MAIN UNIT LISTING (ROM A-4)

| LINE # | CURR ADDR | BRAN ADDR | OPERATION CODE BIT PATTERN | | | | |
|---|---|---|---|---|---|---|---|
| 2 | 0000 | | 0 000 000 000 | | DUMMY | | |
| 3 | 0001 | | 0 000 000 000 | | DUMMY | | |
| 4 | 0002 | | 0 010 101 000 | LEOL19 | CXM | | PREPARE OP.CODE SET |
| 5 | 0003 | | 0 111 101 010 | | X,CP1C | | SET OP.CODE FOR + INSTEAD |
| 6 | 0004 | | 0 010 101 000 | | CXM | | RESTORE C AND M-REGISTERS |
| 7 | 0005 | | 1 011 001 100 | | PT11 | | PREPARE SYMBOL CODE LOAD |
| 8 | 0006 | 0126 | 0 101 011 011 | | BRN | LEOL10 | GO TO SUBTOTAL ROUTINE |
| 9 | 0007 | | 1 010 010 000 | LXTY2 | ROM 5 | | GO TO START POINT OF THE EXPO-BLOCK |
| 10 | 0010 | | 0 001 011 000 | LFLG5 | LDC1 | | SET CONDITION NOT MET FLAG |
| 11 | 0011 | | 0 010 101 000 | LFLG6 | CXM | | STORE UPDATED INT. FLG. VECTOR |
| 12 | 0012 | 0036 | 0 001 111 011 | | BRN | LFLG3 | |
| 13 | 0013 | | 1 000 101 110 | LINTE3 | W,BXC | | SAVE DATA TEMPORARILY IN B-REG |
| 14 | 0014 | 0046 | 0 010 011 011 | | BRN | LFLG9 | GO TO COMMON PART WITH OTHER PRGM. FLG. ROUTINES |
| 15 | 0015 | | 0 101 000 000 | LCLA10 | IS2 | | |
| 16 | 0016 | | 0 010 001 000 | | XOR | | COMPARE WITH MASTER MASK |
| 17 | 0017 | | 1 001 000 000 | | IS1 | | |
| 18 | 0020 | | 0 111 111 000 | | TTC | | RESULT OF COMPARISON INTO C-REG |
| 19 | 0021 | 0216 | 1 000 111 011 | | BRN | LCLA11 | |
| 20 | 0022 | 0054 | 0 010 110 011 | LEOLC | BRN | LEOL8 | GO TO CHECK SYNTAX |
| 21 | 0023 | | 0 000 011 000 | LFLG1 | LDC0 | | RESET DIGIT INTERPRETATION CODE TO ZERO |
| 22 | 0024 | | 0 010 101 000 | | CXM | | STORE UPDATED INT. FLG. VECTOR IN M-REG |
| 23 | 0025 | 0077 | 0 100 000 001 | | JSB | LADDR1 | GET PROGRAM FLAG VECTOR |
| 24 | 0026 | | 0 000 011 100 | LFLG2 | PRS | | POINTER DECREMENT |
| 25 | 0027 | | 1 101 101 010 | | X,AM1A | | DECREMENT ENTERED DIGIT TO CHECK ITS VALUE |
| 26 | 0030 | 0026 | 0 001 011 011 | | BRN | LFLG2 | NO CARRY: CONTINUE IN POINTER ADJUSTMENT |
| 27 | 0031 | | 1 000 101 110 | LFLG7 | W,BXC | | RESTORE DATA IN B-REG: PRGM. FLG. VECTOR TO C-REG |
| 28 | 0032 | | 1 001 010 100 | | YS9 | | CHECK AUXILIARY FLAG |
| 29 | 0033 | 0041 | 0 010 000 111 | | BRN | LFLG8 | GO TO PROGRAM FLAG INTERROGATION |
| 30 | 0034 | | 0 001 011 000 | | LDC1 | | SET PROGRAM FLAG |
| 31 | 0035 | | 1 011 110 000 | | DTDS | | STORE UPDATED PRGM. FLG. VECTOR |
| 32 | 0036 | | 1 001 100 100 | LFLG3 | RS9 | | RESET AUXILIARY FLAG IF SET |
| 33 | 0037 | | 0 010 001 110 | | W,BTC | | RESTORE DATA IN C-REG |
| 34 | 0040 | | 0 010 010 000 | | ROM 1 | | GO TO SUPERVISOR LSUPR |
| 35 | 0041 | | 0 110 100 010 | LFLG8 | P,ZMC | | INTERROGATE FLAG VALUE |
| 36 | 0042 | 0045 | 0 010 010 111 | | BRN | LFLG4 | ZERO : CONDITON NOT MET |
| 37 | 0043 | | 0 000 011 000 | | LDC0 | | RESET INTERROGATED PROGRAM FLAG |
| 38 | 0044 | | 1 001 000 100 | | SS9 | | ONE : CONDITION MET : INDICATE THIS SITUATION |
| 39 | 0045 | | 1 011 110 000 | LFLG4 | DTDS | | STORE UPDATED PRGM. FLG. VECTOR |
| 40 | 0046 | | 1 010 101 000 | LFLG9 | MTC | | PREPARE INT. FLG. VECTOR |
| 41 | 0047 | | 0 110 001 100 | | PT6 | | PREPARE PROGRAM JUMP CONDITION FLAG |
| 42 | 0050 | | 1 001 010 100 | | YS9 | | CHECK CONDITION |
| 43 | 0051 | 0010 | 0 000 100 011 | | BRN | LFLG5 | NOT MET |
| 44 | 0052 | | 0 000 011 000 | | LDC0 | | MET : SET CONDITION MET FLAG |
| 45 | 0053 | 0011 | 0 000 100 111 | | BRN | LFLG6 | STORE UPDATED INT. FLG. VECTOR |
| 46 | 0054 | | 0 011 010 100 | LEOL8 | YS3 | | IS OP. FLAG SET? |
| 47 | 0055 | 0361 | 1 111 000 111 | | BRN | LEOL9 | NO. NORMAL PATH |
| 48 | 0056 | 0002 | 0 000 001 011 | | BRN | LEOL19 | YES. "SUBTOTAL" PATH |
| 49 | 0057 | | 0 100 010 000 | LCLOK | ROM 2 | | |
| 50 | 0060 | | 0 101 110 010 | LTW06 | WP,CM1C | | IS OP. CODE EQUAL TO 6? |
| 51 | 0061 | 0353 | 1 110 101 111 | | BRN | LTW07 | NO: CONTINUE IN THE TEST |
| 52 | 0062 | 0065 | 0 011 011 001 | | JSB | LCAL1 | CALL D.S. AND GET DATA |
| 53 | 0063 | | 1 100 101 000 | | DNR | | RESTORE OLD DATA IN C-REG |
| 54 | 0064 | | 0 100 101 000 | | CTS | | COPY IT BACK TO STACK |
| 55 | 0065 | 0264 | 1 011 010 011 | | BRN | LLDD2 | GO TO STORE DATA |
| 56 | 0066 | | 0 010 001 110 | LCAL1 | W,BTC | | ADDRESS INTO C-REG |
| 57 | 0067 | | 1 001 110 000 | | ATDS | | CALL D.S. |
| 58 | 0070 | | 1 011 010 100 | | YS11 | | CHECK IF FLAG |
| 59 | 0071 | 0371 | 1 111 100 111 | | BRN | LERR | NO: TROUBLE: D.S. NOT FOUND |
| 60 | 0072 | | 1 011 111 000 | LCAL3 | DSTC | | READ D.S INTO C-REG |
| 61 | 0073 | | 1 000 101 110 | | W,BXC | | SAVE DATA IN B-REG |
| 62 | 0074 | | 1 011 100 100 | | RS11 | | YES. O.K. |
| 63 | 0075 | | 0 110 010 100 | | YS6 | | IS THIS AN ACC ROUTINE ? |
| 64 | 0076 | 0125 | 0 101 010 111 | | BRN | LRET1 | NO. GO TO SUBROUTINE END |
| 65 | 0077 | 0365 | 1 111 010 111 | | BRN | LCAL0 | YES. GO TO DATA EXCHANGE |
| 66 | 0100 | | 0 011 001 110 | LADDR1 | W,ZTC | | |
| 67 | 0101 | | 0 111 101 110 | | W,CP1C | | |
| 68 | 0102 | | 1 100 001 100 | | PT12 | | |
| 69 | 0103 | | 1 111 011 000 | | LDC15 | | |
| 70 | 0104 | | 0 111 011 000 | | LDC7 | | |
| 71 | 0105 | | 1 001 110 000 | | ATDS | | |
| 72 | 0106 | 0072 | 0 011 101 011 | | BRN | LCAL3 | |
| 73 | 0107 | | 1 000 101 110 | LYLE3 | W,BXC | | SAVE DATA TEMPORARILY IN B-REG |
| 74 | 0110 | 0077 | 0 100 000 001 | | JSB | LADDR1 | GET PROGRAM FLAG VECTOR |
| 75 | 0111 | | 1 101 001 100 | | PT13 | | SET POINTER TO L.E. FLAG LOCATION |
| 76 | 0112 | 0031 | 0 001 100 111 | | BRN | LFLG7 | |
| 77 | 0113 | | 0 101 110 010 | LTW017 | WP,CM1C | | IS OP. CODE EQUAL TO 17? |
| 78 | 0114 | 0373 | 1 111 101 111 | | BRN | LTW018 | NO: CONTINUE IN TEST |
| 79 | 0115 | 0065 | 0 011 011 001 | | JSB | LCAL1 | CALL D.S. AND GET STORED DATA |
| 80 | 0116 | 0224 | 1 001 010 011 | | BRN | LPOW3 | YES: GO TO XY ROUTINE START |
| 81 | 0117 | | 0 111 101 010 | LCODX | X,CP1C | | SET CURRENT OP.CODE TO ONE |
| 82 | 0120 | 0162 | 0 111 001 011 | | BRN | LCODA | GO TO EXECUTE PREVIOUSLY KEYED OPERATION |
| 83 | 0121 | | 0 110 101 000 | LSAV9 | STA | | OLD RESULT INTO A-REG |
| 84 | 0122 | | 1 110 101 110 | | W,AXC | | TEMPORARILY EXCHANGED |
| 85 | 0123 | | 0 100 101 000 | | CTS | | COPIED BACK INTO STACK |
| 86 | 0124 | | 1 110 101 110 | LSAV8 | W,AXC | | DATA OUT OF D.S. OR STACK INTO A-REG |
| 87 | 0125 | | 0 000 110 000 | LRET1 | RETURN | | END OF THE SUBROUINE |
| 88 | 0126 | | 1 011 011 000 | LEOL10 | LDC11 | | R |
| 89 | 0127 | | 0 000 010 000 | LEOL7 | ROM 0 | | |
| 90 | 0130 | | 0 101 110 010 | LTW09 | WP,CM1C | | IS OP. CODE EQUAL TO 9 |
| 91 | 0131 | 0153 | 0 110 101 111 | | BRN | LTW010 | NO CONTINUE TEST |
| 92 | 0132 | | 0 110 000 100 | | SS6 | | YES. IT IS L X ROUTINE: SET L-FLAG |
| 93 | 0133 | 0265 | 0 011 011 001 | LRCM2 | JSB | LCAL1 | CALL D.S. TO GET STORED DATA |
| 94 | 0134 | | 0 010 001 110 | LMUL3 | W,BTC | | RESTORE DATA IN C-REGISTER |
| 95 | 0135 | | 0 011 001 100 | | PT3 | | SET MULTIPLICATION FLAG |
| 96 | 0136 | | 0 010 101 010 | | X,ZMCC | | COMPLEMENT OF THE EXPONENT IN C-REG |
| 97 | 0137 | 0260 | 1 011 000 101 | LLDV2 | JSB | LSAV2 | |
| 98 | 0140 | | 0 000 000 000 | LDIV3 | NOP | | WAIT FOR OTHERS |
| 99 | 0141 | | 0 101 001 010 | | X,AMCC | | CALCULATE RESULT EXPONENT |
| 100 | 0142 | | 0 000 101 110 | | W,ZTB | | PREPARE B-REG |
| 101 | 0143 | 0247 | 1 010 011 111 | | BRN | LDIV11 | |
| 102 | 0144 | | 0 101 110 010 | LTW03 | WP,CM1C | | IS OP. CODE EQUAL TO 3? |
| 103 | 0145 | 0147 | 0 110 011 111 | | BRN | LTW04 | NO: CONTINUE TEST |
| 104 | 0146 | 0134 | 0 101 110 011 | | BRN | LMUL3 | YES: GO TO MULTIPLICATION ROUTINE (X) |
| 105 | 0147 | | 0 101 110 010 | LTW04 | WP,CM1C | | IS OP. CODE EQUAL TO 4? |
| 106 | 0150 | 0222 | 1 001 001 011 | | BRN | LTW05 | NO: CONTINUE TEST |
| 107 | 0151 | | 1 100 001 100 | LRCV2 | PT12 | | YES: SET POINTER TO PROPER VALUE |

MAIN UNIT LISTING (ROM A-4) – Continued

| LINE # | CURR ADDR | BRAN ADDR | OPERATION CODE BIT PATTERN | | | | |
|---|---|---|---|---|---|---|---|
| 108 | 0152 | 0177 | 0 111 111 111 | | BRN | LDIV9 | |
| 109 | 0153 | | 0 101 110 010 | LTWO10 | WP,CMIC | | IS OP. CODE EQUAL TO 10? |
| 110 | 0154 | 0217 | 1 000 111 111 | | BRN | LTWO11 | NO: CONTINUE TEST |
| 111 | 0155 | | 0 110 000 100 | | SS6 | | YES: IT IS L-ROUTINE,SET L-FLAG |
| 112 | 0156 | 0065 | 0 011 011 001 | | JSB | LCAL1 | CALL D.S. TO GET STORED DATA |
| 113 | 0157 | | 1 100 001 100 | | PT12 | | SET PROPER POINTER VALUE FOR DIVISION |
| 114 | 0160 | 0177 | 0 111 111 111 | | BRN | LDIV9 | GO TO RESTORE DIVISOR IN C-REG |
| 115 | 0161 | 0015 | 0 000 110 111 | LCLAE | BRN | LCLA10 | |
| 116 | 0162 | | 0 010 101 000 | LCODA | CXM | | STORE UPDATED INT. FLG. VECTOR IN M-REG |
| 117 | 0163 | | 1 010 101 000 | | MTC | | PREPARE NEW INT. FLG. VECTOR FOR TEST |
| 118 | 0164 | | 1 001 001 110 | | W,SRC | | OLD OP. CODE ALIGNMENT SHIFT |
| 119 | 0165 | | 1 001 001 110 | | W,SRC | | OLD OP. CODE ALIGNMENT SHIFT |
| 120 | 0166 | | 0 001 001 100 | | PT1 | | PREPARE OLD OP. CODE (TO BE EXECUTED) FOR TEST |
| 121 | 0167 | | 0 110 120 100 | | RS6 | | |
| 122 | 0170 | | 0 101 110 010 | LTWO0 | WP,CMIC | | IS OP. CODE EQUAL TO 0? |
| 123 | 0171 | 0250 | 1 010 100 011 | | BRN | LTWO1 | NO, CONTINUE TEST |
| 124 | 0172 | | 0 010 001 110 | LCLOH | W,BTC | | RESTORE DATA IN C-REG |
| 125 | 0173 | 0057 | 0 010 111 111 | | BRN | LCLOK | GO TO COPY IT INTO STACK |
| 126 | 0174 | | 0 101 110 010 | LTWO15 | WP,CMIC | | IS OP. CODE EQUAL TO 15? |
| 127 | 0175 | 0212 | 1 000 101 011 | | BRN | LTWO16 | NO: CONTINUE TEST |
| 128 | 0176 | 0133 | 0 101 101 111 | | BRN | LRCM2 | GO TO COMMON PART OF ROUTINES |
| 129 | 0177 | | 0 010 001 110 | LDIV9 | W,BTC | | |
| 130 | 0200 | 0137 | 0 101 111 111 | | BRN | LLDV2 | |
| 131 | 0201 | 0013 | 0 000 101 111 | LINTEA | BRN | LINTE3 | |
| 132 | 0202 | 0107 | 0 100 011 111 | LYLEA | BRN | LYLE3 | |
| 133 | 0203 | | 0 101 111 010 | LSUM5 | XS,CMIC | | RESTORE RESULT EXPONENT IN C-REG |
| 134 | 0204 | | 0 101 111 010 | | XS,CMIC | | RESTORE RESULT EXPONENT IN C-REG |
| 135 | 0205 | | 1 011 101 010 | | X,ZTA | | CANCEL OFFSET INDICATOR |
| 136 | 0206 | | 1 101 011 110 | | S,AMCA | | CHECK SIGNS OF BOTH MANITSSAS |
| 137 | 0207 | | 1 001 111 110 | | S,AM1 | | EQUAL? |
| 138 | 0210 | 0306 | 1 100 011 011 | | BRN | LSUM6 | NO: GO TO SUBTRACTION |
| 139 | 0211 | 0305 | 1 100 010 111 | | BRN | LSUM8 | YES: GO TO ADDITION |
| 140 | 0212 | | 0 101 110 010 | LTWO16 | WP,CMIC | | IS OP. CODE EQUAL TO 16? |
| 141 | 0213 | 0113 | 0 100 101 111 | | BRN | LTWO17 | NO: CONTINUE TEST |
| 142 | 0214 | 0065 | 0 011 011 001 | | JSB | LCAL1 | CALL D.S. TO GET STORED DATA |
| 143 | 0215 | 0151 | 0 110 100 111 | | BRN | LRCV2 | GO TO COMMON PART OF ROUTINES |
| 144 | 0216 | | 1 100 010 000 | LCLA11 | ROM 6 | | |
| 145 | 0217 | | 0 101 110 010 | LTWO11 | WP,CMIC | | IS OP. CODE EQUAL TO 11? |
| 146 | 0220 | 0362 | 1 111 001 011 | | BRN | LTWO12 | NO: CONTINUE IN TEST |
| 147 | 0221 | 0362 | 1 111 001 011 | | BRN | LTWO12 | NO: CONTINUE IN TEST |
| 148 | 0222 | | 0 101 110 010 | LTWO5 | WP,CMIC | | IS OP. CODE EQUAL TO 5? |
| 149 | 0223 | 0060 | 0 011 000 011 | | BRN | LTWO6 | NO: CONTINUE IN TEST |
| 150 | 0224 | | 1 100 101 000 | LPOW3 | DNR | | XY - ROUTINE START: PREPARE MANTISSA, EXPONENT |
| 151 | 0225 | | 1 000 101 110 | | W,BXC | | |
| 152 | 0226 | | 0 100 101 000 | | CTS | | MANTISSA IN A,C,D-REG |
| 153 | 0227 | | 0 010 001 110 | | W,BTC | | EXPONENT IS IN B,C-REG |
| 154 | 0230 | | 1 000 000 100 | | SS8 | | |
| 155 | 0231 | | 0 010 000 100 | LXTY1 | SS2 | | XY-ROUTINE EXECUTION START POINT |
| 156 | 0232 | | 1 100 001 100 | | PT12 | | SET POINTER TO PROPER VALUE |
| 157 | 0233 | 0307 | 0 000 011 111 | | BRN | LXTY2 | |
| 158 | 0234 | | 0 100 001 110 | LPO011 | W,SLA | | |
| 159 | 0235 | | 1 010 010 110 | LPO012 | MS,SRB | | |
| 160 | 0236 | | 1 000 101 110 | | W,BXC | | |
| 161 | 0237 | 0241 | 1 010 000 111 | | BRN | LPO016 | |
| 162 | 0240 | | 0 111 111 110 | LPO015 | S,CP1C | | |
| 163 | 0241 | | 1 100 001 110 | LPO016 | W,AMBA | | |
| 164 | 0242 | 0240 | 1 010 000 011 | | BRN | LPO015 | |
| 165 | 0243 | | 1 110 001 110 | | W,APBA | | |
| 166 | 0244 | | 1 010 010 000 | LPO013 | ROM 5 | | GO TO LPO023 |
| 167 | 0245 | | 1 100 001 100 | LSAV1 | PT12 | | SET PROPER POINTER VALUE |
| 168 | 0246 | 0261 | 1 011 000 111 | | BRN | LSAV2 | |
| 169 | 0247 | | 1 010 010 000 | LDIV11 | ROM 5 | | GO TO LDIV21 |
| 170 | 0250 | | 0 101 110 010 | LTWO1 | WP,CMIC | | IS OP. CODE EQUAL TO 1? |
| 171 | 0251 | 0253 | 1 010 101 111 | | BRN | LTWO2 | NO: CONTINUE TEST |
| 172 | 0252 | 0357 | 1 110 111 111 | | BRN | LADD3 | YES: GO TO ADDITION ROUTINE |
| 173 | 0253 | | 0 101 110 010 | LTWO2 | WP,CMIC | | IS OP. CODE EQUAL TO 2? |
| 174 | 0254 | 0144 | 0 110 010 011 | | BRN | LTWO3 | NO: CONTINUE TEST |
| 175 | 0255 | 0320 | 1 101 000 011 | | BRN | LSUB3 | YES: GO TO SUBTRACTION ROUTINE |
| 176 | 0256 | | 0 101 110 010 | LTWO13 | WP,CMIC | | IS OP. CODE EQUAL TO 13? |
| 177 | 0257 | 0347 | 1 110 011 111 | | BRN | LTWO14, | NO: CONTINUE TEST |
| 178 | 0260 | 0356 | 1 110 111 011 | | BRN | LRCA2 | GO TO CALL DATA FROM D.S. |
| 179 | 0261 | | 0 110 010 100 | LSAV2 | YS6 | | IS THIS AN ACC ROUINE ? |
| 180 | 0262 | 0171 | 0 101 000 111 | | BRN | LSAV9 | NO,GO TO GET OLD RESULT |
| 181 | 0263 | | 0 000 110 000 | | RETURN | | YES,DO NOTHING,DATA IS READY |
| 182 | 0264 | | 0 100 010 000 | LLDD2 | ROM 2 | | GO TO COMMON STORE ROUTINE |
| 183 | 0265 | 0323 | 0 001 001 111 | LFLAG | BRN | LFLG1 | |
| 184 | 0266 | | 0 100 010 000 | LCLO4 | ROM 2 | | |
| 185 | 0267 | | 0 100 010 000 | LCLO5 | ROM 2 | | |
| 186 | 0270 | | 0 111 100 010 | LDIV14 | P,CP1C | | |
| 187 | 0271 | | 1 100 010 110 | LDIV15 | MS,AMBA | | |
| 188 | 0272 | 0270 | 1 011 100 011 | | BRN | LDIV14 | |
| 189 | 0273 | | 1 110 010 110 | | MS,APBA | | |
| 190 | 0274 | | 0 100 010 110 | | MS,SLA | | |
| 191 | 0275 | | 0 000 011 100 | LDIV16 | PRS | | |
| 192 | 0276 | | 0 000 101 100 | | YP0 | | |
| 193 | 0277 | 0271 | 1 011 100 111 | | BRN | LDIV15 | |
| 194 | 0300 | | 0 110 001 110 | LTNM12 | W,CTA | | |
| 195 | 0301 | | 0 010 001 010 | | X,BTC | | |
| 196 | 0302 | 0313 | 1 100 101 111 | | BRN | LADD15 | |
| 197 | 0303 | | 0 100 101 000 | LERRR | CTS | | STORE IT ALSO IN STACK |
| 198 | 0304 | | 0 000 010 000 | | ROM 0 | | CALL ERROR ROUTINE |
| 199 | 0305 | | 1 010 010 000 | LSUM8 | ROM 5 | | GO TO LMPY 26 AND THEN TO NORMALIZATION |
| 200 | 0306 | | 1 000 000 110 | LSUM6 | M,AMB | | CHECK WHICH MANTISSA IS BIGGER |
| 201 | 0307 | 0312 | 1 100 101 011 | | BRN | LSUM7 | A-REG HAS BIGGER MANTISSA: GO TO SUBTRACTION |
| 202 | 0310 | | 0 011 111 110 | | S,ZNCC | | B-REG HAS BIGGER MANTISSA: CHANGE RESULT SIGN. |
| 203 | 0311 | | 1 100 101 110 | | W,AXB | | INTERCHANGE A AND B-REGISTERS |
| 204 | 0312 | | 1 100 001 110 | LSUM7 | W,AMBA | | PERFORM SUBTRACTION |
| 205 | 0313 | | 1 010 010 000 | LADD15 | ROM 5 | | GO TO NORMALIZATION ROUTINE |
| 206 | 0314 | | 0 101 110 010 | LTWO8 | WP,CMIC | | IS OP. CODE EQUAL TO 8? |
| 207 | 0315 | 0130 | 0 101 100 011 | | BRN | LTWO9 | NO: CONTINUE TEST |
| 208 | 0316 | | 0 110 000 100 | | SS6 | | YES: IT IS L-ROUTINE: SET L-FLAG |
| 209 | 0317 | 0365 | 0 011 011 001 | LRCS2 | JSB | LCAL1 | CALL D.S. AND GET STORED DATA |
| 210 | 0320 | | 0 010 001 110 | LSUB3 | W,BTC | | RESTORE DATA IN C-REGISTER |
| 211 | 0321 | | 0 011 111 110 | | S,ZNCC | | COMPLEMENT OF THE SIGN OF DATA IN C-REG |
| 212 | 0322 | 0244 | 1 010 010 101 | LSUM1 | JSB | LSAV1 | GET PREVIOUS RESULT |
| 213 | 0323 | | 0 000 101 110 | | W,ZTB | | PREPARE B-REGISTER |
| 214 | 0324 | | 1 111 111 010 | | XS,AP1A | | PREPARE SIGN OF EXP. IN A-REG FOR TEST |
| 215 | 0325 | | 1 111 111 010 | | XS,AP1A | | PREPARE SIGN OF EXP. IN A-REG FOR TEST |

MAIN UNIT LISTING (ROM A-4)—Continued

| LINE # | CURR ADDR | BRAN ADDR | OPERATION CODE BIT PATTERN | | | | |
|---|---|---|---|---|---|---|---|
| 216 | 0326 | | 0 111 111 010 | | XS.CP1C | | PREPARE SIGN OF EXP. IN C-REG FOR TEST |
| 217 | 0327 | | 0 111 111 010 | | XS.CP1C | | PREPARE SIGN OF EXP. IN C-REG FOR TEST |
| 218 | 0330 | | 0 001 001 010 | | X.AMC | | CHECK WHICH EXPONENT IS BIGGER |
| 219 | 0331 | 0333 | 1 101 101 111 | | BRN | LSUM2 | BIGGER IS IN A-REGISTER |
| 220 | 0332 | | 1 110 101 110 | | W.AXC | | GET DATA WITH BIGGER EXPONENT INTO A-REG |
| 221 | 0333 | | 1 110 100 110 | LSUM2 | M.AXC | | PREPARE MANTISSA VALUE CHECK |
| 222 | 0334 | | 0 110 100 110 | | M.ZMC | | CHECK IF MANTISSA IS ZERO |
| 223 | 0335 | 0337 | 1 101 111 111 | | BRN | LSUM3 | YES |
| 224 | 0336 | | 1 110 101 110 | | W.AXC | | NO: PUT IT BACK TO A-REG |
| 225 | 0337 | | 1 000 100 110 | LSUM3 | M.BXC | | PREPARE MANTISSA ALIGNMENT IN B-REG |
| 226 | 0340 | | 0 001 001 010 | LSUM4 | X.AMC | | CHECK IF OFFSET IS ZERO |
| 227 | 0341 | 0203 | 1 000 001 111 | | BRN | LSUM5 | YES. MANTISSAS ARE ALIGNED FOR SUMMATION |
| 228 | 0342 | | 1 010 001 110 | | W.SRB | | NO: ALIGNMENT SHIFT |
| 229 | 0343 | | 1 111 101 010 | | X.AP1A | | DECREMENT OFFSET |
| 230 | 0344 | | 0 000 001 110 | | W.ZMB | | CHECK IF MANTISSA AFTER SHIFT IS ZERO |
| 231 | 0345 | 0203 | 1 000 001 111 | | BRN | LSUM5 | YES. GO DIRECTLY TO RESULT CALCULATION |
| 232 | 0346 | 0340 | 1 110 000 011 | | BRN | LSUM4 | NO. CONTINUE IN OFFSET ALIGNMENT |
| 233 | 0347 | | 0 101 110 010 | LTWO14 | WP.CM1C | | IS OP. CODE EQUAL TO 14? |
| 234 | 0350 | 0174 | 0 111 110 011 | | BRN | LTWO15 | NO: CONTINUE TEST |
| 235 | 0351 | | 0 110 100 100 | | RS6 | | YES: IT IS R-ROUTINE: RESET L-FLAG |
| 236 | 0352 | 0317 | 1 100 111 111 | | BRN | LRCS2 | GO TO CALL DATA FROM D.S. |
| 237 | 0353 | | 0 101 110 010 | LTWO7 | WP.CM1C | | IS OP. CODE EQUAL TO 7? |
| 238 | 0354 | 0314 | 1 100 110 011 | | BRN | LTWO8 | NO: CONTINUE TEST |
| 239 | 0355 | | 0 110 000 100 | | SS6 | | YES: IT IS L ROUTINE: SET L-FLAG |
| 240 | 0356 | 0065 | 0 011 011 001 | LRCA2 | JSB | LCAL1 | CALL D.S. AND GET STORED DATA |
| 241 | 0357 | | 0 010 001 110 | LADD3 | W.BTC | | RESTORE DATA IN C-REGISTER |
| 242 | 0360 | 0322 | 1 101 001 011 | | BRN | LSUM1 | GO TO COMMON SUMMATION BLOCK |
| 243 | 0361 | | 0 010 010 000 | LFOL9 | ROM 1 | | SWITCH TO ROM 1 |
| 244 | 0362 | | 0 101 110 010 | LTWO12 | WP.CM1C | | IS OP. CODE EQUAL TO 12? |
| 245 | 0363 | 0256 | 1 010 111 011 | | BRN | LTWO13 | NO: CONTINUE IN TEST |
| 246 | 0364 | 0356 | 1 110 111 011 | | BRN | LRCA2 | GO TO CALL DATA FROM D.S. |
| 247 | 0365 | | 1 100 101 000 | LCAL0 | DNR | | RESTORE PREVIOUS RESULT IN C-REG |
| 248 | 0366 | | 0 100 101 000 | | CTS | | COPY IT BACK TO STACK |
| 249 | 0367 | | 1 000 101 110 | LSAV7 | W.BXC | | OLD RESULT TO B.DATA OUT OF D.S. TO C-REG |
| 250 | 0370 | 0124 | 0 101 010 011 | | BRN | LSAV8 | |
| 251 | 0371 | | 1 100 101 000 | LERR | DNR | | RESTORE OLD DATA NORIGINAL DATA) |
| 252 | 0372 | 0303 | 1 100 001 111 | | BRN | LERRR | |
| 253 | 0373 | 0065 | 0 011 011 001 | LTWO18 | JSB | LCAL1 | CALL D.S. AND GET "NEW" DATA INTO B-REG |
| 254 | 0374 | | 1 100 101 000 | | DNR | | PREPERE OLD DATA |
| 255 | 0375 | | 1 011 110 000 | | DTDS | | STORE "OLD" DATA IN D.S. |
| 256 | 0376 | 0172 | 0 111 101 011 | | BRN | LCLOH | |
| 257 | 0377 | 0117 | 0 100 111 111 | LCODD | BRN | LCODX | GO TO SET OP.CODE |

MAIN UNIT LISTING (ROM A-5)

| LINE # | CURR ADDR | BRAN ADDR | OPERATION CODE BIT PATTERN | | | | |
|---|---|---|---|---|---|---|---|
| 3 | 0000 | | 0 110 010 000 | LFRR21 | ROM 3 | | |
| 4 | 0001 | | 1 100 111 110 | LLN24 | S.AXB | | |
| 5 | 0002 | | 1 111 111 110 | | S.AP1A | | |
| 6 | 0003 | | 1 001 010 110 | | MS.SRC | | |
| 7 | 0004 | | 0 100 010 010 | | WP.SLA | | |
| 8 | 0005 | 0022 | 0 001 001 011 | | BRN | LLN26 | |
| 9 | 0006 | | 0 110 101 000 | LXTY22 | STA | | |
| 10 | 0007 | 0245 | 1 010 011 001 | | JSB | LMPY21 | |
| 11 | 0010 | 0263 | 1 011 001 111 | LSBL1 | BRN | LSBL2 | GO TO SET BUSY LIGHT |
| 12 | 0011 | | 1 000 010 100 | LAUX1 | YSB | | |
| 13 | 0012 | 0102 | 0 100 001 011 | | BRN | LEXP21 | |
| 14 | 0013 | | 1 011 101 110 | LLN22 | W.ZTA | | |
| 15 | 0014 | | 1 101 000 110 | | M.AMCA | | |
| 16 | 0015 | 0262 | 1 011 001 011 | | BRN | LERR23 | MANTISSA IS ZERO |
| 17 | 0016 | | 1 011 001 110 | | W.SRA | | |
| 18 | 0017 | | 0 101 111 110 | | S.CM1C | | |
| 19 | 0020 | 0000 | 0 000 000 011 | | BRN | LERR21 | MANTISSA IS NEGATIVE |
| 20 | 0021 | | 0 111 111 110 | LLN25 | S.CP1C | | |
| 21 | 0022 | | 0 100 101 110 | LLN26 | W.ATB | | |
| 22 | 0023 | 0225 | 1 001 011 001 | | JSB | LECA22 | |
| 23 | 0024 | | 1 101 100 010 | | P.AM1A | | |
| 24 | 0025 | 0021 | 0 001 000 111 | | BRN | LLN25 | |
| 25 | 0026 | | 1 100 110 010 | | WP.AXB | | |
| 26 | 0027 | | 1 110 011 110 | | S.APBA | | |
| 27 | 0030 | 0001 | 0 000 000 111 | | BRN | LLN24 | |
| 28 | 0031 | | 0 111 001 100 | | PT7 | | |
| 29 | 0032 | 0154 | 0 110 110 101 | | JSB | LP0023 | |
| 30 | 0033 | | 1 000 001 100 | | PT8 | | |
| 31 | 0034 | 0234 | 1 001 110 101 | | JSB | LPMU22 | |
| 32 | 0035 | | 1 001 001 100 | | PT9 | | |
| 33 | 0036 | 0233 | 1 001 110 001 | | JSB | LPMU21 | |
| 34 | 0037 | 0375 | 1 111 111 001 | | JSB | LLNCD3 | |
| 35 | 0040 | | 1 010 001 100 | | PT10 | | |
| 36 | 0041 | 0233 | 1 001 110 001 | | JSB | LPMU21 | |
| 37 | 0042 | 0174 | 0 111 110 101 | | JSB | LLNCD2 | |
| 38 | 0043 | | 1 011 001 100 | | PT11 | | |
| 39 | 0044 | 0233 | 1 001 110 001 | | JSB | LPMU21 | |
| 40 | 0045 | 0336 | 1 101 111 101 | | JSB | LLNCD1 | |
| 41 | 0046 | 0233 | 1 001 110 001 | | JSB | LPMU21 | |
| 42 | 0047 | 0270 | 1 011 100 101 | | JSB | LLNC2 | |
| 43 | 0050 | 0233 | 1 001 110 001 | | JSB | LPMU21 | |
| 44 | 0051 | 0365 | 1 111 011 001 | | JSB | LLNC10 | |
| 45 | 0052 | | 1 110 101 110 | | W.AXC | | |
| 46 | 0053 | | 0 101 001 110 | | W.AMCC | | |
| 47 | 0054 | | 0 000 011 010 | | XS.ZMB | | |
| 48 | 0055 | 0057 | 0 010 111 111 | | BRN | LLN27 | |
| 49 | 0056 | | 0 101 001 110 | | W.AMCC | | |
| 50 | 0057 | | 1 100 101 110 | LLN27 | W.AXB | | |
| 51 | 0060 | | 0 000 011 100 | LLN28 | PRS | | |
| 52 | 0061 | | 0 100 001 110 | | W.SLA | | |

MAIN UNIT LISTING (ROM A-5) – Continued

| CURR ADDR | BRAN ADDR | OPERATION CODE BIT PATTERN | | | | |
|---|---|---|---|---|---|---|
| 0062 | | 0 001 101 100 | | YP1 | | |
| 0063 | 0062 | 0 011 000 011 | | BRN | LLN28 | |
| 0064 | | 1 110 101 110 | | W,AXC | | |
| 0065 | | 0 110 111 110 | | S,ZMC | | |
| 0066 | 0070 | 0 011 100 011 | | BRN | LLN29 | |
| 0067 | | 0 011 100 110 | | M,ZNCC | | |
| 0070 | | 0 111 101 010 | LLN29 | X,CP1C | | |
| 0071 | | 1 011 001 100 | | PT11 | | |
| 0072 | 0334 | 1 100 010 101 | | JSB | LMPY27 | |
| 0073 | | 1 001 010 100 | | YS9 | | |
| 0074 | 0036 | 0 000 011 011 | | BRN | LXTY22 | |
| 0075 | | 0 101 010 100 | | YS5 | | |
| 0076 | 0224 | 1 001 010 011 | | BRN | LRTN21 | |
| 0077 | 0365 | 1 111 011 001 | | JSB | LLNC10 | |
| 0100 | 0246 | 1 010 011 101 | | JSB | LMPY22 | |
| 0101 | 0224 | 1 001 010 011 | | BRN | LRTN21 | |
| 0102 | 0365 | 1 111 011 001 | LEXP21 | JSB | LLNC10 | |
| 0103 | 0353 | 1 110 110 001 | | JSB | LPRE21 | |
| 0104 | 0270 | 1 011 100 101 | | JSB | LLNC2 | |
| 0105 | | 1 011 001 100 | | PT11 | | |
| 0106 | 0232 | 1 001 101 101 | | JSB | LPQ021 | |
| 0107 | 0336 | 1 101 111 101 | | JSB | LLNC01 | |
| 0110 | | 1 010 001 100 | | PT10 | | |
| 0111 | 0232 | 1 001 101 101 | | JSB | LPQ021 | |
| 0112 | 0174 | 0 111 110 101 | | JSB | LLNCD2 | |
| 0113 | | 1 001 001 100 | | PT9 | | |
| 0114 | 0232 | 1 001 101 101 | | JSB | LPQ021 | |
| 0115 | 0375 | 1 111 111 001 | | JSB | LLNCD3 | |
| 0116 | | 1 000 001 100 | | PT8 | | |
| 0117 | 0232 | 1 001 101 101 | | JSB | LPQ021 | |
| 0120 | 0232 | 1 001 101 101 | | JSB | LPQ021 | |
| 0121 | 0232 | 1 001 101 101 | | JSB | LPQ021 | |
| 0122 | | 0 110 001 100 | | PT6 | | |
| 0123 | | 1 011 110 010 | | WP,ZTA | | |
| 0124 | | 1 101 001 100 | | PT13 | | |
| 0125 | | 1 000 101 110 | | W,BXC | | |
| 0126 | | 1 110 101 110 | | W,AXC | | |
| 0127 | | 0 110 011 000 | | LDC6 | | |
| 0130 | 0216 | 1 000 111 011 | | BRN | LEXP23 | |
| 0131 | | 0 010 010 100 | LPRE23 | YS2 | | |
| 0132 | 0136 | 0 101 111 011 | | BRN | LPRE24 | |
| 0133 | | 1 111 101 010 | | X,AP1A | | |
| 0134 | | 1 001 111 010 | LPRE29 | XS,AM1 | | |
| 0135 | 0302 | 1 100 001 011 | | BRN | LPRE27 | |
| 0136 | | 1 100 010 110 | LPRE24 | MS,AMRA | | |
| 0137 | 0131 | 0 101 100 111 | | BRN | LPRE23 | |
| 0140 | | 1 110 010 110 | | MS,APRA | | |
| 0141 | | 0 100 001 110 | | W,SLA | | |
| 0142 | | 0 101 101 010 | | X,CM1C | | |
| 0143 | 0134 | 0 101 110 011 | | BRN | LPRE29 | |
| 0144 | | 1 011 001 110 | LPRE25 | W,SRA | | |
| 0145 | | 0 011 010 010 | | WP,ZTC | | |
| 0146 | | 1 110 101 010 | | X,AXC | | |
| 0147 | | 0 110 111 110 | LPRE26 | S,ZMC | | |
| 0150 | 0154 | 0 110 110 011 | | BRN | LPRE28 | |
| 0151 | | 1 100 101 110 | | W,AXB | | |
| 0152 | | 1 100 001 110 | | W,AMBA | | |
| 0153 | | 0 011 101 110 | | W,ZNCC | | |
| 0154 | | 1 011 001 110 | LPRE28 | W,SRA | | |
| 0155 | | 1 000 101 110 | LPQ023 | W,BXC | | |
| 0156 | | 0 011 001 110 | | W,ZTC | | |
| 0157 | | 0 101 100 110 | | M,CM1C | | |
| 0160 | | 0 010 010 100 | | YS2 | | |
| 0161 | 0166 | 0 111 011 011 | | BRN | LPQ028 | |
| 0162 | | 0 100 011 000 | | LDC4 | | |
| 0163 | | 0 111 100 110 | | M,CP1C | | |
| 0164 | 0171 | 0 111 100 111 | | BRN | LPQ024 | |
| 0165 | | 0 110 011 000 | LPQ027 | LDC6 | | |
| 0166 | | 0 001 101 100 | LPQ028 | YP1 | | |
| 0167 | 0165 | 0 111 010 111 | | BRN | LPQ027 | |
| 0170 | | 1 001 001 110 | | W,SRC | | |
| 0171 | | 1 001 001 110 | LPQ024 | W,SRC | | |
| 0172 | | 0 010 010 100 | LNRM26 | YS2 | | |
| 0173 | 0224 | 1 001 010 011 | | BRN | LRTN21 | |
| 0174 | | 0 000 110 000 | | RETURN | | |
| 0175 | | 0 111 001 100 | LLNCD2 | PT7 | | |
| 0176 | | 0 011 011 000 | LLNC6 | LDC3 | | |
| 0177 | | 0 011 011 000 | | LDC3 | | |
| 0200 | | 0 000 011 000 | | LDC0 | | |
| 0201 | | 1 000 011 000 | LLNC7 | LDC8 | | |
| 0202 | | 0 101 011 000 | | LDC5 | | |
| 0203 | | 0 000 011 000 | | LDC0 | | |
| 0204 | | 1 001 011 000 | | LDC9 | | |
| 0205 | 0352 | 1 110 101 011 | | BRN | LLNC9 | |
| 0206 | 0225 | 1 001 011 001 | LEXP29 | JSB | LECA22 | |
| 0207 | | 1 111 100 010 | | P,AP1A | | |
| 0210 | | 0 100 101 110 | LEXP22 | W,ATB | | |
| 0211 | | 0 101 111 110 | | S,CM1C | | |
| 0212 | 0206 | 1 000 011 011 | | BRN | LEXP29 | |
| 0213 | | 1 011 010 010 | | WP,SRA | | |
| 0214 | | 1 110 101 110 | | W,AXC | | |
| 0215 | | 0 100 010 110 | | MS,SLA | | |
| 0216 | | 1 110 101 110 | LEXP23 | W,AXC | | |
| 0217 | | 1 101 111 110 | | S,AM1A | | |
| 0220 | 0210 | 1 000 100 011 | | BRN | LEXP22 | |
| 0221 | | 1 100 101 110 | | W,AXB | | |
| 0222 | | 1 111 100 010 | | P,AP1A | | |
| 0223 | 0313 | 1 100 110 001 | | JSB | LNRM21 | |
| 0224 | | 0 100 010 000 | LRTN21 | ROM 2 | | END OF NORMALIZATION, GO TO OVFL TEST |
| 0225 | | 1 011 010 010 | LECA21 | WP,SRA | | |
| 0226 | | 1 101 111 110 | LECA22 | S,AM1A | | |
| 0227 | 0225 | 1 001 010 111 | | BRN | LECA21 | |
| 0230 | | 1 011 111 110 | | S,ZTA | | |
| 0231 | | 1 110 001 110 | | W,APRA | | |
| 0232 | | 0 000 110 000 | | RETURN | | |
| 0233 | | 1 000 010 000 | LPQ021 | ROM 4 | | GO TO LPQ011 |
| 0234 | | 1 011 001 110 | LPMU21 | W,SRA | | |
| 0235 | | 1 000 101 110 | LPMU22 | W,BXC | | |

MAIN UNIT LISTING (ROM A-5)—Continued

| CURR ADDR | BRAN ADDR | OPERATION CODE BIT PATTERN | | | | |
|---|---|---|---|---|---|---|
| 0236 | 0240 | 1 010 000 011 | | BRN | LPMU24 | |
| 0237 | | 1 110 001 110 | LPMU23 | W.APRA | | |
| 0240 | | 0 101 111 110 | LPMU24 | S.CM1C | | |
| 0241 | 0237 | 1 001 111 111 | | BRN | LPMU23 | |
| 0242 | | 1 110 101 110 | | W.AXC | | |
| 0243 | | 0 100 010 110 | | MS.SLA | | |
| 0244 | | 1 110 101 110 | | W.AXC | | |
| 0245 | 0155 | 0 110 110 111 | | BRN | LPQ023 | |
| 0246 | | 0 011 001 100 | LMPY21 | PT3 | | |
| 0247 | | 0 111 001 010 | LMPY22 | X.APCC | | |
| 0250 | | 0 101 011 110 | LDIV21 | S.AMCC | | |
| 0251 | 0253 | 1 010 101 111 | | BRN | LDIV22 | |
| 0252 | | 0 010 111 110 | | S.ZMCC | | |
| 0253 | | 1 100 100 110 | LDIV22 | M.AXB | | |
| 0254 | | 1 011 101 110 | | W.ZTA | | |
| 0255 | | 1 100 101 100 | | YP12 | | |
| 0256 | 0305 | 1 100 010 111 | | BRN | LMPY27 | |
| 0257 | | 0 001 100 110 | | M.CM1 | | |
| 0260 | 0266 | 1 011 011 011 | | BRN | LDIV23 | |
| 0261 | | 1 110 010 000 | LERR22 | ROM 7 | | ZERO DIVISOR DETECTED <C>=0 LNOT3 |
| 0262 | | 0 110 010 000 | LERR23 | ROM 3 | | |
| 0263 | | 1 010 100 000 | LSAL2 | SAL | | SET BUSY LIGHT |
| 0264 | | 0 110 001 110 | LXTY21 | W.CTA | | EXPO BLOCK EXECUTION STARTING POINT |
| 0265 | 0311 | 0 000 100 111 | | BRN | LAUX1 | |
| 0266 | | 1 000 110 010 | LDIV23 | WP.BXC | | |
| 0267 | | 1 110 100 110 | | M.AXC | | |
| 0270 | | 1 000 010 000 | | ROM 4 | | GO TO LDIV15 |
| 0271 | | 1 000 100 100 | LLNC2 | RSB | | |
| 0272 | | 0 110 011 000 | | LDC6 | | |
| 0273 | | 1 001 011 000 | | LDC9 | | |
| 0274 | | 0 011 011 000 | | LDC3 | | |
| 0275 | | 0 001 011 000 | | LDC1 | | |
| 0276 | | 0 100 011 000 | | LDC4 | | |
| 0277 | | 0 111 011 000 | | LDC7 | | |
| 0300 | | 0 001 011 000 | | LDC1 | | |
| 0301 | 0346 | 1 110 011 011 | | BRN | LLNC8 | |
| 0302 | | 1 111 100 110 | LPRE27 | M.AP1A | | |
| 0303 | 0144 | 0 110 010 011 | | BRN | LPRE25 | |
| 0304 | | 1 110 001 110 | LMPY26 | W.APRA | | |
| 0305 | | 0 101 100 010 | LMPY27 | P.CM1C | | |
| 0306 | 0304 | 1 100 010 011 | | BRN | LMPY26 | |
| 0307 | | 1 011 001 110 | LMPY28 | W.SRA | | |
| 0310 | | 0 000 111 100 | | PLS | | |
| 0311 | | 1 101 101 100 | | YP13 | | |
| 0312 | 0305 | 1 100 010 111 | | BRN | LMPY27 | |
| 0313 | | 0 111 101 010 | | X.CP1C | | |
| 0314 | | 1 011 111 110 | LNRM21 | S.ZTA | | |
| 0315 | | 1 100 001 100 | | PT12 | | |
| 0316 | | 0 000 101 110 | | W.ZTB | | |
| 0317 | | 1 001 100 010 | LNRM23 | P.AM1 | | |
| 0320 | 0326 | 1 101 011 011 | | BRN | LNRM24 | |
| 0321 | | 0 100 001 110 | | W.SLA | | |
| 0322 | | 0 101 101 010 | | X.CM1C | | |
| 0323 | | 1 001 101 110 | | W.AM1 | | |
| 0324 | 0317 | 1 100 111 111 | | BRN | LNRM23 | |
| 0325 | | 0 011 001 110 | | W.ZTC | | |
| 0326 | | 0 100 101 010 | LNRM24 | X.ATB | | |
| 0327 | | 1 110 001 110 | | W.APRA | | |
| 0330 | | 1 001 111 110 | | S.AM1 | | |
| 0331 | 0307 | 1 100 011 111 | | BRN | LMPY28 | |
| 0332 | | 1 110 100 110 | | M.AXC | | |
| 0333 | | 0 110 001 110 | LNRM25 | W.CTA | | |
| 0334 | | 0 000 101 110 | | W.ZTB | | |
| 0335 | | 1 100 001 100 | LNRM27 | PT12 | | |
| 0336 | 0172 | 0 111 101 011 | | BRN | LNRM26 | |
| 0337 | | 1 001 001 100 | LLNC01 | PT9 | | |
| 0340 | | 0 011 011 000 | | LDC3 | | |
| 0341 | | 0 001 011 000 | | LDC1 | | |
| 0342 | | 0 000 011 000 | | LDC0 | | |
| 0343 | | 0 001 011 000 | | LDC1 | | |
| 0344 | | 0 111 011 000 | | LDC7 | | |
| 0345 | | 1 001 011 000 | | LDC9 | | |
| 0346 | | 1 000 011 000 | LLNC8 | LDC8 | | |
| 0347 | | 0 000 011 000 | | LDC0 | | |
| 0350 | | 0 101 011 000 | | LDC5 | | |
| 0351 | | 0 101 011 000 | | LDC5 | | |
| 0352 | | 0 011 011 000 | LLNC9 | LDC3 | | |
| 0353 | 0335 | 1 101 110 111 | | BRN | LNRM27 | |
| 0354 | | 1 110 101 110 | LPRE21 | W.AXC | | |
| 0355 | | 0 100 101 110 | | W.ATB | | |
| 0356 | | 0 110 000 110 | | M.CTA | | |
| 0357 | | 1 010 111 010 | | XS.CPCC | | |
| 0360 | 0136 | 0 101 111 011 | | BRN | LPRE24 | |
| 0361 | | 0 111 111 010 | | XS.CP1C | | |
| 0362 | | 1 011 001 110 | LPRE22 | W.SRA | | |
| 0363 | | 0 111 101 010 | | X.CP1C | | |
| 0364 | 0362 | 1 111 001 011 | | BRN | LPRE22 | |
| 0365 | 0147 | 0 110 011 111 | | BRN | LPRE26 | |
| 0366 | | 0 011 001 110 | LLNC10 | W.ZTC | | |
| 0367 | | 1 100 001 100 | | PT12 | | |
| 0370 | | 0 010 011 000 | | LDC2 | | |
| 0371 | | 0 011 011 000 | | LDC3 | | |
| 0372 | | 0 000 011 000 | | LDC0 | | |
| 0373 | | 0 010 011 000 | | LDC2 | | |
| 0374 | | 0 101 011 000 | | LDC5 | | |
| 0375 | 0201 | 1 000 000 111 | | BRN | LLNC7 | |
| 0376 | | 0 101 001 100 | LLNC03 | PT5 | | |
| 0377 | 0176 | 0 111 111 011 | | BRN | LLNC6 | |

MAIN UNIT LISTING (ROM A-6)

| CURR ADDR | BRAN ADDR | OPERATION CODE BIT PATTERN | | | | |
|---|---|---|---|---|---|---|
| 0000 | | 0 000 010 000 | LLLL6 | ROM 0 | | GO TO ROM 0 IN "RON GROUP SWITCH MODE" |
| 0001 | | 1 000 000 100 | LLN1 | SS8 | | NOT. LOG. ROUTINE EXECUTION START |
| 0002 | | 1 001 000 100 | LEXP1 | SS9 | | EXPONENTIAL ROUTINE EXECUTION START |
| 0003 | | 0 010 000 100 | | SS2 | | SET COMMON FLAG OF EXP. ROUTINES |
| 0004 | | 1 011 000 100 | | SS11 | | SET SINGLE OPERAND OP. FLAG |
| 0005 | | 0 110 100 100 | | RS6 | | RESET DEC.POINT FLAG IF SET |
| 0006 | | 1 100 001 100 | | PT12 | | SET POINTER TO PROPPER VALUE |
| 0007 | | 1 010 010 000 | | ROM 5 | | GO TO START POINT OF THE EXPO BLOCK |
| 0010 | | 1 001 000 100 | LPREP | SS9 | | SET SHIFT KEY ROUTINE AUX. FLAG |
| 0011 | 0024 | 0 001 010 011 | | BRN | LPREP1 | |
| 0012 | 0101 | 0 100 000 111 | LLOGA | BRN | LLOGB | ROUTINE START |
| 0013 | 0173 | 0 101 101 111 | LLNA | BRN | LLNB | ROUTINE START |
| 0014 | 0007 | 0 000 100 001 | LOXXA | JSB | LPREP | PREPARE DATA FOR PRINT |
| 0015 | 0112 | 0 100 101 011 | | BRN | LOXXB | CONTINUE |
| 0016 | | 0 100 100 000 | LEXCH | RMGRC | | EXCH() ROUTINE BEGINNING POINT |
| 0017 | | 1 110 010 000 | LERRR | ROM 7 | | GO TO ERROR MESSAGE ROUTINE |
| 0020 | 0055 | 0 010 110 111 | | BRN | LGT1 | GRAND TOTAL |
| 0021 | | 1 110 010 000 | LGTR | ROM 7 | | AFTER RETURN FROM DATA ADJUSTMENT LOAD SYMBOL CODES |
| 0022 | 0067 | 0 011 011 111 | LTAB1 | BRN | LTAB2 | CALL TABLE FUNCTION |
| 0023 | 0106 | 0 100 011 011 | | BRN | LDONT | DO NOTHING |
| 0024 | | 1 110 010 000 | LPREP1 | ROM 7 | | |
| 0025 | | 0 000 000 000 | | DUMMY | | |
| 0026 | | 0 011 111 110 | LCHS1 | S,ZNCC | | CHANGE SIGN OF MANTISSA |
| 0027 | | 0 000 000 000 | | NOP | | TO ELIMINATE POSSIBLE CARRY |
| 0030 | 0106 | 0 100 011 011 | | BRN | LDONT | GO TO SUPERVISOR |
| 0031 | 0354 | 1 110 110 101 | LALFA | JSB | LPRINT | PRINT ALPHA MESS.RESTORE DATA |
| 0032 | 0106 | 0 100 011 011 | | BRN | LDONT | DO NOTHING |
| 0033 | 0106 | 0 100 011 011 | | BRN | LDONT | DO NOTHING |
| 0034 | 0106 | 0 100 011 011 | | BRN | LDONT | DO NOTHING |
| 0035 | | 0 010 101 000 | LIOC3 | CXM | | STORE UPDATED INT. FLG. VECTOR |
| 0036 | 0106 | 0 100 011 011 | | BRN | LDONT | DO NOTHING |
| 0037 | | 0 010 100 000 | LFBLK | RMGRB | | CALL F. BLOCK SOFTWARE |
| 0040 | 0007 | 0 000 100 001 | LEXPA | JSB | LPREP | PREPARE DATA FOR PRINT |
| 0041 | 0146 | 0 110 011 011 | | BRN | LEXPB | |
| 0042 | 0106 | 0 100 011 011 | | BRN | LDONT | DO NOTHING |
| 0043 | 0106 | 0 100 011 011 | | BRN | LDONT | DO NOTHING |
| 0044 | 0106 | 0 100 011 011 | | BRN | LDONT | DO NOTHING |
| 0045 | | 0 011 010 000 | LWANZ | TKRA | | ACCEPT KEYCODE |
| 0046 | | 0 100 100 000 | LRECL | RMGRC | | RECALL() ROUTINE BEGINNING POINT |
| 0047 | 0017 | 0 000 111 111 | | BRN | LERRR | D.S. SOFTWARE NOT PRESENT |
| 0050 | 0007 | 0 000 100 001 | LTWWA | JSB | LPREP | PREPARE DATA FOR PRINT |
| 0051 | 0121 | 0 101 000 111 | | BRN | LTWWB | CONTINUE |
| 0052 | 0106 | 0 100 011 011 | | BRN | LDONT | DO NOTHING |
| 0053 | 0106 | 0 100 011 011 | | BRN | LDONT | DO NOTHING |
| 0054 | 0106 | 0 100 011 011 | | BRN | LDONT | DO NOTHING |
| 0055 | | 0 110 010 000 | LGT1 | ROM 3 | | |
| 0056 | | 0 100 100 000 | LSTOR | RMGRC | | STORE() ROUTINE BEGINNING POINT |
| 0057 | 0017 | 0 000 111 111 | | BRN | LERRR | D.S. SOFTWARE NOT PRESENT |
| 0060 | 0303 | 1 100 010 001 | LALFB | JSB | LGNT2 | GET TWO INSTR. TO BUILD RIGHT PART |
| 0061 | 0155 | 0 110 110 111 | | BRN | LALF2 | |
| 0062 | 0106 | 0 100 011 011 | | BRN | LDONT | DO NOTHING |
| 0063 | 0106 | 0 100 011 011 | | BRN | LDONT | DO NOTHING |
| 0064 | | 0 100 100 000 | LLIST | RMGRC | | LIST OR CLEAR DATA BEGINNING POINT |
| 0065 | 0017 | 0 000 111 111 | | BRN | LERRR | D.S.SOFTWARE NOT PRESENT |
| 0066 | 0106 | 0 100 011 011 | | BRN | LDONT | DO NOTHING |
| 0067 | | 0 010 100 000 | LTAB2 | RMGRB | | GO TO F.BLK.SOFTWARE |
| 0070 | | 0 000 000 000 | LSHFT2 | NOP | | |
| 0071 | | 1 010 000 100 | | SS10 | | SET SHIFT KEY FLAG |
| 0072 | 0106 | 0 100 011 011 | | BRN | LDONT | DO NOTHING |
| 0073 | 0106 | 0 100 011 011 | | BRN | LDONT | DO NOTHING |
| 0074 | | 0 111 101 110 | LTWW2 | W.CP1C | | GEN EXP. VALOE 1 |
| 0075 | 0117 | 0 100 111 111 | | BRN | LOXXD | |
| 0076 | 0142 | 0 110 001 011 | LIOC1 | BRN | LIOC2 | I/O CALL BEGINNING |
| 0077 | | 0 000 110 000 | | RETURN | | END OF SUBROUTINE |
| 0100 | 0152 | 0 110 101 011 | LLAHB | BRN | LINCR | GO TO LABEL HEAD ROUT.EXECUTION |
| 0101 | 0007 | 0 000 100 001 | LLOGB | JSB | LPREP | PREPARE DATA FOR PRINT |
| 0102 | | 1 000 011 000 | | LDC8 | | LOAD SYMBOL CODE FOR LOG |
| 0103 | 0354 | 1 110 110 101 | | JSB | LPRINT | PRINT AND RESTORE DATA IN C-REG |
| 0104 | | 0 101 000 100 | | SS5 | | DEC. LOG ROUTINE EXECUTION START |
| 0105 | 0001 | 0 000 000 111 | | BRN | LLN1 | GO TO COMMON PART WITH LN ROUTINE |
| 0106 | | 0 000 010 000 | LDONT | ROM 0 | | GO TO SUPERVISOR |
| 0107 | | 0 101 100 010 | LRET1 | P.CM1C | | DECREMENT LEVEL INDICATOR |
| 0110 | 0261 | 1 011 000 111 | | BRN | LJSB2 | NO CARRY: O.K. GO TO COMMON PART WITH JSB |
| 0111 | 0163 | 0 111 001 111 | | BRN | LEROR | CARRY: SYNTAX ERROR |
| 0112 | | 0 001 011 000 | LOXXB | LDC1 | | LOAD SYMBOL CODE FOR 1/X |
| 0113 | 0354 | 1 110 110 101 | | JSB | LPRINT | PRINT AND RESTORE DATA IN C-REG |
| 0114 | | 1 100 001 100 | | PT12 | | SET POINTER |
| 0115 | | 1 011 101 110 | LOXXC | W.ZTA | | CLEAR A-REG |
| 0116 | | 1 111 100 010 | | P,AP1A | | GENERATE "ONE" AS DIVIDEND |
| 0117 | | 1 011 000 100 | LOXXD | SS11 | | SET SINGLE OPERAND OP. FLAG |
| 0120 | 0137 | 0 101 111 111 | | BRN | LDIVR | GO TO DIVISION ROUTINE |
| 0121 | | 0 101 011 000 | LTWWB | LDC5 | | LOAD SYMBOL CODE FOR X/12 |
| 0122 | 0354 | 1 110 110 101 | | JSB | LPRINT | PRINT AND RESTORE DATA IN C-REG |
| 0123 | | 1 100 001 100 | | PT12 | | |
| 0124 | | 0 110 001 110 | | W.CTA | | SEND NEW DATA TO A-REG (DIVISOR) |
| 0125 | | 0 011 001 110 | | W.ZTC | | RESET C-REG TO ZERO |
| 0126 | | 0 001 011 000 | | LDC1 | | BUILD "12" FOR DIVISOR |
| 0127 | | 0 010 011 000 | | LDC2 | | |
| 0130 | | 1 100 001 100 | | PT12 | | SET PROPER POINTER VALUE |
| 0131 | 0074 | 0 011 110 011 | | BRN | LTWW2 | |
| 0132 | 0026 | 0 001 011 011 | LPCHS | BRN | LCHS1 | GO TO CH.S.ROUTINE EXECUTION |
| 0133 | 0007 | 0 000 100 001 | LLNB | JSB | LPREP | PREPARE DATA FOR PRINT. |
| 0134 | | 0 111 011 000 | | LDC7 | | LOAD SYMBOL CODE FOR LN |
| 0135 | 0354 | 1 110 110 101 | | JSB | LPRINT | PRINT AND RESTORE DATA |
| 0136 | 0001 | 0 000 000 111 | | BRN | LLN1 | GO TO EXECUTION PART |
| 0137 | | 0 110 100 100 | LDIVR | RS6 | | RESET D.P. FLAG IF SET |
| 0140 | | 1 000 010 000 | LDIVQ | ROM 4 | | GO TO DIVISION ROUTINE |
| 0141 | 0055 | 0 010 110 111 | LGRND | BRN | LGT1 | GO TO GRAND-TOTAL ROUTINE |
| 0142 | | 0 010 101 000 | LIOC2 | CXM | | GET INT. FLG. VECTOR FOR UPDATE |
| 0143 | | 1 011 001 100 | | PT11 | | PREPARE DIGIT INTERPRETATION CODE FLAG |
| 0144 | | 0 010 011 000 | | LDC2 | | SET IT TO TWO |
| 0145 | 0035 | 0 001 110 111 | | BRN | LIOC3 | GO TO STORE INT.FLG.VECTOR |
| 0146 | | 0 110 011 000 | LEXPB | LDC6 | | LOAD SYMBOL CODE FOR EXP |
| 0147 | 0354 | 1 110 110 101 | | JSB | LPRINT | GO TO PRINT AND RESTORE DATA IN C-REG |

MAIN UNIT LISTING (ROM A-6) – Continued

| CURR ADDR | BRAN ADDR | OPERATION CODE BIT PATTERN | | | | |
|---|---|---|---|---|---|---|
| 0150 | 0002 | 0 000 001 011 | | BRN | LEXP1 | GO TO EXECUTION PART OF THE ROUTINE |
| 0151 | | 0 010 001 110 | LINCL | W.BTC | | RESTORE DATA |
| 0152 | | 0 111 000 000 | LINCR | PINC | | PROGRAM COUNTER INCREMENT BY ONE |
| 0153 | | 0 111 000 000 | | PINC | | PROGRAM COUNTER INCREMENT BY TWO |
| 0154 | 0275 | 1 011 110 111 | | BRN | LFINI | GO TO RESET FLAGS AND ROUTINE EXIT |
| 0155 | | 0 100 101 000 | LALF2 | CTS | | STORE RIGHT PART OF MESSAGE IN STACK |
| 0156 | | 0 001 001 100 | | PT1 | | PREPARE COUNTER |
| 0157 | 0174 | 0 111 110 011 | | BRN | LALF4 | |
| 0160 | | 1 000 010 000 | LCLA9 | ROM 6 | | |
| 0161 | | 0 111 000 000 | LCLAZ | PINC | | INCREMENT PROGRAM COUNTER |
| 0162 | 0151 | 0 110 100 111 | | BRN | LINCL | |
| 0163 | | 1 110 010 000 | LEROM | ROM 7 | | GO TO MESSAGE ROUTINE |
| 0164 | | 0 111 000 000 | LCLAN | PINC | | PREPARE NEXT STEP IN SEARCH ROUTINE |
| 0165 | | 0 111 000 000 | LCLAD | PINC | | INCR. P-REG. TO REACH THIRD NEXT ADDR. |
| 0166 | | 0 011 001 110 | | W.ZTC | | PREPARE C-REG |
| 0167 | | 0 101 001 100 | | PT5 | | PREPARE COUNTER |
| 0170 | 0301 | 1 100 001 001 | | JSB | LGNTI | GO GET NEXT INSTRUCTIONS INTO T-REG |
| 0171 | | 1 110 101 110 | | W.AXC | | GET MASTER INTO C-REG |
| 0172 | | 0 110 001 110 | | W.CTA | | COPY IT BACK INTO A-REG FOR NEXT STEP |
| 0173 | 0160 | 0 111 000 011 | | BRN | LCLA9 | |
| 0174 | 0303 | 1 100 010 001 | LALF4 | JSB | LGNT2 | GET SEVEN INSTR.TO BUILD LEFT PART OF MESS.IN T-REG |
| 0175 | | 1 100 101 000 | | DNR | | RIGHT PART OF THE MESSAGE INTO C-REG |
| 0176 | | 0 111 000 000 | LALF3 | PINC | | PRGM. COUNTER INCREMENT (+10)(PT=8) |
| 0177 | | 0 000 111 100 | | PLS | | COUNT INCREMENTS |
| 0200 | | 0 011 101 100 | | YP3 | | 11-TH ? |
| 0201 | 0176 | 0 111 111 011 | | BRN. | LALF3 | NO: CONTINUE |
| 0202 | 0031 | 0 001 100 111 | | BRN | LALF8 | GO TO PRINT MESSAGE |
| 0203 | | 1 111 001 100 | LRET2 | PT15 | | PREPARE FOUR SHIFTS DOWN |
| 0204 | | 1 001 001 110 | LALIG | W.SRC | | ALIGNMENT SHIFT |
| 0205 | | 0 000 111 100 | | PLS | | COUNT |
| 0206 | | 0 011 101 100 | | YP3 | | FINISHED? |
| 0207 | 0204 | 1 000 010 011 | | BRN | LALIG | NO: COUTINUE |
| 0210 | | 0 101 010 100 | | YS5 | | YES.WHO? |
| 0211 | 0214 | 1 000 110 011 | | BRN | LRET20 | IT IS RETURN ROUTINE |
| 0212 | | 0 111 110 000 | | CTT | | COPY SHIFTED ADDR. INTO T-REG |
| 0213 | | 0 000 110 000 | | RETURN | | END OF THE SUBROUTINE |
| 0214 | | 1 011 110 000 | LRET20 | DTDS | | STORE NEW STACK IN D.S. |
| 0215 | | 1 000 000 000 | | TTP | | RETURN ADDR INTI PRGM.COUNTER |
| 0216 | 0151 | 0 110 100 111 | | BRN | LINCL | |
| 0217 | | 0 001 101 110 | LCLAF | W.CMI | | MATCH FOUND? |
| 0220 | 0164 | 0 111 010 011 | | BRN | LCLAN | NO: GO TO NEXT STEP |
| 0221 | 0161 | 0 111 000 111 | | BRN | LCLAZ | YES: FINISHED |
| 0222 | | 0 010 101 000 | LJMP2 | CXM | | STORE INT. FLG. VECTOR  RESTORE DATA |
| 0223 | | 1 000 101 110 | | W.BXC | | SAVE DATA INTO B-REG |
| 0224 | | 0 100 010 100 | | YS4 | | IS THIS JUMP RELATIVE? |
| 0225 | 0244 | 1 010 010 011 | | BRN | LJMP3 | NO: |
| 0226 | 0301 | 1 100 001 001 | LJAB1 | JSB | LGNTI | YES: GET NEXT TWO INSTRUCTIONS (PT=6) |
| 0227 | 0203 | 1 000 010 001 | | JSB | LALIG | ADDRESS MODIFIER ALIGNMENT |
| 0230 | | 0 100 010 000 | LJAB2 | ROM 2 | | GO TO MODIFY ADDRESS |
| 0231 | | 0 010 101 000 | LJMPA | CXM | | GET INT. FLG. VECTOR. SAVE DATA |
| 0232 | | 0 110 001 100 | | PT6 | | PREPARE PROGRAM JUMP CONDITION FLAG |
| 0233 | | 0 110 100 010 | | P.ZMC | | TEST CONDITION FOR PROGRAM JUMP |
| 0234 | 0222 | 1 001 001 011 | | BRN | LJMP2 | NO CARRY: ZERO: CONDITION MET: GO TO EXECUTE |
| 0235 | | 0 000 011 000 | | LDC0 | | CARRY: CONDITION NOT MET: RESET CONDITION FLAG |
| 0236 | | 0 010 101 000 | | CXM | | STORE INT. FLG. VECTOR: RESTORE DATA |
| 0237 | | 0 101 010 100 | | YS5 | | IS IT RETURN ROUTINE? |
| 0240 | 0275 | 1 011 110 111 | | BRN | LFINI | YES: SKIP PRGM. COUNTER INCREMENT |
| 0241 | | 1 001 010 100 | | YS9 | | IS IT JUMP TO C-REG CONTENTS? |
| 0242 | 0152 | 0 110 101 011 | | BRN. | LINCR | NO. GO TO PRGM COUNTER INCREMENT |
| 0243 | 0275 | 1 011 110 111 | | BRN | LFINI | GO TO ROUTINE EXIT |
| 0244 | | 0 001 010 100 | LJMP3 | YS1 | | IS THIS A "JSB" ROUTINE |
| 0245 | 0320 | 1 101 000 011 | | BRN | LJMP4 | NO: IT IS "GO TO " ROUTINE |
| 0246 | | 1 010 101 000 | | MTC | | YES: GET INT. FLG. VECTOR |
| 0247 | | 0 101 001 100 | | PT5 | | PREPARE SUBROUTINE LEVEL INDICATOR |
| 0250 | | 0 101 010 100 | | YS5 | | IS THIS RETURN ROUTINE? |
| 0251 | 0107 | 0 100 011 111 | | BRN | LRET1 | YES |
| 0252 | | 1 110 100 010 | | P.AXC | | NO: IT IS JSB: PREPARE LEVEL TEST |
| 0253 | | 0 011 011 000 | | LDC3 | | SET LIMIT |
| 0254 | | 0 000 111 100 | | PLS | | RESTORE POINTER |
| 0255 | | 0 101 000 010 | | P.AMCC | | CHECK DIFFERENCE |
| 0256 | 0163 | 0 111 001 111 | | BRN | LEROR | NO CARRY: LIMIT: SYNTAX ERROR |
| 0257 | | 1 110 100 010 | | P.AXC | | CARRY, O.K., RESTORE LEVEL INDICATOR IN C-REG |
| 0260 | | 0 111 100 010 | | P.CP1C | | INCREMENT LEVEL INDICATOR |
| 0261 | | 0 010 101 000 | LJSB2 | CXM | | STORE UPDATED INT. FLG. VECTOR |
| 0262 | | 0 011 001 110 | | W.ZTC | | START TO BUILD INT. D.S.P ADDRESS |
| 0263 | | 0 111 101 110 | | W.CP1C | | SET EXPONENT TO ONE |
| 0264 | | 1 100 001 100 | | PT12 | | PREPARE PROPER POINTER |
| 0265 | | 1 111 011 000 | | LDC15 | | INTERNAL D.S. ADDRESS |
| 0266 | 0337 | 1 101 111 111 | | BRN | LJSB20 | |
| 0267 | | 0 010 010 000 | LEPRINN | ROM 1 | | |
| 0270 | 0014 | 0 000 110 011 | LOXXT | BRN | LOXXA | GO TO 1/X ROUTINE BEGINNING |
| 0271 | 0040 | 0 010 000 011 | LEXPT | BRN | LEXPA | GO TO EXP. ROUTINE BEGINNING |
| 0272 | | 0 000 010 000 | LTRA2 | ROM 0 | | |
| 0273 | | 0 110 010 000 | LCLA2 | ROM 3 | | GO TO SEARCH FOR LABEL ROUTINE |
| 0274 | | 0 010 001 110 | LFIN4 | W.BTC | | RESTORE DATA IN C-REG |
| 0275 | | 0 010 010 000 | LFINI | ROM 1 | | ROUTINE EXIT |
| 0276 | | 0 011 001 110 | LPLA1 | W.ZTC | | PREPARE C-REG FOR LABEL |
| 0277 | | 0 110 001 100 | | PT6 | | PREPARE COUNTER |
| 0300 | 0301 | 1 100 001 001 | | JSB | LGNTI | GET LABEL NUMBER FROM THE PROGRAM |
| 0301 | 0273 | 1 011 101 111 | | BRN | LCLA2 | GO TO SEARCH FOR LABEL ROUTINE |
| 0302 | | 0 111 000 000 | LGNTI | PINC | | INCREMENT PRGM. COUNTER |
| 0303 | | 0 111 000 000 | | PINC | | INCREMENT PRGM. COUNTER |
| 0304 | | 1 001 001 110 | LGNT2 | W.SRC | | ALIGNMENT SHIFT ONE |
| 0305 | | 1 001 001 110 | | W.SRC | | ALIGNMENT SHIFT TWO |
| 0306 | | 0 111 110 000 | | CTT | | COPY C-REG TO T-REG |
| 0307 | | 1 000 100 000 | | READ | | GET NEXT INSTRUCTION |
| 0310 | | 1 011 010 100 | | YS11 | | EXTERNAL FLAG? |
| 0311 | 0364 | 1 111 010 011 | | BRN | LOKY2 | NO: O.K. |
| 0312 | 0272 | 1 011 101 011 | | BRN | LTRA2 | YES: TROUBLE |
| 0313 | | 0 101 000 000 | LJSB4 | IS2 | | |
| 0314 | | 1 000 101 000 | | PTT | | ADD NEW RETURN VECTOR TO STACK |
| 0315 | | 1 001 000 000 | | IS1 | | |
| 0316 | | 0 111 111 000 | | TTC | | PREPARE NEW RET. V. STACK FOR STORE |
| 0317 | | 1 011 110 000 | | DTDS | | STORE NEW STACK IN D.S. |
| 0320 | | 1 000 010 100 | LJMP4 | YS8 | | IS THIS JUMP TO ABS. ADDRESS? |
| 0321 | 0226 | 1 001 011 011 | | BRN | LJAB1 | YES |
| 0322 | | 1 001 010 100 | | YS9 | | NO: IT IS JUMP TO LABEL: WHERE? |
| 0323 | 0276 | 1 011 111 011 | | BRN | LPLA1 | LABEL IS IN PROGRAM |

MAIN UNIT LISTING (ROM A-6) – Continued

| LINE # | CURR ADDR | BRAN ADDR | OPERATION CODE BIT PATTERN | | | | |
|---|---|---|---|---|---|---|---|
| 215 | 0324 | | 1 100 101 110 | | W.AXB | | LABEL IS IN CPU. GET IT INTO A-REG |
| 216 | 0325 | | 0 010 010 000 | | ROM 1 | | |
| 217 | 0326 | | 1 001 010 100 | LJSR40 | YS9 | | LABEL IN C-REG ? |
| 218 | 0327 | 0313 | 1 100 101 111 | | BRN | LJSR4 | NO |
| 219 | 0330 | | 0 101 000 000 | | IS2 | | YES |
| 220 | 0331 | | 1 001 001 000 | | PDEC | | DECREMENT CURRENT ADDRESS |
| 221 | 0332 | | 1 001 001 000 | | PDEC | | BY TWO FOR PROPER RETURN |
| 222 | 0333 | | 1 001 000 000 | | IS1 | | |
| 223 | 0334 | 0313 | 1 100 101 111 | | BRN | LJSR4 | |
| 224 | 0335 | 0274 | 1 011 110 011 | LRETX | BRN | LFIN4 | GO TO ROUTINE EXIT |
| 225 | 0336 | 0273 | 1 011 101 111 | LCLAB | BRN | LCLA2 | |
| 226 | 0337 | | 0 110 011 000 | LJSR20 | LDC6 | | RETURN VECTOR STACK ADDRESS |
| 227 | 0340 | | 1 001 110 000 | | ATDS | | D.S. CALL |
| 228 | 0341 | | 0 110 001 100 | | PT6 | | PREPARE PROPER POINTER |
| 229 | 0342 | | 1 011 111 000 | | DSTC | | READ RETURN VECTOR STACK INTO C-REG |
| 230 | 0343 | | 0 111 110 000 | | CTT | | IS THIS RETURN ROUTINE? |
| 231 | 0344 | | 0 101 010 100 | | YS5 | | YES |
| 232 | 0345 | 0203 | 1 000 001 111 | | BRN | LRET2 | NO: IT IS JSR. PREPARE STACK-UP (NON BCD-CH.) |
| 233 | 0346 | | 0 000 111 100 | LJSR3 | PLS | | COUNT SHIFTS (BEGINNING PT=10) |
| 234 | 0347 | | 0 101 000 000 | | IS2 | | |
| 235 | 0350 | | 0 100 001 000 | | SLT | | SHIFT T-REG LEFT ONE BIT |
| 236 | 0351 | | 1 001 000 000 | | IS1 | | |
| 237 | 0352 | | 0 110 101 100 | | YP6 | | WAS IT 16-TH SHIFT ? |
| 238 | 0353 | 0346 | 1 110 011 011 | | BRN | LJSR3 | NO: CONTINUE |
| 239 | 0354 | 0326 | 1 101 011 011 | | BRN | LJSR40 | YES.FINISHED |
| 240 | 0355 | | 0 101 010 100 | LPRINT | YS5 | | PRINT OR NOT TO PRINT ? |
| 241 | 0356 | 0267 | 1 011 011 111 | | BRN | LFPRINN | GO TO PRINT |
| 242 | 0357 | | 0 101 100 100 | | RS5 | | |
| 243 | 0360 | | 0 010 001 110 | | W.BTC | | |
| 244 | 0361 | | 0 000 110 000 | | RETURN | | |
| 245 | 0362 | | 0 010 100 000 | | RMGRB | | CALL F.BLOCK FOR INTERPRETATION |
| 246 | 0363 | 0350 | 0 010 100 011 | LTWWT | BRN | LTWWA | GO TO X/12 ROUTINE BEGINNING |
| 247 | 0364 | | 0 101 000 000 | LOKY2 | IS2 | | |
| 248 | 0365 | | 0 100 101 000 | | IXT | | LOAD NEW INSTRUCTION INTO T-REG |
| 249 | 0366 | | 1 001 001 000 | | PDEC | | DECREMENT PROGRAM COUNTER |
| 250 | 0367 | | 1 001 000 000 | | IS1 | | |
| 251 | 0370 | | 0 111 111 000 | | TTC | | COPY NEW INSTRUCTION INTO C-REG |
| 252 | 0371 | | 0 000 111 100 | | PLS. | | COUNT |
| 253 | 0372 | | 1 000 101 100 | | YP8 | | FINISHED? |
| 254 | 0373 | 0304 | 1 100 010 011 | | BRN | LGNT2 | NO: MAKE THE LOOP AGAIN |
| 255 | 0374 | | 0 000 110 000 | | RETURN | | YES: SUBROUTINE END |
| 256 | 0375 | 0101 | 0 100 000 111 | LLOGT | BRN | LLOGB | GO TO LOG ROUTINE BEGINNING |
| 257 | 0376 | 0133 | 0 101 101 111 | LLNT | BRN | LLNB | GO TO LN ROUTINE BEGINNING |
| 258 | 0377 | 0142 | 0 110 001 011 | LIOPC | BRN | LIOC2 | GO TO I/O CALL ROUTINE |

MAIN UNIT LISTING (ROM A-7)

| LINE # | CURR ADDR | BRAN ADDR | OPERATION CODE BIT PATTERN | | | | |
|---|---|---|---|---|---|---|---|
| 3 | 0000 | 0014 | 0 000 110 011 | | BRN | LSYNG | |
| 4 | 0001 | | 1 101 111 110 | LADJ2 | S.AMIA | | RESTORE D.P.L. FLAG |
| 5 | 0002 | | 1 101 111 110 | LADJ4 | S.AMIA | | DECREMENT. CHECK IF CARRY |
| 6 | 0003 | 0010 | 0 000 100 011 | | BRN | LADJ3 | NO CARRY CONTINUE EXPONENT ADJUSTMENT |
| 7 | 0004 | | 0 001 001 100 | | PT1 | | CARRY. ADJUSTMENT OF THE EXP. IS FINISHED |
| 8 | 0005 | | 1 001 100 010 | | P.AM1 | | CHECK MOST SIGNIFICANT DIGIT OF THE EXPONENT |
| 9 | 0006 | 0322 | 1 101 001 011 | | BRN | LTRA1 | |
| 10 | 0007 | 0314 | 1 100 110 011 | | BRN | LTRA3 | ZERO.GO TO SIGN OF EXP.CHECK |
| 11 | 0010 | | 1 111 101 010 | LADJ3 | X.AP1A | | INCREMENT EXPONENT |
| 12 | 0011 | | 0 000 000 000 | | NOP | | TO ELIMINATE CARRY |
| 13 | 0012 | 0002 | 0 000 001 011 | | BRN | LADJ4 | |
| 14 | 0013 | | 1 010 001 100 | LSYNA | PT10 | | SET POINTER FOR NOTE #5 |
| 15 | 0014 | | 0 000 110 100 | LSYNG | CLS | | CLEAR ALL STATUS BITS |
| 16 | 0015 | 0237 | 1 001 111 111 | | BRN | LSYNN | |
| 17 | 0016 | | 1 001 000 100 | LGT3 | SS9 | | SET SHIFT FLAG |
| 18 | 0017 | | 0 000 010 000 | | ROM 0 | | |
| 19 | 0020 | | 1 000 101 110 | LERRR | W.RXC | | |
| 20 | 0021 | 0221 | 1 001 000 111 | | BRN | LERA0 | |
| 21 | 0022 | | 1 011 011 000 | LGTS | LDC11 | | R (FROM ROM 6 ) |
| 22 | 0023 | | 1 011 011 000 | | LDC11 | | LOAD T |
| 23 | 0024 | 0231 | 1 001 100 111 | | BRN | LGT4 | |
| 24 | 0025 | 0165 | 0 111 010 111 | LPREPA | BRN | LPRSA | |
| 25 | 0026 | | 0 000 010 000 | LRES5 | ROM 0 | | RETURN TO ROM 0 |
| 26 | 0027 | | 0 010 010 000 | LFPR1 | ROM 1 | | GO TO PRINT PART |
| 27 | 0030 | 0365 | 1 111 010 111 | LRES8 | BRN | LRES7 | |
| 28 | 0031 | | 0 010 101 000 | LRES8 | CXM | | PUT INT.FLG.VECTOR INTO M-REG |
| 29 | 0032 | | 1 101 001 100 | | PT13 | | PREPARE MESSAGE GEN. |
| 30 | 0033 | | 1 111 011 000 | LRES4 | LDC15 | | "BLANK" |
| 31 | 0034 | | 0 001 101 100 | | YP1 | | BLANKS STILL NEEDED? |
| 32 | 0035 | 0033 | 0 001 101 111 | | BRN | LRES4 | YES |
| 33 | 0036 | | 0 001 011 000 | | LDC1 | | NO. SET "C" |
| 34 | 0037 | | 0 111 011 000 | | LDC7 | | SET"L" |
| 35 | 0040 | | 0 111 110 000 | | CTT | | STORE LEFT PART OF THE PRNT. WORD IN T-REG |
| 36 | 0041 | | 1 101 001 100 | | PT13 | | |
| 37 | 0042 | | 1 011 011 000 | | LDC11 | | SET "E" |
| 38 | 0043 | | 0 000 000 000 | | NOP | | |
| 39 | 0044 | | 1 100 011 000 | | LDC12 | | SET "A" |
| 40 | 0045 | | 1 011 011 000 | | LDC11 | | SET "R" |
| 41 | 0046 | | 1 111 011 000 | | LDC15 | | SET "BLANK" |
| 42 | 0047 | 0026 | 0 001 011 011 | | BRN | LRES5 | END OF MESSAGE |
| 43 | 0050 | | 1 111 011 000 | CONT | LDC15 | | LOAD BLANKS |
| 44 | 0051 | | 0 100 101 000 | | CTS | | STORE PRINT MASK |
| 45 | 0052 | | 1 101 001 100 | | PT13 | | |
| 46 | 0053 | | 1 111 011 000 | LMESA | LDC15 | | |
| 47 | 0054 | | 0 111 101 100 | | YP7 | | |
| 48 | 0055 | 0053 | 0 010 101 111 | | BRN | LMESA | |
| 49 | 0056 | | 1 100 011 000 | | LDC12 | | N |
| 50 | 0057 | | 1 111 011 000 | | LDC15 | | BLANK |
| 51 | 0060 | | 0 000 011 000 | | LDC0 | | O |
| 52 | 0061 | | 1 111 011 000 | | LDC15 | | BLANK |

MAIN UNIT LISTING (ROM A-7) – Continued

| LINE # | CURR ADDR | BRAN ADDR | OPERATION CODE BIT PATTERN | | | | |
|---|---|---|---|---|---|---|---|
| 53 | 0062 | | 1 011 011 000 | | LDC11 | | T |
| 54 | 0063 | | 1 111 011 000 | | LDC15 | | BLANK |
| 55 | 0064 | | 1 011 011 000 | | LDC11 | | E |
| 56 | 0065 | | 1 111 011 000 | | LDC15 | | |
| 57 | 0066 | | 0 111 110 000 | | CTT | | |
| 58 | 0067 | | 1 100 101 000 | | DNR | | RECOVER PRINT MASK |
| 59 | 0070 | | 0 000 110 000 | | RETURN | | END OF THE SUBROUTINE |
| 60 | 0071 | | 0 110 010 000 | LPRS6 | ROM 3 | | |
| 61 | 0072 | | 1 011 111 000 | | DSTC | | GET GRAND TOTAL |
| 62 | 0073 | 0016 | 0 000 111 011 | | BRN | LGT3 | |
| 63 | 0074 | | 0 100 101 110 | LRED1 | W.ATB | | COPY ORIG. DATA INTO B-REG |
| 64 | 0075 | | 0 000 011 110 | | S.ZMB | | CHECK SIGN OF MANTISSA |
| 65 | 0076 | 0100 | 0 100 000 011 | | BRN | LADJ1 | POSITIVE. GO TO DATA ADJUSTMENT |
| 66 | 0077 | | 0 001 110 000 | | RED | | PREPARE RED TAPE |
| 67 | 0100 | | 1 110 110 110 | LADJ1 | MS.AXC | | MANTISSA BACK TO C-REG: FLG. VECTOR TO A-REG |
| 68 | 0101 | | 0 011 011 010 | | XS.ZTC | | CANCELL OP.CODE IN C-REG |
| 69 | 0102 | | 1 111 111 110 | | S.APIA | | INCREMENT: CHECK IF CARRY |
| 70 | 0103 | 0001 | 0 000 000 111 | | BRN | LADJ2 | NO. CONTINUE TEST |
| 71 | 0104 | | 0 110 001 110 | LSCI1 | W.CTA | | YES: START SCI. NOTATION FORMAT PRINT |
| 72 | 0105 | | 1 011 001 100 | | PT11 | | SET POINTER TO INDICATE DE.POINT LOCATION |
| 73 | 0106 | | 0 101 000 100 | | SS5 | | SET SCI. NOT. FORMAT FLAG |
| 74 | 0107 | | 1 011 010 100 | LDCP1 | YS11 | | CHECK IF EXTERNAL FLAG IS SET |
| 75 | 0110 | 0133 | 0 101 101 111 | | BRN | LDCP4 | NO. CONTINUE IN PRINT ROUTINE |
| 76 | 0111 | | 0 100 010 000 | | ROM 2 | | YES:GO TO DISPLAY ROUTINE |
| 77 | 0112 | | 1 001 100 100 | LFPRM | RS9 | | |
| 78 | 0113 | | 0 010 001 110 | | W.BTC | | RESTORE DATA IN C-REG |
| 79 | 0114 | | 0 000 110 000 | | RETURN | | |
| 80 | 0115 | | 1 111 101 010 | LTRB4 | X.APIA | | |
| 81 | 0116 | 0256 | 1 010 111 011 | | BRN | LTRB5 | |
| 82 | 0117 | | 0 011 011 110 | LADJ6 | S.ZTC | | PREPARE ALIGNMENT SHIFT |
| 83 | 0120 | | 1 001 001 110 | | W.SRC | | MANTISSA ALIGNMENT IN FIX FORMAT PRINT |
| 84 | 0121 | | 0 000 001 100 | LADJ5 | PT0 | | PREPARE CHECK OF THE LEAST SIGN DIGIT |
| 85 | 0122 | | 1 111 100 010 | | P.APIA | | INCREMENT TO CHECK IF IT WAS NINE |
| 86 | 0123 | 0117 | 0 100 111 111 | | BRN | LADJ6 | NO CARRY. GO TO ROUND AND SHIFT |
| 87 | 0124 | 0261 | 1 011 000 111 | | BRN | LADJ7 | GO TO ROUND OFF ROUTINE |
| 88 | 0125 | | 1 110 101 110 | LADJ8 | W.AXC | | DATA TEMP. INTO A-REG |
| 89 | 0126 | | 1 010 101 000 | | MTC | | PREPARE INT.FLG.VECTOR FOR TEST |
| 90 | 0127 | | 0 010 001 100 | | PT2 | | PRESET POINTER FOR FIX 0 FORMAT |
| 91 | 0130 | | 0 101 111 110 | LDCP3 | S.CMIC | | DECREMENT DPL FLAG TO CHECK IF IT IS ZERO |
| 92 | 0131 | 0150 | 0 110 100 011 | | BRN | LDCP2 | NOT ZERO. CONTINUE |
| 93 | 0132 | 0107 | 0 100 011 111 | | BRN | LDCP1 | ZERO. FINISHED |
| 94 | 0133 | | 1 110 101 110 | LDCP4 | W.AXC | | BRING PART OF PRINT. WORD TO C-REG |
| 95 | 0134 | | 1 001 010 010 | | WP.SRC | | MAKE SPACE FOR DEC.POINT PRINT CODE |
| 96 | 0135 | | 0 111 100 010 | | P.CP1C | | SET"1" TO INDICATE D.P. LOCATION |
| 97 | 0136 | | 0 110 001 110 | | W.CTA | | COPY NEW "MASK" TO A-REG |
| 98 | 0137 | | 1 010 011 000 | | LDC10 | | SET PRINT CODE FOR D.P. |
| 99 | 0140 | | 1 100 001 100 | | PT12 | | PREPARE SEARCH FOR LEADING ZEROS |
| 100 | 0141 | | 1 001 100 010 | LDCP5 | P.AM1 | | DECREMENT. CHECK IF CARRY |
| 101 | 0142 | 0347 | 1 110 011 111 | | BRN | LMSS1 | NON ZERO. FINISHED |
| 102 | 0143 | | 1 111 011 000 | | LDC15 | | ZERO. SET CODE FOR BLANK INTO C-REG |
| 103 | 0144 | 0141 | 0 110 000 111 | | BRN | LDCP5 | CONTINUE IN SEARCH |
| 104 | 0145 | | 1 110 101 110 | LSYM3 | W.AXC | | COPY EXPONENT INTO C-REG |
| 105 | 0146 | | 1 111 011 000 | LSYM9 | LDC15 | | LOAD PRINT CODE FOR BLANK |
| 106 | 0147 | 0071 | 0 011 100 111 | | BRN | LPRS6 | GO TO SUBROUTINE EXIT |
| 107 | 0150 | | 0 000 111 100 | LDCP2 | PLS | | INCREMENT POINTER TO INDICATE FIX FORMAT |
| 108 | 0151 | 0130 | 0 101 100 011 | | BRN | LDCP3 | |
| 109 | 0152 | | 0 101 000 100 | LPRS5 | SS5 | | SET "DO NOT PRINT" FLAG |
| 110 | 0153 | | 0 100 101 110 | | W.ATB | | COPY DATA INTO B-REG FOR NEXT EXECUTION STEPS |
| 111 | 0154 | 0071 | 0 011 100 111 | | BRN | LPRS6 | |
| 112 | 0155 | | 1 110 100 000 | LPRS4 | YPOC | | CHECK PRINT-ON-COMMAND FLAG |
| 113 | 0156 | | 1 011 010 100 | | YS11 | | ON COMMAND ONLY? |
| 114 | 0157 | 0242 | 1 010 001 011 | | BRN | LRED0 | GO TO CHECK AUX.FLAG |
| 115 | 0160 | | 1 011 100 100 | | RS11 | | RESET EXTERNAL FLAG |
| 116 | 0161 | | 0 101 010 100 | LPRS50 | YS5 | | IS AUX.FLAG SET ? |
| 117 | 0162 | 0152 | 0 110 101 011 | | BRN | LPRS5 | NO.CONTINUE IN DATA ADJUSTMENR |
| 118 | 0163 | 0276 | 1 011 111 011 | | BRN | LFPPS | YES.GO TO LEFT PARENTHESIS ROUTINE |
| 119 | 0164 | 0214 | 0 000 110 011 | LERROR | BRN | LSYNG | |
| 120 | 0165 | | 0 110 001 110 | LPRSA | W.CTA | | COPY DATA TO A-REGISTER |
| 121 | 0166 | | 1 010 101 000 | LPRSAA | MTC | | GET INT.FLG.VECTOR FOR TEST |
| 122 | 0167 | | 1 100 001 100 | | PT12 | | PREPARE OP. MODE CODE FOR TEST |
| 123 | 0170 | | 0 110 100 010 | | P.ZMC | | CHECK IF ZERO |
| 124 | 0171 | 0155 | 0 110 110 111 | | BRN | LPRS4 | OP. CODE WAS NOT ONE. CONTINUE TEST |
| 125 | 0172 | 0161 | 0 111 000 111 | | BRN | LPRS50 | GO TO CHECK AUX.FLAG |
| 126 | 0173 | | 0 000 110 100 | LNOT20 | CLS | | CLEAR ALL STATUS BITS TO AVOID TROUBLE |
| 127 | 0174 | 0176 | 0 111 111 011 | | BRN | NOT20 | |
| 128 | 0175 | 0263 | 1 011 010 001 | LFRIA | JSB | LMESS | GENERATE MESSAGE |
| 129 | 0176 | 0324 | 1 101 010 101 | NOT20 | JSB | LFPRZ | PRINT |
| 130 | 0177 | 0247 | 1 010 011 111 | | BRN | LSYN9 | EXIT |
| 131 | 0200 | | 0 101 010 100 | LPRTA | YS5 | | PRINT OR NOT? |
| 132 | 0201 | 0327 | 0 001 011 111 | | BRN | LFPR1 | PRINT |
| 133 | 0202 | | 1 010 101 000 | LFPR4 | MTC | | DO NOT: GET INT. FLAG VECTOR FOR UPDATE |
| 134 | 0203 | | 0 001 001 100 | | PT1 | | PREPARE OP. CODE LOADING |
| 135 | 0204 | | 0 011 010 010 | | WP.ZTC | | MASK PREVIOUS OP. CODE WITH ZEROS |
| 136 | 0205 | | 0 101 100 100 | | RS5 | | RESET "DO NOT PRINT" FLAG IF SET |
| 137 | 0206 | 0220 | 1 001 000 011 | | BRN | LFPR5 | |
| 138 | 0207 | | 0 111 110 000 | LSCI3 | CTT | | STORE LEFT HALF OF THE PRINT WORD |
| 139 | 0210 | | 1 100 101 010 | | X.AXB | | SEND EXPONENT TO A-REG |
| 140 | 0211 | | 0 100 101 010 | | X.ATB | | RESTORE ORIG. EXPONENT IN B-REG |
| 141 | 0212 | | 0 011 001 110 | LSCI4 | W.ZTC | | CANCELL NONBCD CHAR. IN C-REG |
| 142 | 0213 | | 0 100 001 110 | LSCI5 | W.SLA | | ALIGNMENT SHIFT |
| 143 | 0214 | | 0 000 111 100 | | PLS | | INCREMENT SHIFT COUNTER |
| 144 | 0215 | | 1 011 101 100 | | YP11 | | FINISHED? |
| 145 | 0216 | 0213 | 1 000 101 111 | | BRN | LSCI5 | NO. STAY IN LOOP |
| 146 | 0217 | 0145 | 0 110 010 111 | | BRN | LSYM3 | YES |
| 147 | 0220 | | 0 000 010 000 | LFPR5 | ROM 0 | | GO BACK TO ROM 0 |
| 148 | 0221 | 0263 | 1 011 010 001 | LFRAN | JSB | LMESS | GO TO MESSAGE GEN. |
| 149 | 0222 | | 1 101 001 100 | | PT13 | | LOAD 20 |
| 150 | 0223 | 0373 | 1 111 101 111 | | BRN | NOT2 | |
| 151 | 0224 | | 0 110 001 110 | LPRXA | W.CTA | | GO TO FORCED PRINT DATA ADJUSTMENT |
| 152 | 0225 | | 1 010 101 000 | | MTC | | |
| 153 | 0226 | 0074 | 0 011 110 011 | | BRN | LRED1 | |
| 154 | 0227 | | 0 100 101 000 | LPRST | CTS | | STORE SYMBOL TEMPORARILY IN D-REG |
| 155 | 0230 | 0166 | 0 111 011 011 | | BRN | LPRSAA | |
| 156 | 0231 | | 0 000 010 000 | LGT4 | ROM 0 | | GO TO PRINT |
| 157 | 0232 | | 1 011 111 000 | LAC1 | DSTC | | FETCH ACCUMULATED TOTAL |
| 158 | 0233 | | 0 000 110 100 | | CLS | | CLEAR STATUS BITS |
| 159 | 0234 | | 1 010 000 100 | | SS10 | | SET EQUAL KEY FLAG |
| 160 | 0235 | | 0 110 000 100 | | SS6 | | SET L-FLAG |

MAIN UNIT LISTING (ROM A-7) – Continued

```
CURR  BRAN   OPERATION CODE
ADDR  ADDR   BIT PATTERN

0236  0317  1 100 111 111            BRN      LAC2
0237        0 111 000 100  LSYNN     SS7
0240        0 010 100 100  LSYNF     RS2
0241  0175  0 111 110 111            BRN      LERTA
0242        0 101 010 100  LRED0     YS5               IS AUX.FLAG SET ?
0243  0074  0 011 110 011            BRN      LRED1      NO, GO TO CHECK SIGN
0244        1 100 101 000            DNR               RESTORE CODED SYMBOL FOR PRINT IN C-REG
0245  0027  0 001 011 111            BRN      LFPR1    YES,GO TO FORCED PRINT ROUTINE
0246  0221  1 001 000 111            BRN      LERA0
0247        1 100 001 100  LSYN9     PT12              SET POINTER TO CHANGE MODE
0250  0310  1 100 100 011            BRN      LSYN2    GO TO ROUTINE EXIT
0251        1 001 110 000  LAC0      ATDS              SEND ADDRESS TO DATA STORAGE
0252  0232  1 001 101 011            BRN      LAC1
0253        1 111 111 010  LTRB2     XS,AP1A           CHECK SIGN OF EXP.
0254  0104  0 100 010 011            BRN      LSCI1    NOT NINE,SCI.NOT.FMT.
0255        1 101 111 010            XS,AM1A           NINE,RESTORE SIGN OF THE EXP.
0256        0 011 010 110  LTRB5     MS,ZTC
0257        0 110 010 110            MS,CTA            COPY ZERO MANTISSA TO A-REG
0260  0121  0 101 000 111            BRN      LADJ5    CONTINUE IN ADJUSTMENT FOR FIX.P.FMT.
0261        0 100 010 000  LADJ7     ROM 2
0262        1 001 011 000            LDC9
0263  0354  1 110 110 011            BRN      LART1
0264        0 011 001 110  LMESS     W,ZTC
0265        0 000 011 100  UPDATE    PRS               GENERATE NOTE NUMBER
0266        0 111 111 110            S,CP1C
0267        1 011 101 100            YP11
0270  0265  1 011 010 111            BRN      UPDATE
0271        1 001 001 110            W,SRC             SHIFT NOTE NUMBER
0272        1 011 100 100            RS11              RESET STATUS 11 IF SET
0273        1 111 011 000            LDC15
0274  0050  0 010 100 011            BRN      CONT
0275  0221  1 001 000 111            BRN      LERA0
0276        0 101 010 100  LFPRS     YS5               AUX. FLAG?
0277  0202  1 000 001 011            BRN      LFPR4    NOT SET, FINISHED, GO TO SUBROUTINE EXIT
0300        0 110 010 000            ROM 3             SET, RETURN TO LEFT PAR. ROUTINE
0301        0 111 110 000  LFIX1     CTT                 STORE LEFT HALF OF THE PRINT WORD
0302        1 101 001 100            PT13                SET POINTER TO SUPRESS EXPONENT PRINT
0303        1 111 011 000            LDC15               LOAD "BLANK" INSTEAD OF EXP. M.S.D.
0304        0 000 000 000            NOP                 BECAUSE OF HARDWARE "FEATURE"
0305        0 011 010 010            WP,ZTC            SET ZERO FOR OP.SYMBOL CODE GEN.BEGINNING
0306        1 111 011 000            LDC15             LOAD BLANK INSTEAD OF L.S.D. OF EXP.
0307  0146  0 110 011 011            BRN      LSYM9    GO TO SUBROUTINE EXIT
0310        0 000 010 000  LSYN2     ROM 0             RETURN TO ROM 0
0311        0 010 001 100  LRES9     PT2               PREPARE OPCODE LOAD
0312        0 001 011 000            LDC1              LOAD OP.CODE FOR ADD
0313  0031  0 001 100 111            BRN      LRES8
0314        1 001 111 010  LTRB3     XS,AM1            CHECK SIGN OF EXP.
0315  0253  1 010 101 111            BRN      LTRB2    NONZERO,CONTINUE IN TEST
0316  0121  0 101 000 111            BRN      LADJ5    ZERO,O.K. FIX.P.FORMAT
0317        0 011 000 100  LAC2      SS3               SET OP FLAG TO INDICATE GRANDTOTAL ACC ROUTE
0320        1 100 101 110            W,AXB             PREPARE DATA IN A-REG FOR SUMMATION
0321        1 000 010 000            ROM 4             DO AN ACC +
0322        1 001 111 010  LTRB1     XS,AM1
0323  0115  0 100 110 111            BRN      LTRB4
0324  0104  0 100 010 011            BRN      LSCI1
0325        1 001 000 100  LFPRZ     SS9               SET FORCED PRINT FLAG
0326  0027  0 001 011 111            BRN      LFPR1
0327        1 111 011 000  LMSS2     LDC15               LOAD PRINT CODE FOR BLANK (PLUS)
0330        0 001 001 100  LMSS3     PT1                 PREPARE EXPONENT PRINT CANCELLATION
0331        1 111 011 000            LDC15               LOAD "BLANK"
0332        1 111 011 000            LDC15               LOAD "BLANK"
0333        0 101 010 100            YS5                 CHECK FORMAT FLAG
0334  0301  1 100 000 111            BRN      LFIX1      FIX. POINT
0335        0 101 100 100            RS5                 SCI. NOT.  RESET FLAG
0336        0 000 011 010            XS,ZMB              CHECK EXP. SIGN OF ORIGINAL DATA
0337  0207  1 000 011 111            BRN      LSCI3      POSITIVE
0340        0 000 001 100            PT0                 NEGATIVE
0341        1 001 011 000            LDC9                LOAD CODE FOR MINUS
0342        0 111 110 000            CTT                 STORE LEFT HALF OF THE PRINT WORD
0343        0 010 001 010            X,BTC               LOAD ORIG. EXPONENT INTO C-REG
0344        0 010 101 010            X,ZMCC            COMPLEMENT OF THE EXPONENT
0345        0 110 001 010            X,CTA               SEND EXPONENT INTO A-REG
0346  0212  1 000 101 011            BRN      LSCI4      GO TO EXPONENT ALIGNMENT BY SHIFTING
0347        1 101 001 100  LMSS1     PT13                PREPARE OPERATION ON SIGN OF MANTISSA
0350        0 000 011 110            S,ZMB               TEST ORIG. SIGN OF MANTISSA
0351  0327  1 101 011 111            BRN      LMSS2      POSITIVE
0352        1 001 011 000            LDC9                NEGATIVE, LOAD PRINT CODE FOR MINUS
0353  0330  1 101 100 011            BRN      LMSS3
0354        0 011 010 010  LART1     WP,ZTC
0355        0 101 110 010            WP,CM1C
0356        0 011 011 010  LART2     XS,ZTC
0357        1 000 101 110            W,BXC
0360  0263  1 011 010 001            JSB      LMESS
0361        0 111 111 110            S,CP1C
0362  0375  1 111 110 111            BRN      LART4
0363  0356  1 110 111 011            BRN      LART2
0364  0354  1 110 110 011            BRN      LART1
0365        0 111 111 000  LRES7     TTC               FETCH INT. FLAG VECTOR OUT OF T REG
0366  0311  1 100 100 111            BRN      LRES9
0367        1 001 010 100  LFPRK     YS9               CHECK IF FORCED PRINT FLAG IS SET
0370  0276  1 011 111 011            BRN      LFPRS    NO
0371  0112  0 100 101 011            BRN      LFPRM    YES
0372  0240  1 010 000 011            BRN      LSYNF
0373        0 010 011 000  NOT2      LDC2
0374  0173  0 111 101 111            BRN      LNOT20
0375  0324  1 101 010 101  LART4     JSB      LFPRZ
0376        0 100 010 000  LOUT2     ROM 2
0377  0125  0 101 010 111            BRN      LADJ8
```

DATA STORAGE UNIT LISTING (ROM C-0)

```
CURR  BRAN  OPERATION CODE
ADDR  ADDR  BIT PATTERN

0000  0076  0 011 111 101  CACPR   JSB     CPRIT   PRINT SYMBOL
0001  0315  1 100 110 111          BRN     CSUPE9  GO TO RESTORE DATA IN C-REG AND SUPERVISOR
0002        0 010 010 000  CLIS1   ROM 1
0003        0 011 010 000  CSTO6   TKRA            ACCEPT KEYCODE
0004        1 010 101 000  CRESZ   MTC             PREPARE INT. FLG. VECTOR
0005        0 000 100 000          RMGRA           GO TO RESET ROUTINE
0006  0134  0 101 110 001  CSTD2   JSB     CCODE   GO TO LOAD OP. CODE
0007        0 010 101 000  CSTD3   CXM             RESTORE C- AND M- REGISTERS
0010  0106  0 100 011 011          BRN     CSUPER  GO TO MAIN UNIT SUPERVISOR
0011        0 000 000 000          DUMMY
0012        0 100 010 000  CSTD1   ROM 2           STORE-DIVIDE BEGINNING
0013        0 100 010 000  CSTM1   ROM 2           STORE-MULTIPLY BEGINNING
0014  0101  0 100 000 111          BRN     CDSM2   FALSE KEY
0015        0 000 000 000          DUMMY
0016  0101  0 100 000 111          BRN     CDSM2   FALSE KEY
0017  0340  1 110 000 011  CEXCH   BRN     CEXC1   EXCH() ROUTINE BEGINNING POINT
0020  0101  0 100 000 111          BRN     CDSM2   FALSE KEY
0021        0 000 000 000          DUMMY
0022  0101  0 100 000 111          BRN     CDSM2   FALSE KEY
0023  0253  1 010 101 111  CDIG0   BRN     CDIGA   ACCEPT DIGIT 0
0024        0 000 100 000  CDIGH   RMGRA           GO TO MAIN UNIT DIGIT ENTRY
0025        0 000 100 000  CLPR1   RMGRA           GO TO LPAR ROUTINE ON MAIN UNIT
0026  0025  0 001 010 111  CLPAR   BRN     CLPR1   GO TO MAIN UNIT SOFTWARE
0027        0 000 000 000          DUMMY
0030        0 111 011 000  CSTA2   LDC7            OP. CODE 07
0031  0007  0 000 011 111          BRN     CSTD3   GO TO RESTORE C- AND M- REGISTERS
0032        1 111 101 010  CDIG3   X.APIA          ACCEPT DIGIT 3
0033        1 111 101 010  CDIG2   X.APIA          ACCEPT DIGIT 2
0034        1 111 101 010  CDIG1   X.APIA          ACCEPT DIGIT 1
0035  0023  0 001 001 111          BRN     CDIG0
0036  0101  0 100 000 111          BRN     CDSM2   FALSE KEY
0037        0 010 100 000  CSTO7   RMGRB           CALL F.BLK.SOFTWARE
0040        0 100 010 000  CSTA1   ROM 2           STORE-ADD BEGINNING
0041  0030  0 001 100 011          BRN     CSTA2
0042        1 111 101 010  CDIG6   X.APIA          ACCEPT DIGIT 6
0043        1 111 101 010  CDIG5   X.APIA          ACCEPT DIGIT 5
0044        1 111 101 010  CDIG4   X.APIA          ACCEPT DIGIT 4
0045  0032  0 001 101 011          BRN     CDIG3
0046  0101  0 100 000 111          BRN     CDSM2   FALSE KEY
0047  0301  1 100 000 111  CRECL   BRN     CREC1   RECALL() ROUTINE BEGINNING POINT
0050        0 100 010 000  CSTS1   ROM 2           STORE-SUBTRACT BEGINNING
0051  0060  0 011 000 011          BRN     CSTS2
0052        1 111 101 010  CDIG9   X.APIA          ACCEPT DIGIT 9
0053        1 111 101 010  CDIG8   X.APIA          ACCEPT DIGIT 8
0054        1 111 101 010  CDIG7   X.APIA          ACCEPT DIGIT 7
0055  0042  0 010 001 011          BRN     CDIG6
0056  0101  0 100 000 111          BRN     CDSM2   FALSE KEY
0057  0226  1 001 011 011  CSTOR   BRN     CSTO1   STORE () ROUTINE BEGINNING POINT
0060        1 000 011 000  CSTS2   LDC8            OP. CODE 08
0061  0007  0 000 011 111          BRN     CSTD3   GO TO RESTORE C- AND D- REGISTERS
0062  0101  0 100 000 111          BRN     CDSM2   FALSE KEY
0063  0101  0 100 000 111          BRN     CDSM2   FALSE KEY
0064  0101  0 100 000 111          BRN     CDSM2   FALSE KEY
0065  0002  0 000 001 011  CLIST   BRN     CLIS1   LIST AND RESET D.S. BEGINNING
0066        1 010 100 100  CANEN   RS10            RESET SHIFT FLAG IF SET D.S.CANCEL ENTRY
0067  0101  0 100 000 111          BRN     CDSM2   GO TO WAIT FOR NEXT KEY
0070        1 010 010 100  CSHIFT  SS10            SET SHIFT FLAG
0071  0101  0 100 000 111          BRN     CDSM2   GO TO WIAT FOR NEXT KEY
0072  0101  0 100 000 111          BRN     CDSM2   FALSE KEY
0073        0 100 010 000  CRES0   ROM 2           GO TO ROM 2 FOR RESET ROUTINE START
0074        0 000 100 000          RMGRA           GO TO MAIN UNIT RESET ROUTINE
0075        0 010 101 000  CDSM1   CXM             RESTORE C- AND M-REGISTERS
0076  0101  0 100 000 111          BRN     CDSM2   FALSE KEY
0077        0 010 101 000  CPRIT   CXM             GET INT.FLG.VECTOR FOR TEST
0100  0372  1 111 101 011          BRN     CPRYT
0101        0 000 100 100  CDSM2   RS0             RESET KEY-DOWN FLAG BEFORE TEST
0102        0 000 010 100          YS0             IS THE OLD KEY STILL DOWN?
0103  0120  0 101 000 011          BRN     CSTO2   NO: CONTINUE IN STORE () ROUTINE
0104  0101  0 100 000 111          BRN     CDSM2   YES: WAIT
0105        0 111 000 100  CSUPE1  SS7             SET FIRST DATA ENTRY DIGIT FLAG
0106        0 000 100 000  CSUPER  RMGRA           GO TO ROM GR. A SUPERVISOR
0107        1 011 110 000  CFIN1   DTDS            STORE NEW DATA INGIVEN D.S. REGISTER
0110        1 100 101 000          DNR             OLD RESULT BACK TO C-REG
0111        0 100 101 000          CTS             COPIED BACK TO D-REG ALSO
0112        0 110 100 100          RS6             RESET STATUS SIX IF SET
0113  0105  0 100 010 111          BRN     CSUPE1  GO TO SUPERVISOR
0114        0 010 010 000  CCINC   ROM 1
0115        0 000 000 000          DUMMY
0116        0 010 010 000  CREC2   ROM 1
0117  0107  0 100 011 111  CINDE   BRN     CFIN1
0120        0 101 000 000  CSTO2   IS2
0121        0 100 100 000          RBL             RESET BUSY LIGHT
0122        1 001 000 000          IS1
0123        0 000 010 100  CSTO3   YS0             NEW KEY DOWN?
0124  0123  0 101 001 111          BRN     CSTO3   NO: WAIT
0125        0 000 001 100          PT0
0126        1 011 100 010          P.ZTA           PREPARE A-REG TO ACCEPT DIGIT
0127        0 000 011 100  CSTO4   PRS             WAIT FOR 3MS.
0130        1 100 101 100          YP12            FINISHED?
0131  0127  0 101 011 111          BRN     CSTO4   NO: WAIT
0132        1 000 101 000          DSOF            YES: START EXECUTION
0133        1 100 100 000          YFKB            INTERROGATE F.BLK. KBD.FLAG
0134  0221  1 001 000 111          BRN     CSTO5
0135        0 010 101 000  CCODE   CXM
0136        0 011 001 100          PT3
0137        0 001 011 000          LDC1
0140        0 011 010 010  CCODG   WP.ZIC
0141        0 000 110 000          RETURN
0142        0 010 101 000  CCODF   CXM
0143        0 011 001 100          PT3
0144        0 000 011 000          LDC0
0145  0140  0 110 000 011          BRN     CCODG
0146        0 001 100 100  CCINA   RS1             RESET AUX. FLAG
0147  0114  0 100 110 011          BRN     CCINC   GO TO ROM 1 FOR EXECUTION
0150        0 000 100 000  CMANA   RMGRA           GO TO MAIN UNIT SOFTWARE
```

DATA STORAGE UNIT LISTING (ROM C-Ø) – Continued

```
CURR  BRAN   OPERATION CODE
ADDR  ADDR   BIT PATTERN

0151         0 000 000 000           DUMMY
0152         0 010 101 000  CMANL    CXM                GET INT. FLG. VECTOR FOR TEST
0153         0 100 001 100           PT4                PREPARE USERS CODE FOR TEST
0154         0 001 100 010           P.CM1              IS IT ZERO?
0155  0232   1 001 101 011           BRN      CDSM9     NO; STAY IN GROUP C
0156         0 010 101 000           CXM                YES; RESTORE C- AND M- REGISTERS
0157  0150   0 110 100 011           BRN      CMANA     GO BACK TO MAIN UNIT SOFTWARE
0160         0 000 100 000  CCOMA    RMGRA              GO TO EXECUTE OLD OPERATION
0161         0 101 100 010  CDSC1    P.CMIC             IS IT ONE?
0162  0175   0 111 110 111           BRN      CDSC2     NO
0163         0 010 010 000           ROM 1              YES; GO TO LIST DATA ROUTINE
0164  0321   1 101 002 111  CCOM8    BRN      CACP4     GO TO COMMON OUTPUT TO ROMGRA
0165         0 101 100 010  CDSC3    P.CMIC             IS IT THREE?
0166  0344   1 110 010 011           BRN      CDSC4     NO
0167         1 001 011 000           LDC9               YES; SET IT TO NINE TO INDICATE RETURN
0170         0 010 101 000           CXM                STORE UPDATED INT. FLG. VECTOR; RESTORE C-REG
0171         1 011 001 100           PT11               LOAD SYMBOLS FOR STORE()
0172         0 000 011 000           LDC0               S
0173         0 011 011 000           LDC3               -->
0174  0207   1 000 011 111           BRN      CCOMP     GO TO COMMON PRINT AND EXECUTION
0175         0 101 100 010  CDSC2    P.CMIC             IS IT TWO?
0176  0165   0 111 010 111           BRN      CDSC3     NO
0177         0 000 011 000           LDC0               YES; RESET USERS CODE
0200         0 001 001 100           PT1                LOAD OP. CODE FOR EXCHANGE
0201         0 001 011 000           LDC1               1
0202         1 000 011 000           LDC8               8
0203         0 010 101 000           CXM                STORE UPDATED INT. FLG. VECTOR; RESTORE C-REG
0204         1 011 001 100           PT11               LOAD SYMBOLS FOR EXCHANGE
0205         0 000 011 000           LDC0               S
0206         1 000 011 000           LDC8
0207  0276   0 011 111 101  CCOMP    JSB      CPRIT     GO TO PRINT
0210  0160   0 111 000 011           BRN      CCOMA
0211  0141   0 110 001 001  CSTM2    JSB      CCODE
0212         1 001 011 000           LDC9               OP. CODE 09
0213  0207   0 000 011 111           BRN      CSTD3     GO TO RESTORE C- AND M- REGISTERS
0214  0134   0 101 110 101  CSTE2    JSB      CCODE     GO TO LOAD OP. CODE
0215         0 001 011 000           LDC1               OP. CODE 11
0216  0007   0 000 011 111           BRN      CSTD3     GO TO RESTORE C- AND M- REGISTERS
0217         0 000 100 000  LERRO    RMGRA              GO TO MAIN UNIT ERROR ROUTINE
0220         0 100 010 000  CEXC2    ROM 2              GO TO EXCH. ROUTINE
0221         1 011 010 100  CST05    YS11               WAS IT SET ?
0222  0003   0 000 001 111           BRN      CST06     NO.GO TO ACCEPT KEYCODE
0223  0037   0 001 111 111           BRN      CST07     YES.GO TO F.BLK.SOFTWARE
0224         0 000 000 000           DUMMY
0225         0 000 000 000           DUMMY
0226         0 010 101 000  CST01    CXM                GET INT. FLG. VECTOR
0227         0 100 001 100           PT4                SET POINTER TO INDICATE D.S. USER CODE
0230         0 011 011 000           LDC3               SET FLAG TO VALUE "THREE"
0231  0321   1 101 000 111           BRN      CACP4     GO TO COMMON DATA ADJUSTMENT
0232         0 011 010 010  CDSM9    WP.ZTC             CLEAR OP. AND USERS CODES
0233         0 010 001 100           PT2                PREPARE OP.CODE GEN.
0234         0 110 011 000           LDC6               LOAD OP.CODE FOR STORE DIRECT
0235  0075   0 011 110 111           BRN      CDSM1
0236         0 010 101 000  CINC1    CXM                GET INT. FLG. VECTOR
0237         0 100 001 100           PT4                SET POINTER TO INDICATE D.S. USER CODE
0240         0 100 011 000           LDC4               4
0241  0321   1 101 000 111           BRN      CACP4     GO TO COMMON DATA ADJUSTMENT
0242         0 010 101 000  CDEC1    CXM                GET INT. FLG. VECTOR
0243         0 100 001 100           PT4                SET POINTER TO INDICATE D.S. USER CODE
0244         0 101 011 000           LDC5               5
0245  0321   1 101 000 111           BRN      CACP4     GO TO COMMON DATA ADJUSTMENT
0246         0 010 101 000  CACU7    CXM                GET INT. FLG. VECTOR; SAVE C-REG
0247         0 100 001 100           PT4                PREPARE D.S. USER CODE FOR TEST
0250         0 101 100 010           P.CMIC             IS IT ZERO?
0251  0161   0 111 000 111           BRN      CDSC1     NO;
0252  0106   0 100 011 011  CEND9    BRN      CSUPER    GO TO SUPERVISOR
0253         1 000 101 110  CDIGA    W.BXC              STORE DATA IN B-REG
0254         0 011 001 110           W.ZTC              CLEAR C-REG
0255         0 000 001 100           PT0
0256         1 110 100 010           P.AXC              GET ENTERED DIGIT INTO C-REG
0257         0 110 001 110           W.CTA              COPY IT BACK TO A-REG ALSO
0260         1 010 101 000           MTC                PREPARE INTERNAL FLG. VECTOR FOR TEST
0261  0024   0 001 010 011           BRN      CDIGB
0262         0 000 011 000  CDSC5    LDC0               RESET USERS CODE
0263         0 010 101 000           CXM                STORE M-REG; RESTORE C-REG
0264         1 011 001 100           PT11               LOAD SYMBOLS
0265         1 010 011 000           LDC10              I
0266         0 111 011 000           LDC7               -
0267  0354   1 110 110 011           BRN      CDINC
0270         1 000 101 110  CBLNK    W.BXC              SAVE DATA IN B-REG TEMPORARILY
0271         0 011 001 110           W.ZTC              CLEAR C-REG
0272         0 111 110 000           CTT                CLEAR T-REG
0273         0 101 000 000           IS2
0274         1 101 001 000           TDEC               LOAD T-REG FULL WITH ONE'S
0275         1 001 000 000           IS1
0276         0 111 111 000           TTC                COPY ALL ONE'S TO C-REG ALSO
0277         1 011 001 100           PT11               PREPARE LOAD CODES FOR SYMBOLS
0300         0 000 110 000           RETURN             END OF THE SUBROUTINE
0301  0267   1 011 100 001  CREC1    JSB      CBLNK     GO TO GENERATE BLANKS
0302         1 011 011 000           LDC11              LOAD SYMBOL R
0303         0 100 011 000           LDC4               LOAD SYMBOL +
0304  0276   0 011 111 101           JSB      CPRIT     GO TO PRINT
0305         0 011 001 100           PT3                PREPARE OP. CODE MODIFICATION
0306         1 110 110 010           WP.AXC             OLD TO A-REG
0307         0 011 010 010           WP.ZTC             CLEAR C-REG
0310         0 001 011 000           LDC1               LOAD 1ST DIGIT
0311         0 010 011 000           LDC2               LOAD 2ND DIGIT
0312         0 011 001 100           PT3                RESTORE POINTER
0313         0 111 010 010           WP.APCC            INCREMENT OP. CODE BY 12
0314         0 010 101 000           CXM                STORE UPDATED INT. FLG. VECTOR
0315         0 010 001 110  CSUPE9   W.BTC              RESTORE DATA IN C-REG
0316         0 000 110 100           CLS                CLEAR ALL STATUS BITS
0317         0 011 000 100           SS3                SET OPERATION SYNTAX FLAG
0320  0195   0 100 010 111           BRN      CSUPE1    GO TO SUPERVISOR
0321         0 010 101 000  CACP4    CXM                STORE UPDATED INT. FLG. VECTOR
0322         0 000 100 000           RMGRA              GO TO MAIN UNIT SOFTWARE
0323         1 010 101 000  CPRT3    MTC                GET INT.FLG.VECTOR
0324         0 000 110 000           RETURN             END OF THE SUBROUTINE
```

DATA STORAGE UNIT LISTING (ROM C-Ø) – Continued

| LINE # | CURR ADDR | BRAN ADDR | OPERATION CODE BIT PATTERN | | | | |
|---|---|---|---|---|---|---|---|
| 216 | Ø325 | | Ø 1ØØ Ø1Ø ØØØ | CPSUB | ROM 2 | | RETURN AFTER DATA ADJUSTMENT FOR PRINT |
| 217 | Ø326 | | Ø 1ØØ Ø1Ø ØØØ | CPLIS | ROM 2 | | |
| 218 | Ø327 | | Ø Ø1Ø Ø1Ø ØØØ | CPCLR | ROM 1 | | GO TO CLEAR DATA ROUTINE |
| 219 | Ø33Ø | Ø236 | 1 ØØ1 111 Ø11 | CINCR | BRN | CINC1 | PROGRAM INCREMENT START |
| 220 | Ø331 | Ø242 | 1 Ø1Ø ØØ1 Ø11 | CDECR | BRN | CDEC1 | PROGRAM DECREMENT START |
| 221 | Ø332 | | Ø 1ØØ Ø1Ø ØØØ | CPSTO | ROM 2 | | |
| 222 | Ø333 | Ø24Ø | Ø Ø1Ø ØØØ Ø11 | CPSTA | BRN | CSTA1 | PRGM. RUN STORE -ADD |
| 223 | Ø334 | Ø25Ø | Ø Ø1Ø 1ØØ Ø11 | CPSTS | BRN | CSTS1 | PRGM. RUN STORE -SUB |
| 224 | Ø335 | Ø313 | Ø ØØØ 1Ø1 111 | CPSTM | BRN | CSTM1 | PRGM. RUN STORE-MUL |
| 225 | Ø336 | Ø312 | Ø ØØØ 1Ø1 Ø11 | CPSTD | BRN | CSTD1 | PRGM. RUN STORE-DIV |
| 226 | Ø337 | Ø3Ø1 | 1 1ØØ ØØØ 111 | CPRCL | BRN | CREC1 | PROGRAM RUN RCL() BEGINNING |
| 227 | Ø34Ø | Ø22Ø | 1 ØØ1 ØØØ Ø11 | CEXC1 | BRN | CEXC2 | EXCH() ROUTINE BEGINNING |
| 228 | Ø341 | | Ø 1ØØ ØØØ 1ØØ | CDECT | SS4 | | DECREMENT AND TEST BEGIN.SET TEST FLAG |
| 229 | Ø342 | | Ø Ø1Ø 1ØØ 1ØØ | | RS2 | | RESET STATUS ONE IF SET |
| 230 | Ø343 | Ø356 | 1 11Ø 111 Ø11 | | BRN | CDCT1 | |
| 231 | Ø344 | | Ø 1Ø1 1ØØ Ø1Ø | CDSC4 | P.CMIC | | IS IT FOUR |
| 232 | Ø345 | Ø262 | 1 Ø11 ØØ1 Ø11 | | BRN | CDSC5 | NO: IT IS FIVE |
| 233 | Ø346 | | Ø ØØ1 ØØØ 1ØØ | | SS1 | | SET AUX. FLAG |
| 234 | Ø347 | | Ø ØØØ Ø11 ØØØ | | LDCØ | | YES: RESET USERS CODE |
| 235 | Ø35Ø | | Ø Ø1Ø 1Ø1 ØØØ | | CXM | | STORE UPDATED INT. FLG. V: RESTORE C-REG |
| 236 | Ø351 | | 1 Ø11 ØØ1 1ØØ | | PT11 | | LOAD SYMBOLS |
| 237 | Ø352 | | 1 Ø1Ø Ø11 ØØØ | | LDC1Ø | | I |
| 238 | Ø353 | | Ø ØØØ Ø11 ØØØ | | LDCØ | | + |
| 239 | Ø354 | ØØ76 | Ø Ø11 111 1Ø1 | CDINC | JSR | CPRIT | GO TO PRINT |
| 240 | Ø355 | | Ø Ø1Ø ØØ1 11Ø | | W.RTC | | RESTORE ADDRESS IN C-REG |
| 241 | Ø356 | | 1 ØØ1 11Ø ØØØ | CDCT1 | ATOS | | CALL D.S. |
| 242 | Ø357 | | 1 Ø11 Ø1Ø 1ØØ | | YS11 | | FOUND? |
| 243 | Ø36Ø | Ø217 | 1 ØØØ 111 111 | | BRN | LERRO | NO |
| 244 | Ø361 | | 1 Ø11 1ØØ 1ØØ | | RS11 | | YES: RESET EXTERNAL FLAG |
| 245 | Ø362 | | 1 Ø11 111 ØØØ | | DSTC | | GET DATA |
| 246 | Ø363 | | Ø 11Ø ØØ1 11Ø | | W.CTA | | COPY DATA INTO A-REG |
| 247 | Ø364 | | Ø ØØ1 Ø1Ø 1ØØ | | YS1 | | CHECK AUX. FLAG |
| 248 | Ø365 | Ø115 | Ø 1ØØ 111 Ø11 | | BRN | CDEC2 | NOT SET |
| 249 | Ø366 | Ø146 | Ø 11Ø Ø11 Ø11 | | BRN | CCINØ | GO TO INCREMENT SUBROUTINE |
| 250 | Ø367 | Ø242 | 1 Ø1Ø ØØ1 Ø11 | CMDEC | BRN | CDEC1 | GO TO COMMON ROUTINE |
| 251 | Ø37Ø | | Ø Ø1Ø 1Ø1 ØØØ | CPRT1 | CXM | | RESTORE RIGHT HALF OF THE PRINTED MASK |
| 252 | Ø371 | | Ø Ø1Ø Ø1Ø ØØØ | | ROM 1 | | GO TO PRINT SUBROUTINE |
| 253 | Ø372 | | 1 1ØØ ØØ1 1ØØ | CPRYT | PT12 | | PREPARE OP. MODE FLAG TEST |
| 254 | Ø373 | | Ø 11Ø 1ØØ Ø1Ø | | P.ZMC | | IS IT ZERO? |
| 255 | Ø374 | Ø37Ø | 1 111 1ØØ Ø11 | | BRN | CPRT1 | YES |
| 256 | Ø375 | | Ø Ø1Ø 1Ø1 ØØØ | | CXM | | RESTERE INT.FLG.VECTOR IN M-REG |
| 257 | Ø376 | Ø323 | 1 1Ø1 ØØ1 111 | | BRN | CPRT3 | |
| 258 | Ø377 | Ø236 | 1 ØØ1 111 Ø11 | CMINC | BRN | CINC1 | GO TO COMMON ROUTINE |

DATA STORAGE UNIT LISTING (ROM C-1)

| LINE # | CURR ADDR | BRAN ADDR | OPERATION CODE BIT PATTERN | | | | |
|---|---|---|---|---|---|---|---|
| 3 | ØØØØ | | Ø 1Ø1 Ø1Ø 1ØØ | CPRNT | YS5 | | CHECK IF PRINT OR NOT |
| 4 | ØØØ1 | Ø227 | 1 ØØØ Ø11 111 | | BRN | CPRIN | PRINT |
| 5 | ØØØ2 | Ø227 | 1 ØØ1 Ø11 111 | | BRN | CPRT9 | DO NOT PRINT |
| 6 | ØØØ3 | | Ø ØØØ 1Ø1 ØØØ | CLISA | DSTO | | DISPLAY OLD DATA: USE OLD MASK |
| 7 | ØØØ4 | | Ø ØØØ 1ØØ 1ØØ | CLIS2 | RSØ | | |
| 8 | ØØØ5 | | Ø ØØØ Ø1Ø 1ØØ | | YSØ | | IS OLD KEY STILL DOWN? |
| 9 | ØØØ6 | Ø1ØØ | Ø 1ØØ ØØØ Ø11 | | BRN | CLIS3 | NO: CONTINUE |
| 10 | ØØØ7 | ØØØ4 | Ø ØØØ Ø1Ø Ø11 | | BRN | CLIS2 | YES.WAIT |
| 11 | ØØ1Ø | ØØØ3 | Ø ØØØ ØØ1 111 | | BRN | CLISA | FALSE KEY |
| 12 | ØØ11 | | Ø ØØØ ØØØ ØØØ | | DUMMY | | |
| 13 | ØØ12 | ØØØ3 | Ø ØØØ ØØ1 111 | | BRN | CLISA | FALSE KEY |
| 14 | ØØ13 | ØØØ3 | Ø ØØØ ØØ1 111 | | BRN | CLISA | FALSE KEY |
| 15 | ØØ14 | ØØØ3 | Ø ØØØ ØØ1 111 | | BRN | CLISA | FALSE KEY |
| 16 | ØØ15 | | Ø ØØØ ØØØ ØØØ | | DUMMY | | |
| 17 | ØØ16 | ØØØ3 | Ø ØØØ ØØ1 111 | | BRN | CLISA | FALSE KEY |
| 18 | ØØ17 | | Ø ØØØ ØØØ ØØØ | | DUMMY | | |
| 19 | ØØ2Ø | Ø363 | 1 111 ØØ1 111 | CEQL1 | BRN | CEQL2 | GO TO CHECK AUX. FLAGS |
| 20 | ØØ21 | | Ø ØØØ ØØØ ØØØ | | DUMMY | | |
| 21 | ØØ22 | ØØØ3 | Ø ØØØ ØØ1 111 | | BRN | CLISA | FALSE KEY |
| 22 | ØØ23 | | Ø 1ØØ ØØØ 1ØØ | CCLR1 | SS4 | | SET CLEAR DATA ROUTINE AUXILIARY FLAG |
| 23 | ØØ24 | ØØØ3 | Ø ØØØ ØØ1 111 | | BRN | CLISA | GO TO DISPLAY OLD DATA |
| 24 | ØØ25 | | Ø ØØØ ØØØ ØØØ | | DUMMY | | |
| 25 | ØØ26 | ØØØ3 | Ø ØØØ ØØ1 111 | | BRN | CLISA | FALSE KEY |
| 26 | ØØ27 | | Ø Ø11 ØØ1 11Ø | CCLR2 | W.ZTC | | SET ZERO TO C-REG |
| 27 | ØØ3Ø | | 1 Ø11 11Ø ØØØ | | DTDS | | LOAD ZERO INTO GIVEN D.S. REGISTER |
| 28 | ØØ31 | Ø171 | Ø 111 1ØØ 111 | | BRN | CCOM6Ø | GO TO COMMON PART WITH LIST ROUTINE |
| 29 | ØØ32 | ØØØ3 | Ø ØØØ ØØ1 111 | | BRN | CLISA | FALSE KEY |
| 30 | ØØ33 | ØØØ3 | Ø ØØØ ØØ1 111 | | BRN | CLISA | FALSE KEY |
| 31 | ØØ34 | ØØØ3 | Ø ØØØ ØØ1 111 | | BRN | CLISA | FALSE KEY |
| 32 | ØØ35 | | Ø ØØØ ØØØ ØØØ | | DUMMY | | |
| 33 | ØØ36 | ØØØ3 | Ø ØØØ ØØ1 111 | | BRN | CLISA | FALSE KEY |
| 34 | ØØ37 | | Ø ØØØ ØØØ ØØØ | | DUMMY | | |
| 35 | ØØ4Ø | Ø376 | 1 111 111 Ø11 | CMINC | BRN | CINC1Ø | MANUAL INCREMENT START |
| 36 | ØØ41 | Ø121 | Ø 1Ø1 ØØØ 111 | | BRN | CCOM1 | GO TO COMMON PART OF BOTH ROUTINES |
| 37 | ØØ42 | ØØØ3 | Ø ØØØ ØØ1 111 | | BRN | CLISA | FALSE KEY |
| 38 | ØØ43 | ØØØ3 | Ø ØØØ ØØ1 111 | | BRN | CLISA | FALSE KEY |
| 39 | ØØ44 | ØØØ3 | Ø ØØØ ØØ1 111 | | BRN | CLISA | FALSE KEY |
| 40 | ØØ45 | | Ø ØØØ ØØØ ØØØ | | DUMMY | | |
| 41 | ØØ46 | ØØØ3 | Ø ØØØ ØØ1 111 | | BRN | CLISA | FALSE KEY |
| 42 | ØØ47 | | Ø ØØØ ØØØ ØØØ | | DUMMY | | |
| 43 | ØØ5Ø | Ø366 | 1 111 Ø11 Ø11 | CMDEC | BRN | CDEC1Ø | MANUAL DECREMENT START |
| 44 | ØØ51 | Ø243 | 1 Ø1Ø ØØ1 111 | CINTS | BRN | CEND5 | GO TO ROUTINE END |
| 45 | ØØ52 | ØØØ3 | Ø ØØØ ØØ1 111 | | BRN | CLISA | FALSE KEY |
| 46 | ØØ53 | ØØØ3 | Ø ØØØ ØØ1 111 | | BRN | CLISA | FALSE KEY |
| 47 | ØØ54 | ØØØ3 | Ø ØØØ ØØ1 111 | | BRN | CLISA | FALSE KEY |
| 48 | ØØ55 | | Ø ØØØ ØØØ ØØØ | | DUMMY | | |
| 49 | ØØ56 | ØØØ3 | Ø ØØØ ØØ1 111 | | BRN | CLISA | FALSE KEY |
| 50 | ØØ57 | | 1 ØØØ Ø1Ø 1ØØ | CEQL3 | YS8 | | IS LIST DAT ROUTINE FLAG SET ? |
| 51 | ØØ6Ø | ØØØ3 | Ø ØØØ ØØ1 111 | | BRN | CLISA | NO: FALSE KEY SEQUENCE |
| 52 | ØØ61 | ØØ71 | Ø Ø11 1ØØ 111 | | BRN | CCOM1Ø | GO TO CHECK IF KEY IS STILL DOWN |

DATA STORAGE UNIT LISTING (ROM C-1) – Continued

| CURR ADDR | BRAN ADDR | OPERATION CODE BIT PATTERN | | | | |
|---|---|---|---|---|---|---|
| 0062 | 0003 | 0 000 001 111 | | BRN | CLISA | FALSE KEY |
| 0063 | 0003 | 0 000 001 111 | | BRN | CLISA | FALSE KEY |
| 0064 | 0003 | 0 000 001 111 | | BRN | CLISA | FALSE KEY |
| 0065 | | 0 000 000 000 | | DUMMY | | |
| 0066 | 0003 | 0 000 001 111 | | BRN | CLISA | FALSE KEY |
| 0067 | | 0 000 000 000 | | DUMMY | | |
| 0070 | 0003 | 0 000 001 111 | | BRN | CLISA | FALSE KEY |
| 0071 | | 0 100 010 000 | CCOM10 | ROM 2 | | GO TO TEST ON ROM 2 |
| 0072 | 0003 | 0 000 001 111 | | BRN | CLISA | FALSE KEY |
| 0073 | | 0 100 010 000 | CRES1 | ROM 2 | | GO TO ROM 2 FOR RESET ROUTINE START |
| 0074 | | 0 100 100 100 | CFOL9 | RS4 | | RESET CLEAR DATA FLAG |
| 0075 | 0071 | 0 011 100 111 | | BRN | CCOM10 | GO TO CHECK IF KEY IS STILL DOWN |
| 0076 | | 1 000 000 100 | CLIS6 | SS8 | | SET LIST ROUTINE AUXILIARY FLAG |
| 0077 | 0003 | 0 000 001 111 | | BRN | CLISA | GO TO DISPLAY OLD DATA |
| 0100 | | 0 101 000 000 | CLIS3 | IS2 | | |
| 0101 | | 0 100 100 000 | | RAL | | RESET BUSY LIGHT |
| 0102 | | 1 001 000 000 | | IS1 | | |
| 0103 | | 0 000 010 100 | CLIS4 | YS0 | | NEW KEY DOWN? |
| 0104 | 0103 | 0 100 001 111 | | BRN | CLIS4 | NO: WAIT |
| 0105 | | 1 001 001 100 | | PT9 | | |
| 0106 | | 0 000 111 100 | CLIS5 | PLS | | WAIT FOR 3 MS. |
| 0107 | | 1 100 101 100 | | YP12 | | FINISHED? |
| 0110 | 0106 | 0 100 011 011 | | BRN | CLIS5 | NO, WAIT |
| 0111 | | 1 000 101 000 | | DSOF | | YES: START EXECUTION |
| 0112 | | 1 010 100 000 | | SBL | | SET BUSY LIGHT |
| 0113 | | 0 011 010 000 | | TKRA | | ACCEPT KEYCODE |
| 0114 | | 0 000 000 000 | | DUMMY | | |
| 0115 | 0274 | 1 011 110 101 | CCCIN | JSB | CINCR | GO TO INCREMENT SUBROUTINE |
| 0116 | | 0 000 010 000 | CINDE | ROM 0 | | BACK TO COMMON FINAL PART |
| 0117 | 0270 | 1 011 100 101 | CCCDE | JSB | CDECR | GO TO DECREMENT SUBROUTINE |
| 0120 | 0246 | 1 010 011 011 | | BRN | CINDT | |
| 0121 | | 0 100 101 000 | CCOM1 | CTS | | SAVE CURRENT C-REG AND D-REG IN STACK |
| 0122 | | 1 000 010 100 | | YS8 | | IS THIS LIST ROUTINE ? |
| 0123 | 0142 | 0 110 001 011 | | BRN | CCOM4 | NO: |
| 0124 | | 1 101 001 100 | | PT13 | | YES: PREPARE MESSAGE |
| 0125 | | 1 111 011 000 | CCOM2 | LDC15 | | LOAD BLANKS |
| 0126 | | 0 101 101 100 | | YP5 | | FINISHED? |
| 0127 | 0125 | 0 101 010 111 | | BRN | CCOM2 | NO |
| 0130 | | 1 011 011 000 | CCOM3 | LDC11 | | YES: LOAD "DATA |
| 0131 | | 0 001 101 100 | | YP1 | | FINISHED? |
| 0132 | 0130 | 0 101 100 011 | | BRN | CCOM3 | NO |
| 0133 | | 1 111 011 000 | | LDC15 | | YES: LOAD BLANK |
| 0134 | | 1 111 011 000 | | LDC15 | | BLANK |
| 0135 | | 0 111 110 000 | | CTT | | STORE LEFT HALF IN T-REG |
| 0136 | | 1 010 001 100 | | PT10 | | |
| 0137 | | 0 010 011 000 | | LDC2 | | LOAD = |
| 0140 | 0206 | 1 000 011 101 | | JSB | CPRIN | GO TO PRINT ROUTINE |
| 0141 | 0200 | 1 000 000 101 | | JSB | CPAPA | PAPER ADVANCE |
| 0142 | | 0 010 101 000 | CCOM4 | CXM | | PREPARE REGISTER COUNTER: STEP ONE |
| 0143 | | 0 000 001 100 | | PT0 | | PREPARE REGISTER COUNTER: STEP TWO |
| 0144 | | 0 011 000 010 | | P.ZTC | | RESET REGISTER COUNTER |
| 0145 | | 1 011 101 110 | | W.ZTA | | PREPARE D.S. ADDRESS ZERO IN A-REG |
| 0146 | | 0 010 101 000 | CCOM5 | CXM | | STORE UPDATED REGISTER COUNTER |
| 0147 | | 1 110 101 110 | | W.AXC | | GET NEW D.S. ADDRESS INTO C-REG |
| 0150 | | 0 100 101 000 | | CTS | | COPY NEW ADDRESS INTO STACK |
| 0151 | | 1 001 110 000 | | ATDS | | CALL D.S. |
| 0152 | | 1 011 010 100 | | YS11 | | CHECK IF FOUND |
| 0153 | 0230 | 1 001 100 011 | | BRN | CEND1 | NO: GO TO END OF THE ROUTINE |
| 0154 | | 1 011 100 100 | | RS11 | | YES: RESET EXTERNAL FLAG |
| 0155 | | 1 000 010 100 | | YS8 | | IS THIS LIST ROUTINE ? |
| 0156 | 0027 | 0 001 011 111 | | BRN | CCLR2 | NO: GO TO CLEAR |
| 0157 | | 0 100 010 000 | | ROM 2 | | YES: GO TO KEY-DOWN CHECK |
| 0160 | | 0 010 101 000 | | CXM | | GET INT. FLG. VECTOR |
| 0161 | | 0 100 001 100 | | PT4 | | SET POINTER TO INDICATE D.S. USER FLAG |
| 0162 | | 0 001 011 000 | | LDC1 | | SET IT TO "ONE" |
| 0163 | | 0 000 010 000 | | ROM 0 | | GO TO ROM 0 TO CALL GROUP A |
| 0164 | | 0 000 011 000 | CCOMA | LDC0 | | RESET D.S. USER CODE TO ZERO |
| 0165 | | 0 010 101 000 | | CXM | | STORE INT. FLG. VECTOR: RESTORE C-REG |
| 0166 | | 1 010 001 100 | | PT10 | | PREPERE SYMBOLS TO BE LOADED |
| 0167 | | 1 111 011 000 | | LDC15 | | BLANK |
| 0170 | 0206 | 1 000 011 101 | | JSB | CPRIN | GO TO PRINT LISTED DATA |
| 0171 | | 0 110 101 000 | CCOM60 | STA | | RESTORE OLD ADDRESS IN A-REG |
| 0172 | 0274 | 1 011 110 101 | CCOM6 | JSB | CINCR | GO TO ADDRESS INCREMENT |
| 0173 | | 1 010 101 000 | | MTC | | GET INT. FLG. VECTOR |
| 0174 | | 0 000 001 100 | | PT0 | | PREPARE REGISTER COUNTER |
| 0175 | | 0 111 100 010 | | P.CP1C | | INCREMENT AND CHECK IF CARRY |
| 0176 | 0146 | 0 110 011 011 | | BRN | CCOM5 | NO CARRY: GO BACK TO LOOP |
| 0177 | 0200 | 1 000 000 101 | | JSB | CPAPA | CARRY: GO TO PAPER ADVANCE |
| 0200 | 0146 | 0 110 011 011 | | BRN | CCOM5 | GO BACK TO LOOP |
| 0201 | | 0 101 110 000 | CPAPA | PRE | | PRINTER ENABLE |
| 0202 | | 1 011 010 100 | CPAP1 | YS11 | | FLAG? |
| 0203 | 0202 | 1 000 001 011 | | BRN | CPAP1 | NO: WAIT |
| 0204 | | 1 011 100 100 | | RS11 | | YES: RESET EXTERNAL FLAG |
| 0205 | | 0 011 110 000 | | ADV | | PAPER ADVANCE |
| 0206 | | 0 000 110 000 | | RETURN | | END OF THE SUBROUTINE |
| 0207 | | 0 100 001 100 | CPRIN | PT4 | | PREPARE SECTOR COUNTER |
| 0210 | | 0 101 110 000 | | PRE | | PRINTER ENABLE |
| 0211 | | 1 011 010 100 | CPRT4 | YS11 | | FLAG? |
| 0212 | 0211 | 1 000 100 111 | | BRN | CPRT4 | NO: WAIT |
| 0213 | | 1 011 100 100 | | RS11 | | YES |
| 0214 | | 1 111 110 000 | | CCS | | RIGHT PART OF THE MASK |
| 0215 | | 1 101 110 000 | | TCS | | LEFT PART OF THE MASK |
| 0216 | | 0 000 111 100 | | PLS | | INCREMENT SECTOR COUNTER |
| 0217 | | 0 001 101 100 | | YP1 | | LAST SECTOR ? |
| 0220 | 0211 | 1 000 100 111 | | BRN | CPRT4 | NO |
| 0221 | | 1 011 010 100 | CPRT2 | YS11 | | YES: FLAG? |
| 0222 | 0221 | 1 001 000 111 | | BRN | CPRT2 | NO: WAIT! |
| 0223 | | 1 011 100 100 | | RS11 | | YES: RESET EXTERNAL FLAG |
| 0224 | | 0 011 110 000 | | ADV | | PAPER ADVANCE |
| 0225 | | 1 000 010 100 | | YS8 | | IS THIS LIST ROUTINE ? |
| 0226 | 0375 | 1 111 110 111 | | BRN | CPRT3 | NO |
| 0227 | | 0 000 110 000 | CPRT9 | RETURN | | YES: END OF THE SUBROUTINE |
| 0230 | | 1 101 001 100 | CEND1 | PT13 | | PREPARE END MESSAGE |
| 0231 | | 1 000 010 100 | | YS8 | | IS THIS LIST ROUTINE ? |
| 0232 | 0252 | 1 010 101 011 | | BRN | CCLR3 | NO |
| 0233 | | 1 111 011 000 | CEND2 | LDC15 | | YES: LOAD BLANKS |
| 0234 | | 0 010 101 100 | | YP2 | | FINISHED? |
| 0235 | 0233 | 1 001 101 111 | | BRN | CEND2 | NO |

DATA STORAGE UNIT LISTING (ROM C-1)–Continued

| CURR ADDR | BRAN ADDR | OPERATION CODE BIT PATTERN | | | | |
|---|---|---|---|---|---|---|
| 0236 | | 1 100 011 000 | CEND3 | LDC12 | | YES, LOAD "END" |
| 0237 | | 1 111 101 100 | | YP15 | | FINISHED ? |
| 0240 | 0236 | 1 001 111 011 | | BRN | CEND3 | NO |
| 0241 | | 0 111 110 000 | | CTT | | LEFT HALF TO T-REG |
| 0242 | 0206 | 1 000 011 101 | CEND4 | JSB | CPRIN | GO TO PRINT SUBROUTINE |
| 0243 | | 1 000 100 100 | CEND5 | RS8 | | RESET AUXILIARY FLAG IS SET |
| 0244 | | 1 010 101 000 | | MTC | | GET INT. FLG. VECTOR TO BE RESTORED |
| 0245 | | 0 100 010 000 | | ROM 2 | | GO TO AUX.FLAG RESET |
| 0246 | | 0 100 010 100 | CINDT | YS4 | | IS TEST PROGRAMMED ? |
| 0247 | 0116 | 0 100 111 011 | | BRN | CINDE | NO |
| 0250 | | 0 100 100 100 | | RS4 | | YES.RESET TEST FLAG |
| 0251 | 0377 | 1 111 111 111 | | BRN | CINT1 | |
| 0252 | | 1 111 011 000 | CCLR3 | LDC15 | | LOAD BLANKS |
| 0253 | | 0 101 101 100 | | YP5 | | FINISHED? |
| 0254 | 0252 | 1 010 101 011 | | BRN | CCLR3 | NO |
| 0255 | | 1 011 011 000 | CCLR4 | LDC11 | | YES: LOAD "DATA" |
| 0256 | | 0 001 101 100 | | YP1 | | FINISHED? |
| 0257 | 0255 | 1 010 110 111 | | BRN | CCLR4 | NO |
| 0260 | | 0 001 011 000 | | LDC1 | | YES: LOAD "C" |
| 0261 | | 0 111 011 000 | | LDC7 | | LOAD"L" |
| 0262 | | 0 111 110 000 | | CTT | | LEFT HALF TO T-REG |
| 0263 | | 1 101 001 100 | | PT13 | | SET POINTER |
| 0264 | | 1 011 011 000 | | LDC11 | | E |
| 0265 | | 1 000 000 100 | | SS8 | | SET AUX.FLG. TO GET OUT PRINT ROUTE |
| 0266 | | 1 100 011 000 | | LDC12 | | A |
| 0267 | | 1 011 011 000 | | LDC11 | | R |
| 0270 | 0242 | 1 010 001 011 | | BRN | CEND4 | GO TO COMMON PRINT WITH LIST ROUTINE |
| 0271 | | 0 011 001 110 | CDECR | W.ZTC | | CLEAR C-REG |
| 0272 | | 0 011 111 110 | | S.ZNCC | | LOAD MINUS FOR SIGN OF MANTISSA |
| 0273 | | 1 100 001 100 | | PT12 | | SET POINTER: ELIMINATE CARRY |
| 0274 | 0277 | 1 011 111 111 | | BRN | CINC1 | GO TO COMMON PART WITH INCREMENT |
| 0275 | | 0 011 001 110 | CINCR | W.ZTC | | CLEAR C-REG |
| 0276 | | 1 100 001 100 | | PT12 | | PREPARE LOAD ONE |
| 0277 | | 0 111 100 010 | CINC1 | P.CP1C | | GENERATE "ONE" IN SCI-NOT |
| 0300 | | 0 000 101 110 | | W.ZTB | | |
| 0301 | | 1 111 111 010 | | XS.AP1A | | |
| 0302 | | 1 111 111 010 | | XS.AP1A | | |
| 0303 | | 0 111 111 010 | | XS.CP1C | | |
| 0304 | | 0 111 111 010 | | XS.CP1C | | |
| 0305 | | 0 001 001 010 | | X.AMC | | |
| 0306 | 0310 | 1 100 100 011 | | BRN | CINC4 | |
| 0307 | | 1 110 101 110 | | W.AXC | | |
| 0310 | | 1 110 100 110 | CINC4 | M.AXC | | |
| 0311 | | 0 110 100 110 | | M.ZMC | | |
| 0312 | 0314 | 1 100 110 011 | | BRN | CINC5 | |
| 0313 | | 1 110 101 110 | | W.AXC | | |
| 0314 | | 1 000 100 110 | CINC5 | M.BXC | | |
| 0315 | | 0 001 001 010 | CINC6 | X.AMC | | |
| 0316 | 0331 | 1 101 100 111 | | BRN | CINC2 | |
| 0317 | | 1 010 001 110 | | W.SRB | | |
| 0320 | | 1 111 101 010 | | X.AP1A | | |
| 0321 | | 0 000 001 110 | | W.ZMB | | |
| 0322 | 0331 | 1 101 100 111 | | BRN | CINC2 | |
| 0323 | 0315 | 1 100 110 111 | | BRN | CINC6 | |
| 0324 | | 1 110 100 110 | CNRM2 | M.AXC | | GET RESULT MANTISSA INTO C-REG |
| 0325 | | 0 110 001 110 | | W.CTA | | COPY RESULT INTO A-REG |
| 0326 | | 0 000 110 000 | | RETURN | | |
| 0327 | | 1 000 000 100 | CPRLIS | SS8 | | LIST IN PROGRAM RUN.SET AUX.FLG. |
| 0330 | 0121 | 0 101 000 111 | | BRN | CCOM1 | GO TO COMMON PART |
| 0331 | | 0 101 111 010 | CINC2 | XS.CM1C | | |
| 0332 | | 0 101 111 010 | | XS.CM1C | | |
| 0333 | | 1 011 101 010 | | X.ZTA | | |
| 0334 | | 1 101 011 110 | | S.AMCA | | |
| 0335 | | 1 001 111 110 | | S.AM1 | | |
| 0336 | 0353 | 1 110 101 111 | | BRN | CINC3 | GO TO SUBTRACTION |
| 0337 | | 1 110 001 110 | | W.APBA | | ADD MANTISSAS |
| 0340 | | 1 011 001 110 | CINC7 | W.SRA | | FOR OVERFLOW CASE |
| 0341 | | 0 111 101 010 | | X.CP1C | | INCREMENT EXPONENT ACCORDINGLY |
| 0342 | | 1 100 001 100 | | PT12 | | PREPARE NORMALIZATION CHECK |
| 0343 | | 1 001 100 010 | CNRM1 | P.AM1 | | NORMALIZATION NEEDED? |
| 0344 | 0324 | 1 101 010 011 | | BRN | CNRM2 | NO |
| 0345 | | 0 100 001 110 | | W.SLA | | YES: NORMALIZATION SHIFT |
| 0346 | | 0 101 101 010 | | X.CM1C | | EXPONENT DECREMENT |
| 0347 | | 1 001 101 110 | | W.AM1 | | IS IT ZERO? |
| 0350 | 0343 | 1 110 001 111 | | BRN | CNRM1 | NO |
| 0351 | | 0 011 001 110 | | W.ZTC | | SET ZERO FOR RESULT |
| 0352 | | 0 000 110 000 | | RETURN | | YES: FINISHED |
| 0353 | | 1 000 000 110 | CINC3 | M.AMB | | |
| 0354 | 0357 | 1 110 111 111 | | BRN | CINC8 | |
| 0355 | | 0 011 111 110 | | S.ZNCC | | |
| 0356 | | 1 100 101 110 | | W.AXB | | |
| 0357 | | 1 100 001 110 | CINC8 | W.AMBA | | SUBTRACT MANTISSAS |
| 0360 | | 1 011 111 110 | | S.ZTA | | CANCEL SIGN |
| 0361 | | 0 000 000 000 | | NOP | | TO ELIMINATE CARRY |
| 0362 | 0340 | 1 110 000 011 | | BRN | CINC7 | GO TO NORMALIZATION |
| 0363 | | 0 100 010 100 | CEQL2 | YS4 | | IS CLEAR DATA ROUTINE FLAG SET? |
| 0364 | 0357 | 0 010 111 111 | | BRN | CEQL3 | NO: CONTINUE IN TEST |
| 0365 | 0374 | 0 011 110 011 | | BRN | CEQL9 | YES.GO TO RESET IT |
| 0366 | | 0 000 010 000 | CDEC10 | ROM 0 | | GO TO COMMON PATH |
| 0367 | | 1 011 010 100 | CCPR1 | YS11 | | ON COMMAND ONLY ? |
| 0370 | 0000 | 0 000 000 011 | | BRN | CPRNT | NO.GO TO PRINT |
| 0371 | 0374 | 1 111 110 011 | | BRN | CCPR2 | YES.DO NOT PRINT |
| 0372 | | 1 110 100 000 | CPRTA | YPOC | | CHECK PRINT ON COMMAND FLAG |
| 0373 | 0367 | 1 111 011 111 | | BRN | CCPR1 | CONTINUE |
| 0374 | | 1 011 100 100 | CCPR2 | RS11 | | RESET EXTERNAL FLAG |
| 0375 | | 0 000 010 000 | CPRT3 | ROM 0 | | GO BACK TO ROM 0 |
| 0376 | | 0 000 010 000 | CINC10 | ROM 0 | | GO TO COMMON PART |
| 0377 | | 0 100 010 000 | CINT1 | ROM 2 | | GO TO TEST |

DATA STORAGE UNIT LISTING (ROM C-2)

| CURR ADDR | BRAN ADDR | OPERATION CODE BIT PATTERN | | | | |
|---|---|---|---|---|---|---|
| 0000 | | 0 001 100 110 | CINT2 | M.CM1 | | IS DECREMENTED NUMBER ZERO ? |
| 0001 | 0132 | 0 101 101 011 | | BRN | CINT3 | NO.CONDITION NOT MET |
| 0002 | 0106 | 0 100 011 011 | | BRN | CINT4 | YES.CONDITION MET |
| 0003 | | 0 010 101 000 | CCOR2 | CXM | | GET INT. FLG. VECTOR FOR UPDATING |
| 0004 | | 0 010 001 100 | | PT2 | | SET OP. CODE TO : |
| 0005 | | 0 111 011 000 | | LDC7 | | 07 |
| 0006 | 0055 | 0 010 110 111 | | BRN | CCOR9 | GO TO COMMON PART |
| 0007 | | 0 010 101 000 | CCOR1 | CXM | | GET INT. FLG. VECTOR FOR UPDATING |
| 0010 | | 0 010 001 100 | | PT2 | | SET OP. CODE TO : |
| 0011 | | 1 000 011 000 | | LDC8 | | 08 |
| 0012 | 0055 | 0 010 110 111 | | BRN | CCOR9 | GO TO COMMON PART |
| 0013 | 0023 | 0 001 001 111 | CSTD2 | BRN | CSTD3 | STORE-DIVIDE |
| 0014 | 0020 | 0 001 000 011 | CSTM2 | BRN | CSTM3 | STORE-MULTIPLY |
| 0015 | | 0 000 000 000 | | DUMMY | | |
| 0016 | | 0 000 000 000 | | DUMMY | | |
| 0017 | | 0 000 000 000 | | DUMMY | | |
| 0020 | 0033 | 0 001 110 001 | CSTM3 | JSR | CCOR4 | GO TO SET OP. CODE AND PREPARE BLANKS |
| 0021 | | 0 001 011 000 | | LDC1 | | LOAD CODE FOR * |
| 0022 | 0377 | 1 111 111 111 | | BRN | CPRNT | GO TO PRINT |
| 0023 | 0041 | 0 010 001 001 | CSTD3 | JSR | CCOR3 | GO TO SET OP. CODE AND PREPARE BLANKS |
| 0024 | | 0 110 011 000 | | LDC6 | | LOAD CODE FOR DIVIDE |
| 0025 | 0377 | 1 111 111 111 | | BRN | CPRNT | GO TO PRINT |
| 0026 | 0002 | 0 000 001 101 | CSTA3 | JSR | CCOR2 | GO TO SET OP. CODE AND PREPARE BLANKS |
| 0027 | | 0 000 011 000 | | LDC0 | | LOAD CODE FOR + |
| 0030 | 0377 | 1 111 111 111 | | BRN | CPRNT | GO TO PRINT |
| 0031 | 0006 | 0 000 011 101 | CSTS3 | JSR | CCOR1 | GO TO SET OP. CODE AND PREPARE BLANKS |
| 0032 | | 0 111 011 000 | | LDC7 | | LOAD CODE FOR - |
| 0033 | 0377 | 1 111 111 111 | | BRN | CPRNT | GO TO PRINT |
| 0034 | | 0 010 101 000 | CCOR4 | CXM | | GET INT. FLG. VECTOR FOR UPDATING |
| 0035 | | 0 010 001 100 | | PT2 | | SET OP. CODE TO : |
| 0036 | | 1 001 011 000 | | LDC9 | | 09 |
| 0037 | 0055 | 0 010 110 111 | | BRN | CCOR9 | GO TO COMMON PART |
| 0040 | | 0 010 010 000 | CCOMR | ROM 1 | | GO TO EXECUTE ROUTINE ON ROM U |
| 0041 | 0026 | 0 001 011 011 | CSTA2 | BRN | CSTA3 | STORE-ADD |
| 0042 | | 0 010 101 000 | CCOR3 | CXM | | GET INT. FLG. VECTOR FOR UPDATING |
| 0043 | | 0 011 001 100 | | PT3 | | SET OP. CODE TO : |
| 0044 | | 0 001 011 000 | | LDC1 | | 10 |
| 0045 | 0054 | 0 010 110 011 | | BRN | CCOR8 | GO TO FINISH OP.CODE LOADING |
| 0046 | | 0 000 010 100 | CINT1 | YS0 | | IS A KEY DOWN? |
| 0047 | 0156 | 0 110 111 011 | | BRN | CCOMB | NO: CONTINUE IN ROUTINE EXECUTION |
| 0050 | | 0 010 010 000 | | ROM 1 | | YES: GO TO ROUTINE END |
| 0051 | 0031 | 0 001 100 111 | CSTS2 | BRN | CSTS3 | STORE-SUBTRACT |
| 0052 | | 0 000 000 000 | | DUMMY | | |
| 0053 | | 0 000 000 000 | | DUMMY | | |
| 0054 | | 0 000 011 000 | CCOR8 | LDC0 | | 10 |
| 0055 | | 0 010 101 000 | CCOR9 | CXM | | RESTORE INT.FLG.VECTOR |
| 0056 | | 1 000 101 110 | | W.BXC | | DATA TEMPORARILY INTO B-REG |
| 0057 | | 0 011 001 110 | | W.ZTC | | CLEAR C-REG |
| 0060 | | 0 111 110 000 | | CTT | | CLEAR T-REG |
| 0061 | | 0 101 000 000 | | IS2 | | |
| 0062 | | 1 101 001 000 | | TDEC | | LOAD T-REG FULL WITH ONES |
| 0063 | | 1 001 000 000 | | IS1 | | |
| 0064 | | 0 111 111 000 | | TTC | | COPY "ONES" INTO C-REG ALSO |
| 0065 | | 1 010 001 100 | | PT10 | | PREPARE OP.CODE LOAD |
| 0066 | | 0 101 100 100 | | RS5 | | RESET FLAG 5 IF SET |
| 0067 | | 1 000 100 100 | | RS8 | | RESET FLAG 8 IF SET |
| 0070 | | 0 000 110 000 | | RETURN | | END OF THE SUBROUTINE |
| 0071 | | 0 000 000 000 | | DUMMY | | |
| 0072 | 0100 | 0 100 000 011 | | BRN | CCOMS | |
| 0073 | | 0 000 010 000 | CRES3 | ROM 0 | | GO TO MAIN UNIT |
| 0074 | | 0 000 110 100 | CRES2 | CLS | | CLEAR ALL STATUS BITS |
| 0075 | | 0 100 000 100 | | SS4 | | SET RESET ROUTINE AUX. FLAG |
| 0076 | | 1 010 101 000 | | MTC | | GET INT. FLG. VECTOR FOR UPDATE |
| 0077 | 0073 | 0 011 101 111 | | BRN | CRES3 | |
| 0100 | | 0 000 100 100 | CCOMS | RS0 | | RESET KEY-DOWN FLAG |
| 0101 | | 0 000 010 100 | | YS0 | | IS THE KEY STILL DOWN |
| 0102 | 0040 | 0 010 000 011 | | BRN | CCOMR | NO: GO AND EXECUTE |
| 0103 | 0100 | 0 100 000 011 | | BRN | CCOMS | YES: WAIT IN THIS LOOP |
| 0104 | | 0 000 000 000 | | DUMMY | | |
| 0105 | | 0 000 000 000 | | DUMMY | | |
| 0106 | | 0 000 010 000 | CINT4 | ROM 0 | | GO TO CFINI |
| 0107 | | 0 000 000 000 | | DUMMY | | |
| 0110 | | 0 000 000 000 | | DUMMY | | |
| 0111 | | 0 000 000 000 | | DUMMY | | |
| 0112 | | 0 000 000 000 | | DUMMY | | |
| 0113 | | 0 000 011 000 | CPLI2 | LDC0 | | RESET IT TO ALLOW DATA PRINT |
| 0114 | | 0 001 001 100 | | PT1 | | PREPARE FLAG FOR RUN MODE INDICATION |
| 0115 | | 0 010 011 000 | | LDC2 | | SET IT |
| 0116 | | 0 010 101 000 | CPLI3 | CXM | | STORE UPDATED VECTOR.RESTORE DATA |
| 0117 | | 1 000 000 100 | | SS8 | | SET LIST ROUTINE AUX.FLAG |
| 0120 | | 0 010 010 000 | | ROM 1 | | |
| 0121 | | 0 001 001 100 | CEND7 | PT1 | | PREPARE RUN MODE INDICATOR TEST |
| 0122 | | 0 110 100 010 | | P.ZNC | | IS IT ZERO ? |
| 0123 | 0127 | 0 101 011 111 | | BRN | CEND8 | YES |
| 0124 | | 1 100 001 100 | | PT12 | | NO.PREPARE OP.MODE CODE LOAD |
| 0125 | | 0 010 011 000 | | LDC2 | | SET RUN MODE CODE |
| 0126 | | 0 001 001 100 | | PT1 | | PREPARE AUX.FLAGS RESET |
| 0127 | | 0 011 010 010 | CEND8 | WP.ZTC | | AUX.FLG.RESET |
| 0130 | | 0 010 101 000 | | CXM | | STORE UPDATED INT.FLG.VECTOT |
| 0131 | 0247 | 1 010 011 111 | | BRN | CEND9 | |
| 0132 | | 0 010 101 000 | CINT3 | CXM | | GET INT.FLG.VECTOR |
| 0133 | | 0 110 001 100 | | PT6 | | PREPARE CONDITION FLAG TO BE SET |
| 0134 | | 0 001 011 000 | | LDC1 | | SET CONDITION NOT MET FLAG |
| 0135 | | 0 010 101 000 | | CXM | | RESTORE DATA AND INT.FLG.VECTOR |
| 0136 | 0106 | 0 100 011 011 | | BRN | CINT4 | |
| 0137 | | 0 000 000 000 | | DUMMY | | |
| 0140 | | 0 000 000 000 | | DUMMY | | |
| 0141 | | 0 000 000 000 | | DUMMY | | |
| 0142 | | 0 000 000 000 | | DUMMY | | |
| 0143 | | 0 000 000 000 | | DUMMY | | |
| 0144 | | 0 000 000 000 | | DUMMY | | |
| 0145 | | 0 000 000 000 | | DUMMY | | |
| 0146 | | 0 000 000 000 | | DUMMY | | |
| 0147 | | 0 000 000 000 | | DUMMY | | |
| 0150 | | 0 000 000 000 | | DUMMY | | |

DATA STORAGE UNIT LISTING (ROM C-2)-Continued

| LINE # | CURR ADDR | BRAN ADDR | OPERATION CODE BIT PATTERN | | | | |
|---|---|---|---|---|---|---|---|
| 108 | 0151 | | 0 000 000 000 | | DUMMY | | |
| 109 | 0152 | | 0 000 000 000 | | DUMMY | | |
| 110 | 0153 | | 0 000 000 000 | | DUMMY | | |
| 111 | 0154 | | 0 000 000 000 | | DUMMY | | |
| 112 | 0155 | | 0 000 000 000 | | DUMMY | | |
| 113 | 0156 | | 1 011 111 000 | CCOMB | DSTC | | GET THE DATA OUT |
| 114 | 0157 | | 0 010 010 000 | | ROM 1 | | GO BACK TO LIST ROUTINE ON ROM 1 |
| 115 | 0160 | | 1 011 100 100 | CCOMZ | RSI1 | | RESET EXTERNAL FLAG |
| 116 | 0161 | 0046 | 0 010 011 011 | | BRN | CINT1 | GO TO CHECK FOR KEY-DOWN |
| 117 | 0162 | | 0 000 000 000 | | DUMMY | | |
| 118 | 0163 | | 0 000 000 000 | | DUMMY | | |
| 119 | 0164 | | 0 000 000 000 | | DUMMY | | |
| 120 | 0165 | | 0 000 000 000 | | DUMMY | | |
| 121 | 0166 | | 0 000 000 000 | | DUMMY | | |
| 122 | 0167 | | 0 000 000 000 | | DUMMY | | |
| 123 | 0170 | | 0 000 000 000 | | DUMMY | | |
| 124 | 0171 | | 0 000 000 000 | | DUMMY | | |
| 125 | 0172 | | 0 000 000 000 | | DUMMY | | |
| 126 | 0173 | | 0 000 000 000 | | DUMMY | | |
| 127 | 0174 | | 0 000 000 000 | | DUMMY | | |
| 128 | 0175 | | 0 000 000 000 | | DUMMY | | |
| 129 | 0176 | | 0 000 000 000 | | DUMMY | | |
| 130 | 0177 | | 0 000 000 000 | | DUMMY | | |
| 131 | 0200 | | 0 000 000 000 | | DUMMY | | |
| 132 | 0201 | | 0 000 000 000 | | DUMMY | | |
| 133 | 0202 | | 0 000 000 000 | | DUMMY | | |
| 134 | 0203 | | 0 000 000 000 | | DUMMY | | |
| 135 | 0204 | | 0 000 000 000 | | DUMMY | | |
| 136 | 0205 | | 0 000 000 000 | | DUMMY | | |
| 137 | 0206 | | 0 000 000 000 | | DUMMY | | |
| 138 | 0207 | | 0 000 010 000 | CPST3 | ROM 0 | | GO TO EXECUTE OLD OPERATION |
| 139 | 0210 | | 0 000 000 000 | | DUMMY | | |
| 140 | 0211 | | 0 000 000 000 | | DUMMY | | |
| 141 | 0212 | | 0 000 000 000 | | DUMMY | | |
| 142 | 0213 | | 0 000 000 000 | | DUMMY | | |
| 143 | 0214 | | 0 000 000 000 | | DUMMY | | |
| 144 | 0215 | | 0 000 000 000 | | DUMMY | | |
| 145 | 0216 | | 0 000 000 000 | | DUMMY | | |
| 146 | 0217 | | 0 000 000 000 | | DUMMY | | |
| 147 | 0220 | | 0 000 000 000 | | DUMMY | | |
| 148 | 0221 | | 0 010 101 000 | CFXC3 | CXM | | GET INT.FL.VECTOR |
| 149 | 0222 | | 0 100 001 100 | | PT4 | | SET POINTER TO INDICATE D.S.USER CODE |
| 150 | 0223 | | 0 010 011 000 | | LDC2 | | SET IT TO TWO |
| 151 | 0224 | 0320 | 1 101 000 011 | | BRN | LEXC4 | |
| 152 | 0225 | | 0 000 000 000 | | DUMMY | | |
| 153 | 0226 | | 0 000 010 000 | CPST2 | ROM 0 | | GO TO SET USERS CODE |
| 154 | 0227 | | 0 000 000 000 | | DUMMY | | |
| 155 | 0230 | | 0 000 000 000 | | DUMMY | | |
| 156 | 0231 | | 0 000 000 000 | | DUMMY | | |
| 157 | 0232 | | 0 000 000 000 | | DUMMY | | |
| 158 | 0233 | | 0 000 000 000 | | DUMMY | | |
| 159 | 0234 | | 0 000 000 000 | | DUMMY | | |
| 160 | 0235 | | 0 000 000 000 | | DUMMY | | |
| 161 | 0236 | | 0 000 000 000 | | DUMMY | | |
| 162 | 0237 | | 0 000 000 000 | | DUMMY | | |
| 163 | 0240 | | 0 000 000 000 | | DUMMY | | |
| 164 | 0241 | | 0 000 000 000 | | DUMMY | | |
| 165 | 0242 | | 0 000 000 000 | | DUMMY | | |
| 166 | 0243 | | 0 000 000 000 | | DUMMY | | |
| 167 | 0244 | | 0 101 100 100 | CACU9 | RS5 | | RESET "DO NOT PRINT" FLAG IF SET |
| 168 | 0245 | | 0 000 010 000 | | ROM 0 | | GO TO USERS CODE TEST |
| 169 | 0246 | 0121 | 0 101 000 111 | CEND6 | BRN | CEND7 | |
| 170 | 0247 | | 1 100 101 000 | CEND9 | DNR | | LAST ADDRESS INTO C-REG |
| 171 | 0250 | | 1 100 101 000 | | DNR | | RESTORE ORIGINAL C- AND D-REG CONTENTS |
| 172 | 0251 | | 0 000 010 000 | | ROM 0 | | GO TO MAIN UNIT SUPERVISOR |
| 173 | 0252 | | 0 000 000 000 | | DUMMY | | |
| 174 | 0253 | | 0 000 000 000 | | DUMMY | | |
| 175 | 0254 | | 0 000 000 000 | | DUMMY | | |
| 176 | 0255 | | 0 000 000 000 | | DUMMY | | |
| 177 | 0256 | | 0 000 000 000 | | DUMMY | | |
| 178 | 0257 | | 0 000 000 000 | | DUMMY | | |
| 179 | 0260 | | 0 000 000 000 | | DUMMY | | |
| 180 | 0261 | | 0 000 000 000 | | DUMMY | | |
| 181 | 0262 | | 0 000 000 000 | | DUMMY | | |
| 182 | 0263 | | 0 000 000 000 | | DUMMY | | |
| 183 | 0264 | | 0 000 000 000 | | DUMMY | | |
| 184 | 0265 | | 0 000 000 000 | | DUMMY | | |
| 185 | 0266 | | 0 000 000 000 | | DUMMY | | |
| 186 | 0267 | | 0 000 000 000 | | DUMMY | | |
| 187 | 0270 | | 0 000 000 000 | | DUMMY | | |
| 188 | 0271 | | 0 000 000 000 | | DUMMY | | |
| 189 | 0272 | | 0 000 000 000 | | DUMMY | | |
| 190 | 0273 | | 0 000 000 000 | | DUMMY | | |
| 191 | 0274 | | 0 000 000 000 | | DUMMY | | |
| 192 | 0275 | | 0 000 000 000 | | DUMMY | | |
| 193 | 0276 | | 0 000 000 000 | | DUMMY | | |
| 194 | 0277 | | 0 000 000 000 | | DUMMY | | |
| 195 | 0300 | | 0 000 000 000 | | DUMMY | | |
| 196 | 0301 | | 0 000 000 000 | | DUMMY | | |
| 197 | 0302 | | 0 000 000 000 | | DUMMY | | |
| 198 | 0303 | | 0 000 000 000 | | DUMMY | | |
| 199 | 0304 | | 0 000 000 000 | | DUMMY | | |
| 200 | 0305 | | 0 000 000 000 | | DUMMY | | |
| 201 | 0306 | | 0 000 000 000 | | DUMMY | | |
| 202 | 0307 | | 0 000 000 000 | | DUMMY | | |
| 203 | 0310 | | 0 000 000 000 | | DUMMY | | |
| 204 | 0311 | | 0 000 000 000 | | DUMMY | | |
| 205 | 0312 | | 0 000 000 000 | | DUMMY | | |
| 206 | 0313 | | 0 000 000 000 | | DUMMY | | |
| 207 | 0314 | | 0 000 000 000 | | DUMMY | | |
| 208 | 0315 | | 0 000 000 000 | | DUMMY | | |
| 209 | 0316 | | 0 000 000 000 | | DUMMY | | |
| 210 | 0317 | | 0 000 000 000 | | DUMMY | | |
| 211 | 0320 | | 0 000 010 000 | LEXC4 | ROM 0 | | GO TO CACP4 |
| 212 | 0321 | | 0 000 000 000 | | DUMMY | | |
| 213 | 0322 | | 0 000 000 000 | | DUMMY | | |
| 214 | 0323 | | 0 000 000 000 | | DUMMY | | |
| 215 | 0324 | | 0 000 000 000 | | DUMMY | | |

DATA STORAGE UNIT LISTING (ROM C-2)—Continued

| CURR ADDR | BRAN ADDR | OPERATION CODE BIT PATTERN | | | | |
|---|---|---|---|---|---|---|
| 0325 | | 0 000 000 000 | | DUMMY | | |
| 0326 | 0244 | 1 010 010 011 | CACU8 | BRN | CACU9 | |
| 0327 | | 0 010 101 000 | CPLT1 | CXM | | GET INT.FLG.VECTOR |
| 0330 | | 0 110 100 010 | | P.ZMC | | IS OP.MODE CODE ZERO ? |
| 0331 | 0116 | 0 100 111 011 | | BRN | CPLT3 | YES |
| 0332 | 0113 | 0 100 101 111 | | BRN | CPLT2 | NO |
| 0333 | | 0 010 101 000 | CPST1 | CXM | | GET INT.FLG.VECTOR |
| 0334 | | 1 100 001 100 | | PT12 | | PREPARE OP.MODE TEST |
| 0335 | | 0 110 100 010 | | P.ZMC | | IS IT ZERO ? |
| 0336 | 0226 | 1 001 011 011 | | BRN | CPST2 | YES,IT IS STEP MODE |
| 0337 | | 0 000 001 100 | | PT0 | | NO,PROGRAM RUN MODE |
| 0340 | | 0 110 011 000 | | LDC6 | | LOAD OP.CODE FOR STORE DIRECT |
| 0341 | | 0 010 101 000 | | CXM | | STORE UPDATED VECTOR,RESTORE DATA |
| 0342 | | 1 000 101 110 | | W.BXC | | SAVE DATA IN B-REG TEMPORARILY |
| 0343 | | 1 010 101 000 | | MTC | | PREPARE INT.FLG.VECTOR FOR TEST |
| 0344 | 0207 | 1 000 011 111 | | BRN | CPST3 | |
| 0345 | | 0 000 000 000 | | DUMMY | | |
| 0346 | | 0 000 000 000 | | DUMMY | | |
| 0347 | | 0 000 000 000 | | DUMMY | | |
| 0350 | | 0 000 000 000 | | DUMMY | | |
| 0351 | | 0 000 000 000 | | DUMMY | | |
| 0352 | | 0 000 000 000 | | DUMMY | | |
| 0353 | | 0 000 000 000 | | DUMMY | | |
| 0354 | | 0 000 000 000 | | DUMMY | | |
| 0355 | | 0 000 000 000 | | DUMMY | | |
| 0356 | | 0 000 000 000 | | DUMMY | | |
| 0357 | | 0 000 000 000 | | DUMMY | | |
| 0360 | | 0 000 000 000 | | DUMMY | | |
| 0361 | | 0 000 000 000 | | DUMMY | | |
| 0362 | | 0 000 000 000 | | DUMMY | | |
| 0363 | | 0 000 000 000 | | DUMMY | | |
| 0364 | | 0 000 000 000 | | DUMMY | | |
| 0365 | | 0 000 000 000 | | DUMMY | | |
| 0366 | | 0 000 000 000 | | DUMMY | | |
| 0367 | | 0 000 000 000 | | DUMMY | | |
| 0370 | | 0 000 000 000 | | DUMMY | | |
| 0371 | | 0 000 000 000 | | DUMMY | | |
| 0372 | | 0 000 000 000 | | DUMMY | | |
| 0373 | | 0 000 000 000 | | DUMMY | | |
| 0374 | | 0 000 000 000 | | DUMMY | | |
| 0375 | | 0 000 000 000 | | DUMMY | | |
| 0376 | | 0 000 000 000 | | DUMMY | | |
| 0377 | | 0 000 010 000 | CPRNT | ROM 0 | | GO TO PRINT |

MATH/USER-DEFINABLE FUNCTION BLOCK LISTING (ROM B-Ø)

| CURR ADDR | BRAN ADDR | OPERATION CODE BIT PATTERN | | | | |
|---|---|---|---|---|---|---|
| 0000 | | 0 010 101 000 | | CXM | | |
| 0001 | | 1 101 001 100 | | PT13 | | |
| 0002 | 0005 | 0 000 010 111 | | BRN | PROGM2 | |
| 0003 | | 0 000 100 000 | BNOCH | RMGRA | | |
| 0004 | 0003 | 0 000 001 111 | | BRN | BNOCH | |
| 0005 | | 1 000 010 000 | PROGM2 | ROM 4 | | CONTINUE PROGRAM MODE IN ROM 4 |
| 0006 | | 0 111 000 100 | SUPC0 | SS7 | | SET FIRST ENTRY FLAG |
| 0007 | 0106 | 0 100 011 011 | | BRN | SUPC | |
| 0010 | 0241 | 1 010 000 111 | KY1 | BRN | CD1 | KEY 1 DOWN |
| 0011 | 0306 | 1 100 011 011 | | BRN | DATA0 | |
| 0012 | 0242 | 1 010 001 011 | KY2 | BRN | CD2 | KEY 2 DOWN |
| 0013 | 0243 | 1 010 001 111 | KY3 | BRN | CD3 | KEY 3 DOWN |
| 0014 | 0244 | 1 010 010 011 | KY4 | BRN | CD4 | KEY 4 DOWN |
| 0015 | | 0 000 000 000 | | DUMMY | | |
| 0016 | 0245 | 1 010 010 111 | KY5 | BRN | CD5 | KEY 5 DOWN |
| 0017 | | 0 000 100 000 | EQUAL | RMGRA | | GO TO = ROUTINE IN ROM A |
| 0020 | 0246 | 1 010 011 011 | KY6 | BRN | CD6 | KEY 6 DOWN |
| 0021 | | 0 000 000 000 | | DUMMY | | |
| 0022 | 0247 | 1 010 011 111 | KY7 | BRN | CD7 | KEY 7 DOWN |
| 0023 | 0250 | 1 010 100 011 | KY8 | BRN | CD8 | KEY 8 DOWN |
| 0024 | 0251 | 1 010 100 111 | KY9 | BRN | CD9 | KEY 9 DOWN |
| 0025 | 0071 | 0 011 100 111 | | BRN | PRINT0 | PRINT DATA, SAVE USERCODE |
| 0026 | 0252 | 1 010 101 011 | KY10 | BRN | CD10 | KEY 10 DOWS |
| 0027 | | 0 000 000 000 | | DUMMY | | |
| 0030 | 0253 | 1 010 101 111 | KY11 | BRN | CD11 | KEY 11 DOWN |
| 0031 | | 0 000 000 000 | | DUMMY | | |
| 0032 | 0254 | 1 010 110 011 | KY12 | BRN | CD12 | KEY 12 DOWN |
| 0033 | 0255 | 1 010 110 111 | KY13 | BRN | CD13 | KEY 13 DOWN |
| 0034 | 0256 | 1 010 111 011 | KY14 | BRN | CD14 | KEY 14 DOWN |
| 0035 | | 0 000 000 000 | | DUMMY | | |
| 0036 | 0257 | 1 010 111 111 | KY15 | BRN | CD15 | KEY 15 DOWN |
| 0037 | | 0 000 000 000 | | DUMMY | | |
| 0040 | 0205 | 1 000 010 111 | | BRN | START | FUNCTION BLOCK START |
| 0041 | | 0 100 010 100 | TAB03 | YS4 | | IS DO NOT PRINT FLAG SET? |
| 0042 | 0355 | 1 110 110 111 | | BRN | PRINTT | NO, GO TO CHECK PRINT ON COMMAND FLAG |
| 0043 | 0225 | 1 001 010 111 | | BRN | SUPC02 | YES, GO TO SUPERVISOR |
| 0044 | | 0 010 101 000 | TAB02 | CXM | | RESTORE M VECTOR |
| 0045 | 0225 | 1 001 010 111 | | BRN | SUPC02 | GO TO SUPERVISOR |
| 0046 | | 0 000 000 000 | | DUMMY | | |
| 0047 | | 1 000 010 000 | EEX | ROM 4 | | GO TO ENTER EXP ROUTINE |
| 0050 | | 1 101 100 010 | | P.AM1A | | IS USERCODE 1 |
| 0051 | 0053 | 0 010 101 111 | | BRN | TEMP | NO,CONTINUE CHECK |
| 0052 | 0317 | 1 100 111 111 | | BRN | DATA | DATA ENTRY CHECK |
| 0053 | | 1 101 100 010 | TEMP | P.AM1A | | IS USERCODE 2? |
| 0054 | 0056 | 0 010 111 011 | | BRN | TEMP1 | NO, CONTINUE TEST |
| 0055 | 0231 | 1 001 100 111 | | BRN | PRINT | YES, RETURN FROM PRINTING |
| 0056 | | 1 101 100 010 | TEMP1 | P.AM1A | | IS USERCODE 3? |
| 0057 | 0061 | 0 011 000 111 | | BRN | TEMP2 | |
| 0060 | 0140 | 0 110 000 011 | | BRN | AENTRY | YES, ANGLE ENTRY CANCEL |
| 0061 | | 1 101 100 010 | TEMP2 | P.AM1A | | IS USERCODE 4 |

MATH/USER-DEFINABLE FUNCTION BLOCK LISTING (ROM D-Ø) —Continued

```
CURR  BRAN  OPERATION CODE
ADDR  ADDR  BIT PATTERN

0062  0064  0 011 010 011           BRN     TEMP5     NO. CONTINUE
0063  0047  0 010 011 111           BRN     EEX       YES. ENTER EXP ROUTINE
0064        1 101 100 010  TEMP5    P.AMIA            IS USERCODE 5
0065  0323  1 101 001 111           BRN     LSTP      NO.CHECK FOR RUN MODE
0066        1 010 101 000           MTC
0067  0133  0 101 101 111           BRN     TEMP4
0070  0103  0 100 001 111  TAB      BRN     TABØØ     START OF TABLE ROUTINE
0071  0165  0 111 011 001  PRINTØ   JSB     SAVE      SAVE OLD USERCODE
0072        0 111 001 100           PT7
0073        0 010 011 000           LDC2              LOAD NEW USERCODE 2
0074        0 010 101 000           CXM               RESTORE M VECTOR
0075        0 000 100 000  PRINT1   RMGRA             GO TO PRINT DATA ROUTINE
0076        0 001 011 000  TEMP3    LDC1              YES. SET TO PROGRAM MODE
0077        0 111 001 100           PT7
0100        0 111 011 000           LDC7              SET USERCODE TO 7
0101  0177  0 111 111 111           BRN     RSTR
0102  0071  0 011 100 111           BRN     PRINTØ    DATA PRINT FROM ROM 7
0103        1 011 001 100  TABØØ    PT11
0104  0107  0 100 011 111           BRN     TABØ
0105        0 000 100 000  CAL      RMGRA
0106        0 000 100 000  SUPC     RMGRA             GO TO ROM A SUPERVISOR
0107        0 010 101 000  TABØ     CXM
0110        0 100 011 000           LDC4              LOAD 4 AS DIC
0111        0 001 011 000           LDC1              STORE COUNTER FOR TWO DIGIT ENTRY
0112        0 111 001 100           PT7               CHECK USERCODE FOR 1
0113        0 001 100 010           P.CM1
0114  0344  0 010 010 011           BRN     TABØ2     NO. CONTINUE
0115        0 010 101 000           CXM
0116  0041  0 010 000 111           BRN     TABØ3
0117        1 110 010 000  START1   ROM 7
0120        1 000 101 110  RESTOR   W.BXC             STORE C
0121        1 110 101 110           W.AXC             PUT M VECTOR IN C
0122        1 000 001 100           PTB               GET OLD USERCODE
0123        1 110 100 010           P.AXC             PUT IT IN A
0124        1 011 001 110           W.SRA             ALIGNMENT SHIFT
0125        0 000 011 000           LDCØ              SET MB TO ZERO
0126        0 111 001 100           PT7
0127        1 110 100 010           P.AXC             RESTORE OLD USERCODE
0130        0 010 101 000           CXM               RESTORE M VECTOR
0131        0 010 001 110           W.BTC             RESTORE DATA
0132        0 000 110 000           RETURN
0133        0 110 011 000  TEMP4    LDC6              LOAD USERCODE TO 6
0134        1 100 001 100           PT12
0135        1 001 100 010           P.AM1             MANUAL MODE?
0136  0177  0 111 111 111           BRN     RSTR      NO. GO TO RESTORE
0137  0076  0 011 111 011           BRN     TEMP3
0140        0 010 101 000  AENTRY   CXM
0141        1 010 001 100           PT10
0142        1 001 011 000           LDC9
0143        0 010 101 000           CXM
0144        1 011 101 110           W.ZTA
0145  0161  0 111 001 001           JSB     DISPLY
0146        0 000 100 000  SUPCH    RMGRA
0147  0071  0 011 100 111           BRN     PRINTØ    GO TO PRINT FROM ROM 2
0150        0 000 100 000  SUPCK    RMGRA             GO TO MANUAL SUPERVISOR WITHOUT DISPLAY
0151        0 010 101 000  PRINT2   CXM
0152        0 001 001 100           PT1               LOAD PRINT RETURN FLAG
0153        0 000 011 000           LDCØ
0154        0 010 101 000           CXM
0155  0071  0 011 100 111           BRN     PRINTØ
0156  0165  0 111 011 001  ENTRY1   JSB     SAVE      SAVE OLD USERCODE
0157        1 011 001 100           PT11
0160        0 010 010 000  ENTRY    ROM 1             ANGLE ENTRY HEAD
0161  0156  0 110 111 011           BRN     ENTRY1    TO SAVE USERCODE FROM ANGLE ENTRY
0162        1 110 010 000  DISPLY   ROM 7             GO TO ANGLE DISPLAY VIA ROM 7
0163        1 110 010 000  PRANG    ROM 7             GO TO PRINT ANGLE
0164  0117  0 101 000 001           JSB     RESTOR    ANGLE ENTRY DONE FROM ROM 2
0165  0153  0 111 001 111           BRN     PRANG     GO TO PRINT IN DMS FORMAT
0166        0 010 101 000  SAVE     CXM               SAVE OLD USERCODE
0167        0 111 001 100           PT7               GET OLD USERCODE
0170        1 110 100 010           P.AXC             PUT IT IN A
0171        0 100 001 110           W.SLA             ALIGNMENT SHIFT
0172  0174  0 111 110 011           BRN     SAVE1
0173        1 100 010 000  A2       ROM 6             RETURN AFTER DATA PRINT TO ROM 6
0174        1 000 001 100  SAVE1    PTB               SAVE OLD USERCODE
0175        1 110 100 010           P.AXC
0176        0 000 110 000           RETURN
0177        0 010 101 000  RSTR     CXM
0200        1 100 101 000           DNR               RESTORE C REGISTER
0201        0 000 010 100  WAIT     YSØ
0202  0227  1 001 011 111           BRN     CALØ
0203        0 000 100 100           RSØ
0204  0201  1 000 000 111           BRN     WAIT      WAIT FOR KEY UP
0205        1 011 100 100  START    RS11
0206        1 010 010 100           YS10              IS SHIFT KEY DOWN
0207  0215  1 000 110 111           BRN     FAD       NO. CONTINUE
0210        0 101 000 000           IS2               YES. CALL CHANNEL 3
0211  0177  1 000 000 001           LIO     400
0212        0 110 100 000           GIDE
0213        1 001 000 000           IS1               CHANNEL 3 NOT THERE
0214  0117  0 100 111 111           BRN     START1
0215        1 011 101 110  FAD      W.ZTA             CLEAR A PREPARE FOR LABEL
0216        1 010 100 000           SHL               SET BUSY LIGHT
0217        0 011 010 000           TKRA
0220        1 010 101 000  CAL1     MTC
0221        1 110 101 110           W.AXC
0222  0135  0 100 010 111           BRN     CAL
0223        0 000 100 000  RET      RMGRA             RETURN TO ROM A
0224  0117  0 101 000 001  SUPCØ1   JSB     RESTOR    RESTORE OLD USERCODE
0225        0 000 110 100  SUPCØ2   CLS               CLEAR STATUS
0226  0206  0 000 011 011           BRN     SUPCØ     GO TO CLEAR STATUS BITS
0227        0 110 001 110  CALØ     W.CTA
0230  0220  1 001 000 011           BRN     CAL1
0231        0 001 001 100  PRINT    PT1               CHECK WHERE TO RETURN TO AFTER PRINT
0232        1 101 100 010           P.AMIA
0233  0235  1 001 110 111           BRN     AØ
0234  0224  1 001 010 011           BRN     SUPCØ1
```

MATH/USER-DEFINABLE FUNCTION BLOCK LISTING (ROM B-Ø) – Continued

```
CURR  BRAN    OPERATION CODE
ADDR  ADDR    BIT PATTERN

0235          1 101 100 010  A0      P.AMIA
0236  0224    1 001 010 011          BRN     SUPC01
0237  0342    1 110 001 011          BRN     A1
0240  0375    1 111 110 111          BRN     PROGM    PROGRAM MODE TABLE ROUTINE
0241          1 111 100 110  CD1     M.APIA           SET A REG ACCORDING
0242          1 111 100 110  CD2     M.APIA           TO FUNCTION DESIRED
0243          1 111 100 110  CD3     M.APIA
0244          1 111 100 110  CD4     M.APIA
0245          1 111 100 110  CD5     M.APIA
0246          1 111 100 110  CD6     M.APIA
0247          1 111 100 110  CD7     M.APIA
0250          1 111 100 110  CD8     M.APIA
0251          1 111 100 110  CD9     M.APIA
0252          1 111 100 110  CD10    M.APIA
0253          1 111 100 110  CD11    M.APIA
0254          1 111 100 110  CD12    M.APIA
0255          1 111 100 110  CD13    M.APIA
0256          1 111 100 110  CD14    M.APIA
0257          1 111 100 110  CD15    M.APIA
0260          0 100 101 000          CTS              SAVE C AND D REG IN STACK
0261          1 010 101 000          MTC              GET INT. FLAG VECTOR
0262          0 111 001 100          PT7              SET POINTER
0263          0 101 011 000          LDC5             SET USERCODE TO 5
0264          0 010 101 000          CXM              RESTORE INT. FLAG VECTOR
0265          0 011 001 110          W.ZTC            CLEAR C REG
0266          0 110 001 100          PT6              SET POINTER
0267          0 001 011 000          LDC1             SET MANTISSA TO 1000
0270          1 110 101 110          W.AXC
0271          1 101 000 110          M.AMCA           CALCULATE DESIRED LABEL
0272          0 100 001 110  ALP     W.SLA
0273          0 000 111 100          PLS
0274          1 100 101 100          YP12             IS POINTER = 12?
0275  0272    1 011 101 011          BRN     ALP      NO. CONTINUE
0276          1 110 101 110          W.AXC            RETURN LABEL TO C REG
0277          0 111 101 110          W.CPIC           ADD EXPONENET
0300          0 111 101 110          W.CPIC
0301          0 101 000 000          IS2
0302          1 001 001 000          PDEC
0303          1 001 001 000          PDEC
0304          1 001 000 000          IS1
0305  0223    1 001 001 111          BRN     BET      PERFORM A JSBLC
0306  0165    0 111 011 001  DATA0   JSB     SAVE     SAVE OLD USERCODE
0307          0 111 001 100          PT7
0310          0 001 011 000          LDC1             SET USERCODE TO'1
0311          1 100 001 100          PT12
0312          0 000 011 000          LDC0             SET TO MANUAL MODE
0313          0 010 101 000          CXM
0314          0 011 001 110          W.ZTC            CLEAR C FOR DATA ENTRY
0315          0 111 000 100          SS7              SET FIRST ENTRY FLAG
0316  0146    0 110 011 011          BRN     SUPCB    GO TO MANUAL SUPERVISOR
0317          1 100 001 100  DATA    PT12
0320          1 001 100 010          P.AM1            CHECK FOR MANUAL MODE
0321  0224    1 001 010 011          BRN     SUPC01   NO. END DATA ENTRY
0322  0146    0 110 011 011          BRN     SUPCB    CONTINUE DATA ENTRY
0323          1 100 001 100  LSTP    PT12
0324          1 001 100 010          P.AM1            ARE WE IN MANUAL MODE
0325  0105    0 100 010 111          BRN     CAL      GO TO SUPERVIXOR SKIP USERCODE CHECK
0326          0 111 001 100          PT7              YES
0327          0 100 101 000          CTS
0330          1 010 101 000          MTC
0331          1 101 100 010          P.AMIA           IS USERCODE SET TO 6
0332  0336    1 101 111 011          BRN     RET      NO. IT IS 7 RETURN TO MANUAL MODE
0333          1 100 001 100          PT12             YES. SET TO RUN MODE
0334          0 001 011 000          LDC1
0335          0 111 001 100          PT7
0336          0 000 011 000  RET     LDC0             SET USER CODE TO 0
0337          0 010 101 000          CXM
0340          1 100 101 000          DNR
0341          0 000 100 000  DRET    RMGRA            DO A RETURN
0342  0117    0 101 000 001  A1      JSB     RESTOR   RESTORE USERCODE
0343  0173    0 111 101 111          BRN     A2       GO BACK TO ROM 6
0344          0 010 010 000  HOME2   ROM 1            GO TO TABLE NUMBER ROUTINE WITHOUT PRINT
0345          1 110 100 000          YPOC             CHECK PRINT ON COMMAND FLAG
0346          1 011 010 100          YS11
0347  0362    1 111 001 011          BRN     HOME1    NOT SET. GO TO PRINT TABLE NUMBER
0350          1 011 100 100          RS11
0351  0344    1 110 010 011          BRN     HOME2    SET GO TO TABLE ROUTINE SKIP PRINT
0352          0 000 000 000          DUMMY
0353          0 000 000 000          DUMMY
0354  0017    0 000 111 111          BRN     EQUAL    GO TO ROM A EQUAL ROUTINE FROM ROM 4
0355          1 110 100 000  PRINT1  YPOC             CHECK PRINT ON COMMAND FLAG
0356          1 011 010 100          YS11
0357  0151    0 110 100 111          BRN     PRINT2   NOT SET. GO TO PINT DATA
0360          1 011 100 100          RS11
0361  0106    0 100 011 011          BRN     SUPC     SET. GO TO SUPERVISOR
0362          0 010 010 000  HOME1   ROM 1            GO BACK TO TABLE ROUTINE TO PRINT TABLE NUMBER
0363          0 010 010 000          ROM 1            CONTINUE DIC CHECK
0364          0 000 000 000          DUMMY
0365          1 000 010 000  EEXX    ROM 4            CONTINUE EEX ROUTINE IN ROM 4
0366          0 001 100 010  EEXX1   P.CM1            CHECK IF USERCODE IS OTHER THAN 0
0367  0371    1 111 100 111          BRN     EEXX2    YES. GO TO SET MANUAL MODE
0370  0365    1 111 010 111          BRN     EEXX     NO. CONTINUE
0371          1 100 001 100  EEXX2   PT12
0372          0 000 011 000          LDC0             SET  TO MANUAL MODE
0373  0365    1 111 010 111          BRN     EEXX     CONTONUE
0374  0366    1 111 011 011          BRN     EEXX1    EEX ROUTINE FROM ROM 4
0375          0 010 101 000  PROGM   CXM              STORE COUNTER FOR 2 DIGIT ENTRY
0376          1 010 001 100  PROGM1  PT10
0377          0 001 011 000          LDC1
```

MATH/USER-DEFINABLE FUNCTION BLOCK LISTING (ROM B-1)

| CURR ADDR | BRAN ADDR | OPERATION CODE BIT PATTERN | | | | |
|---|---|---|---|---|---|---|
| 0000 | 0160 | 0 111 000 011 | | BRN | ENTRY | |
| 0001 | 0353 | 0 010 101 111 | | BRN | SIN0 | |
| 0002 | 0352 | 0 010 101 011 | | BRN | COS0 | |
| 0003 | 0354 | 0 010 110 011 | | BRN | TAN0 | |
| 0004 | 0212 | 0 000 101 011 | | BRN | ASIN | |
| 0005 | 0214 | 0 000 110 011 | | BRN | ACOS | |
| 0006 | 0216 | 0 000 111 011 | | BRN | ATAN | |
| 0007 | 0055 | 0 010 110 111 | | BRN | SQT1 | |
| 0010 | | 0 000 010 000 | | ROM 0 | | DATA ENTRY ROUTINE |
| 0011 | 0032 | 0 001 101 011 | | BRN | SQUAR | |
| 0012 | | 1 010 000 100 | ASIN | SS10 | | |
| 0013 | 0053 | 0 010 101 111 | | BRN | SIN0 | |
| 0014 | | 1 010 000 100 | ACOS | SS10 | | |
| 0015 | 0052 | 0 010 101 011 | | BRN | COS0 | |
| 0016 | | 1 010 000 100 | ATAN | SS10 | | |
| 0017 | 0054 | 0 010 110 011 | | BRN | TAN0 | |
| 0020 | | 0 100 010 000 | | ROM 2 | | LOAD PI ROUTINE |
| 0021 | | 0 100 010 000 | | ROM 2 | | INTEGER X ROUTINE |
| 0022 | 0072 | 0 011 101 011 | | BRN | ABS0 | ABSOLUTE VALUE ROUTINE |
| 0023 | 0201 | 1 000 000 111 | | BRN | POLAR0 | TO POLAR ROUTINE |
| 0024 | 0202 | 1 000 001 011 | | BRN | RECT0 | TO RECTANGULAR ROUTINE |
| 0025 | | 1 100 010 000 | | ROM 6 | | X EXCHANGE Y ROUTINE |
| 0026 | 0203 | 1 000 001 111 | | BRN | ACC+0 | ACC+ ROUTINE |
| 0027 | 0220 | 1 001 000 011 | | BRN | ACC- | ACC- ROUTINE |
| 0030 | | 1 100 010 000 | | ROM 6 | | RECALL ACC ROUTINE |
| 0031 | | 1 100 010 000 | | ROM 6 | | CLEAR ACC ROUTINE |
| 0032 | 0105 | 0 100 011 001 | SQUAR | JSB | SET1 | SET RETURN FLAG |
| 0033 | | 0 110 001 110 | | W.CTA | | |
| 0034 | | 0 000 101 110 | | W.ZTB | | |
| 0035 | 0244 | 1 010 010 101 | | JSB | MPY11 | |
| 0036 | 0332 | 1 101 101 011 | | BRN | OFL1 | OVERFLOW TEST AND DISPLAY |
| 0037 | 0345 | 1 110 010 111 | | BRN | TABS | FROM PROGRAM MODE IN ROM 6 |
| 0040 | | 1 010 010 000 | | ROM 5 | | DMS TO DWDF |
| 0041 | | 1 010 010 000 | | ROM 5 | | DWDF TO DMS |
| 0042 | | 1 010 010 000 | | ROM 5 | | GRAD TO DWDF |
| 0043 | | 1 010 010 000 | | ROM 5 | | DWDF TO GRAD |
| 0044 | | 1 010 010 000 | | ROM 5 | | RAD TO DWDF |
| 0045 | | 1 010 010 000 | | ROM 5 | | DWDF TO RAD |
| 0046 | | 1 010 010 000 | | ROM 5 | | MILS TO DWDF |
| 0047 | | 1 010 010 000 | | ROM 5 | | DWDF TO MILS |
| 0050 | 0120 | 0 101 000 011 | | BRN | EEX | ENTER EXP ROUTINE |
| 0051 | 0331 | 1 101 100 111 | | BRN | ERR1 | TABLE NUMBER ERROR |
| 0052 | | 1 001 000 100 | COS0 | SS9 | | |
| 0053 | | 0 101 000 100 | SIN0 | SS5 | | |
| 0054 | | 0 001 000 100 | TAN0 | SS1 | | |
| 0055 | 0223 | 1 001 001 111 | SQT1 | BRN | SQT2 | |
| 0056 | | 0 000 101 110 | SQT3 | W.ZTB | | |
| 0057 | | 0 110 010 000 | | ROM 3 | | |
| 0060 | 0163 | 0 111 001 111 | | BRN | PRXY | PRINT X,Y ROUTINE |
| 0061 | | 1 100 010 000 | | ROM 6 | | PRINT R,A ROUTINE |
| 0062 | 0331 | 1 101 100 111 | | BRN | ERR1 | TABLE NUMBER ERROR |
| 0063 | 0331 | 1 101 100 111 | | BRN | ERR1 | TABLE NUMBER ERROR |
| 0064 | 0331 | 1 101 100 111 | | BRN | ERR1 | |
| 0065 | 0331 | 1 101 100 111 | | BRN | ERR1 | |
| 0066 | 0331 | 1 101 100 111 | | BRN | ERR1 | |
| 0067 | 0331 | 1 101 100 111 | | BRN | ERR1 | |
| 0070 | 0331 | 1 101 100 111 | | BRN | ERR1 | |
| 0071 | 0331 | 1 101 100 111 | | BRN | ERR1 | |
| 0072 | | 1 101 001 100 | ABS0 | PT13 | | ABSOLUTE VALIE ROUTINE |
| 0073 | | 0 011 000 010 | | P.ZTC | | CHANGE SIGN TO POSITIVE |
| 0074 | | 0 110 001 110 | | W.CTA | | |
| 0075 | 0332 | 1 101 101 011 | | BRN | OFL1 | |
| 0076 | | 1 011 001 110 | CHECK0 | W.SRA | | PROGRAM MODE STORE AND RECALL ROUTINE |
| 0077 | | 1 001 001 110 | | W.SRC | | FROM ROM 4 |
| 0100 | | 0 000 011 100 | | PRS | | |
| 0101 | | 0 001 101 100 | | YP1 | | |
| 0102 | 0076 | 0 011 111 011 | | BRN | CHECK0 | SHIFT RIGHT TO PT 0 |
| 0103 | 0263 | 1 011 001 111 | | BRN | CHECK | CONTINUE WITH MANUAL CHECK |
| 0104 | | 0 000 010 000 | SUPCA | ROM 0 | | GO TO SUPERVISOR WITHOUT CHECKING USERCODE |
| 0105 | | 0 000 010 000 | SUPA1 | ROM 0 | | GO TO SUPERVISOR |
| 0106 | | 0 010 101 000 | SET1 | CXM | | SET RETURN FLAG |
| 0107 | | 0 000 001 100 | | PT0 | | |
| 0110 | | 0 001 011 000 | | LDC1 | | |
| 0111 | | 0 010 101 000 | | CXM | | |
| 0112 | | 0 000 110 000 | | RETURN | | |
| 0113 | | 0 000 001 100 | TAB6 | PT0 | | |
| 0114 | | 1 100 101 000 | | ONR | | RESTORE 1ST TABLE NUMBER DIGIT |
| 0115 | | 1 110 100 010 | | P.AXC | | COMBINE TWO DIGITS |
| 0116 | | 1 110 101 110 | | W.AXC | | PUT TABLE NUMBER IN REGISTER A |
| 0117 | 0333 | 1 101 101 111 | | BRN | TAB2 | |
| 0120 | 0276 | 1 011 111 101 | EEX | JSB | ADDR | LOAD DATA STORAGE ADDRESS |
| 0121 | 0266 | 1 011 011 101 | | JSB | ADDR0 | REGISTER 0 ADDRESS |
| 0122 | | 0 010 101 000 | | CXM | | GET M FLAG |
| 0123 | | 1 000 010 000 | | ROM 4 | | CONTINUE IN ROM 4 |
| 0124 | | 0 000 000 000 | | DUMMY | | |
| 0125 | | 0 000 000 000 | | DUMMY | | |
| 0126 | | 0 111 001 100 | | PT7 | | SET POINTER FOR USERCODE |
| 0127 | | 0 100 011 000 | | LDC4 | | LOAD 4 AS USERCODE |
| 0130 | | 0 000 011 000 | | LDC0 | | LOAD 0 FOR COUNTER |
| 0131 | | 0 011 011 100 | | PT3 | | |
| 0132 | | 0 000 011 000 | | LDC0 | | LOAD OP CODE FOR ADD |
| 0133 | | 0 001 011 000 | | LDC1 | | |
| 0134 | | 0 010 101 000 | | CXM | | RESTORE M AND DATA |
| 0135 | 0276 | 1 011 111 101 | | JSB | ADDR | LOAD DATA STORAGE ADDRESS |
| 0136 | 0213 | 1 000 110 001 | | JSB | ADDR1 | DATA STARAGE 1 ADDRESS |
| 0137 | | 1 011 110 000 | | DTOS | | STORE ORIGINAL DATA |
| 0140 | 0323 | 1 101 001 111 | | BRN | EEX01 | GO TO STORE D REGISTER |
| 0141 | | 0 011 001 110 | EEX0 | W.ZTC | | CLEAR C |
| 0142 | | 0 100 101 000 | | CTS | | STORE 0 IN D |
| 0143 | | 1 001 111 010 | | XS.AM1 | | CHECK FOR NEGATIVE EXP |
| 0144 | 0164 | 0 111 010 011 | | BRN | EEX1 | YES, IT IS NEGATIVE,HCONVERT |

MATH/USER-DEFINABLE FUNCTION BLOCK LISTING (ROM B-1) – Continued

| CURR ADDR | BRAN ADDR | OPERATION CODE BIT PATTERN | | | | |
|---|---|---|---|---|---|---|
| 0145 | | 0 001 001 100 | EEX5 | PT1 | | NO, IT IS POSITIVE |
| 0146 | | 0 100 001 110 | EEX2 | W,SLA | | NORMALIZE EXPONENT |
| 0147 | | 0 000 111 100 | | PLS | | |
| 0150 | | 1 100 101 100 | | YP12 | | |
| 0151 | 0146 | 0 110 011 011 | | BRN | EEX2 | |
| 0152 | | 1 001 100 010 | | P,AM1 | | CHECK FOR LEADING ZERO |
| 0153 | 0210 | 1 000 100 011 | | BRN | EEX3 | NO ZERO |
| 0154 | | 0 100 010 010 | | WP,SLA | | ZERO, SHIFT LEFT ONE |
| 0155 | | 1 010 101 000 | EEX4 | MTC | | |
| 0156 | | 1 110 101 110 | | W,AXC | | DATA IN C , M IN A |
| 0157 | 0105 | 0 100 010 111 | | BRN | SUPA1 | GO TO SUPERVISOR |
| 0160 | | 0 000 010 000 | ENTRY | ROM 0 | | GO TO ROM 0 TO SAVE OLD USERCODE |
| 0161 | | 0 011 100 100 | | RS3 | | RETURN FROM ROM 0 RESET 3 |
| 0162 | 0172 | 0 111 101 011 | | BRN | ENTRY1 | |
| 0163 | | 1 100 010 000 | PRXY | ROM 6 | | PRINT X,Y ROUTINE IN ROM 6 |
| 0164 | | 1 110 101 110 | EEX1 | W,AXC | | PUT DATA IN C, 0 IN A |
| 0165 | | 0 101 001 010 | | X,AMCC | | COMPLIMENT EXP |
| 0166 | | 0 010 001 100 | | PT2 | | |
| 0167 | | 1 001 011 000 | | LDC9 | | LOAD NEGATIVE SIGN |
| 0170 | | 1 110 101 110 | | W,AXC | | PUT EXP IN A |
| 0171 | 0146 | 0 110 011 011 | | BRN | EEX2 | CONTINUE |
| 0172 | | 0 101 011 000 | ENTRY1 | LDC5 | | SET DIC TO 5 |
| 0173 | | 1 001 011 000 | | LDC9 | | SET ALIGNMENT SHIFT TO 9 |
| 0174 | | 0 111 001 100 | | PT7 | | |
| 0175 | | 0 011 011 000 | | LDC3 | | SET USERCODE TO 3 FOR POSSIBLE CANCEL |
| 0176 | | 0 010 101 000 | | CXM | | |
| 0177 | | 1 110 010 000 | PRINT1 | ROM 7 | | GO TO PRINT "ENTER ANGLE" |
| 0200 | | 1 110 010 000 | PRINT | ROM 7 | | |
| 0201 | | 1 100 010 000 | POLAR0 | ROM 6 | | TO POLAR ROUTINE IN ROM 6 |
| 0202 | | 1 100 010 000 | RECT0 | ROM 6 | | TO RECT ROUTINE IN ROM 6 |
| 0203 | | 1 100 010 000 | ACC+0 | ROM 6 | | ACCUMULATE + ROUTINE IN ROM 6 |
| 0204 | | 1 100 010 000 | ACC-0 | ROM 6 | | ACCUMULATE – ROUTINE IN ROM 6 |
| 0205 | | 1 101 100 010 | CHECK1 | P,AM1A | | IS 1ST DIGIT 5 |
| 0206 | 0331 | 1 101 100 111 | | BRN | ERR1 | NO, TABLE NUMBER ERROR |
| 0207 | 0216 | 1 000 111 011 | | BRN | RECAL | YES, GO TO RECALL ROUTINE |
| 0210 | | 1 111 101 010 | EEX3 | X,AP1A | | ADD 1 TO EXP OF NORMALIZED EXP |
| 0211 | 0155 | 0 110 110 111 | | BRN | EEX4 | CONTINUE |
| 0212 | | 0 100 011 000 | ADDR4 | LDC4 | | |
| 0213 | 0270 | 1 011 100 011 | | BRN | ADDRC | LOAD DATA STORAGE 4 ADDRESS |
| 0214 | | 0 001 011 000 | ADDR1 | LDC1 | | LOAD DATASTORAGE 1 ADDRESS |
| 0215 | 0270 | 1 011 100 011 | | BRN | ADDRC | CONTINUE |
| 0216 | | 0 100 010 000 | RECAL | ROM 2 | | GO TO RECALL ROUTINE |
| 0217 | | 0 100 010 000 | STORE | ROM 2 | | GO TO STORE ROUTINE |
| 0220 | | 1 000 100 100 | ACC- | RS8 | | |
| 0221 | 0204 | 1 000 010 011 | | BRN | ACC-0 | |
| 0222 | | 0 000 110 000 | | RETURN | | |
| 0223 | | 0 000 001 100 | SQT2 | PT0 | | |
| 0224 | | 0 010 101 000 | | CXM | | |
| 0225 | | 0 011 011 000 | | LDC3 | | SET TRIG AND SQRT RETURN FLAG |
| 0226 | | 0 010 101 000 | | CXM | | |
| 0227 | | 1 100 001 100 | | PT12 | | |
| 0230 | | 0 110 001 110 | | W,CTA | | |
| 0231 | 0056 | 0 010 111 011 | | BRN | SQT3 | |
| 0232 | | 0 100 010 000 | TAB1 | ROM 2 | | |
| 0233 | | 0 000 101 110 | ADD3 | W,ZTB | | ADDITION ROUTINE |
| 0234 | | 1 111 111 010 | | XS,AP1A | | |
| 0235 | | 1 111 111 010 | | XS,AP1A | | |
| 0236 | | 0 111 111 010 | | XS,CP1C | | |
| 0237 | | 0 111 111 010 | | XS,CP1C | | |
| 0240 | | 0 001 001 010 | | X,AMC | | |
| 0241 | 0243 | 1 010 001 111 | | BRN | ADD4 | |
| 0242 | | 1 110 101 110 | | W,AXC | | |
| 0243 | | 1 110 100 110 | ADD4 | M,AXC | | |
| 0244 | 0250 | 1 010 100 011 | | BRN | ADDD | |
| 0245 | | 1 000 010 000 | MPY11 | ROM 4 | | |
| 0246 | | 0 101 001 010 | DIV11 | X,AMCC | | |
| 0247 | | 1 000 010 000 | | ROM 4 | | |
| 0250 | | 0 110 100 110 | ADDD | M,ZMC | | |
| 0251 | 0253 | 1 010 101 111 | | BRN | ADD5 | |
| 0252 | | 1 110 101 110 | | W,AXC | | |
| 0253 | | 1 000 100 110 | ADD5 | M,BXC | | |
| 0254 | | 0 001 001 010 | ADD6 | X,AMC | | |
| 0255 | 0276 | 1 011 111 011 | | BRN | ADD7 | |
| 0256 | | 1 010 001 110 | | W,SRB | | |
| 0257 | | 1 111 101 010 | | X,AP1A | | |
| 0260 | | 0 000 001 110 | | W,ZMB | | |
| 0261 | 0276 | 1 011 111 011 | | BRN | ADD7 | |
| 0262 | 0254 | 1 010 110 011 | | BRN | ADD6 | |
| 0263 | | 1 101 000 010 | CHECK | P,AMCA | | CHECK WHETHER 1ST TAB DIGIT IS 4 |
| 0264 | | 1 101 100 010 | | P,AM1A | | |
| 0265 | 0205 | 1 000 010 111 | | BRN | CHECK1 | NO, CONTINUE CHECK |
| 0266 | 0217 | 1 000 111 111 | | BRN | STORE | YES, GO TO STORE ROUTINE |
| 0267 | | 0 000 011 000 | ADDR0 | LDC0 | | |
| 0270 | | 1 001 110 000 | ADDRC | ATDS | | |
| 0271 | | 0 010 001 110 | | W,BTC | | |
| 0272 | | 0 000 110 000 | | RETURN | | |
| 0273 | 0320 | 1 101 000 011 | | BRN | ERROR | |
| 0274 | | 1 110 101 110 | | W,AXC | | PUT DATA IN A |
| 0275 | 0305 | 1 100 010 111 | | BRN | EEX9 | CONTINUE EXP ROUTINE |
| 0276 | | 0 110 010 000 | ADD7 | ROM 3 | | |
| 0277 | | 1 000 101 110 | ADDR | W,BXC | | LOAD DS ADDRESS ROUTINE |
| 0300 | | 0 011 001 110 | | W,ZTC | | |
| 0301 | | 0 111 101 110 | | W,CP1C | | |
| 0302 | | 1 100 001 100 | | PT12 | | |
| 0303 | | 1 010 011 000 | | LDC10 | | |
| 0304 | | 0 000 110 000 | | RETURN | | |
| 0305 | 0276 | 1 011 111 101 | EEX9 | JSB | ADDR | |
| 0306 | 0211 | 1 000 101 001 | | JSB | ADDR4 | LOAD DATA STORAGE 4 ADDRESS |
| 0307 | | 1 011 111 000 | | DSTC | | RELOAD OLD D REGISTER |
| 0310 | | 0 100 101 000 | | CTS | | RESTORE OLD D REGISTER |
| 0311 | 0276 | 1 011 111 101 | | JSB | ADDR | |
| 0312 | 0266 | 1 011 011 101 | | JSB | ADDR0 | LOAD DATA STORAGE ADDRESS |
| 0313 | | 1 011 111 000 | | DSTC | | RELOAD ORIGINAL M VECTOR |
| 0314 | | 0 010 101 000 | | CXM | | REPLACE M |
| 0315 | 0276 | 1 011 111 101 | | JSB | ADDR | |
| 0316 | 0213 | 1 000 110 001 | | JSB | ADDR1 | LOAD DATA STORAGE 1 ADDRESS |
| 0317 | 0376 | 1 111 111 011 | | BRN | EEX10 | GO TO ROM 4 TO FINISH ROUTINE |
| 0320 | 0276 | 1 011 111 101 | ERROR | JSB | ADDR | |
| 0321 | 0266 | 1 011 011 101 | | JSB | ADDR0 | LOAD DATA STORAGE SDDRESS |

MATH/USER-DEFINABLE FUNCTION BLOCK LISTING (ROM B-1)—Continued

| CURR ADDR | BRAN ADDR | OPERATION CODE BIT PATTERN | | | | |
|---|---|---|---|---|---|---|
| 0322 | 0377 | 1 111 111 111 | | BRN | ERROR2 | |
| 0323 | | 0 110 101 000 | EEX01 | STA | | LOAD D REGISTER TO A |
| 0324 | | 1 110 101 110 | | W.AXC | | PUT IT IN C |
| 0325 | 0276 | 1 011 111 101 | | JSR | ADDR | |
| 0326 | 0211 | 1 000 101 001 | | JSR | ADDR4 | LOAD DATA STORAGE 4 ADDRESS |
| 0327 | | 1 011 110 000 | | DTDS | | STORE D IN DS 2 |
| 0330 | 0141 | 0 110 000 111 | | BRN | EEX0 | CONTINUE |
| 0331 | | 1 110 010 000 | ERR1 | ROM 7 | | |
| 0332 | | 0 100 010 000 | OFL1 | ROM 2 | | |
| 0333 | | 0 001 001 100 | TAB2 | PT1 | | |
| 0334 | | 0 100 011 000 | | LDC4 | | LOAD 4 TO CHECK TABLE NUMBER |
| 0335 | | 0 001 001 100 | | PT1 | | |
| 0336 | | 0 001 000 010 | | P.AMC | | IS FIRST DIGIT GREATER THAN 4 |
| 0337 | 0263 | 1 011 001 111 | | BRN | CHECK | YES. CHECK WHETHER ITS STORE OR RECALL |
| 0340 | | 0 100 001 110 | TAB3 | W.SLA | | SHIFT LEFT ONE |
| 0341 | | 0 000 111 100 | | PLS | | INCREMENT COUNTER |
| 0342 | | 1 101 101 100 | | YP13 | | IS COUNTER 13 |
| 0343 | 0340 | 1 110 000 011 | | BRN | TAB3 | NO. CONTINUE SHIFT |
| 0344 | | 0 000 010 000 | | ROM 0 | | GO TO CHECK PRINT ON COMMAND FLAG |
| 0345 | | 1 110 101 110 | TAB5 | W.AXC | | |
| 0346 | | 0 111 110 000 | | CTT | | LOAD TO C AND T |
| 0347 | | 0 101 000 000 | | IS2 | | |
| 0350 | | 0 100 101 000 | | IXT | | EXCHANGE T WITH I/O REGISTER |
| 0351 | | 1 001 000 000 | | IS1 | | |
| 0352 | | 0 010 001 110 | | W.BTC | | |
| 0353 | | 1 010 100 000 | | SBL | | SET BUSY LIGHT |
| 0354 | | 0 001 010 000 | | EERA | | EXTERNAL ROM ADDRESS ENTRY |
| 0355 | | 0 100 001 110 | TAB4 | W.SLA | | SHIFT LEFT ONE |
| 0356 | | 0 010 101 000 | | CXM | | RESTORE FLAG VECTOR |
| 0357 | | 1 110 101 110 | | W.AXC | | |
| 0360 | | 0 100 101 000 | | CTS | | STORE FIRST DIGIT |
| 0361 | | 0 010 001 110 | | W.BTC | | RESTORE C |
| 0362 | 0105 | 0 100 010 111 | | BRN | SUPA1 | |
| 0363 | 0200 | 1 000 000 011 | | BRN | PRINT | GO TO PRINT TABLE NUMBER FROM ROM 0 |
| 0364 | | 0 101 100 010 | | P.CMIC | | IS DIC 4 |
| 0365 | 0232 | 1 001 101 011 | | BRN | TAB1 | NO.CONTINUE CHECK |
| 0366 | | 1 010 001 100 | | PT10 | | |
| 0367 | | 0 010 101 000 | | CXM | | GET COUNTER IN FLAG VECTOR |
| 0370 | | 0 101 100 010 | | P.CMIC | | DECREASE COUNTER |
| 0371 | 0355 | 1 110 110 111 | | BRN | TAB4 | COUNTER GREATER THAN 0? |
| 0372 | | 1 011 001 100 | | PT11 | | NO.SET DIC TO 0 |
| 0373 | | 0 000 011 000 | | LDC0 | | |
| 0374 | | 0 010 101 000 | | CXM | | |
| 0375 | 0113 | 0 100 101 111 | | BRN | TAB6 | |
| 0376 | | 1 000 010 000 | EEX10 | ROM 4 | | GO TO ROM 4 TOFINISH ROUTINE |
| 0377 | | 1 000 010 000 | ERROR2 | ROM 4 | | GO TO ERROR ROUTINE |

MATH/USER-DEFINABLE FUNCTION BLOCK LISTING (ROM B-2)

| CURR ADDR | BRAN ADDR | OPERATION CODE BIT PATTERN | | | | |
|---|---|---|---|---|---|---|
| 0000 | 0002 | 0 000 001 011 | | BRN | DISP2 | NO. CONTINUE |
| 0001 | | 1 001 011 000 | | LDC9 | | YES. BLANK IT |
| 0002 | | 0 011 001 100 | DISP2 | PT3 | | BLANK DIGITS 2 AND 3 |
| 0003 | | 1 001 011 000 | | LDC9 | | |
| 0004 | | 0 000 011 000 | | LDC0 | | |
| 0005 | | 1 001 100 010 | | P.AM1 | | IS DIGIT U ZERO |
| 0006 | 0010 | 0 000 100 011 | | BRN | DISP3 | NO. CONTINUE |
| 0007 | | 1 001 011 000 | | LDC9 | | YES. BLANK IT |
| 0010 | | 1 000 101 110 | DISP3 | W.BXC | | RESTORE DATA |
| 0011 | | 0 000 101 000 | | DSTO | | DISPLAY ON |
| 0012 | | 0 000 110 000 | | RETURN | | |
| 0013 | | 1 011 110 000 | STORE3 | DTDS | | |
| 0014 | 0256 | 0 010 111 011 | | BRN. | OPUT | |
| 0015 | 0027 | 0 001 011 111 | | BRN | OFLL0 | |
| 0016 | | 1 010 010 000 | DTRD | ROM 5 | | GO BACK TO ANGLE CONVERSION |
| 0017 | | 1 011 111 000 | RECALL | DSTC | | LOAD DATA TO C |
| 0020 | 0256 | 0 010 111 011 | | BRN | OPUT | GO TO OUTPUT |
| 0021 | 0164 | 0 111 010 011 | | BRN | PI1 | LOAD PI ROUTINE |
| 0022 | 0166 | 0 111 011 011 | | BRN | INT1 | INTEGER ROUTINE |
| 0023 | | 0 000 110 000 | | RETURN | | |
| 0024 | | 0 011 010 100 | OFL0 | YS3 | | CHECK FOR LOAD PI FLAG |
| 0025 | 0136 | 0 100 011 011 | | BRN | OFL01 | |
| 0026 | 0016 | 0 000 111 011 | | BRN | DTRD | |
| 0027 | | 0 000 110 100 | OFLL0 | CLS | | |
| 0030 | | 0 111 000 100 | | SS7 | | |
| 0031 | | 0 001 100 110 | OFLL1 | M.CM1 | | MANTISSA ZERO? |
| 0032 | 0034 | 0 001 110 011 | | BRN | OFL2 | NO. CONTINUE TEST |
| 0033 | 0045 | 0 010 010 111 | | BRN | OFL4 | YES. SET RESULT TO ZERO |
| 0034 | | 0 110 111 010 | OFL2 | XS.ZMC | | CHECK SIGN OF EXPONENT |
| 0035 | 0105 | 0 100 010 111 | | BRN | SUPA20 | RESULT OK |
| 0036 | | 0 010 101 010 | | X.ZMCC | | SIGN CODE DECREMENT |
| 0037 | | 0 101 111 010 | | XS.CMIC | | CONTINUE TEST. EXPONENT COMPLEMENTED |
| 0040 | 0043 | 0 010 001 111 | | BRN | OFL3 | NO CARRY. TROUBLE |
| 0041 | | 1 110 101 110 | | W.AXC | | CARRY. RESULT OK |
| 0042 | 0105 | 0 100 010 111 | | BRN | SUPA20 | |
| 0043 | | 0 001 111 010 | OFL3 | XS.CM1 | | |
| 0044 | 0047 | 0 010 011 111 | | BRN | OFL5 | NO CARRY. OVERFLOW |
| 0045 | | 0 011 001 110 | OFL4 | W.ZTC | | CARRY. UNDERFLOW. RESULT SET TO ZERO |
| 0046 | 0105 | 0 100 010 111 | | BRN | SUPA20 | GO TO SUPERVISOR |
| 0047 | | 0 011 001 110 | OFL5 | W.ZTC | | |
| 0050 | | 0 101 101 110 | | W.CMIC | | SET ALL 9'S |
| 0051 | | 0 010 001 100 | | PT2 | | |
| 0052 | | 0 000 011 000 | | LDC0 | | SET EXPONENT SIGN TO POSITIVE |
| 0053 | | 1 101 001 100 | | PT13 | | |
| 0054 | | 0 000 011 000 | | LDC0 | | SET MANTISSA SIGN TO POSITIVE |
| 0055 | 0132 | 0 100 001 011 | | BRN . | PRINT1 | PRINT ERROR MESSAGE FOR OVERFLOW |
| 0056 | | 0 010 101 000 | OPUT | CXM | | OUTPUT SYBOL FOR STORE AND RECALL |
| 0057 | 0156 | 0 110 111 011 | | BRN | OPUT1 | GO TO CHECK OP MODE |
| 0060 | | 1 011 111 110 | NRM21 | S.ZTA | | |
| 0061 | | 1 100 001 100 | | PT12 | | |

MATH/USER-DEFINABLE FUNCTION BLOCK LISTING (ROM B-2)—Continued

| CUPR ADDR | BRAM ADDR | OPERATION CODE BIT PATTERN | | | | |
|---|---|---|---|---|---|---|
| 0062 | | 0 000 101 110 | | W.ZTB | | |
| 0063 | | 1 001 100 010 | NRM23 | P.AM1 | | |
| 0064 | 0072 | 0 011 101 011 | | BRN | NRM24 | |
| 0065 | | 0 100 001 110 | | W.SLA | | |
| 0066 | | 0 101 101 010 | | X.CM1C | | |
| 0067 | | 1 001 101 110 | | W.AM1 | | |
| 0070 | 0063 | 0 011 001 111 | | BRN | NRM23 | |
| 0071 | | 0 011 001 110 | | W.ZTC | | |
| 0072 | | 0 100 101 010 | NRM24 | X.ATB | | |
| 0073 | | 1 110 001 110 | | W.APRA | | |
| 0074 | | 1 001 111 110 | | S.AM1 | | |
| 0075 | 0225 | 1 001 010 111 | | BRN | MPY28 | |
| 0076 | | 1 110 100 110 | | M.AXC | | |
| 0077 | | 0 110 001 110 | NRM25 | W.CTA | | |
| 0100 | | 0 000 101 110 | | W.ZTB | | |
| 0101 | | 1 000 010 000 | NRM26 | ROM 4 | | |
| 0102 | | 1 110 010 000 | PRINT1 | ROM 7 | | PRINT OVERFLOW MEASSGE |
| 0103 | | 0 001 100 100 | SQRT1 | RS1 | | |
| 0104 | 0216 | 1 000 111 011 | | BRN | SQRT | RETURN AFTER SQRT |
| 0105 | | 0 000 010 000 | SUPA20 | ROM 0 | | |
| 0106 | | 0 010 010 100 | OFL01 | YS2 | | |
| 0107 | 0027 | 0 001 011 111 | | BRN | OFLL0 | |
| 0110 | | 0 010 100 100 | | RS2 . | | |
| 0111 | | 0 000 001 100 | | PT0 | | |
| 0112 | | 0 010 101 000 | | CXM | | |
| 0113 | | 0 110 011 000 | | LDC6 | | |
| 0114 | | 0 010 101 000 | | CXM | | |
| 0115 | | 1 001 010 100 | | YS9 | | |
| 0116 | 0121 | 0 101 000 111 | | BRN | A0 | |
| 0117 | | 1 001 100 100 | | RS9 | | |
| 0120 | 0214 | 1 000 110 011 | | BRN | COS | |
| 0121 | | 0 101 010 100 | A0 | YS5 | | |
| 0122 | 0125 | 0 101 010 111 | | BRN | A1 | |
| 0123 | | 0 101 100 100 | | RS5 | | |
| 0124 | 0213 | 1 000 101 111 | | BRN | SIN | |
| 0125 | | 1 010 010 100 | A1 | YS10 | | |
| 0126 | 0103 | 0 100 001 111 | | BRN | SQRT1 | |
| 0127 | | 1 010 100 100 | | RS10 | | |
| 0130 | 0215 | 1 000 110 111 | | BRN | ATAN1 | |
| 0131 | | 0 110 100 100 | RECAL | RS6 | | |
| 0132 | 0134 | 0 101 110 011 | | BRN | STORE1 | |
| 0133 | | 0 110 000 100 | STORE | SS6 | | |
| 0134 | | 0 000 001 100 | STORE1 | PT0 | | |
| 0135 | | 0 100 001 110 | STORE0 | W.SLA | | |
| 0136 | | 0 000 111 100 | | PLS | | SHIFT ENTER DS REGISTER NUMBER TO PT11 |
| 0137 | | 1 011 101 100 | | YP11 | | |
| 0140 | 0135 | 0 101 110 111 | | BRN | STORE0 | |
| 0141 | | 0 011 001 110 | | W.ZTC | | |
| 0142 | | 1 100 001 100 | | PT12 | | LOAD DS ADDRESS |
| 0143 | | 0 111 101 110 | | W.CP1C | | |
| 0144 | | 1 010 011 000 | | LOC10 | | |
| 0145 | 0152 | 0 110 100 011 | | BRN | STORE2 | |
| 0146 | | 0 000 000 000 | | DUMMY | | |
| 0147 | | 0 000 010 000 | SUPRA | ROM 0 | | GO TO SUPERVISOR A WITHOUT DISPLAY |
| 0150 | | 1 110 100 010 | STORE2 | P.AXC | | LOAD DS REGISTER ADDRESS |
| 0151 | | 1 001 110 000 | | ATDS. | | |
| 0152 | | 1 000 101 110 | | W.BXC | | YES, RESTORE C SAVE DS ADDRESS |
| 0153 | | 0 110 010 100 | | YS6 | | |
| 0154 | 0017 | 0 000 111 111 | | BRN | RECAL1 | NO, GO TO RECALL |
| 0155 | 0213 | 0 000 101 111 | | BRN | STORE3 | |
| 0156 | | 1 100 001 100 | OPUT1 | PT12 | | |
| 0157 | | 0 001 100 010 | | P.CM1 | | PROGRAM MODE? |
| 0160 | 0223 | 1 001 001 111 | | BRN | SUPA4 | YES, GO TO SUPERVISOR |
| 0161 | 0221 | 1 001 000 111 | | BRN | OPUT2 | NO, GO TO PRINT SYMBOL |
| 0162 | | 0 000 000 000 | | DUMMY | | |
| 0163 | | 0 000 010 000 | PRINT3 | ROM 0 | | GO TO RESTORE USERCODE IN ROM 0 |
| 0164 | | 0 001 100 100 | PI1 | RS1 | | |
| 0165 | | 0 110 010 000 | | ROM 3 | | LOAD PI IN ROM 3 |
| 0166 | | 0 110 001 110 | INT1 | W.CTA | | STORE ORIGINAL DATA |
| 0167 | | 0 010 001 100 | | PT2 | | |
| 0170 | | 0 001 100 010 | | P.CM1 | | CHECK WHETHER EXPONENT IS NEGATIVE |
| 0171 | 0211 | 1 000 100 111 | | BRN | INT2 | YES, SET VALUE TO ZERO |
| 0172 | | 0 001 001 100 | | PT1 | | NO, CHECK IF EXPONENT IS GREATER THAN 10 |
| 0173 | | 0 001 100 010 | | P.CM1 | | |
| 0174 | 0105 | 0 100 010 111 | | BRN | SUPA20 | YES, DO NOTHING |
| 0175 | | 0 000 001 100 | | PT0 | | CHECK IF EXPONENT IS LESS THAN 10 |
| 0176 | | 0 001 100 010 | | P.CM1 | | BUT GREATER THAN ZERO |
| 0177 | 0202 | 1 000 001 011 | | BRN | INT4 | YES, PREPARE TO ZERO DIGITS |
| 0200 | | 1 011 001 100 | | PT11 | | NO, EXPONENT IS ZERO |
| 0201 | 0206 | 1 000 011 011 | | BRN | INT6 | ZERO ALL DIGITS EXCEPT THE FIRST |
| 0202 | | 1 100 001 100 | INT4 | PT12 | | |
| 0203 | | 0 000 011 100 | INT5 | PRS | | SET POINTER |
| 0204 | | 0 101 101 010 | | X.CM1C | | ZERO DIGIT AFTER DECIMAL POINT |
| 0205 | 0203 | 1 000 001 111 | | BRN | INT5 | |
| 0206 | | 0 011 010 010 | INT6 | WP.ZTC | | |
| 0207 | | 1 110 101 010 | | X.AXC | | RESTORE ORIGINAL EXPONENT |
| 0210 | 0105 | 0 100 010 111 | | BRN | SUPA20 | |
| 0211 | | 0 011 001 110 | INT2 | W.ZTC | | |
| 0212 | 0105 | 0 100 010 111 | | BRN | SUPA20 | |
| 0213 | | 1 100 010 000 | SIN | ROM 6 | | RETURN IN ROM 6 |
| 0214 | | 1 100 010 000 | COS | ROM 6 | | RETURN IN ROM 6 |
| 0215 | | 1 100 010 000 | ATAN1 | ROM 6 | | RETURN IN ROM 6 |
| 0216 | | 1 100 010 000 | SQRT | ROM 6 | | RETURN IN ROM 6 |
| 0217 | 0131 | 0 101 100 111 | | BRN | RECAL | NO, RECAL |
| 0220 | 0133 | 0 101 101 111 | | BRN | STORE | YES, STORE |
| 0221 | | 0 010 101 000 | OPUT2 | CXM | | |
| 0222 | 0245 | 1 010 010 111 | | BRN | OPUT3 | GO TO PRINT SYMBOL IN ROM 7 |
| 0223 | | 0 010 101 000 | SUPA4 | CXM | | |
| 0224 | 0227 | 1 001 011 111 | | BRN | SUPA41 | |
| 0225 | | 1 000 010 000 | MPY28 | ROM 4 | | |
| 0226 | 0060 | 0 011 000 011 | | BRN | NRM21 | |
| 0227 | | 0 000 110 100 | SUPA41 | CLS | | |
| 0230 | | 0 111 000 100 | | SS7 | | |
| 0231 | 0105 | 0 100 010 111 | | BRN | SUPA20 | GO TO SUPERVISOR |
| 0232 | | 0 010 010 000 | ADD31 | ROM 1 | | GO TO ADD ROUTINE |
| 0233 | | 0 101 100 010 | | P.CM1C | | IS DIC 5 |
| 0234 | 0105 | 0 100 010 111 | | BRN | SUPA20 | |

MATH/USER-DEFINABLE FUNCTION BLOCK LISTING (ROM B-2) – Continued

| CURR ADDR | BRAM ADDR | OPERATION CODE BIT PATTERN | | | | |
|---|---|---|---|---|---|---|
| 0235 | 0247 | 1 010 011 111 | | BRN | ENTRY | |
| 0236 | | 0 010 101 000 | PRINT2 | CXM | | |
| 0237 | | 1 000 101 110 | | W.BXC | | |
| 0240 | | 1 010 101 000 | | MTC | | |
| 0241 | | 1 110 101 110 | | W.AXC | | PUT M IN A FOR RESTORE ROUTINE |
| 0242 | | 1 000 101 110 | | W.BXC | | RESTORE C |
| 0243 | 0163 | 0 111 001 111 | | BRN | PRINT3 | |
| 0244 | | 0 000 000 000 | | DUMMY | | |
| 0245 | | 1 000 101 110 | OPUT3 | W.BXC | | PUT DS ADDRESS IN C. DATA IN B |
| 0246 | | 1 110 010 000 | | ROM 7 | | PRINT SYMBOL AND DATA IN ROM 7 |
| 0247 | | 0 010 001 110 | ENTRY | W.BTC | | |
| 0250 | | 0 000 001 100 | | PT0 | | |
| 0251 | | 1 110 100 010 | | P.AXC | | |
| 0252 | | 0 101 010 100 | | YS5 | | IS D.P. SET |
| 0253 | 0303 | 1 100 001 111 | | BRN | ENTRY2 | NO. ENTER DIGIT |
| 0254 | | 0 010 101 000 | | CXM | | YES. GET FLAG VECTOR |
| 0255 | | 0 110 001 110 | | W.CTA | | PREPARE TO CHECK IF M10 IS 9 |
| 0256 | | 1 010 001 100 | | PT10 | | |
| 0257 | | 0 110 011 000 | | LDC6 | | |
| 0260 | | 1 010 001 100 | | PT10 | | |
| 0261 | | 0 001 000 010 | | P.AMC | | |
| 0262 | 0273 | 1 011 101 111 | | BRN | ENTRY3 | M10 IS 9 |
| 0263 | | 0 010 011 000 | | LDC2 | | NO. PREPARE TO CHECK IF M10 IS 5 |
| 0264 | | 1 010 001 100 | | PT10 | | |
| 0265 | | 0 001 000 010 | | P.AMC | | |
| 0266 | 0301 | 1 100 000 111 | | BRN | ENTRY4 | M10 IS 5 |
| 0267 | | 1 011 001 100 | | PT11 | | NO |
| 0270 | | 0 000 011 000 | | LDC0 | | SET DIC TO 0 |
| 0271 | | 0 111 000 100 | | SS7 | | |
| 0272 | 0236 | 1 001 111 011 | | BRN | PRINT2 | |
| 0273 | | 0 101 011 000 | ENTRY3 | LDC5 | | SET M10 TO 5. ONE DECIMAL ENTERED |
| 0274 | | 0 010 101 000 | ENTRY5 | CXM | | RESTORE FLAG VECTOR |
| 0275 | | 0 110 001 110 | | W.CTA | | |
| 0276 | | 0 101 100 100 | | RS5 | | RESET D.P. FLAG |
| 0277 | 0352 | 1 110 101 101 | ENTR12 | JSB | DISP0 | GO TO DISPLAY |
| 0300 | 0147 | 0 110 011 111 | | BRN | SUPRA | |
| 0301 | | 0 001 011 000 | ENTRY4 | LDC1 | | SET M10 TO 1. TWO DECIMAL ENTERED |
| 0302 | 0274 | 1 011 110 011 | | BRN | ENTRY5 | |
| 0303 | | 1 000 101 110 | ENTRY2 | W.BXC | | |
| 0304 | | 1 010 101 000 | | MTC | | |
| 0305 | | 0 110 001 110 | | W.CTA | | |
| 0306 | | 1 010 001 100 | | PT10 | | PREPARE TO CHECK IF M10 IS 9 |
| 0307 | | 0 110 011 000 | | LDC6 | | |
| 0310 | | 1 010 001 100 | | PT10 | | |
| 0311 | | 0 001 000 010 | | P.AMC | | |
| 0312 | 0322 | 1 101 001 011 | | BRN | ENTRY7 | M10 IS 9 |
| 0313 | | 0 010 011 000 | | LDC2 | | PREPARE TO CHECK IF M10 IS 5 |
| 0314 | | 1 010 001 100 | | PT10 | | |
| 0315 | | 0 001 000 010 | | P.AMC | | |
| 0316 | 0325 | 1 101 010 111 | | BRN | ENTRY8 | M10 IS 5 |
| 0317 | | 1 100 101 110 | | W.AXB | | RESTORE ENTERED DATA |
| 0320 | | 0 010 001 100 | | PT2 | | SET POINTER TO 2 |
| 0321 | 0327 | 1 101 011 111 | | BRN | ENTRY9 | GO TO SHIFT ROUTINE |
| 0322 | | 1 100 101 110 | ENTRY7 | W.AXB | | RESTORE ENTERED DATA |
| 0323 | | 1 100 001 100 | | PT12 | | SET POINTER TO 12 |
| 0324 | 0327 | 1 101 011 111 | | BRN | ENTRY9 | GO TO SHIFT ROUTINE |
| 0325 | | 1 100 101 110 | ENTRY8 | W.AXB | | RESTORE ENTERED DATA |
| 0326 | | 0 110 001 100 | | PT6 | | SET POINTER TO 6 |
| 0327 | | 0 100 010 010 | ENTRY9 | WP.SLA | | SHIFT LEFT ONE |
| 0330 | | 1 100 101 100 | | YP12 | | |
| 0331 | 0336 | 1 101 111 011 | | BRN | ENTR10 | NO. CONTINUE CHECK |
| 0332 | 0334 | 1 101 110 011 | | BRN | ENTR | |
| 0333 | 0024 | 0 001 010 011 | | BRN | OFL0 | |
| 0334 | | 1 001 001 100 | ENTR | PT9 | | |
| 0335 | 0342 | 1 110 001 011 | | BRN | ENTR11 | SHIFT LEFT 8 PLACES |
| 0336 | | 0 110 101 100 | ENTR10 | YP6 | | IS POINTER 6 |
| 0337 | 0277 | 1 011 111 111 | | BRN | ENTR12 | NO. GO TO DISPLAY ROUTINE |
| 0340 | | 0 101 001 100 | | PT5 | | YES. SET POINTER TO 5 |
| 0341 | 0346 | 1 110 011 011 | | BRN | ENTR13 | SHIFT LEFT 4 PLACES |
| 0342 | | 0 100 010 010 | ENTR11 | WP.SLA | | |
| 0343 | | 0 100 010 010 | | WP.SLA | | |
| 0344 | | 0 100 010 010 | | WP.SLA | | |
| 0345 | | 0 100 010 010 | | WP.SLA | | |
| 0346 | | 0 100 010 010 | ENTR13 | WP.SLA | | |
| 0347 | | 0 100 010 010 | | WP.SLA | | |
| 0350 | | 0 100 010 010 | | WP.SLA | | |
| 0351 | | 0 100 010 010 | | WP.SLA | | |
| 0352 | 0277 | 1 011 111 111 | | BRN | ENTR12 | |
| 0353 | | 1 110 101 110 | DISP0 | W.AXC | | |
| 0354 | | 0 110 001 110 | | W.CTA | | |
| 0355 | | 1 011 001 110 | | W.SRA | | SHIFT RIGHT FOR DISPLAY FORMAT |
| 0356 | | 1 000 101 110 | | W.BXC | | STORE C |
| 0357 | | 0 011 001 110 | | W.ZTC | | PREPARE MASK |
| 0360 | | 1 100 001 100 | | PT12 | | BLANK DIGIT 12 |
| 0361 | | 1 001 011 000 | | LDC9 | | |
| 0362 | | 0 000 000 000 | | NOP | | |
| 0363 | | 1 001 100 010 | | P.AM1 | | IS DIGIT 11 ZERO? |
| 0364 | 0374 | 1 111 110 011 | | BRN | DISP1 | NO. CONTINUE |
| 0365 | | 1 001 011 000 | | LDC9 | | YES. BLANK IT |
| 0366 | | 1 001 100 010 | | P.AM1 | | IS DIGIT 10 ZERO |
| 0367 | 0374 | 1 111 110 011 | | BRN | DISP1 | NO. CONTINUE |
| 0370 | | 1 001 011 000 | | LDC9 | | YES. BLANK IT |
| 0371 | | 1 001 100 010 | | P.AM1 | | IS DIGIT 9 ZERO |
| 0372 | 0374 | 1 111 110 011 | | BRN | DISP1 | NO. CONTINUE |
| 0373 | | 1 001 011 000 | | LDC9 | | YES. BLANK IT |
| 0374 | | 0 111 001 100 | DISP1 | PT7 | | BLANK DIGIT 6 AND 7 |
| 0375 | | 1 001 011 000 | | LDC9 | | |
| 0376 | | 1 001 011 000 | | LDC9 | | |
| 0377 | | 1 001 100 010 | | P.AM1 | | IS DIGIT #5 ZERO |

MATH/USER-DEFINABLE FUNCTION BLOCK LISTING (ROM B-3)

```
CURR  BRAN   OPERATION CODE
ADDR  ADDR   BIT PATTERN

0000  0363  1 111 001 111            BRN     TAN13
0001        1 100 101 110  TAN15     W,AXB
0002  0047  0 010 100 001            JSB     TNM11      NORMALIZE DATA
0003        0 110 101 000            STA
0004  0047  0 010 100 001            JSB     TNM11
0005        0 110 101 000            STA
0006        1 001 010 100            YS9                SEE WHETHER COS IS ASKED
0007  0011  0 000 100 111            BRN     TAN16
0010        1 110 101 110            W,AXC
0011        0 101 010 100  TAN16     YS5
0012  0022  0 001 001 011            BRN     ASN12      FORM TAN BY DIVISION OR
0013        0 011 011 110            S,ZTC              PREPARE TO FORM SIN OR COS
0014  0245  1 010 011 001            JSB     DIV11
0015        0 100 101 000  ASN11     CTS                CALCULATE SIN OR COS FROM
0016  0244  1 010 010 101            JSB     MPY11      TANGENT, OR FORM ARC TAN
0017  0227  1 001 100 001            JSB     ADD10      FROM ARC SIN RO ARCCOS
0020  0244  0 010 010 101            JSB     SQT11
0021        0 110 101 000            STA
0022  0245  1 010 011 001  ASN12     JSB     DIV11
0023        1 010 010 100            YS10
0024  0332  1 101 101 011            BRN     RTN12      SIN RO COS OUTPUT
0025        1 011 101 110  ATN11     W,ZTA              ARC TAN ROUTINE
0026        1 111 100 010            P,APIA             ATN11 TO ATN13 PREPARE DATA
0027        0 100 100 110            M,ATB              FOR FINDING MULTIPLIERS OF
0030        1 110 100 110            M,AXC              TAN 0 WHERE TAN 0=10+-N
0031        0 101 101 010  ATN12     X,CMIC             N FROM 0 TO 4
0032        1 010 010 010            WP,SRA
0033        0 110 111 010            XS,ZMC
0034  0031  0 001 100 111            BRN     ATN12
0035        1 011 010 010  ATN13     WP,SRA             Y VALUE IS SET TO 1
0036        0 111 101 010            X,CPIC             X VALUE THE DATA VALUE
0037  0035  0 001 110 111            BRN     ATN13
0040        1 011 001 110            W,SRA
0041        1 010 001 110            W,SRA
0042        0 100 101 000            CTS
0043        1 000 101 110  ATN14     W,BXC
0044  0101  0 100 000 111            BRN     ATN18
0045        1 000 101 110  SQT11     W,BXC
0046        0 100 001 100            PT4
0047  0336  1 101 111 011            BRN     SQT14
0050        0 100 101 000  TNM11     CTS
0051        1 110 101 110            W,AXC
0052        0 110 100 010            P,ZMC
0053  0055  0 010 110 111            BRN     TNM12
0054        0 010 101 110            W,ZMCC
0055        0 110 001 110  TNM12     W,CTA
0056        0 010 001 010            X,BTC
0057  0313  1 100 101 111            BRN     ADD15
0060        0 110 001 110  STN11     W,CTA
0061        0 001 010 100            YS1
0062  0045  0 010 010 111            BRN     SQT11
0063        1 010 010 100            YS10
0064  0155  0 110 110 111            BRN     TAN12
0065        0 101 010 100            YS5
0066  0025  0 001 010 111            BRN     ATN11
0067        0 011 111 110            S,ZNCC
0070        1 110 111 110            S,AXC
0071  0015  0 000 110 111            BRN     ASN11
0072        1 010 010 010  ATN15     WP,SRB
0073        1 101 111 110  ATN16     S,AMIA
0074  0072  0 011 101 011            BRN     ATN15
0075        0 111 111 110            S,CPIC
0076        1 100 110 010            WP,AXB
0077        0 111 010 010            WP,APCC
0100        1 100 101 110            W,AXB
0101        0 100 101 110  ATN18     W,ATB              ATN14 TO ATN18 ACTUALLY
0102        1 101 010 010            WP,AMCA            FINDS THE MULTIPLIER
0103  0073  0 011 101 111            BRN     ATN16
0104        0 110 101 000            STA
0105        1 011 001 110            W,SRA
0106        1 110 110 010            WP,AXC
0107        1 100 101 110            W,AXB
0110        0 100 010 010            WP,SLA
0111        0 100 101 000            CTS
0112        1 111 111 110            S,APIA
0113        1 111 111 110            S,APIA
0114  0343  0 010 001 111            BRN     ATN14
0115        0 011 001 110            W,ZTC
0116        0 000 101 010            X,ZTB
0117        1 011 010 110            MS,SRA
0120  0251  1 011 001 001            JSB     DIV14
0121        0 101 100 010            P,CMIC
0122        0 110 101 000            STA
0123        1 110 101 110            W,AXC
0124        0 100 001 100            PT4
0125  0243  1 010 010 001  ATN17     JSB     PQ013
0126        0 110 001 100            PT6                FORM TAN10+-4 X FIND PSEUDO MULTIPLIER
0127  0232  1 001 101 101            JSB     PMU11
0130        1 000 001 100            PT8
0131  0232  1 001 101 101            JSB     PMU11      FORM TAN10+-3 X FIND PSEUDO MULTIPLIER
0132        0 010 001 100            PT2
0133        1 000 011 000            LDC8
0134        1 010 001 100            PT10
0135  0232  1 001 101 101            JSB     PMU11      FORM TAN 10+-2 X FIND PSFUDO MULTIPLIER
0136  0215  1 000 111 001            JSB     ATC01
0137  0232  1 001 101 101            JSB     PMU11      FORM TAN 10+-1 X FIND PSFUDO MULTIPLIER
0140  0313  1 100 110 001            JSB     ATC1       LOAD PI/4=TAN1 X FORM
0141        0 100 001 110            W,SLA              PSEUDO MULTIPLIER
0142  0232  1 001 101 101            JSB     PMU11
0143        0 010 001 110            W,BTC
0144  0312  1 100 101 101            JSB     ADD15
0145  0313  1 100 110 001            JSB     ATC1
```

MATH/USER-DEFINABLE FUNCTION BLOCK LISTING (ROM B-3) – Continued

| CURR ADDR | BRAN ADDR | OPERATION CODE BIT PATTERN | LABEL | OPERATION | OPERAND | COMMENT |
|---|---|---|---|---|---|---|
| 0146 | | 1 010 101 110 | | W.CPCC | | CONVERSION FROM RADIAN |
| 0147 | 0245 | 1 010 011 001 | | JSB | DIV11 | TO DEGREE |
| 0150 | | 1 001 010 100 | | YS9 | | |
| 0151 | 0154 | 0 110 110 011 | | BRN | ATN19 | |
| 0152 | | 0 011 111 110 | | S.ZNCC | | |
| 0153 | 0227 | 1 001 100 001 | | JSB | ADD10 | |
| 0154 | | 0 001 100 100 | ATN19 | RS1 | | |
| 0155 | | 0 011 001 110 | TAN12 | W.ZTC | | BEGINNING OF TANGENT |
| 0156 | | 0 101 100 010 | | P.CMIC | | ROUTINE. CONVERSION |
| 0157 | | 0 111 101 010 | | X.CPIC | | OF DEGREE TO RADIAN |
| 0160 | | 0 001 010 100 | | YS1 | | |
| 0161 | 0245 | 1 010 010 111 | | BRN | MPY11 | |
| 0162 | 0245 | 1 010 011 001 | | JSB | DIV11 | |
| 0163 | 0313 | 1 100 110 001 | | JSB | ATC1 | |
| 0164 | | 1 010 101 110 | | W.CPCC | | |
| 0165 | 0244 | 1 010 010 101 | | JSB | MPY11 | |
| 0166 | 0313 | 1 100 110 001 | LPI11 | JSB | ATC1 | LOAD PI/4 |
| 0167 | | 1 010 101 110 | | W.CPCC | | |
| 0170 | | 1 010 101 110 | | W.CPCC | | PI |
| 0171 | 0224 | 1 001 010 101 | | JSB | RTN11 | |
| 0172 | | 1 010 101 110 | | W.CPCC | | LOAD 2 PI |
| 0173 | 0352 | 1 110 101 101 | | JSB | PRE11 | GET RID OF INTEGER CIRCLF |
| 0174 | 0313 | 1 100 110 001 | | JSB | ATC1 | LOAD PI/4 |
| 0175 | | 1 010 001 100 | | PT10 | | |
| 0176 | 0233 | 1 001 110 001 | | JSB | PQ011 | FORM PSEUDO QUOTIENT FOR TAN↑-1 1=PI/4 |
| 0177 | 0215 | 1 000 111 001 | | JSB | ATCD1 | |
| 0200 | | 1 000 001 100 | | PT8 | | |
| 0201 | 0234 | 1 001 110 101 | | JSB | PQ012 | FORM PSEUDO QUOTIENT FOR TAN↑-1 10↑-1 |
| 0202 | | 0 010 001 100 | | PT2 | | |
| 0203 | | 1 000 011 000 | | LOC8 | | |
| 0204 | | 0 110 001 100 | | PT6 | | |
| 0205 | 0233 | 1 001 110 001 | | JSB | PQ011 | FORM PSEUDO QUOTIENT FOR TAN↑-1 10↑-2 |
| 0206 | | 0 100 001 100 | | PT4 | | |
| 0207 | 0233 | 1 001 110 001 | | JSB | PQ011 | FORM PSEUDO QUOTIENT FOR TAN↑-1 10↑-3 |
| 0210 | 0233 | 1 001 110 001 | | JSB | PQ011 | FORM PSEUDO QUOTIENT FOR TAN↑-1 10↑-4 |
| 0211 | | 1 100 101 110 | | W.AXB | | |
| 0212 | | 1 001 001 110 | | W.SRC | | |
| 0213 | | 1 101 001 100 | | PT13 | | |
| 0214 | | 0 101 011 000 | | LOC5 | | |
| 0215 | 0373 | 1 111 101 111 | | BRN | TAN14 | |
| 0216 | | 0 110 001 100 | ATCD1 | PT6 | | |
| 0217 | | 1 000 011 000 | | LOC8 | | |
| 0220 | | 0 110 011 000 | | LOC6 | | |
| 0221 | | 0 101 011 000 | | LOC5 | | |
| 0222 | | 0 010 011 000 | | LOC2 | | |
| 0223 | | 0 100 011 000 | | LOC4 | | |
| 0224 | | 1 001 011 000 | | LOC9 | | |
| 0225 | | 0 001 010 100 | RTN11 | YS1 | | |
| 0226 | 0332 | 1 101 101 011 | | BRN | RTN12 | |
| 0227 | | 0 000 110 000 | | RETURN | | |
| 0230 | | 1 011 101 110 | ADD10 | W.ZTA | | |
| 0231 | | 1 111 100 010 | | P.APIA | | |
| 0232 | | 0 010 010 000 | ADD11 | ROM 1 | | |
| 0233 | | 1 000 010 000 | PMU11 | ROM 4 | | |
| 0234 | | 0 100 001 110 | PCO11 | W.SLA | | |
| 0235 | | 1 010 010 110 | PCO12 | MS.SRB | | |
| 0236 | | 1 000 101 110 | | W.BXC | | |
| 0237 | 0241 | 1 010 000 111 | | BRN | PQ016 | |
| 0240 | | 0 111 111 110 | PQ015 | S.CPIC | | |
| 0241 | | 1 100 001 110 | PQ016 | W.AMBA | | |
| 0242 | 0240 | 1 010 000 011 | | BRN | PQ015 | |
| 0243 | | 1 110 001 110 | | W.APBA | | |
| 0244 | | 1 000 010 000 | PQ013 | ROM 4 | | |
| 0245 | | 1 000 010 000 | MPY11 | ROM 4 | | |
| 0246 | | 0 101 001 010 | DIV11 | X.AMCC | | |
| 0247 | | 1 000 010 000 | | ROM 4 | | |
| 0250 | | 0 111 100 010 | SQT15 | P.CPIC | | |
| 0251 | | 1 101 001 110 | SQT16 | W.AMCA | | |
| 0252 | 0250 | 1 010 100 011 | | BRN | SQT15 | |
| 0253 | | 1 111 001 110 | | W.APCA | | |
| 0254 | | 0 100 001 110 | | W.SLA | | |
| 0255 | | 0 000 011 100 | | PRS | | |
| 0256 | | 1 001 010 010 | SQT17 | WP.SRC | | |
| 0257 | | 0 000 101 100 | | YP0 | | |
| 0260 | 0251 | 1 010 100 111 | | BRN | SQT16 | |
| 0261 | 0355 | 0 010 110 111 | | BRN | TNM12 | |
| 0262 | | 0 111 100 010 | DIV14 | P.CPIC | | |
| 0263 | | 1 100 010 110 | DIV15 | MS.AMBA | | |
| 0264 | 0262 | 1 011 001 011 | | BRN | DIV14 | |
| 0265 | | 1 110 010 110 | | MS.APBA | | |
| 0266 | | 0 100 010 110 | | MS.SLA | | |
| 0267 | | 0 000 011 100 | DIV16 | PRS | | |
| 0270 | | 0 000 101 100 | | YP0 | | |
| 0271 | 0263 | 1 011 001 111 | | BRN | DIV15 | |
| 0272 | 0355 | 0 010 110 111 | | BRN | TNM12 | |
| 0273 | | 0 000 011 100 | SQT12 | PRS | | |
| 0274 | | 1 110 010 110 | | MS.APBA | | |
| 0275 | 0333 | 1 101 101 111 | | BRN | SQT18 | |
| 0276 | | 1 110 010 000 | | ROM 7 | | |
| 0277 | | 0 101 111 010 | ADD12 | XS.CMIC | | |
| 0300 | | 0 101 111 010 | | XS.CMIC | | |
| 0301 | | 1 011 101 010 | | X.ZTA | | |
| 0302 | | 1 101 011 110 | | S.AMCA | | |
| 0303 | | 1 001 111 110 | | S.AMI | | |
| 0304 | 0306 | 1 100 011 011 | | BRN | ADD13 | |
| 0305 | | 1 000 010 000 | | ROM 4 | | |
| 0306 | | 1 000 000 110 | ADD13 | M.AMB | | |
| 0307 | 0312 | 1 100 101 011 | | BRN | ADD14 | |
| 0310 | | 0 011 111 110 | | S.ZNCC | | |
| 0311 | | 1 100 101 110 | | W.AXB | | |
| 0312 | | 1 100 001 110 | ADD14 | W.AMBA | | |
| 0313 | | 1 000 010 000 | ADD15 | ROM 4 | | |
| 0314 | | 0 011 001 110 | ATC1 | W.ZTC | | |
| 0315 | | 1 011 001 100 | | PT11 | | |
| 0316 | | 0 111 011 000 | | LOC7 | | |

MATH/USER-DEFINABLE FUNCTION BLOCK LISTING (ROM B-3)–Continued

| CURR ADDR | BRAN ADDR | OPERATION CODE BIT PATTERN | | | | |
|---|---|---|---|---|---|---|
| 0317 | | 1 000 011 000 | | LDC8 | | |
| 0320 | | 0 101 011 000 | | LDC5 | | |
| 0321 | | 0 011 011 000 | | LDC3 | | |
| 0322 | | 1 001 011 000 | | LDC9 | | |
| 0323 | | 1 000 011 000 | | LDC8 | | |
| 0324 | | 0 001 011 000 | | LDC1 | | |
| 0325 | | 0 110 011 000 | | LDC6 | | |
| 0326 | | 0 011 011 000 | | LDC3 | | |
| 0327 | | 0 101 011 000 | | LDC5 | | |
| 0330 | | 1 100 001 100 | | PT12 | | |
| 0331 | | 0 000 110 000 | | RETURN | | |
| 0332 | | 0 100 010 000 | RTN12 | ROM 2 | | |
| 0333 | | 1 110 001 010 | SQT18 | X.APRA | | |
| 0334 | 0336 | 1 101 111 011 | | BRN | SQT14 | |
| 0335 | | 0 101 100 010 | | P.CMIC | | |
| 0336 | | 0 111 111 110 | SQT14 | S.CPIC | | |
| 0337 | | 0 000 101 100 | | YP0 | | |
| 0340 | 0273 | 1 011 101 111 | | BRN | SQT12 | |
| 0341 | | 1 110 101 010 | | X.AXC | | |
| 0342 | | 1 011 101 010 | | X.ZTA | | |
| 0343 | | 0 001 100 010 | | P.CMI | | |
| 0344 | 0346 | 1 110 011 011 | | BRN | SQT13 | |
| 0345 | | 1 011 001 110 | | W.SRA | | |
| 0346 | | 1 001 001 110 | SQT13 | W.SRC | | |
| 0347 | | 1 000 101 010 | | X.BXC | | |
| 0350 | | 0 011 001 010 | | X.ZTC | | |
| 0351 | | 1 100 001 100 | | PT12 | | |
| 0352 | 0256 | 1 010 111 011 | | BRN | SQT17 | |
| 0353 | | 1 000 010 000 | PRE11 | ROM 4 | | CONTINUE IN ROM 4 |
| 0354 | | 1 010 010 010 | TAN18 | WP.SRA | | TAN14 TO TAN19 USES THE |
| 0355 | | 1 010 010 010 | | WP.SRA | | PSEUDO QUOTIENTS FORMED |
| 0356 | | 0 101 111 110 | TAN19 | S.CMIC | | BEFORE ON THE FOLLOWING |
| 0357 | 0354 | 1 110 110 011 | | BRN | TAN18 | |
| 0360 | | 0 111 010 010 | | WP.APCC | | EQUATIONS |
| 0361 | | 1 100 010 010 | | WP.AMRA | | |
| 0362 | | 1 000 110 010 | | WP.BXC | | |
| 0363 | | 0 010 001 110 | TAN13 | W.BTC | | |
| 0364 | | 1 101 111 110 | | S.AMIA | | |
| 0365 | 0356 | 1 110 111 011 | | BRN | TAN19 | |
| 0366 | | 1 110 110 010 | | WP.AXC | | |
| 0367 | | 0 110 101 000 | | STA | | |
| 0370 | | 0 000 011 110 | | S.ZMB | | |
| 0371 | 0331 | 0 000 000 111 | | BRN | TAN15 | |
| 0372 | | 0 100 001 110 | | W.SLA | | |
| 0373 | | 1 110 110 010 | TAN14 | WP.AXC | | |
| 0374 | | 0 100 101 000 | | CTS | | |
| 0375 | | 1 010 010 010 | | WP.SRB | | |
| 0376 | | 0 101 111 110 | | S.CMIC | | |
| 0377 | | 1 000 111 110 | | S.BXC | | |

MATH/USER-DEFINABLE FUNCTION BLOCK LISTING (ROM B-4)

| CURR ADDR | BRAN ADDR | OPERATION CODE BIT PATTERN | | | | |
|---|---|---|---|---|---|---|
| 0000 | | 1 011 111 000 | | DSTC | | RELOAD OLD M |
| 0001 | 0374 | 1 111 110 011 | | BRN | ERROR2 | GO TO PRINT ERROR MESSAGE |
| 0002 | | 1 100 101 000 | RTN41 | DNR | | |
| 0003 | | 0 000 110 000 | | RETURN | | |
| 0004 | | 0 010 101 000 | PROGM1 | CXM | | |
| 0005 | | 1 100 001 100 | | PT12 | | |
| 0006 | | 0 111 000 000 | PROGM | PINC | | |
| 0007 | | 1 000 100 000 | | READ | | FROM ROM 0 PROGRAM MODE |
| 0010 | | 1 011 110 010 | | WP.ZTA | | READ THE 2 TABLE DIGITS |
| 0011 | | 0 001 010 000 | | EERA | | |
| 0012 | | 1 101 001 100 | PROGM2 | PT13 | | |
| 0013 | | 0 100 011 000 | PROGM4 | LDC4 | | |
| 0014 | | 1 101 001 100 | | PT13 | | |
| 0015 | | 0 001 000 010 | | P.AMC | | |
| 0016 | 0075 | 0 011 110 111 | | BRN | CHECK | |
| 0017 | 0300 | 1 100 000 011 | | BRN | PROGM5 | |
| 0020 | | 1 100 010 000 | RTN610 | ROM 6 | | |
| 0021 | | 1 100 101 000 | RTN31 | DNR | | |
| 0022 | | 0 100 010 000 | | ROM 2 | | |
| 0023 | | 1 010 001 100 | DIGT0 | PT10 | | |
| 0024 | | 0 010 101 000 | | CXM | | |
| 0025 | | 0 101 100 010 | | P.CMIC | | |
| 0026 | 0004 | 0 000 010 011 | | BRN | PROGM1 | |
| 0027 | | 0 010 101 000 | | CXM | | |
| 0030 | | 1 000 101 110 | | W.BXC | | |
| 0031 | 0312 | 0 010 101 011 | | BRN | PROGM2 | |
| 0032 | | 1 111 100 010 | DIGT3 | P.APIA | | |
| 0033 | | 1 111 100 010 | DIGT2 | P.APIA | | |
| 0034 | | 1 111 100 010 | DIGT1 | P.APIA | | |
| 0035 | 0023 | 0 001 001 111 | | BRN | DIGT0 | |
| 0036 | | 0 010 010 000 | PROGM3 | ROM 1 | | GO TO ROUTINE BEGINNING |
| 0037 | | 1 010 010 000 | RTN510 | ROM 5 | | |
| 0040 | | 1 100 101 000 | RTN51 | DNR | | |
| 0041 | 0337 | 0 001 111 111 | | BRN | RTN510 | |
| 0042 | | 1 111 100 010 | DIGT6 | P.APIA | | |
| 0043 | | 1 111 100 010 | DIGT5 | P.APIA | | |
| 0044 | | 1 111 100 010 | DIGT4 | P.APIA | | |
| 0045 | 0032 | 0 001 101 011 | | BRN | DIGT3 | |
| 0046 | | 1 100 101 000 | RTN61 | DNR | | |
| 0047 | 0020 | 0 001 000 011 | | BRN | RTN610 | |
| 0050 | | 1 000 101 110 | EEX | W.BXC | | STORE C |
| 0051 | 0056 | 0 010 111 011 | | BRN | EEX0 | |
| 0052 | | 1 111 100 010 | DIGT9 | P.APIA | | |
| 0053 | | 1 111 100 010 | DIGT8 | P.APIA | | |
| 0054 | | 1 111 100 010 | DIGT7 | P.APIA | | |

MATH/USER-DEFINABLE FUNCTION BLOCK LISTING (ROM B-4) – Continued

```
CURR  BRAN   OPERATION CODE
ADDR  ADDR   BIT PATTERN

0055  0042   0 010 001 011            BRN      DIGT6
0056         1 010 101 000   EEX0     MTC
0057         0 110 001 100            PT6
0060         0 101 100 010            P.CMIC            CHECK IF COUNTER IS 0
0061  0063   0 011 001 111            BRN      EEX01    NO. CONTINUE CHECK
0062  0316   1 100 111 011            BRN      EEX1     YES. INCREMENT COUNTER
0063         0 101 100 010   EEX01    P.CMIC            IS COUNTER 1
0064  0066   0 011 011 011            BRN      EEX02    NOM CONTINUE CHECK
0065  0316   1 100 111 011            BRN      EEX1     YES. INCREMENT COUNTER
0066         0 101 100 010   EEX02    P.CMIC            IS COUNTER 2
0067  0071   0 011 100 111            BRN      EEX03    NO. CONTINUE
0070  0316   1 100 111 011            BRN      EEX1     YES. GO TO INCREMENT COUNTER
0071         0 101 100 010   EEX03    P.CMIC            IS COUNTER 3
0072  0323   1 101 001 111            BRN      EEX3     NO. IT IS 4
0073         1 010 101 000            MTC
0074  0350   1 110 100 011            BRN      EEX30
0075         0 010 010 000   CHECK    ROM 1             PROGRAM MODE CHECK
0076         1 100 001 100   EEX5     PT12
0077         1 001 010 010            WP.SRC
0100  0333   1 101 110 001            JSB      EEX6
0101         0 000 000 000            DUMMY
0102  0170   0 111 100 011            BRN      NRM26
0103         0 000 000 000            DUMMY
0104         0 000 010 000   SUPCA    ROM 0             GO TO SUPERVISOR SKIP USERCODE CHECK
0105         0 000 010 000   SUPA4    ROM 0
0106         0 000 000 000            DUMMY
0107         0 001 100 110   DIV61    M.CM1             CHECK FOR ZERO X
0110  0116   0 100 111 011            BRN      DIV41    NO. GO TO DIVIDE
0111         1 100 001 100            PT12
0112         0 001 011 000            LDC1              LOAD 1 IF X IS ZERO
0113         0 001 000 100            SS1               SET S1 TO INDICATE TRIG ROUTINE
0114         1 011 110 010            WP.ZTA
0115         1 110 101 110            W.AXC
0116         0 000 101 110   DIV41    W.ZTB
0117         0 101 001 010            X.AMCC
0120         1 100 001 100            PT12
0121  0259   1 010 100 011            BRN      DIV21
0122         1 100 101 000   SUPA40   DNR
0123  0105   0 100 010 111            BRN SUPA4
0124  0367   1 111 011 111            BRN      EEXX1    EEX ROUTINE FROM ROM 1
0125         0 010 010 000   EEXX     ROM 1             CONTINUE EEX ROUTINE IN ROM 1
0126         0 010 101 000   SET      CXM
0127         0 000 001 100            PT0
0130         0 100 011 000            LDC4
0131         0 010 101 000            CXM
0132         0 000 110 000            RETURN
0133         1 001 111 010   PRE29    XS.AM1
0134  0302   1 100 001 011            BRN      PRE27
0135         1 100 010 110   PRE24    MS.AMBA
0136  0135   0 101 110 111            BRN      PRE24
0137         1 110 010 110            MS.APBA
0140         0 100 001 110            W.SLA
0141         0 101 101 010            X.CMIC
0142  0133   0 101 101 111            BRN      PRE29
0143         1 011 001 110   PRE25    W.SRA
0144         0 011 010 010            WP.ZTC
0145         1 110 101 010            X.AXC
0146         0 110 111 110   PRE26    S.ZMC
0147  0153   0 110 101 111            BRN      PRE28
0150         1 100 101 110            W.AXB
0151         1 100 001 110            W.AMBA
0152         0 011 101 010            X.ZNCC
0153         1 011 001 110   PRE28    W.SRA
0154         1 000 101 110   PQ023    W.BXC
0155         0 011 001 110            W.ZTC
0156         0 101 100 110            M.CMIC
0157         0 000 000 000            NOP
0160  0162   0 111 001 011            BRN      PQ028
0161         0 110 011 000   PQ027    LDC6
0162         0 001 101 100   PQ028    YP1
0163  0161   0 111 000 111            BRN      PQ027
0164         1 001 001 110            W.SRC
0165         1 001 001 110   PQ024    W.SRC
0166         0 000 000 000            NOP
0167  0224   1 001 010 011            BRN      RTN21
0170         0 000 001 100   NRM26    PT0
0171         0 100 101 000            CTS
0172         1 010 101 000            MTC
0173         0 101 100 010            P.CMIC
0174  0176   0 111 111 011            BRN      A1
0175         0 000 000 000            DUMMY
0176         0 101 100 010   A1       P.CMIC
0177  0201   1 000 000 111            BRN      A2
0200  0220   1 001 000 011            BRN      RTN11     RETURN IN ROM 1
0201         0 101 100 010   A2       P.CMIC
0202  0204   1 000 010 011            BRN      A3
0203  0021   0 001 000 111            BRN      RTN31     RETURN IN ROM 2
0204         0 101 100 010   A3       P.CMIC
0205  0207   1 000 011 111            BRN      A0
0206  0222   1 001 001 011            BRN      RTN20     RETURN IN ROM 3
0207         0 101 100 010   A0       P.CMIC
0210  0212   1 000 101 011            BRN      A4
0211  0002   0 000 001 011            BRN      RTN41     RETURN IN ROM 4
0212         0 101 100 010   A4       P.CMIC
0213  0215   1 000 110 111            BRN      A5
0214  0040   0 010 000 011            BRN      RTN51     RETURN IN ROM 5
0215         0 101 100 010   A5       P.CMIC
0216  0122   0 101 001 011            BRN      SUPA40
0217  0046   0 010 011 011            BRN      RTN61     RETURN IN ROM 6
0220         1 100 101 000   RTN11    DNR
0221         0 010 010 000            ROM 1
0222         1 100 001 100   RTN20    PT12
0223         1 100 101 000            DNR
0224         0 110 010 000   RTN21    ROM 3
0225         0 100 010 000   NRM21    ROM 2
```

MATH/USER-DEFINABLE FUNCTION BLOCK LISTING (ROM D-4) - Continued

| CURR ADDR | BRAN ADDR | OPERATION CODE BIT PATTERN | | | | |
|---|---|---|---|---|---|---|
| 0226 | 0307 | 1 100 011 111 | | BRN | MPY28 | |
| 0227 | | 0 000 000 000 | | DUMMY | | |
| 0230 | | 0 000 000 000 | | DUMMY | | |
| 0231 | | 1 100 001 100 | ADD41 | PT12 | | |
| 0232 | | 0 010 010 000 | | ROM 1 | | |
| 0233 | | 0 110 010 000 | PO021 | ROM 3 | | |
| 0234 | | 1 011 001 110 | PMU21 | W.SRA | | |
| 0235 | | 1 000 101 110 | PMU22 | W.BXC | | |
| 0236 | 0240 | 1 010 000 011 | | BRN | PMU24 | |
| 0237 | | 1 110 001 110 | PMU23 | W.APRA | | |
| 0240 | | 0 101 111 110 | PMU24 | S.CMIC | | |
| 0241 | 0237 | 1 001 111 111 | | BRN | PMU23 | |
| 0242 | | 1 110 101 110 | | W.AXC | | |
| 0243 | | 0 100 010 110 | | MS.SLA | | |
| 0244 | | 1 110 101 110 | | W.AXC | | |
| 0245 | 0154 | 0 110 110 011 | | BRN | PO023 | |
| 0246 | | 0 011 001 100 | MPY21 | PT3 | | |
| 0247 | | 0 111 001 010 | MPY22 | X.APCC | | |
| 0250 | | 0 101 011 110 | DIV21 | S.AMCC | | |
| 0251 | 0253 | 1 010 101 111 | | BRN | DIV22 | |
| 0252 | | 0 010 111 110 | | S.ZMCC | | |
| 0253 | | 1 100 100 110 | DIV22 | M.AXB | | |
| 0254 | | 1 011 101 110 | | W.ZTA | | |
| 0255 | | 1 100 101 100 | | YP12 | | |
| 0256 | 0305 | 1 100 010 111 | | BRN | MPY27 | |
| 0257 | | 0 001 100 110 | | M.CM1 | | |
| 0260 | 0266 | 1 011 011 011 | | BRN | DIV23 | |
| 0261 | | 0 001 010 100 | | YS1 | | |
| 0262 | 0271 | 1 011 100 111 | | BRN | ERR0 | |
| 0263 | | 0 010 010 010 | | WP.BTC | | |
| 0264 | | 1 101 100 110 | | M.AM1A | | |
| 0265 | | 0 111 111 010 | | XS.CP1C | | |
| 0266 | | 1 000 110 010 | DIV23 | WP.BXC | | |
| 0267 | | 1 110 100 110 | | M.AXC | | |
| 0270 | | 0 110 010 000 | | ROM 3 | | |
| 0271 | | 1 110 010 000 | ERR0 | ROM 7 | | |
| 0272 | | 0 010 010 000 | ERROR | ROM 1 | | |
| 0273 | | 0 010 010 000 | EEX8 | ROM 1 | | GO TO FINISH EEX ROUTINE |
| 0274 | | 0 011 011 110 | EEX7 | S.ZTC | | |
| 0275 | | 0 010 101 010 | | X.ZMCC | | COMPLIMENT EXP |
| 0276 | 0272 | 1 011 101 101 | | JSB | EEX8 | |
| 0277 | 0271 | 1 011 100 111 | | BRN | ERR0 | |
| 0300 | | 0 011 100 100 | PROGM5 | RS3 | | |
| 0301 | 0036 | 0 001 111 011 | | BRN | PROGM3 | |
| 0302 | | 1 111 100 110 | PRE27 | M.AP1A | | |
| 0303 | 0143 | 0 110 001 111 | | BRN | PRE25 | |
| 0304 | | 1 110 001 110 | MPY26 | W.APRA | | |
| 0305 | | 0 101 100 010 | MPY27 | P.CM1C | | |
| 0306 | 0304 | 1 100 010 011 | | BRN | MPY26 | |
| 0307 | | 1 011 001 110 | MPY28 | W.SRA | | |
| 0310 | | 0 000 111 100 | | PLS | | |
| 0311 | | 1 101 101 100 | | YP13 | | |
| 0312 | 0305 | 1 100 010 111 | | BRN | MPY27 | |
| 0313 | | 0 111 101 010 | | X.CP1C | | |
| 0314 | | 0 000 000 000 | | NOP | | |
| 0315 | 0225 | 1 001 010 111 | | BRN | NRM21 | |
| 0316 | | 1 010 101 000 | EEX1 | MTC | | INCREMENT COUNTER BY 1 |
| 0317 | | 0 111 100 010 | | P.CP1C | | |
| 0320 | | 0 010 101 000 | | CXM | | |
| 0321 | | 1 000 101 110 | | W.BXC | | RESTORE DATA |
| 0322 | 0104 | 0 100 010 011 | | BRN | SUPCA | GO TO USPERVISOR SKIP USERCODE CHECK |
| 0323 | | 1 000 101 110 | EEX3 | W.BXC | | RESTORE DATA |
| 0324 | | 0 001 111 010 | | XS.CM1 | | |
| 0325 | 0272 | 1 011 101 011 | | BRN | ERROR | NEGATIVE,UNDERFLOW |
| 0326 | | 0 101 101 010 | | X.CM1C | | |
| 0327 | 0331 | 1 101 100 111 | | BRN | EEX4 | |
| 0330 | 0276 | 0 011 111 011 | | BRN | EEX5 | 1 DIGIT EXP |
| 0331 | | 0 101 101 010 | EEX4 | X.CM1C | | |
| 0332 | 0272 | 1 011 101 011 | | BRN | ERROR | |
| 0333 | | 1 100 001 100 | | PT12 | | |
| 0334 | | 1 001 010 010 | EEX6 | WP.SRC | | |
| 0335 | | 0 000 011 100 | | PRS | | |
| 0336 | | 0 001 101 100 | | YP1 | | |
| 0337 | 0334 | 1 101 110 011 | | BRN | EEX6 | |
| 0340 | | 0 001 111 110 | | S.CM1 | | CHECK FOR SIGN |
| 0341 | 0274 | 1 011 110 011 | | BRN | EEX7 | NEGATIVE |
| 0342 | 0273 | 1 011 101 111 | | BRN | EEX8 | POSITIVE, GO TO FINISH ROUTINE |
| 0343 | | 1 011 111 000 | EEX10 | DSTC | | LOAD ORIGINAL DATA |
| 0344 | | 1 110 101 010 | | X.AXC | | LOAD NEW EXPONENT |
| 0345 | | 0 011 100 100 | | RS3 | | RESET OPERATION FLAG |
| 0346 | | 1 100 001 100 | | PT12 | | RESET POINTER TO 12 |
| 0347 | 0105 | 0 100 010 111 | | BRN | SUPA4 | |
| 0350 | | 0 111 100 010 | EEX30 | P.CP1C | | INCREMENT COUNTER |
| 0351 | | 0 010 101 000 | | CXM | | |
| 0352 | | 1 000 101 110 | | W.BXC | | RESTORE DATA |
| 0353 | | 0 000 010 000 | EQUAL | ROM 0 | | |
| 0354 | | 1 110 101 110 | PRE21 | W.AXC | | |
| 0355 | | 0 100 101 110 | | W.ATB | | |
| 0356 | | 0 110 000 110 | | M.CTA | | |
| 0357 | | 1 010 111 010 | | XS.CPCC | | |
| 0360 | 0135 | 0 101 110 111 | | BRN | PRE24 | |
| 0361 | | 0 111 111 010 | | XS.CP1C | | |
| 0362 | | 1 011 001 110 | PRE22 | W.SRA | | |
| 0363 | | 0 111 101 010 | | X.CP1C | | |
| 0364 | 0362 | 1 111 001 011 | | BRN | PRE22 | |
| 0365 | 0146 | 0 110 011 011 | | BRN | PRE26 | |
| 0366 | 0125 | 0 101 010 111 | | BRN | EEXX | FROM ROM 0 |
| 0367 | | 1 011 110 000 | EEXX1 | DTDS | | STORE M REGISTER IN DATA STORAGE |
| 0370 | | 1 001 001 100 | | PT9 | | |
| 0371 | | 0 000 011 000 | | LDC0 | | |
| 0372 | | 0 000 011 000 | | LDC0 | | LOAD 0 FOR = SIGN INTERPRETATION |
| 0373 | | 0 000 010 000 | | ROM 0 | | CONTINUE IN ROM 0 |
| 0374 | | 0 010 101 000 | ERROR2 | CXM | | RESTORE M |
| 0375 | | 0 011 001 110 | | W.ZTC | | |
| 0376 | | 1 110 010 000 | | ROM 7 | | GO TO ROM 7 FOR ERROR MESSAGE 35 |
| 0377 | 0343 | 1 110 001 111 | | BRN | EEX10 | |

MATH/USER-DEFINABLE FUNCTION BLOCK LISTING (ROM B-5)

```
CURR  BRAN   OPERATION CODE
ADDR  ADDR   BIT PATTERN

0000         0 000 011 100  TEST1    PRS                  TEST IF THERE ARE 2 DIGITS
0001         1 001 001 110           W.SRC                SHIFT RIGHT ONE IFF NOT
0002         1 010 101 100  TEST     YP10
0003  0000   0 000 000 011           BRN       TEST1
0004         0 000 110 000           RETURN
0005         0 011 001 110  ATC7     W.ZTC
0006         1 100 001 100           PT12
0007         0 001 011 000           LDC1
0010         0 101 011 000           LDC5                 LOAD 0.00015 FOR ROUND OFF
0011         0 011 011 000           LDC3
0012         0 101 101 010           X.CMIC
0013         0 101 101 010           X.CMIC
0014         0 101 101 010           X.CMIC
0015         0 101 101 010           X.CMIC
0016         0 000 110 000           RETURN
0017  0311   1 101 100 111           BRN       DTR02
0020         0 100 010 000  ATCC0    ROM 2                LOAD PI
0021         0 000 001 100  SET      PT0
0022         0 010 101 000           CXM
0023         0 101 011 000           LDC5
0024         0 010 101 000           CXM
0025         0 000 110 000           RETURN
0026         0 100 010 000  OFL1     ROM 2
0027         0 011 001 110  ATC5     W.ZTC                LOAD 60
0030         1 100 001 100           PT12
0031         0 110 011 000           LDC6
0032         0 111 101 010           X.CP1C
0033         1 100 001 100           PT12
0034         0 000 110 000           RETURN
0035         1 000 101 110  TEMP     W.BXC                RELOAD DATA
0036         0 110 101 000           STA
0037         1 110 101 110           W.AXC
0040         0 000 110 000           RETURN
0041  0251   0 010 100 111           BRN       TDWD       DMS TO DWDF
0042  0126   0 101 011 011           BRN       TDMS       DWDF TO DMS
0043         1 000 000 100           SSB                  GRAD TO DWDF
0044  0263   1 011 001 111           BRN       DTGR       DWDF TO GRAD
0045         1 000 000 100           SSB                  RADIAN TO DWDF
0046  0311   1 100 100 111           BRN       DTRD       DWDF TO RADIAN
0047         1 000 000 100           SSB                  MIL TO DWDF
0050  0340   1 110 000 011           BRN       DTML       DWDF TO MIL
0051  0023   0 001 000 101  TDWD     JSB       SET        SET RETURN FLAG
0052         0 010 001 100           PT2
0053         1 011 101 110           W.ZTA                TAKE SECOND PART AND STORE THE REST
0054         1 110 110 010           WP.AXC
0055         0 100 101 000           CTS
0056  0110   0 100 100 101           JSB       NORM1      SHIFT LEFT 10 PLACES
0057         1 111 101 010           X.AP1A               CORRECT EXPONENT
0060  0026   0 001 011 101           JSB       ATC5       LOAD 60
0061  0247   1 010 100 001           JSB       DIV51      DIVIDE
0062  0034   0 001 110 101           JSB       TEMP       RELOAD DATA
0063         0 110 001 100           PT6                  TAKE THE MINUTE PART
0064         1 011 101 110           W.ZTA                AND STORE THE REST
0065         1 110 110 010           WP.AXC
0066         0 100 101 000           CTS
0067         1 000 101 110           W.BXC
0070  0110   0 100 100 101           JSB       NORM1      NORMALIZE IT
0071         1 111 101 010           X.AP1A
0072  0230   1 001 100 101           JSB       ADD51      ADD DIVISION RESULT TO MINUTE
0073  0026   0 001 011 101           JSB       ATC5       LOAD 60
0074  0247   1 010 100 001           JSB       DIV51      DIVIDE MINUTE BY 60
0075  0034   0 001 110 101           JSB       TEMP       RELOAD DATA AND GET DEGREE PART
0076         0 110 001 110           W.CTA
0077         0 110 101 110           W.ZMC
0100  0106   0 100 011 011           BRN       TDWD1
0101         1 100 001 100           PT12
0102  0117   0 101 000 001           JSB       NORM4      CHECK FOR LEADING ZERO
0103         1 111 101 010           X.AP1A               CORRECT EXPONENT
0104         1 111 101 010           X.AP1A               ADD EXPONENT
0105         1 111 101 010           X.AP1A
0106         1 000 101 110  TDWD1    W.BXC
0107  0233   1 001 100 101           JSB       ADD51      ADD RESULT TO DEGREE
0110  0026   0 001 011 011           BRN       OFL1       GO TO OVERFLOW TEST AND DISPLAY
0111         0 100 101 110  NORM1    W.ATB                NORMALIZATION ROUTINE
0112         0 000 001 110           W.ZMB                CHECK IF DATA IS ZERO
0113  0125   0 101 010 111           BRN       NORM3      IF SO, RETURN
0114         0 100 001 110  NORM2    W.SLA
0115         0 000 111 100           PLS                  SHIFT LEFT UNTIL POINTER IS AT 12
0116         1 100 101 100           YP12
0117  0114   0 100 110 011           BRN       NORM2
0120         1 001 100 010  NORM4    P.AM1                CHECK FOR LEADING ZERO
0121  0125   0 101 010 111           BRN       NORM3
0122         1 101 101 010           X.AM1A
0123         0 100 010 110           MS.SLA
0124  0120   0 101 000 011           BRN       NORM4
0125         0 000 110 000  NORM3    RETURN
0126  0023   0 001 000 101  TDMS     JSB       SET        SET RETURN FLAG
0127         0 110 001 110           W.CTA
0130         0 001 111 110           S.CM1
0131  0240   1 010 000 011           BRN       TDMS02
0132  0004   0 000 010 101  TDMS01   JSB       ATC7       LOAD 0.000153 FOR ROUND OFF
0133  0230   1 001 100 101           JSB       ADD51      ADD ROUND OFF NUMBER
0134         0 001 111 010           XS.CM1               CHECK IF DATA IS LESS THAN 1
0135  0225   1 001 010 111           BRN       TDMS1      YES,CONVERT TO MINUTE
0136         0 011 001 110           W.ZTC
0137         0 000 001 100           PT0                  CHECK IF NUMBER IS TOO LARGE
0140         0 100 011 000           LDC4
0141         0 001 001 010           X.AMC
0142  0376   1 111 111 011           BRN       ERR1       IF SO GO TO ERROR MESSAGE
0143         1 100 101 110           W.AXB                IF NOT, CONTINUE
0144         0 010 001 110           W.BTC
0145         1 100 001 100           PT12
```

MATH/USER-DEFINABLE FUNCTION BLOCK LISTING (ROM B-5) – Continued

| CURR ADDR | BRAN ADDR | OPERATION CODE BIT PATTERN | | | | |
|---|---|---|---|---|---|---|
| 0146 | 0252 | 1 010 101 101 | | JSB | XRM1 | DETERMINE SIZE OF DEGREE PART |
| 0147 | 0152 | 0 110 101 011 | | BRN | TOMS7 | |
| 0150 | | 0 000 011 100 | TOMS8 | PRS | | IF LESS THAN 4 DIGITS MOVE |
| 0151 | | 1 001 001 110 | | W.SRC | | TO RIGHT ACCORDINGLY |
| 0152 | | 1 000 101 100 | TOMS7 | YP8 | | |
| 0153 | 0150 | 0 110 100 011 | | BRN | TOMS8 | |
| 0154 | | 0 100 101 000 | | CTS | | |
| 0155 | | 0 010 001 110 | | W.BTC | | |
| 0156 | | 1 100 001 100 | | PT12 | | |
| 0157 | 0252 | 1 010 101 101 | | JSB | XRM1 | RESET POINTER TO DECIMAL LOCATION |
| 0160 | 0110 | 0 100 100 101 | | JSB | NORM1 | NORMALIZE DECIMAL PART |
| 0161 | | 1 101 101 010 | | X.AM1A | | |
| 0162 | 0026 | 0 001 011 101 | TOMS6 | JSB | ATC5 | LOAD 60 |
| 0163 | 0243 | 1 010 010 001 | | JSB | MPY51 | MULTIPLY |
| 0164 | | 0 001 111 010 | | XS.CM1 | | CHECK IF MINUTE PART IS LESS THAN 1 |
| 0165 | 0205 | 1 000 010 111 | | BRN | TOMS2 | YES. CONVERT TO SECOND |
| 0166 | | 0 100 101 110 | | W.ATB | | STORE DATA IN B |
| 0167 | | 1 100 001 100 | | PT12 | | |
| 0170 | 0252 | 1 010 101 101 | | JSB | XRM1 | SAVE INTEGER PART AS MINUTE |
| 0171 | 0001 | 0 000 001 001 | | JSB | TEST | TEST IF MINUTE HAS 2 DIGITS |
| 0172 | | 1 100 001 100 | | PT12 | | |
| 0173 | | 1 001 001 110 | TOMS3 | W.SRC | | |
| 0174 | | 0 000 011 100 | | PRS | | |
| 0175 | | 0 110 101 100 | | YP6 | | MOVE MINUTE PART TO CORRECT LOCATION |
| 0176 | 0173 | 0 111 101 111 | | BRN | TOMS3 | |
| 0177 | 0232 | 1 001 101 101 | | JSB | STORE | SAVE MINUTE PART IN PROPER LOCATION |
| 0200 | | 0 010 001 110 | | W.BTC | | RESTORE DATA IN C |
| 0201 | | 1 100 001 100 | | PT12 | | |
| 0202 | 0252 | 1 010 101 101 | | JSB | XRM1 | SET POINTER TO DECIMAL LOCATION |
| 0203 | 0110 | 0 100 100 101 | | JSB | NORM1 | NORMALIZE DECIMAL PART |
| 0204 | | 1 101 101 010 | | X.AM1A | | CORRECT EXPONENT |
| 0205 | 0026 | 0 001 011 101 | TOMS2 | JSB | ATC5 | LOAD 60 |
| 0206 | 0243 | 1 010 010 001 | | JSB | MPY51 | |
| 0207 | | 0 001 111 010 | | XS.CM1 | | CHECK IF SECOND PART IS LESS THAN 1 |
| 0210 | 0222 | 1 001 001 011 | | BRN | TOMS5 | IF SO, RESULT IS ZERO.DONE. |
| 0211 | | 1 100 001 100 | | PT12 | | |
| 0212 | 0252 | 1 010 101 101 | | JSB | XRM1 | DETERMINE SIZE OF SECOND PATT |
| 0213 | 0001 | 0 000 001 001 | | JSB | TEST | TEST IF IT HAS 2 DIGITS |
| 0214 | | 1 100 001 100 | | PT12 | | |
| 0215 | | 1 001 001 110 | TOMS4 | W.SRC | | MOVE SECOND PART INTO RIGHT LOCATION |
| 0216 | | 0 000 011 100 | | PRS | | |
| 0217 | | 0 010 101 100 | | YP2 | | |
| 0220 | 0215 | 1 000 110 111 | | BRN | TOMS4 | |
| 0221 | 0232 | 1 001 101 101 | | JSB | STORE | STORE RESULT |
| 0222 | | 0 110 101 000 | TOMS5 | STA | | |
| 0223 | 0310 | 1 100 100 011 | | BRN | PRINT | GO TO PRINT ANGLE ROUTINE |
| 0224 | | 0 000 000 000 | | DUMMY | | |
| 0225 | | 0 110 001 110 | TOMS1 | W.CTA | | STORE ZERO INTO DEGREE |
| 0226 | | 0 011 001 110 | | W.ZTC | | PART AND CONVERT TO SECOND |
| 0227 | | 0 100 101 000 | | CTS | | |
| 0230 | 0162 | 0 111 001 011 | | BRN | TOMS6 | |
| 0231 | | 1 100 001 100 | ADDS1 | PT12 | | |
| 0232 | | 0 010 010 000 | | ROM 1 | | ADD ROUTINE |
| 0233 | | 0 110 101 000 | STORE | STA | | STORE PROPERLY LOCATED DATA IN STACK |
| 0234 | | 0 110 010 010 | | WP.CTA | | |
| 0235 | | 1 110 101 110 | | W.AXC | | |
| 0236 | | 0 100 101 000 | | CTS | | |
| 0237 | | 0 000 110 000 | | RETURN | | |
| 0240 | 0365 | 1 111 011 001 | TOMS02 | JSB | ATC6 | |
| 0241 | | 1 110 101 110 | | W.AXC | | |
| 0242 | 0230 | 1 001 100 101 | | JSB | ADDS1 | |
| 0243 | 0132 | 0 101 101 011 | | BRN | TOMS01 | |
| 0244 | | 0 000 101 110 | MPY51 | W.ZTB | | |
| 0245 | | 1 000 010 000 | | ROM 4 | | |
| 0246 | | 0 101 001 010 | DIVS10 | X.AMCC | | |
| 0247 | | 1 000 010 000 | | ROM 4 | | |
| 0250 | | 0 000 101 110 | DIVS1 | W.ZTB | | |
| 0251 | 0246 | 1 010 011 011 | | BRN | DIVS10 | |
| 0252 | | 0 000 011 100 | XRM2 | PRS | | |
| 0253 | | 0 101 101 010 | XRM1 | X.CM1C | ISOLATE INTEGER PART | |
| 0254 | 0252 | 1 010 101 011 | | BRN | XRM2 | |
| 0255 | | 0 000 011 100 | | PRS | | |
| 0256 | | 0 011 001 010 | | X.ZTC | | |
| 0257 | | 1 011 101 110 | | W.ZTA | | |
| 0260 | | 0 110 010 010 | | WP.CTA | | |
| 0261 | | 0 011 010 010 | | WP.ZTC | | |
| 0262 | | 0 000 110 000 | | RETURN | | |
| 0263 | 0020 | 0 001 000 101 | DTGR | JSB | SET | SET RETURN FLAG |
| 0264 | | 1 110 101 110 | | W.AXC | | DEGREE TO GRAD OR GRAD TO DEGREE CONVERSION |
| 0265 | 0365 | 1 111 011 001 | | JSB | ATC6 | LOAD 360 |
| 0266 | | 1 000 010 100 | | YS8 | | |
| 0267 | 0272 | 1 011 101 011 | | BRN | DIVV | IF SET COVVERT GRAD TO DWDF |
| 0270 | 0243 | 1 010 010 001 | | JSB | MPY51 | |
| 0271 | 0273 | 1 011 101 111 | | BRN | CONT1 | |
| 0272 | 0247 | 1 010 100 001 | DIVV | JSB | DIVS1 | |
| 0273 | | 1 011 101 110 | CONT1 | W.ZTA | | |
| 0274 | | 1 110 101 110 | | W.AXC | | |
| 0275 | | 1 100 001 100 | | PT12 | | |
| 0276 | | 0 100 011 000 | | LDC4 | | LOAD 400 |
| 0277 | | 0 000 001 100 | | PT0 | | |
| 0300 | | 0 010 011 000 | | LDC2 | | |
| 0301 | | 1 100 001 100 | | PT12 | | |
| 0302 | | 1 000 010 100 | | YS8 | | IF S8 NOT SET CONVERT DWDF TO GRAD |
| 0303 | 0306 | 1 100 011 011 | | BRN | MPYY | IF SET CONVERT GRAD TO DWDF |
| 0304 | 0247 | 1 010 100 001 | | JSB | DIVS1 | |
| 0305 | 0327 | 1 100 011 111 | | BRN | CONT2 | |
| 0306 | 0243 | 1 010 010 001 | MPYY | JSB | MPY51 | |
| 0307 | 0326 | 0 001 011 011 | CONT2 | BRN | OFL1 | |
| 0310 | | 1 110 010 000 | PRINT | ROM 7 | | |
| 0311 | 0020 | 0 001 000 101 | DTRD | JSB | SET | SET RETURN FLAG |
| 0312 | | 1 011 101 110 | | W.ZTA | | DEGREE TO RADIAN OR RADIAN TO DEGREE |
| 0313 | | 1 110 101 110 | | W.AXC | | |
| 0314 | | 1 100 001 100 | | PT12 | | |
| 0315 | | 0 001 011 000 | | LDC1 | | |
| 0316 | | 1 000 011 000 | | LDC8 | | |

MATH/USER-DEFINABLE FUNCTION BLOCK LISTING (ROM B-5) – Continued

```
CURR  BRAN   OPERATION CODE
ADDR  ADDR   BIT PATTERN

0317         0 000 001 100          PT0
0320         0 010 011 000          LDC2
0321         1 100 001 100          PT12
0322         1 000 010 100          YSB                  IF SB NOT SET CONVERT RAD TO DWDF
0323  0326   1 101 011 011          BRN      DIVV1       IF SET CONVERT DWDF TO RAD
0324  0243   1 010 010 001          JSB      MPY51
0325  0327   1 101 011 111          BRN      DTRD1
0326  0247   1 010 100 001  DIVV1   JSB      DIV51
0327         0 011 000 100  DTRD1   SS3                  SET LOAD PI FLAG
0330  0020   0 001 000 011          BRN      ATCC0       GO TO LOAD PI
0331         0 011 100 100  DTRD2   RS3                  RESET LOAD PI FLAG
0332         1 000 010 100          YSB                  IF SB NOT SET CONVERT DWDF TO RAD
0333  0336   1 101 111 011          BRN      MPYY1       IF SET CONVERT RAD TO DWDF
0334  0247   1 010 100 001          JSB      DIV51
0335  0337   1 101 111 111          BRN      DTRD3
0336  0243   1 010 010 001  MPYY1   JSB      MPY51
0337  0326   0 001 011 011  DTRD3   BRN      OFL1        DONE
0340  0020   0 001 000 101  DTML    JSB      SET         SET RETURN FLAG
0341         1 110 101 110          W.AXC                DWDF TO MIL OR MIL TO DWDF
0342  0365   1 111 011 001          JSB      ATC6        LOAD 360
0343         1 000 010 100          YSB                  IF SB NOT SET CONVERT DWDF TO MIL
0344  0347   1 110 011 111          BRN      DIVV2       IF SET CONVERT MIL TO DWDF
0345  0243   1 010 010 001          JSB      MPY51
0346  0350   1 110 100 011          BRN      DTML1
0347  0247   1 010 100 001  DIVV2   JSB      DIV51
0350         1 011 101 110  DTML1   W.ZTA
0351         1 110 101 110          W.AXC
0352         1 100 001 100          PT12
0353         0 110 011 000          LDC6
0354         0 100 011 000          LDC4                 LOAD 6400
0355         0 000 001 100          PT0
0356         0 100 011 000          LDC4
0357         1 100 001 100          PT12
0360         1 000 010 100          YSB
0361  0364   1 111 010 011          BRN      MPYY2
0362  0247   1 010 100 001          JSB      DIV51
0363  0365   1 111 010 111          BRN      DTML2
0364  0243   1 010 010 001  MPYY2   JSB      MPY51
0365  0326   0 001 011 011  DTML2   BRN      OFL1        DONE
0366         0 011 001 110  ATC6    W.ZTC                LOAD 360
0367         1 100 001 100          PT12
0370         0 011 011 000          LDC3                 LOAD 360
0371         0 110 011 000          LDC6
0372         0 000 001 100          PT0
0373         0 010 011 000          LDC2
0374         1 100 001 100          PT12
0375         0 000 110 000          RETURN
0376         1 110 010 000  ERR1    ROM 7
```

MATH/USER-DEFINABLE FUNCTION BLOCK LISTING (ROM B-6)

```
CURR  BRAN   OPERATION CODE
ADDR  ADDR   BIT PATTERN

0000         0 010 010 000  SIN     ROM 1
0001         0 010 010 000  COS     ROM 1
0002         0 011 111 110  ACC30   S.ZNCC
0003         0 000 000 000          NOP
0004  0367   1 111 011 111          BRN      ACC4
0005         0 010 010 000  ATAN    ROM 1
0006         0 010 010 000  SQRT    ROM 1
0007         0 000 000 000          DUMMY
0010         1 000 101 110  ADDR    W.BXC                SAVE C
0011         0 011 001 110          W.ZTC                PREPARE TO GENERATE DS ADDRESS
0012         0 111 101 110          W.CPIC
0013         1 100 001 100          PT12
0014         1 010 011 000          LDC10                LOAD DS ADDRESS
0015         0 000 110 000          RETURN
0016         0 000 011 000  ADDR0   LDC0                 LOAD DS REGISTER ADDRESS
0017         1 001 110 000  ADDRC   ATDS                 LOAD DS ADDRESS
0020         0 010 001 110          W.BTC                RESTORE C
0021         0 000 110 000          RETURN
0022         0 001 011 000  ADDR1   LDC1                 LOAD DS REGISTER ADDRESS
0023  0017   0 000 111 111          BRN      ADDRC       CONTINUE
0024         0 000 010 000  PRINT   ROM 0
0025         0 000 000 000          DUMMY
0026  0063   0 011 001 111          BRN      XEXY        X EXCHANGE WITH Y ROUTINE
0027         0 100 000 100  PRXY    SS4                  PRINT X,Y ROUTINE
0030  0260   1 011 000 011          BRN      POPUT
0031  0321   1 101 000 111          BRN      RECAL       RECALL ACCUMULATED VALUE ROUTINE
0032  0220   1 001 000 011          BRN      CLEAR       CLEAR ACCUMULATED VALUE ROUTINE
0033         0 010 001 110  TRECT   W.BTC                TO RECTANGULAR ROUTINE
0034         0 100 101 000          CTS                  SAVE ANGLE
0035         0 010 000 100          SS2                  SET RETURN FROM TRIG FLAG
0036  0021   0 000 000 111          BRN      COS         COMPUTE COS θ
0037  0007   0 000 100 001  RCOS    JSB      ADDR
0040  0015   0 000 111 001          JSB      ADDR0       LOAD DS ADDRESS
0041         1 011 111 000          DSTC                 LOAD R IN C
0042         0 100 101 000          CTS                  SAVE R IN STACK
0043  0243   1 010 010 001          JSB      MPY61       COMPUTE X BY R COS θ
0044         1 011 110 000          DTDS                 STORE X IN DS REGISTER 0
0045         1 100 101 000          DNR                  LOAD R IN C
0046         0 110 101 000          STA                  LOAD θ IN A
0047         0 100 101 000          CTS
0050         1 110 101 110          W.AXC                LOAD θ IN C
0051         0 010 000 100          SS2
0052  0000   0 000 000 011          BRN      SIN         COMPUTE SIN θ
0053         0 110 101 000  RSIN    STA                  LOAD R TO A
0054  0243   1 010 010 001          JSB      MPY61       COMPUTE Y BY R SIN θ
0055  0007   0 000 100 001          JSB      ADDR
0056  0021   0 001 001 001          JSB      ADDR1       LOAD DS DS REGISTER 1 ADDRESS
0057         1 011 110 000          DTDS                 STORE Y IN DS 1
0060         0 100 000 100          SS4                  SET FLAG FOR SYMBOL X,Y
0061  0257   1 010 111 111          BRN      OPUT        GO TO OUTPUT
```

MATH/USER-DEFINABLE FUNCTION BLOCK LISTING (ROM B-6) - Continued

```
CURR  BRAN   OPERATION CODE
ADDR  ADDR   BIT PATTERN

0062  0246   1 010 011 011               BRN     PRRA
0063  0007   0 000 100 001   XEXY        JSB     ADDR
0064  0021   0 001 001 001               JSB     ADDR1      LOAD DS REGISTER 1 ADDRESS
0065         1 011 111 000               DSTC               LOAD Y TO C
0066         0 100 101 000               CTS                SAVE Y
0067  0007   0 000 100 001               JSB     ADDR
0070  0015   0 000 111 001               JSB     ADDR0      LOAD DS REGISTER 0 ADDRESS
0071         1 011 111 000               DSTC               LOAD X TO C
0072         0 110 101 000               STA                LOAD Y IN A
0073         1 110 101 110               W.AXC              Y IN C AND X IN A
0074         1 011 110 000               DTDS               LOAD Y IN DS REGISTER 0
0075         1 110 101 110               W.AXC              Y IN A AND X IN C
0076  0007   0 000 100 001               JSB     ADDR
0077  0021   0 001 001 001               JSB     ADDR1      LOAD DS REGISTER 1 ADDRESS
0100         1 011 110 000               DTDS               LOAD X IN DS 1
0101  0105   0 100 010 111               BRN     SUPA6
0102         0 010 101 000   SUPA60      CXM
0103         0 000 110 100   SUPA61      CLS
0104         0 111 000 100               SS7
0105         0 000 010 000   SUPA6       ROM 0
0106         1 000 010 000   DIV61       ROM 4
0107         0 010 001 110   TPOLR       W.BTC              TO POLAR ROUTINE
0110         0 100 101 000               CTS                SAVE Y
0111         0 110 001 110               W.CTA
0112  0174   0 111 110 101               JSB     SET        SET RETURN FLAG
0113  0243   1 010 010 001               JSB     MPY61      COMPUTE Y2
0114         0 100 101 000               CTS                SAVE Y2
0115  0007   0 000 100 001               JSB     ADDR
0116  0015   0 000 111 001               JSB     ADDR0      LOAD DS REGISTER 0 ADDRESS
0117         1 011 111 000               DSTC               LOAD X IN C
0120         0 110 001 110               W.CTA
0121  0243   1 010 010 001               JSB     MPY61      COMPUTE X2
0122         0 110 101 000               STA                LOAD Y2 IN A
0123  0230   1 001 100 101               JSB     ADD61      ADD THE TWO
0124         0 010 000 100               SS2
0125  0096   0 000 011 011               BRN     SORT       COMPUTE R
0126         1 011 111 000   RSORT       DSTC               LOAD X IN C
0127         1 110 101 110               W.AXC              LOAD X IN C
0130         1 011 110 000               DTDS               STORE R IN DS REGISTER 0
0131         1 110 101 110               W.AXC              LOAD R IN C. S IN A
0132         0 110 101 000               STA                Y IN A
0133         0 001 111 110               S.CM1              CHECK IF X IS NEGATIVE
0134  0137   0 101 111 111               BRN     TPOLR1     YES. PREPARE TO ADD 180
0135         1 000 100 100               RSB                NO. RESET 8
0136  0140   0 110 000 011               BRN     TPOLR2
0137         1 000 000 100   TPOLR1      SSB
0140  0105   0 100 011 001   TPOLR2      JSB     DIV61      FIND Y/X
0141         0 010 000 100               SS2
0142  0095   0 000 010 111               BRN     ATAN       COMPUTE ARCTAN Y/X
0143         1 000 010 100   RATAN       YSB                IS SB SET
0144  0147   0 110 011 111               BRN     TPOLR3     NO. CONTINUE
0145  0164   0 111 010 101               JSB     ATC1       YES. LOAD 180
0146  0230   1 001 100 101               JSB     ADD61      ADD180
0147         0 001 111 110   TPOLR3      S.CM1              CHECK IF ANGLE IS NEGATIVE
0150  0152   0 110 101 011               BRN     TPOLR4     YES. ADD 360
0151  0155   0 110 110 111               BRN     TPOLR5     NO. CONTINUE
0152  0164   0 111 010 101   TPOLR4      JSB     ATC1       LOAD 180
0153         1 010 100 110               W.CPCC             ADD TO 360
0154  0230   1 001 100 101               JSB     ADD61      ADD 360 TO RESULT
0155  0007   0 000 100 001   TPOLR5      JSB     ADDR
0156  0021   0 001 001 001               JSB     ADDR1      LOAD DS REGISTER 1 ADDRESS
0157         1 011 110 000               DTDS               STORE ANGLE IN DS REGISTER 1
0160         0 100 100 100               RS4                SET FLAG TO LOAD SYMBOL A AND R
0161  0257   1 010 111 111               BRN     OPUT       GO TO OUTPUT
0162         0 010 011 000   ADDR2       LDC2               LOAD DS REGISTER ADDESS 2
0163  0017   0 000 111 111               BRN     ADDRC
0164  0327   0 001 011 111               BRN     PRXY       PRINT X.Y GROM ROM 1
0165         0 011 001 110   ATC1        W.ZTC
0166         1 100 001 100               PT12
0167         0 001 011 000               LDC1               LOAD 180
0170         1 000 011 000               LDC8
0171         0 000 001 100               PT0
0172         0 010 011 000               LDC2
0173         0 000 110 000               RETURN
0174  0275   1 011 110 111               BRN     OPUT3      PRINT DATA RETURN
0175         0 010 101 000   SET         CXM
0176         0 000 001 100               PT0
0177         0 110 011 000               LDC6               SET RETURN FLAG
0200         0 010 101 000   SET1        CXM
0201         0 000 110 000               RETURN
0202  0107   0 100 011 111               BRN     TPOLR      TO POLAR ROUTINE FROM ROM 1
0203  0073   0 001 101 111               BRN     TRECT      TO RECT. ROUTINE FROM ROM 1
0204  0337   1 101 111 111               BRN     ACC+       ACC+ ROUTINE FROM ROM 1
0205  0340   1 110 000 011               BRN     ACC-       ACC- ROUTINE FROM ROM 1
0206         0 011 011 000   ADDR3       LDC3
0207  0017   0 000 111 111               BRN     ADDRC      LOAD DS REGISTER ADDRESS 3
0210         1 111 011 000   SYMBL       LDC15
0211         0 000 101 100               YP0
0212  0210   1 000 100 011               BRN     SYMBL
0213  0240   1 010 000 011               BRN     SYMBL0
0214  0253   0 010 101 111               BRN     RSIN       RETURN AFTER SIN
0215  0037   0 001 111 111               BRN     RCOS       RETURN AFTER COS
0216  0143   0 110 001 111               BRN     RATAN      RETURN AFTER ACTAN
0217  0126   0 101 011 011               BRN     RSQRT      RETURN AFTER SQUARE ROOT
0220         1 000 101 110   CLEAR       W.BXC              SAVE B
0221         0 011 001 110               W.ZTC              LOAD 0 IN C
0222  0007   0 000 100 001               JSB     ADDR
0223  0161   0 111 001 001               JSB     ADDR2      LOAD DS REGISTER 2 ADDRESS
0224         1 011 110 000               DTDS               LOAD 0 IN DS REGISTER 2
0225  0007   0 000 100 001               JSB     ADDR
0226  0205   1 000 011 001               JSB     ADDR3.     LOAD DS REGISTER 3 ADDRESS
0227         1 011 110 000               DTDS               LOAD 0 IN DS 3
0230  0321   1 101 000 111               BRN     RECAL      OUTPUT THE 0 CONTENT
0231         1 100 001 100   ADD61       PT12
```

MATH/USER-DEFINABLE FUNCTION BLOCK LISTING (ROM B-6) - Continued

| CURR ADDR | BRAN ADDR | OPERATION CODE BIT PATTERN | | | |
|---|---|---|---|---|---|---|
| 0232 | | 0 010 010 000 | | ROM 1 | | |
| 0233 | | 0 010 101 000 | CHECK | CXM | | CHECK FOR PROGRAM MODE ROUTINE |
| 0234 | | 1 100 001 100 | | PT12 | | |
| 0235 | | 0 001 100 010 | | P.CM1 | | |
| 0236 | 0102 | 0 100 001 011 | | BRN | SUPA60 | |
| 0237 | 0253 | 1 010 101 111 | | BRN | CHECK1 | CONTINUE TO CHECK PRINT ON COMMAND FLAG |
| 0240 | | 1 110 010 000 | SYMBL0 | ROM 7 | | PRINT SYMBOL ROUTINE |
| 0241 | | 0 000 000 000 | | DUMMY | | |
| 0242 | | 1 011 100 100 | CHECK2 | RS11 | | |
| 0243 | 0102 | 0 100 001 011 | | BRN | SUPA60 | GO BACK TO SUPERVISOR |
| 0244 | | 0 000 101 110 | MPY61 | W.ZTB | | |
| 0245 | | 1 000 010 000 | | ROM 4 | | |
| 0246 | | 0 100 100 100 | PRRA | RS4 | | |
| 0247 | 0260 | 1 011 000 011 | | BRN | POPUT | PRINT DS 0.1 WITH SYMBOL R.A |
| 0250 | | 1 110 101 110 | ACC3 | W.AXC | | COMPLIMENT ENTERED X |
| 0251 | 0002 | 0 000 001 011 | | BRN | ACC30 | |
| 0252 | | 0 000 000 000 | | DUMMY | | |
| 0253 | | 1 110 100 000 | CHECK1 | YPOC | | CHECK PRINT ON COMMAND FLAG |
| 0254 | | 1 011 010 100 | | YS11 | | |
| 0255 | 0200 | 1 000 000 011 | | BRN | SET1 | NOT SET. CONTINUE WITH OUTPUT |
| 0256 | 0242 | 1 010 001 011 | | BRN | CHECK2 | SET. GO TO SUPERVISOR |
| 0257 | 0232 | 1 001 101 101 | OPUT | JSB | CHECK | CHECK FOR PROGRAM MODE |
| 0260 | | 0 010 101 000 | POPUT | CXM | | |
| 0261 | | 0 001 001 100 | | PT1 | | |
| 0262 | | 0 001 011 000 | | LDC1 | | |
| 0263 | | 0 010 101 000 | | CXM | | |
| 0264 | | 0 100 010 100 | | YS4 | | IS S4 SET |
| 0265 | 0311 | 1 100 100 111 | | BRN | POLAR | NO. PREPARE SYMBOL R |
| 0266 | | 1 101 001 100 | | PT13 | | |
| 0267 | | 0 000 011 000 | | LDC0 | | YES. LOAD SYMBOL X |
| 0270 | 0213 | 1 000 100 011 | SYMBL1 | BRN | SYMBL | GO TO ROM 7 TO PRINT SYMBOL |
| 0271 | 0007 | 0 000 100 001 | OPUT1 | JSB | ADDR | |
| 0272 | 0015 | 0 000 111 001 | | JSB | ADDR0 | LOAD DS REGSTER 0 ADDRESS |
| 0273 | | 1 011 111 000 | OPUT4 | DSTC | | LOAD X OR R IN C |
| 0274 | 0024 | 0 001 010 011 | | BRN | PRINT | GO TO ROM A DATA PRINT ROUTINE |
| 0275 | | 0 001 001 100 | OPUT3 | PT1 | | |
| 0276 | | 0 010 101 000 | | CXM | | LOAD SECOND PRINT RETURN FLAG |
| 0277 | | 0 010 011 000 | | LDC2 | | |
| 0300 | | 0 010 101 000 | | CXM. | | |
| 0301 | | 0 100 010 100 | | YS4 | | S4 SET |
| 0302 | 0314 | 1 100 110 011 | | BRN | POLAR1 | NO. GO TO LOAD SYMBOL A |
| 0303 | | 1 101 001 100 | | PT13 | | YES. LOAD SYMBOL Y |
| 0304 | | 0 001 011 000 | | LOC1 | | |
| 0305 | 0210 | 1 000 100 011 | SYMBL2 | BRN | SYMBL | GO TO ROM 7 AND PRINT SYMBOL |
| 0306 | 0007 | 0 000 100 001 | OPUT2 | JSB | ADDR | |
| 0307 | 0021 | 0 001 001 001 | | JSB | ADDR1 | LOAD DS REGISTER 1 ADDRESS |
| 0310 | 0273 | 1 011 101 111 | | BRN | OPUT4 | LOAD Y OR A IN C |
| 0311 | | 1 101 001 100 | POLAR | PT13 | | LOAD SYMBOL R |
| 0312 | | 1 011 011 000 | | LOC11 | | |
| 0313 | 0270 | 1 011 100 011 | | BRN | SYMBL1 | GO TO PRINT SYJBOL AND DATA |
| 0314 | | 1 101 001 100 | POLAR1 | PT13 | | LOAD SYMBOL A |
| 0315 | | 0 100 011 000 | | LDC4 | | |
| 0316 | 0305 | 1 100 010 111 | | BRN | SYMBL2 | GO TO PRINT SYMBOL AND DATA |
| 0317 | 0271 | 1 011 100 111 | | BRN | OPUT1 | RETURN FROM PRINT SYMBOL IN ROM 7 |
| 0320 | 0306 | 1 100 011 011 | | BRN | OPUT2 | RETURN FROM PRINT SYMBOL IN ROM 7 |
| 0321 | 0007 | 0 000 100 001 | RECAL | JSB | ADDR | RECALL ACC ROUTINE |
| 0322 | 0161 | 0 111 001 001 | | JSB | ADDR2 | LOAD DS REGISTER 2 ADDRESS |
| 0323 | | 1 011 111 000 | | DSTC | | LOAD X IN C |
| 0324 | 0007 | 0 000 100 001 | | JSB | ADDR | |
| 0325 | 0015 | 0 000 111 001 | | JSB | ADDR0 | LOAD DS REGISTER 0 ADDRESS |
| 0326 | | 1 011 110 000 | | DTDS | | LOAD X IN DS REGISTER 0 |
| 0327 | 0007 | 0 000 100 001 | | JSB | ADDR | |
| 0330 | 0205 | 1 000 011 001 | | JSB | ADDR3 | LOAD DS REGISTER 3 ADDRESS |
| 0331 | | 1 011 111 000 | | DSTC | | LOAD Y IN C |
| 0332 | 0007 | 0 000 100 001 | | JSB | ADDR | |
| 0333 | 0021 | 0 001 001 001 | | JSB | ADDR1 | LOAD DS REGISTER 1 ADDRESS |
| 0334 | | 1 011 110 000 | | DTOS | | LOAD Y IN DS REGISTER 1 |
| 0335 | | 0 100 000 100 | | SS4 | | |
| 0336 | 0257 | 1 010 111 111 | | BRN | OPUT | GO TO OUTPUT |
| 0337 | | 1 000 000 100 | ACC+ | SSB | | |
| 0340 | | 0 010 001 110 | ACC- | W.BTC | | |
| 0341 | | 0 100 101 000 | | CTS . | | SAVE ENTERED Y IN STACK |
| 0342 | 0174 | 0 111 110 101 | | JSB | SET | SET RETURN FLAG |
| 0343 | 0007 | 0 000 100 001 | | JSB | ADDR | |
| 0344 | 0021 | 0 001 001 001 | | JSB | ADDR1 | LOAD DS REGISTER 1 ADDRESS |
| 0345 | | 1 011 110 000 | | DTDS | | STORE ENTERED IN DS REGISTER 1 |
| 0346 | | 0 110 001 110 | | W.CTA | | |
| 0347 | 0007 | 0 000 100 001 | | JSB | ADDR | |
| 0350 | 0205 | 1 000 011 001 | | JSB | ADDR3 | LOAD DS REGISTER 3 ADDRESS |
| 0351 | | 1 011 111 000 | | DSTC | | LOAD Y IN C |
| 0352 | | 1 000 010 100 | | YSB | | IS SB SET |
| 0353 | 0374 | 1 111 110 011 | | BRN | ACC1 | NO. IT IS ACC- |
| 0354 | 0230 | 1 001 100 101 | ACC2 | JSB | ADD61 | YES. GO TO ADD |
| 0355 | | 1 011 110 000 | | DTDS | | STORE FINAL Y IN DS REGISTR 3 |
| 0356 | 0007 | 0 000 100 001 | | JSB | ADDR | |
| 0357 | 0315 | 0 000 111 001 | | JSB | ADDR0 | LOAD DS EGISTER 0 ADDRESS |
| 0360 | | 1 011 111 000 | | DSTC | | LOAD X IN C? |
| 0361 | | 0 110 001 110 | | W.CTA | | LOAD X TO A |
| 0362 | 0007 | 0 000 100 001 | | JSB | ADDR | |
| 0363 | 0161 | 0 111 001 001 | | JSB | ADDR2 | LOAD DS REGISTER 2 ADDRESS |
| 0364 | | 1 011 111 000 | | DSTC | | |
| 0365 | | 1 000 010 100 | | YSB | | IS SB SET |
| 0366 | 0250 | 1 010 100 011 | | BRN | ACC3 | NO. IT IS ACC-. COMPLIMENT |
| 0367 | 0230 | 1 001 100 101 | ACC4 | JSB | ADD61 | YES. GO TO ADD |
| 0370 | | 1 011 110 000 | | DTDS | | STORE FINAL X IN DS.REGISTER 2 |
| 0371 | | 1 000 100 100 | | RSB | | RESET SB |
| 0372 | | 1 100 101 000 | | DNR | | RESTORE ENTERED Y |
| 0373 | 0105 | 0 100 010 111 | | BRN | SUPA6 | GO TO SUPERVISOR |
| 0374 | | 1 110 101 110 | ACC1 | W.AXC | | |
| 0375 | | 0 011 111 110 | | S.ZNCC | | COMPLIMENT ENTERED Y |
| 0376 | | 0 000 000 000 | | NOP | | |
| 0377 | 0354 | 1 110 110 011 | | BRN | ACC2 | |

MATH/USER-DEFINABLE FUNCTION BLOCK LISTING (ROM B-7)

```
CURR  BRAN   OPERATION CODE
ADDR  ADDR   BIT PATTERN

ØØØØ         Ø ØØØ ØØ1 1ØØ  FPRT    PTØ
ØØØ1         Ø 1Ø1 11Ø ØØØ          PRE                PRINTER ENABLE
ØØØ2         1 Ø11 Ø1Ø 1ØØ  MESB    YS11               FLAG?
ØØØ3  ØØØ2   Ø ØØØ ØØ1 Ø11          BRN       MESB     NO,WAIT
ØØØ4         1 Ø11 1ØØ 1ØØ          RS11               YES,RESET IT
ØØØ5         1 111 11Ø ØØØ          CCS                RIGHT PART OF PRINTER MASK
ØØØ6         1 1Ø1 11Ø ØØØ          TCS                LEFT PART OF PRINTER MASK
ØØØ7         Ø ØØØ 111 1ØØ          PLS                INCREMENT SECTOR COUNTER
ØØ1Ø         1 1Ø1 1Ø1 1ØØ  MESBB   YP13               LAST SECTOR
ØØ11  ØØØ2   Ø ØØØ ØØ1 Ø11          BRN       MESB     NO
ØØ12         1 Ø11 Ø1Ø 1ØØ  MESC    YS11               YES,FLAG
ØØ13  ØØ12   Ø ØØØ 1Ø1 Ø11          BRN       MESC     NO,WAIT
ØØ14         1 Ø11 1ØØ 1ØØ          RS11               YES,RESET
ØØ15         Ø Ø11 11Ø ØØØ          ADV                PAPER ADVANCE
ØØ16         Ø ØØØ 11Ø ØØØ          RETURN
ØØ17         1 1Ø1 ØØ1 1ØØ  NOTE    PT13               GENERATE MESSAGE "NOTE"
ØØ2Ø         1 ØØØ 1Ø1 11Ø          W,BXC              SAVE C REG.
ØØ21         1 111 Ø11 ØØØ  MESA    LDC15              PREPARE "NOTE 19" MESSAGE
ØØ22         Ø 111 1Ø1 1ØØ          YP7
ØØ23  ØØ21   Ø ØØ1 ØØØ 111          BRN       MESA
ØØ24         1 1ØØ Ø11 ØØØ          LDC12              N
ØØ25         1 111 Ø11 ØØØ          LDC15
ØØ26         Ø ØØØ Ø11 ØØØ          LDCØ               O
ØØ27         1 111 Ø11 ØØØ          LDC15
ØØ3Ø         1 Ø11 Ø11 ØØØ          LDC11              T
ØØ31         1 111 Ø11 ØØØ          LDC15
ØØ32         1 Ø11 Ø11 ØØØ          LDC11              E
ØØ33         1 111 Ø11 ØØØ          LDC15
ØØ34         Ø 111 11Ø ØØØ          CTT
ØØ35         Ø ØØØ 11Ø ØØØ          RETURN
ØØ36         1 1Ø1 ØØ1 1ØØ  ENTER   PT13
ØØ37         1 111 Ø11 ØØØ          LDC15              LOAD SPACE
ØØ4Ø         Ø ØØØ ØØØ ØØØ          NOP
ØØ41         1 Ø11 Ø11 ØØØ          LDC11              E
ØØ42         1 1ØØ Ø11 ØØØ          LDC12              N
ØØ43         1 Ø1Ø Ø11 ØØØ          LDC1Ø              T
ØØ44         1 Ø11 Ø11 ØØØ          LDC11              E
ØØ45         1 Ø11 Ø11 ØØØ          LDC11              R
ØØ46         1 111 Ø11 ØØØ          LDC15
ØØ47         Ø ØØØ 11Ø ØØØ  HOME    RETURN
ØØ5Ø         1 111 Ø11 ØØØ  PRANG7  LDC15
ØØ51         Ø ØØ1 ØØ1 1ØØ  PRANG3  PT1
ØØ52         1 111 Ø11 ØØØ          LDC15
ØØ53         1 111 Ø11 ØØØ          LDC15              SECOND
ØØ54         Ø 111 11Ø ØØØ          CTT                LEFT PART OF PRINT MASK
ØØ55         Ø Ø1Ø ØØ1 1ØØ          PT2
ØØ56         Ø 1ØØ ØØ1 11Ø  PRANG4  W,SLA
ØØ57         Ø ØØØ 111 1ØØ          PLS
ØØ6Ø         1 1Ø1 1Ø1 1ØØ          YP13
ØØ61  ØØ56   Ø Ø1Ø 111 Ø11          BRN       PRANG4
ØØ62         1 11Ø 1Ø1 11Ø          W,AXC              LOAD IT IN C
ØØ63         Ø ØØ1 1ØØ Ø1Ø          P,CM1              CHECK FOR LEADING ZERO
ØØ64  ØØ66   Ø Ø11 Ø11 Ø11          BRN       PRANG5   NO, CONTINUE
ØØ65         1 111 Ø11 ØØØ          LDC15              YES, BLANK IT
ØØ66         1 Ø11 ØØ1 1ØØ  PRANG5  PT11
ØØ67         1 111 Ø11 ØØØ          LDC15
ØØ7Ø         1 111 Ø11 ØØØ          LDC15
ØØ71  7777   Ø ØØØ ØØØ ØØ1          JSB       FPRT     GO TO PRINT IT
ØØ72         1 1ØØ 1Ø1 11Ø          W,AXB              RELOAD DATA
ØØ73         1 Ø1Ø 1Ø1 ØØØ          MTC
ØØ74         1 1ØØ ØØ1 1ØØ          PT12
ØØ75         Ø ØØ1 1ØØ Ø1Ø          P,CM1
ØØ76  Ø113   Ø 1ØØ 1Ø1 111          BRN       SUPA7Ø
ØØ77         Ø 1ØØ ØØØ 1ØØ          SS4
Ø1ØØ  Ø351   1 11Ø 1ØØ 111          BRN       DISPLY
Ø1Ø1         Ø ØØØ Ø1Ø ØØØ  PRINTA  ROM Ø
Ø1Ø2  Ø332   1 1Ø1 1Ø1 Ø11          BRN       ERR5     PROGRAM MODE TABLE NUMBER ERROR
Ø1Ø3  ØØ16   Ø ØØØ 111 1Ø1          JSB       NOTE     OVERFLOW ERROR MESSAGE
Ø1Ø4  Ø1Ø6   Ø 1ØØ Ø11 Ø11          BRN       ERR3
Ø1Ø5         Ø ØØØ Ø1Ø ØØØ  SUPA7   ROM Ø
Ø1Ø6         1 1Ø1 ØØ1 1ØØ  ERR3    PT13
Ø1Ø7         Ø Ø11 Ø11 ØØØ          LDC3
Ø11Ø         Ø ØØØ ØØØ ØØØ          NOP
Ø111         Ø ØØ1 Ø11 ØØØ          LDC1
Ø112  Ø125   Ø 1Ø1 Ø1Ø 111          BRN       ERR2
Ø113         1 11Ø 1Ø1 11Ø  SUPA7Ø  W,AXC
Ø114         Ø ØØØ Ø1Ø 1ØØ  WAIT    YSØ
Ø115  Ø362   1 111 ØØ1 Ø11          BRN       OPUT9    FINISH ROUTINE CLEAR STATUS ETC
Ø116         Ø ØØØ 1ØØ 1ØØ          RSØ                WAIT FOR KEY UP
Ø117  Ø114   Ø 1ØØ 11Ø Ø11          BRN       WAIT
Ø12Ø  ØØ16   Ø ØØØ 111 1Ø1          JSB       NOTE     ERROR NOTE 19 ROUTINE FROM ROM Ø
Ø121         1 1Ø1 ØØ1 1ØØ          PT13
Ø122         Ø Ø11 Ø11 ØØØ          LDC3
Ø123         Ø ØØØ ØØØ ØØØ          NOP
Ø124         Ø ØØØ Ø11 ØØØ          LDCØ
Ø125  7777   Ø ØØØ ØØØ ØØ1  ERR2    JSB       FPRT
Ø126         Ø Ø1Ø ØØ1 11Ø          W,BTC
Ø127         Ø Ø1Ø 1Ø1 ØØØ          CXM
Ø13Ø         1 1ØØ ØØ1 1ØØ          PT12
Ø131         Ø ØØØ Ø11 ØØØ          LDCØ
Ø132         Ø Ø1Ø 1Ø1 ØØØ          CXM
Ø133  Ø362   1 111 ØØ1 Ø11          BRN       OPUT9    TO RESET STATUS BIT
Ø134         Ø ØØØ ØØØ ØØØ          DUMMY
Ø135         Ø ØØØ ØØØ ØØØ          DUMMY
Ø136  Ø317   1 1Ø1 ØØØ ØØ1  OPUT    JSB       CHECK1
Ø137         Ø 1ØØ 1Ø1 ØØØ          CTS
Ø14Ø         1 1Ø1 ØØ1 1ØØ          PT13
Ø141         1 111 Ø11 ØØØ  OPUT1   LDC15
Ø142         Ø ØØØ 1Ø1 1ØØ          YPØ
Ø143  Ø141   Ø 11Ø ØØØ 111          BRN       OPUT1
Ø144         1 111 Ø11 ØØØ          LDC15
Ø145  Ø244   1 Ø1Ø Ø1Ø Ø11          BRN       OPUT3
Ø146         1 111 Ø11 ØØØ  PRANG6  LDC15
```

MATH/USER-DEFINABLE FUNCTION BLOCK LISTING (ROM B-7)—Continued

| CURR ADDR | BRAN ADDR | OPERATION CODE BIT PATTERN | | | | |
|---|---|---|---|---|---|---|
| 0147 | | 0 001 100 010 | | P.CM1 | | |
| 0150 | 0155 | 0 110 110 111 | | BRN | PRANG1 | NO. CONTINUE |
| 0151 | | 1 111 011 000 | | LDC15 | | YES. BLANK IT |
| 0152 | | 0 001 100 010 | | P.CM1 | | CHECK FOR LEADING ZERO |
| 0153 | 0155 | 0 110 110 111 | | BRN | PRANG1 | NO. CONTINUE |
| 0154 | | 1 111 011 000 | | LDC15 | | YES. BLANK IT |
| 0155 | | 0 101 001 100 | PRANG1 | PT5 | | BLANK BETWEEN DEGREE AND MINUTE |
| 0156 | | 1 111 011 000 | | LDC15 | | |
| 0157 | | 1 111 011 000 | | LDC15 | | |
| 0160 | | 0 001 100 010 | | P.CM1 | | CHECK FOR LEADING ZERO ON MINUTE |
| 0161 | 0051 | 0 010 100 111 | | BRN | PRANG3 | NO. CONTINUE |
| 0162 | 0050 | 0 010 100 011 | | BRN | PRANG7 | |
| 0163 | 0351 | 1 110 100 111 | | BRN | DISPLY | GO TO DISPLY GROM ROM 0 |
| 0164 | | 0 110 001 110 | PRANGG | W.CTA | | |
| 0165 | 0345 | 1 110 010 111 | | BRN | PRAN | GO TO CHECK PRINT ON COMMAND FLAG |
| 0166 | | 1 001 001 110 | PRANN | W.SRC | | ALIGNMENT SHIFT |
| 0167 | | 1 001 001 110 | | W.SRC | | |
| 0170 | | 1 001 001 110 | | W.SRC | | |
| 0171 | | 1 101 001 100 | | PT13 | | |
| 0172 | | 1 111 011 000 | PRANG0 | LDC15 | | LOAD LEADING SPACES |
| 0173 | | 1 001 101 100 | | YP9 | | |
| 0174 | 0172 | 0 111 101 011 | | BRN | PRANG0 | |
| 0175 | | 0 001 100 010 | | P.CM1 | | CHECK FOR LEADING ZERO ON DEGREE |
| 0176 | 0155 | 0 110 110 111 | | BRN | PRANG1 | NOM CONTINUE |
| 0177 | 0146 | 0 110 011 011 | | BRN | PRANG6 | |
| 0200 | 0242 | 1 010 001 011 | | BRN | PRIN0 | |
| 0201 | | 1 111 011 000 | PRINT | LDC15 | | |
| 0202 | | 0 011 101 100 | | YP3 | | |
| 0203 | 0201 | 1 000 000 111 | | BRN | PRINT | LOAD SPACE FOR PRINTER |
| 0204 | | 1 011 011 000 | | LDC11 | | T |
| 0205 | | 1 011 011 000 | | LDC11 | | A |
| 0206 | | 0 000 011 000 | | LDC0 | | B |
| 0207 | | 1 111 011 000 | | LDC15 | | |
| 0210 | | 0 111 110 000 | | CTT | | |
| 0211 | | 1 110 101 110 | | W.AXC | | |
| 0212 | | 0 110 001 110 | | W.CTA | | |
| 0213 | | 1 011 001 100 | | PT11 | | |
| 0214 | | 1 111 011 000 | | LDC15 | | |
| 0215 | | 1 111 011 000 | | LDC15 | | |
| 0216 | 7777 | 0 000 000 001 | | JSB | FPRT | |
| 0217 | 0344 | 1 110 010 011 | | BRN | TAB | GO BACK TO TABLE ROUTINE IN ROM 1 |
| 0220 | | 0 000 000 000 | | DUMMY | | |
| 0221 | 0035 | 0 001 111 001 | PRINT1 | JSB | ENTER | LOAD MESSAGE "ENTER" |
| 0222 | | 1 111 011 000 | PRINT3 | LDC15 | | |
| 0223 | | 0 010 101 100 | | YP2 | | |
| 0224 | 0222 | 1 001 001 011 | | BRN | PRINT3 | |
| 0225 | | 1 011 011 000 | | LDC11 | | A |
| 0226 | | 1 100 011 000 | | LDC12 | | N |
| 0227 | | 1 000 011 000 | | LDC8 | | G |
| 0230 | | 0 111 110 000 | PRINT4 | CTT | | |
| 0231 | | 1 101 001 100 | | PT13 | | |
| 0232 | | 1 111 011 000 | PRINT5 | LDC15 | | |
| 0233 | | 1 001 101 100 | | YP9 | | |
| 0234 | 0232 | 1 001 101 011 | | BRN | PRINT5 | |
| 0235 | 7777 | 0 000 000 001 | | JSB | FPRT | |
| 0236 | | 1 011 101 110 | PRINT6 | W.ZTA | | CLEAR A FOR ZERO DISPLAY |
| 0237 | | 0 000 000 000 | | NOP | | TO PREVENT CAARRY |
| 0240 | 0351 | 1 110 100 111 | | BRN | DISPLY | |
| 0241 | 0256 | 1 010 111 011 | | BRN | SYMBL | FROM ROM 6 |
| 0242 | 0324 | 1 101 010 101 | PRIN0 | JSB | CHECK2 | |
| 0243 | 0221 | 1 001 000 111 | | BRN | PRINT1 | GO TO PRINT ANGLE |
| 0244 | | 0 111 110 000 | OPUT3 | CTT | | |
| 0245 | | 0 110 101 000 | | STA | | |
| 0246 | 0305 | 1 100 010 111 | | BRN | OPUT5 | |
| 0247 | 0136 | 0 101 111 011 | | BRN | OPUT | |
| 0250 | 0016 | 0 000 111 101 | ERR1 | JSB | NOTE | ZERO DIVISOR ERROR ROUTINE |
| 0251 | | 1 101 001 100 | | PT13 | | |
| 0252 | | 0 011 011 000 | | LDC3 | | |
| 0253 | | 0 000 000 000 | | NOP | | |
| 0254 | | 0 010 011 000 | | LDC2 | | |
| 0255 | 0125 | 0 101 010 111 | | BRN | ERR2 | |
| 0256 | | 1 111 011 000 | SYMBL | LDC15 | | |
| 0257 | | 0 111 110 000 | | CTT | | |
| 0260 | | 1 101 001 100 | | PT13 | | |
| 0261 | | 1 111 011 000 | SYMBL2 | LDC15 | | |
| 0262 | | 1 001 101 100 | | YP9 | | |
| 0263 | 0261 | 1 011 000 111 | | BRN | SYMBL2 | |
| 0264 | 7777 | 0 000 000 001 | | JSB | FPRT | |
| 0265 | | 1 010 101 000 | | MTC | | |
| 0266 | | 0 001 001 100 | | PT1 | | |
| 0267 | 0273 | 1 011 101 111 | | BRN | SYMBL3 | |
| 0270 | | 1 011 100 100 | CHECK4 | RS11 | | |
| 0271 | 0351 | 1 110 100 111 | | BRN | DISPLY | PRINT ON COMMAND SET GO TO DISPLAY WITHOUT PRINT |
| 0272 | 0250 | 1 010 100 011 | | BRN | ERR1 | |
| 0273 | | 0 101 100 010 | SYMBL3 | P.CM1C | | |
| 0274 | | 0 101 100 010 | | P.CM1C | | |
| 0275 | 0317 | 1 100 111 111 | | BRN | SYMBL4 | |
| 0276 | 0316 | 1 100 111 011 | | BRN | SYMBL5 | |
| 0277 | 0016 | 0 000 111 101 | | JSB | NOTE | SQUARROOT OF A NEGATIVE NUMBER |
| 0300 | | 1 101 001 100 | | PT13 | | |
| 0301 | | 0 011 011 000 | | LDC3 | | LOAD NOTE 30 |
| 0302 | | 0 000 000 000 | | NOP | | |
| 0303 | | 0 011 011 000 | | LDC3 | | |
| 0304 | 0125 | 0 101 010 111 | | BRN | ERR2 | |
| 0305 | | 0 100 001 110 | OPUT5 | W.SLA | | |
| 0306 | | 1 110 101 110 | | W.AXC | | |
| 0307 | | 1 101 001 100 | | PT13 | | |
| 0310 | 0313 | 1 100 101 111 | | BRN | OPUT6 | |
| 0311 | | 1 110 101 110 | | W.AXC | | |
| 0312 | 0164 | 0 111 010 011 | | BRN | PRANGG | |
| 0313 | | 1 100 011 000 | OPUT6 | LDC12 | | |
| 0314 | | 1 011 001 100 | | PT11 | | |
| 0315 | 0354 | 1 110 110 011 | | BRN | OPUT7 | |
| 0316 | | 1 100 010 000 | SYMBL5 | ROM 6 | | RETURN TO ROM 6 AFTER SYMBOL PRINT 1 |
| 0317 | | 1 100 010 000 | SYMBL4 | ROM 6 | | RETURN TO ROM 6 AFTER SYMBOL PRINT 2 |

MATH/USER-DEFINABLE FUNCTION BLOCK LISTING (ROM B-7)-Continued

| LINE # | CURR ADDR | BRAN ADDR | OPERATION CODE BIT PATTERN | | | | |
|---|---|---|---|---|---|---|---|
| 211 | 0320 | | 1 110 100 000 | CHECK1 | YPOC | | PRINT ON COMMAND FLAG CHECK |
| 212 | 0321 | | 1 011 010 100 | | YS11 | | |
| 213 | 0322 | 0047 | 0 010 011 111 | | BRN | HOME | NOT SET, GO BACK TO PRINT STORE AND RECAL SYMBOL |
| 214 | 0323 | | 1 011 100 100 | | RS11 | | |
| 215 | 0324 | 0365 | 1 111 010 111 | | BRN | SUPA71 | |
| 216 | 0325 | | 1 110 100 000 | CHECK2 | YPOC | | PRINT ON COMMAND FLAG CHECK |
| 217 | 0326 | | 1 011 010 100 | | YS11 | | |
| 218 | 0327 | 0047 | 0 010 011 111 | | BRN | HOME | NOTSET, GO BACK TO PRINT ENTER ANGLE |
| 219 | 0330 | | 1 011 100 100 | | RS11 | | |
| 220 | 0331 | 0236 | 1 001 111 011 | | BRN | PRINT6 | SET, GO TO ANGLE DISPLAY WITHOUT PRINT |
| 221 | 0332 | 0016 | 0 000 111 101 | ERRS | JSB | NOTE | TABLE NUMBER ERROR |
| 222 | 0333 | | 1 101 001 100 | | PT13 | | |
| 223 | 0334 | | 0 011 011 000 | | LDC3 | | |
| 224 | 0335 | | 0 000 000 000 | | NOP | | |
| 225 | 0336 | | 0 100 011 000 | | LDC4 | | |
| 226 | 0337 | 0125 | 0 101 010 111 | | BRN | ERR2 | |
| 227 | 0340 | | 1 110 100 000 | CHECK3 | YPOC | | PRINT ON COMMAND CHECK |
| 228 | 0341 | | 1 011 010 100 | | YS11 | | |
| 229 | 0342 | 0047 | 0 010 011 111 | | BRN | HOME | NOT SET, GO BACK TO ANGLE PRINT |
| 230 | 0343 | 0272 | 1 011 100 011 | | BRN | CHECK4 | SET, GO TO DISPLY |
| 231 | 0344 | | 0 010 010 000 | TAR | ROM 1 | | |
| 232 | 0345 | | 0 100 101 110 | PRAN | W,ATB | | |
| 233 | 0346 | 0337 | 1 110 000 001 | | JSB | CHECK3 | CHECK PRINT ON COMMAND FLAG |
| 234 | 0347 | 0156 | 0 111 011 011 | | BRN | PRANN | NOT SET, GO BACK TO PRINT ANGLE |
| 235 | 0350 | | 0 000 000 000 | | DUMMY | | |
| 236 | 0351 | | 0 100 010 000 | DISPLY | ROM 2 | | |
| 237 | 0352 | | 0 010 001 110 | CLEAR3 | W,BTC | | |
| 238 | 0353 | 0105 | 0 100 010 111 | | BRN | SUPA7 | |
| 239 | 0354 | | 1 111 011 000 | OPUT7 | LDC15 | | |
| 240 | 0355 | | 0 110 010 100 | | YS6 | | |
| 241 | 0356 | 0367 | 1 111 011 111 | | BRN | OPUT2 | |
| 242 | 0357 | | 0 011 011 000 | | LDC3 | | |
| 243 | 0360 | 7777 | 0 000 000 001 | OPUT8 | JSB | FPRT | |
| 244 | 0361 | | 0 010 001 110 | | W,BTC | | |
| 245 | 0362 | | 0 000 110 100 | OPUT9 | CLS | | |
| 246 | 0363 | | 0 111 000 100 | | SS7 | | SET FIRST DIGIT ENTRY FLAG |
| 247 | 0364 | 0105 | 0 100 010 111 | | BRN | SUPA7 | |
| 248 | 0365 | | 1 000 101 110 | SUPA71 | W,BXC | | |
| 249 | 0366 | 0105 | 0 100 010 111 | | BRN | SUPA7 | |
| 250 | 0367 | | 0 100 011 000 | OPUT2 | LDC4 | | |
| 251 | 0370 | 0360 | 1 111 000 011 | | BRN | OPUT8 | |
| 252 | 0371 | 0016 | 0 000 111 101 | ERR4 | JSB | NOTE | NUMBER TOO LARGE ERROR FOR CONVERSITON |
| 253 | 0372 | | 1 101 001 100 | | PT13 | | |
| 254 | 0373 | | 0 011 011 000 | | LDC3 | | |
| 255 | 0374 | | 0 000 000 000 | | NOP | | |
| 256 | 0375 | | 0 101 011 000 | | LDC5 | | |
| 257 | 0376 | 0125 | 0 101 010 111 | | BRN | ERR2 | |
| 258 | 0377 | 0371 | 1 111 100 111 | | BRN | ERR4 | |

STATISTICS FUNCTION BLOCK LISTING (ROM 0)

| LINE # | CURR ADDR | BRAN ADDR | OPERATION CODE BIT PATTERN | | | | |
|---|---|---|---|---|---|---|---|
| 3 | 0000 | 0175 | 0 111 110 111 | | BRN | SKIP- | 0 |
| 4 | 0001 | 0351 | 1 110 100 111 | | BRN | TESPRT | |
| 5 | 0002 | 0146 | 0 110 011 011 | | BRN | XROOT | |
| 6 | 0003 | | 0 000 100 000 | PON | RMGRA | | |
| 7 | 0004 | 0003 | 0 000 001 111 | | BRN | PON | POWER ON ACCESS TO RMGRA |
| 8 | 0005 | 0257 | 1 011 000 001 | PLOT | JSB | PREP | |
| 9 | 0006 | | 1 000 001 100 | | PT8 | | |
| 10 | 0007 | | 1 010 010 000 | | ROM 5 | | |
| 11 | 0010 | 0257 | 1 011 000 001 | KEY1 | JSB | PREP | 10 HIST KEY ENTRY |
| 12 | 0011 | | 1 010 010 000 | | ROM 5 | | |
| 13 | 0012 | 0005 | 0 000 010 111 | KEY2 | BRN | PLOT | PLOT KEY ENTRY |
| 14 | 0013 | 0043 | 0 010 001 111 | KEY3 | BRN | CT | CHAR# KEY ENTRY |
| 15 | 0014 | 0257 | 1 011 000 001 | KEY4 | JSB | PREP | AXES KEY ENTRY |
| 16 | 0015 | | 1 100 010 000 | | ROM 6 | | |
| 17 | 0016 | 0257 | 1 011 000 001 | KEY5 | JSB | PREP | OFFSET/WIDTH KEY ENTRY |
| 18 | 0017 | 0323 | 1 101 001 111 | | BRN | OFST | |
| 19 | 0020 | 0257 | 1 011 000 001 | KEY6 | JSB | PREP | 20 LINEAR KEY ENTRY |
| 20 | 0021 | | 0 110 010 000 | | ROM 3 | | |
| 21 | 0022 | | 1 100 010 000 | KEY7 | ROM 6 | | RECALL KEY ENTRY |
| 22 | 0023 | 0172 | 0 011 110 011 | KEY8 | BRN | T | T KEY ENTRY |
| 23 | 0024 | 0257 | 1 011 000 001 | KEY9 | JSB | PREP | SAMPLE KEY ENTRY |
| 24 | 0025 | | 1 100 010 000 | | ROM 6 | | |
| 25 | 0026 | 0257 | 1 011 000 001 | KEY10 | JSB | PREP | VAR KEY ENTRY |
| 26 | 0027 | | 1 000 010 000 | | ROM 4 | | |
| 27 | 0030 | 0257 | 1 011 000 001 | KEY11 | JSB | PREP | 30 PAR KEY ENTRY |
| 28 | 0031 | | 0 110 010 000 | | ROM 3 | | |
| 29 | 0032 | 0144 | 0 110 010 011 | KEY12 | BRN | EVAL | EVAL KEY ENTRY |
| 30 | 0033 | 0237 | 1 001 111 111 | KEY13 | BRN | BASIC | BASIC KEY ENTRY |
| 31 | 0034 | 0257 | 1 011 000 001 | KEY14 | JSB | PREP | DELETE KEY ENTRY |
| 32 | 0035 | | 1 100 010 000 | | ROM 6 | | |
| 33 | 0036 | 0257 | 1 011 000 001 | KEY15 | JSB | PREP | DATA ENTRY KEY ENTRY |
| 34 | 0037 | | 1 100 010 000 | | ROM 6 | | |
| 35 | 0040 | | 1 010 010 100 | ERKO | YS10 | | 40 |
| 36 | 0041 | 0373 | 1 111 101 111 | | BRN | AK | |
| 37 | 0042 | 0227 | 1 010 011 111 | | BRN | PRGMR | |
| 38 | 0043 | 0257 | 1 011 000 001 | CT | JSB | PREP | CHAR# KEY |
| 39 | 0044 | | 0 010 101 000 | | CXM | | |
| 40 | 0045 | | 1 011 001 100 | | PT11 | | |
| 41 | 0046 | | 0 101 011 000 | | LDC5 | | |
| 42 | 0047 | 0345 | 1 110 010 111 | | BRN | EC | |
| 43 | 0050 | | 0 000 110 100 | RETROUT | CLS | | 50 RETURN FROM EXT. ROUTINE |
| 44 | 0051 | | 0 100 101 000 | | CTS | | DATA TO D |
| 45 | 0052 | | 0 111 001 100 | | PT7 | | |
| 46 | 0053 | 0341 | 1 111 001 001 | | JSB | CH1A | 53 STAT FLAG TO M |
| 47 | 0054 | | 0 010 101 000 | | CXM | | HENRY'S FLAG TO R17 |
| 48 | 0055 | | 1 011 110 000 | | OTDS | | |
| 49 | 0056 | | 1 100 101 000 | | DNR | | DATA TO C |
| 50 | 0057 | | 0 101 000 000 | CONT | IS2 | | |
| 51 | 0060 | | 0 111 000 000 | | PINC | | 60 INCREMENT FROM 2ND BIT |
| 52 | 0061 | | 0 111 000 000 | | PINC | | OF PRGM COUNTER |

STATISTICS FUNCTION BLOCK LISTING (ROM Ø) - Continued

| CURR ADDR | BRAN ADDR | OPERATION CODE BIT PATTERN | | | | |
|---|---|---|---|---|---|---|
| 0062 | | 0 101 101 000 | | SRI | | NEW INSTRUCTION ADDRESS TO LS BITS OF IO |
| 0063 | | 1 001 000 000 | | IS1 | | |
| 0064 | | 0 010 101 000 | | CXM | | FLAGS TO A |
| 0065 | | 0 110 001 110 | | W,CTA | | |
| 0066 | | 0 010 101 000 | | CXM | | |
| 0067 | | 0 000 000 000 | | DUMMY | | |
| 0070 | | 0 111 001 100 | | PT7 | | 7Ø |
| 0071 | | 0 010 010 000 | | ROM 1 | | SEARCH ROM 1 FOR PRGM |
| 0072 | 0257 | 1 011 000 001 | T | JSB | PREP | |
| 0073 | 173 | 0 111 111 111 | | BRN | T4 | |
| 0074 | 347 | 1 110 100 001 | XPRINT | JSB | EXN712 | |
| 0075 | | 0 000 100 000 | | RMGRA | | |
| 0076 | | 0 100 001 100 | SUITE3 | PT4 | | |
| 0077 | | 1 001 100 010 | | P,AM1 | | WHICH SAMPLE IS BEING ENTERED? |
| 0100 | 0103 | 0 100 001 111 | | BRN | ON2 | Y |
| 0101 | | 0 000 001 100 | EX3Ø | PTØ | | X |
| 0102 | 0104 | 0 100 010 011 | | BRN | ON1 | |
| 0103 | | 1 001 001 100 | ON2 | PT9 | | FETCH N2 |
| 0104 | 0362 | 1 111 000 101 | ON1 | JSB | CHBA | |
| 0105 | | 0 111 010 100 | OUT | SS7 | | SET FIRST DIGIT FLAG |
| 0106 | | 0 000 100 000 | | RMGRA | | RETURN TO HENRY'S SUPERVISOR |
| 0107 | | 1 011 111 110 | NOTE | S,ZTA | | |
| 0110 | 0112 | 0 100 101 101 | | JSB | TO | 11Ø |
| 0111 | | 1 111 111 110 | INC | S,AP1A | | SET AB TO PREVIOUSLY SET POINTER VALUE |
| 0112 | | 0 000 011 100 | | PRS | | |
| 0113 | | 0 000 101 100 | TO | YPØ | | |
| 0114 | 0111 | 0 100 100 111 | | BRN | INC | |
| 0115 | 0366 | 1 111 011 101 | NOTE3Ø | JSB | BLANK | FILL C WITH BLANKS |
| 0116 | | 1 101 001 100 | | PT13 | | 3 TO C13 |
| 0117 | | 0 011 011 000 | | LDC3 | | |
| 0120 | 0371 | 1 111 101 001 | | JSB | ADV | 12Ø ADVANCE PAPER |
| 0121 | | 1 011 001 110 | | W,SRA | | SHIFT DIGIT IN A13 TO A12 |
| 0122 | | 1 110 100 010 | | P,AXC | | A12 TO C12 |
| 0123 | | 0 010 101 000 | | CXM | | |
| 0124 | | 0 000 011 000 | | LDCØ | | Ø TO F12 AND F11 |
| 0125 | | 0 000 011 000 | | LDCØ | | |
| 0126 | | 0 010 101 000 | | CXM | | |
| 0127 | 0365 | 1 111 011 101 | | JSB | BLANK | 127 C TO T AND BLANK C |
| 0130 | | 0 111 001 100 | | PT7 | | 13Ø LOAD "NOTE" IN C |
| 0131 | | 1 100 011 000 | | LDC12 | | |
| 0132 | | 0 101 001 100 | | PT5 | | |
| 0133 | | 0 000 011 000 | | LDCØ | | |
| 0134 | | 0 011 001 100 | | PT3 | | |
| 0135 | | 1 011 011 000 | | LDC11 | | |
| 0136 | | 0 001 001 100 | | PT1 | | |
| 0137 | | 1 011 011 000 | | LDC11 | | |
| 0140 | 0372 | 1 111 100 101 | | JSB | PRINT | 14Ø PRINT "NOTE 3X" |
| 0141 | | 0 111 010 100 | | YS7 | | IS THIS NOTE 3Ø? |
| 0142 | 0217 | 1 000 111 111 | | BRN | FIN | NO, GO THROUGH NORMAL EXIT |
| 0143 | 0101 | 0 100 000 111 | | BRN | EX3Ø | YES, STRAIGHT OUT |
| 0144 | 0257 | 1 011 000 001 | FVAL | JSB | PREP | |
| 0145 | | 1 010 010 000 | | ROM 5 | | |
| 0146 | 0347 | 1 110 100 001 | XROOT | JSB | EXN712 | EXCHANGE FLAGS |
| 0147 | | 1 100 001 100 | | PT12 | | 1/2 TO C |
| 0150 | | 0 011 001 110 | | W,ZTC | | 15Ø |
| 0151 | | 0 101 011 000 | | LDC5 | | |
| 0152 | | 0 011 001 100 | | PT3 | | |
| 0153 | | 0 101 101 010 | | A,CMIC | | |
| 0154 | | 1 000 101 110 | | W,BXC | | 1/2 TO B |
| 0155 | | 1 010 101 000 | | MTC | | HENRY'S FLAG TO C |
| 0156 | | 0 000 011 000 | | LDCØ | | Ø --> F3 |
| 0157 | | 0 101 011 000 | | LDC5 | | 5 --> F2 |
| 0160 | | 0 000 100 000 | | RMGRA | | 16Ø EXIT TO X TO Y |
| 0161 | | 0 010 101 000 | START | CXM | | STAT FLAGS TO M |
| 0162 | | 0 111 110 000 | | CTT | | LOAD STARTING ADDRESS TO PRGM COUNTER |
| 0163 | | 0 101 000 000 | | IS2 | | |
| 0164 | | 0 100 001 000 | | SLT | | |
| 0165 | | 1 000 000 000 | | TTP | | |
| 0166 | | 1 001 000 000 | | IS1 | | |
| 0167 | | 1 010 100 000 | | SBL | | SET BUSY LIGHT |
| 0170 | | 1 000 101 000 | | DSOF | | TURN DISPLAY OFF |
| 0171 | | 0 000 101 000 | | DSTO | | TURN DISPLAY ON |
| 0172 | 257 | 0 010 111 111 | | BRN | CONT | |
| 0173 | | 1 000 010 000 | T4 | ROM 4 | | |
| 0174 | | 0 000 000 000 | | DUMMY | | |
| 0175 | | 0 101 000 000 | SKIP- | IS2 | | DECREMENT THE PRGM COUNTER FROM |
| 0176 | | 1 001 001 000 | | PDEC | | THE 2ND BIT A NUMBER OF TIMES |
| 0177 | | 1 001 001 000 | | PDEC | | EQUAL TO THE PREVIOUSLY SET POINTER |
| 0200 | | 1 001 000 000 | | IS1 | | 2ØØ |
| 0201 | | 0 100 011 100 | | PRS | | |
| 0202 | | 0 000 101 100 | | YPØ | | |
| 0203 | 0175 | 0 111 110 111 | | BRN | SKIP- | 2Ø3 |
| 0204 | 0257 | 0 010 111 111 | | BRN | CONT | |
| 0205 | 0107 | 0 100 011 111 | | BRN | NOTE | RETURN FROM ROM 7 ROUTINES |
| 0206 | | 0 000 110 000 | | RETURN | | |
| 0207 | | 1 011 111 110 | PRGMR | S,ZTA | | Ø TO A13 FOR NOTE 3Ø GENERATION |
| 0210 | | 0 101 000 000 | | IS2 | | 21Ø |
| 0211 | 177 | 1 000 000 001 | | LTO | 4ØØ | |
| 0212 | | 0 110 100 000 | | GTOE | | EGRESS TO PRGMR IN IO? |
| 0213 | | 1 001 000 000 | | IS1 | | PRGMR NOT CONNECTED PRINT NOTE 3Ø |
| 0214 | | 0 000 110 100 | | CLS | | SET FLAG FOR NOTE 3Ø TERMINATION |
| 0215 | | 0 111 000 100 | | SS7 | | |
| 0216 | 0115 | 0 100 110 111 | | BRN | NOTE3Ø | |
| 0217 | | 1 000 001 100 | FIN | PTA | | FETCH LAST PRGM ADDRESS |
| 0220 | 0361 | 1 111 001 001 | | JSB | CH1A | 22Ø AND RESTORE IT TO |
| 0221 | | 0 111 110 000 | | CTT | | THE PRGM COUNTER. |
| 0222 | | 1 000 000 000 | | TTP | | |
| 0223 | | 0 111 001 100 | | PT7 | | HENRY'S FLAGS TO C |
| 0224 | 361 | 1 111 001 001 | | JSB | CH1A | |
| 0225 | | 0 010 101 000 | | CXM | | HENRY'S FLAGS TO M; STAT FLAGS TO C |
| 0226 | | 1 011 110 000 | | DTOS | | STORE STAT FLAGS IN R17 |
| 0227 | | 1 110 101 110 | | W,AXC | | STAT FLAGS TO A |
| 0230 | | 0 010 101 000 | | CXM | | 23Ø HENRY'S FLAGS TO C |
| 0231 | | 1 110 100 010 | | P,AXC | | |
| 0232 | | 0 111 001 100 | | PT7 | | |
| 0233 | | 0 011 000 010 | | P,ZTC | | SET FLAG FOR MAIN UNIT CONTROL |
| 0234 | | 1 011 001 100 | | PT11 | | IMPOSE DIGIT INTERP. ON HENRY |

STATISTICS FUNCTION BLOCK LISTING (ROM Ø) – Continued

```
CURR   BRAN    OPERATION CODE
ADDR   ADDR    BIT PATTERN

0235           1 114 1Ø2 Ø1Ø          P.AXC
0236   0355    1 113 112 111          BRN     SUITE1
0237   0257    1 Ø11 ØØ2 ØØ1  BASIC   JSB     PREP
0240           Ø 1ØØ Ø1Ø ØØ2          ROM 2                 240
0241   0312    Ø Ø11 1Ø1 Ø11          BRN     KEY1          ACCESS TO STAT FUNCTIONS
0242   0312    Ø ØØ4 1Ø1 Ø11          BRN     KEY2          IN PROGRAM MODE
0243   0313    Ø ØØ3 1Ø1 111          BRN     KEY3
0244   0314    Ø ØØ1 112 Ø11          BRN     KEY4
0245   0316    Ø Ø2Ø 111 Ø11          BRN     KEY5
0246   0227    Ø Ø41 2ØØ Ø11          BRN     KEY6
0247   0222    1 ØØ1 Ø21 Ø11          BRN     KEY7
0250   0223    Ø ØØ1 ØØ1 111          BRN     KEY8          250
0251   0324    Ø ØØ1 Ø1Ø Ø11          BRN     KEY9
0252   0226    Ø ØØ1 Ø11 Ø11          BRN     KEY1Ø
0253   0230    Ø ØØ1 1ØØ Ø11          BRN     KEY11
0254   0232    Ø ØØ1 1Ø1 Ø11          BRN     KEY12
0255   0333    Ø ØØ1 1Ø1 111          BRN     KEY13
0256   0334    Ø ØØ1 11Ø Ø11          BRN     KEY14
0257   0336    Ø ØØ1 111 Ø11          BRN     KEY15         257
0260           1 1ØØ 1Ø1 11Ø  PREP    W.AXB                 260 DIGIT ENTRY TO A
0261           1 11Ø 1Ø1 ØØ3          STA                       D TO A
0262           1 1ØØ 1Ø1 ØØØ          CTS                   DATA TO D
0263           Ø Ø11 ØØ1 11Ø          W.ZTC                     ADDRESS R19
0264           1 111 1Ø1 11Ø          W.CPIC
0265           1 1ØØ ØØ1 1ØØ          PT12
0266           1 Ø11 Ø11 ØØ3          LOC11
0267           Ø ØØØ 11Ø 1ØØ          CLS
0270           Ø 1Ø1 1ØØ Ø1Ø          P.CMIC                270
0271           1 ØØ1 11Ø ØØØ          ATDS
0272           Ø 1ØØ 1Ø1 ØØØ          CTS                       ADDRESS TO D
0273           1 11Ø 1Ø1 11Ø          W.AXC
0274           1 Ø11 11Ø ØØØ          DTDS                      STORE D-REG IN R19
0275           1 1ØØ 1Ø1 ØØ4          DNR                       BRING DOWN ADDRESS
0276           Ø 1Ø1 1ØØ Ø1Ø          P.CMIC                    DECREMENT ADDRESS
0277           1 ØØ1 11Ø ØØØ          ATDS                      ADDRESS R18
0300           Ø 1ØØ 1Ø1 ØØØ          CTS.                  300 ADDRESS TO D
0301           Ø 1Ø1 ØØØ ØØ2          IS2                       PRGM ADDRESS TO C
0302           1 ØØØ 1Ø1 ØØØ          PTT
0303           1 ØØ1 ØØØ ØØ2          IS1
0304           Ø 111 111 ØØ3          TTC
0305           1 Ø11 112 ØØ3          DTDS                      STORE PRGM ADDRESS IN R18
0306           1 1ØØ 1Ø1 ØØØ          DNR                       BRING DOWN ADDRESS
0307           Ø 1Ø1 1ØØ Ø1Ø          P.CMIC                    DECREMENT ADDRESS
0310           1 ØØ1 11Ø ØØØ          ATDS                  310 ADDRESS R17
0311           1 1ØØ ØØ1 1ØØ          PT12
0312           1 Ø11 111 ØØØ          DSTC                      FETCH STAT FLAGS FROM R17
0313           1 11Ø 1Ø1 11Ø          W.AXC                     STAT FLAGS TO A
0314           Ø Ø1Ø 1Ø1 ØØØ          CXM                       HENRY'S FLAGS TO C
0315           1 Ø11 11Ø ØØØ          DTDS                      STORE HENRY'S FLAGS
0316           1 11Ø 1ØØ Ø1Ø          P.AXC                     OPERATION MODE TO STAT FLAG
0317           1 11Ø 1Ø1 11Ø          W.AXC                     NEW STAT FLAGS TO A AND M
0320           Ø 11Ø ØØ1 11Ø          W.CTA                 320
0321           Ø Ø1Ø 1Ø1 ØØØ          CXM                       DIGIT ENTRY IN RØ, DATA IN D
0322           Ø ØØØ 11Ø ØØØ          RETURN
0323           Ø 1ØØ ØØ1 1ØØ  OFST    PT4                       OFFSET KEY
0324           1 1Ø1 111 Ø1Ø          XS.AM1A
0325           1 1Ø1 111 Ø1Ø          AS.AM1A                   IS THIS IN 1 VAR MODE?
0326   0127    Ø 1ØØ Ø11 111          BRN     NOTE          NO. PRINT NOTE 34
0327   0371    1 111 1Ø1 ØØ1          JSB     ADV           YES. PRINT "OF ="
0330   0366    1 111 Ø11 1Ø1          JSB     BLANK         330
0331           1 Ø1Ø ØØ1 1ØØ          PT1Ø
0332           Ø Ø1Ø Ø11 ØØØ          LOC2
0333   0366    1 111 Ø11 1Ø1          JSB     BLANK         333
0334           Ø Ø1Ø ØØ1 1ØØ          PT2
0335           Ø ØØØ Ø11 ØØØ          LOCØ
0336           Ø Ø11 Ø11 ØØØ          LOC3
0337   0372    1 111 1ØØ 1Ø1          JSB     PRINT
0340           Ø Ø1Ø 1Ø1 ØØØ          CXM                   340
0341           1 1Ø1 ØØ1 1ØØ          PT13.
0342           Ø Ø11 Ø11 ØØØ          LOC3                      SET FLAG FOR HISTOGRAM
0343           Ø 11Ø ØØ1 1ØØ          PT6
0344           Ø ØØ1 Ø11 ØØØ          LOC1                      SET FLAG FOR OFFSET ENTRY
0345           Ø Ø1Ø 1Ø1 ØØØ  FC      CXM
0346   0217    1 ØØ3 111 111          BRN     FIN
0347           1 1ØØ Ø1Ø ØØØ  DIGIT   ROM 6                 DIGIT EGRESS TO ROM 6
0350           1 111 Ø1Ø ØØØ  EXM712  ROM 7                 350
0351           1 1ØØ ØØ1 1ØØ  TESPRT  PT12
0352           1 ØØ1 1ØØ Ø1Ø          P.AM1
0353   0257    Ø Ø1Ø 111 111          BRN     CONT
0354   0074    Ø Ø11 11Ø Ø11          BRN     XPRINT
0355           Ø Ø1Ø 1Ø1 ØØØ  SUITE1  CXM                   HENRYS FLAGS TO M
0356           1 ØØ1 ØØ1 1ØØ          PT9                   RETURN STORED D REGISTER
0357   0361    1 111 ØØ1 ØØ1          JSB     CH1A
0360   0365    1 111 Ø1Ø 111          BRN     SUITE2
0361           1 ØØØ Ø1Ø 1ØØ  CHØA    SSB
0362           1 11Ø Ø1Ø ØØØ  CH1A    ROM 7
0363   0257    1 Ø11 ØØØ ØØ1          JSB     PREP          DIGIT INTERPRETATION ENTRY
0364   0347    1 11Ø Ø11 111          BRN     DIGIT
0365           Ø 1ØØ 1ØØ ØØØ  SUITE2  CTS
0366   0376    Ø Ø11 111 Ø11          BRN     SUITE3
0367           1 11Ø Ø1Ø ØØØ  BLANK   ROM 7
0370           Ø ØØØ ØØØ ØØ1          DUMMY                 370
0371           1 ØØØ ØØØ 1ØØ  PRINT   SSB
0372           1 11Ø Ø1Ø ØØØ  ADV     ROM 7
0373           Ø Ø11 Ø1Ø ØØØ  AK      TKRA.
0374   0217    1 ØØ3 111 111          BRN     FIN
0375   0127    Ø 1ØØ Ø11 111          BRN     NOTE
0376   0257    Ø Ø1Ø 111 111          BRN     CONT
0377           Ø ØØØ ØØØ ØØØ          DUMMY                 377
```

STATISTICS FUNCTION BLOCK LISTING (ROM 1)

```
CURR  BRAN   OPERATION CODE
ADDR  ADDR   BIT PATTERN

0000  0166   0 111 011 011   PXACC     BRN      MINCN     0 INCREMENT N
0001         0 011 001 100             PT3
0002  0161   0 111 000 111             BRN      MSTORE    STORE X IN R13
0003  0330   1 101 100 011             BRN      MSUM1     ADD TO SX
0004  0343   0 010 001 111             BRN      MSUM2     ADD TO SX2
0005  0213   1 000 001 111             BRN      MVAT1     IF NOT IN 2 VARIABLE MODE SKIP 2 STEPS
0006  0111   0 100 100 111             BRN      MSUM3     ADD TO SX4
0007  0114   0 100 110 011             BRN      MSUM4     ADD TO SX3
0010         0 011 001 100             PT3                10
0011  0163   0 111 001 111             BRN      MFCH      FETCH X
0012  0376   1 111 111 011             BRN      XPRINT    PRINT X
0013  0213   1 000 101 111             BRN      MTSDEL    CANCEL DELETE IF DATA SET IS COMPLETE
0014         1 010 010 000   XPLOT     ROM 5              TO X PLOT
0015  0255   1 010 111 001   MSUM5     JSB      FILREG    Y,Y,Y,Y
0016         0 100 001 100             PT4
0017  0332   1 101 101 011             BRN      COMS      STORE SY Y, Y, Y, Y,
0020  0164   0 111 010 011   PYACC     BRN      MINCN2    20 INCREMENT N2
0021         0 100 001 100             PT4
0022  0161   0 111 000 111             BRN      MSTORE    STORE Y IN R14
0023  0315   1 001 110 111             BRN      MSUM5     ADD TO SY
0024  0340   0 010 000 011             BRN      MSUM6     ADD TO SY2
0025  0235   1 000 010 111             BRN      MVAT2     IF NOT IN 2 VARIABLE MODE SKIP 6 STEPS
0026  0355   0 010 110 111             BRN      MSUM7
0027  0266   0 011 011 011             BRN      MSUM8     ADD TO SX2Y
0030  0223   1 001 001 111             BRN      MPLOT?    TEST FOR PLOT AND PEN RAISING
0031  0263   1 011 001 111             BRN      MLODCO    LOAD COORDINATES
0032  0275   1 011 110 111             BRN      MCHAR     PLOT POINT
0033  0250   1 010 100 011             BRN      XPENUP    RAISE PEN
0034         0 100 001 100             PT4                FETCH Y
0035  0163   0 111 001 111             BRN      MFCH
0036  0376   1 111 111 011             BRN      XPRINT    PRINTY
0037  0213   1 000 101 111             BRN      MTSDEL    CANCEL DELETE
0040  0355   1 110 111 001   MSUM6     JSB      MULT      Y2, Y2, Y, Y
0041         0 101 001 100             PT5                40
0042  0332   1 101 101 011             BRN      COMS      STORE SY2 Y, Y, Y, Y
0043  0355   1 110 111 001   MSUM2     JSB      MULT      X2, X2, X, X
0044         0 100 101 000             CTS
0045         1 100 101 000             DNR                X2, X2, X, X2
0046         0 010 001 100             PT2
0047  0332   1 101 101 011             BRN      COMS      STORE SX2 X2, X2, X, X2
0050         1 011 110 000   SUITE2    DTDS               50 STORE NEW FREQ.
0051         0 001 001 100   HPXACC    PT1                LOAD STARTING ADDRESS FOR PXACC
0052         1 111 011 000             LOC15
0053         1 111 011 000             LOC15              53
0054  0155   0 110 110 111             BRN      ROMID
0055         0 011 001 100   MSUM7     PT3
0056  0360   1 111 000 101             JSB      CHIA      X, Y, Y, Y
0057         1 100 101 000             DNR
0060         0 110 101 000             STA                60
0061         0 110 101 000             STA                Y, X, X, X
0062  0355   1 110 111 001             JSB      MULT      XY, XY
0063         0 100 101 000             CTS                XY, XY, XY, X
0064         0 011 001 100             PT3
0065  0332   1 101 101 011             BRN      COMS      STORE SXY X, X, XY, X
0066         1 100 101 000   MSUM8     DNR                X, XY, X, XY
0067  0355   1 110 111 001             JSB      MULT      X2Y, X2Y
0070         1 000 001 100             PT8                70
0071  0332   1 101 101 011             BRN      COMS      STORE SX2Y
0072         1 101 100 010             P,AM1A             IS PRGM IN ROM 1?
0073  0375   0 011 110 111             BRN      R2        NO
0074         0 001 010 000             EERA               YES
0075         0 100 010 000   R2        ROM 2
0076         0 010 101 000   TESTCOR   CXM                FLAG TO A
0077         0 110 001 110             W,CTA
0100         0 010 101 000             CXM                100
0101         0 101 001 100             PT5
0102         1 001 100 010             P,AM1              IS THIS IN DELETE MODE?
0103  0135   0 100 010 111             BRN      COR       YES, SUBTRACT D FROM C
0104  0354   1 111 010 011             BRN      PLUS      NO, ADD D AND C
0105         0 110 101 000   COR       STA
0106         0 100 101 000             CTS
0107         1 110 101 110             W,AXC
0110  0363   1 111 001 111             BRN      MINUS     110
0111  0355   1 110 111 001   MSUM3     JSB      MULT      X4, X4, X, X2
0112         0 111 001 100             PT7
0113  0332   1 101 101 011             BRN      COMS      STORE SX4  X2, X2, X, X2
0114         1 100 101 000   MSUM4     DNR                X2, X, X2, X2
0115  0355   1 110 111 001             JSB      MULT      X3, X3
0116         0 110 001 100             PT6
0117  0332   1 101 101 011             BRN      COMS      STORE SX3  X2, X2, X2, X2
0120  0344   1 110 010 101   MFREN     JSB      DS        120 ACCESS TO MFREN
0121         0 100 101 000   CHALK     CTS                ACCESS TO CHALK FROM ROM 6
0122         0 100 101 000             CTS                I, I, I, DATA
0123         0 011 001 110             W,ZTC
0124         0 111 101 110             W,CPIC
0125         1 100 001 100             PT12
0126         0 001 011 000             LOC1
0127         0 011 011 000             LOC3               127  13, I, I, DATA
0130  0363   1 111 010 001             JSB      PLUS      130 I+13, ", I, DATA
0131         1 100 001 100             PT12
0132         0 101 100 010             P,CMIC
0133         0 101 100 010             P,CMIC             IS CELL I IN CHIP 10 OR11
0134  0137   0 101 111 111             BRN      LD11      11
0135         1 010 011 000             LOC10              10
0136  0140   0 110 000 011             BRN      F
0137         1 011 011 000   LD11      LOC11
0140         1 001 110 000   F         ATDS               140 ADDRESS CELL I
0141         0 110 101 000             STA
0142         1 011 111 000             DSTC               FREQ(I), I, DATA, DATA
0143         1 001 010 100             YS9                SHOULD FREQ BE INCREMENTED?
0144  0375   1 111 110 111             BRN      CONT      NO
0145         1 100 001 100             PT12               YES
0146         0 110 001 110             W,CTA
0147         0 011 001 110             W,ZTC
```

STATISTICS FUNCTION BLOCK LISTING (ROM 1) - Continued

| CURR ADDR | BRAN ADDR | OPERATION CODE BIT PATTERN | | | | |
|---|---|---|---|---|---|---|
| Ø15Ø | | Ø ØØ1 Ø11 ØØØ | | LDC1 | | 15Ø |
| Ø151 | Ø316 | 1 1ØØ 111 Ø11 | | BRN | SUITE1 | |
| Ø152 | | Ø ØØ1 ØØ1 1ØØ | RPYACC | PT1 | | LOAD STARTING ADDRESS FOR PYACC PRGM |
| Ø153 | | Ø ØØØ Ø11 ØØØ | | LDCØ | | |
| Ø154 | | 1 111 Ø11 ØØØ | | LDC15 | | |
| Ø155 | | Ø Ø1Ø 1Ø1 ØØØ | ROMID | CXM | | |
| Ø156 | | 1 111 ØØ1 1ØØ | | PT7 | | |
| Ø157 | | Ø ØØØ Ø11 ØØØ | | LDCØ | | |
| Ø16Ø | | Ø ØØØ Ø1Ø ØØØ | | ROM Ø | | 16Ø |
| Ø161 | | Ø 1ØØ Ø1Ø ØØØ | MSTORE | ROM 2 | | |
| Ø162 | | Ø ØØØ ØØØ ØØØ | | DUMMY | | |
| Ø163 | | Ø 1ØØ Ø1Ø ØØØ | MECH | ROM 2 | | |
| Ø164 | | 1 ØØ1 ØØ1 1ØØ | MINCN2 | PT9 | | -, DATA, -, - |
| Ø165 | Ø167 | 1 111 Ø11 111 | | BRN | CIN | |
| Ø166 | | Ø ØØØ ØØ1 1ØØ | MINCN | PTØ | | |
| Ø167 | Ø357 | 1 111 ØØØ ØØ1 | CIN | JSB | CHØA | N, DATA |
| Ø17Ø | | 1 11Ø 1Ø1 11Ø | | W,AXC | | 17Ø |
| Ø171 | | Ø Ø11 ØØ1 11Ø | | W,ZTC | | |
| Ø172 | | 1 1ØØ ØØ1 1ØØ | | PT12 | | |
| Ø173 | | Ø ØØ1 Ø11 ØØØ | | LDC1 | | |
| Ø174 | | Ø 1ØØ 1Ø1 ØØØ | | CTS | | 1, 1, DATA, - |
| Ø175 | | 1 11Ø 1Ø1 11Ø | | W,AXC | | N, 1, DATA |
| Ø176 | Ø375 | Ø Ø11 111 ØØ1 | | JSB | TESTCOR | NEW N, M, DATA |
| Ø177 | | 1 Ø11 11Ø ØØØ | | DTDS | | |
| Ø2ØØ | | 1 1ØØ 1Ø1 ØØØ | | DNR | | 2ØØ |
| Ø2Ø1 | | 1 1ØØ 1Ø1 ØØØ | | DNR | | |
| Ø2Ø2 | Ø375 | 1 111 11Ø 111 | | BRN | CONT | |
| Ø2Ø3 | | Ø Ø1Ø ØØ1 1ØØ | MVAT1 | PT2 | | 2Ø3 |
| Ø2Ø4 | Ø2Ø6 | 1 ØØØ Ø11 Ø11 | | BRN | CVT | |
| Ø2Ø5 | | Ø 11Ø ØØ1 1ØØ | MVAT2 | PT6 | | |
| Ø2Ø6 | | 1 1Ø1 111 Ø1Ø | CVT | XS,AM1A | | |
| Ø2Ø7 | | 1 1Ø1 111 Ø1Ø | | XS,AM1A | | |
| Ø21Ø | | 1 1Ø1 111 Ø1Ø | | XS,AM1A | | 21Ø IS THIS IN 2 VAR MODE? |
| Ø211 | Ø347 | 1 11Ø Ø11 111 | | BRN | SKIP+ | NO |
| Ø212 | Ø375 | 1 111 11Ø 111 | | BRN | CONT | YES |
| Ø213 | | Ø Ø11 ØØ1 1ØØ | MISDEL | PT3 | | |
| Ø214 | | 1 ØØ1 1Ø1 Ø1Ø | | P,AM1 | | IS DATA SET COMPLETE? |
| Ø215 | Ø373 | 1 111 1Ø1 111 | | BRN | FIN | NO |
| Ø216 | | Ø Ø1Ø 1Ø1 ØØØ | | CXM | | YES, CANCEL DELETE, Ø --> FS |
| Ø217 | | Ø 1Ø1 ØØ1 1ØØ | | PT5 | | |
| Ø22Ø | | Ø Ø11 ØØØ Ø1Ø | | P,ZTC | | 22Ø |
| Ø221 | | Ø Ø1Ø 1Ø1 ØØØ | | CXM | | |
| Ø222 | Ø373 | 1 111 1Ø1 111 | | BRN | FIN | |
| Ø223 | | 1 ØØØ ØØ1 1ØØ | MPLOT? | PTØ | | |
| Ø224 | | 1 ØØ1 1Ø1 Ø1Ø | | P,AM1 | | IS THIS IN PLOTTING MODE? |
| Ø225 | Ø23Ø | 1 ØØ1 1Ø1 Ø11 | | BRN | TIN | YES |
| Ø226 | | Ø Ø11 ØØ1 1ØØ | | PT3 | | NO |
| Ø227 | Ø347 | 1 11Ø Ø11 111 | | BRN | SKIP+ | SKIP TO PRINT |
| Ø23Ø | | Ø 1Ø1 ØØ1 1ØØ | TIN | PT5 | | 23Ø |
| Ø231 | | 1 1Ø1 1Ø1 Ø1Ø | | P,AM1A | | IS THIS IN DELETE MODE? |
| Ø232 | Ø25Ø | 1 Ø1Ø 1Ø1 Ø11 | | BRN | XPENUP | YES, RAISE PEN |
| Ø233 | | Ø ØØØ ØØ1 1ØØ | | PTØ | | NO |
| Ø234 | | Ø 1Ø1 Ø11 ØØØ | | LDC5 | | |
| Ø235 | | Ø ØØØ ØØ1 1ØØ | | PTØ | | |
| Ø236 | | Ø ØØ1 ØØØ Ø1Ø | | P,AMC | | IS PLOT TO BE CONNECTED? |
| Ø237 | Ø241 | 1 Ø1Ø ØØØ 111 | | BRN | NT | YES, TEST N |
| Ø24Ø | Ø25Ø | 1 Ø1Ø 1Ø1 Ø11 | | BRN | XPENUP | 24Ø NO, RAISE PEN |
| Ø241 | Ø357 | 1 111 ØØØ ØØ1 | NT | JSB | CHØA | FETCH N |
| Ø242 | | 1 Ø11 1Ø1 11Ø | | W,ZTA | | |
| Ø243 | | 1 1ØØ ØØ1 1ØØ | | PT12 | | |
| Ø244 | | 1 111 1ØØ Ø1Ø | | P,AP1A | | |
| Ø245 | | Ø 1Ø1 ØØ1 11Ø | | W,AMCC | | N-1 TO C |
| Ø246 | | Ø ØØ1 1Ø1 11Ø | | W,CM1 | | IS N=1? |
| Ø247 | Ø314 | Ø ØØØ 11Ø Ø11 | | BRN | XPLOT | NO, DROP PEN |
| Ø25Ø | | 1 Ø11 ØØ1 1ØØ | XPENUP | PT11 | | 25Ø, YES, RAISE PEN |
| Ø251 | Ø314 | Ø ØØØ 11Ø Ø11 | | BRN | XPLOT | |
| Ø252 | | Ø ØØØ ØØØ ØØØ | | DUMMY | | |
| Ø253 | | Ø ØØØ ØØØ ØØØ | | DUMMY | | |
| Ø254 | | Ø ØØØ ØØØ ØØØ | | DUMMY | | |
| Ø255 | | Ø ØØØ ØØØ ØØØ | | DUMMY | | |
| Ø256 | | Ø 1ØØ 1Ø1 ØØØ | FILREG | CTS | | |
| Ø257 | | Ø 1ØØ 1Ø1 ØØØ | | CTS | | 257 |
| Ø26Ø | | Ø 1ØØ 1Ø1 ØØØ | | CTS | | 26Ø |
| Ø261 | | Ø Ø11 1ØØ 1ØØ | | RSI | | RETURN FROM ROM 7 ROUTINES |
| Ø262 | | Ø ØØØ 11Ø Ø1Ø | | RETURN | | |
| Ø263 | | Ø Ø11 ØØ1 1ØØ | MLODCØ | PT3 | | FETCH X DATA |
| Ø264 | Ø36Ø | 1 111 ØØØ 1Ø1 | | JSB | CH1A | |
| Ø265 | | Ø 1ØØ 1Ø1 ØØØ | | CTS | | |
| Ø266 | Ø344 | 1 11Ø Ø1Ø 1Ø1 | | JSB | DS | ADDRESS DEDICATES STORAGE |
| Ø267 | | 1 1ØØ 1Ø1 ØØØ | | DNR | | |
| Ø27Ø | | 1 Ø11 11Ø ØØØ | | DTDS | | 27Ø STORE X DATA IN DS |
| Ø271 | | Ø 1ØØ ØØ1 1ØØ | | PT4 | | FETCH Y DATA |
| Ø272 | Ø36Ø | 1 111 ØØØ 1Ø1 | | JSB | CH1A | |
| Ø273 | | 1 Ø1Ø ØØ1 1ØØ | | PT1Ø | | |
| Ø274 | Ø314 | Ø ØØØ 11Ø Ø11 | | BRN | XPLOT | SEND PEN TO NEW COORDINATES |
| Ø275 | | Ø 1Ø1 ØØ1 1ØØ | MCHAR | PT5 | | |
| Ø276 | | 1 ØØ1 1Ø1 Ø1Ø | | P,AM1 | | IS THIS IN DELETE MODE? |
| Ø277 | Ø312 | 1 1ØØ 1Ø1 Ø11 | | BRN | SCRATCH | YES, SET UP SCRATCH CHARACTER |
| Ø3ØØ | | Ø ØØØ ØØ1 1ØØ | | PTØ | | 3ØØ N, SET UP SELECTED CHARACTER |
| Ø3Ø1 | | Ø 1Ø1 Ø11 ØØØ | | LDC5 | | |
| Ø3Ø2 | | Ø ØØØ ØØ1 1ØØ | | PTØ | | |
| Ø3Ø3 | | 1 111 ØØØ Ø1Ø | | P,APCA | | IS PLOT CONNECTED |
| Ø3Ø4 | Ø3Ø6 | 1 1ØØ Ø11 Ø11 | | BRN | ATC | YES, |
| Ø3Ø5 | | 1 1Ø1 ØØØ Ø1Ø | | P,AMCA | | NO, RESTORE PLOT CHARACTER |
| Ø3Ø6 | | 1 11Ø 1ØØ Ø1Ø | ATC | P,AXC | | CHARACTER TO C |
| Ø3Ø7 | | 1 Ø11 1Ø1 11Ø | CTA | W,ZTA | | ARRANGE A FOR XPLOT |
| Ø31Ø | | 1 11Ø 1ØØ Ø1Ø | | P,AXC | | 31Ø |
| Ø311 | Ø314 | Ø ØØØ 11Ø Ø11 | | BRN | XPLOT | PLOT CHARACTER |
| Ø312 | | Ø ØØØ ØØ1 1ØØ | SCRATCH | PTØ | | |
| Ø313 | | 1 ØØ1 Ø11 ØØØ | | LDC9 | | |
| Ø314 | | Ø ØØØ ØØ1 1ØØ | | PTØ | | |
| Ø315 | Ø3Ø7 | 1 1ØØ Ø11 111 | | BRN | CTA | |
| Ø316 | | Ø 1ØØ 1Ø1 ØØØ | SUITE1 | CTS | | |
| Ø317 | | 1 11Ø 1Ø1 11Ø | | W,AXC | | FREQ, 1, 1, DATA |
| Ø32Ø | Ø375 | 1 Ø11 111 ØØ1 | | JSB | TESTCOR | 32Ø NEW FREQ, M, 1, DATA |
| Ø321 | | Ø 111 1Ø1 ØØØ | | STA | | NEW FREQ, 1, DATA, DATA |
| Ø322 | | Ø 111 1Ø1 ØØØ | | STA | | NEW FREQ, DATA, DATA, DATA |

STATISTICS FUNCTION BLOCK LISTING (ROM 1) – Continued

| LINE # | CURR ADDR | BRAN ADDR | OPERATION CODE BIT PATTERN | | | | |
|---|---|---|---|---|---|---|---|
| 214 | 0323 | | 1 001 100 100 | | RS9 | | |
| 215 | 0324 | | 0 111 011 100 | | PTS | | |
| 216 | 0325 | | 0 001 111 110 | | S.CH1 | | WAS CELL COUNT 0? |
| 217 | 0326 | 0374 | 1 111 110 011 | | BRN | NOTE | YES. NOTE 35 NO DELETION |
| 218 | 0327 | 0253 | 1 011 1 0 011 | | BRN | SUITE2 | NO |
| 219 | 0330 | 0255 | 1 010 111 001 | MSUM1 | JSB | FILREG | 330 X. X. X. X |
| 220 | 0331 | | 0 001 0 1 100 | | PT1 | | |
| 221 | 0332 | 0357 | 1 111 0 0 001 | COMS | JSB | CH0A | SX. X. X. X |
| 222 | 0333 | 0375 | 0 011 111 001 | | JSB | TESTCOR | 333 |
| 223 | 0334 | | 1 011 110 000 | | DTDS | | D1. D2. D3. D4 |
| 224 | 0335 | | 0 111 1 1 000 | | STA | | |
| 225 | 0336 | | 0 111 1 1 000 | | STA | | D1. D4. D4. D4 |
| 226 | 0337 | | 1 111 1 1 110 | | W.AXC | | D3 |
| 227 | 0340 | | 0 111 1 1 000 | | STA | | 340 |
| 228 | 0341 | | 0 100 1 1 000 | | CTS | | D3. D3. D4. D4 |
| 229 | 0342 | | 1 111 1 1 110 | | W.AXC | | D4 |
| 230 | 0343 | | 0 100 1 1 000 | | CTS | | D4. D4. D3. D4 |
| 231 | 0344 | 0375 | 1 111 110 111 | | HRN | CONT | |
| 232 | 0345 | | 0 001 0 0 100 | DS | SS1 | | |
| 233 | 0346 | | 1 110 010 000 | | ROM 7 | | |
| 234 | 0347 | | 0 111 0 0 000 | SKIP+ | PINC | | |
| 235 | 0350 | | 0 111 000 003 | | PINC | | 350 |
| 236 | 0351 | | 0 002 011 100 | | PRS | | |
| 237 | 0352 | | 0 000 1 1 100 | | YP0 | | |
| 238 | 0353 | 0347 | 1 110 011 111 | | BRN | SKIP+ | |
| 239 | 0354 | 0375 | 1 111 110 111 | | HRN | CONT | |
| 240 | 0355 | | 0 000 0 0 000 | | DUMMY | | |
| 241 | 0356 | | 0 001 0 1 100 | MULT | SS1 | | |
| 242 | 0357 | | 1 110 010 000 | | ROM 7 | | |
| 243 | 0360 | | 1 000 000 100 | CH0A | SS0 | | 360 |
| 244 | 0361 | | 0 001 0 0 100 | CH1A | SS1 | | |
| 245 | 0362 | | 1 110 010 000 | | ROM 7 | | |
| 246 | 0363 | | 0 011 111 110 | MINUS | S.ZNCC | | |
| 247 | 0364 | | 0 001 0 0 100 | PLUS | SS1 | | |
| 248 | 0365 | | 1 110 010 000 | | ROM 7 | | |
| 249 | 0366 | | 0 000 0 0 000 | | DUMMY | | |
| 250 | 0367 | | 0 000 0 0 000 | | DUMMY | | |
| 251 | 0370 | | 0 000 0 0 000 | | DUMMY | | 370 |
| 252 | 0371 | | 0 000 0 0 000 | | DUMMY | | |
| 253 | 0372 | | 0 000 000 000 | | DUMMY | | |
| 254 | 0373 | | 0 000 010 000 | FIN | ROM 0 | | |
| 255 | 0374 | | 0 000 010 000 | NOTE | ROM 0 | | |
| 256 | 0375 | | 0 000 010 000 | CONT | ROM 0 | | |
| 257 | 0376 | | 0 100 010 000 | XPRINT | ROM 2 | | |
| 258 | 0377 | 0347 | 1 110 011 111 | | HRN | SKIP+ | 377 ACCESS TO SKIP+ |

STATISTICS FUNCTION BLOCK LISTING (ROM 2)

| LINE # | CURR ADDR | BRAN ADDR | OPERATION CODE BIT PATTERN | | | | |
|---|---|---|---|---|---|---|---|
| 3 | 2000 | | 1 010 010 000 | XROOT | ROM 5 | | 0 |
| 4 | 2001 | 0127 | 0 101 011 111 | PRAS | HRN | MLON | FETCH N AND ADVANCE PAPER |
| 5 | 2002 | 0174 | 0 111 110 011 | | HRN | MLDEQ | PRINT "N1=" |
| 6 | 2003 | 0227 | 1 001 011 111 | | HRN | MPRINTN1 | |
| 7 | 2004 | 0377 | 1 111 111 111 | | HRN | XPRINT | PRINT N1 |
| 8 | 2005 | 0116 | 0 100 111 011 | | HRN | MEANX | CALC. THE MEAN OF X |
| 9 | 2006 | | 0 011 001 100 | | PT3 | | |
| 10 | 2007 | 0167 | 0 111 011 111 | | HRN | MSTORE | STORE MEAN OF X IN R13 |
| 11 | 2010 | 0174 | 0 111 110 011 | | HRN | MLDEQ | 10 PRINT "XM=" |
| 12 | 2011 | 0222 | 1 001 001 011 | | HRN | MPRINTXM | |
| 13 | 2012 | 0377 | 1 111 111 111 | | HRN | XPRINT | PRINT MEAN OF X |
| 14 | 2013 | 0276 | 1 011 111 011 | | BRN | MSTX | UX. UX |
| 15 | 2014 | 0133 | 0 101 101 111 | | BRN | MCAL1 | UX/(N-1). " |
| 16 | 2015 | 0200 | 0 000 000 011 | | HRN | XROOT | SOX. |
| 17 | 2016 | | 0 100 001 100 | | PT4 | | |
| 18 | 2017 | 0167 | 0 111 011 111 | | HRN | MSTORE | STORE SOX IN R14 |
| 19 | 2020 | 0174 | 0 111 110 011 | | HRN | MLDEQ | 20 PRINT "S1 =" |
| 20 | 2021 | 0214 | 1 000 110 011 | | HRN | MPRINTS1 | |
| 21 | 2022 | 0377 | 1 111 111 111 | | BRN | XPRINT | PRINT SOX |
| 22 | 2023 | 0233 | 1 000 001 111 | | HRN | MTV1 | IF 2 SAMPLE. CONT: IF 1 VAR. FIN: IF 2 VAR. SKIP 5 |
| 23 | 2024 | 0102 | 0 100 001 011 | | HRN | MEXNS | EXCHANGE N1 AND N2 IN DATA STORAGE |
| 24 | 2025 | 0127 | 0 101 011 111 | | HRN | MLON | FETCH N2 AND ADVANCE PAPER |
| 25 | 2026 | 0174 | 0 111 110 011 | | HRN | MLDEQ | PRINT "N2 =" |
| 26 | 2027 | 0252 | 1 010 101 011 | | BRN | MPRINTN2 | |
| 27 | 2030 | 0377 | 1 111 111 111 | | HRN | XPRINT | 30 PRINT N2 |
| 28 | 2031 | 0126 | 0 101 010 011 | | HRN | MEANY | CALC. THE MEAN OF Y |
| 29 | 2032 | | 0 000 001 100 | | PT0 | | |
| 30 | 2033 | 0167 | 0 111 011 111 | | HRN | MSTORE | STORE MEAN OF Y IN R10 |
| 31 | 2034 | 0174 | 0 111 110 011 | | HRN | MLDEQ | PRINT "YM =" |
| 32 | 2035 | 0225 | 1 001 010 111 | | HRN | MPRINTYM | |
| 33 | 2036 | 0377 | 1 111 111 111 | | HRN | XPRINT | PRINT MEAN OF Y |
| 34 | 2037 | 0275 | 1 011 110 111 | | HRN | MSTY | UY. UY |
| 35 | 2040 | 0133 | 0 101 101 111 | | HRN | MCAL1 | 40 UY/(N-1) |
| 36 | 2041 | 0200 | 0 000 000 011 | | HRN | XROOT | SOY |
| 37 | 2042 | | 0 001 001 100 | | PT1 | | |
| 38 | 2043 | 0167 | 0 111 011 111 | | HRN | MSTORE | STORE SOY IN R11 |
| 39 | 2044 | 0174 | 0 111 110 011 | | HRN | MLDEQ | PRINT "S2 =" |
| 40 | 2045 | 0217 | 1 000 111 111 | | HRN | MPRINTS2 | |
| 41 | 2046 | 0377 | 1 111 111 111 | | BRN | XPRINT | PRINT SOY |
| 42 | 2047 | 0235 | 1 000 010 111 | | HRN | MTV2 | IF 2 SAMPLE. CONT: IF 2 VAR SKIP2 |
| 43 | 2050 | 0122 | 0 100 001 011 | | HRN | MEXNS | 50 EXCHANGE N1 AND N2 IN DATA STORAGE |
| 44 | 2051 | 0252 | 1 010 101 011 | | HRN | BOUT | |
| 45 | 2052 | 0276 | 1 011 111 011 | | HRN | MSTX | UX. UX |
| 46 | 2053 | 0275 | 1 011 110 111 | | HRN | MSTY | 53 UY. UY. UX |
| 47 | 2054 | 0145 | 0 110 010 111 | | HRN | MCAL2 | UYUX. " |
| 48 | 2055 | 0200 | 0 000 000 011 | | HRN | XROOT | R(UXUY) |
| 49 | 2056 | 0273 | 1 011 101 111 | | HRN | MLUKXY | UXY.UXY.R(UXUY) |
| 50 | 2057 | 0277 | 1 011 111 111 | | HRN | MCAL3 | R.R |
| 51 | 2060 | | 0 010 001 100 | | PT2 | | 60 |
| 52 | 2061 | 0167 | 0 111 011 111 | | HRN | MSTORE | STORE R IN R12 |

STATISTICS FUNCTION BLOCK LISTING (ROM 2)-Continued

```
CURR  BRAN   OPERATION CODE
ADDR  ADDR   BIT PATTERN

0162  0174   Ø 111 11Ø Ø11            BRN      MLOFQ      PRINT "R="
0163  0234   1 ØØ1 11Ø Ø11            BRN      MPRINTR
0164  0377   1 111 111 111            BRN      XPRINT     PRINT R
0165  0252   1 Ø1Ø 1Ø1 Ø11            BRN      HOUT
0166         Ø ØØ1 ØØ1 1ØØ  WIDTH     PT1                 LOAD STARTING ADDRESS FOR PRTW PRGM
0167         Ø Ø11 Ø11 ØØØ            LDC3
0170         1 ØØ1 Ø11 ØØØ            LDC9                7Ø
0171  0155   Ø 11Ø 11Ø 111            BRN      ROMID
0172  0326   1 1Ø1 Ø11 Ø11  PRTW      BRN      MDPRT      PRINT CELL WIDTH
0173         Ø 1Ø1 ØØ1 1ØØ            PT5
0174  0167   Ø 111 Ø11 111            BRN      MSTORE     STORE CELL WIDTH IN R15
0175  0252   1 Ø1Ø 1Ø1 Ø11            BRN      HOUT
0176         1 1Ø1 1ØØ Ø1Ø            P,AMIA              IS PRGM IN ROM2?
0177  0121   Ø 1ØØ ØØØ 111            BRN      R3           NO
0100         Ø ØØ1 Ø1Ø ØØØ            EFRA                1ØØ  YES
0101         Ø 11Ø Ø1Ø ØØØ  R3        ROM 3               LOOK FOR PRGM IN ROM 3
0102         1 ØØ1 ØØ1 1ØØ  MFXNS     PT9                 FETCH N2
0103  0357   1 111 ØØØ ØØ1            JSB      CHØA
0104         1 11Ø 1Ø1 11Ø            W,AXC               N2 TO A
0105         Ø ØØØ ØØ1 1ØØ            PTØ                 FETCH N1
0106  0357   1 111 ØØØ ØØ1            JSB      CHØA
0107         1 11Ø 1Ø1 11Ø            W,AXC               N1 TO A, N2 TO C
0110         1 Ø11 11Ø ØØØ            DTDS                11Ø STORE N2 IN RØØ
0111         1 ØØ1 ØØ1 1ØØ            PT9                 ADDRESS RØ9
0112  0357   1 111 ØØØ ØØ1            JSB      CHØA
0113         1 11Ø 1Ø1 11Ø            W,AXC               N1 TO C
0114         1 Ø11 11Ø ØØØ            DTDS                STORE N1 IN RØ9
0115  0375   1 111 11Ø 111            BRN      CONT
0116         Ø ØØ1 ØØ1 1ØØ  MFANX     PT1
0117  0121   Ø 1Ø1 ØØØ 111            BRN      COMP1
0120         Ø 1ØØ ØØ1 1ØØ  MFANY     PT4                 12Ø
0121  0357   1 111 ØØØ ØØ1  COMP1     JSB      CHØA          SX      (ALSO FOR Y)
0122         Ø 1ØØ 1Ø1 ØØØ            CTS                    SX, SX
0123         Ø ØØØ ØØ1 1ØØ            PTØ
0124  0357   1 111 ØØØ ØØ1            JSB      CHØA          N, SX
0125  0247   1 Ø1Ø 11Ø ØØ1            JSB      DIVIDE        SX/N, "
0126  0375   1 111 11Ø 111            BRN      CONT
0127         Ø ØØØ ØØ1 1ØØ  MLON      PTØ                 127
0130  0357   1 111 ØØØ ØØ1            JSB      CHØA       13Ø N--> C
0131  0372   1 111 1ØØ 1Ø1            JSB      ADV           ADVANCE PAPER
0132  0375   1 111 11Ø 111            BRN      CONT
0133         Ø ØØØ ØØ1 1ØØ  MCAL1     PTØ                 UX,UX      ALSO FOR Y
0134  0357   1 111 ØØØ ØØ1            JSB      CHØA       N, UX
0135         Ø 1ØØ 1Ø1 ØØØ            CTS                 N, N, UX
0136         Ø Ø11 ØØ1 11Ø            W,ZTC
0137         1 1ØØ ØØ1 1ØØ            PT12
0140         Ø ØØ1 Ø11 ØØØ            LDC1                14Ø  1, N, UX
0141  0362   1 111 ØØ1 1Ø1            JSB      MINUS        N-1, N-1, UX
0142         1 1ØØ 1Ø1 ØØØ            DNR                 N-1, UX
0143  0247   1 Ø1Ø 11Ø ØØ1  COD       JSB      DIVIDE     UX/(N-1), "
0144  0375   1 111 11Ø 111            BRN      CONT
0145         Ø 11Ø 1Ø1 ØØØ  MCAL2     STA                 UY, UX
0146  0355   1 11Ø 111 ØØ1            JSB      MULT       UYUX, "
0147  0375   1 111 11Ø 111            BRN      CONT
0150         1 1Ø1 11Ø Ø1Ø            P,AMIA              15Ø ACCESS TO OFFSET/WIDTH ENTRIES
0151  0266   Ø Ø11 Ø11 Ø11            BRN      WIDTH
0152         Ø ØØ1 ØØ1 1ØØ  BPRTO     PT1                 LOAD STARTING ADDRESS FOR PRTO PRGM
0153         1 1ØØ Ø11 ØØØ            LDC12
0154         Ø Ø1Ø Ø11 ØØØ            LDC2
0155         Ø Ø1Ø 1Ø1 ØØØ  ROMID     CXM
0156         Ø 111 ØØ1 1ØØ            PT7
0157         Ø ØØ1 Ø11 ØØØ            LDC1
0160         Ø ØØØ Ø1Ø ØØØ            ROM Ø               16Ø
0161         Ø ØØØ ØØØ ØØØ            DUMMY
0162  0167   Ø 111 Ø11 111            BRN      MSTORE     MSTORE ACCESS
0163  0174   Ø 111 11Ø Ø11            BRN      MLOFQ      MLDFQ ACCESS
0164  0364   1 111 ØØØ 1Ø1            JSB      CHIA       MFCH ACCESS
0165         Ø ØØ1 ØØ1 1ØØ  FCOM      PT1                 SKIP 1 STEP DUE TO POINTER IN PRGM
0166  0376   1 111 111 Ø11            BRN      SKIP+
0167         Ø 1ØØ 1Ø1 ØØØ  MSTORE    CTS
0170  0364   1 111 ØØØ 1Ø1            JSB      CHIA       17Ø ADDRESS REGISTER CORRESPONDING TO POINTER
0171         1 1ØØ 1Ø1 ØØØ            DNR
0172         1 Ø11 11Ø ØØØ            DTDS                   STORE DATA ORIGINALLY IN C
0173  0165   Ø 111 Ø1Ø 111            BRN      FCOM
0174         Ø 1ØØ 1Ø1 ØØØ  MLOFQ     CTS
0175  0372   1 111 1ØØ 1Ø1            JSB      ADV        ADVANCE PAPER
0176  0365   1 111 Ø11 ØØ1            JSB      BLANK      LOAD BLANKS IN C
0177         1 Ø1Ø ØØ1 1ØØ            PT1Ø                LOAD "="
0200         Ø Ø1Ø Ø11 ØØØ            LDC2                2ØØ
0201  0365   1 111 Ø11 ØØ1            JSB      BLANK         TRANSFER C TO T AND BLANK C
0202  0375   1 111 11Ø 111            BRN      CONT
0203         Ø 1Ø1 ØØ1 1ØØ  MTV1      PT5                 2Ø3
0204  0206   1 ØØØ Ø11 Ø11            BRN      T1
0205         Ø Ø1Ø ØØ1 1ØØ  MTV2      PT2
0206         1 1Ø1 111 Ø1Ø  T1        XS,AMIA             WHICH DATA ENTRY MODE?
0207  0211   1 ØØØ 1ØØ 111            BRN      T2
0210  0375   1 111 11Ø 111            BRN      CONT       21Ø  2 SAMPLE
0211         1 1Ø1 111 Ø1Ø  T2        XS,AMIA
0212  0376   1 111 111 Ø11            BRN      SKIP+         2 VARIABLE
0213  0252   1 Ø1Ø 1Ø1 Ø11            BRN      HOUT
0214         1 1Ø1 ØØ1 1ØØ  MPRINTS1  PT13
0215         Ø 11Ø Ø11 ØØØ            LDC6
0216  0231   1 ØØ1 1ØØ 111            BRN      LD1
0217         1 1Ø1 ØØ1 1ØØ  MPRINTS2  PT13
0220         Ø 11Ø Ø11 ØØØ            LDC6                22Ø
0221  0352   1 11Ø 1Ø1 Ø11            BRN      LD2
0222         1 1Ø1 ØØ1 1ØØ  MPRINTXM  PT13
0223         Ø ØØØ Ø11 ØØØ            LDCØ
0224  0236   1 ØØ1 111 Ø11            BRN      COMPT
0225         1 1Ø1 ØØ1 1ØØ  MPRINTYM  PT13
0226  0231   1 ØØ1 1ØØ 111            BRN      LD1
0227         1 Ø11 ØØ1 1ØØ  MPRINIM1  PT11
0230         1 1ØØ Ø11 ØØØ            LDC12               23Ø
0231         Ø ØØ1 Ø11 ØØØ  LD1       LDC1
0232  0236   1 ØØ1 111 Ø11            BRN      COMPT
0233         Ø ØØØ ØØØ ØØØ            DUMMY
0234         1 1Ø1 ØØ1 1ØØ  MPRINTR   PT13
```

STATISTICS FUNCTION BLOCK LISTING (ROM 2)—Continued

```
CURR  BRAN    OPERATION CODE
ADDR  ADDR    BIT PATTERN

0235          1 011 011 000           LOC11
0236  0367    1 111 110 001  COMPT    JSB      PRINT
0237          1 100 101 000           DHR
0240  0375    1 111 110 111           BRN      CONT      240
0241          0 011 001 100  BASIC    PT3                BASIC STAT KEY
0242          1 001 100 010           P,AMI              IS DATA SET COMPLETE?
0243  0374    1 111 110 011           BRN      NOTE      NO, PRINT NOTE 33
0244          0 001 001 100  BPRAS    PT1                YES, LOAD STARTING ADDRESS FOR PRAS PRGM.
0245          0 000 011 000           LOC0
0246          0 000 011 000           LOC0
0247  0155    0 110 110 111           BRN      ROMID
0250          0 010 000 100  DIVIDE   SS2                250
0251  0355    1 110 110 111           BRN      DIV1
0252  0371    1 111 110 101  BOUT     JSB      ADV
0253  0371    1 111 100 101           JSB      ADV
0254  0371    1 111 100 101           JSB      ADV
0255  0371    1 111 100 101           JSB      ADV
0256  0371    1 111 100 101           JSB      ADV
0257  0266    1 011 011 011           BRN      SUITE1
0260          0 000 000 000           DUMMY
0261          0 000 000 000           DUMMY
0262          0 001 001 100  LINJ     PT1                ACCESS TO LINJ
0263  0330    1 101 100 011           BRN      SUITE2
0264          0 010 100 100           RS2                RETURN FROM ROM 7 ROUTINES
0265          0 000 110 000           RETURN
0266          0 010 101 000  SUITE1   CXM                SET F6 FOR VARIABLE ENTRY
0267          0 110 001 100           PT6
0270          0 000 011 000           LOC0               270
0271          0 010 101 000           CXM
0272  0373    1 111 101 111           BRN      FIN
0273          0 100 101 000  MLUKXY   CTS
0274          0 110 010 000  MSTXY    ROM 3              EGRESS TO MSTXY
0275          0 110 010 000  MSTY     ROM 3              EGRESS TO MSTY
0276          0 110 010 000  MSTX     ROM 3              EGRESS TO MSTX
0277          1 100 101 000  MCAL3    DNR                    UXY, R(UXUY), -, UXY
0300          1 100 101 000           DHR                300 R(UXUY)--, UXY, UXY
0301          0 110 101 000           STA                R(UXUY), UXY
0302  0143    0 110 001 111           BRN      COD       UXY/R(UXUY)  =R
0303  0326    1 101 011 011  PRTO     BRN      MDPRT     PRINT OFFSET
0304          0 110 001 100           PT6
0305  0167    0 111 011 111           BRN      MSTORE    STORE OFFSET IN R16
0306  0371    1 111 100 101           JSB      ADV       ADVANCE PAPER
0307  0365    1 111 011 001           JSB      BLANK     PRINT "CEL="
0310          1 101 001 100           PT13               310
0311          1 011 011 000           LOC11
0312          1 011 001 100           PT11
0313          1 001 011 000           LOC9
0314          0 010 011 000           LOC2
0315  0365    1 111 011 001           JSB      BLANK
0316          0 001 001 100           PT1
0317          0 001 011 000           LOC1
0320  0367    1 111 100 001           JSB      PRINT     320
0321          0 010 101 000           CXM                SET F6 FOR CELL WIDTH ENTRY
0322          0 110 001 100           PT6
0323          0 010 011 000           LOC2
0324          0 010 101 000           CXM
0325  0373    1 111 101 111           BRN      FIN
0326          1 100 101 000  MDPRT    DNR
0327  0377    1 111 111 111           BRN      XPRINT
0330  0361    1 111 000 101  SUITE2   JSB      CHIA      330 B, CSX2, -, -
0331          0 100 101 000           CTS                    B, B, CSX2, -
0332          0 001 001 100           PT1
0333  0357    1 111 000 001           JSB      CH0A      333 SX, B, CSX2, -
0334  0356    1 111 111 001           JSB      MULT          BSX, BSX, CSX2, -
0335          1 100 101 000           DHR                BSX, CSX2, -, BSX
0336  0363    1 111 010 001           JSB      PLUS          BSX+CSX2, "
0337          0 100 001 100           PT4
0340  0357    1 111 000 001           JSB      CH0A      340 SY,BSX+CSX2
0341  0362    1 111 001 101           JSB      MINUS         BSX+CSX2-SY, "
0342          0 000 001 100           PT0
0343  0357    1 111 000 001           JSB      CH0A          N
0344          0 011 111 110           S,ZNCC                 -N
0345  0247    1 010 100 001           JSB      DIVIDE    (SY-DSX-CSX2)/N=A
0346          0 000 001 100           PT0
0347  0167    0 111 011 111           BRN      MSTORE        STORE A IN R10
0350          1 011 001 100  MPRINTN2 PT11
0351          1 100 011 000           LOC12
0352          0 010 011 000  LD2      LOC2
0353  0236    1 001 111 011           BRN      COMPT
0354  0252    1 010 101 011           BRN      BOUT      ACCESS TO BOUT
0355          1 110 010 000  DIV1     ROM 7
0356          0 010 000 100  MULT     SS2
0357          1 110 010 000           ROM 7
0360          1 000 000 100  CH0A     SS8                360
0361          0 010 000 100  CHIA     SS2
0362          1 110 010 000           ROM 7
0363          0 011 111 110  MINUS    S,ZNCC
0364          0 010 000 100  PLUS     SS2
0365          1 110 010 000           ROM 7
0366          0 010 000 100  BLANK    SS2
0367          1 110 010 000           ROM 7
0370          1 000 000 100  PRINT    SS8                370
0371          0 010 000 100  ADV      SS2
0372          1 110 010 000           ROM 7
0373          0 000 010 000  FIN      ROM 0
0374          0 000 010 000  NOTE     ROM 3
0375          0 000 010 000  CONT     ROM 0
0376          0 010 010 000  SKIP+    ROM 1
0377          1 010 010 000  XPRINT   ROM 5              377
```

STATISTICS FUNCTION BLOCK LISTING (ROM 3)

```
CURR  BRAN   OPERATION CODE
ADDR  ADDR   BIT PATTERN

0000         1 100 101 000  MCAL10    DNR
0001  0355   1 110 111 001  MCAL11    JSB       MULT
0002  0375   1 111 110 111            BRN       CONT
0003         1 100 101 000  MCAL12    DNR
0004  0362   1 111 001 101            JSB       MINUS
0005  0375   1 111 110 111            BRN       CONT
0006         1 100 101 000  MCAL15    DNR
0007  0353   1 110 110 001  MCAL17    JSB       DIVIDE
0010  0375   1 111 110 111            BRN       CONT
0011         1 100 101 000  MCAL19    DNR
0012  0363   1 111 010 001  MCAL16    JSB       PLUS
0013  0375   1 111 110 111            BRN       CONT
0014         0 001 001 100  MPRINTA   PT1
0015         1 001 011 000            LOC9
0016  0100   0 100 001 011            BRN       PC
0017         0 001 001 100  MPRINTB   PT1
0020         0 000 011 000            LOC0
0021  0100   0 100 000 011            BRN       PC
0022  0262   1 011 001 101            JSB       V27        LINEAR KEY
0023         0 011 001 100            PT3
0024         1 001 100 010            P.AN1
0025  0374   1 111 110 011            BRN       NOTE
0026         0 010 101 000            CXM                  SET F13 TO INDICATE LINEAR REG.
0027         0 011 011 110            S.ZTC
0030         0 111 111 110            S.CPIC
0031  0272   0 011 101 011            BRN       SUITE2
0032  0262   1 011 001 101            JSB       V27        PAR KEY
0033         0 011 001 100            PT3
0034         1 001 100 010            P.AN1
0035  0374   1 111 110 011            BRN       NOTE
0036         0 010 101 000            CXM
0037         0 011 011 110            S.ZTC
0040         0 111 111 110            S.CPIC
0041         0 111 111 110            S.CPIC
0042         0 010 101 000            CXM
0043         0 001 001 100  BPARA     PT1                  LOAD STARTING ADDRESS FOR PARA PRGM
0044         0 111 011 000            LOC7
0045         0 011 011 000            LOC3
0046  0155   0 110 110 111            BRN       ROMID
0047  0326   1 101 011 011  PLIN      BRN       MSTXY      LIN.REG.PRGM  UXY, UXY
0050  0277   1 011 111 111            BRN       MSTX                     UX, UX, UXY
0051  0006   0 000 011 011            BRN       MCAL15                   UXY/UX=B
0052         0 001 001 100            PT1
0053  0161   0 111 001 111            BRN       MSTORE     53 STORE B IN R11
0054  0253   1 010 101 111            BRN       MCALA         CALC A AND STORE R10
0055         0 000 000 000            DUMMY
0056  0326   1 101 011 011            BRN       MSTXY           UXY,UXY
0057  0001   0 000 001 111            BRN       MCAL11          (UXY)2, "
0060  0277   1 011 111 111            BRN       MSTX          UX, UX, (UXY)2
0061  0006   0 000 011 011            BRN       MCAL15          (UXY)2/UX
0062  0316   1 100 111 011            BRN       MSTY          UY, UY, (UXY)2/UX
0063  0006   0 000 011 011            BRN       MCAL15        (UXY)2/(UXUY)=R2
0064         0 011 001 100            PT3
0065  0161   0 111 001 111            BRN       MSTORE          STORE R2 IN R13
0066         0 001 001 100  BPRINTS   PT1                  LOAD STARTING ADDRESS FOR PRINTS PRGM
0067         0 100 011 000            LOC4
0070         1 100 011 000            LOC12
0071  0155   0 110 110 111            BRN       ROMID
0072         0 010 101 000  SUITE2    CXM
0073         0 010 001 100            PT2                  SET R12(C) TO 0
0074  0364   1 111 001 101            JSB       CH1A
0075  0150   0 110 100 011            BRN       BPLIN
0076         1 101 001 100  MPRINTR2  PT13
0077         1 000 011 000            LOC8
0100  0367   1 111 110 001  PC        JSB       PRINT
0101  0271   1 011 101 111            BRN       SUITE1
0102         1 101 100 010            P.AMIA               IS PRGM IN ROM 3?
0103  0135   0 100 010 111            BRN       R4         NO, LOOK IN ROM 4
0104         0 001 010 000            EFRA                 YES, GO TO NEXT STEP
0105         1 000 010 000  R4        ROM 4
0106  0355   1 110 111 001  STAT      JSB       MULT       SXSY, SXSY, SXY (UXY EXAMPLE)
0107         0 000 001 100            PT0
0110  0357   1 111 010 001            JSB       CHMA       N, SXSY, SXY
0111  0353   1 110 110 001            JSB       DIVIDE     SXSY/N, ", SXY
0112         1 100 101 000            DNR
0113  0362   1 111 001 101            JSB       MINUS      SXY-SXSY/N=UXY
0114  0375   1 111 110 111            BRN       CONT
0115         0 000 001 100  PRINTS    PT0                    FETCH A
0116  0163   0 111 001 111            BRN       MFCH
0117  0162   0 111 001 011            BRN       MLDEQ            PRINT "A ="
0120  0014   0 000 110 011            BRN       MPRINTA
0121  0377   1 111 111 111            BRN       XPRINT           PRINT A
0122         0 001 001 100            PT1                        FETCH B
0123  0163   0 111 001 111            BRN       MFCH
0124  0162   0 111 001 011            BRN       MLDEQ            PRINT "B ="
0125  0017   0 000 111 111            BRN       MPRINTB
0126  0377   1 111 111 111            BRN       XPRINT           PRINT B
0127  0143   0 110 001 111            BRN       MTR        127 SKIP C PRINTOUT IF LINEAR
0130         0 010 001 100            PT2                  FETCH C
0131  0163   0 111 001 111            BRN       MFCH
0132  0162   0 111 001 011            BRN       MLDEQ            PRINT "C ="
0133  0035   0 011 101 011            BRN       MPRINTC
0134  0377   1 111 111 111            BRN       XPRINT           PRINT C
0135         0 011 001 100            PT3                        FETCH R2
0136  0163   0 111 001 111            BRN       MFCH
0137  0162   0 111 001 011            BRN       MLDEQ            PRINT "R2 ="
0140  0076   0 011 111 011            BRN       MPRINTR2
0141  0377   1 111 111 111            BRN       XPRINT           PRINT R2
0142  0353   1 110 101 111            BRN       HOUT
0143         0 101 001 100  MTR       PT5
0144         1 101 111 110            S.AMIA
0145         1 101 111 110            S.AMIA               IS THIS A LINEAR REGRESSION?
0146  0375   1 111 110 111            BRN       CONT       NO
0147  0376   1 111 111 011            BRN       SKIP+      YES
```

STATISTICS FUNCTION BLOCK LISTING (ROM 3)—Continued

| LINE # | CURR ADDR | BRAN ADDR | OPERATION CODE BIT PATTERN | | | | |
|---|---|---|---|---|---|---|---|
| 107 | 0150 | | 0 011 001 110 | RELIN | W.ZTC | | 150 |
| 108 | 0151 | | 1 011 112 000 | | OTOS | | |
| 109 | 0152 | | 0 001 001 100 | | PT1 | | LOAD STARTING ADDRESS FOR PLIN PRGM |
| 110 | 0153 | | 0 010 011 200 | | LDC2 | | |
| 111 | 0154 | | 0 110 011 002 | | LDC6 | | |
| 112 | 0155 | | 0 010 111 000 | ROMID | CXM | | LOAD ROM IDENTIFICATION FLAG |
| 113 | 0156 | | 0 111 001 100 | | PT7 | | |
| 114 | 0157 | | 0 010 011 001 | | LDC2 | | |
| 115 | 0160 | | 0 000 010 002 | | ROM 0 | | 160 |
| 116 | 0161 | | 0 100 012 002 | MSTORE | ROM 2 | | EGRESS TO MSTORE |
| 117 | 0162 | | 0 100 012 002 | MLOEQ | ROM 2 | | EGRESS TO MLOEQ |
| 118 | 0163 | | 0 100 010 002 | MFCH | ROM 2 | EGRESS TO MFCH | |
| 119 | 0164 | 0324 | 1 100 010 011 | PARA | BRN | MSTX2 | PARA. REG. PRGM UX2, UX2 |
| 120 | 0165 | 0277 | 1 011 111 111 | | BRN | MSTX | UX, UX, UX2 |
| 121 | 0166 | | 0 000 001 100 | | PT0 | | |
| 122 | 0167 | 0161 | 0 111 002 111 | | BRN | MSTORE | STORE UX IN R10 |
| 123 | 0170 | 0220 | 0 000 002 011 | | BRN | MCAL10 | 170 UXUX2, " |
| 124 | 0171 | 0311 | 1 100 122 111 | | BRN | MSTXX2 | UXX2, UXX2, UXUX2 |
| 125 | 0172 | | 0 001 021 100 | | PT1 | | |
| 126 | 0173 | 0161 | 0 111 002 111 | | BRN | MSTORE | STORE UXX2 IN R11 |
| 127 | 0174 | 0221 | 0 000 002 111 | | BRN | MCAL11 | (UXX2)2, " |
| 128 | 0175 | 0223 | 0 000 001 111 | | BRN | MCAL12 | UXUX2 - (UXX2)2 = DEN (C) |
| 129 | 0176 | | 0 010 001 102 | | PT2 | | |
| 130 | 0177 | 0161 | 0 111 002 111 | | BRN | MSTORE | STORE DEN (C) IN R12 |
| 131 | 0200 | 0322 | 1 101 001 011 | | BRN | MSTX2Y | 200 UX2Y, UX2Y |
| 132 | 0201 | | 0 000 001 102 | | PT0 | | |
| 133 | 0202 | 0163 | 0 111 001 111 | | BRN | MFCH | UX, UX2Y |
| 134 | 0203 | 0221 | 0 000 002 111 | | BRN | MCAL11 | 203 UXUX2Y, " |
| 135 | 0204 | 0326 | 1 101 011 011 | | BRN | MSTXY | UXY, UXY, UXUX2Y |
| 136 | 0205 | | 0 001 001 102 | | PT1 | | |
| 137 | 0206 | 0163 | 0 111 001 111 | | BRN | MFCH | UXX2, UXY, UXUX2Y |
| 138 | 0207 | 0221 | 0 000 010 111 | | BRN | MCAL11 | UXX2UXY, ", UXUX2Y |
| 139 | 0210 | 0223 | 0 000 001 111 | | BRN | MCAL12 | 210 UXUX2Y - UXX2UXY, " = NUM(C) |
| 140 | 0211 | | 0 010 001 102 | | PT2 | | |
| 141 | 0212 | 0163 | 0 111 001 111 | | BRN | MFCH | DEN (C), NUM(C) |
| 142 | 0213 | 0227 | 0 000 011 111 | | BRN | MCAL17 | C, C |
| 143 | 0214 | | 0 010 001 102 | | PT2 | | |
| 144 | 0215 | 0161 | 0 111 002 111 | | BRN | MSTORE | STORE C IN R12 |
| 145 | 0216 | | 0 001 001 102 | | PT1 | | |
| 146 | 0217 | 0163 | 0 111 001 111 | | BRN | MFCH | UXX2, C |
| 147 | 0220 | 0221 | 0 000 002 111 | | BRN | MCAL11 | 220 CUXX2, CUXX2 |
| 148 | 0221 | 0326 | 1 101 011 011 | | BRN | MSTXY | UXY, UXY, CUXX2 |
| 149 | 0222 | 0223 | 0 000 001 111 | | BRN | MCAL12 | CUXX2 - UXY, " |
| 150 | 0223 | | 0 000 001 100 | | PT0 | | |
| 151 | 0224 | 0163 | 0 111 001 111 | | BRN | MFCH | UX, CUXX2 - UXY |
| 152 | 0225 | 0366 | 1 111 011 011 | | BRN | MCAL18 | UXY - CUXX2/UX = B |
| 153 | 0226 | | 0 001 001 102 | | PT1 | | |
| 154 | 0227 | 0161 | 0 111 002 111 | | BRN | MSTORE | STOER B IN R11 |
| 155 | 0230 | 0253 | 1 010 101 111 | | BRN | MCALA | 230 A CALC. AND STORED IN R10 |
| 156 | 0231 | | 0 000 002 003 | | DUMMY | | |
| 157 | 0232 | 0326 | 1 101 011 011 | | BRN | MSTXY | UXY, UXY |
| 158 | 0233 | | 0 001 001 102 | | PT1 | | |
| 159 | 0234 | 0163 | 0 111 001 111 | | BRN | MFCH | B |
| 160 | 0235 | 0221 | 0 000 002 111 | | BRN | MCAL11 | B UXY, " |
| 161 | 0236 | 0322 | 1 101 001 011 | | BRN | MSTX2Y | UX2Y, UX2Y, BUXY |
| 162 | 0237 | | 0 010 001 102 | | PT2 | | |
| 163 | 0240 | 0163 | 0 111 001 111 | | BRN | MFCH | 240 C |
| 164 | 0241 | 0221 | 0 000 002 111 | | BRN | MCAL11 | CUX2Y, ", BUXY |
| 165 | 0242 | 0311 | 0 000 102 111 | | BRN | MCAL19 | CUX2Y+BUXY = NUM(R2) |
| 166 | 0243 | 0316 | 1 100 111 011 | | BRN | MSTY | UY, UY, NUM (R2) |
| 167 | 0244 | 0236 | 0 000 011 011 | | BRN | MCAL15 | R2 |
| 168 | 0245 | | 0 011 001 102 | | PT3 | | |
| 169 | 0246 | 0161 | 0 111 002 111 | | BRN | MSTORE | STORE R2 IN R13 |
| 170 | 0247 | 0266 | 0 011 011 011 | | BRN | BPRINTS | LOAD STARTING ADDRESS FOR PRINTS PRGM |
| 171 | 0250 | | 0 001 000 000 | | DUMMY | | 250 |
| 172 | 0251 | | 0 000 000 001 | | DUMMY | | |
| 173 | 0252 | | 0 020 002 000 | | DUMMY | | |
| 174 | 0253 | | 0 010 001 100 | MCALA | PT2 | | |
| 175 | 0254 | 0357 | 1 111 002 001 | | JSB | CH0A | SX2 |
| 176 | 0255 | | 0 100 101 000 | | CTS | | SX2, SX2 |
| 177 | 0256 | | 0 010 001 102 | | PT2 | | |
| 178 | 0257 | 0360 | 1 111 002 101 | | JSB | CH1A | 257 C, SX2 |
| 179 | 0260 | 0355 | 1 110 111 001 | | JSB | MULT | 260 CSX2, CSX2 |
| 180 | 0261 | | 0 100 012 002 | LINJ | ROM 2 | | EGRESS TO LINJ |
| 181 | 0262 | | 0 000 000 200 | | DUMMY | | |
| 182 | 0263 | | 1 101 111 013 | V22 | XS,AM1A | | |
| 183 | 0264 | | 1 101 111 013 | | XS,AM1A | | |
| 184 | 0265 | | 1 101 111 014 | | XS,AM1A | | |
| 185 | 0266 | 0373 | 1 111 111 111 | | BRN | FIN | |
| 186 | 0267 | | 0 011 102 100 | | RS3 | | RETURN FROM ROM 7 ROUTINES |
| 187 | 0270 | | 0 000 110 000 | | RETURN | | 270 |
| 188 | 0271 | | 1 100 111 002 | SUITEI | ONR | | |
| 189 | 0272 | 0375 | 1 111 110 111 | | BRN | CONT | |
| 190 | 0273 | | 0 000 002 001 | | DUMMY | | |
| 191 | 0274 | | 0 000 000 000 | | DUMMY | | |
| 192 | 0275 | 0326 | 1 101 011 011 | | BRN | MSTXY | ACCESS TO MSTXY |
| 193 | 0276 | 0316 | 1 100 111 011 | | BRN | MSTY | ACCESS TO MSTY |
| 194 | 0277 | | 0 011 001 100 | MSTX | PT2 | | ACCESS TO MSTX CODE UX |
| 195 | 0300 | | 0 010 011 001 | | LDC2 | | 300 |
| 196 | 0301 | | 0 001 011 001 | | LDC1 | | |
| 197 | 0302 | | 0 001 011 002 | | LDC1 | | |
| 198 | 0303 | 0332 | 1 101 101 011 | | BRN | LOAD | |
| 199 | 0304 | | 0 010 001 100 | MSTX2 | PT2 | | CODE UX2 |
| 200 | 0305 | | 0 111 011 002 | | LDC7 | | |
| 201 | 0306 | | 0 010 011 002 | | LDC2 | | |
| 202 | 0307 | | 0 010 011 000 | | LDC2 | | |
| 203 | 0310 | 0332 | 1 101 101 011 | | BRN | LOAD | 310 |
| 204 | 0311 | | 0 010 001 102 | MSTXX2 | PT2 | | CODE UXX2 |
| 205 | 0312 | | 0 110 011 002 | | LDC6 | | |
| 206 | 0313 | | 0 001 011 002 | | LDC1 | | |
| 207 | 0314 | | 0 010 011 002 | | LDC2 | | |
| 208 | 0315 | 0332 | 1 101 101 011 | | BRN | LOAD | |
| 209 | 0316 | | 0 010 001 102 | MSTY | PT2 | | CODE UY |
| 210 | 0317 | | 0 101 011 002 | | LDC5 | | |
| 211 | 0320 | | 0 100 011 200 | | LDC4 | | 320 |
| 212 | 0321 | 0331 | 1 101 102 111 | | BRN | L04 | |
| 213 | 0322 | | 0 010 001 100 | MSTX2Y | PT2 | | CODE X2Y |

STATISTICS FUNCTION BLOCK LISTING (ROM 3) – Continued

| LINE # | CURR ADDR | BRAN ADDR | OPERATION CODE BIT PATTERN | | | | |
|---|---|---|---|---|---|---|---|
| 214 | 0323 | | 1 000 011 [illegible] | | LOC8 | | |
| 215 | 0324 | | 1 010 011 00[illegible] | | LOC2 | | |
| 216 | 0325 | 0331 | 1 101 1[illegible]0 111 | | BRN | LD4 | |
| 217 | 0326 | | 0 010 0[illegible]1 100 | MSTXY | PT2 | | CODE XY |
| 218 | 0327 | | 0 011 011 00[illegible] | | LOC3 | | |
| 219 | 0330 | | 0 001 011 00[illegible] | | LOC1 | | 330 |
| 220 | 0331 | | 0 100 011 00[illegible] | LD4 | LOC4 | | |
| 221 | 0332 | | 0 011 010 110 | LOAD | MS.ZTC | | |
| 222 | 0333 | | 1 01[illegible] 0[illegible]1 10[illegible] | | PT10 | | 333 |
| 223 | 0334 | | 0 001 011 00[illegible] | | LOC1 | | LOAD END TEST DIGIT |
| 224 | 0335 | | 1 110 1[illegible]1 110 | | W.AXC | | CODE WORD TO A |
| 225 | 0336 | | 1 111 0[illegible]1 10[illegible] | NEUF | PT15 | | |
| 226 | 0337 | | 0 000 111 100 | INC | PLS | | |
| 227 | 0340 | | 1 101 111 010 | | XS.AM1A | | 340 |
| 228 | 0341 | 0337 | 1 101 111 111 | | BRN | INC | DECODE XS TO SET POINTER |
| 229 | 0342 | 0357 | 1 111 0[illegible]0 001 | | JSB | CH0A | FETCH CODED REGISTER |
| 230 | 0343 | | 0 100 0[illegible]1 110 | | W.SLA | | SHIFT TO NEXT CODED DIGIT |
| 231 | 0344 | | 1 101 111 110 | | S.AM1A | | HAVE ALL 3 REGISTERS BEEN FETCHED? |
| 232 | 0345 | 0146 | 0 100 011 011 | | BRN | STAT | YES. CALC CORRECTED SUM OF SQUARES |
| 233 | 0346 | | 0 100 1[illegible]1 000 | | CTS | | NO. FETCH NEXT REGISTER |
| 234 | 0347 | 0336 | 1 101 111 011 | | BRN | NEUF | |
| 235 | 0350 | | 0 001 0[illegible]1 100 | MPRINTC | PT1 | | 350 |
| 236 | 0351 | | 0 001 011 000 | | LOC1 | | |
| 237 | 0352 | 0107 | 0 100 0[illegible]0 011 | | BRN | PC | |
| 238 | 0353 | | 0 100 010 000 | BCUT | ROM 2 | | |
| 239 | 0354 | | 0 011 0[illegible]0 100 | DIVIDE | SS3 | | |
| 240 | 0355 | | 1 11[illegible] 010 000 | | ROM 7 | | |
| 241 | 0356 | | 0 011 0[illegible]0 100 | MULT | SS3 | | |
| 242 | 0357 | | 1 110 010 000 | | ROM 7 | | |
| 243 | 0360 | | 1 000 0[illegible]0 100 | CH0A | SS8 | | 360 |
| 244 | 0361 | | 0 011 0[illegible]0 100 | CH1A | SS3 | | |
| 245 | 0362 | | 1 110 010 000 | | ROM 7 | | |
| 246 | 0363 | | 0 011 111 110 | MINUS | S.ZNCC | | |
| 247 | 0364 | | 0 011 0[illegible]0 100 | PLUS | SS3 | | |
| 248 | 0365 | | 1 110 010 000 | | ROM 7 | | |
| 249 | 0366 | | 0 011 111 110 | MCAL18 | S.ZNCC | | |
| 250 | 0367 | 0206 | 0 000 011 101 | | JSB | MCAL17 | |
| 251 | 0370 | | 1 000 0[illegible]0 100 | PRINT | SS8 | | 370 |
| 252 | 0371 | | 0 011 0[illegible]0 100 | | SS3 | | |
| 253 | 0372 | | 1 110 010 000 | | ROM 7 | | |
| 254 | 0373 | | 0 000 010 000 | FIN | ROM 0 | | |
| 255 | 0374 | | 0 000 010 000 | NOTE | ROM 0 | | |
| 256 | 0375 | | 0 000 010 000 | CONT | ROM 0 | | |
| 257 | 0376 | | 0 010 010 000 | SKIP+ | ROM 1 | | |
| 258 | 0377 | | 1 010 010 000 | XPRINT | ROM 5 | | 377 |

STATISTICS FUNCTION BLOCK LISTING (ROM 4)

| LINE # | CURR ADDR | BRAN ADDR | OPERATION CODE BIT PATTERN | | | | |
|---|---|---|---|---|---|---|---|
| 3 | 0000 | | 1 010 010 000 | XROOT | ROM 5 | | 0 |
| 4 | 0001 | | 0 101 0[illegible]1 100 | MPRINTD | PT5 | | |
| 5 | 0002 | | 1 011 011 000 | | LOC11 | | |
| 6 | 0003 | 0264 | 1 011 010 011 | | BRN | PCOM | |
| 7 | 0004 | | 0 000 011 100 | MSCALEX | PRS | | SET POINTER CODE FOR X SCALING |
| 8 | 0005 | | 0 004 011 100 | MSCALEY | PRS | | SET POINTER CODE FOR Y SCALING |
| 9 | 0006 | | 0 000 011 100 | MOTIC | PRS | | SET POINTER CODE FOR TICS |
| 10 | 0007 | | 0 000 011 100 | MOAXES | PRS | | SET POINTER CODE FOR AXES |
| 11 | 0010 | | 0 000 011 100 | | PRS | | |
| 12 | 0011 | | 0 000 011 100 | | PRS | | |
| 13 | 0012 | | 1 100 1[illegible]1 000 | | DNR | | |
| 14 | 0013 | | 1 100 1[illegible]1 000 | | DNR | | |
| 15 | 0014 | | 1 010 010 000 | XPLOT | ROM 5 | | EGRESS TO XPLOT |
| 16 | 0015 | | 0 000 0[illegible]1 100 | MLDNS | PT0 | | |
| 17 | 0016 | 0357 | 1 111 000 001 | | JSB | CH0A | N1 |
| 18 | 0017 | | 0 100 1[illegible]1 000 | | CTS | | |
| 19 | 0020 | | 0 100 1[illegible]1 000 | | CTS | | |
| 20 | 0021 | | 0 100 1[illegible]1 000 | | CTS | | N1. N1. N1. N1 |
| 21 | 0022 | | 1 001 111 010 | | XS.AM1 | | 170 IS THIS IN 2 SAMPLE MODE? |
| 22 | 0023 | 0375 | 1 111 110 111 | | BRN | CONT | . NO |
| 23 | 0024 | | 1 001 0[illegible]1 100 | | PT9 | | YES |
| 24 | 0025 | 0357 | 1 111 0[illegible]0 001 | | JSB | CH0A | N2 |
| 25 | 0026 | | 1 100 1[illegible]1 000 | | DNR | | N1. N1. N1. N2 |
| 26 | 0027 | 0143 | 0 111 0[illegible]1 111 | | BRN | SUITE1 | |
| 27 | 0030 | | 0 010 1[illegible]1 001 | VAR | CXM | | 170 VAR KEY |
| 28 | 0031 | | 1 011 0[illegible]1 100 | | PT11 | | 4 TO F11 |
| 29 | 0032 | | 0 100 011 000 | | LOC4 | | |
| 30 | 0033 | | 0 010 1[illegible]1 002 | FC | CXM | | |
| 31 | 0034 | 0373 | 1 111 1[illegible]1 111 | | BRN | FIN | |
| 32 | 0035 | 0276 | 1 011 111 011 | PT | BRN | MSTX | UX. UX |
| 33 | 0036 | 0477 | 0 011 111 111 | | BRN | MP12 | SKIP 1 IF 2 VAR |
| 34 | 0037 | 0131 | 0 100 0[illegible]0 111 | | BRN | MEXNS | EXCHANGE N1 AND N2 |
| 35 | 0040 | 0275 | 1 011 110 111 | | BRN | MSTY | UY. UY. UX |
| 36 | 0041 | 0331 | 1 100 0[illegible]0 111 | | BRN | MCAL20 | UX+UY. " |
| 37 | 0042 | 0132 | 0 100 0[illegible]1 011 | | BRN | MP22 | SKIP 4 IF 2 VAR |
| 38 | 0043 | 0131 | 0 100 0[illegible]0 111 | | BRN | MEXNS | EXCHANGE N1 AND N2 |
| 39 | 0044 | | 1 100 1[illegible]1 000 | | DNR | | BRING DOWN UX+UY FOR STORAGE |
| 40 | 0045 | | 0 100 0[illegible]1 100 | | PT4 | | |
| 41 | 0046 | 0376 | 1 111 111 011 | | BRN | SKIP+ | |
| 42 | 0047 | 0274 | 1 011 110 011 | | BRN | MSTXY | UXY. UXY. UX+UY |
| 43 | 0050 | 0277 | 1 011 111 111 | | BRN | MCAL30 | UX+UY-2UXY. " |
| 44 | 0051 | | 0 101 0[illegible]1 100 | | PTS | | 120 |
| 45 | 0052 | 0161 | 0 111 000 111 | | BRN | MSTORE | STORE UX+UY (2 SAMP) OR UX+UY-2UXY (2 VAR.) |
| 46 | 0053 | 0315 | 0 000 110 111 | | BRN | MLDNS | N1. N2. N2. N1 (2 SAMPLE CASE) |
| 47 | 0054 | 0255 | 1 000 010 111 | | BRN | MCALNS | (N1+N2-2)/(UX+UY)(NH+N2) N1N2 |
| 48 | 0055 | [illegible] | 0 000 000 011 | | BRN | XROOT | R( ) |
| 49 | 0056 | | 0 101 0[illegible]1 102 | | PTS | | |
| 50 | 0057 | 0161 | 0 111 000 111 | | BRN | MSTORE | STORE ABOVE PARTIAL RESULT IN R15 |
| 51 | 0060 | 0315 | 0 000 110 111 | | BRN | MLDNS | 127 N1. N2. N2. N1 |
| 52 | 0061 | 0227 | 1 001 011 111 | | BRN | MCALT | 130 T |

STATISTICS FUNCTION BLOCK LISTING (ROM 4)—Continued

| CURR ADDR | BRAN ADDR | OPERATION CODE BIT PATTERN | | | | |
|---|---|---|---|---|---|---|
| 0262 | | 0 101 001 100 | | PT5 | | |
| 0263 | 0161 | 0 111 000 111 | | BRN | MSTORE | STORE T IN R15 |
| 0264 | 0162 | 0 111 001 011 | | BRN | MLDEQ | PRINT "\ =" |
| 0265 | 0324 | 1 100 010 011 | | BRN | MPRINTT | |
| 0266 | 0341 | 1 110 000 111 | | BRN | MDPRT | PRINT T |
| 0267 | 0215 | 0 000 110 111 | | BRN | MLONS | N1, N2, N2, N1 |
| 0270 | 0245 | 1 010 010 111 | | BRN | MCALD | DEGREES OF FREEDOM |
| 0271 | | 0 110 001 100 | | PT6 | | 140 |
| 0272 | 0161 | 0 111 000 111 | | BRN | MSTORE | STORE DEG. FROM IN R16 |
| 0273 | 0162 | 0 111 001 011 | | BRN | MLDEQ | PRINT ": =" |
| 0274 | 0321 | 0 000 000 111 | | BRN | MPRINTD | |
| 0275 | 0341 | 1 110 000 111 | | BRN | MDPRT | PRINT DEGEES OF FEEDOM |
| 0276 | 0353 | 1 110 101 111 | | BRN | BOUT | |
| 0277 | | 0 001 001 100 | MP12 | PT1 | | |
| 0123 | 0123 | 0 100 001 111 | | BRN | LT | |
| 0131 | | 0 010 010 000 | MEXNS | ROM 1 | | EGRESS TO MEXNS |
| 0132 | | 0 100 001 100 | MP22 | PT4 | | |
| 0133 | | 1 011 111 010 | LT | XS,AM1 | | IS THIS 2 VAR OR 2 SAMPLE |
| 0134 | 0376 | 1 111 111 011 | | BRN | SKIP+ | 2 VAR |
| 0135 | 0375 | 1 111 110 111 | | BRN | CONT | 2 SAMPLE |
| 0136 | | 1 101 100 010 | | P,AM1A | | |
| 0137 | 0111 | 0 100 100 111 | | BRN | R5 | |
| 0110 | | 0 001 010 000 | | EFRA. | | 110 |
| 0111 | | 1 010 010 000 | R5 | ROM 5 | | |
| 0112 | | 1 101 101 110 | SEP | W,AM1A | | 20 |
| 0113 | | 1 101 101 110 | | W,AM1A | | IS THIS AN X RANGE ENTRY? |
| 0114 | 0120 | 0 101 000 011 | | BRN | T2 | NO |
| 0115 | | 0 111 011 000 | BPRG1 | LOC7 | | YES LOAD STARTING ADDRESS FOR PRG1 |
| 0116 | | 0 101 011 000 | | LOC5 | | |
| 0117 | 0155 | 0 110 110 111 | | BRN | ROMID | |
| 0120 | | 1 101 101 110 | T2 | W,AM1A | | IS THIS A Y RANGE ENTRY? |
| 0121 | 0125 | 0 101 010 111 | | BRN | T3 | NO |
| 0122 | | 0 101 011 000 | BPRG2 | LOC5 | | 30 YES, LOAD STARTING ADDRESS FOR PRG2 |
| 0123 | | 1 110 011 000 | | LOC14 | | |
| 0124 | 0155 | 0 110 110 111 | | BRN | ROMID | |
| 0125 | | 1 101 101 110 | T3 | W,AM1A | | 40 IS THIS A TIC ENTRY? |
| 0126 | 0132 | 0 101 101 011 | | BRN | T4 | NO |
| 0127 | | 1 101 011 000 | BPTIC | LOC13 | | YES, LOAD STARTING ADDRESS FOR PTIC |
| 0130 | | 0 000 011 000 | | LOC0 | | |
| 0131 | 0155 | 0 110 110 111 | | BRN | ROMID | |
| 0132 | | 1 101 101 110 | T4 | W,AM1A | | IS THIS AN AXES ENTRY? |
| 0133 | 0222 | 1 000 000 011 | | BRN | ZEROF11 | NO, SET F11 FOR DATA ENTRY |
| 0134 | | 1 100 011 000 | BPORG | LOC12 | | YES, LOAD STARTING ADDRESS FOR PORG |
| 0135 | | 1 010 011 000 | | LOC10 | | |
| 0136 | 0155 | 0 110 110 111 | | BRN | ROMID | |
| 0137 | 0225 | 0 000 010 111 | PRG2 | BRN | MSCALEY | STORE Y LIMITS |
| 0140 | 0162 | 0 111 001 011 | | BRN | MLDEQ | |
| 0141 | 0221 | 1 000 000 111 | | BRN | MPRINTG2 | PRINT"RG2=" |
| 0142 | 0366 | 1 111 011 011 | | BRN | MSPRT | PRINT YMIN |
| 0143 | 0341 | 1 110 000 111 | | BRN | MDPRT | PRINT YMAX |
| 0144 | 0347 | 1 110 011 111 | | BRN | DATRES | SET F11 TO 0 |
| 0145 | | 0 011 001 100 | MPRINT1 | PT3 | | |
| 0146 | | 1 011 011 000 | | LOC11 | | |
| 0147 | | 0 001 001 100 | | PT1 | | |
| 0150 | 0331 | 1 101 100 111 | | BRN | LD6 | |
| 0151 | | 1 100 101 110 | AX | W,AXB. | | ACCESS TO AX FROM ROM 6, DIGIT TO A0 |
| 0152 | | 0 001 001 100 | | PT1 | | SET POINTER TO LOAD STARTING ADDRESSES |
| 0153 | 0112 | 0 100 101 011 | | BRN | SEP | |
| 0154 | | 1 100 011 000 | BPT | LOC12 | | |
| 0155 | | 0 010 101 000 | ROMID | CXH | | |
| 0156 | | 0 111 001 100 | | PT7 | | |
| 0157 | | 0 011 011 000 | | LOC3 | | |
| 0160 | | 0 000 010 000 | | ROM 0 | | 160 EGRESS TO START |
| 0161 | | 0 100 010 000 | MSTORE | ROM 2 | | |
| 0162 | | 0 100 010 000 | MLDEQ | ROM 2 | | |
| 0163 | | 0 110 101 000 | SOITF1 | STA | | N1, N1, N2, N2 |
| 0164 | | 1 101 101 000 | | DNR | | N1, N2, N2, N1 |
| 0165 | 0375 | 1 111 110 111 | | BRN | CONT | |
| 0166 | 0224 | 0 000 010 011 | PRG1 | BRN | MSCALEX | STORE X LIMITS |
| 0167 | 0162 | 0 111 001 011 | | BRN | MLDEQ | |
| 0170 | 0262 | 1 011 001 011 | | BRN | MPRINTG1 | PRINT "RG1=" |
| 0171 | 0366 | 1 111 011 011 | | BRN | MSPRT | PRINT XMIN |
| 0172 | 0341 | 1 110 000 111 | | BRN | MDPRT | PRINT XMAX |
| 0173 | 0347 | 1 110 011 111 | | BRN | DATRES | SET F11 TO 0 |
| 0174 | | 1 101 111 010 | T | XS,AM1A | | T KEY |
| 0175 | | 1 101 111 010 | | XS,AM1A | | IS THIS IN 1 VARIABLE MODE? |
| 0176 | 0333 | 1 101 101 111 | | BRN | COMP7 | NO |
| 0177 | 0373 | 1 111 101 111 | | BRN | FIN | YES, DO NOT ACCEPT |
| 0200 | | 1 100 010 000 | ZEROF11 | ROM 6 | | |
| 0201 | 0245 | 1 011 011 001 | MPRINTG2 | JSR | RG | |
| 0202 | | 0 010 011 000 | | LOC2 | | |
| 0203 | 0244 | 1 011 010 011 | | BRN | PCOM | 150 |
| 0204 | | 0 000 000 000 | | DUMMY | | |
| 0205 | 0355 | 1 110 111 001 | MCALNS | JSR | MULT | N1N2, ", N2, N1 |
| 0206 | | 1 100 101 000 | | DNR | | |
| 0207 | | 1 100 101 000 | | DNR | | N2, N1, N1N2, N1N2 . |
| 0210 | 0363 | 1 111 010 001 | | JSR | PLUS | 210 N1+N2, ", N1N2, N1N2 |
| 0211 | | 0 100 101 000 | | CTS | | N1+N2, N1+N2, N1+N2, N1N2 |
| 0212 | | 0 011 001 110 | | W,ZTC | | |
| 0213 | | 1 100 001 100 | | PT12 | | |
| 0214 | | 0 011 011 000 | | LOC2 | | 2 |
| 0215 | 0362 | 1 111 001 101 | | JSR | MINUS | N1+N2-2, ", N1+N2, N1N2 |
| 0216 | | 1 100 101 000 | | DNR | | |
| 0217 | | 1 100 101 000 | | DNR | | N1+N2, N1N2, N1+N2-2, N1+N2-2 |
| 0220 | 0355 | 1 110 111 001 | | JSR | MULT | 220 N1N2(N1+N2) ", |
| 0221 | | 1 100 101 000 | | DNR | | |
| 0222 | 0353 | 1 110 110 001 | | JSR | DIVIDE | |
| 0223 | | 0 101 001 100 | | PT5 | | |
| 0224 | 0346 | 1 111 000 101 | | JSR | CH1A | UX+UY |
| 0225 | 0353 | 1 110 110 001 | | JSR | DIVIDE | (N1+N2-2)/(UX+UY)(N1+N2)N1N2 |
| 0226 | 0375 | 1 111 110 111 | | BRN | CONT | |
| 0227 | | 0 001 001 100 | MCALT | PT1 | | N1, N2, N2, N1 |
| 0230 | 0357 | 1 111 000 001 | | JSR | CH0A | 230 SX |
| 0231 | 0355 | 1 110 111 001 | | JSR | MULT | N2SX, " |
| 0232 | | 1 100 101 000 | | DNR | | |
| 0233 | | 1 100 101 000 | | DNR | | N2, N1, N2SX, " |
| 0234 | | 0 100 001 100 | | PT4 | | |

STATISTICS FUNCTION BLOCK LISTING (ROM 4)—Continued

| LINE # | CURR ADDR | BRAN ADDR | OPERATION CODE BIT PATTERN | | | | |
|---|---|---|---|---|---|---|---|
| 160 | 0235 | 0357 | 1 111 000 001 | | JSB | CHØA | SY |
| 161 | 0236 | 0355 | 1 110 111 001 | | JSB | MULT | N1SY, N1SY, N2SX, N2SX |
| 162 | 0237 | | 1 100 101 000 | | DNR | | |
| 163 | 0240 | 0362 | 1 111 001 101 | | JSB | MINUS | 240 N2SX-N1SY, " |
| 164 | 0241 | | 0 111 001 101 | | PTS | | |
| 165 | 0242 | 0360 | 1 111 000 101 | | JSB | CHIA | |
| 166 | 0243 | 0355 | 1 110 111 001 | | JSB | MULT | T=(N2SX-N1SY)R((N1+N2-2/(UX+UY)(N1+N2)N1N2) |
| 167 | 0244 | 0375 | 1 111 110 111 | | BRN | CONT | |
| 168 | 0245 | 0363 | 1 111 010 001 | MCAL0 | JSB | PLUS | N1+N2, " |
| 169 | 0246 | | 0 011 001 110 | | W.ZTC | | |
| 170 | 0247 | | 0 010 011 000 | | LDC2 | | 250 2 |
| 171 | 0250 | 0362 | 1 111 001 101 | | JSB | MINUS | N1+N2-2," =DEG. FROM. |
| 172 | 0251 | | 1 010 101 000 | | WTC | | |
| 173 | 0252 | | 0 001 111 010 | | XS.CMI | | IS THIS IN 2 SAMPLE MODE? |
| 174 | 0253 | 0256 | 1 010 111 011 | | BRN | HALF | NO, DIVIDE BY 2 |
| 175 | 0254 | | 1 100 101 000 | | DNR | | YES |
| 176 | 0255 | 0375 | 1 111 110 111 | | BRN | CONT | |
| 177 | 0256 | | 0 011 001 110 | HALF | W.ZTC | | |
| 178 | 0257 | | 0 010 011 000 | | LDC2 | | 257 2, 2N1-2 |
| 179 | 0260 | 0353 | 1 110 110 001 | | JSB | DIVIDE | 260 N1-1 =DEG. FROM |
| 180 | 0261 | 0375 | 1 111 110 111 | | BRN | CONT | |
| 181 | 0262 | 0265 | 1 011 011 001 | MPRINTG1 | JSB | RG | |
| 182 | 0263 | | 0 001 011 000 | | LDC1 | | |
| 183 | 0264 | 0367 | 1 111 110 001 | PCOM | JSB | PRINT | |
| 184 | 0265 | 0375 | 1 111 110 111 | | BRN | CONT | |
| 185 | 0266 | | 0 101 001 100 | RG | PTS | | LOAD "RG" IN C |
| 186 | 0267 | | 1 100 011 000 | | LDC12 | | |
| 187 | 0270 | | 1 100 011 000 | | LDC12 | | 270 |
| 188 | 0271 | | 0 011 001 100 | | PT3 | | |
| 189 | 0272 | | 0 100 100 100 | | RS4 | | RETURN FROM ROM 7 ROUTINES |
| 190 | 0273 | | 0 000 110 000 | | RETURN | | |
| 191 | 0274 | | 0 110 010 000 | MSTXY | ROM 3 | | |
| 192 | 0275 | | 0 110 010 000 | MSTY | ROM 3 | | |
| 193 | 0276 | | 0 110 010 000 | MSTX | ROM 3 | | |
| 194 | 0277 | 0363 | 1 111 010 001 | MCAL30 | JSB | PLUS | 2UXY, ", UX+UY |
| 195 | 0300 | | 0 011 111 110 | | S.ZNCC | | 300 -2UXY, 2UXY, UX+UY |
| 196 | 0301 | | 0 110 101 000 | MCAL20 | STA | | -2UXY, UX+UY |
| 197 | 0302 | 0363 | 1 111 010 001 | | JSB | PLUS | UX+UY-2UXY |
| 198 | 0303 | 0375 | 1 111 110 111 | | BRN | CONT | |
| 199 | 0304 | | 1 010 001 100 | MPRINTT | PT10 | | |
| 200 | 0305 | | 1 010 011 000 | | LDC10 | | |
| 201 | 0306 | | 1 001 111 010 | | XS.AMI | | |
| 202 | 0307 | 0311 | 1 100 100 111 | | BRN | P | |
| 203 | 0310 | 0264 | 1 011 010 011 | | BRN | PCOM | |
| 204 | 0311 | | 1 010 011 000 | P | LDC10 | | |
| 205 | 0312 | 0264 | 1 011 010 011 | | BRN | PCOM | |
| 206 | 0313 | [illegible] | 0 000 011 111 | PORG | BRN | MDAXES | PLOT AXES |
| 207 | 0314 | 0142 | 1 111 001 011 | | BRN | MLOFQ | |
| 208 | 0315 | 0327 | 1 101 011 111 | | BRN | MPRINTO | PRINT "ORG=" |
| 209 | 0316 | 0366 | 1 111 011 011 | | BRN | MSPRT | 320 PRINT X COOR. OF ORIGIN |
| 210 | 0317 | 0341 | 1 110 000 111 | | BRN | MDPRT | PRINT Y COOR. OF ORIGIN |
| 211 | 0320 | 0347 | 1 110 011 111 | | BRN | DATRES | SET F11 TO 0 |
| 212 | 0321 | 0146 | 0 000 011 011 | PTIC | BRN | MOTIC | DRAW TICS |
| 213 | 0322 | 0142 | 0 111 001 011 | | BRN | MLOFQ | PRINT "T I =" |
| 214 | 0323 | 0145 | 0 110 010 111 | | BRN | MPRINTI | |
| 215 | 0324 | 0366 | 1 111 011 011 | | BRN | MSPRT | PRINT X TIC INTERVAL |
| 216 | 0325 | 0341 | 1 110 000 111 | | BRN | MDPRT | PRINT Y TIC INTERVAL |
| 217 | 0326 | 0347 | 1 110 011 111 | | BRN | DATRES | SET F11 TO 0 |
| 218 | 0327 | | 0 010 001 100 | MPRINTO | PT2 | | |
| 219 | 0330 | | 1 011 011 000 | | LDC11 | | |
| 220 | 0331 | | 0 110 011 000 | LD6 | LDC6 | | |
| 221 | 0332 | 0264 | 1 011 010 011 | | BRN | PCOM | |
| 222 | 0333 | | 0 011 001 100 | COMP? | PT3 | | 100 |
| 223 | 0334 | | 1 001 100 010 | | P.AMI | | IS THE DATA COMPLETE? |
| 224 | 0335 | 0374 | 1 111 110 011 | | BRN | NOTE | NO, NOTE 30 |
| 225 | 0336 | | 0 001 001 100 | | PT1 | | YES, [illegible] STARTING ADDRESS FOR PT PRGM |
| 226 | 0337 | | 0 001 011 000 | | LDC1 | | |
| 227 | 0340 | 0154 | 0 110 110 011 | | BRN | BPT | |
| 228 | 0341 | | 1 100 101 000 | MDPRT | DNR | | |
| 229 | 0342 | 0377 | 1 111 111 111 | | BRN | XPRINT | |
| 230 | 0343 | | 0 100 000 100 | CHP | SS4 | | |
| 231 | 0344 | | 1 110 010 000 | | ROM 7 | | |
| 232 | 0345 | | 0 100 000 100 | DS | SS4 | | |
| 233 | 0346 | | 1 110 010 000 | | ROM 7 | | |
| 234 | 0347 | | 0 010 101 000 | DATRES | CXM | | SET F11 TO 0 |
| 235 | 0350 | | 1 011 001 100 | | PT11 | | |
| 236 | 0351 | | 0 000 011 000 | | LDC0 | | |
| 237 | 0352 | | 0 010 101 000 | | CXM | | |
| 238 | 0353 | | 0 100 010 000 | BOUT | ROM 2 | | |
| 239 | 0354 | | 0 100 000 100 | DIVIDE | SS4 | | |
| 240 | 0355 | | 1 110 010 000 | | ROM 7 | | |
| 241 | 0356 | | 0 100 010 100 | MULT | SS4 | | |
| 242 | 0357 | | 1 110 010 000 | | ROM 7 | | |
| 243 | 0360 | | 1 000 000 100 | CHØA | SS8 | | 360 |
| 244 | 0361 | | 0 100 000 100 | CHIA | SS4 | | |
| 245 | 0362 | | 1 110 010 000 | | ROM 7 | | |
| 246 | 0363 | | 0 011 111 110 | MINUS | S.ZNCC | | |
| 247 | 0364 | | 0 100 000 100 | PLUS | SS4 | | |
| 248 | 0365 | | 1 111 010 000 | | ROM 7 | | |
| 249 | 0366 | 0344 | 1 110 010 101 | MSPRT | JSB | DS | PRINT CONTENTS OF DS |
| 250 | 0367 | 0377 | 1 111 111 111 | | BRN | XPRINT | |
| 251 | 0370 | | 1 000 000 100 | PRINT | SS8 | | 370 |
| 252 | 0371 | | 0 100 000 100 | | SS4 | | |
| 253 | 0372 | | 1 110 010 000 | | ROM 7 | | |
| 254 | 0373 | | 0 000 010 000 | FIN | ROM 0 | | |
| 255 | 0374 | | 0 000 010 000 | NOTE | ROM 0 | | |
| 256 | 0375 | | 0 000 010 000 | CONT | ROM 0 | | |
| 257 | 0376 | | 0 010 010 000 | SKIP+ | ROM 1 | | |
| 258 | 0377 | | 1 010 010 000 | XPRINT | ROM 5 | | 377 |

STATISTICS FUNCTION BLOCK LISTING (ROM 5)

```
CURR  BRAN   OPERATION CODE
ADDR  ADDR   BIT PATTERN

0004         0 200 010 000  XPRINT  ROM 0                 0
0001         0 000 010 002  XPLOT   ROM 0
0002         1 101 111 110  HIST    S.AMIA
0003         1 101 111 110          S.AMIA
0004         1 101 111 110          S.AMIA
0005         1 101 111 110          S.AMIA
0005  0373   1 111 111 111          BRN     FIN
0007  0255   0 010 110 111          BRN     HISTI
0010  0235   0 001 110 111          BRN     PLOT      10 PLOT KEY
0011         0 000 000 000          DUMMY
0012  0365   1 111 011 001          JSB     BLANK        HIST KEY
0013  0322   0 000 001 011          BRN     HIST
0014         1 111 001 101  XPENUP  PT11              SET POINTER CODE FOR PENUP
0015         0 000 1 1 100  XPLOT   YP0               20 ACCESS TO XPLOT
0016  0020   0 001 000 011          BRN     DECOP
0017  0025   0 201 010 111          BRN     ADA
0020         1 011 1 1 110  DECOP   W.ZTA             SET A0 TO PREVIOUSLY SET POINTER VALUE
0021         0 000 011 110  INC     P.S
0022         1 111 1 1 110          4.APIA
0023         0 000 1 1 100          YP0
0024  0021   0 001 010 111          BRN     INC
0025         0 121 001 110  ADA     W.SLA             30 SHIFT A0 TO A1
0026         1 111 1 1 110          4.APIA            LOAD U'S IN A0 AND A2
0027         1 111 111 010          XS.APIA
0030  0366   1 111 011 101          JSB     EX4712    EXCHANGE FLAGS
0031         0 010 1 1 000          CXM
0032         0 010 011 000          LOC2              SET HENRY.S F11 TO 2 TO INDICATE I/O CALL
0033         0 010 1 1 000          CXM
0034         0 000 1 0 000          RMGRA             EGRESS TO PLOT ROUTINES
0035         1 001 1 0 010  PLOT    P.AMI             IS THIS IN PLOTTING MODE
0036  0041   0 011 0 0 111          BRN     TO        YES
0037         0 111 0 1 100          PT7               NO. PRINT NOTE 37
0040  0374   1 111 110 011          BRN     NOTE      40
0041         1 101 111 110  TO      S.AMIA            HAS A REG. OR HIST. BEEN PERFORMED
0042  0045   0 010 010 111          BRN     TI        YES
0043         0 110 0 1 100          PT6               NO. PRINT NOTE 36
0044  0374   1 111 110 011          BRN     NOTE
0045         1 101 0 1 100  TI      PT13
0046         0 010 011 000          LOC2
0047         0 001 001 100          PT1
0050         0 001 011 110          S.AMC             50 WHAT KIND OF PLOT?
0051  0153   0 110 1 1 111          BRN     BPLOTH    HISTOGRAM
0052         0 111 011 000  BPLOT   LOC7              REG. LOAD STARTING ADDRESS FOR PLOR PRGM
0053         0 001 011 000          LOC1              53
0054  0155   0 110 110 111          BRN     ROMID
0055  0365   1 111 011 001  HISTI   JSB     BLANK     PRINT HG
0056         0 001 001 100          PT1
0057         0 101 011 000          LOC5
0060         1 000 011 000          LOC4
0061  0367   1 111 1 0 001          JSB     PRINT
0062  0344   1 110 010 101          JSB     DS        0 TO DS
0063         0 011 001 110          W.ZTC
0064         1 011 110 000          DTOS
0065         0 001 001 100  BPHOUT  PT1               LOAD STARTING ADDRESS FOR PHOUT PRGM
0066         0 100 011 000          LOC4
0067         0 000 011 000          LOC0
0070  0155   0 110 110 111          BRN     ROMID
0071  0167   0 111 011 111          BRN     MLB       CALC LOWER BOUND
0072  0004   0 000 0 0 011          BRN     XPRINT    PRINT LOWER BOUND
0073  0117   0 100 111 111          BRN     MFREN     FETCH FREQ
0074  0004   0 000 000 011          BRN     XPRINT       PRINT FREQ.
0075  0265   1 011 010 111          BRN     MRF       CALC REL FREQ
0076  0004   0 000 000 011          BRN     XPRINT    PRINT RELATIVE FREQ
0077  0223   1 001 0 1 111          BRN     MINCAD    ADV PAPER .INC I
0100  0325   1 101 010 111          BRN     MTI          IF 10 CELLS PRINTED. GO TO FIN
0101  0224   1 001 010 011  PHOUT   BRN     MINCI     INC I
0102  0004   0 000 000 011          BRN     XPRINT    100 PRINT CELL NUMBER
0103  0222   1 001 0 0 011          BRN     MDECI
0104         1 100 0 1 100          PT12
0105  0377   1 111 111 111          BRN     SKIP-        GO TO MLB
0106  0353   1 110 101 111          BRN     BOUT
0107         1 100 101 000  MDPRT   DNR               XDATA TO C
0110         1 011 110 000          DTOS              110 STORE X DATA INDS
0111  0004   0 000 0 0 011          BRN     XPRINT       PRINT X DATA
0112         0 001 010 011          EFRA              GO TO NEXT PROGRAM STEP
0113         0 000 0 0 000          DUMMY
0114         0 000 0 0 000          DUMMY
0115         0 000 0 0 000          DUMMY
0116         0 000 0 0 000          DUMMY
0117         0 010 010 000  MFREN   ROM 1             EGRESS TO MFREN
0120  0014   0 000 110 011  PLOTH   BRN     XPENUP    120 RAISE PEN
0121  0235   1 001 111 011          BRN     MPHE      0 TO DS
0122  0215   1 000 110 111          BRN     MEC       FREQ TO C
0123  0147   0 110 011 111          BRN     MLBO      0 TO C  PEN TO COOR (LB. 0)
0124  0325   1 101 010 111          BRN     MTI          IF 10 CELLS PLOTTED GO TO FIN
0125  0200   1 000 0 0 011          BRN     MTLH      IF I EXCEEDS XMAX-1 .GO TO FIN
0126  0153   0 110 1 0 011          BRN     XCOOR     130 PEN TO COOR. (LB. NEWF)
0127  0224   1 001 010 011          BRN     MINCI
0130         0 111 001 100          PT7
0131  0377   1 111 111 111          BRN     SKIP-        BACK TO MEC
0132  0014   0 000 110 011          BRN     XPENUP
0133  0373   1 111 1 1 111          BRN     FIN
0134         1 010 001 100  XPLINC  PT10              SET POINTER CODE FOR PEN TO COOR. WITH INCREMENT
0135  0020   0 001 000 011          BRN     DECOP
0136  0107   0 100 011 111  REV     BRN     MDPRT        PRINT X DATA AND STORE IT IN DS
0137         0 011 001 100          PT3
0140  0161   0 111 000 111          BRN     MSTORE    140 STORE SDATA IN R13
0141  0243   1 010 0 1 111          BRN     MEVAL        Y
0142         0 100 0 1 100          PT4
0143  0161   0 111 0 0 111          BRN     MSTORE       STORE Y IN R14
0144  0004   0 000 0 0 011          BRN     XPRINT       PRINT Y
0145  0353   1 110 1 1 111          BRN     BOUT
0146  0341   1 110 000 111  EK      BRN     EVAL      EVAL KEY
0147         0 011 0 1 110  MLBO    W.ZTC
0150         1 110 0 1 100  XCOOR   PT14              SET CODE FOR PLOT WITHOUT INCREMENT
```

STATISTICS FUNCTION BLOCK LISTING (ROM 5) – Continued

```
CURR   BRAN    OPERATION CODE
ADDR   ADDR    BIT PATTERN

0151   0320    Ø ØØ1 ØØØ Ø11            BRN      DECOP
0152           Ø ØØØ ØØØ ØØØ            DUMMY
0153           Ø 1ØØ Ø11 ØØØ  BPLOTH    LOC4                 LOAD STARTING ADDRESS FOR PLOTH PRGM
0154           1 111 Ø11 ØØ1            LOC15
0155           Ø Ø1Ø 1 1 ØØØ  ROMID     CXM
0156           Ø 111 ØØ1 1ØØ            PT7
0157           Ø 1ØØ Ø11 ØØØ            LOC4
0160           Ø ØØØ Ø1Ø ØØØ            ROM Ø                160
0161           Ø 1ØØ Ø1Ø ØØØ  MSTORE    ROM 2
0162   0014    Ø ØØØ 11Ø Ø11  PLOR      BRN      XPENUP      RAISE PEN
0163   0277    1 Ø11 111 111            BRN      MINIT       INITIALIZE REGRESSION PLOT
0164   0243    1 Ø1Ø Ø 1 111            BRN      MEVAL       EVAL Y FOR CURRENT X IN DS
0165   0134    Ø 1Ø1 11Ø Ø11            BRN      XPLINC      PEN TO (X,Y)
0166   0314    1 1ØØ 11Ø Ø11            BRN      MTL         IF X IS GREATER THAN XMAX PLOT IS FINISH
0167   0344    1 11Ø Ø1Ø 1Ø1  MLR       JSB      DS          I,
0170           Ø 1ØØ 1Ø1 ØØØ            CTS                  I,I
0171           Ø 1Ø1 ØØ1 1ØØ            PT5
0172   0362    1 111 ØØØ 1Ø1            JSB      CHIA        CW,I
0173   0355    1 11Ø 111 ØØ1            JSH      MULT        I(CW),",
0174           Ø 11Ø ØØ1 1ØØ            PT6
0175   0361    1 111 Ø Ø 1Ø1            JSB      CHIA           OFST ,I(CW)
0176   0363    1 111 Ø1Ø ØØ1            JSB      PLUS        LB, LB,
0177   0375    1 111 11Ø 111            BRN      CONT
0200           Ø Ø1Ø ØØ1 1ØØ  MTLH      PT2                  FETCH XMAX
0201   0362    1 11Ø Ø 1 1Ø1            JSB      CHP
0202           Ø 1ØØ 1Ø1 ØØØ            CTS
0203           Ø Ø11 ØØ1 11Ø            W,ZTC
0204           1 1ØØ ØØ1 1ØØ            PT12
0205           Ø 111 1ØØ Ø1Ø            P,CPIC               I ,XMAX
0206   0362    1 111 ØØ1 1Ø1            JSB      MINUS       XMAX-1
0207   0344    1 11Ø Ø1Ø 1Ø1            JSB      DS          I ,XMAX-1
0210   0362    1 111 ØØ1 1Ø1            JSB      MINUS       XMAX-1-DS
0211           Ø 1ØØ Ø 1 1ØØ            PT4
0212           Ø ØØ1 111 11Ø            S,CMI                IS THERE ROOM TO PLOT ANOTHER WINDOW
0213   0376    1 111 111 Ø11            BRN      SKIP+       NO ,PLOT IS FINISHED
0214   0117    1 1ØØ 111 111            BRN      MFREN       YES, CALC FREQ
0215           1 1ØØ 1Ø1 ØØØ  MFC       GNR
0216           1 1ØØ 1Ø1 ØØØ            DNR
0217   0151    Ø 11Ø 1ØØ Ø11            BRN      XCOOR
0220           1 Ø11 1 1 11Ø  MOFCI     W,ZTA
0221           1 1Ø1 111 111            S,AMIA               LOAD MINUS SIGN
0222   0224    1 ØØ1 Ø1Ø 1Ø1            JSB      CINC
0223   0372    1 111 1ØØ 1Ø1  MINCAD    JSB      ADV
0224           1 Ø11 1Ø1 11Ø  MINCI     W,ZTA
0225           1 1ØØ ØØ1 1ØØ  CINC      PT12
0226           1 111 11Ø Ø1Ø            P,APIA
0227           Ø 1ØØ 1Ø1 ØØØ            CTS
0230           1 11Ø 1 1 11Ø            W,AKC                I ,F
0231           Ø 1ØØ 1Ø1 ØØØ            CTS                  I,I,F
0232   0344    1 11Ø Ø1Ø 1Ø1            JSB      DS          I ,I ,F
0233   0363    1 111 Ø1Ø ØØ1            JSB      PLUS        I,I,F
0234           1 Ø11 11Ø ØØØ            DTOS
0235   0375    1 111 11Ø 111            BRN      CONT
0236   0344    1 11Ø Ø1Ø 1Ø1  MPRE      JSB      DS
0237           Ø Ø11 Ø 1 11Ø            W,ZTC
0240           1 Ø11 11Ø ØØØ            DTOS                  Ø TO DS
0241           Ø ØØ1 Ø 1 1ØØ            PT1
0242   0376    1 111 111 Ø11            BRN      SKIP+
0243   0344    1 11Ø Ø1Ø 1Ø1  MEVAL     JSB      DS          FETCH X
0244           Ø 1ØØ 1 1 ØØØ            CTS                  X ,X
0245   0355    1 11Ø 111 ØØ1            JSB      MULT        X2, X2
0246           Ø Ø1Ø Ø 1 1ØØ            PT2
0247   0361    1 111 Ø Ø 1Ø1            JSB      CHIA            C
0250   0355    1 11Ø 111 ØØ1            JSB      MULT            CX2, CX2
0251   0344    1 11Ø Ø1Ø 1Ø1            JSB      DS          250 X
0252           Ø 1ØØ 1Ø1 ØØØ            CTS                      X, X, CX2,
0253           Ø ØØ1 Ø 1 1ØØ            PT1
0254   0361    1 111 ØØØ 1Ø1            JSB      CHIA            B
0255   0355    1 11Ø 111 ØØ1            JSB      MULT            BX,BX,CX2
0256           Ø 11Ø 1Ø1 ØØØ            STA                      BX,CX2
0257   0363    1 111 Ø1Ø ØØ1            JSB      PLUS            BX+CX2, "
0260           Ø ØØØ Ø 1 1ØØ            PTØ                  257
0261   0361    1 111 ØØØ 1Ø1            JSB      CHIA        260 A
0262   0363    1 111 Ø1Ø ØØ1            JSB      PLUS            Y,Y
0263   0375    1 111 11Ø 111            BRN      CONT
0264           Ø ØØØ ØØØ ØØØ            DUMMY
0265           Ø 1ØØ 1Ø1 ØØØ  MRF       CTS                  F ,F
0266           Ø ØØØ ØØ1 1ØØ            PTØ
0267   0357    1 111 ØØØ ØØ1            JSB      CHØA            N ,F
0270   0353    1 11Ø 11Ø ØØ1            JSB      DIVIDE          RF, RF
0271           Ø 111 1Ø1 Ø1Ø            X,CPIC                  CONVERT TO %
0272           Ø 111 1Ø1 Ø1Ø            X,CPIC
0273           Ø ØØØ ØØØ ØØØ            DUMMY                270
0274   0375    1 111 11Ø 111            BRN      CONT
0275           Ø 1Ø1 1ØØ 1ØØ            RSS                  RETURN FROM ROM 7 ROUTINES
0276           Ø ØØØ 11Ø ØØØ            RETURN
0277           Ø Ø11 ØØ1 11Ø  MINIT     W,ZTC                LOAD  333,3
0300           1 1ØØ ØØ1 1ØØ            PT12
0301           Ø Ø11 Ø11 ØØØ  LOC3      LOC3
0302           1 ØØØ 1Ø1 1ØØ            YPB
0303   0331    1 1ØØ ØØØ 111            BRU      LOC1
0304           Ø ØØØ ØØ1 1ØØ            PTØ
0305           Ø Ø1Ø Ø11 ØØØ            LOC2
0306           Ø 1ØØ 1Ø1 ØØØ            CTS
0307           Ø 111 ØØ1 1ØØ            PT7
0310   0362    1 11Ø Ø 1 1Ø1            JSB      CHP         FETCH X+
0311   0353    1 11Ø 11Ø ØØ1            JSB      DIVIDE      GENERATE XINC
0312           1 1Ø1 Ø 1 1ØØ            PT13
0313   0320    Ø ØØ1 ØØØ Ø11            BRN      DECOP
0314           Ø 111 Ø 1 1ØØ  MTL       PT7                  FETCH HENRY'S FLAGS
0315   0361    1 111 ØØØ 1Ø1            JSB      CHIA
0316           Ø 11Ø ØØ1 1ØØ            PT6
0317           Ø 1Ø1 1ØØ Ø1Ø            P,CMIC               HAS PLOT REACHED LIMIT
0320   0323    1 1Ø1 Ø 1 111            BRN      RF          YES
0321           Ø Ø11 Ø 1 1ØØ            PT3                  NO
0322   0377    1 111 111 111            BRN      SKIP-
0323           1 Ø11 11Ø ØØØ  RF        DTOS                 RESTORE HENRY'S FLAGS
```

STATISTICS FUNCTION BLOCK LISTING (ROM 5) – Continued

| LINE # | CURR ADDR | BRAN ADDR | OPERATION CODE BIT PATTERN | | | | |
|---|---|---|---|---|---|---|---|
| 215 | 0324 | 0373 | 1 111 111 111 | | BRN | FIN | |
| 216 | 0325 | 0344 | 1 111 011 101 | MTI | JSB | DS | ADDRESS DS |
| 217 | 0326 | | 0 100 101 000 | | CTS | | |
| 218 | 0327 | | 0 011 001 110 | | W.ZTC | | |
| 219 | 0330 | | 1 100 001 100 | | PT12 | | |
| 220 | 0331 | | 0 111 101 110 | | W.CPIC | | |
| 221 | 0332 | | 0 111 100 010 | | P.CPIC | | 10.I |
| 222 | 0333 | 0362 | 1 111 001 101 | | JSB | MINUS | I-10." |
| 223 | 0334 | | 0 101 001 100 | | PTS | | |
| 224 | 0335 | | 0 110 111 110 | | S.ZMC | | IS I LESS THAN 10? |
| 225 | 0336 | 0376 | 1 111 111 011 | | BRN | SKIP+ | NO. PRGM IS FINISHED |
| 226 | 0337 | 0375 | 1 111 110 111 | | BRN | CONT | |
| 227 | 0340 | 0155 | 0 110 110 111 | | BRN | ROMID | 340 ACCESS TO ROM 5 ROMID |
| 228 | 0341 | | 1 010 000 100 | EVAL | SS10 | | EGRESS TO ROM 7 EVAL ROUTINE |
| 229 | 0342 | | 1 110 010 000 | | ROM 7 | | |
| 230 | 0343 | | 0 101 000 100 | CHP | SSS | | |
| 231 | 0344 | | 1 110 010 000 | | ROM 7 | | |
| 232 | 0345 | | 0 101 000 100 | DS | SSS | | |
| 233 | 0346 | | 1 110 010 000 | | ROM 7 | | |
| 234 | 0347 | | 0 101 000 100 | EXM712 | SSS | | |
| 235 | 0350 | | 1 110 010 000 | | ROM 7 | | 350 |
| 236 | 0351 | | 0 000 000 000 | | DUMMY | | |
| 237 | 0352 | | 0 000 000 000 | | DUMMY | | |
| 238 | 0353 | | 0 100 010 000 | ROUT | ROM 2 | | |
| 239 | 0354 | | 0 101 000 100 | DIVIDE | SSS | | |
| 240 | 0355 | | 1 110 010 000 | | ROM 7 | | |
| 241 | 0356 | | 0 101 000 100 | MULT | SSS | | |
| 242 | 0357 | | 1 110 010 000 | | ROM 7 | | |
| 243 | 0360 | | 1 001 000 100 | CHOA | SSA | | 360 |
| 244 | 0361 | | 0 101 000 100 | CHIA | | SSS | |
| 245 | 0362 | | 1 110 010 000 | | ROM 7 | | |
| 246 | 0363 | | 0 011 111 110 | MINUS | S.ZNCC | | |
| 247 | 0364 | | 0 101 000 100 | PLUS | SSS | | |
| 248 | 0365 | | 1 110 010 000 | | ROM 7 | | |
| 249 | 0366 | | 0 101 000 100 | BLANK | SSS | | |
| 250 | 0367 | | 1 110 010 000 | | ROM 7 | | |
| 251 | 0370 | | 1 000 000 100 | PRINT | SSA | | 370 |
| 252 | 0371 | | 0 101 000 100 | ADV | SSS | | |
| 253 | 0372 | | 1 110 010 000 | | ROM 7 | | |
| 254 | 0373 | | 0 000 010 000 | FIN | ROM 0 | | |
| 255 | 0374 | | 0 000 010 000 | NOTE | ROM 0 | | |
| 256 | 0375 | | 0 000 010 000 | CONT | ROM 0 | | |
| 257 | 0376 | | 0 010 010 000 | SKIP+ | ROM 1 | | |
| 258 | 0377 | | 0 000 010 000 | SKIP- | ROM 0 | | 377 |

STATISTICS FUNCTION BLOCK LISTING (ROM 6)

| LINE # | CURR ADDR | BRAN ADDR | OPERATION CODE BIT PATTERN | | | | |
|---|---|---|---|---|---|---|---|
| 3 | 0000 | | 0 010 101 000 | | CXM | | 0 1 TO F5 TO INDICATE DELETE |
| 4 | 0001 | | 0 101 001 100 | | PTS | | |
| 5 | 0002 | | 0 001 011 000 | | LOC1 | | |
| 6 | 0003 | | 0 010 101 000 | | CXM | | |
| 7 | 0004 | 0365 | 1 111 011 001 | | JSB | BLANK | PRINT "DEL" |
| 8 | 0005 | | 1 101 001 100 | | PT13 | | |
| 9 | 0006 | | 1 011 011 000 | | LOC11 | | |
| 10 | 0007 | | 1 011 001 100 | | PT11 | | |
| 11 | 0010 | | 1 001 011 000 | | LOC9 | | 10 |
| 12 | 0011 | 0365 | 1 111 011 001 | | JSB | BLANK | |
| 13 | 0012 | | 0 001 001 100 | | PT1 | | |
| 14 | 0013 | | 0 010 011 000 | | LOC2 | | |
| 15 | 0014 | 0367 | 1 111 100 001 | | JSB | PRINT | |
| 16 | 0015 | 0373 | 1 111 101 111 | | BRN | FIN | |
| 17 | 0016 | 0342 | 1 110 001 101 | AXES | JSB | CHP | AXES KEY. FETCH PLOTTER REG2 |
| 18 | 0017 | | 0 100 101 000 | | CTS | | SAVE REG2 |
| 19 | 0020 | | 0 001 011 000 | | LOC1 | | 20 1 TO C6 |
| 20 | 0021 | | 1 011 110 000 | | DTDS | | STORE IN REG2 |
| 21 | 0022 | 0253 | 1 010 101 111 | | BRN | SUITE1 | |
| 22 | 0023 | | 1 101 001 100 | RECALL | PT13 | | RECALL KEY. LOAD 10 IN C13 |
| 23 | 0024 | | 1 010 011 000 | | LOC10 | | |
| 24 | 0025 | 0302 | 1 100 001 011 | | BRN | SUITE2 | |
| 25 | 0026 | | 1 001 111 010 | SAMPLE | XS.AMI | | SAMPLE KEY IS THIS IN 2 SAMPLE MODE? |
| 26 | 0027 | 0373 | 1 111 101 111 | | BRN | FIN | NO |
| 27 | 0030 | | 0 011 001 110 | | W.ZTC | | 30 YES |
| 28 | 0031 | | 0 100 001 100 | | PT4 | | |
| 29 | 0032 | | 1 001 100 010 | | P.AMI | | WHICH IS THE NEW SAMPLE MODE? |
| 30 | 0033 | 0323 | 1 101 001 111 | | BRN | D1 | DATA 1 1 TO A0 |
| 31 | 0034 | | 0 111 101 110 | | W.CPIC | | DATA 2 2 TO A0 |
| 32 | 0035 | 0323 | 1 101 001 111 | | BRN | D1 | |
| 33 | 0036 | | 0 011 001 100 | DELETE | PT3 | | DELETE KEY |
| 34 | 0037 | 0375 | 1 111 110 111 | | BRN | DEL | |
| 35 | 0040 | | 0 110 001 100 | | PT6 | | 40 DATA ENTRY KEY |
| 36 | 0041 | | 1 101 100 010 | | P.AMIA | | IS THIS VARIABLE DATA? |
| 37 | 0042 | 0147 | 0 110 011 111 | | BRN | T1 | NO |
| 38 | 0043 | | 1 101 111 010 | VAREN | XS.AMIA | | YES. IS THIS IN 2 SAMPLE MODE? |
| 39 | 0044 | 0051 | 0 010 100 111 | | BRN | TV1 | NO |
| 40 | 0045 | | 0 100 001 100 | | PT4 | | YES |
| 41 | 0046 | | 1 001 100 010 | | P.AMI | | |
| 42 | 0047 | 0161 | 0 111 000 111 | | BRN | HPYACC | |
| 43 | 0050 | | 0 010 010 000 | RPXACC | ROM 1 | | 50 EGRESS TO RPXACC |
| 44 | 0051 | | 1 001 111 010 | TV1 | XS.AMI | | IS THIS IN 1 VARIABLE MODE? |
| 45 | 0052 | 0216 | 1 000 111 011 | | BRN | TOGGLE | NO |
| 46 | 0053 | | 1 101 111 110 | HACC | S.AMIA | | 53 YES. IS THIS IN HISTOGRAM MODE? |
| 47 | 0054 | 0356 | 0 010 111 011 | | BRN | HG | YES |
| 48 | 0055 | 0052 | 0 010 110 011 | | BRN | RPXACC | NO |
| 49 | 0056 | | 1 100 101 000 | HG | DNR | | DATA |
| 50 | 0057 | | 0 100 101 000 | | CTS | | |
| 51 | 0060 | | 0 100 101 000 | | CTS | | 60 DATA. DATA. DATA |
| 52 | 0061 | | 0 110 001 100 | | PT6 | | |

STATISTICS FUNCTION BLOCK LISTING (ROM 6)—Continued

| CURR ADDR | BRAN ADDR | OPERATION CODE BIT PATTERN | | | | |
|---|---|---|---|---|---|---|
| 0062 | 0363 | 1 111 010 101 | | JSB | CH1A | OFFSET, DATA, DATA |
| 0063 | 0362 | 1 111 001 101 | | JSB | MINUS | DATA-OFFSET, 0, DATA |
| 0064 | | 0 101 001 100 | | PT5 | | |
| 0065 | 0360 | 1 111 000 101 | | JSB | CH1A | CW |
| 0066 | 0353 | 1 110 110 001 | | JSB | DIVIDE | DATA-OFFSET/CW=I |
| 0067 | | 0 100 101 000 | | CTS | | I, I, I, DATA |
| 0070 | | 0 001 111 110 | | S,CH1 | | 70 IS I NEG? |
| 0071 | 0110 | 0 100 100 011 | | BRN | PRINTL | YES, PRINT "L" |
| 0072 | | 0 011 001 110 | | W,ZTC | | NO |
| 0073 | | 1 100 001 100 | | PT12 | | |
| 0074 | | 0 111 101 110 | | W,CP1C | | |
| 0075 | | 0 111 100 010 | | P,CP1C | | 10, I, I, DATA |
| 0076 | 0362 | 1 111 001 101 | | JSB | MINUS | I-10, I-10,I, DATA |
| 0077 | | 0 001 111 110 | | S,CH1 | | IS I LESS THAN 10 |
| 0100 | 0115 | 0 100 110 111 | | BRN | DAAD | 100 YES, DATA IS IN RANGE OF HISTOGRAM |
| 0101 | 0365 | 1 111 011 001 | | JSB | BLANK | NO, PRINT "H" |
| 0102 | 0365 | 1 111 011 001 | | JSB | BLANK | |
| 0103 | 0125 | 0 100 010 111 | | BRN | SUITES | |
| 0104 | | 0 000 010 000 | OUT | ROM 0 | | |
| 0105 | | 0 001 011 100 | SUITES | PT1 | | EGRESS TO OUT |
| 0106 | | 0 101 011 000 | | LDC5 | | |
| 0107 | 0267 | 1 011 011 111 | | BRN | CP | |
| 0110 | 0365 | 1 111 011 001 | PRINTL | JSB | BLANK | 110 |
| 0111 | 0365 | 1 111 011 001 | | JSB | BLANK | |
| 0112 | | 0 000 001 100 | | PT0 | | |
| 0113 | | 0 111 011 000 | | LDC7 | | |
| 0114 | 0267 | 1 011 011 111 | | BRN | CP | |
| 0115 | | 1 100 101 000 | DAAD | DNR | | |
| 0116 | | 1 100 101 000 | | DNR | | I, DATA |
| 0117 | | 1 001 000 100 | | SS9 | | SET FLAG FOR SHALK ROUTINE |
| 0120 | | 0 010 010 000 | | ROM 1 | | 120 EGRESS TO CHALK |
| 0121 | | 1 011 001 100 | DIGIT | PT11 | | |
| 0122 | | 1 101 000 010 | | P,AMCA | | IS A11 LESS THAN 5 |
| 0123 | 0227 | 1 001 011 111 | | BRN | CHAR | NO |
| 0124 | | 1 100 101 110 | VARDEC | W,AXA | | YES, A11=4, VAR, NUM, ENTRY, DIGIT TO A0 |
| 0125 | | 0 100 001 110 | | W,SLA | | DIGIT TO A2 |
| 0126 | | 0 100 001 110 | | W,SLA | | |
| 0127 | | 0 010 001 100 | | PT2 | | 127 |
| 0130 | | 0 011 011 000 | | LDC3 | | 130 3 TO C2 |
| 0131 | | 0 010 001 100 | | PT2 | | |
| 0132 | | 0 001 011 010 | | XS,AMC | | IS VARIABLE NUMBER GREATER THAN 2? |
| 0133 | 0374 | 1 111 110 011 | | BRN | NOTE | YES, NOTE 12 |
| 0134 | 0370 | 1 111 100 101 | | JSB | ADV | NO |
| 0135 | | 0 011 001 110 | | W,ZTC | | 0 TO STAT REGISTERS 00 THROUGH 17 |
| 0136 | | 0 111 101 110 | | W,CP1C | | BUILD ADDRESS FOR R17 |
| 0137 | | 1 100 001 100 | | PT12 | | |
| 0140 | | 1 011 011 000 | | LDC11 | | 140 |
| 0141 | | 0 110 011 000 | | LDC6 | | |
| 0142 | | 1 011 001 100 | | PT11 | | |
| 0143 | 0344 | 1 110 010 101 | | JSB | LOOP | INITILIZE REGISTERS 10 TO 17 |
| 0144 | | 1 100 001 100 | | PT12 | | BUILD ADDRESS FOR R09 |
| 0145 | | 1 010 011 000 | | LDC10 | | |
| 0146 | 0152 | 0 110 101 011 | | BRN | SUITE3 | |
| 0147 | | 0 100 010 000 | T1 | ROM 2 | | EGRESS TO OFFSET/WIDTH ENTRIES |
| 0150 | | 1 000 010 000 | AX | ROM 4 | | 150 EGRESS TO AX |
| 0151 | | 0 010 010 000 | BPYACC | ROM 1 | | |
| 0152 | 0344 | 1 110 010 101 | SUITE3 | JSB | LOOP | INITIAILZE REGISTERS 00 TO 09 |
| 0153 | | 1 110 101 110 | | W,AXC | | INITIALIZED FLAGS TO 0, ALL FLAGS 0 EXCEPT |
| 0154 | | 0 110 001 110 | | W,CTA | | F2 WHICH MAY BE 0, 1 OR 2 |
| 0155 | | 0 010 101 000 | | CXM | | |
| 0156 | 0365 | 1 111 011 001 | | JSB | BLANK | PRINT VARIABLE ENTRY MODE |
| 0157 | 0365 | 1 111 011 001 | | JSB | BLANK | |
| 0160 | | 1 000 001 100 | | PT8 | | 160 LOAD DEC. POINTS IN C |
| 0161 | | 1 010 011 000 | L2 | LDC10 | | |
| 0162 | | 0 001 101 100 | | YP1 | | |
| 0163 | 0161 | 0 111 000 111 | | BRN | L2 | |
| 0164 | | 1 101 111 010 | | XS,AM1A | | IS THIS IN 2 SAMPLE MODE? |
| 0165 | 0206 | 1 000 011 011 | | BRN | ONETWO | NO |
| 0166 | | 1 011 001 100 | | PT11 | | YES, PRINT "2T" |
| 0167 | | 0 010 011 000 | | LDC2 | | |
| 0170 | | 1 010 011 000 | | LDC10 | | 170 |
| 0171 | 0370 | 1 111 100 101 | | JSB | ADV | |
| 0172 | 0367 | 1 111 100 001 | | JSB | PRINT | |
| 0173 | 0365 | 1 111 011 001 | | JSB | BLANK | PRINT "DATA 1" |
| 0174 | 0365 | 1 111 011 001 | | JSB | BLANK | |
| 0175 | 0333 | 1 101 110 001 | | JSB | DATA | |
| 0176 | | 0 001 011 000 | VARP1 | LDC1 | | |
| 0177 | 0370 | 1 111 100 101 | VARP | JSB | ADV | |
| 0200 | 0367 | 1 111 100 001 | | JSB | PRINT | 200 |
| 0201 | | 0 010 101 000 | ZEROF11 | CXM | | SET F11 FOR VARIABLE DATA ENTRY |
| 0202 | | 1 011 001 100 | | PT11 | | |
| 0203 | | 0 011 000 010 | | P,ZTC | | 203 |
| 0204 | | 0 010 101 000 | FIN | CXM, | | |
| 0205 | 0373 | 1 111 101 111 | | BRN | FIN | |
| 0206 | | 1 101 001 100 | ONETWO | PT13 | | PRINT V1 OR V2 |
| 0207 | | 0 101 011 000 | | LDC5 | | LOAD "V2" IN C |
| 0210 | | 0 000 000 000 | | DUMMY | | 210 |
| 0211 | | 0 010 011 000 | | LDC2 | | |
| 0212 | | 1 100 001 100 | | PT12 | | |
| 0213 | | 1 001 111 010 | | XS,AM1 | | IS THIS IN 1 VARIABLE MODE? |
| 0214 | 0177 | 0 111 111 111 | | BRN | VARP | NO PRINT "V2" |
| 0215 | 0176 | 0 111 111 011 | | BRN | VARP1 | YES PRINT "V1" |
| 0216 | | 0 010 101 000 | TOGGLE | CXM | | SET CALCULATION FLAG F13 TO 0 |
| 0217 | | 0 011 011 110 | | S,ZTC | | AND TOGGLE COMPLETENESS FLAG F3 |
| 0220 | | 0 011 001 100 | | PT3 | | 220 |
| 0221 | | 0 011 100 010 | | P,ZNCE | | |
| 0222 | | 0 010 101 000 | | CXM | | |
| 0223 | | 1 001 100 010 | | P,AM1 | | WHICH VARIABLE IS BEING ENTERED? |
| 0224 | 0151 | 0 110 100 111 | | BRN | BPYACC | Y, GO TO PROM FOR Y ACCUMULATION |
| 0225 | 0372 | 1 111 100 101 | | JSB | ADV | X |
| 0226 | 0152 | 0 010 100 011 | | BRN | BPXACC | GO TO PROM FOR X ACCUMULATION |
| 0227 | | 1 101 100 010 | CHAR | P,AM1A | | IS THIS A CHARACTER DIGIT ENTRY |
| 0230 | 0150 | 0 110 100 011 | | BRN | AX | 230 NO |
| 0231 | | 1 100 101 110 | | W,AXA | | YES DIGIT TO A0 |
| 0232 | | 0 000 001 100 | | PT0 | | DIGIT TO F0 |
| 0233 | | 1 010 101 000 | | MTC | | |
| 0234 | | 1 110 100 010 | | P,AXC | | |

STATISTICS FUNCTION BLOCK LISTING (ROM 6) – Continued

| CURR ADDR | BRAN ADDR | OPERATION CODE BIT PATTERN | | | | |
|---|---|---|---|---|---|---|
| 0235 | | 0 110 000 010 | | P.CTA | | |
| 0236 | | 0 010 101 000 | | CXM | | |
| 0237 | 0365* | 1 111 011 001 | | JSB | BLANK | PRINT "CT" A0 |
| 0240 | | 0 000 001 100 | | PT0 | | 240 |
| 0241 | | 0 100 001 110 | SHIFT | W.SLA | | |
| 0242 | | 0 000 111 100 | | PLS | | |
| 0243 | | 1 101 101 100 | | YP13 | | |
| 0244 | 0241 | 1 010 000 111 | | BRN | SHIFT | |
| 0245 | | 1 110 100 010 | | P.AXC | | |
| 0246 | 0365 | 1 111 011 001 | | JSB | BLANK | |
| 0247 | | 0 001 001 100 | | PT1 | | |
| 0250 | | 0 001 011 000 | | LDC1 | | 250 |
| 0251 | | 1 010 011 000 | | LDC10 | | |
| 0252 | 0177 | 0 111 111 111 | | BRN | VARP | |
| 0253 | | 0 111 001 100 | SUITE1 | PT7 | | |
| 0254 | | 1 011 111 000 | | DSTC | | RETREIVE FROM REG 2 |
| 0255 | | 0 110 101 110 | | W.ZMC | | IS C0? |
| 0256 | 0374 | 1 111 110 011 | | BRN | NOTE | YES, PLOTTER WAS NOT PRESENT NOTE 37 |
| 0257 | | 1 100 101 000 | | DNR | | 257 NO, REG2 DATA TO C |
| 0260 | | 1 011 110 000 | | DTDS | | 260 RETURN ORIGINAL DATA |
| 0261 | | 0 010 101 000 | | CXM | | 6 TO F11 TO INDICATE AXES DIGIT ENTRY |
| 0262 | | 1 011 001 100 | | PT11 | | |
| 0263 | | 0 110 011 000 | | LDC6 | | |
| 0264 | | 1 000 001 100 | | PT8 | | 1 TO F8 TO INDICATE PLOTTING MODE |
| 0265 | | 0 001 011 000 | | LDC1 | | |
| 0266 | 0224 | 1 000 010 011 | | BRN | FIN | |
| 0267 | 0367 | 1 111 100 001 | CP | JSB | PRINT | |
| 0270 | | 1 100 101 000 | | DNR | | 270 |
| 0271 | | 1 100 101 000 | | DNR | | |
| 0272 | 0052 | 0 010 100 011 | | BRN | BPXACC | I, DATA |
| 0273 | | 0 011 001 110 | SUITE4 | W.ZTC | | |
| 0274 | | 1 011 110 000 | | DTDS | | 0 TO ADDRESSED REGISTER |
| 0275 | | 1 100 101 000 | | DNR | | BRING DOWN ADDRESS |
| 0276 | | 0 101 100 010 | | P.CM1C | | DECREMENT ADDRESS: WAS ADDRESS 0? |
| 0277 | 0345 | 1 110 010 111 | | BRN | LOOP | NO, CONTINUE TO INITIALIZE THIS CHIP |
| 0300 | | 0 110 100 100 | | RS6 . | | 300 RETURN FROM ROM 7 ROUTINES |
| 0301 | | 0 000 110 000 | | RETURN | | |
| 0302 | | 0 001 101 010 | SUITE2 | X.CM1 | | IS THE EXPONENT 0 |
| 0303 | 0313 | 1 100 101 111 | | BRN | L11 | NO |
| 0304 | | 1 001 001 110 | | W.SRC | | YES, SHIFT REGHT, MANTISSA OF ADDRESS IS READY |
| 0305 | | 0 011 001 010 | AD | X.ZTC | | SET EXPONENT TO 1 |
| 0306 | | 0 111 101 010 | | X.CP1C | | |
| 0307 | | 1 001 110 000 | | ATDS | | |
| 0310 | | 0 000 110 100 | | CLS | | 310 |
| 0311 | | 1 011 111 000 | | DSTC | | CONTENTS OF SELECTED REGISTER TO C |
| 0312 | 0124 | 0 100 010 011 | | BRN | OUT | |
| 0313 | | 1 011 011 000 | L11 | LDC11 | | LOAD 11 IN C12, MANTISSA OF ADDRESS IS READY |
| 0314 | 0305 | 1 100 010 111 | | BRN | AD | |
| 0315 | | 0 000 000 000 | | DUMMY | | ADDRESS SELECTED REGISTER |
| 0316 | | 0 000 000 000 | | DUMMY | | RETURN D-DATA TO D |
| 0317 | | 0 000 000 000 | | DUMMY | | REGISTER DATA TO C |
| 0320 | | 0 000 000 000 | | DUMMY | | 320 |
| 0321 | | 0 000 000 000 | | DUMMY | | |
| 0322 | | 0 000 000 000 | | DUMMY | | |
| 0323 | | 0 111 101 110 | D1 | W.CP1C | | |
| 0324 | | 1 110 101 110 | | W.AXC | | |
| 0325 | | 0 011 100 010 | | P.ZNCC | | |
| 0326 | | 0 010 101 000 | | CXM | | |
| 0327 | 0365 | 1 111 011 001 | | JSB | BLANK | PRINT "DATA" A0 |
| 0330 | 0365 | 1 111 011 001 | | JSB | BLANK | 330 |
| 0331 | 0333 | 1 101 110 001 | | JSB | DATA | |
| 0332 | | 1 110 100 010 | | P.AXC | | |
| 0333 | 0176* | 0 111 111 101 | | JSB | VARP | |
| 0334 | | 0 101 001 100 | DATA | PT5 | | LOAD WORD DATA IN C |
| 0335 | | 1 011 011 000 | | LDC11 | | |
| 0336 | | 1 011 011 000 | | LDC11 | | |
| 0337 | | 1 011 011 000 | | LDC11 | | |
| 0340 | | 1 011 011 000 | | LDC11 | | 340 |
| 0341 | | 0 000 001 100 | | PT0 . | | |
| 0342 | | 0 000 110 000 | | RETURN | | |
| 0343 | | 0 110 000 100 | CHP | SS6 | | |
| 0344 | | 1 110 010 000 | | ROM 7 | | |
| 0345 | | 1 001 110 000 | LOOP | ATDS | | ADDRESS REGISTER |
| 0346 | | 0 100 101 000 | | CTS | | ADDRESS TO D |
| 0347 | 0273 | 1 011 101 111 | | BRN | SUITE4 | |
| 0350 | | 1 011 001 100 | DF | PT11 | | 350 DIGIT INTERPRETATION |
| 0351 | | 0 101 011 000 | | LDC5 | | 5 TO C11 |
| 0352 | 0121 | 0 101 000 111 | | BRN | DIGIT | |
| 0353 | | 0 000 000 000 | | DUMMY | | |
| 0354 | | 0 110 000 100 | DIVIDE | SS6 | | |
| 0355 | | 1 110 010 000 | | ROM 7 | | |
| 0356 | | 0 000 000 000 | | DUMMY | | |
| 0357 | | 0 000 000 000 | | DUMMY | | |
| 0360 | | 0 000 000 000 | | DUMMY | | 360 |
| 0361 | | 0 110 000 100 | CH1A | SS6 | | |
| 0362 | | 1 110 010 000 | | ROM 7 | | |
| 0363 | | 0 011 111 110 | MINUS | S.ZNCC | | |
| 0364 | | 0 110 000 100 | PLUS | SS6 | | |
| 0365 | | 1 110 010 000 | | ROM 7 | | |
| 0366 | | 0 110 000 100 | BLANK | SS6 | | |
| 0367 | | 1 110 010 000 | | ROM 7 | | |
| 0370 | | 1 000 000 100 | PRINT | SS8 | | 370 |
| 0371 | | 0 110 000 100 | ADV | SS6 | | |
| 0372 | | 1 110 010 000 | | ROM 7 | | |
| 0373 | | 0 000 010 000 | FIN | ROM 0 | | |
| 0374 | | 0 000 010 000 | NOTE | ROM 0 | | |
| 0375 | | 1 001 100 010 | DEL | P.AM1 | | IS DATA SET COMPLETE? |
| 0376 | 0374 | 1 111 110 011 | | BRN | NOTE | NO, PRINT NOTE33 |
| 0377 | 0371 | 1 111 100 101 | | JSB | ADV | 377 YES |

STATISTICS FUNCTION BLOCK LISTING (ROM 7)

```
CURR  BRAN  OPERATION CODE
ADDR  ADDR  BIT PATTERN

0000        0 101 110 020            PRE                   NO PRINT (S8) OR ADVANCE
0001        1 011 012 100   WAIT     YS11                  WAIT FOR PRINT FLAG
0002  0001  0 000 000 111            BRN       WAIT
0003        1 011 100 100            RS11
0004        1 000 012 100            YS8                  IS THIS A PRINT OR AN ADVANCE?
0005  0013  0 000 101 111            BRN       ADV        ADVANCE
0006        1 101 110 000            TCS                  PRINT, LOAD ID REG.
0007        1 111 110 000            CCS                  10
0010        0 000 011 100            PRS
0011        1 110 101 100            YP14                 IS PRINT FINISHED?
0012  0001  0 000 000 111            BRN       WAIT       NO, WAIT FOR NEXT FLAG
0013        0 011 110 004   ADV      ADV                  YES, ADVANCE PAPER
0014  0254  1 010 110 011            BRN       TERM
0015        0 010 1 1 000   STOP     CXM                  FLAG BACK TO M - DATA BACK TO C
0016  0254  1 010 110 011            BRN       TERM
0017        1 101 011 004   BLK      LDC13
0020        1 111 1 1 100            YP15                 FILL C WITH BLANKS
0021  0017  0 000 111 111            BRN       BLK        20
0022  0254  1 010 110 011            BRN       TERM
0023        0 111 111 112   INC10    S,CP1C               SET C13 TO POINTER VALUE
0026        0 000 011 100            PRS
0025        0 000 1 1 122   TO       YP0
0026  0023  0 001 0 1 111            BRN       INC10
0027        1 001 0 1 114            W,SRC                C13 TO C11
0030        1 001 0 1 110            W,SRC
0031        0 111 1 1 114            W,CP1C               30
0032        1 100 0 1 100            PT12
0033        1 000 012 104            YS8                  WHICH CHIP SOUGHT?
0034  0037  0 001 111 111            BRN       LD11       CHIP11
0035        1 010 011 000            LDC10                CHIP 10
0036  0040  0 010 012 011            BRN       AD
0037        1 011 011 002   LD11     LDC11
0040        1 001 110 000   AD       ATDS
0041        1 100 0 1 100            PT12
0042  0237  1 001 111 111            BRN       COMT
0043        0 110 1 1 000   SUM1     STA
0044        0 000 1 1 110            W,ZTA
0045        1 111 111 010            XS,AP1A
0046        1 111 111 010            XS,AP1A
0047        0 111 111 010            XS,CP1C
0050        0 111 111 010            XS,CP1C              50
0051        0 001 0 1 010            X,AMC
0052  0254  0 010 110 011            BRN       SUM2
0053        1 110 1 1 110            W,AXC                53
0054        1 110 1 0 110   SUM2     M,AXC
0055        0 110 1 0 110            M,ZMC
0056  0060  0 011 0 0 011            BRN       SUM3
0057        1 110 1 1 110            W,AXC
0060        1 000 1 0 110   SUM3     M,BXC                60
0061        0 001 0 1 010   SUM4     X,AMC
0062  0070  0 011 1 0 011            BRN       SUM5
0063        1 010 0 1 110            W,SRA
0064        1 111 1 1 010            X,AP1A
0065        0 000 0 1 110            W,ZMA
0066  0273  0 011 1 0 011            BRN       SUM5
0067  0061  0 011 0 0 111            BRN       SUM4
0070        0 101 111 010   SUM5     XS,CM1C              70
0071        0 101 111 010            AS,CM1C
0072        1 011 101 010            X,ZTA
0073        1 101 011 110            S,AMCA
0074        1 001 111 110            S,AM1
0075  0077  0 011 111 111            BRN       SUN6
0076  0142  0 110 001 011            HRN       MPY26
0077        1 000 0 0 110   SUM6     M,AMA
0102  0103  0 100 001 111            BRN       SUM7       100
0101        0 011 111 110            S,ZNCC
0102        1 100 1 1 110            W,AXB
0103        1 100 0 1 110   SUM7     W,AMBA
0104        0 000 000 000            DUMMY
0105  0152  0 110 1 1 011            BRN       NRM21
0106        0 110 1 1 002   LOV2     STA
0107        0 000 1 1 110            W,ZTA
0110        0 101 0 1 012            X,AMCC               110
0111        0 101 011 110            S,AMCC
0112  0114  0 100 110 011            BRN       DIV22
0113        0 010 111 110            S,ZMCC
0114        1 110 1 0 110   DIV22    M,AXB
0115        1 011 1 1 110            W,ZTA
0116        1 100 1 1 100            YP12
0117  0143  0 110 0 1 111            BRN       MPY27
0120        0 001 1 0 110            M,CM1                120
0121  0124  0 101 010 011            BRN       DIV23
0122        1 001 0 1 100   NOTE11   PT1                  ZERO DIVISOR OR OVERFLOW
0123  0203  1 000 0 1 111            BRN       NOTE
0124        1 000 110 010   DIV23    WP,BXC
0125        1 110 1 0 110            M,AXC
0126  0130  0 101 1 0 011            BRN       DIV15
0127        0 111 1 0 010   DIV14    P,CP1C               127
0130        1 100 010 110   DIV15    MS,AMBA              130
0131  0127  0 101 011 111            BRN       DIV14
0132        1 110 010 110            MS,APBA
0133        0 100 010 110            MS,SLA
0134        0 000 011 100   DIV16    PRS
0135        0 000 1 1 100            YP0
0136  0130  0 101 1 0 011            BRN       DIV15
0137        0 110 0 1 110   TRM12    W,CTA
0140        0 010 0 1 010            X,BTC                140
0141  0152  0 110 1 1 011            BRN       NRM21
0142        1 110 0 1 110   MPY26    W,APBA
0143        0 101 1 0 010   MPY27    P,CM1C
0144  0142  0 110 0 1 011            BRN       MPY26
0145        1 011 0 1 110   MPY28    W,SRA
0146        0 000 111 102            PLS
0147        1 101 1 1 120            YP13
0150  0143  0 110 0 1 111            BRN       MPY27      150
```

STATISTICS FUNCTION BLOCK LISTING (ROM 7)—Continued

| LINE # | CURR ADDR | BRAN ADDR | OPERATION CODE BIT PATTERN | | | | |
|---|---|---|---|---|---|---|---|
| 108 | 151 | | 0 111 1 1 010 | | X.CP1C | | |
| 109 | 152 | | 1 011 111 110 | NRM21 | S.ZTA | | |
| 110 | 153 | | 1 100 0 1 100 | | PT12 | | |
| 111 | 154 | | 0 001 1 1 110 | | W.ZTB | | |
| 112 | 155 | | 1 001 1 0 010 | NRM23 | P.AM1 | | |
| 113 | 156 | 164 | 0 111 010 011 | | BRN | NRM24 | |
| 114 | 157 | | 0 100 0 1 110 | | W.SLA | | |
| 115 | 160 | | 0 101 1 1 010 | | X.CM1C | | 160 |
| 116 | 161 | | 1 001 1 1 110 | | W.AM1 | | |
| 117 | 162 | 155 | 0 110 110 111 | | BRN | NRM23 | |
| 118 | 163 | | 0 011 0 1 110 | | W.ZTC | | |
| 119 | 164 | | 0 100 1 1 010 | NRM24 | X.ATB | | |
| 120 | 165 | | 1 110 0 1 110 | | W.APRA | | |
| 121 | 166 | | 1 001 111 110 | | S.AM1 | | |
| 122 | 167 | 145 | 0 110 01 111 | | BRN | MPY28 | |
| 123 | 170 | | 1 110 1 0 110 | | M.AXC | | 170 |
| 124 | 171 | | 0 110 0 1 110 | NRM25 | W.CTA | | |
| 125 | 172 | | 0 000 1 1 110 | | W.ZTB | | |
| 126 | 173 | | 1 100 0 1 100 | | PT12 | | |
| 127 | 174 | | 0 001 1 0 110 | OFL1 | M.CM1 | | |
| 128 | 175 | 206 | 1 000 011 011 | | BRN | OFL2 | |
| 129 | 176 | 220 | 1 001 00 011 | | BRN | OFL4 | |
| 130 | 177 | | 0 011 0 1 110 | DS1 | W.ZTC | | |
| 131 | 200 | | 1 111 011 000 | | LOC15 | | 200 BUILD ADDRESS OF |
| 132 | 201 | | 1 001 011 000 | | LOC9 | | DEDICATED STORAGE IN C |
| 133 | 202 | 234 | 1 001 110 011 | | BRN | AC | |
| 134 | 203 | | 0 000 110 100 | NOTE | CLS | | 203 INSURE RETURN TO ROM 0 |
| 135 | 204 | | 0 000 010 000 | | ROM 0 | | AFTER NOTE SUBROUTINES |
| 136 | 205 | | 0 000 010 000 | ZERO | ROM 0 | | RETURN TO ROM 0 |
| 137 | 206 | | 0 110 111 010 | OFL2 | XS.ZMC | | |
| 138 | 207 | 221 | 1 001 0 0 111 | | BRN | CLOSE | |
| 139 | 210 | | 0 010 1 1 010 | | X.ZMCC | | 210 |
| 140 | 211 | | 0 101 111 010 | | XS.CM1C | | |
| 141 | 212 | 215 | 1 000 110 111 | | BRN | OFL3 | |
| 142 | 213 | | 1 110 1 1 110 | | W.AXC | | |
| 143 | 214 | 221 | 1 001 0 0 111 | | BRN | CLOSE | |
| 144 | 215 | | 1 110 111 010 | OFL3 | XS.AXC | | |
| 145 | 216 | | 1 001 111 010 | | XS.AM1 | | |
| 146 | 217 | 122 | 0 101 0 1 011 | | BRN | NOTE31 | |
| 147 | 220 | | 0 011 0 1 110 | OFL4 | W.ZTC | | 220 |
| 148 | 221 | | 0 100 1 1 000 | CLOSE | CTS | | |
| 149 | 222 | 254 | 1 010 110 011 | | BRN | TERM | |
| 150 | 223 | | 0 011 0 1 110 | CHP1 | W.ZTC | | SET CB TO POINTER VALUE |
| 151 | 224 | | 0 111 111 110 | INC12 | S.CP1C | | |
| 152 | 225 | | 0 000 011 100 | | PHS | | |
| 153 | 226 | | 0 000 1 1 100 | | YP0 | | |
| 154 | 227 | 224 | 1 001 010 011 | | BRN | INC12 | |
| 155 | 230 | | 1 001 0 1 110 | | W.SRC | | 230 |
| 156 | 231 | | 1 001 0 1 110 | | W.SRC | | CB TO C11 |
| 157 | 232 | | 1 100 001 100 | | PT12 | | |
| 158 | 233 | 342 | 1 110 0 0 011 | | BRN | AC1 | BUILD REMAINDER OF ADDRESS FOR PLOTTER DS |
| 159 | 234 | | 0 111 1 1 010 | AC | X.CP1C | | |
| 160 | 235 | | 1 001 110 000 | | ATDS | | |
| 161 | 236 | | 0 110 001 100 | | PT6 | | |
| 162 | 237 | | 1 011 111 000 | COMT | DSTC | | |
| 163 | 240 | 254 | 1 010 110 011 | | BRN | TERM | 240 |
| 164 | 241 | | 1 011 011 000 | FX | LOC11 | | |
| 165 | 242 | | 0 111 011 000 | | LOC7 | | |
| 166 | 243 | | 1 001 110 000 | | ATDS | | |
| 167 | 244 | | 0 111 0 1 100 | | PT7 | | |
| 168 | 245 | | 1 011 111 000 | | DSTC | | FETCH HENRY'S FLAG |
| 169 | 246 | | 1 001 011 000 | | LOC9 | | 250 |
| 170 | 247 | | 1 100 0 1 100 | | PT12 | | |
| 171 | 250 | | 0 001 011 000 | | LOC1 | | SET TO PRGM MODE AND RMGPA USER |
| 172 | 251 | | 0 010 1 1 000 | | CXM | | HENRY'S FLAG TO M. STAT FLAG TO C |
| 173 | 252 | | 1 011 110 000 | | DTDS | | STORE STAT FLAG |
| 174 | 253 | | 1 100 1 1 000 | | DNR | | DATA TO C |
| 175 | 254 | | 1 000 110 100 | TERM | RSB | | |
| 176 | 255 | | 1 011 110 100 | | RS11 | | |
| 177 | 256 | | 0 001 010 100 | | YS1 | | FIND CALLING ROM AND |
| 178 | 257 | 261 | 1 011 0 0 111 | | BRN | TEST2 | 257 RETURN CONTROL |
| 179 | 260 | | 0 010 010 000 | | ROM 1 | | 260 |
| 180 | 261 | | 0 010 010 100 | TEST2 | YS2 | | |
| 181 | 262 | 264 | 1 011 010 011 | | BRN | TEST3 | |
| 182 | 263 | | 0 100 010 000 | | ROM 2 | | |
| 183 | 264 | | 0 011 010 100 | TEST3 | YS3 | | |
| 184 | 265 | 267 | 1 011 011 111 | | BRN | TEST4 | |
| 185 | 266 | | 0 110 010 000 | | ROM 3 | | |
| 186 | 267 | | 0 100 010 100 | TEST4 | YS4 | | |
| 187 | 270 | 272 | 1 011 1 1 011 | | BRN | TEST5 | 270 |
| 188 | 271 | | 1 000 010 000 | | ROM 4 | | |
| 189 | 272 | | 0 101 010 100 | TEST5 | YS5 | | |
| 190 | 273 | 275 | 1 011 110 111 | | BRN | TEST6 | |
| 191 | 274 | | 1 010 010 000 | | ROM 5 | | |
| 192 | 275 | | 0 110 010 100 | TEST6 | YS6 | | |
| 193 | 276 | 300 | 1 100 000 011 | | BRN | TEST10 | |
| 194 | 277 | | 1 100 010 000 | | ROM 6 | | |
| 195 | 300 | | 1 010 010 100 | TEST10 | YS10 | | 300 |
| 196 | 301 | 205 | 1 000 010 111 | | BRN | ZERO | |
| 197 | 302 | | 0 000 110 000 | | RETURN | | |
| 198 | 303 | | 1 101 111 110 | EVAL1 | S.AM1A | | |
| 199 | 304 | | 1 101 111 110 | | S.AM1A | | IS THIS A LINEAR REGRESSION? |
| 200 | 305 | 323 | 1 101 001 111 | | BRN | T2 | NO |
| 201 | 306 | | 1 101 0 1 100 | | PT13 | | YES, PRINT LE |
| 202 | 307 | | 1 011 011 000 | | LOC11 | | |
| 203 | 310 | 367 | 1 111 110 001 | | JSB | BLANK | 310 |
| 204 | 311 | | 0 000 0 1 100 | | PT0 | | |
| 205 | 312 | | 0 111 011 000 | | LOC7 | | |
| 206 | 313 | 372 | 1 111 1 1 101 | CP | JSB | P/A | ADVANCE PAPER |
| 207 | 314 | | 1 000 0 0 101 | | SSB | | |
| 208 | 315 | 372 | 1 111 1 1 101 | | JSB | P/A | PRINT |
| 209 | 316 | 346 | 1 110 011 101 | | JSB | D8 | |
| 210 | 317 | | 0 011 0 1 100 | HPEV | PT1 | | LOAD STARTING ADDRESS FOR PEV PROM. |
| 211 | 320 | | 0 101 011 000 | | LOC5 | | 320 |
| 212 | 321 | | 1 101 011 000 | | LOC13 | | |
| 213 | 322 | 316 | 1 101 111 011 | | BRN | ROMID | |
| 214 | 323 | | 0 110 0 1 100 | T2 | PT6 | | |

STATISTICS FUNCTION BLOCK LISTING (ROM 7)—Continued

| CURR ADDR | BRAN ADDR | OPERATION CODE BIT PATTERN | | | | |
|---|---|---|---|---|---|---|
| 0324 | | 1 101 111 110 | | S,AM1A | | IS THIS A PARABOLIC REGRESSION? |
| 0325 | 0203 | 1 000 001 111 | | BRN | NOTE | NO, PRINT NO 36 |
| 0326 | 0367 | 1 111 100 001 | | JSB | BLANK | YES, PRINT PE |
| 0327 | | 1 001 001 100 | | PT9 | | |
| 0330 | | 1 010 011 000 | | LDC10 | | 330 |
| 0331 | | 1 100 011 000 | | LDC12 | | |
| 0332 | 0313 | 1 100 101 111 | | BRN | CP | |
| 0333 | | 0 000 000 000 | | DUMMY | | 333 |
| 0334 | | 0 000 000 000 | | DUMMY | | |
| 0335 | | 0 000 000 000 | | DUMMY | | |
| 0336 | | 1 010 100 100 | ROMIO | RS10 | | |
| 0337 | | 1 010 010 000 | | ROM 5 | | EGRESS TO ROMIO IN ROM 5 |
| 0340 | | 1 101 011 000 | AC1 | LDC13 | | |
| 0341 | 0234 | 1 001 110 011 | | BRN | AC | |
| 0342 | | 0 000 000 000 | | DUMMY | | |
| 0343 | 0367 | 1 111 100 001 | EVAL | JSB | BLANK | ACCESS TO EVAL |
| 0344 | 0333 | 1 100 001 111 | | BRN | EVAL1 | |
| 0345 | | 0 000 000 000 | CHP | DUMMY | | CHP ACCESS |
| 0346 | 0223 | 1 001 001 111 | | BRN | CHP1 | |
| 0347 | | 1 100 001 100 | DS | PT12 | | DS ACCESS |
| 0350 | 0177 | 1 111 111 111 | | BRN | DS1 | 350 |
| 0351 | | 0 100 101 000 | EXM712 | CTS | | EXM712 ACCESS |
| 0352 | | 0 011 001 110 | | W,ZTC | | ADDRESS FLAG VECTOR |
| 0353 | | 0 111 101 110 | | W,CP1C | | |
| 0354 | | 1 100 001 100 | | PT12 | | |
| 0355 | 0241 | 1 010 001 111 | | BRN | EX | |
| 0356 | | 1 100 001 100 | DIVIDE | PT12 | | DIVIDE ACCESS |
| 0357 | 0146 | 0 100 011 011 | | BRN | LDV2 | |
| 0360 | | 0 010 101 010 | MULT | X,ZMCC | | 360 MULT ACCESS |
| 0361 | | 0 011 001 100 | | PT3 | | |
| 0362 | 0146 | 0 100 011 011 | | BRN | LDV2 | |
| 0363 | | 0 011 001 110 | CH | W,ZTC | | CH0A/CH1A ACCESS |
| 0364 | | 0 000 000 000 | | DUMMY | | |
| 0365 | 0225 | 0 001 010 111 | | BRN | TO | |
| 0366 | | 1 100 001 100 | PLUS | PT12 | | PLUS ACCESS |
| 0367 | 0243 | 0 010 001 111 | | BRN | SUM1 | |
| 0370 | | 0 111 110 000 | BLANK | CTT | | 370 BLANK ACCESS |
| 0371 | | 1 101 001 100 | | PT13 | | |
| 0372 | 0317 | 0 000 111 111 | | BRN | BLK | |
| 0373 | | 0 010 101 000 | P/A | CXM | | PRINT/ADV ACCESS |
| 0374 | | 1 100 001 100 | | PT12 | | |
| 0375 | | 0 001 100 010 | | P,CM1 | | IS THIS IN PRGM MODE? |
| 0376 | 0315 | 0 000 110 111 | | BRN | STUP | YES DONT PRINT OR ADVANCE |
| 0377 | | 0 010 101 000 | | CXM | | NO CONTINUE |

TYPEWRITER INTERFACE LISTING (ROM 0)

| CURR ADDR | BRAN ADDR | OPERATION CODE BIT PATTERN | | | | |
|---|---|---|---|---|---|---|
| 0000 | | 0 000 000 000 | | DUMMY | | |
| 0001 | | 0 000 000 000 | | DUMMY | | |
| 0002 | | 0 000 000 000 | | DUMMY | | |
| 0003 | | 0 000 000 000 | | DUMMY | | |
| 0004 | | 0 000 000 000 | | DUMMY | | |
| 0005 | | 0 000 000 000 | | DUMMY | | |
| 0006 | | 0 000 000 000 | | DUMMY | | |
| 0007 | | 0 000 000 000 | | DUMMY | | |
| 0010 | | 0 000 000 000 | | DUMMY | | |
| 0011 | | 0 000 000 000 | | DUMMY | | |
| 0012 | | 1 000 010 000 | DIV | ROM 4 | | GO TO ROM 4 |
| 0013 | 0313 | 1 100 101 111 | MUL | BRN | MUL1 | CONTINUE ROUTINE |
| 0014 | | 1 110 010 000 | UP | ROM 7 | | GO TO ROM 7 TO TEST OP LEVEL |
| 0015 | | 0 100 010 000 | XMEM | ROM 2 | | GO TO ROM 2 FOR ERROR MESSAGE, NO MEMORY |
| 0016 | | 0 100 010 000 | CPAR | ROM 2 | | GO TO ROM 2 TO PROCESS CLOSED PAR. |
| 0017 | | 0 011 010 000 | ACKEY0 | TKRA | | ACCEPT KEYCODE |
| 0020 | | 1 000 010 000 | EQUAL | ROM 4 | | GO TO ROM 4 |
| 0021 | | 0 100 010 000 | SYNTAX | ROM 2 | | GO TO ROM 2 TO PROCESS SYNTAX |
| 0022 | | 0 100 010 000 | DFCPT | ROM 2 | | GO TO ROM 2 TO PROCESS DFCPT |
| 0023 | | 0 100 010 000 | DIGIT0 | ROM 2 | | GO TO ROM 2 TO PROCESS DIGIT |
| 0024 | | 0 010 010 000 | ACKEY1 | ROM 1 | | GO TO ROM 1 TO ACCEPT KEYCODE |
| 0025 | 0344 | 1 110 010 011 | | BRN | STEP1 | CONTINUE ROUTINE |
| 0026 | | 0 100 010 000 | OPAR | ROM 2 | | GO TO ROM 2 TO PROCESS OPEN PAR. |
| 0027 | | 1 011 101 110 | PWSS | W,ZTA | | CLEAR A-REG |
| 0030 | | 0 010 101 000 | | CXM | | DATA TO C-REG, FLAG TO M-REG |
| 0031 | | 0 001 010 000 | | EERA | | ACCEPT STARTING ADDRESS |
| 0032 | | 1 111 101 010 | DIGIT3 | X,AP1A | | LOAD DIGIT 3 IN A-REG |
| 0033 | | 1 111 101 010 | DIGIT2 | X,AP1A | | LOAD DIGIT 2 IN A-REG |
| 0034 | | 1 111 101 010 | DIGIT1 | X,AP1A | | LOAD DIGIT 1 IN A-REG |
| 0035 | 0023 | 0 001 001 111 | | BRN | DIGIT0 | GO TO DIGIT 0 ENTRY |
| 0036 | | 1 010 000 100 | PERCENT | SS10 | | SET EXCHANGE FLAG |
| 0037 | 0056 | 0 010 111 011 | | BRN | STORE | GO TO STORE ROUTINE |
| 0040 | 0317 | 1 100 111 111 | PLUS | BRN | PLUS1 | CONTINUE ROUTINE |
| 0041 | | 0 110 010 000 | FLGEXC | ROM 3 | | GO TO ROM 3 FOR SUBROUTINE |
| 0042 | | 1 111 101 010 | DIGIT6 | X,AP1A | | LOAD DIGIT 6 IN A-REG |
| 0043 | | 1 111 101 010 | DIGIT5 | X,AP1A | | LOAD DIGIT 5 IN A-REG |
| 0044 | | 1 111 101 010 | DIGIT4 | X,AP1A | | LOAD DIGIT 4 IN A-REG |
| 0045 | 0032 | 0 001 101 011 | | BRN | DIGIT3 | GO TO DIGIT 3 ENTRY |
| 0046 | | 1 000 101 110 | RECALL | W,BXC | | SAVE DATA IN B-REG |
| 0047 | 0315 | 1 100 110 111 | | BRN | RECALL1 | CONTINUE ROUTINE |
| 0050 | 0277 | 1 011 111 111 | MINUS | BRN | MINUS1 | CONTINUE ROUTINE |
| 0051 | | 0 000 000 000 | | DUMMY | | |
| 0052 | | 1 111 101 010 | DIGIT9 | X,AP1A | | LOAD DIGIT 9 IN A-REG |
| 0053 | | 1 111 101 010 | DIGIT8 | X,AP1A | | LOAD DIGIT 8 IN A-REG |
| 0054 | | 1 111 101 010 | DIGIT7 | X,AP1A | | LOAD DIGIT 7 IN A-REG |
| 0055 | 0042 | 0 010 001 011 | | BRN | DIGIT6 | GO TO DIGIT 6 ENTRY |
| 0056 | | 0 010 010 000 | STORE | ROM 1 | | GO TO ROM 1 TO PROCESS STORE |
| 0057 | | 0 000 000 000 | | DUMMY | | |
| 0060 | | 0 000 000 000 | | DUMMY | | |
| 0061 | | 0 000 000 000 | | DUMMY | | |

TYPEWRITER INTERFACE LISTING (ROM Ø) (Continued)

| CUPR ADDR | BRAN ADDR | OPERATION CODE BIT PATTERN | | | | |
|---|---|---|---|---|---|---|
| 0062 | 0172 | 0 111 101 011 | RUN | BRN | RUN1 | GO TO RUN ROUTINE |
| 0063 | 0102 | 0 100 001 011 | LAST | BRN | LAST1 | GO TO LAST ENTRY ROUTINE |
| 0064 | 0366 | 1 111 011 011 | START | BRN | START1 | CONTINUE ROUTINE |
| 0065 | 0111 | 0 100 100 111 | | BRN | SUPVR2 | RETURN TO SUPERVISOR FROM DIGEX |
| 0066 | | 1 000 101 110 | CANCEL | W.BXC | | SAVE DATA IN B-REG |
| 0067 | 0162 | 0 111 001 011 | | BRN | CANCEL1 | CONTINUE ROUTINE |
| 0070 | 0111 | 0 100 100 111 | SHIFT | BRN | SUPVR2 | ACCEPT SHIFT KEY, NOP |
| 0071 | | 0 000 000 000 | | DUMMY | | |
| 0072 | 0141 | 0 110 000 111 | RND | BRN | RND1 | CONTINUE ROUTINE |
| 0073 | 0321 | 1 101 000 111 | RESET | BRN | RESET1 | CONTINUE ROUTINE |
| 0074 | | 0 000 100 000 | RESET2 | RMGRA | | GO TO ROM GROUP A RESET ROUTINE |
| 0075 | | 0 000 000 000 | | DUMMY | | |
| 0076 | | 1 000 101 110 | PRINT | W.BXC | | SAVE DATA IN B-REG |
| 0077 | | 0 010 010 000 | | ROM 1 | | GO TO ROM 1 PRINT ROUTINE |
| 0100 | | 0 000 000 000 | | DUMMY | | |
| 0101 | | 0 000 110 000 | | RETURN | | RETURN TO CALLING ROUTINE |
| 0102 | 0277 | 1 100 000 001 | LAST1 | JSB | OPLEV=0? | DOES OPLEVEL = 0 ? |
| 0103 | | 0 111 000 100 | | SS7 | | SET FIRST DIGIT ENTRY FLAG |
| 0104 | 0040 | 0 010 000 101 | | JSB | FLGEXC | CALL D. S. FLAG REG AND EXCHANGE FLAGS |
| 0105 | | 1 000 101 110 | | W.BXC | | RESTORE DATA IN C-REG |
| 0106 | | 0 000 100 000 | | RMGRA | | RETURN TO MAIN ROM GROUP |
| 0107 | | 0 011 001 110 | ENTER1 | W.ZTC | | CLEAR C-REG |
| 0110 | | 1 000 101 110 | SUPVR1 | W.BXC | | RESTORE DATA TO C-REG |
| 0111 | | 0 010 101 000 | SUPVR2 | CXM | | PREPARE TO TEST OP MODE DIGIT |
| 0112 | | 1 100 001 100 | SUPVR3 | PT12 | | SELECT OP MODE DIGIT |
| 0113 | | 0 001 100 010 | SUPVR4 | P.CM1 | | DOES OP MODE = 0? |
| 0114 | 0256 | 1 010 111 011 | | BRN | PMS1 | NO, GO TO PROGRAM MODE SUPERVISOR |
| 0115 | | 0 010 101 000 | | CXM | | YES, RESTORE DATA IN C-REG |
| 0116 | | 0 010 010 000 | DISPLAY | ROM 1 | | GO TO ROM 1 FOR DISPLAY ROUTINE |
| 0117 | | 0 000 100 000 | 1C | RMGRA | | CONTINUE POWER ON |
| 0120 | | 1 001 000 000 | | IS1 | | BEGIN POWER ON |
| 0121 | 0200 | 1 000 000 011 | | BRN | IOPW01 | GO TO TURN-ON ROUTINE |
| 0122 | | 0 000 100 000 | 2C | RMGRA | | CONTINUE POWER ON |
| 0123 | | 1 001 000 000 | | IS1 | | BEGIN POWER ON |
| 0124 | 0202 | 1 000 001 011 | | BRN | IOPW02 | GO TO TURN-ON ROUTINE |
| 0125 | | 0 000 100 000 | 3C | RMGRA | | CONTINUE POWER ON |
| 0126 | | 1 001 000 000 | | IS1 | | BEGIN POWER ON |
| 0127 | 0147 | 0 110 100 001 | | JSB | PRESET | PRESET FLAG |
| 0130 | 0125 | 0 101 010 111 | | BRN | 3C | CONTINUE POWER ON |
| 0131 | 0363 | 1 111 001 111 | | BRN | ILLEGAL1 | ILLEGAL KEY CODE OR S.A. |
| 0132 | 0355 | 1 110 111 001 | MMS1 | JSB | KEYUP | WAIT FOR OLD KEY UP CONDITION |
| 0133 | | 0 101 000 000 | MMS2 | IS2 | | PREPARE TO TURN BUSY LIGHT OFF |
| 0134 | | 0 100 100 000 | | RBL | | TURN BUSY LIGHT OFF |
| 0135 | | 1 001 000 000 | | IS1 | | WAIT FOR KEY DOWN |
| 0136 | 0237 | 1 001 111 111 | | BRN | MMS6 | CONTINUE SUPERVISOR |
| 0137 | | 0 000 000 000 | | DUMMY | | |
| 0140 | 0363 | 1 111 001 111 | | BRN | ILLEGAL1 | ILLEGAL KEY CODE OR S.A. |
| 0141 | | 0 010 101 000 | RND1 | CXM | | PREPARE TO CLEAR FLAGS |
| 0142 | | 1 000 001 100 | | PT8 | | SET POINTER TO FIRST FLAG |
| 0143 | | 0 000 011 000 | | LDC0 | | CLEAR CR/LF FLAG |
| 0144 | | 0 000 011 000 | | LDC0 | | CLEAR TAB FLAG |
| 0145 | 0112 | 0 100 101 011 | | BRN | SUPVR3 | RETURN TO SUPERVISOR |
| 0146 | | 0 000 000 000 | | DUMMY | | |
| 0147 | | 0 000 000 000 | | DUMMY | | |
| 0150 | | 1 011 010 100 | PRESET | YS11 | | NORMAL CALL ? |
| 0151 | 0153 | 0 110 101 111 | | BRN | PRESET1 | NO, POWER ON |
| 0152 | 0214 | 1 000 110 011 | | BRN | SCODE | YES, CONTINUE |
| 0153 | | 0 011 001 110 | PRESET1 | W.ZTC | | CLEAR C-REG |
| 0154 | | 0 010 001 100 | | PT2 | | SET POINTER TO RND |
| 0155 | | 0 010 011 000 | | LDC2 | | SET RND TO 2 |
| 0156 | | 1 001 001 100 | | PT9 | | SET POINTER TO SELECT CODE |
| 0157 | | 0 010 011 000 | | LDC2 | | SET SELECT CODE TO 2 |
| 0160 | | 0 010 101 000 | | CXM | | STORE FLAG |
| 0161 | 0041 | 0 010 000 111 | | BRN | FLGEXC | STORE FLAG IN DATA STORAGE |
| 0162 | | 0 011 001 110 | CANCEL1 | W.ZTC | | CLEAR C-REG |
| 0163 | | 0 111 110 000 | | CTT | | CLEAR T-REG |
| 0164 | | 1 100 101 000 | | DNR | | CHECK STACK CONTENTS |
| 0165 | | 0 001 100 110 | | M.CM1 | | REAL DATA ? |
| 0166 | 0170 | 0 111 100 011 | | BRN | CANCEL2 | YES, RESTORE DATA |
| 0167 | | 0 011 001 110 | | W.ZTC | | NO, CLEAR DATA ENTERED |
| 0170 | | 0 100 101 000 | CANCEL2 | CTS | | RESTORE STACK |
| 0171 | 0107 | 0 100 011 111 | | BRN | ENTER1 | RETURN TO SUPERVISOR |
| 0172 | | 0 010 101 000 | RUN1 | CXM | | FLAG TO C-REG FOR UPDATE |
| 0173 | | 1 100 001 100 | | PT12 | | SELECT OP MODE DIGIT |
| 0174 | | 0 001 011 000 | | LDC1 | | SET OP MODE TO 1 |
| 0175 | | 1 010 100 000 | | SBL | | SET BUSY LIGHT |
| 0176 | 0355 | 1 110 111 001 | RUN2 | JSB | KEYUP | WAIT FOR KEYUP CONDITION BEFORE PROCEEDING |
| 0177 | 0271 | 1 011 100 111 | | BRN | PMS2 | GO TO INC. AND READ ROUTINE |
| 0200 | 0147 | 0 110 100 001 | IOPW01 | JSB | PRESET | PRESET FLAG |
| 0201 | 0117 | 0 100 111 111 | | BRN | 1C | CONTINUE POWER ON |
| 0202 | 0147 | 0 110 100 001 | IOPW02 | JSB | PRESET | PRESET FLAG |
| 0203 | 0122 | 0 101 001 011 | | BRN | 2C | CONTINUE POWER ON |
| 0204 | | 0 110 100 100 | INITIAL | RS6 | | RESET STATUS BIT 6 |
| 0205 | | 1 000 100 100 | | RS8 | | RESET STATUS BIT 8 |
| 0206 | | 1 010 100 100 | | RS10 | | RESET STATUS BIT 10 |
| 0207 | | 1 011 100 100 | | RS11 | | RESET STATUS BIT 11 |
| 0210 | | 0 111 100 100 | INITIAL1 | RS7 | | RESET STATUS BIT 7 |
| 0211 | 0040 | 0 010 000 101 | ENTER | JSB | FLGEXC | CALL D.S. FLAG REG AND EXCHANGE FLAGS |
| 0212 | 0107 | 0 100 011 111 | | BRN | ENTER1 | CONTINUE ROUTINE |
| 0213 | 0162 | 0 111 001 011 | | BRN | CANCEL1 | CONTINUE |
| 0214 | | 0 011 001 110 | SCODE | W.ZTC | | PREPARE TO CALL D.S. |
| 0215 | | 0 111 101 110 | | W.CP1C | | BEGIN LOADING ADDRESS |
| 0216 | | 1 100 001 100 | | PT12 | | SET POINTER |
| 0217 | | 1 110 011 000 | | LDC14 | | LOAD ADDRESS |
| 0220 | | 1 001 110 000 | | ATDS | | ENABLE REGISTER |
| 0221 | | 1 001 001 100 | | PT9 | | SET POINTER TO SELECT CODE DIGIT |
| 0222 | | 1 011 111 000 | | DSTC | | RECALL FLAG |
| 0223 | | 1 001 001 110 | SHIFTSC | W.SRC | | SHIFT SELECT CODE TO PROPER POSITION |
| 0224 | | 0 000 011 100 | | PRS | | SHIFT POINTER |
| 0225 | | 0 000 101 100 | | YP0 | | IS SHIFT DONE ? |
| 0226 | 0223 | 1 001 001 111 | | BRN | SHIFTSC | NO, CONTINUE SHIFT |
| 0227 | | 0 101 000 010 | | P.AMCC | | YES, PREPARE SELECT CODE TEST |
| 0230 | | 0 001 100 010 | | P.CM1 | | IS THIS THE RIGHT SELECT CODE ? |
| 0231 | 0304 | 1 100 010 011 | | BRN | RET | NO, EXIT FROM THIS CHANNEL |
| 0232 | | 1 001 100 100 | | RS9 | | YES, RESET STATUS BIT 9 |

TYPEWRITER INTERFACE LISTING (ROM 0) (continued)

```
CURR  BRAN  OPERATION CODE
ADDR  ADDR  BIT PATTERN

0233        0 100 100 100             RS4                 RESET STATUS BIT 4
0234        0 101 100 100             RS5                 RESET STATUS BIT 5
0235  0204  1 000 010 011             BRN     INITIAL     CONTINUE
0236        0 000 000 000             DUMMY
0237        0 000 010 100  MMS6       YS0                 IS NEW KEY DOWN?
0240  0237  1 001 111 111             BRN     MMS6        NO, WAIT FOR NEW KEY
0241        0 000 100 100             RS0                 YES, WAIT FOR BOUNCE TO SETTLE
0242        0 000 001 100             PT0                 BEGIN DELAY ROUTINE
0243        0 000 111 100  MMS4       PLS                 COUNTDOWN LOOP
0244        0 011 101 100             YP3                 IS COUNTDOWN COMPLETE ?
0245  0243  1 010 001 111             BRN     MMS4        NO, CONTINUE TO WAIT FOR 3 MSEC.
0246        1 100 100 000             YFKB                WAS IT FUNCTION BLK KEY ?
0247        1 000 101 000  MMS5       DSOF                TURN DISPLAY OFF
0250        0 000 101 110             W,ZTB               CLEAR B-REG
0251        1 011 101 110             W,ZTA               CLEAR A-REG
0252        1 011 010 100             YS11                TEST FUNCTION BLOCK FLAG
0253  0017  0 000 111 111             BRN     ACKEY0      NO, MAIN UNIT KEY
0254        1 011 100 100             RS11                YES, RESET FLAG
0255  0024  0 001 010 011             BRN     ACKEY1      GO TO ROM 1 TO ACCEPT KEY
0256        0 101 100 100  PMS1       RS5                 RESET STATUS BIT 5
0257        0 000 010 100             YS0                 IS A KEY DOWN ? ( STOP PROGRAM )
0260  0271  1 011 100 111             BRN     PMS2        NO, CONTINUE ROUTINE
0261        0 000 100 100             RS0                 YES, RESET STATUS BIT
0262        0 010 101 000             CXM                 RESTORE DATA
0263        0 010 101 000  PSTOP      CXM                 BEGIN MAN. AND PROG. STOP
0264        1 100 001 100             PT12                SELECT OP MODE DIGIT
0265        0 011 000 010             P,ZTC               SET OP MODE TO 0 (MANUAL)
0266  0112  0 100 101 101             JSB     SUPVR4      GO TO SUPERVISOR
0267  0363  1 111 001 111             BRN     ILLEGAL1    ILLEGAL KEY CODE OR S.A.
0270  0363  1 111 001 111             BRN     ILLEGAL1    ILLEGAL KEY CODE OR S.A.
0271        0 111 000 000  PMS2       PINC                INCREMENT PROGRAM COUNTER
0272        1 000 100 000             READ                READ NEXT PROGRAM INSTRUCTION
0273        0 110 011 110             S,CTA               LOAD OP LEVEL IN A-REG FOR TEST
0274  0305  1 100 010 111             BRN     PMS4        CONTINUE ROUTINE
0275        0 000 000 000             DUMMY
0276        0 010 010 000  POCTFLG    ROM 1               GO TO ROM 1
0277        0 100 010 000  MINUS1     ROM 2               GO TO ROM 2 TO CONTINUE HSPACEB
0300        1 000 101 110  OPLEV=0?   W,BXC               SAVE DATA IN B-REG
0301        1 010 101 000             MTC                 RECALL TFLAG FOR OP LEVEL TEST
0302        0 001 111 110             S,CM1               DOES OP LEVEL=0?
0303  0021  0 001 000 111             BRN     SYNTAX      NO, GO TO SYNTAX ERROR ROUTINE
0304        0 000 110 000  RET        RETURN              YES, RETURN TO CALLING ROUTINE
0305        1 101 111 110  PMS4       S,AM1A              DOES OP LEVEL = 0?
0306        1 101 111 110             S,AM1A              DOES OP LEVEL = 1?
0307        1 101 111 110             S,AM1A              DOES OP LEVEL = 2?
0310  0320  1 101 000 011             BRN     PMS3        NO, CONTINUE TEST
0311  0276  1 011 111 011             BRN     POCTFLG     YES, GO AND PROCESS OCTAL DATA
0312        0 000 000 000             DUMMY
0313        1 001 000 100  MUL1       SS9                 SET STATUS BIT FOR FAST SPACE
0314  0341  1 110 000 111             BRN     MUL2        CONTINUE ROUTINE
0315        0 010 010 000  RECALL1    ROM 1               GO TO ROM 1 TO FINISH RECALL ROUTINE
0316        0 000 000 000             DUMMY
0317        1 110 010 000  PLUS1      ROM 7               GO TO ROM 7 TO TEST OP LEVEL
0320        0 110 010 000  PMS3       ROM 3               GO TO ROM 3 TO CONTINUE TEST
0321        0 010 101 000  RESET1     CXM                 RECALL TFLAG
0322        0 011 011 110             S,ZTC               CLEAR OP LEVEL
0323        0 010 101 000             CXM                 STORE NEW OP LEVEL
0324  0040  0 010 000 101             JSB     FLGEXC      CALL O.S. FLAG REG AND EXCHANGE FLAGS
0325        0 100 000 100             SS4                 SET STATUS BIT FOR RMGRA CLEAR ROUTINE
0326        1 011 001 100             PT11                SET POINTER FOR ROMGRA CLEAR ROUTINE
0327  0074  0 011 110 011             BRN     RESET2      CONTINUE ROUTINE
0330        0 000 000 000             DUMMY
0331  0363  1 111 001 111             BRN     ILLEGAL1    ILLEGAL KEY CODE OR S.A.
0332  0363  1 111 001 111             BRN     ILLEGAL1    ILLEGAL KEY CODE OR S.A.
0333  0363  1 111 001 111             BRN     ILLEGAL1    ILLEGAL KEY CODE OR S.A.
0334  0363  1 111 001 111             BRN     ILLEGAL1    ILLEGAL KEY CODE OR S.A.
0335  0363  1 111 001 111             BRN     ILLEGAL1    ILLEGAL KEY CODE OR S.A.
0336  0363  1 111 001 111             BRN     ILLEGAL1    ILLEGAL KEY CODE OR S.A.
0337  0363  1 111 001 111             BRN     ILLEGAL1    ILLEGAL KEY CODE OR S.A.
0340        0 000 000 000             DUMMY
0341        0 100 010 000  MUL2       ROM 2               GO TO ROM 2 TO CONTINUE HSPACEF
0342        0 000 000 000             DUMMY
0343        0 000 000 000             DUMMY
0344        0 010 101 000  STEP1      CXM                 PREPARE DATA FOR OP LEVEL TEST
0345  0176  0 111 111 011  STEP2      BRN     RUN2        WAIT FOR KEYUP
0346        0 000 000 000             DUMMY
0347        0 000 000 000             DUMMY
0350        0 000 000 000             DUMMY
0351        0 000 000 000             DUMMY
0352        0 000 000 000             DUMMY
0353        0 000 000 000             DUMMY
0354        0 000 000 000             DUMMY
0355        0 000 000 000             DUMMY
0356        0 000 010 100  KEYUP      YS0                 IS KEY DOWN ?
0357  0304  1 100 010 011             BRN     RET         NO, RETURN TO CALLING ROUTINE
0360        0 000 100 100             RS0                 YES, RESET STATUS BIT AND CHECK KEY DOWN AGAIN
0361  0356  1 110 111 011             BRN     KEYUP       CHECK KEY STATUS
0362  0363  1 111 001 111             BRN     ILLEGAL1    ILLEGAL KEY CODE OR S.A.
0363        1 000 101 110  ILLEGAL1   W,BXC               SAVE DATA IN B-REG
0364        0 100 010 000             ROM 2               GO TO ROM 2 TO PRINT MESSAGE
0365        0 000 000 000             DUMMY
0366        0 010 101 000  START1     CXM                 PREPARE TO MODIFY SELECT CODE
0367        1 001 001 100             PT9                 SET POINTER TO SELECT CODE DIGIT
0370        0 111 100 010             P,CP1C              INCREMENT SELECT CODE
0371  0373  1 111 101 111             BRN     PRINTSC     IF NO CARRY PRINT SELECT CODE
0372        0 111 100 010             P,CP1C              CARRY ! INCREMENT ONCE MORE
0373        0 010 101 000  PRINTSC    CXM                 RESTORE DATA
0374  0363  1 111 001 111             BRN     ILLEGAL1    ILLEGAL KEY CODE OR S.A. (FCTN BLK KEY)
0375  0363  1 111 001 111             BRN     ILLEGAL1    ILLEGAL KEY CODE OR S.A.
0376  0363  1 111 001 111             BRN     ILLEGAL1    ILLEGAL KEY CODE OR S.A.
0377  0015  0 000 110 111  NOMEMORY   BRN     XMEM        TRIED TO STEP OR RUN W/NO MEMORY, GO TO ERROR
```

TYPEWRITER INTERFACE LISTING (ROM 1)

```
LINE  CURR  BRAN   OPERATION CODE
 #    ADDR  ADDR   BIT PATTERN

      0000        1 010 100 000  LISTM    SBL                 SET BUSY LIGHT
      0001        0 000 010 100  LISTK    YS0                 IS KEY STILL DOWN ?
      0002  0357  1 110 111 111           BRN      LIST1      NO, CONTINUE ROUTINE
      0003        0 000 100 100           RS0                 YES, RESET STATUS BIT AND TEST KEY DOWN AGAIN
      0004  0001  0 000 000 111           BRN      LISTK      TEST FOR KEY DOWN
      0005        0 101 110 010  SM1      WP,CMIC             SUBTRACT 1 FROM SPACES, WAS SPACES = 0?
      0006  0011  0 000 100 111           BRN      SM1F       NO, RETURN TO CALLING PROGRAM
      0007        0 110 010 000  FTS      ROM 3               YES, GO TO ROM 3 FOR FIELD TOO SMALL ROUTINE
      0010  0373  1 111 101 111           BRN      XKEY1      INVALID KEYCODE
      0011        0 000 110 000  SM1F     RETURN              RETURN TO CALLING ROUTINE
      0012  0373  1 111 101 111           BRN      XKEY1      INVALID KEYCODE
      0013  0373  1 111 101 111           BRN      XKEY1      INVALID KEYCODE
      0014  0373  1 111 101 111           BRN      XKEY1      INVALID KEYCODE
      0015        0 000 000 000           DUMMY
      0016  0373  1 111 101 111           BRN      XKEY1      INVALID KEYCODE
      0017        0 110 010 000  POCTFLG2 ROM 3               GO TO ROM 3 TO TEST FOR CODE " 377 "
      0020  0373  1 111 101 111           BRN      XKEY1      INVALID KEYCODE
      0021        0 100 010 000  SYNTAX   ROM 2               GO TO ROM 2 TO PRECESS SYNTAX
      0022  0373  1 111 101 111           BRN      XKEY1      INVALID KEYCODE
      0023  0373  1 111 101 111           BRN      XKEY1      INVALID KEYCODE
      0024        0 000 010 000  STEP1    ROM 0               GO TO ROM 0 TO PROCESS STEP
      0025        0 011 010 000           TKRA                ACCEPT FUNCTION BLOCK KEYCODE
      0026  0373  1 111 101 111           BRN      XKEY1      INVALID KEYCODE
      0027        0 000 000 000           DUMMY
      0030  0373  1 111 101 111           BRN      XKEY1      INVALID KEYCODE
      0031        0 000 000 000           DUMMY
      0032  0373  1 111 101 111           BRN      XKEY1      INVALID KEYCODE
      0033  0373  1 111 101 111           BRN      XKEY1      INVALID KEYCODE
      0034  0373  1 111 101 111           BRN      XKEY1      INVALID KEYCODE
      0035        0 000 000 000           DUMMY
      0036        1 000 101 110  LIST     W,BXC               SAVE DATA IN B-REG
      0037  0000  0 000 000 011           BRN      LISTM      CONTINUE ROUTINE
      0040        1 000 010 000  RECALLD  ROM 4               GO TO ROM 4 TO CONTINUE ROUTINE
      0041        0 101 101 010  MASK3    X,CMIC              BLANK EXPONENT PART OF WORD
      0042        1 000 101 110           W,BXC               DATA BACK TO C-REG, MASK TO B-REG
      0043        0 110 010 100           YS6                 IS DATA IN SCIENTIFIC NOTATION?
      0044  0073  0 011 101 111           BRN      EXIT1      NO, PREPARE TO EXIT
      0045        0 000 101 010           X,ZTB               YES, UNBLANK EXPONENT MASK
      0046        0 110 111 010           XS,ZMC              IS EXPONENT POSITIVE?
      0047  0075  0 011 110 111           BRN      EXIT       YES, PREPARE TO EXIT
      0050        0 001 001 100  COMPL    PT1                 NO, SET POINTER FOR EXPONENT COMPLEMENT
      0051        0 010 110 010           WP,ZMCC             COMPLEMENT EXPONENT
      0052        1 110 110 010           WP,AXC              ORIGINAL EXPONENT TO C-REG, COMPL. TO A-REG
      0053  0075  0 011 110 111           BRN      EXIT       PREPARE TO EXIT
      0054        0 011 011 110  DSHIFT2  S,ZTC               SET SIGN TO ZERO BEFORE SHIFT
      0055        1 001 001 110           W,SRC               SHIFT ONCE
      0056  0222  1 001 001 101           JSB      DSHIFT1    CHECK IF SHIFT IS COMPLETE
      0057        1 000 101 110  STORE1   W,BXC               SAVE C-REG IN B-REG
      0060        1 010 101 000           MTC                 RECALL TFLAG FOR OP LEVEL TEST
      0061        0 101 111 110           S,CMIC              DOES OP LEVEL = 0?
      0062  0324  1 101 010 011           BRN      STORE2     NO, CONTINUE TO TEST OP LEVEL
      0063        1 101 001 100           PT13                YES, PREPARE TO UPDATE OP LEVEL
      0064        0 101 011 000           LDC5                SET OP LEVEL TO FIVE
      0065        0 000 000 000           NOP                 SOFTWARE DELAY
      0066        0 010 101 000  DSRET    CXM                 STORE NEW FLAG IN M-REG
      0067        0 011 001 110           W,ZTC               CLEAR C-REG
      0070        1 010 010 000           ROM 5               GO TO SUPERVISOR
      0071        0 000 000 000           DUMMY
      0072        0 000 000 000           DUMMY
      0073        0 110 001 010  EXIT1    X,CTA               STORE EXPONENT IN A-REG FOR PRINT ROUTINE
      0074        0 110 011 110           S,CTA               LOAD SIGN OF DATA IN DISPLAY
      0075        1 000 010 100  EXIT     YS8                 DID PRINT ROUTINE CALL?
      0076  0126  0 101 011 011           BRN      MANEX      NO, GO TO SUPERVISOR (IN ROM 0)
      0077  0132  0 101 101 011           BRN      PRINT12    YES, CONTINUE ROUTINE
      0100        1 000 000 100  PRINT1   SS8                 SET PRINT ROUTINE FLAG
      0101        1 010 101 000           MTC                 RECALL TFLAG FOR OP LEVEL TEST
      0102        0 101 111 110           S,CMIC              DOES OP LEVEL = 0 ?
      0103  0040  0 010 000 011           BRN      RECALLD    NO, CONTINUE TEST
      0104  0165  0 111 010 111           BRN      ADJDATA    YES, GO TO ADJUST DATA ROUTINE
      0105        0 101 000 000  SHIFT    IS2                 SHIFT ROUTINE
      0106        0 100 001 000           SLT                 SHIFT
      0107        0 100 001 000           SLT                 SHIFT
      0110        0 100 001 000           SLT                 SHIFT
      0111        0 100 001 000           SLT                 SHIFT
      0112        1 001 000 000           IS1                 PREPARE TO TEST IF SHIFT IS COMPLETE
      0113        0 000 011 100           PRS                 SHIFT POINTER
      0114        0 000 101 100           YP8                 IS SHIFT COMPLETE?
      0115  0105  0 100 010 111           BRN      SHIFT      NO, CONTINUE SHIFT
      0116        0 110 010 000           ROM 3               YES, CONTINUE STORE ROUTINE
      0117        1 000 101 110  DISPLAY1 W,BXC               SAVE DATA IN B-REG
      0120        1 010 101 000           MTC                 PREPARE FOR OP LEVEL TEST
      0121  0344  1 110 010 011           BRN      DATA?      TEST FOR DATA TO BE DISPLAYED
      0122        1 001 111 010  PRINT6   XS,AM1              IS EXPONENT POSITIVE?
      0123  0164  0 111 010 011           BRN      SPOUT      NO, PREPARE TO OUTPUT SPACES
      0124  0362  1 111 001 101           JSB      SMEXP      YES, SUBTRACT EXPONENT FROM SPACES
      0125  0164  0 111 010 011           BRN      SPOUT      GO TO SPOUT ROUTINE
      0126        0 000 101 000  MANEX    DSTO                TURN ON DISPLAY
      0127        0 101 100 100           RS5                 RESET STATUS BIT 5
      0130        0 110 100 100           RS6                 RESET STATUS BIT 6
      0131        0 000 010 000  DISFIN2  ROM 0               GO TO ROM 0 AND PROCEED IN SUPERVISOR
      0132        0 100 101 000  PRINT12  CTS                 STORE DATA IN STACK
      0133        1 010 101 000           MTC                 RECALL TFLAG FOR FIELD WIDTH
      0134        0 001 001 100           PT1                 SET POINTER FOR SPACE ADJUSTMENT
      0135        0 001 110 010           WP,CM1              IS WIDTH = 0?
      0136  0141  0 110 000 111           BRN      FNZ        NO, FIELD IS NOT ZERO, CONTINUE ROUTINE
      0137        0 010 011 000           LDC2                YES, SET FIELD WIDTH TO 20
      0140        0 001 001 100           PT1                 RESET POINTER
      0141  0004  0 000 010 101  FNZ      JSB      SM1        DECREMENT SPACES BY ONE FOR MSD
      0142        0 001 111 010           XS,CM1              IS D = 0?
      0143  0367  1 111 011 111           BRN      PRINT9     NO, ADJUST SPACES FOR D NOT EQUAL TO 0
      0144        1 001 111 110  PRINT2   S,AM1               YES, CONTINUE ROUTINE, IS MANTISSA POSITIVE ?
      0145  0303  1 100 001 111           BRN      PRINT8     NO, ADJUST SPACES FOR MINUS SIGN
      0146        0 101 010 100  PRINT3   YS5                 YES, CONTINUE ROUTINE, DID DATA FIT?
```

TYPEWRITER INTERFACE LISTING (ROM 1)—Continued

| CURR ADDR | BRAN ADDR | OPERATION CODE BIT PATTERN | | | | |
|---|---|---|---|---|---|---|
| 0147 | 0332 | 1 101 101 011 | | BRN | PRINT7 | YES. CONTINUE ROUTINE |
| 0150 | | 0 000 100 110 | | M.ZTB | | NO. CLEAR DECIMAL POINT MASK |
| 0151 | 0362 | 1 111 001 101 | | JSB | SMEXP | SUBTRACT EXPONENT FROM SPACES |
| 0152 | | 1 001 100 010 | | P.AM1 | | IS MOST SIGNIFICANT DIGIT OF EXPONENT = 0 ? |
| 0153 | 0164 | 0 111 010 011 | | BRN | SPOUT | NO. GO TO OUTPUT SPACE ROUTINE |
| 0154 | | 1 100 001 100 | | PT12 | | YES. PREPARE TO LOCATE DECIMAL POINT |
| 0155 | | 1 101 101 010 | DPADJ1 | X.AM1A | | DECREMENT EXPONENT. IS ADJUSTMENT COMPLETE ? |
| 0156 | 0263 | 1 011 001 111 | | BRN | DPADJ2 | NO. ADJUST DECIMAL POINT LOCATION |
| 0157 | | 0 111 100 010 | | P.CP1C | | YES. LOAD DECIMAL POINT CODE (1 WILL WORK) |
| 0160 | | 1 000 100 010 | | P.BXC | | LOAD DECIMAL POINT CODE IN MASK REGISTER |
| 0161 | | 1 011 101 010 | | X.ZTA | | CLEAR EXPONENT IN DATA |
| 0162 | | 0 000 101 010 | | X.ZTB | | CLEAR MASK IN B-REG |
| 0163 | | 0 001 001 100 | | PT1 | | INITIALIZE POINTER FOR SPOUT ROUTINE |
| 0164 | | 0 110 010 000 | SPOUT | ROM 3 | | GO TO ROM 3 TO FINISH PRINT ROUTINE |
| 0165 | | 0 011 001 100 | ADJDATA | PT3 | | SET POINTER FOR SCIENTIFIC NOTATION TEST |
| 0166 | | 0 001 100 010 | | P.CM1 | | IS FIXED POINT SPECIFIED? |
| 0167 | 0246 | 1 010 011 011 | | BRN | SCINOT | NO. GO TO SCIENTIFIC NOTATION ROUTINE |
| 0170 | | 1 100 101 110 | | W.AXB | | YES. LOAD DATA IN A-REG |
| 0171 | | 0 100 101 110 | | W.ATB | | LOAD DATA IN B-REG |
| 0172 | | 0 010 010 110 | ADJDATA1 | MS.BTC | | LOAD MANTISSA IN C-REG FOR ADJUSTMENT |
| 0173 | | 0 101 111 010 | EXPADJ1 | XS.CM1C | | DECREMENT RND. CHECK IF CARRY? |
| 0174 | 0242 | 1 010 001 011 | | BRN | EXPADJ2 | NO CARRY. CONTINUE EXP. ADJUSTMENT |
| 0175 | | 0 011 001 010 | FP1 | X.ZTC | | YES. CLEAR C-REG EXP. ELIMINATE FALSE ROUNOUP |
| 0176 | | 0 001 001 100 | | PT1 | | PREPARE TO TEST MSD OF (EXP + RND) |
| 0177 | | 1 001 100 010 | | P.AM1 | | IS MOST SIGNIFICANT DIGIT OF EXPONENT = 0 ? |
| 0200 | 0204 | 1 000 010 011 | | BRN | EXP1 | NO. DATA MAY NOT FIT |
| 0201 | | 1 001 111 010 | | XS.AM1 | | YES. CONTINUE TEST. IS EXP POSITIVE? |
| 0202 | 0217 | 1 000 111 111 | | BRN | EXP3 | NO. CONTINUE TEST |
| 0203 | 0223 | 1 001 001 111 | | BRN | DSHIFT1 | YES. DATA WILL FIT. GO TO SHIFT ROUTINE |
| 0204 | | 1 001 111 010 | EXP1 | XS.AM1 | | IS EXPONENT POSITIVE? |
| 0205 | 0210 | 1 000 100 011 | | BRN | EXP2 | NO. CONTINUE TEST |
| 0206 | | 0 101 000 100 | DTL | SS5 | | YES. DATA WILL NOT FIT. SET STATUS BIT |
| 0207 | 0246 | 1 010 011 011 | | BRN | SCINOT | GO TO SCIENTIFIC NOTATION ROUTINE |
| 0210 | | 1 111 101 010 | EXP2 | X.AP1A | | IS EXP = 999? |
| 0211 | 0215 | 1 000 110 111 | | BRN | DTS | NO. DATA IS TOO SMALL |
| 0212 | | 0 011 011 110 | | S.ZTC | | YES. CLEAR SIGN FOR SHIFT |
| 0213 | | 1 001 001 110 | | W.SRC | | SHIFT DATA ONCE (WILL SHIFT 9 MORE TIMES) |
| 0214 | 0222 | 1 001 001 101 | | JSB | DSHIFT1 | GO TO SHIFT ROUTINE |
| 0215 | | 0 011 001 110 | DTS | W.ZTC | | CLEAR C-REG (DISPLAY=0) |
| 0216 | 0222 | 1 001 001 101 | | JSB | DSHIFT1 | GO TO DATA SHIFT ROUTINE |
| 0217 | | 1 111 111 010 | EXP3 | XS.AP1A | | IS EXPONENT NEGATIVE? |
| 0220 | 0206 | 1 000 011 011 | | BRN | DTL | NO. DATA TOO LARGE |
| 0221 | | 1 101 111 010 | | XS.AM1A | | YES. RESTORE SIGN OF EXPONENT |
| 0222 | 0214 | 1 000 110 101 | | JSB | DTS | BUT DATA IS TOO SMALL TO BE DISPLAYED |
| 0223 | | 0 000 001 100 | DSHIFT1 | PT0 | | PREPARE POINTER FOR DATA SHIFT |
| 0224 | | 1 111 100 010 | | P.AP1A | | DOES LSD OF EXPONENT =9?(IS SHIFT COMPLETE ?) |
| 0225 | 0054 | 0 010 110 011 | | BRN | DSHIFT2 | NO. SHIFT DATA ONCE |
| 0226 | | 1 011 101 110 | DSHIFT3 | W.ZTA | | PREPARE A-REG FOR ROUNOUP |
| 0227 | | 0 110 001 010 | | X.CTA | | LOAD GUARD DIGIT IN A-REG |
| 0230 | | 1 111 001 110 | | W.APCA | | ROUNDUP |
| 0231 | | 1 010 101 000 | | MTC | | GET ROUND DIGIT FOR DECIMAL POINT LOCATION |
| 0232 | | 0 010 001 100 | | PT2 | | INITIALIZE DECIMAL POINT LOCATION |
| 0233 | | 0 000 111 100 | DSHIFT4 | PLS | | ADJUST DECIMAL POINT LOCATION |
| 0234 | | 0 101 111 010 | | XS.CM1C | | IS RND=0? |
| 0235 | 0233 | 1 001 101 111 | | BRN | DSHIFT4 | NO. CONTINUE DECIMAL POINT ADJUSTMENT |
| 0236 | | 0 011 101 100 | | YP3 | | YES. WAS ORIGINAL RND=0? |
| 0237 | 0252 | 1 010 101 011 | | BRN | MASK | NO. LOAD DECIMAL POINT |
| 0240 | | 0 011 001 110 | | W.ZTC | | YES. CLEAR C-REG FOR MASK GENERATION |
| 0241 | 0253 | 1 010 110 001 | | JSB | MASK1 | DO NOT LOAD DECIMAL POINT |
| 0242 | | 1 111 101 010 | EXPADJ2 | X.AP1A | | INCREMENT EXPONENT |
| 0243 | 0172 | 0 111 101 101 | | JSB | EXPADJ1 | CHECK IF EXP. ADJUSTMENT IS COMPLETE |
| 0244 | | 1 101 010 010 | SMEXP1 | WP.AMCA | | RESTORE EXPONENT IN A-REG |
| 0245 | | 0 000 110 000 | | RETURN | | GO TO CALLING ROUTINE |
| 0246 | | 1 100 001 100 | SCINOT | PT12 | | LOCATE DECIMAL POINT FOR SCIENTIFIC NOTATION |
| 0247 | | 0 110 000 100 | | SS6 | | SET SCIENTIFIC NOTATION FLAG |
| 0250 | | 1 100 101 110 | | W.AXB | | DATA TO A-REG |
| 0251 | | 0 100 101 110 | | W.ATB | | DATA TO B-REG |
| 0252 | | 0 011 001 110 | MASK | W.ZTC | | CLEAR C-REG FOR MASK GENERATION |
| 0253 | | 0 010 011 000 | | LDC2 | | LOAD DECIMAL POINT CODE |
| 0254 | | 1 100 001 100 | MASK1 | PT12 | | BEGIN SEARCH FOR LEADING ZEROES |
| 0255 | | 1 001 100 010 | MASK2 | P.AM1 | | IS THIS DIGIT 0? |
| 0256 | 0041 | 0 010 000 111 | | BRN | MASK3 | NO. TEST OVER |
| 0257 | | 0 001 100 010 | | P.CM1 | | YES. IS DECIMAL POINT AT THIS LOCATION ? |
| 0260 | 0041 | 0 010 000 111 | | BRN | MASK3 | YES. END OF SEARCH FOR LEADING ZEROES |
| 0261 | | 1 001 011 000 | | LDC9 | | NO. BLANK THIS DIGIT |
| 0262 | 0265 | 1 011 010 111 | | BRN | MASK4 | CONTINUE ROUTINE |
| 0263 | | 0 000 011 100 | DPADJ2 | PRS | | ADJUST POINTER AND CHECK EXPONENT AGAIN |
| 0264 | 0155 | 0 110 110 111 | | BRN | DPADJ1 | CHECK EXPONENT |
| 0265 | | 0 011 101 100 | MASK4 | YP3 | | IS THIS THE LAST DIGIT TO BE BLANKED? |
| 0266 | 0255 | 1 010 110 111 | | BRN | MASK2 | NO. CONTINUE SEARCH FOR LEADING ZEROES |
| 0267 | 0041 | 0 010 000 111 | | BRN | MASK3 | YES. CONTINUE ROUTINE |
| 0270 | | 0 000 000 000 | | DUMMY | | |
| 0271 | | 0 000 000 000 | | DUMMY | | |
| 0272 | | 0 000 000 000 | | DUMMY | | |
| 0273 | | 0 000 000 000 | | DUMMY | | |
| 0274 | | 0 000 000 000 | | DUMMY | | |
| 0275 | | 0 000 000 000 | | DUMMY | | |
| 0276 | | 0 000 000 000 | | DUMMY | | |
| 0277 | | 0 010 101 000 | POCTFLG | CXM | | RESTORE DATA AND FLAG |
| 0300 | | 1 000 101 110 | | W.BXC | | SAVE DATA IN B-REG |
| 0301 | | 0 111 110 000 | | CTT | | CLEAR T-REG |
| 0302 | 0306 | 1 100 011 011 | | BRN | POCTFLG1 | CONTINUE ROUTINE |
| 0303 | 0004 | 0 000 010 101 | PRINT8 | JSB | SM1 | SUBTRACT 1 FROM SPACES (FOR MINUS SIGN) |
| 0304 | 0146 | 0 110 011 011 | | BRN | PRINT3 | CONTINUE ROUTINE |
| 0305 | | 0 000 000 000 | | DUMMY | | |
| 0306 | | 0 101 000 000 | POCTFLG1 | IS2 | | PREPARE TO LOAD DATA IN T-REG |
| 0307 | | 0 100 101 000 | | IXT | | LOAD DATA IN T-REG |
| 0310 | | 1 001 000 000 | | IS1 | | PREPARE TO CHECK FOR "377" |
| 0311 | | 1 101 001 100 | | PT13 | | SET POINTER FOR "377" MASK |
| 0312 | | 1 111 011 000 | | LDC15 | | LOAD CODE |
| 0313 | | 0 000 000 000 | | NOP | | FOR "377" |
| 0314 | | 1 111 011 000 | | LDC15 | | MASK |
| 0315 | 0017 | 0 000 111 111 | | BRN | POCTFLG2 | CONTINUE ROUTINE |
| 0316 | | 1 010 101 000 | RECALL2 | MTC | | RECALL TFLAG FOR OP LEVEL TEST |
| 0317 | | 0 101 111 110 | | S.CM1C | | DOES OP LEVEL = 0 ? |

TYPEWRITER INTERFACE LISTING (ROM 1) – Continued

| CURR ADDR | BRAN ADDR | OPERATION CODE BIT PATTERN | | | | |
|---|---|---|---|---|---|---|
| 0320 | 0040 | 0 010 000 011 | | BRN | RECALLO | NO, CONTINUE TEST |
| 0321 | | 1 101 001 100 | | PT13 | | YES, SET POINTER TO UPDATE OP LEVEL |
| 0322 | | 0 100 011 000 | | LDC4 | | SET OP LEVEL TO FOUR |
| 0323 | 0066 | 0 011 011 011 | | BRN | OSRET | PREPARE TO RETURN TO SUPERVISOR |
| 0324 | | 1 010 100 100 | STORE2 | RS10 | | RESET STATUS BIT |
| 0325 | | 0 101 111 110 | | S,CMIC | | DOES OP LEVEL = 1 ? |
| 0326 | | 0 101 111 110 | | S,CMIC | | DOES OP LEVEL = 2 ? |
| 0327 | 0347 | 1 110 011 111 | | BRN | STORE3 | NO, CONTINUE TEST |
| 0330 | | 1 100 001 100 | | PT12 | | YES, INITIALIZE POINTER FOR SHIFT |
| 0331 | 0105 | 0 100 010 111 | | BRN | SHIFT | CONTINUE ROUTINE |
| 0332 | | 0 110 010 100 | PRINT7 | YS6 | | WAS SCIENTIFIC NOTATION SPECIFIED? |
| 0333 | 0122 | 0 101 001 011 | | BRN | PRINT6 | NO, CONTINUE TEST |
| 0334 | | 0 101 100 010 | | P,CMIC | | YES, SUBTRACT TEN FROM SPACES, ARE SPACES < 10 ? |
| 0335 | 0337 | 1 101 111 111 | | BRN | PRINT71 | NO, CONTINUE TO SUBTRACT 13 FROM SPACES |
| 0336 | 0007 | 0 000 011 111 | | BRN | FTS | YES, GO TO FIELD TOO SMALL ROUTINE |
| 0337 | 0004 | 0 000 010 101 | PRINT71 | JSB | SM1 | SUBTRACT 1 FROM SPACES (11) |
| 0340 | 0004 | 0 000 010 101 | | JSB | SM1 | SUBTRACT 1 FROM SPACES (12) |
| 0341 | 0004 | 0 000 010 101 | | JSB | SM1 | SUBTRACT 1 FROM SPACES (13) |
| 0342 | 0004 | 0 000 010 101 | | JSB | SM1 | SUBTRACT 1 FROM SPACES (14) |
| 0343 | 0164 | 0 111 010 011 | | BRN | SPOUT | GO TO SPOUT ROUTINE |
| 0344 | | 0 101 010 100 | DATA7 | YS5 | | IS DATA ENTRY FLAG SET |
| 0345 | 0165 | 0 111 010 111 | | BRN | ADJDATA | NO, GO TO DATA ADJUSTMENT ROUTINE |
| 0346 | 0350 | 1 110 100 011 | | BRN | YENTRY | YES, DISPLAY DATA ENTRY |
| 0347 | | 1 000 010 000 | STORE3 | ROM 4 | | CONTINUE TEST |
| 0350 | | 1 100 101 000 | YENTRY | DNR | | RECALL DATA FROM STACK |
| 0351 | | 0 100 101 000 | | CTS | | RESTORE STACK |
| 0352 | | 1 110 101 110 | | W,AXC | | LOAD DATA IN A-REG |
| 0353 | | 0 100 001 110 | LREG | W,SLA | | SHIFT DATA TO PROPER POSITION |
| 0354 | | 0 100 001 110 | | W,SLA | | SHIFT DATA TO PROPER POSITION |
| 0355 | | 0 100 001 110 | | W,SLA | | SHIFT DATA TO PROPER POSITION |
| 0356 | 0254 | 1 010 110 011 | | BRN | MASK1 | FINISH DISPLAY WITH MASK |
| 0357 | | 1 010 101 000 | LIST1 | MTC | | RECALL TFLAG FOR OP LEVEL TEST |
| 0360 | | 0 101 111 110 | | S,CMIC | | DOES OP LEVEL=0? |
| 0361 | 0021 | 0 001 000 111 | | BRN | SYNTAX | NO, GO TO SYNTAX ERROR ROUTINE |
| 0362 | | 1 010 010 000 | LIST2 | ROM 5 | | GO TO ROM 5 TO CONTINUE LIST |
| 0363 | | 1 110 110 010 | SMEXP | WP,AXC | | EXCHANGE EXPONENT AND SPACES |
| 0364 | | 0 101 010 010 | | WP,AMCC | | SUBTRACT EXP FROM SPACES, IS SPACE <0? |
| 0365 | 0244 | 1 010 010 011 | | BRN | SMEXP1 | NO, PREPARE TO RETURN |
| 0366 | 0007 | 0 000 011 111 | | BRN | FTS | YES, GO TO FIELD TOO SMALL ROUTINE |
| 0367 | 0004 | 0 000 010 101 | PRINT9 | JSB | SM1 | SUBTRACT 1 FROM SPACES ( FOR D NOT EQUAL TO |
| 0370 | | 0 101 111 010 | | XS,CMIC | | DECREMENT 2ND DIGIT, IS ADJUSTMENT COMPLETE |
| 0371 | 0367 | 1 111 011 111 | | BRN | PRINT9 | NO, CONTINUE TO ADJUST SPACES |
| 0372 | 0144 | 0 110 010 011 | | BRN | PRINT2 | YES, CONTINUE ROUTINE |
| 0373 | | 0 000 010 000 | XKEY1 | ROM 0 | | GO TO ERROR MESSAGE ROUTINE |
| 0374 | | 0 010 101 000 | DISLREG | CXM | | STORE NEW OP LEVEL |
| 0375 | | 0 011 001 110 | | W,ZTC | | CLEAR C-REG |
| 0376 | 0352 | 1 110 101 101 | | JSB | LREG | DISPLAY LAST REGISTER USED |
| 0377 | | 0 000 000 000 | | DUMMY | | |

TYPEWRITER INTERFACE LISTING (ROM 2)

| CURR ADDR | BRAN ADDR | OPERATION CODE BIT PATTERN | | | | |
|---|---|---|---|---|---|---|
| 0000 | | 1 101 110 000 | | TCS | | COMPARE T-REG |
| 0001 | | 0 000 111 100 | | PLS | | SHIFT POINTER |
| 0002 | | 1 100 101 100 | | YP12 | | INTERROGATE POINTER |
| 0003 | 0376 | 1 111 111 011 | | BRN | FLG1 | TEST FLAG |
| 0004 | 0212 | 1 000 101 101 | | JSB | FLAG | TEST IF PRINTER FLAG HAS RETURNED |
| 0005 | | 0 011 110 000 | | ADV | | ADVANCE PAPER |
| 0006 | | 1 110 101 110 | | W,AXC | | PREPARE TO RESTORE T-REG |
| 0007 | | 0 111 110 000 | | CTT | | RESTORE T-REG |
| 0010 | | 0 010 101 000 | | CXM | | PREPARE TO SET ZERO FOR OP MODE |
| 0011 | | 0 000 011 000 | | LDC0 | | SET OP MODE TO 0 |
| 0012 | 0057 | 0 010 111 111 | | BRN | LDC0 | CLEAR SHIFT DIGIT |
| 0013 | | 1 000 101 110 | LERR | W,BXC | | SAVE DATA IN B-REG |
| 0014 | 0232 | 1 001 101 011 | | BRN | LERROR3 | GO TO ERROR MESSAGE ROUTINE |
| 0015 | 0235 | 1 001 110 111 | | BRN | VSPACEF | CONTINUE ROUTINE |
| 0016 | 0013 | 0 000 101 111 | | BRN | LERR | NO MEMORY |
| 0017 | | 1 000 101 110 | CPAR1 | W,BXC | | SAVE C-REG IN B-REG |
| 0020 | | 1 010 101 000 | | MTC | | RECALL TFLAG FOR OP LEVEL TEST |
| 0021 | 0352 | 1 110 101 011 | | BRN | CPARS | CONTINUE ROUTINE |
| 0022 | 0206 | 1 000 011 011 | | BRN | SYNTAX | GO TO SYNTAX ERROR ROUTINE |
| 0023 | 0037 | 0 001 111 111 | DECPT1 | BRN | DECPT2 | GO TO DECPT ROUTINE |
| 0024 | | 1 000 101 110 | DIGIT1 | W,BXC | | SAVE DATA IN B-REG |
| 0025 | | 1 010 101 000 | | MTC | | RECALL TFLAG FOR OP LEVEL TEST |
| 0026 | 0065 | 0 011 010 111 | | BRN | DIGIT2 | CONTINUE ROUTINE |
| 0027 | | 1 000 101 110 | OPAR1 | W,BXC | | SAVE DATA IN B-REG |
| 0030 | | 1 010 101 000 | | MTC | | RECALL TFLAG FOR OP LEVEL TEST |
| 0031 | | 0 101 111 110 | | S,CMIC | | DOES OP LEVEL = 0? |
| 0032 | 0211 | 1 000 100 111 | | BRN | OPAR2 | NO, CONTINUE TEST |
| 0033 | | 0 010 111 110 | | S,ZMCC | | YES, SET OP LEVEL TO 1 |
| 0034 | | 0 111 111 110 | | S,CPIC | | SET OP LEVEL TO 2 |
| 0035 | | 0 010 101 000 | | CXM | | STORE NEW OP LEVEL |
| 0036 | 0212 | 1 000 101 011 | | BRN | CANCEL | GO TO CANCEL ENTRY ROUTINE |
| 0037 | | 1 000 101 110 | DECPT2 | W,BXC | | SAVE DATA IN B-REG |
| 0040 | | 1 010 101 000 | | MTC | | RECALL TFLAG FOR OP LEVEL TEST |
| 0041 | | 0 101 111 110 | | S,CMIC | | DOES OP LEVEL = 0? |
| 0042 | | 0 101 111 110 | | S,CMIC | | DOES OP LEVEL = 1? |
| 0043 | 0051 | 0 010 100 111 | | BRN | DECPT3 | NO, CONTINUE TEST |
| 0044 | | 0 110 101 000 | | STA | | YES, BRING STACK DOWN TO A-REG FOR WIDTH UPDATE |
| 0045 | | 1 010 101 000 | | MTC | | RECALL TFLAG FOR WIDTH UPDATE |
| 0046 | | 0 001 001 100 | | PT1 | | SET POINTER FOR WIDTH UPDATE |
| 0047 | | 1 110 110 010 | | WP,AXC | | LOAD NEW WIDTH IN TFLAG |
| 0050 | 0331 | 1 101 100 111 | | BRN | DECPT4 | CONTINUE ROUTINE |
| 0051 | | 0 101 111 110 | DECPT3 | S,CMIC | | DOES OP LEVEL = 2? |
| 0052 | | 0 101 111 110 | | S,CMIC | | DOES OP LEVEL = 3? |
| 0053 | 0206 | 1 000 011 011 | | BRN | SYNTAX | NO, GO TO SYNTAX ERROR |
| 0054 | | 0 011 011 110 | | S,ZTC | | YES, SET OP LEVEL TO 0 |
| 0055 | | 0 011 001 100 | | PT3 | | SET POINTER FOR SCIENTIFIC NOTATION |
| 0056 | | 0 001 011 000 | | LDC1 | | SET SCIENTIFIC NOTATION |
| 0057 | | 0 000 011 000 | LDC0 | LDC0 | | SET DISPLAY TO 0 (OR CLEAR SHIFT DIGIT) |
| 0060 | | 0 010 101 000 | DIGEX1 | CXM | | STORE NEW TFLAG |
| 0061 | | 1 000 101 110 | DIGEX2 | W,BXC | | RESTORE DATA IN C-REG |

TYPEWRITER INTERFACE LISTING (ROM 2)-Continued

```
CURR  BRAN   OPERATION CODE
ADDR  ADDR   BIT PATTERN

0062         1 011 101 110            W.ZTA                CLEAR A-REG
0063         0 000 101 110            W.ZTB                CLEAR B-REG
0064         0 000 010 000  CPAR4     ROM 0                GO TO SUPERVISOR IN ROM 0
0065         0 101 111 110  DIGIT2    S.CMIC               DOES OP LEVEL = 0?
0066  0075   0 011 110 111            BRN      DIGENT2     NO, CONTINUE TEST
0067         0 010 111 110            S.ZMCC               YES, SET OP LEVEL TO 1
0070         0 010 101 000            CXM                  STORE NEW TFLAG
0071         1 110 101 110  STACK     W.AXC                PUT A-REG CONTENTS IN C-REG
0072         0 101 000 100            SSS                  SET DATA ENTRY FLAG
0073         0 100 101 000            CTS                  STORE DATA IN STACK
0074  0061   0 011 000 111            BRN      DIGEX2      RETURN TO SUPERVISOR
0075         0 101 111 110  DIGENT2   S.CMIC               DOES OP LEVEL = 1 ?
0076  0105   0 100 010 111            BRN      DIGENT3     NO, CONTINUE TEST
0077         1 100 101 000  STADIG    DNR                  YES, BRING STACK DOWN TO UPDATE NUMBER
0100         1 110 101 110            W.AXC                NEW DIGIT TO C-REG, OLD DATA TO A-REG
0101         0 100 001 010            X.SLA                SHIFT OLD DATA LEFT TO ACCEPT NEW DIGIT
0102         0 000 001 100            PT0                  SET POINTER FOR UPDATE
0103         0 110 000 010            P.CTA                STORE NEW DIGIT
0104  0071   0 011 100 111            BRN      STACK       STORE RESULT IN STACK AND RETURN TO SUPERVISOR
0105         0 101 111 110  DIGENT3   S.CMIC               DOES OP LEVEL = 2?
0106  0117   0 100 111 111            BRN      DIGENT4     NO, CONTINUE TEST
0107         1 110 101 110  BCODE     W.AXC                YES, LOAD DIGIT IN C-REG
0110         0 101 000 000            IS2                  PREPARE TO BUILD CODE IN T-REG
0111         0 100 001 000            SLT                  SHIFT PREVIOUS CODE
0112         0 100 001 000            SLT                  TO MAKE ROOM FOR
0113         0 100 001 000            SLT                  NEXT OCTAL DIGIT
0114         0 011 001 000            IOR                  LOAD NEW DIGIT IN T-REG
0115         1 001 000 000            IS1                  PREPARE TO LOAD DIGIT IN DISPLAY DATA
0116  0061   0 011 000 111            BRN      DIGEX2      GO TO EXIT ROUTINE
0117         0 101 111 110  DIGENT4   S.CMIC               DOES OP LEVEL = 3 ?
0120  0130   0 101 100 011            BRN      DIGENT5     NO, CONTINUE ROUTINE
0121         0 011 001 100  RND       PT3                  YES, SET POINTER TO LOAD RND DIGIT
0122         0 000 011 000            LDC0                 CLEAR SCIENTIFIC NOTATION FLAG
0123         0 100 001 010            X.SLA                POSITION RND DIGIT FOR STORAGE
0124         0 100 001 010            X.SLA                POSITION RND DIGIT FOR STORAGE
0125         1 110 100 010            P.AXC                LOAD NEW RND DIGIT IN TFLAG
0126         0 011 011 110  SET0      S.ZTC                SET OP LEVEL TO 0
0127  0057   0 011 000 001            JSB      DIGEX1      GO TO EXIT ROUTINE
0130         0 101 111 110  DIGENT5   S.CMIC               DOES OP LEVEL = 4 ?
0131  0313   1 100 101 111            BRN      DIGENT6     NO, CONTINUE TEST
0132         1 001 101 110  SRE       W.AM1                YES, WAS DIGIT ENTERED A ZERO ?
0133  0135   0 101 110 111            BRN      DS1         NO, DO NOT ADJUST DIGIT
0134  0337   1 101 111 111            BRN      DSERR       YES, GO TO ERROR ROUTINE
0135         0 001 001 100  DS1       PT1                  INITIALIZE POINTER FOR DIGIT SHIFT
0136         0 100 001 110  SHIFT     W.SLA                SHIFT DIGIT LEFT
0137         0 000 111 100            PLS                  SHIFT POINTER LEFT
0140         1 100 101 100            YP12                 IS SHIFT COMPLETE ?
0141  0136   0 101 111 011            BRN      SHIFT       NO, CONTINUE TO SHIFT
0142         1 111 101 110            W.AP1A               YES, LOAD EXP. PART OF DATA STORAGE ADDRESS
0143         1 110 101 110            W.AXC                LOAD ADDRESS IN C-REG, FLAG TO A-REG
0144         1 110 011 000            LDC14                FINISH LOADING DATA STORAGE ADDRESS
0145         1 001 110 000            ATDS                 ENABLE SELECTED REGISTER
0146         1 000 101 110            W.BXC                BRING DATA BACK TO C-REG
0147         1 111 111 110            S.AP1A               DOES OP LEVEL = 4 ?
0150  0321   1 101 000 111            BRN      DS2         NO, STORE OR EXCHANGE DATA
0151         1 011 111 000            DSTC                 YES, RECALL DATA FROM DATA STORAGE
0152         1 011 110 000  DS3       DTDS                 LOAD DATA IN DATA STORAGE
0153         1 011 111 110  DS4       S.ZTA                SET OP LEVEL TO 0
0154         1 000 101 110            W.BXC                SAVE DATA IN B-REG
0155         1 110 101 110            W.AXC                RESTORE FLAG IN C-REG
0156  0060   0 011 000 011            BRN      DIGEX1      RESTORE ALL DATA AND RETURN TO SUPERVISOR
0157         1 000 100 100  XNOTES    RSB                  RESET PRINT FLAG
0160         0 111 111 000            TTC                  PREPARE TO SAVE T-REG CONTENTS
0161         0 110 001 110            W.CTA                SAVE IN A-REG
0162         1 101 001 100            PT13                 GENERATE MESSAGE FOR PRINTOUT
0163         1 010 101 000            MTC                  RECALL TFLAG FOR CHANNEL NUMBER
0164         1 111 011 000  BLANK     LDC15                LOAD CODE FOR BLANK
0165         1 001 101 100            YP9                  IS POINTER AT DIGIT 9 ?
0166  0164   0 111 010 011            BRN      BLANK       NO, CONTINUE LOADING BLANKS
0167         0 000 011 100            PRS                  SHIFT POINTER  TO SKIP SELECT CODE
0170         1 111 011 000            LDC15                        X     WHERE X = CURRENT SELECT CODE
0171         1 100 011 000            LDC12
0172         1 111 011 000            LDC15                G M   P N
0173         0 000 011 000            LDC0                 E E   R
0174         1 111 011 000            LDC15                N S   I O
0175         1 011 011 000            LDC11                E S O N
0176         1 111 011 000            LDC15                R A N T T
0177         1 011 011 000            LDC11                A G   E
0200         1 111 011 000            LDC15                T E   R E
0201         0 111 110 000            CTT                  E
0202         1 101 001 100            PT13                         S
0203         0 101 011 000            LDC5                         X     WHERE X = 0 - 4
0204         0 000 110 000            RETURN               RETURN TO CALLING ROUTINE
0205  0263   1 011 010 001  SYNTAX1   JSB      RS89        RESET STATUS BITS
0206  0156   0 110 111 101  SYNTAX    JSB      XNOTES      BEGIN NOTE GENERATION
0207         0 000 011 000            LDC0                 FINISH NOTE
0210  0372   1 111 101 011            BRN      PRINTER     GO TO PRINT ROUTINE
0211         1 000 010 000  OPAR2     ROM 4                GO TO ROM 4 TO CONTINUE TEST
0212         0 000 010 000  CANCEL    ROM 0                GO TO ROM 0 TO PROCESS CANCEL ENTRY
0213         1 011 010 100  FLAG      YS11                 HAS FLAG RETURNED ?
0214  0213   1 000 101 111            BRN      FLAG        NO, CONTINUE TO TEST FLAG
0215         1 011 100 100            RS11                 YES, RESET FLAG STATUS BIT
0216         0 000 110 000            RETURN               RETURN TO PRINTER ROUTINE
0217         0 101 000 000  TEST      IS2                  TEST DATA ACCORDING TO MASK
0220         0 010 001 000            XOR                  PREPARE TEST RESULTS
0221         1 101 001 000            TDEC                 DECREMENT TEST RESULTS
0222         1 110 001 000            YBC                  WAS THERE A CARRY ?
0223         1 110 001 000            YRC                  WAS THERE A CARRY ?
0224         1 100 001 000            TINC                 RESTORE TEST RESULTS
0225         0 010 001 000            XOR                  RESTORE ORGINAL DATA
0226         1 001 000 000            IS1                  PREPARE TO RETURN
0227         0 011 001 110            W.ZTC                CLEAR C-REG
0230         0 000 000 000            NOP                  ELIMINATE CARRY
0231  0317   1 100 111 111            BRN      RETURN      RETURN TO ROM 3 TO CONTINUE STORE ROUTINE
0232  0156   0 110 111 101  LERROR3   JSB      XNOTES      BEGIN NOTE GENERATION
```

TYPEWRITER INTERFACE LISTING (ROM 2) – Continued

```
CURR  BRAN  OPERATION CODE
ADDR  ADDR  BIT PATTERN

0233        0 011 011 000            LDC3                FINISH NOTE
0234  0372  1 111 101 011            BRN      PRINTER    GO TO PRINTER ROUTINE
0235        0 101 000 000  VSPACEF   IS2                 PREPARE TO LOAD LF CODE
0236  0001  0 000 001 001            LIO      004        LOAD LF CODE
0237        1 001 000 000            IS1                 PREPARE TO OUTPUT CODE
0240        1 000 101 110  MP        W,BXC               SAVE DATA IN B-REG
0241        1 010 101 000            MTC                 RECALL TFLAG FOR OP LEVEL TEST
0242        0 101 111 110            S,CMIC              DOES OP LEVEL = 0 ?
0243        0 101 111 110            S,CMIC              DOES OP LEVEL = 1 ?
0244  0205  1 000 010 111            BRN      SYNTAX1    NO, GO TO SYNTAX ERROR ROUTINE
0245        0 011 011 110            S,ZTC               YES, SET OP LEVEL TO 0
0246        0 010 101 000            CXM                 STORE NEW TFLAG
0247        0 101 000 000            IS2                 PREPARE TO LOAD CODE IN OUTPUT POSITION
0250        0 101 101 000            SRI                 LOAD CODE IN OUTPUT POSITION
0251        1 001 000 000            IS1                 PREPARE TO RECALL DATA FROM STACK
0252        0 110 101 000            STA                 BRING DATA DOWN FROM STACK
0253        0 011 001 110            W,ZTC               CLEAR C-REG
0254        0 111 110 000            CTT                 CLEAR T-REG
0255        0 010 001 110            W,BTC               SAVE DATA IN C AND B-REG
0256        0 100 101 000            CTS                 SAVE DATA IN STACK ALSO
0257        1 101 101 110  MP2       W,AM1A              DECREMENT COUNTER, IS OUTPUT FINISHED ?
0260  0272  1 011 101 011            BRN      WAIT       NO, OUTPUT FUNCTION
0261  0262  1 011 001 101            JSB      MP5        YES, EXIT FROM ROUTINE
0262  0061  0 011 000 111            BRN      DIGEX2     EXIT FROM ROUTINE
0263        1 100 101 000  MP5       DNR                 RECALL DATA FROM STACK
0264        1 000 100 100  RS89      RS8                 RESET STATUS BIT 8
0265        1 001 100 100            RS9                 RESET STATUS BIT 9
0266        0 000 110 000            RETURN              RETURN TO CALLING ROUTINE
0267  0217  1 000 111 111            BRN      TEST       GO TO TEST ROUTINE
0270        0 001 011 000  ILLEGAL   LDC1                FINISH NOTE FOR ILLEGAL KEY CODE OR S.A.
0271  0372  1 111 101 011            BRN      PRINTER    PRINT ERROR MESSAGE
0272        0 110 010 000  WAIT      ROM 3               GO TO WAIT ROUTINE IN ROM 3
0273        1 000 101 110  DS5       W,BXC               PREPARE DATA
0274  0153  0 110 101 111            BRN      DS4        CONTINUE ROUTINE
0275        1 001 010 100            YS9                 IS HSPACEF FLAG SET ?
0276  0304  1 100 010 011            BRN      COUNT1     NO, WAIT
0277  0257  1 010 111 111            BRN      MP2        YES, OUTPUT SPACE
0300        0 101 000 000  HSPACEB   IS2                 PREPARE TO LOAD CODE FOR BACKSPACE
0301  0003  0 000 010 001            LIO      010        LOAD CODE FOR BACKSPACE
0302        1 001 000 000            IS1                 PREPARE TO OUTPUT CODE
0303  0240  1 010 000 011            BRN      MP         OUTPUT CODE
0304        0 011 001 010  COUNT1    X,ZTC               CLEAR COUNTER
0305        0 010 001 100            PT2                 SET POINTER TO INITIALIZE COUNTER
0306        0 101 011 000            LDC5                INITIALIZE COUNTER
0307        0 111 101 010  COUNT2    X,CP1C              INCREMENT COUNTER, CARRY?
0310  0307  1 100 011 111            BRN      COUNT2     NO, CONTINUE TO COUNT
0311  0257  1 010 111 111            BRN      MP2        YES, OUTPUT FUNCTION
0312        0 000 000 000            DUMMY
0313        0 101 111 110  DIGENT6   S,CMIC              DOES OP LEVEL = 5 ?
0314  0357  1 110 111 111            BRN      DIGENT7    NO, CONTINUE TEST
0315        0 111 111 110            S,CP1C              YES, RESTORE OP LEVEL FOR LATER TEST
0316  0131  0 101 101 001            JSB      SRE        GO TO DATA STORAGE STORE/RECALL/EXCHANGE ROUTINE
0317        0 110 010 000  RETURN    ROM 3               RETURN TO ROM 3
0320  0346  1 110 011 011            BRN      TAB        CONTINUE ROUTINE
0321        1 010 010 100  DS2       YS10                IS EXCHANGE FLAG SET ?
0322  0152  0 110 101 011            BRN      DS3        NO, GO TO STORE ROUTINE
0323        1 010 100 100            RS10                YES, RESET FLAG
0324        1 000 101 110            W,BXC               SAVE DATA IN B-REG
0325        1 011 111 000            DSTC                RECALL DATA FROM DATA STORAGE
0326        1 000 101 110            W,BXC               EXCHANGE DATA
0327        1 011 110 000            DTDS                STORE OLD DATA IN DATA STORAGE
0330  0273  1 011 101 111            BRN      DS5        CONTINUE ROUTINE
0331        1 101 001 100  DECPT4    PT13                SET POINTER FOR OP LEVEL UPDATE
0332        0 011 011 000            LDC3                SET OP LEVEL TO 3
0333  0060  0 011 000 011            BRN      DIGEX1     RETURN TO SUPERVISOR
0334        0 101 100 100  RESET     RS5                 RESET DID DATA FIT FLAG
0335        0 110 100 100            RS6                 RESET SCIENTIFIC NOTATION FLAG
0336  0367  1 111 011 111            BRN      RESETD     CONTINUE ROUTINE
0337  0156  0 110 111 101  DSERR     JSB      XNOTE5     BEGIN NOTE GENERATION
0340        0 010 011 000            LDC2                FINISH NOTE
0341  0372  1 111 101 011            BRN      PRINTER    PRINTER ERROR MESSAGE
0342        0 101 000 000  HSPACEF   IS2                 PREPARE TO LOAD CODE FOR SPACE
0343  0000  0 000 000 011            LIO      001        LOAD CODE FOR SPACE
0344        1 001 000 000            IS1                 PREPARE TO OUTPUT CODE
0345  0240  1 010 000 011            BRN      MP         OUTPUT CODE
0346        0 101 000 000  TAB       IS2                 PREPARE TO LOAD CODE FOR TAB
0347  0037  0 010 000 001            LIO      100        LOAD CODE FOR TAB
0350        1 001 000 000            IS1                 PREPARE TO OUTPUT CODE
0351  0240  1 010 000 011            BRN      MP         OUTPUT CODE
0352        0 101 111 110  CPAR5     S,CMIC              DOES OP LEVEL=0?
0353        0 101 111 110  CPAR2     S,CMIC              DOES OP LEVEL = 1?
0354        0 101 111 110            S,CMIC              DOES OP LEVEL = 2?
0355  0362  1 111 001 011            BRN      CPAR6      NO, CONTINUE TEST
0356  0126  0 101 011 011            BRN      SET0       YES, SET OP LEVEL TO 0
0357        0 101 111 110  DIGENT7   S,CMIC              DOES OP LEVEL=6?
0360  0077  0 011 111 111            BRN      STADIG     NO, BUILD NUMBER IN STACK
0361  0107  0 100 011 111            BRN      BCODE      YES, BUILD OCTAL CODE IN T-REG
0362        1 000 010 000  CPAR6     ROM 4               GO TO ROM 4 TO CONTINUE TEST
0363  0262  1 011 001 101            JSB      MP5        RECALL DATA AND RESET STATUS BITS
0364  0334  1 101 110 011            BRN      RESET      CONTINUE ROUTINE
0365  0156  0 110 111 101  ILL       JSB      XNOTE5     BEGIN NOTE GENERATION
0366  0270  1 011 100 011            BRN      ILLEGAL    FINISH NOTE GENERATION
0367        1 000 101 110  RESETD    W,BXC               SAVE DATA IN B-REG
0370  0156  0 110 111 101  FAILURE   JSB      XNOTE5     BEGIN NOTE GENERATION
0371        0 100 011 000            LDC4                FINISH NOTE
0372        1 111 011 000  PRINTER   LDC15               BEGIN PRINTER ROUTINE
0373        1 111 011 000            LDC15               FINISH NOTE GENERATION
0374        1 111 001 100            PT15                SET POINTER FOR PRINTER OPERATION
0375        0 101 110 000            PRE                 ENABLE PRINTER
0376  0212  1 000 101 101  FLG1      JSB      FLAG       TEST IF PRINTER FLAG HAS RETURNED
0377        1 111 110 000            CCS                 COMPARE C-REG
```

TYPEWRITER INTERFACE LISTING (ROM 3)

```
CURR  BRAN  OPERATION CODE
ADDR  ADDR  BIT PATTERN

0000        0 101 000 000             IS2                 PREPARE TO TEST FOR EOL
0001  0037  0 010 000 001             LIO      100        LOAD SELECT CODE FOR EOL TEST
0002        1 100 100 000             TG9                 TEST FOR EOL
0003        1 001 000 000             IS1                 PREPARE TO TEST RESULT
0004        1 011 010 100             YS11                WAS IT EOL ?
0005  0363  1 111 001 111             BRN      TCA1       YES, OUTPUT TAB CLEAR ALL CODE
0006        1 011 100 100             RS11                NO, RESET STATUS BIT
0007  0376  1 111 111 011             BRN      TCASPA     CONTINUE TO SPACE
0010        1 010 101 000  FTS        MTC                 FIELD IS TOO SMALL, RECALL FIELD WIDTH
0011        0 101 110 010  FTS1       WP,CM1C             DECREMENT SPACES, IS FIELD = 0 YET ?
0012  0370  1 111 100 011             BRN      FTS2       NO, CONTINUE TO OUTPUT "$"
0013  0353  1 110 101 111             BRN'     PREXIT     YES, GO TO EXIT ROUTINE
0014        1 000 101 110  OCTFLG3    W,BXC               RESTORE DATA
0015        0 000 010 000  1CPAR      ROM 0               GO TO ROM 0 TO ENTER CPAR ROUTINE
0016        0 000 011 100  PTADJ2     PRS                 ADJUST POINTER
0017  0334  1 101 110 011             BRN      PTADJ1     CHECK IF ADJUSTMENT IS COMPLETE
0020  0265  1 011 011 001             JSB      TEST       IS THIS CODE " 377 " ?
0021        1 011 010 100             YS11                WAS CODE " 377 " ?
0022  0014  0 000 110 011             BRN      OCTFLG3    YES, GO TO CPAR ROUTINE
0023        1 011 100 100             RS11                NO, RESET STATUS BIT FOR NEXT TEST
0024  0117  0 100 111 111             BRN      LFTESTP    GO TO LINE FEED TEST
0025        0 000 000 000             DUMMY
0026        0 000 010 000  EXEC       ROM 0               EXECUTE NEXT INSTRUCTION
0027        0 011 001 110  FLGEXC1    W,ZTC               CLEAR C-REG FOR ADDRESS
0030        0 111 101 110             W,CP1C              LOAD EXPONENT ADDRESS
0031        1 100 001 100             PT12                SET POINTER FOR MANTISSA ADDRESS
0032        1 110 011 000             LDC14               LOAD MANTISSA PART OF ADDRESS
0033        1 001 110 000             ATDS                SELECT CHIP 14B, REGISTER 0
0034        1 100 001 100             PT12                START FLAG EXCHANGE, SELECT UPDATE DIGIT
0035        1 011 111 000             DSTC                CALL D.S. REG TO C-REG
0036        0 110 001 110             W,CTA               STORE FLAG IN A-REG FOR UPDATE
0037        1 010 101 000             MTC                 RECALL FLAG TO C-REG
0040        0 110 000 010             P,CTA               LOAD OP MODE IN NEW FLAG
0041  0152  0 110 101 011             BRN      FLGEXC2    CONTINUE ROUTINE
0042  0027  0 001 011 111             BRN      FLGEXC1    CONTINUE
0043  0256  1 010 111 101  SETCNTL    JSB      IXT        LOAD I/O REG
0044  0232  1 001 101 101  SETCNTL1   JSB      WAIT       WAIT FOR FLAG AND OUTPUT DATA
0045        0 101 000 000             IS2                 PREPARE TO OUTPUT NOP
0046  7777  0 000 000 001             LIO      000        LOAD NOP CODE
0047        0 101 101 000             SRI                 SHIFT NOP TO OUTPUT POSITION
0050        1 001 000 000             IS1                 PREPARE TO WAIT FOR FLAG
0051  0232  1 001 101 101             JSB      WAIT       WAIT FOR FLAG AND OUTPUT NOP
0052  0355  1 110 110 111             BRN      RETURN     PREPARE TO RETURN TO SUPERVISOR
0053  0254  1 010 110 101  DATAOUT9   JSB      LOADIGIT   LOAD DIGIT IN I/O-REG
0054  0232  1 001 101 101             JSB      WAIT       WAIT FOR FLAG THEN OUTPUT DATA
0055        1 101 111 110             S,AM1A              RESTORE ORIGINAL DIGIT IN MASK
0056        1 001 111 110             S,AM1               IS DECIMAL POINT NEXT?
0057  0344  1 110 010 011             BRN      DPOUT1     YES, GO TO DPOUT ROUTINE
0060        1 100 101 100  DATAOUT2   YP12                NO, WAS THIS THE LAST DIGIT ?
0061  0176  0 111 111 011             BRN      SHIFT      NO, EXAMINE NEXT DIGIT
0062        0 101 010 100             YS5                 YES, DID DATA FIT?
0063  0206  1 000 011 011             BRN      DATAOUT3   YES, TEST FOR OUTPUT MODE (FIXED OR FLOATING POINT)
0064        1 011 101 110             W,ZTA               NO, CLEAR A-REG
0065        0 000 101 110             W,ZTB               CLEAR B-REG
0066        1 100 101 000             DNR                 RECALL DATA FROM STACK
0067        0 100 101 000             CTS                 RESTORE DATA IN STACK
0070        1 110 101 110             W,AXC               DATA TO C-REG
0071        0 000 001 100             PT0                 PREPARE TO LOAD CONSTANT
0072        1 001 011 000             LDC9                LOAD 9
0073        1 101 001 010             X,AMCA              SUBTRACT 9 FROM EXPONENT
0074        1 011 110 110             MS,ZTA              REMAINING PART OF DATA WILL BE ALL ZEROES
0075        1 101 101 010  DATAOUT4   X,AM1A              DECREMENT EXPONENT, IS EXP. = 0 ?
0076  0275  1 011 110 111             BRN      ZOUT       NO, PREPARE TO OUTPUT ZEROES
0077  0346  1 110 011 011             BRN      DPOUT2     YES, GO TO DECIMAL POINT OUTPUT ROUTINE
0100        0 000 010 000  FLGEXC3    ROM 0               RETURN TO CALLING ROUTINE IN ROM 0
0101        0 101 000 000  SPACE      IS2                 GENERATE CODE FOR SPACE
0102  0000  0 000 000 011             LIO      001        LOAD CODE FOR "SPACE"
0103        0 101 101 000             SRI                 SHIFT CODE TO OUTPUT POSITION
0104        1 001 000 000             IS1                 PREPARE TO CHECK IF OUTPUT IS COMPLETE
0105        0 000 110 000             RETURN              RETURN TO CALLING ROUTINE
0106        1 001 010 100  DSROUT     YS9                 NORMAL RETURN?
0107  0160  0 111 000 011             BRN      EX         YES, GO TO EXIT
0110        0 011 001 110             W,ZTC               CLEAR C-REG
0111        0 111 110 000             CTT                 CLEAR T-REG
0112        1 000 010 000             ROM 4               NO, GO TO ROM 4 TO CONTINUE ROUTINE
0113        1 011 101 110  (PRT)      W,ZTA               CLEAR A-REG
0114        1 100 101 000             DNR                 RECALL DATA FROM STACK
0115        1 000 000 100             SS8                 SET PRINT KEY HIT FLAG
0116        0 010 010 000             ROM 1               GO TO ROM 1 DISPLAY ROUTINE
0117        1 000 101 110  LFTESTP    W,BXC               PREPARE TO STORE DATA IN STACK
0120        0 100 101 000             CTS                 STORE DATA IN STACK
0121        0 011 001 110             W,ZTC               CLEAR C-REG FOR TESTS
0122        1 100 001 100  LFTEST     PT12                PREPARE POINTER FOR LINE FEED MASK
0123        0 100 011 000             LDC4                LOAD LINE FEED TEST MASK
0124  0265  1 011 011 001             JSB      TEST       TEST CODE FOR LINE FEED
0125        1 011 010 100             YS11                WAS THERE A CARRY DURING TEST ?
0126  0043  0 010 001 111             BRN      SETCNTL    NO,CODE IS LINE FEED
0127        1 011 100 100             RS11                YES, CODE IS NOT LINE FEED
0130        1 101 001 100  TCATEST    PT13                SET POINTER TO LOAD TCA TEST
0131        1 000 011 000             LDC8                LOAD TAB
0132        0 000 000 000             NOP                 DELAY FOR LDC
0133        0 010 011 000  TCATEST1   LDC2                MASK
0134  0265  1 011 011 001             JSB      TEST       TEST CODE TO SEE IF IT IS TAB CLEAR ALL
0135        1 011 010 100             YS11                WAS THERE A CARRY DURING TEST ?
0136  0376  1 111 111 011             BRN      TCASPA     NO, CODE IS TAB CLEAR ALL, OUTPUT SPACE, CHECK EOL
0137        1 011 100 100             RS11                YES, CODE IS NOT TAB CLEAR ALL
0140        0 111 111 110  PRTEST     S,CP1C              LOAD CODE FOR PRINT TEST
0141  0265  1 011 011 001             JSB      TEST       TEST CODE FOR PRINT
0142        1 011 010 100             YS11                WAS THERE A CARRY DURING TEST ?
0143  0113  0 100 101 111             BPN      (PRT)      NO, CODE IS PRINT
0144        1 011 100 100             RS11                YES, CODE IS NOT PRINT
0145        0 101 000 000  LCIO1      IS2                 PREPARE TO LOAD CODE IN I/O-REG
0146        0 100 101 000             IXT                 LOAD CODE IN I/O-REG
0147        1 001 000 000             IS1                 PREPARE TO OUTPUT CODE
0150  0232  1 001 101 101  LCIO2      JSB      WAIT       WAIT FOR FLAG AND OUTPUT DATA
0151  0355  1 110 110 111             BRN      RETURN     PREPARE TO RETURN TO SUPERVISOR
0152        1 011 110 000  FLGEXC2    DTDS                STORE OLD FLAG IN D.S.
0153        0 011 001 110             W,ZTC               CLEAR C-REG
0154        1 110 101 110             W,AXC               NEW FLAG TO C-REG
0155        0 010 101 000             CXM                 STORE NEW FLAG IN M-REG
```

TYPEWRITER INTERFACE LISTING (ROM 3) – Continued

```
CURR  BRAN   OPERATION CODE
ADDR  ADDR   BIT PATTERN

0156  0100  0 100 000 011            BRN       FLGEXC3    RETURN TO CALLING ROUTINE IN ROM 0
0157        0 000 000 000            DUMMY
0160        1 000 100 100  EX        RSB                  YES, RESET PRINT KEY FLAG
0161        0 000 010 000  CANCEL    ROM 0                PREPARE TO GO TO CANCFL FNTRY ROUTINE
0162  0302  1 100 001 101  MINUS     JSB       MINUS1     GENERATE CODE FOR MINUS SIGN
0163  0232  1 001 101 101            JSB       WAIT       WAIT FOR FLAG THEN OUTPUT MINUS SIGN
0164  0171  0 111 100 111            BRN       DATAOUT1   BEGIN OUTPUTING DATA
0165        0 101 110 010  SPOUT     WP,CMIC              DECREMENT SPACES, READY TO OUTPUT DATA?
0166  0263  1 011 001 111            BRN       SPOUT1     NO, CONTINUE TO OUTPUT
0167        1 001 111 110  DATAOUT   S,AMI                YES, BEGIN DATA OUTPUT ROUTINE, IS NUM. POS. ?
0170  0162  0 111 001 011            BRN       MINUS      NO, GO TO ROUTINE TO OUTPUT MINUS SIGN
0171        0 011 001 100  DATAOUT1  PT3                  YES, SET POINTER
0172        0 011 011 110  SET9      S,ZTC                CLEAR SIGN DIGIT
0173        0 101 111 110            S,CMIC               SET SIGN DIGIT TO 9
0174        1 100 101 110            W,AXB                STORE DATA IN B-REG, MASK TO A-REG
0175  0202  1 000 001 011            BRN       SHIFT1     SHIFT MASK ONCE TO THE LEFT
0176        0 000 111 100  SHIFT     PLS                  SHIFT POINTER ONCE TO THE LEFT
0177        1 100 101 110            W,AXB                PREPARE TO SHIFT DATA
0200        0 100 001 110            W,SLA                SHIFT DATA ONCE TO THE LEFT
0201        1 100 101 110            W,AXB                RESTORE DATA
0202        0 100 001 110  SHIFT1    W,SLA                SHIFT MASK ONCE TO THE LEFT
0203        1 111 111 110            S,AP1A               IS THIS DIGIT BLANKED?
0204  0053  0 010 101 111            BRN       DATAOUT9   NO, OUTPUT THIS DIGIT
0205  0176  0 111 111 011            BRN       SHIFT      YES, SHIFT DATA AND EXAMINE NEXT DIGIT
0206        0 110 010 100  DATAOUT3  YS6                  WAS SCIENTIFIC NOTATION SPECIFIED?
0207  0353  1 110 101 111            BRN       PREXIT     NO, GO TO EXIT ROUTINE
0210        1 100 101 000            DNR                  YES, RECALL DATA FROM STACK
0211        0 100 101 000            CTS                  RESTORE DATA IN STACK
0212        0 101 000 000            IS2                  PREPARE TO OUTPUT E
0213  0062  0 011 001 011            LIO       145        LOAD CODE FOR "E"
0214        0 101 101 000            SRI                  SHIFT CODE TO OUTPUT POSITION
0215        1 001 000 000            IS1                  PREPARE TO OUTPUT CODE
0216  0232  1 001 101 101            JSB       WAIT       WAIT FOR FLAG AND OUTPUT E
0217        0 001 111 010            XS,CMI               IS EXPONENT POSITIVE?
0220  0271  1 011 100 111            BRN       MINUS2     NO, PREPARE TO OUTPUT MINUS SIGN
0221  0100  0 100 000 101            JSB       SPACE      YES, GENERATE CODE FOR SPACE
0222  0232  1 001 101 101  EXP       JSB       WAIT       WAIT FOR FLAG THEN OUTPUT "SPACE" OR MINUS SIGN
0223        1 100 101 110  EXP1      W,AXB                PREPARE TO SHIFT DATA
0224        0 100 001 110            W,SLA                SHIFT DATA
0225        0 100 001 110            W,SLA                SHIFT DATA
0226        0 110 100 100            RS6                  RESET SCIENTIFIC NOTATION FLAG
0227        1 011 001 100            PT11                 SET POINTER
0230  0172  0 111 101 011            BRN       SET9       OUTPUT EXPONENT
0231        0 000 000 000            DUMMY
0232        0 000 000 000            DUMMY
0233        0 111 110 000  WAIT      CTT                  SAVE CONTENTS OF C-REG IN T-REG
0234        0 011 001 010            X,ZTC                INITIALIZE COUNTER
0235        0 101 000 000  TESTFLG   IS2                  PREPARE TO TEST FLAG
0236        0 000 100 000            YINTF                INTERROGATE FLAG STATUS BIT
0237        1 001 000 000            IS1                  PREPARE TO  CHECK FLAG STATUS
0240        1 011 010 100            YS11                 IS PERIPHERAL READY ?
0241  0246  1 010 011 011            BRN       OUTPUT     YES, OUTPUT DATA
0242        1 011 100 100            RS11                 NO, RESET STATUS BIT AND CHECK FLAG AGAIN
0243        0 111 101 010            X,CP1C               INCREMENT COUNTER, WAS THERE A CARRY ?
0244  0235  1 001 110 111            BRN       TESTFLG    NO, TEST FLAG AGAIN
0245  0361  1 111 000 111            BRN       FAILURE    YES, GO TO FAILURE ROUTINE
0246        0 111 111 000  OUTPUT    TTC                  RECALL DATA TO C-REG
0247        1 010 100 000            SBL                  SET BUSY LIGHT
0250        0 101 000 000            IS2                  PREPARE TO OUTPUT DATA
0251  0017  0 001 000 001            LIO       040        LOAD I/O SELECT CODE
0252        0 110 100 000            GTOE                 OUTPUT DATA
0253        1 001 000 000            IS1                  PREPARE TO RETURN TO CALLING ROUTINE
0254        0 000 110 000            RETURN               RETURN TO CALLING ROUTINE
0255        0 010 000 110  LOADIGIT  M,BTC                LOAD DIGIT IN C-REG
0256        0 111 110 000            CTT                  LOAD DIGIT IN T-REG
0257        0 101 000 000  IXT       IS2                  PREPARE TO LOAD I/O-REG
0260        0 100 101 000            IXT                  LOAD DIGIT IN I/O-REG
0261        1 001 000 000            IS1                  PREPARE TO RETURN
0262        0 000 110 000            RETURN               RETURN TO CALLING ROUTINE
0263  0100  0 100 000 101  SPOUT1    JSB       SPACE      GENERATE CODE FOR SPACE
0264  0232  1 001 101 101            JSB       WAIT       WAIT FOR FLAG THEN OUTPUT SPACE
0265  0165  0 111 010 111            BRN       SPOUT      TEST IF OUTPUT IS COMPLETE
0266        0 100 010 000  TEST      ROM 2                GO TO ROM 2 TO TEST OCTAL DATA
0267  0265  1 011 011 001            JSB       TEST       TEST FOR 377
0270        1 010 010 000            ROM 5                RETURN TO ROM 5
0271  0302  1 100 001 101  MINUS2    JSB       MINUS1     LOAD CODE FOR MINUS SIGN IN I/O-REG
0272  0222  1 001 001 011            BRN       EXP        WAIT FOR FLAG
0273  0232  1 001 101 101            JSB       WAIT       OUTPUT FUNCTION/NOP
0274        0 100 010 000            ROM 2                RETURN TO ROM 2
0275        0 101 000 000  ZOUT      IS2                  PREPARE TO OUTPUT ZEROES
0276  0107  0 100 100 001            LIO       220        LOAD "0" CODE
0277        0 101 101 000            SRI                  SHIFT CODE TO OUTPUT POSITION
0300        1 001 000 000            IS1                  PREPARE TO OUTPUT 0
0301  0232  1 001 101 101            JSB       WAIT       WAIT FOR FLAG THEN OUTPUT ZERO
0302  0075  0 011 110 111            BRN       DATAOUT4   GO TEST IF OUTPUT IS COMPLETE
0303        0 101 000 000  MINUS1    IS2                  PREPARE TO OUTPUT MINUS SIGN
0304  0116  0 100 111 011            LIO       235        LOAD MINUS SIGN CODE
0305        0 101 101 000            SRI                  SHIFT CODE TO OUTPUT POSITION
0306        1 001 000 000            IS1                  PREPARE TO RETURN
0307        0 000 110 000            RETURN               RETURN TO CALLING ROUTINE
0310        1 101 001 100  PMS6      PT13                 SET POINTER TO FINISH MASK
0311        1 111 011 000            LDC15                FINISH MASK
0312  0256  1 010 111 101            JSB       IXT        LOAD I/O-REG
0313  0265  1 011 011 001            JSB       TEST       TEST FOR 377
0314        1 011 010 100            YS11                 WAS CODE 377?
0315  0014  0 000 110 011            BRN       OCTFLG3    YES, GO TO CPAR ROUTINE
0316        1 011 100 100            RS11                 NO, RESET STATUS BIT
0317        1 000 010 000            ROM 4                GO TO ROM 4
0320        0 000 110 000            RETURN               RETURN TO CALLING ROUTINE
0321        1 101 111 110            S,AM1A               DOES OP LEVEL=3?
0322        1 101 111 110            S,AM1A               DOES OP LEVEL=4?
0323        1 101 111 110            S,AM1A               DOES OP LEVEL=5?
0324        1 101 111 110            S,AM1A               DOES OP LEVEL=6?
0325  0026  0 001 011 011            BRN       EXEC       NO, EXECUTE NEXT INSTRUCTION
0326        0 010 101 000            CXM                  YES, RESTORE FLAG AND DATA
0327        1 000 101 110            W,BXC                SAVE DATA IN B-REG
0330        1 111 011 000            LDC15                LOAD LAST HALF OF MASK
0331  0310  1 100 100 011            BRN       PMS6       CONTINUE ROUTINE
0332        1 101 001 100  OPOUT3    PT13                 SET POINTER FOR FACIT CODE
0333        1 001 011 000            LDC9                 LOAD FACIT DIGIT CODE (POINTER SET FOR PTADJ)
0334        0 101 111 010  PTADJ1    XS,CMIC              DECREMENT RND, IS RND = 0?
0335  0016  0 000 111 011            BRN       PTADJ2     NO, GO TO POINTER ADJUSTMENT
```

TYPEWRITER INTERFACE LISTING (ROM 3) – Continued

```
CURR  BRAN   OPERATION CODE
ADDR  ADDR   BIT PATTERN

0336         0 101 000 000  DPOUT4    IS2                  YES. PREPARE TO OUTPUT DECIMAL POINT
0337  0016   0 000 111 101            LIO       036        LOAD CODE FOR DECIMAL POINT
0340         0 101 101 000            SRI                  SHIFT DATA TO OUTPUT POSITION
0341         1 001 000 000            IS1                  PREPARE TO OUTPUT DECIMAL POINT
0342  0232   1 001 101 101            JSB       WAIT       WAIT FOR FLAG THEN OUTPUT
0343  0060   0 011 000 011            BRN       DATAOUT2   CONTINUE ROUTINE
0344         0 101 010 100  DPOUT1    YS5                  DID DATA FIT?
0345  0336   1 101 111 011            BRN       DPOUT4     YES. OUTPUT DECIMAL POINT AND RETURN
0346         0 101 100 100  DPOUT2    RS5                  NO. RESET DID DATA FIT FLAG
0347         0 110 100 100            RS6                  RESET SCIENTIFIC NOTATION FLAG
0350         1 010 101 000            MTC                  RECALL TFLAG FOR RND DATA
0351         0 001 111 010            XS.CM1               IS ROUND EQUAL TO 0 ?
0352  0332   1 101 101 011            BRN       DPOUT3     NO. PREPARE TO OUTPUT DECIMAL POINT
0353         0 101 100 100  PREXIT    RS5                  YES. RESET DID DATA FIT FLAG
0354         1 110 010 000            ROM 7                GO TO ROM 7 TO CHECK FOR TAB
0355         1 011 101 110  RETURN    W.ZTA                CLEAR A-REG
0356         1 100 101 000            DNR                  RESTORE STACK
0357         1 000 101 110            W.BXC                SAVE DATA IN B-REG
0360  0106   0 100 011 011            BRN       DSROUT     CHECK FOR NORMAL RETURN
0361         0 111 111 000  FAILURE   TTC                  RECALL DATA TO C-REG
0362         0 100 010 000  FAILURE1  ROM 2                GO TO ROM 2 TO PROCESS FAILURE ( EOL )
0363         0 101 000 000  TCA1      IS2                  PREPARE TO RELOAD TCA CODE
0364  0100   0 100 000 101            LIO       202        RELOAD TCA CODE
0365         0 101 101 000            SRI                  SHIFT CODE TO OUTPUT POSITION
0366         1 001 000 000            IS1                  PREPARE TO OUTPUT CODE
0367  0044   0 010 010 011            BRN       SETCNTL1   GO TO OUTPUT ROUTINE
0370         0 101 000 000  FTS2      IS2                  CONTINUE TO OUTPUT "$"
0371  0051   0 010 101 001            LIO       124        LOAD CODE FOR "$"
0372         0 101 101 000            SRI                  SHIFT CODE TO OUTPUT POSITION
0373         1 001 000 000            IS1                  PREPARE TO CHECK IF OUTPUT IS COMPLETED
0374  0232   1 001 101 101            JSB       WAIT       WAIT FOR FLAG THEN OUTPUT "$"
0375  0011   0 000 100 111            BRN       FTS1       TEST IF OUTPUT IS COMPLETED.
0376  0100   0 100 000 101  TCASPA    JSB       SPACE      GENERATE CODE FOR SPACE
0377  0232   1 001 101 101            JSB       WAIT       OUTPUT SPACE
```

TYPEWRITER INTERFACE LISTING (ROM 4)

```
CURR  BRAN   OPERATION CODE
ADDR  ADDR   BIT PATTERN

0000         0 000 000 000            DUMMY
0001         0 000 000 000            DUMMY
0002         0 000 000 000            DUMMY
0003         0 000 000 000            DUMMY
0004         0 000 000 000            DUMMY
0005         0 000 000 000            DUMMY
0006         0 000 000 000            DUMMY
0007         0 000 000 000            DUMMY
0010         0 000 000 000            DUMMY
0011         1 111 101 010  INCREG2   X.AP1A               INCREMENT REG
0012  0064   0 011 010 011            BRN       AGAIN      DO IT ALL AGAIN
0013  0254   1 010 110 101  DIV       JSB .     OPLEV=1?   DOES OP LEVEL = 1 ? (RECALL STACK)
0014  0023   0 001 001 111            BRN       SAVE       CONTINUE ROUTINE
0015         1 010 101 000  ALPHA1    MTC                  RECALL TFLAG FOR SHIFT DIGIT
0016         1 011 001 100            PT11                 SET POINTER TO SHIFT DIGIT
0017         0 110 011 000            LDC6                 LOAD SHIFT DIGIT
0020  0374   1 111 110 011            BRN       ALPHA2     CONTINUE ROUTINE
0021  0254   1 010 110 101  EQUAL     JSB       OPLEV=1?   DOES OP LEVEL = 1 ? (RECALL STACK)
0022         1 111 111 110            S.AP1A               SET TYPEWRITER REG INDICATOR
0023  0274   1 011 110 101  SAVE      JSB       ADTEST     TEST ADDRESS
0024  0106   0 100 011 101            JSB       STOAID     SAVE ADDRESS IN D-REG
0025         0 011 001 110            W.ZTC                CLEAR C-REG
0026         0 100 101 000            CTS                  SAVE CLEARED REG IN STACK
0027         1 010 101 000            MTC                  RECALL TFLAG FOR UPDATE
0030         1 101 001 100            PT13                 SET POINTER FOR OP LEVEL OPDATE
0031         0 111 011 000            LDC7                 SET OP LEVEL TO 7
0032  0057   0 010 111 111            BRN       DIGEX1     RETURN TO SUPERVISOR
0033         1 010 101 000  NCHAR.    MTC                  RECALL TFLAG
0034         1 011 001 100            PT11                 SET POINTER TO SHIFT DIGIT
0035         0 101 100 010            P.CM1C               WAS THIS THE LAST CHARACTER ?
0036  0374   1 111 110 011            BRN       ALPHA2     NO. CONTINUE IN SAME REG
0037  0266   1 011 011 011            BRN       INCREG1    YES. TEST FOR NEXT REG
0040         0 000 000 000            DUMMY
0041  0341   1 110 001 001  RECALLO   JSB       OPLEV=7?   DOES OP LEVEL=7?
0042         1 100 101 000            DNR                  YES. RECALL RELATIVE ADDRESS
0043         0 111 110 000            CTT                  SAVE RELATIVE ADDRESS IN T-REG
0044         0 110 101 000            STA                  RECALL ADDRESS TO A-REG
0045         1 111 001 010            X.APCA               ADD RELATIVE & ABSOLUTE ADDRESS
0046  0274   1 011 110 101            JSB       ADTEST     CAN REGISTER BE CALLED ?
0047         0 111 111 000            TTC                  YES. RECALL RELATIVE ADDRESS
0050         1 101 001 010            X.AMCA               RESTORE STARTING REG ADDRESS
0051         1 110 101 110            W.AXC                EXCHANGE REL/ABS ADDRESS
0052         0 100 001 110            W.SLA                SHIFT RELATIVE
0053         0 100 001 110            W.SLA                ADDRESS TO MANTISSA
0054         0 100 001 110            W.SLA                PORTION OF REG.
0055         1 111 001 110  RECALLE   W.APCA               LOAD SHIFTED RELATIVE ADDRESS
0056  0063   0 011 010 001            JSB       AGAIN      CONTINUE ROUTINE
0057         0 010 101 000  DIGEX1    CXM                  STORE NEW T FLAG
0060         0 100 010 000  DIGEX2    ROM 2                GO TO SUPERVISOR
0061         0 001 101 010  TYPE      X.CM1                IS REG 0 CALLED?
0062  0166   0 111 011 011            BRN       NOT0       NO. CONTINUE TEST
0063  0333   1 101 101 111            BRN       DSFRR      YES. GO TO ERROR ROUTINE
0064  0106   0 100 011 101  AGAIN     JSB       STOAID     STORE COMPACTED ADDRESS IN STACK
0065  0274   1 011 110 101            JSB       ADTEST     ENABLE REG
0066         1 001 000 100            SS9                  SET RETURN FLAG
0067         1 010 101 000            MTC                  RECALL TFLAG
0070         0 011 011 110            S.ZTC                SET OP LEVEL TO 0
0071         0 010 101 000            CXM                  STORE NEW FLAG
0072         1 011 111 000            DSTC                 RECALL CONTENTS OF D.S. TO C-REG
0073         1 000 010 100            YS8                  ALPHA OR NUMERIC?
0074  0015   0 000 110 111            BRN       ALPHA1     ALPHA. GO TO ALPHA ROUTINE
0075         0 000 010 000  PRT       ROM 0                NUMERIC. GO TO PRINT ROUTINE
0076         1 000 001 100  SLEFT     PT8                  SET POINTER FOR SHIFT
```

TYPEWRITER INTERFACE LISTING (ROM 4) - Continued

| CURR ADDR | BRAN ADDR | OPERATION CODE BIT PATTERN | | | | |
|---|---|---|---|---|---|---|
| 0077 | | 0 101 000 000 | CONT | IS2 | | PREPARE TO SHIFT |
| 0100 | | 0 100 001 000 | | SLT | | SHIFT LEFT ONE BIT |
| 0101 | | 1 001 000 000 | | IS1 | | PREPARE TO SHIFT POINTER |
| 0102 | | 0 000 011 100 | | PRS | | SHIFT POINTER |
| 0103 | | 0 000 101 100 | | YP0 | | IS SHIFT COMPLETE? |
| 0104 | 0077 | 0 011 111 111 | | BRN | CONT | NO, CONTINUE SHIFT |
| 0105 | | 0 000 110 000 | | RETURN | | YES, RETURN TO CALLING ROUTINE |
| 0106 | | 0 110 101 000 | RCLDTA | STA | | RECALL CONTENTS OF D-REG TO A-REG |
| 0107 | | 1 110 101 110 | STOAID | W,AXC | | PREPARE TO STORE CONTENTS OF A-REG IN STACK |
| 0110 | | 0 100 101 000 | | CTS | | STORE IN STACK |
| 0111 | | 1 110 101 110 | | W,AXC | | RESTORE REGISTERS |
| 0112 | | 0 000 110 000 | | RETURN | | RETURN TO CALLING ROUTINE |
| 0113 | 0264 | 1 011 010 011 | OUTD | BRN | TESTPA | RETURN FROM PRINT/ALPHA , OUTPUT MORE ? |
| 0114 | | 0 000 000 000 | | DUMMY | | |
| 0115 | | 0 010 010 000 | ALPHA9 | ROM 1 | | GO OUTPUT CHARACTER |
| 0116 | | 0 000 000 000 | | DUMMY | | |
| 0117 | | 0 000 000 000 | | DUMMY | | |
| 0120 | | 0 000 000 000 | | DUMMY | | |
| 0121 | | 0 000 000 000 | | DUMMY | | |
| 0122 | | 0 000 000 000 | | DUMMY | | |
| 0123 | | 0 000 000 000 | | DUMMY | | |
| 0124 | | 0 000 000 000 | | DUMMY | | |
| 0125 | | 0 000 000 000 | | DUMMY | | |
| 0126 | | 0 000 000 000 | | DUMMY | | |
| 0127 | | 0 000 000 000 | | DUMMY | | |
| 0130 | | 0 000 000 000 | | DUMMY | | |
| 0131 | | 0 000 000 000 | | DUMMY | | |
| 0132 | | 0 000 000 000 | | DUMMY | | |
| 0133 | | 0 000 000 000 | | DUMMY | | |
| 0134 | | 0 000 000 000 | | DUMMY | | |
| 0135 | | 0 000 000 000 | | DUMMY | | |
| 0136 | | 0 000 000 000 | | DUMMY | | |
| 0137 | | 0 000 000 000 | | DUMMY | | |
| 0140 | | 0 000 000 000 | | DUMMY | | |
| 0141 | | 0 000 000 000 | | DUMMY | | |
| 0142 | | 0 111 110 000 | ALPHA3 | CTT | | LOAD IN T-REG |
| 0143 | | 1 100 001 100 | | PT12 | | INITIALIZE POINTER FOR SHIFT |
| 0144 | | 0 000 011 100 | ROTATE | PRS | | SHIFT POINTER |
| 0145 | | 1 001 001 110 | | W,SRC | | SHIFT DATA |
| 0146 | | 0 000 101 100 | | YP0 | | IS SHIFT COMPLETE ? |
| 0147 | 0144 | 0 110 010 011 | | BRN | ROTATE | NO, CONTINUE TO SHIFT |
| 0150 | | 0 101 000 000 | | IS2 | | YES, SHIFT I/O REG |
| 0151 | | 0 100 101 000 | | IXT | | SAVE 8 BITS FIRST |
| 0152 | | 1 001 000 000 | | IS1 | | PREPARE TO SHIFT |
| 0153 | 0075 | 0 011 111 001 | | JSB | SLEFT | SHIFT I/O REG LEFT 8 BITS |
| 0154 | | 0 101 000 000 | | IS2 | | PREPARE TO FINSH ROTATE |
| 0155 | | 0 011 001 000 | | IOR | | LOAD FIRST 8 BITS AT END OF REG |
| 0156 | | 1 001 000 000 | | IS1 | | PREPARE TO STORE DATA |
| 0157 | | 0 111 111 000 | | TTC | | SAVE ROTATED WORD IN C-REG |
| 0160 | | 1 011 110 000 | | DTDS | | STORE IN DATA STORAGE |
| 0161 | | 0 101 000 000 | | IS2 | | PREPARE TO RECALL 8 BITS |
| 0162 | | 0 010 001 000 | | XOR | | CLEAR T-REG FIRST |
| 0163 | | 0 100 101 000 | | IXT | | RECALL FIRST 8 BITS |
| 0164 | | 1 001 000 000 | | IS1 | | PREPARE TO OUTPUT |
| 0165 | 0115 | 0 100 110 111 | | BRN | ALPHA9 | GO TO OUTPUT ROUTINE |
| 0166 | | 0 001 111 010 | NOT0 | XS,CM1 | | IS REG ADDRESS GREATER THAN 99 ? |
| 0167 | 0333 | 1 101 101 111 | | BRN | DSERR | YES, GO TO ERROR ROUTINE |
| 0170 | | 0 001 001 100 | | PT1 | | NO, SET POINTER FOR GREATER THAN 9 TEST |
| 0171 | | 0 001 100 010 | | P,CM1 | | IS REG ADDRESS GREATER THAN 9 ? |
| 0172 | 0333 | 1 101 101 111 | | BRN | DSERR | YES, GO TO ERROR ROUTINE |
| 0173 | | 1 110 101 110 | | W,AXC | | LOAD ADDRESS IN C-REG |
| 0174 | | 1 011 001 100 | | PT11 | | SET POINTER TO LOAD ADDRESS |
| 0175 | | 1 110 011 000 | | LDC14 | | LOAD ADDRESS |
| 0176 | | 1 011 000 100 | | SS11 | | SET FLAG |
| 0177 | 0311 | 1 100 100 111 | | BRN | EREG | ENABLE REG |
| 0200 | | 1 100 101 000 | STO | DNR | | RECALL ALPHA WORD FROM STACK |
| 0201 | | 0 000 001 100 | | PT0 | | SET POINTER TO CLEAR SHIFT DIGIT |
| 0202 | | 0 011 000 010 | | P,ZTC | | CLEAR SHIFT DIGIT |
| 0203 | 0326 | 1 101 011 101 | | JSB | STOREG | PREPARE TO STORE WORD IN DATA STORAGE |
| 0204 | | 0 100 010 000 | SYNTAX | ROM 2 | | GO TO ROM 2 ERROR ROUTINE |
| 0205 | | 0 100 010 100 | CPAR1 | YS4 | | WAS LAST REG FILLED ? |
| 0206 | 0200 | 1 000 000 011 | | BRN | STO | NO, COMPLETE LAST WORD |
| 0207 | | 0 100 100 100 | | RS4 | | YES, RESET FLAG |
| 0210 | | 0 110 101 000 | | STA | | RECALL NEW ALPHA WORD (TO BE DESTROYED) |
| 0211 | 0365 | 1 111 010 111 | | BRN | EXIT | CONTINUE ROUTINE |
| 0212 | 0341 | 1 110 001 001 | OPAR | JSB | OPLEV=7? | DOES OP LEVEL = 7 ? |
| 0213 | | 0 110 101 000 | | STA | | YES, PREPARE STACK |
| 0214 | | 0 110 101 000 | | STA | | RECALL REG ADDRESS TO A-REG |
| 0215 | 0274 | 1 011 110 101 | PREP | JSB | ADTEST | TEST ADDRESS AND ENABLE REGISTER |
| 0216 | 0106 | 0 100 011 101 | | JSB | STOAID | STORE NEW ADDRESS IN STACK |
| 0217 | | 0 011 001 110 | | W,ZTC | | CLEAR C-REG |
| 0220 | | 0 111 110 000 | | CTT | | CLEAR T-REG |
| 0221 | | 0 000 001 100 | | PT0 | | SET POINTER FOR SHIFT DIGIT |
| 0222 | | 0 110 011 000 | | LDC6 | | LOAD SHIFT DIGIT |
| 0223 | | 0 100 101 000 | | CTS | | SAVE ALPHA WORD IN STACK |
| 0224 | | 1 010 101 000 | | MTC | | RECALL TFLAG FOR UPDATE |
| 0225 | | 1 101 001 100 | | PT13 | | SET POINTER TO UPDATE OP LEVEL |
| 0226 | | 0 110 011 000 | | LDC6 | | SET OP LEVEL TO 6 |
| 0227 | 0057 | 0 010 111 111 | | BRN | DIGEX1 | RETURN TO SUPERVISOR |
| 0230 | | 0 000 001 100 | STORE9 | PT0 | | SET POINTER ON SHIFT DIGIT |
| 0231 | | 0 110 000 010 | | P,CTA | | LOAD SHIFT DIGIT IN A-REG |
| 0232 | | 0 101 100 010 | SHIFT1 | P,CM1C | | DECREMENT SHIFT DIGIT, WAS IT 0? |
| 0233 | 0316 | 1 100 111 011 | | BRN | SHIFT | NO, SHIFT DATA |
| 0234 | | 0 011 000 010 | | P,ZTC | | CLEAR THE 9 LEFT FROM SHIFT DIGIT |
| 0235 | | 0 101 000 000 | | IS2 | | YES, PREPARE TO ADD CHARACTER |
| 0236 | | 0 011 001 000 | | IOR | | PLACE CHARACTER AFTER LAST CHARACTER |
| 0237 | | 1 001 000 000 | | IS1 | | PREPARE TO STORE WORD |
| 0240 | | 0 111 111 000 | | TTC | | BRING WORD TO C-REG |
| 0241 | | 1 101 100 010 | LASTCH? | P,AM1A | | WAS THIS THE LAST CHARACTER? |
| 0242 | 0250 | 1 010 100 011 | | BRN | STORE2 | NO, SAVE ALPHA WORD |
| 0243 | | 1 011 110 000 | | DTDS | | YES, LOAD ALPHA WORD IN D.S. |
| 0244 | | 0 100 000 100 | | SS4 | | SET REG FILLED FLAG |
| 0245 | | 0 110 101 000 | | STA | | RECALL LAST ADDRESS TO A-REG |
| 0246 | | 1 111 101 010 | | X,AP1A | | INCREMENT REG ADDRESS |
| 0247 | 0215 | 1 000 110 111 | | BRN | PREP | PREPARE NEXT REG |
| 0250 | | 1 110 100 010 | STORE2 | P,AXC | | RESTORE SHIFT DIGIT |
| 0251 | | 0 100 101 000 | | CTS | | RESTORE ALPHA WORD IN STACK |

TYPEWRITER INTERFACE LISTING (ROM 4) - Continued

```
CURR   BRAN    OPERATION CODE
ADDR   ADDR    BIT PATTERN

0252           0 011 001 110  STORE3    W,ZTC                CLEAR C-REG
0253           0 111 110 000            CTT                  CLEAR T-REG
0254   0060    0 011 000 011            BRN       DIGEX2     RETURN TO SUPERVISOR
0255           1 000 101 110  OPLEV=1?  W,BXC                SAVE DATA IN B-REG
0256           1 010 101 000            MTC                  RECALL TFLAG
0257           0 101 111 110            S,CMIC               DOES OP LEVEL=0?
0260           0 101 111 110            S,CMIC               DOES OP LEVEL=1?
0261   0204    1 000 010 011            BRN       SYNTAX     NO, GO TO SYNTAX ERROR ROUTINE
0262           0 110 101 000            STA                  YES, RECALL ADDRESS FROM STACK
0263           0 000 110 000            RETURN               RETURN TO CALLING ROUTINE
0264           1 000 010 100  TESTPA    YSB                  IN PRINT ROUTINE?
0265   0033    0 001 101 111            BRN       NCHAR      NO, CHECK NEXT CHARACTER
0266           0 110 101 000  INCREG1   STA                  YES, RECALL ADDRESS TO A-REG
0267           1 101 100 110            M,AMIA               DECREMENT REL ADDRESS, LAST REG?
0270   0011    0 000 100 111            BRN       INCREG2    NO, INCREMENT REG
0271           1 000 100 100            RS8                  YES, RESET STATUS BIT
0272           1 001 100 100            RS9                  RESET STATUS BIT
0273   0060    0 011 000 011            BRN       DIGEX2     RETURN TO SUPERVISOR
0274           0 000 000 000            DUMMY
0275           1 110 101 110  ADTEST    W,AXC                LOAD ADDRESS IN C-REG
0276           0 110 001 010  REG0      X,CTA                ADDRESS TO A-REG
0277           1 010 001 100            PT10                 SET POINTER FOR SHIFT
0300           0 100 001 110  SHIFTR    W,SLA                SHIFT ADDRESS
0301           0 000 011 100            PRS                  SHIFT POINTER
0302           0 000 101 100            YP0                  IS SHIFT COMPLETE?
0303   0300    1 100 000 011            BRN       SHIFTR     NO, CONTINUE SHIFT
0304           1 111 100 010            P,AP1A               LOAD EXPONENT
0305           1 111 100 010            P,AP1A               PART OF ADDRESS
0306           0 001 111 110            S,CMI                IS TYPEWRITER REG CALLED?
0307   0061    0 011 000 111            BRN       TYPE       YES, FINISH ADDRESS
0310           1 110 101 110            W,AXC                NO, FINAL ADDRESS TO C-REG
0311           1 001 110 000  EREG      ATDS                 ENABLE REG.
0312           1 011 010 100            YS11                 WAS REG FOUND?
0313   0333    1 101 101 111            BRN       OSERR      NO, GO TO ERROR ROUTINE
0314           1 011 100 100            RS11                 YES, RESET FLAG
0315           0 000 110 000            RETURN               RETURN TO CALLING ROUTINE
0316   0075    0 011 111 001  SHIFT     JSB       SLEFT      SHIFT LEFT 8 BITS
0317   0232    1 001 101 011            BRN       SHIFT1     CHECK IF SHIFT IS COMPLETE
0320           0 111 111 000  SRIGHT    TTC                  LOAD IN C-REG FOR RIGHT SHIFT
0321           1 001 001 110  SR        W,SRC                SHIFT RIGHT
0322           0 000 011 100            PRS                  SHIFT POINTER
0323           0 000 101 100            YP0                  IS SHIFT COMPLETE ?
0324   0321    1 101 000 111            BRN       SR         NO, CONTINUE SHIFT
0325           0 111 110 000            CTT                  YES, RELOAD IN T-REG
0326   0360    1 111 000 011            BRN       PHS7       CONTINUE ROUTINE
0327           1 011 110 000  STOREG    DTDS                 STORE LAST ALPHA WORD IN DATA STORAGE
0330           1 010 101 000            MTC                  RECALL TFLAG FOR UPDATE
0331           0 110 101 000            STA                  RECALL LAST REG ADDRESS FOR DISPLAY
0332   0367    1 111 011 111            BRN       SOL        CONTINUE ROUTINE
0333           1 010 101 000  OSERR     MTC                  RECALL TFLAG
0334           0 011 011 110            S,ZTC                SET OP LEVEL TO 0
0335           0 010 101 000            CXM                  STORE NEW FLAG
0336           0 100 010 000            ROM 2                GO TO ERROR ROUTINE
0337           0 111 111 110  OPLEV=5?  S,CPIC               DOES OP LEVEL=6?  (3)
0340           0 111 111 110  OPLEV=6?  S,CPIC               DOES OP LEVEL=6?  (2)
0341           0 111 111 110            S,CPIC               DOES OP LEVEL=5?
0342           0 111 111 110  OPLEV=7?  S,CPIC               DOES OP LEVEL=7?  (6)
0343           0 111 111 110            S,CPIC               DOES OP LEVEL=9?
0344           0 111 111 110            S,CPIC               DOES OP LEVEL=8?
0345           0 111 111 110            S,CPIC               DOES OP LEVEL=7?  (6)
0346   0204    1 000 010 011            BRN       SYNTAX     NO, GO TO SYNTAX ERROR ROUTINE
0347           0 000 110 000            RETURN               YES, RETURN TO CALLING ROUTINE
0350   0336    1 101 111 101  STORE     JSB       OPLEV=5?   DOES OP LEVEL = 6 ?
0351           0 011 001 110            W,ZTC                YES, CLEAR C-REG FOR BIT MASK
0352           0 001 001 100            PT1                  SET POINTER FOR MASK
0353           1 111 011 000            LOC15                LOAD MASK
0354           1 111 011 000            LOC15                IN C-REG
0355           0 101 000 000            IS2                  SELECT ONLY
0356           0 010 101 000            AND                  8 LSB
0357           1 001 000 000            IS1                  OF T-REG
0360           0 100 100 100  PHS7      RS4                  RESET REG FILLED FLAG
0361           1 100 101 000            DNR                  RECALL ALPHA FROM STACK
0362   0230    1 001 100 011            BRN       STORE9     CONTINUE ROUTINE
0363   0336    1 101 111 101  CPAR      JSB       OPLEV=5?   DOES OP LEVEL = 6 ?
0364   0205    1 000 010 111            BRN       CPAR1      YES, CONTINUE ROUTINE
0365           0 110 101 000  EXIT      STA                  RECALL REG FOR DISPLAY
0366           1 101 101 010            X,AMIA               RESTORE PROPER VALUE OF LAST REG USED
0367           0 011 011 110  SOL       S,ZTC                SET OP LEVEL TO 0
0370           1 100 001 100            PT12                 SET POINTER TO OP MODE
0371           0 001 100 010            P,CMI                PROGRAM MODE ?
0372   0057    0 010 111 111            BRN       DIGEX1     YES, DO NOT DISPLAY REG
0373           0 010 010 000            ROM 1                NO, DISPLAY LAST REG
0374           0 010 101 000  ALPHA2    CXM                  STORE NEW FLAG
0375           1 011 111 000            DSTC                 RECALL CONTENTS OF DATA STORAGE
0376   0142    0 110 001 011            BRN       ALPHA3     CONTINUE ROUTINE
0377           0 000 000 000            DUMMY
```

TYPEWRITER INTERFACE LISTING (ROM 5)

```
CURR   BRAN    OPERATION CODE
ADDR   ADDR    BIT PATTERN

0000           1 010 001 100            PT10                 SET POINTER TO CONVERT 10 BITS
0001           0 101 000 000  LOADP     IS2                  PREPARE TO LOAD PROGRAM COUNTER
0002           1 000 101 000            PTT                  LOAD PROGRAM COUNTER IN T-REG
0003           1 001 000 000            IS1                  PREPARE TO CONVERT PROGRAM CNTR TO BCD
0004   0313    1 100 110 001  PLOADED   JSB       BIN-BCD    CONVERT PROGRAM COUNTER TO BCD NUMBER
0005           1 100 101 110            W,AXB                PROGRAM COUNTER TO A-REG
0006           0 100 001 110  LSHIFT    W,SLA                SHIFT A-REG LEFT
0007           0 000 111 100            PLS                  SHIFT POINTER LEFT
0010           1 001 101 100            YP9                  IS ADJ. COMPLETE?
0011   0006    0 000 011 011            BRN       LSHIFT     NO, CONTINUE TO SHIFT
0012           0 011 011 110            S,ZTC                CLEAR SIGN DIGIT
0013           0 101 111 110            S,CMIC               LOAD NINE IN SIGN DIGIT
0014   0207    1 000 100 001            JSB       PCOUT      CONTINUE ROUTINE
0015           1 100 010 000  CPAR      ROM 6                GO TO MNEMONIC FOR )
0016           0 011 001 110  T377      W,ZTC                CLEAR C-REG
0017           0 111 110 000            CTT                  CLEAR T-REG
0020           0 101 000 000            IS2                  PREPARE TO LOAD CODE IN T-REG
0021           0 100 101 000            IXT                  LOAD CODE IN T-REG
```

TYPEWRITER INTERFACE LISTING (ROM 5) – Continued

| CURR ADDR | BRAN ADDR | OPERATION CODE BIT PATTERN | | | | |
|---|---|---|---|---|---|---|
| 0022 | | 1 001 000 000 | | IS1 | | PREPARE TO TEST CODE |
| 0023 | | 1 101 001 100 | | PT13 | | SET POINTER FOR 377 TEST |
| 0024 | | 1 111 011 000 | | LDC15 | | LOAD MASK |
| 0025 | | 0 000 000 000 | | NOP | | FOR END OF |
| 0026 | | 1 111 011 000 | | LDC15 | | OCTAL FIELD TEST |
| 0027 | 0266 | 1 011 011 011 | | BRN | TEST | GO TO TEST ROUTINE |
| 0030 | | 1 011 010 100 | TEST1 | YS11 | | WAS THERE A CARRY DURING TEST? |
| 0031 | 0073 | 0 011 101 111 | | BRN | 377 | NO, CODE IS 377 |
| 0032 | | 0 101 000 000 | | IS2 | | YES, BEGIN BIN-OCT CONV BY LOADING 2 ZEROES |
| 0033 | | 0 101 001 000 | | SRT | | FIRST ZERO |
| 0034 | | 0 101 001 000 | | SRT | | SECOND ZERO |
| 0035 | | 1 001 000 000 | | IS1 | | LOAD T-REG |
| 0036 | | 1 101 001 100 | | PT13 | | SET POINTER FOR BINARY TO OCTAL CONV. |
| 0037 | | 0 111 111 000 | BIN-OCT | TTC | | INTO C-REG |
| 0040 | | 0 110 000 010 | | P,CTA | | LOAD DIGIT IN A-REG |
| 0041 | | 0 011 000 010 | | P,ZTC | | CLEAR DIGIT IN C-REG |
| 0042 | | 0 111 110 000 | | CTT | | RELOAD IN T-REG |
| 0043 | | 0 101 000 000 | | IS2 | | INSERT ANOTHER |
| 0044 | | 0 101 001 000 | | SRT | | ZERO IN THE |
| 0045 | | 1 001 000 000 | | IS1 | | BINARY NUMBER |
| 0046 | | 0 000 011 100 | | PRS | | SHIFT POINTER |
| 0047 | | 1 010 101 100 | | YP10 | | IS CONVERSION DONE? |
| 0050 | 0037 | 0 001 111 111 | | BRN | BIN-OCT | NO, CONTINUE |
| 0051 | | 1 011 001 110 | | W,SRA | | YES, SHIFT BCD NUMBER |
| 0052 | | 0 011 001 110 | OUTPUT | W,ZTC | | CLEAR C-REG |
| 0053 | | 0 101 111 110 | | S,CMIC | | SET SIGN DIGIT TO 9 |
| 0054 | | 1 110 100 110 | OUTPUT1 | M,AXC | | LOAD DATA IN C-REG |
| 0055 | | 0 110 000 110 | | M,CTA | | RELOAD IN A-REG |
| 0056 | 0111 | 0 100 101 001 | | JSB | CTI | OUTPUT FIRST DIGIT |
| 0057 | | 0 000 111 100 | | PLS | | SHIFT POINTER |
| 0060 | | 0 100 001 110 | | W,SLA | | SHIFT DATA |
| 0061 | | 1 101 101 100 | | YP13 | | IS OUTPUT COMPLETE? |
| 0062 | 0054 | 0 010 110 011 | | BRN | OUTPUT1 | NO, CONTINUE |
| 0063 | | 0 000 010 100 | KEY | YS0 | | YES, IS KEY DOWN? |
| 0064 | 0374 | 1 111 110 011 | | BRN | LIST2 | NO, CONTINUE TO LIST |
| 0065 | | 0 000 100 100 | | RS0 | | YES, RESET STATUS BIT |
| 0066 | 0102 | 0 100 001 101 | RETURN | JSB | CR/LF | DO A CR/LF |
| 0067 | | 1 100 101 000 | | DNR | | RECALL DATA FROM STACK |
| 0070 | | 1 000 101 110 | | W,BXC | | SAVE DATA IN B-REG |
| 0071 | | 1 100 101 000 | | DNR | | PREPARE STACK FOR STORE |
| 0072 | | 0 100 010 000 | | ROM 2 | | RETURN TO SUPERVISOR VIA ROM 2 |
| 0073 | | 0 111 100 100 | 377 | RS7 | | RESET QUOTE FIELD FLAG |
| 0074 | | 1 011 001 100 | | PT11 | | SET POINTER FOR MNEMONIC GENERATION |
| 0075 | 0015 | 0 000 110 111 | | BRN | CPAR | GO TO ")" |
| 0076 | | 0 101 000 000 | TAB | IS2 | | PREPARE TO OUTPUT TAB |
| 0077 | 0037 | 0 010 000 001 | | LIO | 100 | LOAD CODE FOR TAB |
| 0100 | | 0 101 101 000 | | SRI | | SHIFT CODE TO OUTPUT POSITION |
| 0101 | | 1 001 000 000 | | IS1 | | PREPARE TO OUTPUT |
| 0102 | 0351 | 1 110 100 111 | | BRN | WAIT | OUTPUT TAB |
| 0103 | | 0 101 000 000 | CR/LF | IS2 | | PREPARE TO OUTPUT CR/LF |
| 0104 | 0002 | 0 000 001 101 | | LIO | 006 | LOAD CODE FOR CR/LF |
| 0105 | | 0 101 101 000 | | SRI | | SHIFT CODE TO OUTPUT POSITION |
| 0106 | | 1 001 000 000 | | IS1 | | PREPARE TO OUTPUT |
| 0107 | 0351 | 1 110 100 111 | | BRN | WAIT | OUTPUT CR/LF |
| 0110 | | 1 011 001 100 | MNEMONIC | PT11 | | SET POINTER TO BEGIN MNEMONIC GENERATION |
| 0111 | | 1 100 010 000 | | ROM 6 | | GO TO ROM 6 TO GENERATE MNEMONICS |
| 0112 | | 0 111 110 000 | CTI | CTT | | LOAD DATA IN T-REG |
| 0113 | | 0 101 000 000 | | IS2 | | PREPARE TO LOAD DATA IN I/O-REG |
| 0114 | | 0 100 101 000 | | IXT | | LOAD DATA IN I/O-REG |
| 0115 | | 1 001 000 000 | | IS1 | | PREPARE TO OUTPUT |
| 0116 | 0351 | 1 110 100 111 | | BRN | WAIT | OUTPUT DATA |
| 0117 | | 0 101 010 100 | | YS5 | | WAS LAST INSTR A LBL? |
| 0120 | 0144 | 0 110 010 011 | | BRN | JMP/SUB | NO, TEST FOR JMP/SUB |
| 0121 | 0240 | 1 010 000 101 | LBL1 | JSB | STACK2 | YES, READ NEXT 2 INSTRUCTIONS & STACK IN C-REG |
| 0122 | | 0 101 100 100 | | RS5 | | RESET LBL FLAG |
| 0123 | 0126 | 0 101 011 011 | | BRN | LBL | CONTINUE ROUTINE |
| 0124 | 0350 | 1 110 100 101 | | JSB | WAIT | OUTPUT MNEMONIC |
| 0125 | | 1 110 010 000 | | ROM 7 | | RETURN TO SHIFT MNEMONIC |
| 0126 | | 0 110 001 110 | LBL | W,CTA | | LOAD COMPLETED LABEL IN A-REG |
| 0127 | | 1 011 001 110 | | W,SRA | | SHIFT LBL. |
| 0130 | | 1 010 001 100 | | PT10 | | SET POINTER FOR LAST DIGIT OUT |
| 0131 | | 0 110 010 100 | | YS6 | | WAS LAST INSTR SUB OR JMP? |
| 0132 | 0136 | 0 101 111 011 | | BRN | CR | NO, DO A CR |
| 0133 | | 0 110 100 100 | | RS6 | | YES, RESET FLAG |
| 0134 | 0075 | 0 011 111 001 | LBL3 | JSB | TAB | TAB FOR LBL POSITION |
| 0135 | 0052 | 0 010 101 011 | | BRN | OUTPUT | OUTPUT LBL |
| 0136 | | 0 101 000 000 | CR | IS2 | | LOAD CODE |
| 0137 | 0000 | 0 000 000 101 | | LIO | 002 | FOR A CARRIAGE |
| 0140 | | 0 101 101 000 | | SRI | | RETURN AND |
| 0141 | | 1 001 000 000 | | IS1 | | THEN OUTPUT |
| 0142 | 0350 | 1 110 100 101 | | JSB | WAIT | THAT CODE |
| 0143 | 0134 | 0 101 110 011 | | BRN | LBL3 | NOW TAB AND OUTPUT LBL. |
| 0144 | | 0 110 010 100 | JMP/SUB | YS6 | | WAS INSTR JMP OR SUB? |
| 0145 | 0204 | 1 000 010 011 | | BRN | LEND | NO, TEST FOR END |
| 0146 | 0240 | 1 010 000 101 | JMP1 | JSB | STACK2 | YES, READ NEXT 2 INSTRUCTIONS & STACK IN C-REG |
| 0147 | | 0 110 100 100 | | RS6 | | RESET REL/ABS FLAG |
| 0150 | | 1 000 010 100 | | YS8 | | WAS INSTR SUBC? |
| 0151 | 0154 | 0 110 110 011 | | BRN | JMP4 | NO, OUTPUT ABS/REL ADDRESS |
| 0152 | | 1 000 100 100 | | RS8 | | YES, RESET FLAG |
| 0153 | 0063 | 0 011 001 111 | | BRN | KEY | TEST FOR KEY DOWN |
| 0154 | | 1 001 001 110 | JMP4 | W,SRC | | SHIFT ADDRESS TO |
| 0155 | | 0 000 111 100 | | PLS | | LOW END OF WORD |
| 0156 | | 1 010 101 100 | | YP10 | | IS SHIFT DONE? |
| 0157 | 0154 | 0 110 110 011 | | BRN | JMP4 | NO, CONTINUE |
| 0160 | | 0 111 110 000 | | CTT | | YES, RELOAD IN T-REG |
| 0161 | | 0 111 010 100 | | YS7 | | IS JMP- FLAG SET ? |
| 0162 | 0171 | 0 111 100 111 | | BRN | CONVERT | NO, CONVERT ADDRESS TO BCD NUMBER |
| 0163 | | 0 111 100 100 | | RS7 | | YES, RESET FLAG |
| 0164 | | 0 101 000 000 | | IS2 | | PREPARE TO COMPLEMENT ADDRESS |
| 0165 | | 0 010 001 000 | | XOR | | CLEAR T-REG |
| 0166 | | 1 101 001 000 | | TDEC | | SET T-REG TO ALL ONES |
| 0167 | | 0 010 001 000 | | XOR | | COMPLEMENT C-REG AND LOAD RESULT IN T-REG |
| 0170 | | 1 101 001 000 | | TDEC | | ADJUST ADDRESS FOR LATE TINC |
| 0171 | | 0 101 000 000 | CONVERT | IS2 | | PREPARE TO MAKE FINAL ADJUSTMENT ON ADDRESS |
| 0172 | | 1 100 001 000 | | TINC | | ADJUST ADDRESS |
| 0173 | | 1 001 000 000 | | IS1 | | PREPARE TO CONVERT NUMBER TO BCD |
| 0174 | 0313 | 1 100 110 001 | | JSB | BIN-BCD | CONVERT TO BCD |
| 0175 | | 1 100 101 110 | JMP5 | W,AXB | | LOAD ADDRESS IN A-REG |
| 0176 | | 0 000 001 100 | | PT0 | | FOR SHIFT |
| 0177 | | 0 100 001 110 | JMP6 | W,SLA | | SHIFT ADDRESS |

TYPEWRITER INTERFACE LISTING (ROM 5)—Continued

| CURR ADDR | BRAN ADDR | OPERATION CODE BIT PATTERN | | | | |
|---|---|---|---|---|---|---|
| 0200 | | 0 000 111 100 | | PLS | | SHIFT POINTER |
| 0201 | | 1 001 101 100 | | YP9 | | IS SHIFT DONE? |
| 0202 | 0177 | 0 111 111 111 | | BRN | JMP6 | NO, CONTINUE |
| 0203 | 0052 | 0 010 101 011 | | BRN | OUTPUT | YES, OUTPUT ADDRESS |
| 0204 | | 1 000 010 100 | LEND | YS8 | | WAS INSTR END? |
| 0205 | 0063 | 0 011 001 111 | | BRN | KEY | NO, TEST FOR KEY DOWN |
| 0206 | | 1 000 100 100 | | RS8 | | YES, RESET FLAG |
| 0207 | 0056 | 0 011 011 011 | | BRN | RETURN | RETURN TO SUPERVISOR |
| 0210 | | 1 110 100 110 | PCOUT | W.AXC | | LOAD DIGIT IN C-REG |
| 0211 | | 0 110 000 110 | | W.CTA | | RESTORE DATA IN A-REG |
| 0212 | 0111 | 0 100 101 001 | BCTI | JSB | CTI | LOAD DATA IN I/O-REG AND OUTPUT |
| 0213 | | 0 100 001 110 | PCOUT1 | W.SLA | | SHIFT DATA LEFT ONCE |
| 0214 | | 0 000 111 100 | | PLS | | SHIFT POINTER |
| 0215 | | 1 101 101 100 | | YP13 | | IS OUTPUT COMPLETE? |
| 0216 | 0210 | 1 000 100 011 | | BRN | PCOUT | NO, CONTINUE |
| 0217 | 0075 | 0 011 111 001 | | JSB | TAB | YES, TAB ONCE |
| 0220 | 0075 | 0 011 111 001 | | JSB | TAB | TAB AGAIN |
| 0221 | | 0 101 000 000 | READ | IS2 | | PREPARE TO READ NEXT INSTRUCTION |
| 0222 | | 1 001 001 000 | | PDEC | | DECREMENT PROGRAM COUNTER |
| 0223 | | 0 111 000 000 | | PINC | | INCREMENT PROGRAM COUNTER AND LOAD ADDRESS |
| 0224 | | 1 001 000 000 | | IS1 | | PREPARE TO READ |
| 0225 | | 1 000 100 000 | | READ | | READ NEXT PROGRAM INSTRUCTION |
| 0226 | | 1 001 010 100 | I/O | YS9 | | INSIDE I/O CALL ? |
| 0227 | 0110 | 0 100 100 011 | | BRN | MNEMONIC | NO, GENERATE MNEMONIC |
| 0230 | 0232 | 1 001 101 011 | | BRN | YS7 | YES, TEST FOR INSIDE "(" |
| 0231 | | 0 100 010 000 | LERROR1 | ROM 2 | | GO TO ROM 2 FOR ERROR ROUTINE |
| 0232 | | 0 111 010 100 | YS7 | YS7 | | INSIDE "(" ? |
| 0233 | 0110 | 0 100 100 011 | | BRN | MNEMONIC | NO, GENERATE MNEMONIC |
| 0234 | 0316 | 0 000 111 011 | | BRN | T377 | YES, CONTINUE ROUTINE |
| 0235 | | 1 110 010 000 | CR/LF3 | ROM 7 | | RETURN TO ROM 7 TO CHECK TAB FLAG |
| 0236 | 0350 | 1 110 100 101 | | JSB | WAIT | OUTPUT CR/LF |
| 0237 | 0235 | 1 001 110 111 | | BRN | CR/LF3 | CONTINUE ROTINE |
| 0240 | | 0 000 000 000 | | DUMMY | | |
| 0241 | | 0 111 000 000 | STACK2 | PINC | | INCREMENT PROGRAM COUNTER |
| 0242 | | 1 000 100 000 | | READ | | READ NEXT INSTRUCTION |
| 0243 | | 0 111 001 100 | | PT7 | | SET POINTER FOR SHIFT |
| 0244 | | 0 101 000 000 | | IS2 | | PREPARE TO LOAD DATA IN T-REG |
| 0245 | | 0 100 101 000 | | IXT | | LOAD DATA IN T-REG |
| 0246 | | 1 001 000 000 | | IS1 | | PREPARE TO READ SECOND INSTRUCTION |
| 0247 | | 0 111 000 000 | | PINC | | INCREMENT PROGRAM COUNTER |
| 0250 | | 1 000 100 000 | | READ | | READ SECOND INSTRUCTION |
| 0251 | | 0 101 000 000 | | IS2 | | PREPARE TO LOAD IN T-REG |
| 0252 | | 0 100 101 000 | | IXT | | FIRST TO I/O, SECOND TO T-REG |
| 0253 | | 0 101 000 000 | SHIFT2ND | IS2 | | PREPARE TO SHIFT SECOND INSTRUCTION |
| 0254 | | 0 101 001 000 | | SRT | | SHIFT DATA |
| 0255 | | 1 001 000 000 | | IS1 | | PREPARE TO CHECK IF SHIFT DONE |
| 0256 | | 0 000 011 100 | | PRS | | SHIFT POINTER |
| 0257 | | 1 111 101 100 | | YP15 | | IS SHIFT DONE ? |
| 0260 | 0253 | 1 010 101 111 | | BRN | SHIFT2ND | NO, CONTINUE TO SHIFT |
| 0261 | | 0 101 000 000 | | IS2 | | YES, PREPARE TO LOAD FIRST INSTRUCTION |
| 0262 | | 0 100 101 000 | | IXT | | LOAD FIRST INSTRUCTION IN FRONT OF SECOND |
| 0263 | | 1 001 000 000 | | IS1 | | PREPARE TO BRING RESULT TO C-REG |
| 0264 | | 0 111 111 000 | | TTC | | BRING RESULT TO C-REG |
| 0265 | | 0 000 110 000 | | RETURN | | RETURN TO CALLING ROUTINE |
| 0266 | | 0 110 010 000 | TEST | ROM 3 | | GO TO ROM 3 TO TEST DATA |
| 0267 | | 0 000 000 000 | | DUMMY | | |
| 0270 | | 0 000 000 000 | | DUMMY | | |
| 0271 | 0030 | 0 001 100 011 | | BRN | TEST1 | CHECK TEST RESULTS |
| 0272 | | 0 000 000 000 | | DUMMY | | |
| 0273 | | 0 000 000 000 | | DUMMY | | |
| 0274 | | 0 000 000 000 | | DUMMY | | |
| 0275 | | 0 000 000 000 | | DUMMY | | |
| 0276 | | 0 000 000 000 | | DUMMY | | |
| 0277 | | 0 000 000 000 | | DUMMY | | |
| 0300 | | 0 000 000 000 | | DUMMY | | |
| 0301 | | 0 000 000 000 | | DUMMY | | |
| 0302 | | 0 000 000 000 | | DUMMY | | |
| 0303 | | 0 000 000 000 | | DUMMY | | |
| 0304 | | 0 000 000 000 | | DUMMY | | |
| 0305 | | 0 000 000 000 | | DUMMY | | |
| 0306 | | 0 000 000 000 | | DUMMY | | |
| 0307 | | 0 101 000 000 | OUTPUTL | IS2 | | PREPARE TO OUTPUT DATA |
| 0310 | 0017 | 0 001 000 001 | | LIO | 040 | LOAD I/O SELECT CODE |
| 0311 | | 0 110 100 000 | | GIOE | | OUTPUT DATA |
| 0312 | | 1 001 000 000 | | IS1 | | PREPARE TO RETURN TO CALLING ROUTINE |
| 0313 | | 0 000 110 000 | | RETURN | | RETURN TO CALLING ROUTINE |
| 0314 | | 0 000 101 110 | BIN-BCD | W.ZTB | | CLEAR B-REG SO SUM=0 |
| 0315 | | 1 011 101 110 | | W.ZTA | | CLEAR A-REG |
| 0316 | | 1 111 101 110 | | W.APIA | | INITIALIZE A-REG TO 1 FOR LSB |
| 0317 | | 0 111 111 000 | BCD1 | TTC | | LOAD BINARY NUMBER IN C-REG |
| 0320 | | 0 100 101 000 | | CTS | | STORE BINARY NUMBER IN STACK |
| 0321 | | 0 101 000 000 | | IS2 | | SHIFT BINARY |
| 0322 | | 0 101 001 000 | | SRT | | NUMBER IN T-REG |
| 0323 | | 0 100 001 000 | | SLT | | TO SET LSB TO 0 |
| 0324 | | 0 010 001 000 | | XOR | | COMPARE T & C-REG |
| 0325 | | 1 001 000 000 | | IS1 | | PREPARE TO CHECK RESULTS |
| 0326 | | 0 111 111 000 | | TTC | | LOAD COMPARISON RESULT IN C-REG |
| 0327 | | 0 001 101 110 | | W.CMI | | WAS THAT BIT A ONE? |
| 0330 | 0333 | 1 101 101 111 | | BRN | BCD2 | YES, ADD BINARY VALUE IN A TO SUM IN B |
| 0331 | | 0 010 001 110 | | W.BTC | | NO, LOAD PREVIOUS SUM IN B-REG |
| 0332 | 0335 | 1 101 110 111 | | BRN | BCD3 | DOUBLE PRESENT BINARY NUMBER |
| 0333 | | 0 010 001 110 | BCD2 | W.BTC | | LOAD PREVIOUS SUM IN C-REG |
| 0334 | | 0 111 001 110 | | W.APCC | | ADD PREVIOUS SUM AND PRESENT BINARY VALUE |
| 0335 | | 0 100 101 110 | BCD3 | W.ATB | | LOAD PRESENT BINARY VALUE IN B-REG |
| 0336 | | 1 110 001 110 | | W.APBA | | DOUBLE BINARY VALUE IN A-REG |
| 0337 | | 1 000 101 110 | | W.BXC | | SAVE LATEST BCD SUM IN B-REG |
| 0340 | | 1 100 101 000 | | DNR | | RECALL BINARY NUMBER FROM STACK |
| 0341 | | 0 111 110 000 | | CTT | | LOAD BINARY NUMBER IN T-REG |
| 0342 | | 0 101 000 000 | | IS2 | | SHIFT BINARY |
| 0343 | | 0 101 001 000 | | SRT | | NUMBER TO |
| 0344 | | 1 001 000 000 | | IS1 | | EXAMINE NEXT BIT |
| 0345 | | 0 000 011 100 | | PRS | | SHIFT POINTER |
| 0346 | | 0 000 101 100 | | YP0 | | IS CONVERSION COMPLETE? |
| 0347 | 0317 | 1 100 111 111 | | BRN | BCD1 | NO, CONTINUE ROUTINE |
| 0350 | | 0 000 110 000 | | RETURN | | YES, RETURN TO CALLING ROUTINE |
| 0351 | | 1 011 101 010 | WAIT | X.ZTA | | INITIALIZE COUNTER |
| 0352 | | 0 101 000 000 | TESTFLG | IS2 | | PREPARE TO TEST FLAG |
| 0353 | | 0 000 100 000 | | YINTF | | INTERROGATE FLAG STATUS BIT |
| 0354 | | 1 001 000 000 | | IS1 | | PREPARE TO CHECK FLAG STATUS |
| 0355 | | 1 011 010 100 | | YS11 | | IS PERIPHERAL READY ? |

TYPEWRITER INTERFACE LISTING (ROM 5) – Continued

| CURR ADDR | BRAN ADDR | OPERATION CODE BIT PATTERN | | | | |
|---|---|---|---|---|---|---|
| 0356 | 0307 | 1 100 011 111 | | BRN | OUTPUTL | GO TO OUTPUT DATA ROUTINF |
| 0357 | | 1 011 100 100 | | RS11 | | NO, RESET STATUS BIT AND CHECK FLAG AGAIN |
| 0360 | | 1 111 101 010 | | X,AP1A | | INCREMENT COUNTER, WAS THERE A CARRY ? |
| 0361 | 0352 | 1 110 101 011 | | BRN | TESTFLG | NO, TEST FLAG AGAIN |
| 0362 | | 0 100 010 000 | FAILURE | ROM 2 | | YES, GO TO ROM 2 TO PRINT ERROR MESSAGE |
| 0363 | | 0 101 000 000 | LISTE | IS2 | | PREPARE TO CHECK IF MEMORY IS PROTECTED |
| 0364 | 0077 | 0 100 000 001 | | LIO | 200 | LOAD TEST CODE |
| 0365 | | 1 110 100 000 | | TG8 | | TEST MEMORY |
| 0366 | | 1 001 000 000 | | IS1 | | PREPARE TO CHECK TEST RESULTS |
| 0367 | | 1 011 010 100 | | YS11 | | IS MEMORY PROTECTED? |
| 0370 | 0231 | 1 001 100 111 | | BRN | LERROR1 | YES, MEMORY IS PROTECTED, GO TO ERROR ROUTINE |
| 0371 | | 1 011 100 100 | | RS11 | | NO, RESET STATUS BIT |
| 0372 | | 1 000 101 110 | | W,BXC | | RESTORE DATA TO C-REG |
| 0373 | | 0 100 101 000 | | CTS | | SAVE DATA IN STACK |
| 0374 | 0102 | 0 100 001 101 | LIST2 | JSB | CR/LF | OUTPUT CR/LF |
| 0375 | | 0 111 000 000 | | PINC | | INCREMENT PROGRAM COUNTER |
| 0376 | | 0 011 001 110 | | W,ZTC | | CLEAR C-REG |
| 0377 | | 0 111 110 000 | | CTT | | CLEAR T-REG |

TYPEWRITER INTERFACE LISTING (ROM 6)

| CURR ADDR | BRAN ADDR | OPERATION CODE BIT PATTERN | | | | |
|---|---|---|---|---|---|---|
| 0000 | | 0 111 000 100 | COMPFLG | SS7 | | |
| 0001 | 0050 | 0 010 100 011 | | BRN | - | |
| 0002 | 0166 | 0 111 011 101 | BSUBX | JSB | SSUB | |
| 0003 | 0165 | 0 111 011 001 | | JSB | SLBL | |
| 0004 | 0134 | 0 101 110 011 | | BRN | BLBLX | |
| 0005 | | 0 101 011 000 | B* | LDC5 | | |
| 0006 | | 1 010 011 000 | L10D | LDC10 | | |
| 0007 | 0111 | 0 100 100 111 | | BRN | DONE | |
| 0010 | 0153 | 0 110 110 001 | B/ | JSB | S/ | |
| 0011 | 0111 | 0 100 100 111 | | BRN | DONE | |
| 0012 | 0010 | 0 000 100 011 | / | BRN | B/ | / |
| 0013 | 0005 | 0 000 010 111 | AST | BRN | B* | * |
| 0014 | 0154 | 0 110 110 101 | STOX | JSB | SSTO | STOX |
| 0015 | 0320 | 1 101 000 011 | | BRN | BX | |
| 0016 | | 0 101 011 000 | ) | LDC5 | | ) |
| 0017 | 0105 | 0 100 010 111 | | BRN | L9D | |
| 0020 | | 0 101 011 000 | = | LDC5 | | = |
| 0021 | 0103 | 0 100 001 111 | | BRN | L13D | |
| 0022 | 0145 | 0 110 010 111 | . | BRN | B. | . |
| 0023 | | 1 001 010 010 | 0 | WP,SRC | | 0 |
| 0024 | | 1 001 011 000 | | LDC9 | | |
| 0025 | 0265 | 1 011 010 111 | | BRN | L0D | |
| 0026 | | 1 001 010 100 | ( | YS9 | | ( |
| 0027 | 0142 | 0 110 001 011 | | BRN | B( | |
| 0030 | | 0 111 000 100 | | SS7 | | |
| 0031 | 0142 | 0 110 001 011 | | BRN | B( | |
| 0032 | | 0 111 100 010 | 3 | P,CP1C | | 3 |
| 0033 | | 0 111 100 010 | 2 | P,CP1C | | 2 |
| 0034 | | 0 111 100 010 | 1 | P,CP1C | | 1 |
| 0035 | 0023 | 0 001 001 111 | | BRN | 0 | |
| 0036 | | 0 101 011 000 | % | LDC5 | | % |
| 0037 | 0101 | 0 100 000 111 | | BRN | L5D | |
| 0040 | | 0 101 011 000 | + | LDC5 | | + |
| 0041 | 0061 | 0 011 000 111 | | BRN | L11D | |
| 0042 | | 0 111 100 010 | 6 | P,CP1C | | 6 |
| 0043 | | 0 111 100 010 | 5 | P,CP1C | | 5 |
| 0044 | | 0 111 100 010 | 4 | P,CP1C | | 4 |
| 0045 | 0032 | 0 001 101 011 | | BRN | 3 | |
| 0046 | 0163 | 0 111 010 001 | CRCL | JSB | SC | CRCL |
| 0047 | 0370 | 1 111 100 011 | | BRN | SRCL | |
| 0050 | | 1 001 011 000 | - | LDC9 | | - |
| 0051 | 0103 | 0 100 001 111 | | BRN | L13D | |
| 0052 | | 0 111 100 010 | 9 | P,CP1C | | 9 |
| 0053 | | 0 111 100 010 | 8 | P,CP1C | | 8 |
| 0054 | | 0 111 100 010 | 7 | P,CP1C | | 7 |
| 0055 | 0042 | 0 010 001 011 | | BRN | 6 | |
| 0056 | 0163 | 0 111 010 001 | CSTO | JSB | SC | CSTO |
| 0057 | 0154 | 0 110 110 101 | | JSB | SSTO | |
| 0060 | 0111 | 0 100 100 111 | | BRN | DONE | |
| 0061 | | 1 011 011 000 | L11D | LDC11 | | |
| 0062 | 0111 | 0 100 100 111 | | BRN | DONE | |
| 0063 | | 1 001 100 100 | LE | RS9 | | LE |
| 0064 | 0156 | 0 110 111 101 | LE1 | JSB | SLE | |
| 0065 | 0111 | 0 100 100 111 | | BRN | DONE | |
| 0066 | | 0 110 100 100 | JLBLX | RS6 | | |
| 0067 | | 0 001 001 100 | BJS | PTI | | |
| 0070 | 0162 | 0 111 001 101 | | JSB | SX | |
| 0071 | 0351 | 1 110 100 111 | | BRN | RS5 | |
| 0072 | 0213 | 1 000 101 111 | RND | BRN | BRND | RND |
| 0073 | 0160 | 0 111 000 101 | CLR | JSB | SCL | CLR |
| 0074 | | 0 111 011 000 | | LDC7 | | |
| 0075 | 0136 | 0 101 111 011 | | BRN | L2D | |
| 0076 | 0161 | 0 111 001 001 | PRTX | JSB | SPRT | PRTX |
| 0077 | 0162 | 0 111 001 101 | | JSB | SX | |
| 0100 | 0111 | 0 100 100 111 | | BRN | DONE | |
| 0101 | | 0 101 011 000 | L5D | LDC5 | | |
| 0102 | 0111 | 0 100 100 111 | | BRN | DONE | |
| 0103 | | 1 101 011 000 | L13D | LDC13 | | |
| 0104 | 0111 | 0 100 100 111 | | BRN | DONE | |
| 0105 | | 1 001 011 000 | L9D | LDC9 | | |
| 0106 | 0111 | 0 100 100 111 | | BRN | DONE | |
| 0107 | | 1 110 010 000 | BACC | ROM 7 | | |
| 0110 | | 0 000 000 000 | | DUMMY | | |
| 0111 | | 1 110 010 000 | DONE | ROM 7 | | |
| 0112 | | 0 011 001 110 | | W,ZTC | | |
| 0113 | | 0 001 010 000 | | EFRA | | |
| 0114 | 0161 | 0 111 001 001 | BPRTOS | JSB | SPRT | |
| 0115 | 0171 | 0 111 101 001 | | JSB | SOS | |
| 0116 | 0111 | 0 100 100 111 | | BRN | DONE | |
| 0117 | | 0 000 000 000 | | DUMMY | | |
| 0120 | | 0 000 000 000 | | DUMMY | | |
| 0121 | | 0 000 000 000 | | DUMMY | | |
| 0122 | | 0 000 000 000 | | DUMMY | | |

TYPEWRITER INTERFACE LISTING (ROM 6) – Continued

| LINE # | CURR ADDR | BRAN ADDR | OPERATION CODE BIT PATTERN | | | | | |
|---|---|---|---|---|---|---|---|---|
| 86 | 0123 | | 0 000 000 000 | | DUMMY | | | |
| 87 | 0124 | | 0 000 000 000 | | DUMMY | | | |
| 88 | 0125 | | 0 110 011 000 | L6D | LDC6 | | | |
| 89 | 0126 | 0111 | 0 100 100 111 | | BRN | DONE | | |
| 90 | 0127 | | 0 110 011 000 | BH | LDC6 | | | |
| 91 | 0130 | 0143 | 0 110 001 111 | | BRN | L8D | | |
| 92 | 0131 | 0163 | 0 111 010 001 | CHS | JSB | SC | CHS | |
| 93 | 0132 | | 1 110 010 000 | | ROM 7 | | | |
| 94 | 0133 | | 0 000 110 000 | | RETURN | | | |
| 95 | 0134 | | 1 000 000 100 | BLBLX | SSB | | | |
| 96 | 0135 | 0067 | 0 011 011 111 | | BRN | BJS | | |
| 97 | 0136 | | 0 010 011 000 | L2D | LDC2 | | | |
| 98 | 0137 | 0111 | 0 100 100 111 | | BRN | DONE | | |
| 99 | 0140 | 0161 | 0 111 001 001 | PRTACC | JSB | SPRT | PRTACC | |
| 100 | 0141 | 0107 | 0 100 011 111 | | BRN | BACC | | |
| 101 | 0142 | | 0 101 011 000 | B( | LDC5 | | | |
| 102 | 0143 | | 1 000 011 000 | L8D | LDC8 | | | |
| 103 | 0144 | 0111 | 0 100 100 111 | | BRN | DONE | | |
| 104 | 0145 | | 0 001 011 000 | B. | LDC1 | | | |
| 105 | 0146 | | 1 110 011 000 | L14D | LDC14 | | | |
| 106 | 0147 | 0111 | 0 100 100 111 | | BRN | DONE | | |
| 107 | 0150 | 0164 | 0 111 010 101 | JMP- | JSB | SJMP | JMP-XXXX | WHERE XXXX = NUMBER OF STEPS |
| 108 | 0151 | 0000 | 0 000 000 011 | | BRN | COMPFLG | | |
| 109 | 0152 | 0164 | 0 111 010 101 | JMP+ | JSB | SJMP | JMP+XXXX | WHERE XXXX = NUMBER OF STEPS |
| 110 | 0153 | 0040 | 0 010 000 011 | | BRN | + | | |
| 111 | 0154 | | 1 110 010 000 | S/ | ROM 7 | | | |
| 112 | 0155 | | 1 110 010 000 | SSTO | ROM 7 | | | |
| 113 | 0156 | | 1 110 010 000 | SD | ROM 7 | | | |
| 114 | 0157 | | 1 110 010 000 | SLF | ROM 7 | | | |
| 115 | 0160 | | 1 110 010 000 | SRND | ROM 7 | | | |
| 116 | 0161 | | 1 110 010 000 | SCL | ROM 7 | | | |
| 117 | 0162 | | 1 110 010 000 | SPRT | ROM 7 | | | |
| 118 | 0163 | | 1 110 010 000 | SX | ROM 7 | | | |
| 119 | 0164 | | 1 110 010 000 | SC | ROM 7 | | | |
| 120 | 0165 | | 1 110 010 000 | SJMP | ROM 7 | | | |
| 121 | 0166 | | 1 110 010 000 | SLBL | ROM 7 | | | |
| 122 | 0167 | | 1 110 010 000 | SSUB | ROM 7 | | | |
| 123 | 0170 | | 1 110 010 000 | SEX | ROM 7 | | | |
| 124 | 0171 | | 1 110 010 000 | SIF | ROM 7 | | | |
| 125 | 0172 | | 1 110 010 000 | SDS | ROM 7 | | | |
| 126 | 0173 | | 1 110 010 000 | SFLG | ROM 7 | | | |
| 127 | 0174 | | 0 010 011 000 | BLNX | LDC2 | | | |
| 128 | 0175 | | 1 100 011 000 | | LDC12 | | | |
| 129 | 0176 | | 0 010 011 000 | | LDC2 | | | |
| 130 | 0177 | | 1 110 011 000 | BNX | LDC14 | | | |
| 131 | 0200 | 0320 | 1 101 000 011 | | BRN | BX | | |
| 132 | 0201 | 0162 | 0 111 001 101 | BX/12 | JSB | SX | | |
| 133 | 0202 | 0153 | 0 110 110 001 | | JSB | S/ | | |
| 134 | 0203 | | 1 001 011 000 | | LDC9 | | | |
| 135 | 0204 | | 0 001 011 000 | | LDC1 | | | |
| 136 | 0205 | 0333 | 0 001 101 111 | | BRN | 2 | | |
| 137 | 0206 | 0166 | 0 111 011 101 | BSUBL | JSB | SSUB | | |
| 138 | 0207 | 0165 | 0 111 011 001 | BLBL | JSB | SLBL | LBL | |
| 139 | 0210 | 0111 | 0 100 100 111 | | BRN | DONE | | |
| 140 | 0211 | | 0 000 000 000 | | DUMMY | | | |
| 141 | 0212 | | 0 000 000 000 | | DUMMY | | | |
| 142 | 0213 | 0157 | 0 111 000 001 | BRND | JSB | SRND | | |
| 143 | 0214 | 0111 | 0 100 100 111 | | BRN | DONE | | |
| 144 | 0215 | | 0 110 011 000 | BEND | LDC6 | | | |
| 145 | 0216 | | 0 101 011 000 | | LDC5 | | | |
| 146 | 0217 | | 0 110 011 000 | BND | LDC6 | | | |
| 147 | 0220 | | 1 110 011 000 | BD | LDC14 | | | |
| 148 | 0221 | 0155 | 0 110 111 001 | | JSB | SD | | |
| 149 | 0222 | | 1 000 000 100 | SSB | SSB | | | |
| 150 | 0223 | 0111 | 0 100 100 111 | | BRN | DONE | | |
| 151 | 0224 | 0202 | 0 000 001 011 | SUBLBX | BRN | BSUBX | SUBLBX | |
| 152 | 0225 | 0206 | 1 000 011 011 | SUBLBL | BRN | BSUBL | SUBLBL | |
| 153 | 0226 | 0166 | 0 111 011 101 | SUB | JSB | SSUB | SUBXXXX | WHERE XXXX = LOCATION OF SUBROUTINE |
| 154 | 0227 | 0111 | 0 100 100 111 | | BRN | DONE | | |
| 155 | 0230 | | 1 001 011 000 | B1/X | LDC9 | | | |
| 156 | 0231 | | 0 001 011 000 | | LDC1 | | | |
| 157 | 0232 | 0153 | 0 110 110 001 | | JSB | S/ | | |
| 158 | 0233 | 0162 | 0 111 001 101 | | JSB | SX | | |
| 159 | 0234 | 0111 | 0 100 100 111 | | BRN | DONE | | |
| 160 | 0235 | 0154 | 0 110 110 101 | BSTO | JSB | SSTO | | |
| 161 | 0236 | 0111 | 0 100 100 111 | | BRN | DONE | | |
| 162 | 0237 | | 0 000 000 000 | | DUMMY | | | |
| 163 | 0240 | | 0 111 101 110 | | W.CP1C | | F01 | |
| 164 | 0241 | | 0 111 101 110 | | W.CP1C | | F02 | |
| 165 | 0242 | | 0 111 101 110 | | W.CP1C | | F03 | |
| 166 | 0243 | | 0 111 101 110 | | W.CP1C | | F04 | |
| 167 | 0244 | | 0 111 101 110 | | W.CP1C | | F05 | |
| 168 | 0245 | | 0 111 101 110 | | W.CP1C | | F06 | |
| 169 | 0246 | | 0 111 101 110 | | W.CP1C | | F07 | |
| 170 | 0247 | | 0 111 101 110 | | W.CP1C | | F08 | |
| 171 | 0250 | | 0 111 101 110 | | W.CP1C | | F09 | |
| 172 | 0251 | | 0 111 101 110 | | W.CP1C | | F10 | |
| 173 | 0252 | | 0 111 101 110 | | W.CP1C | | F11 | |
| 174 | 0253 | | 0 111 101 110 | | W.CP1C | | F12 | |
| 175 | 0254 | | 0 111 101 110 | | W.CP1C | | F13 | |
| 176 | 0255 | | 0 111 101 110 | | W.CP1C | | F14 | |
| 177 | 0256 | | 0 111 101 110 | | W.CP1C | | F15 | |
| 178 | 0257 | | 1 110 010 000 | | ROM 7 | | | |
| 179 | 0260 | 0160 | 0 111 000 101 | BCLDS | JSB | SCL | | |
| 180 | 0261 | 0171 | 0 111 101 001 | | JSB | SDS | | |
| 181 | 0262 | 0111 | 0 100 100 111 | | BRN | DONE | | |
| 182 | 0263 | 0154 | 0 110 110 101 | STOP | JSB | SSTO | STOP | |
| 183 | 0264 | | 0 111 011 000 | | LDC7 | | | |
| 184 | 0265 | | 0 000 011 100 | L0D | PRS | | | |
| 185 | 0266 | 0111 | 0 100 100 111 | | BRN | DONE | | |
| 186 | 0267 | 0230 | 1 001 100 011 | 1/X | BRN | B1/X | 1/X | |
| 187 | 0270 | 0167 | 0 111 100 001 | EXPX | JSB | SEX | EXPX | |
| 188 | 0271 | | 0 111 011 000 | | LDC7 | | | |
| 189 | 0272 | | 0 000 011 000 | | LDC0 | | | |
| 190 | 0273 | 0162 | 0 111 001 101 | | JSB | SX | | |
| 191 | 0274 | 0111 | 0 100 100 111 | | BRN | DONE | | |
| 192 | 0275 | 0170 | 0 111 100 101 | IF0 | JSB | SIF | IF0 | |
| 193 | 0276 | 0023 | 0 001 001 111 | | BRN | 0 | | |
| 194 | 0277 | 0171 | 0 111 101 001 | BDS+ | JSB | SDS | | |
| 195 | 0300 | 0040 | 0 010 000 011 | | BRN | + | | |

TYPEWRITER INTERFACE LISTING (ROM 6) - Continued

```
CURR  BRAN   OPERATION CODE
ADDR  ADDR   BIT PATTERN

0301  0171   0 111 101 001  BDS-    JSB    SDS
0302  0050   0 010 100 011          BRN    -
0303         0 111 011 000  BSFLG   LDC7
0304         0 011 011 000          LDC3
0305  0172   0 111 101 101  BFLG    JSB    SFLG
0306  0111   0 100 100 111          BRN    DONE
0307  0164   0 111 010 101  BJMPX   JSB    SJMP
0310  0165   0 111 011 001          JSB    SLBL
0311  0066   0 011 011 011          BRN    JLBLX
0312  0170   0 111 100 101  IF+     JSB    SIF      IF+
0313  0040   0 010 000 011          BRN    +
0314  0160   0 111 000 101  BCL     JSB    SCL
0315  0111   0 100 100 111          BRN    DONE
0316  0170   0 111 100 101  IF-     JSB    SIF      IF-
0317  0050   0 010 100 011          BRN    -
0320  0162   0 111 001 101  BX      JSB    SX
0321  0111   0 100 100 111          BRN    DONE
0322  0170   0 111 100 101  IFLE    JSB    SIF      IFLE
0323  0064   0 011 010 011          BRN    LE1
0324         0 000 000 000          DUMMY
0325  0114   0 100 110 011  PRTDS   BRN    BPRTDS   PRTDS
0326  0260   1 011 000 011  CLDS    BRN    BCLDS    CLDS
0327  0277   1 011 111 111  DS+     BRN    BDS+     DS+
0330  0301   1 100 000 111  DS-     BRN    BDS-     DS-
0331  0235   1 001 110 111  STO     BRN    BSTO     STO
0332         1 110 010 000  ACC+    ROM 7           ACC+
0333         1 110 010 000  ACC-    ROM 7           ACC-
0334         1 110 010 000  ACC*    ROM 7           ACC*
0335         1 110 010 000  ACC/    ROM 7           ACC/
0336  0370   1 111 100 011  RCL     BRN    SRCL     RCL
0337  0167   0 111 100 001  EXCH    JSB    SEX      EXCH
0340  0163   0 111 010 001          JSB    SC
0341  0127   0 101 011 111          BRN    BH
0342         1 110 010 000  RET     ROM 7           RET
0343  0164   0 111 010 101  BJMPL   JSB    SJMP
0344  0207   1 000 011 111          BRN    BLBL
0345         0 000 000 000          DUMMY
0346  0303   1 100 001 111  SAFLG   BRN    BSFLG    SFLG
0347  0170   0 111 100 101  IFFLG   JSB    SIF      IFFLG
0350  0305   1 100 010 111          BRN    BFLG
0351         0 101 100 100  RSS     RSS
0352  0111   0 100 100 111          BRN    DONE
0353  0307   1 100 011 111  JMPLBX  BRN    BJMPX    JMPLBX
0354  0343   1 110 001 111  JMPLBL  BRN    BJMPL    JMPLBL
0355  0164   0 111 010 101  JMP     JSB    SJMP     JMPXXXX     WHERE XXXX = LOCATION OF JUMP
0356  0111   0 100 100 111          BRN    DONE
0357         0 000 000 000          DUMMY
0360         0 000 000 000          DUMMY
0361         0 000 000 000          DUMMY
0362  0201   1 000 000 111  X/12    BRN    BX/12    X/12
0363         0 110 011 000  ADV     LDC6            ADV
0364         0 001 011 000          LDC1
0365  0155   0 110 111 001          JSB    SD
0366         0 111 011 000          LDC7
0367  0125   0 101 010 111          BRN    L60
0370         0 111 011 000  SRCL    LDC7
0371         0 010 011 000          LDC2
0372  0314   1 100 110 011          BRN    BCL
0373  0215   1 000 110 111  SAEND   BRN    BEND     END
0374         1 110 010 000  LOGX    ROM 7           LOGX
0375  0174   0 111 110 011  LNX     BRN    BLNX     LNX
0376         1 110 010 000  CALL    ROM 7           CALL
0377         0 000 000 000          DUMMY
```

TYPEWRITER INTERFACE LISTING (ROM 7)

```
CURR  BRAN   OPERATION CODE
ADDR  ADDR   BIT PATTERN

0000         0 110 011 000          LDC6
0001         0 001 011 000          LDC1
0002         0 110 011 000          LDC6
0003         1 100 011 000          LDC12
0004         0 110 011 000          LDC6
0005         1 100 011 000          LDC12
0006         1 001 000 100  CALL1   SS9
0007  0112   0 100 101 011          BRN    DONE
0010         0 000 000 000          DUMMY
0011         1 100 010 000  /       ROM 6
0012         1 100 010 000  AST     ROM 6
0013         0 010 101 000  FLG1    CXM             RESTORE FLAG
0014         0 100 010 000          ROM 2           CONTINUE TESTS IN ROM 2
0015         0 010 101 000          CXM             EXCHANGE FLAG AND DATA
0016         0 001 111 110          S,CM1           DOES OP LEVEL = 07
0017  0013   0 000 101 111          BRN    FLG1     NO, CONTINUE ROUTINE
0020         1 000 001 100          PT8             YES, SET POINTER TO LOAD FLAG
0021  0324   1 101 010 011          BRN    SETFLG   CONTINUE ROUTINE
0022         0 111 011 000  BSTO    LDC7
0023         0 011 011 000          LDC3
0024         0 111 011 000          LDC7
0025         0 100 011 000          LDC4
0026         0 110 011 000          LDC6
0027  0071   0 011 100 111          BRN    LISR
0030         0 111 011 000  BAND    LDC7
0031         0 010 011 000          LDC2
0032         0 110 011 000          LDC6
0033         1 110 011 000          LDC14
0034  0063   0 011 001 111          BRN    BD
0035         0 000 000 000          DUMMY
0036         0 000 000 000          DUMMY
0037         1 100 010 000  +       ROM 6
0040         0 110 011 000  BCL     LDC6
0041         0 011 011 000          LDC3
0042         0 110 011 000          LDC6
0043         1 100 011 000          LDC12
0044  0132   0 101 101 011          BRN    RETURN
0045         0 000 000 000          DUMMY
```

TYPEWRITER INTERFACE LISTING (ROM 7) – Continued

| CURR ADDR | BRAN ADDR | OPERATION CODE BIT PATTERN | | | | |
|---|---|---|---|---|---|---|
| 0046 | | 0 000 000 000 | | DUMMY | | |
| 0047 | | 1 100 010 000 | - | ROM 6 | | |
| 0050 | | 0 111 011 000 | BPRT | LDC7 | | |
| 0051 | | 0 000 011 000 | | LDC0 | | |
| 0052 | | 0 111 011 000 | | LDC7 | | |
| 0053 | | 0 010 011 000 | | LDC2 | | |
| 0054 | | 0 111 011 000 | | LDC7 | | |
| 0055 | 0064 | 0 011 010 011 | | BRN | L4R | |
| 0056 | | 0 110 011 000 | BLE | LDC6 | | |
| 0057 | | 1 100 011 000 | | LDC12 | | |
| 0060 | | 0 110 011 000 | | LDC6 | | |
| 0061 | | 0 101 011 000 | | LDC5 | | |
| 0062 | 0132 | 0 101 101 011 | | BRN | RETURN | |
| 0063 | | 0 110 011 000 | BD | LDC6 | | |
| 0064 | | 0 100 011 000 | L4R | LDC4 | | |
| 0065 | 0132 | 0 101 101 011 | | BRN | RETURN | |
| 0066 | | 0 000 000 000 | | DUMMY | | |
| 0067 | | 0 000 010 000 | SUPVR | ROM 0 | | RETURN TO SUPERVISOR IN ROM 0 |
| 0070 | | 0 001 011 000 | B/ | LDC1 | | |
| 0071 | | 1 111 011 000 | L15R | LDC15 | | |
| 0072 | 0132 | 0 101 101 011 | | BRN | RETURN | |
| 0073 | | 0 110 011 000 | BEX | LDC6 | | |
| 0074 | | 0 101 011 000 | | LDC5 | | |
| 0075 | | 0 111 011 000 | BX | LDC7 | | |
| 0076 | | 1 000 011 000 | L8R | LDC8 | | |
| 0077 | 0132 | 0 101 101 011 | | BRN | RETURN | |
| 0100 | | 1 100 011 000 | LOG | LDC12 | | |
| 0101 | | 0 110 011 000 | | LDC6 | | |
| 0102 | | 1 111 011 000 | | LDC15 | | |
| 0103 | | 0 110 011 000 | | LDC6 | | |
| 0104 | | 0 111 011 000 | | LDC7 | | |
| 0105 | | 0 111 011 000 | | LDC7 | | |
| 0106 | | 1 000 011 000 | | LDC8 | | |
| 0107 | 0112 | 0 100 101 011 | | BRN | DONE | |
| 0110 | 0137 | 0 110 000 001 | | JSB | ACC | |
| 0111 | 0112 | 0 100 101 011 | | BRN | DONE | |
| 0112 | 0242 | 1 010 001 101 | DONE | JSB | SHIFT | |
| 0113 | 0123 | 0 101 001 111 | DONE1 | BRN | WAIT | |
| 0114 | | 1 001 101 100 | DONE3 | YP9 | | |
| 0115 | 0127 | 0 101 011 111 | | BRN | DONE2 | |
| 0116 | | 1 010 010 000 | LIST | ROM 5 | | |
| 0117 | | 0 000 111 100 | DONE9 | PLS | | |
| 0120 | | 0 000 111 100 | | PLS | | |
| 0121 | 0243 | 1 010 010 001 | | JSB | SHIFT1 | |
| 0122 | 0113 | 0 100 101 111 | | BRN | DONE1 | |
| 0123 | | 1 010 010 000 | WAIT | ROM 5 | | |
| 0124 | | 0 110 011 000 | BC | LDC6 | | |
| 0125 | 0233 | 1 001 101 111 | | BRN | L3R | |
| 0126 | 0114 | 0 100 110 011 | | BRN | DONE3 | |
| 0127 | | 1 010 101 100 | DONE2 | YP10 | | |
| 0130 | 0117 | 0 100 111 111 | | BRN | DONE9 | |
| 0131 | 0116 | 0 100 111 011 | | BRN | LIST | |
| 0132 | | 1 100 010 000 | RETURN | ROM 6 | | |
| 0133 | | 0 110 011 000 | CHS | LDC6 | | |
| 0134 | | 1 000 011 000 | | LDC8 | | |
| 0135 | | 0 111 011 000 | | LDC7 | | |
| 0136 | | 0 011 011 000 | | LDC3 | | |
| 0137 | 0112 | 0 100 101 011 | | BRN | DONE | |
| 0140 | | 0 110 011 000 | ACC | LDC6 | | |
| 0141 | | 0 001 011 000 | | LDC1 | | |
| 0142 | | 0 110 011 000 | | LDC6 | | |
| 0143 | | 0 011 011 000 | | LDC3 | | |
| 0144 | | 0 110 011 000 | C | LDC6 | | |
| 0145 | | 0 011 011 000 | | LDC3 | | |
| 0146 | | 0 000 110 000 | | RETURN | | |
| 0147 | | 0 110 010 000 | LCI02 | ROM 3 | | CONTINUE ROUTINE |
| 0150 | 0137 | 0 110 000 001 | BACC/ | JSB | ACC | |
| 0151 | 0011 | 0 000 100 111 | | BRN | / | |
| 0152 | 0137 | 0 110 000 001 | BACC* | JSB | ACC | |
| 0153 | 0012 | 0 000 101 011 | | BRN | AST | |
| 0154 | | 0 000 000 000 | | DUMMY | | |
| 0155 | 0070 | 0 011 100 011 | S/ | BRN | B/ | |
| 0156 | 0022 | 0 001 001 011 | SSTO | BRN | BSTO | |
| 0157 | 0063 | 0 011 001 111 | SD | BRN | BD | |
| 0160 | 0056 | 0 010 111 011 | SLE | BRN | BLE | |
| 0161 | 0030 | 0 001 100 011 | SRND | BRN | BRND | |
| 0162 | 0040 | 0 010 000 011 | SCL | BRN | BCL | |
| 0163 | 0050 | 0 010 100 011 | SPRT | BRN | BPRT | |
| 0164 | 0075 | 0 011 110 111 | SX | BRN | BX | |
| 0165 | 0124 | 0 101 010 011 | SC | BRN | BC | |
| 0166 | 0305 | 1 100 010 111 | SJMP | BRN | BJMP | |
| 0167 | 0203 | 1 000 001 111 | SLBL | BRN | BLBL | |
| 0170 | 0213 | 1 000 101 111 | SSUB | BRN | BSUB | |
| 0171 | 0073 | 0 011 101 111 | SEX | BRN | BEX | |
| 0172 | 0223 | 1 001 001 111 | SIF | BRN | BIF | |
| 0173 | 0230 | 1 001 100 011 | SDS | BRN | BDS | |
| 0174 | | 0 110 011 000 | SFLG | LDC6 | | |
| 0175 | | 0 110 011 000 | | LDC6 | | |
| 0176 | | 0 110 011 000 | | LDC6 | | |
| 0177 | | 1 100 011 000 | | LDC12 | | |
| 0200 | | 0 110 011 000 | | LDC6 | | |
| 0201 | | 0 111 011 000 | | LDC7 | | |
| 0202 | 0132 | 0 101 101 011 | | BRN | RETURN | |
| 0203 | | 0 101 000 100 | BLBL | SS5 | | |
| 0204 | | 0 110 011 000 | | LDC6 | | |
| 0205 | | 1 100 011 000 | | LDC12 | | |
| 0206 | | 0 110 011 000 | | LDC6 | | |
| 0207 | | 0 010 011 000 | | LDC2 | | |
| 0210 | | 0 110 011 000 | | LDC6 | | |
| 0211 | | 1 100 011 000 | | LDC12 | | |
| 0212 | 0132 | 0 101 101 011 | | BRN | RETURN | |
| 0213 | | 0 111 011 000 | BSUB | LDC7 | | |
| 0214 | | 0 011 011 000 | | LDC3 | | |
| 0215 | | 0 111 011 000 | | LDC7 | | |
| 0216 | | 0 101 011 000 | | LDC5 | | |
| 0217 | | 0 110 011 000 | | LDC6 | | |
| 0220 | | 0 010 011 000 | | LDC2 | | |
| 0221 | | 0 110 000 100 | BLBL1 | SS6 | | |
| 0222 | 0132 | 0 101 101 011 | | BRN | RETURN | |
| 0223 | | 0 110 011 000 | BIF | LDC6 | | |

TYPEWRITER INTERFACE LISTING (ROM 7) – Continued

| CURR ADDR | BRAN ADDR | OPERATION CODE BIT PATTERN | | | | |
|---|---|---|---|---|---|---|
| 0224 | | 1 001 011 000 | | LDC9 | | |
| 0225 | | 0 110 011 000 | | LDC6 | | |
| 0226 | | 0 110 011 000 | | LDC6 | | |
| 0227 | 0132 | 0 101 101 011 | | BRN | RETURN | |
| 0230 | | 0 110 011 000 | BDS | LDC6 | | |
| 0231 | | 0 100 011 000 | | LDC4 | | |
| 0232 | | 0 111 011 000 | | LDC7 | | |
| 0233 | | 0 011 011 000 | L3R | LDC3 | | |
| 0234 | 0132 | 0 101 101 011 | | BRN | RETURN | |
| 0235 | | 1 010 010 000 | CR/LF2 | ROM 5 | | |
| 0236 | 0337 | 1 101 111 111 | | BRN | TABC | |
| 0237 | | 0 000 000 000 | | DUMMY | | |
| 0240 | | 0 000 000 000 | | DUMMY | | |
| 0241 | | 0 000 000 000 | | DUMMY | | |
| 0242 | | 0 000 000 000 | | DUMMY | | |
| 0243 | | 0 111 110 000 | SHIFT | CTT | | |
| 0244 | | 0 101 000 000 | SHIFT1 | IS2 | | |
| 0245 | | 0 100 001 000 | | SLT | | |
| 0246 | | 0 100 001 000 | | SLT | | |
| 0247 | | 0 100 001 000 | | SLT | | |
| 0250 | | 0 100 001 000 | | SLT | | |
| 0251 | | 0 100 001 000 | | SLT | | |
| 0252 | | 0 100 001 000 | | SLT | | |
| 0253 | | 0 100 001 000 | | SLT | | |
| 0254 | | 0 100 001 000 | | SLT | | |
| 0255 | | 0 100 101 000 | | IXT | | |
| 0256 | | 1 001 000 000 | | IS1 | | |
| 0257 | | 0 000 110 000 | | RETURN | | |
| 0260 | | 0 110 001 110 | | W,CTA | | |
| 0261 | | 0 001 001 100 | | PT1 | | |
| 0262 | | 0 001 011 000 | | LDC1 | | |
| 0263 | | 0 110 011 000 | | LDC6 | | |
| 0264 | | 1 110 101 110 | | W,AXC | | |
| 0265 | | 1 101 001 110 | | W,AMCA | | |
| 0266 | | 1 101 111 010 | | XS,AM1A | | |
| 0267 | | 0 100 001 110 | | W,SLA | | |
| 0270 | | 0 100 001 110 | | W,SLA | | |
| 0271 | | 1 011 001 010 | | X,SRA | | |
| 0272 | | 1 101 111 010 | | XS,AM1A | | |
| 0273 | | 0 000 111 100 | FBSHIFT | PLS | | |
| 0274 | | 0 100 001 110 | | W,SLA | | |
| 0275 | | 0 100 101 100 | | YP4 | | |
| 0276 | 0273 | 1 011 101 111 | | BRN | FBSHIFT | |
| 0277 | | 1 011 001 100 | | PT11 | | |
| 0300 | | 1 110 101 110 | | W,AXC | | |
| 0301 | | 0 110 011 000 | | LDC6 | | |
| 0302 | | 0 110 011 000 | | LDC6 | | |
| 0303 | | 0 101 001 100 | | PT5 | | |
| 0304 | 0112 | 0 100 101 011 | | BRN | DONE | |
| 0305 | | 0 110 011 000 | BJMP | LDC6 | | |
| 0306 | | 1 010 011 000 | | LDC10 | | |
| 0307 | | 0 110 011 000 | | LDC6 | | |
| 0310 | | 1 101 011 000 | | LDC13 | | |
| 0311 | | 0 111 011 000 | | LDC7 | | |
| 0312 | | 0 000 011 000 | | LDC0 | | |
| 0313 | 0221 | 1 001 000 111 | | BRN | BLBL1 | |
| 0314 | | 0 000 000 000 | | DUMMY | | |
| 0315 | | 0 000 000 000 | | DUMMY | | |
| 0316 | | 0 010 101 000 | FLG2 | CXM | | RESTORE FLAG AND DATA |
| 0317 | | 0 100 010 000 | | ROM 2 | | GO TO ROM 2 TO CONTINUE TESTS |
| 0320 | | 0 010 101 000 | | CXM | | EXCHANGE FLAG AND DATA |
| 0321 | | 0 001 111 110 | | S,CM1 | | DOES OP LEVEL =.0? |
| 0322 | 0316 | 1 100 111 011 | | BRN | FLG2 | NO, CONTINUE TESTS |
| 0323 | | 0 111 001 100 | | PT7 | | YES, SET POINTER TO LOAD FLAG |
| 0324 | | 1 001 011 000 | SETFLG | LDC9 | | SET FLAG |
| 0325 | | 0 010 101 000 | | CXM | | RESTORE FLAG AND DATA |
| 0326 | 0067 | 0 011 011 111 | | BRN | SUPVR | RETURN TO SUPERVISOR |
| 0327 | 0137 | 0 110 000 001 | BACC- | JSB | ACC | |
| 0330 | 0047 | 0 010 011 111 | | BRN | - | |
| 0331 | 0137 | 0 110 000 001 | BACC+ | JSB | ACC | |
| 0332 | 0037 | 0 001 111 111 | | BRN | + | |
| 0333 | 0331 | 1 101 100 111 | ACC+ | BRN | BACC+ | |
| 0334 | 0327 | 1 101 011 111 | ACC- | BRN | BACC- | |
| 0335 | 0152 | 0 110 101 011 | ACC* | BRN | BACC* | |
| 0336 | 0150 | 0 110 100 011 | ACC/ | BRN | BACC/ | |
| 0337 | | 0 111 001 100 | TABC | PT7 | | SET POINTER TO TAB FLAG |
| 0340 | | 0 001 100 010 | | P,CM1 | | IS FLAG SET ? |
| 0341 | 0363 | 1 111 001 111 | | BRN | TAB | YES, OUTPUT A TAB |
| 0342 | 0354 | 1 110 110 011 | | BRN | PRETURN | NO, RETURN TO ROUTINE |
| 0343 | | 0 111 011 000 | RET | LDC7 | | |
| 0344 | | 0 010 011 000 | | LDC2 | | |
| 0345 | | 0 110 011 000 | | LDC6 | | |
| 0346 | | 0 101 011 000 | | LDC5 | | |
| 0347 | | 0 111 011 000 | | LDC7 | | |
| 0350 | | 0 100 011 000 | | LDC4 | | |
| 0351 | 0112 | 0 100 101 011 | | BRN | DONE | |
| 0352 | | 0 000 000 000 | | DUMMY | | |
| 0353 | | 0 000 000 000 | | DUMMY | | |
| 0354 | | 0 110 010 000 | PRETURN | ROM 3 | | DO NOT TAB |
| 0355 | | 0 110 100 100 | | RS6 | | RESET SCIENTIFIC NOTATION FLAG |
| 0356 | | 1 010 101 000 | | MTC | | RECALL TFLAG FOR FUNCTION TEST |
| 0357 | | 1 000 001 100 | CR/LF | PT8 | | SET POINTER TO CR/LF FLAG |
| 0360 | | 0 001 100 010 | | P,CM1 | | IS FLAG SET ? |
| 0361 | 0370 | 1 111 100 011 | | BRN | CR/LF1 | YES, OUTPUT CR/LF |
| 0362 | 0337 | 1 101 111 111 | | BRN | TABC | NO, CHECK IF TAB FLAG IS SET |
| 0363 | | 0 101 000 000 | TAB | IS2 | | PREPARE TO LOAD CODE FOR TAB |
| 0364 | 0037 | 0 010 000 001 | | LIO 100 | | LOAD TAB CODE |
| 0365 | | 0 101 101 000 | | SRI | | SHIFT CODE TO OUTPUT POSTTION |
| 0366 | | 1 001 000 000 | | IS1 | | PREPARE TO RETURN |
| 0367 | 0147 | 0 110 011 111 | | BRN | LCIO2 | OUTPUT TAB |
| 0370 | | 0 101 000 000 | CR/LF1 | IS2 | | PREPARE TO LOAD CODE FOR CR/LF |
| 0371 | 0002 | 0 000 001 101 | | LIO | 006 | LOAD CODE FOR CR/LF |
| 0372 | | 0 101 101 000 | | SRI | | SHIFT CODE TO OUTPUT POSTTION |
| 0373 | | 1 001 000 000 | | IS1 | | PREPARE TO RETURN |
| 0374 | 0235 | 1 001 110 111 | | BRN | CR/LF2 | OUTPUT CR/LF |
| 0375 | | 0 110 011 000 | LOGX | LDC6 | | |
| 0376 | 0100 | 0 100 000 011 | | BRN | LOG | |
| 0377 | 0143 | 0 110 010 001 | CALL | JSB | C | |

CALCULATOR OPERATION

The basic calculator contains three register locations into which numbers are either entered for immediate use or are stored for later use. These are the X-register, C-register, and RT-register.

Each number which the user enters from the keyboard is placed in the X-register. If the calculator is configured with the plug-in LED display unit, the number is displayed as it is entered. The X-register also receives the result of each mathematical operation.

Each time the EQUALS key is actuated, a result is generated, which is placed in the X-register and also added to the contents of the RT-register for accumulating the result total.

The C-register may be used for storing any constant for later use in making calculations. Whenever the STORE key is actuated, the contents of the X-register are duplicated (stored) in the C-register. Any constant stored in the C-register remains unaltered until either another constant is stored therein or the calculator is switched off. The RECALL key is used to bring the contents of the C-register back into the X-register.

Actuating the CLEAR key erases the contents of the X and RT registers and causes the word CLEAR to be printed on the output printer. CLEAR operations leave the contents of the C-register unaltered.

Actuating the CANCEL ENTRY key erases the X-register but leaves the C and RT registers unaltered.

When operating power to the calculator is removed all storage registers are erased.

In addition to printing CLEAR and tallying keyboard operations, the calculator informs the user of his operating errors by printing diagnostic notes when an error has been made. A table of diagnostic notes appears later herein. Some errors may be readily corrected, while others may require that the CLEAR key be actuated and the problem begun again.

The four basic arithmetic operations comprising addition, substraction, multiplication, and division may be easily accomplished with the calculator. The first operand is entered; the desired operation key is actuated; the second operand is entered; and then the EQUALS key is actuated to execute the calculation. The result is placed in the X-register. When performing calculations involving more than one operator, each successive operation uses the result of the previous operation.

A red busy light on the keyboard flashes whenever the calculator is performing a function and cannot accept key actuations. When the calculator is executing a library program stored in a plug-in ROM or PROM, the busy light may remain on for several seconds. This light simply serves to remind the operator that the calculator will ignore any key actuations which occur during the time it is busy.

Negative numbers are entered by first keying in the number and then changing its sign. The sign is changed by successively actuating the SHIFT key and the LEFT PARENTHESIS key. Negative numbers are printed in red on the output printer.

As discussed above, the calculator performs successive mathematical operations by using the result of the previous operation. By using the LEFT PARENTHESIS and RIGHT PARENTHESIS keys, operations may be grouped together just as is done in standard mathematical notation involving parentheses. Use of parentheses in expressions eliminates the need for storing and recalling intermediate results. The output printer prints the result of each operation within parentheses at the time each right parenthesis is entered. Parentheses may be nested up to and including five levels.

The EXPONENT key is used to raise any number to any power. The number to be raised is entered, followed by the EXPONENT key, followed by the power.

The PERCENT key may be used in conjunction with all four arithmetic operators to calculate, for example, a percentage of a number in the X-register or to further use a percentage of a number in the X-register within a calculation. For example, if it is desired to calculate 6% of 39.95, the user would enter 39.95, followed by the MULTIPLY key, followed by 6, followed by the PERCENT key, terminated by the EQUALS key, to give a result of 2.40. As a further example, if the user wishes to discount or subtract 20% from 80, he would first enter 80, followed by the SUBTRACT key, followed by 20, followed by the PERCENT key, terminated by the EQUALS key, to give a result of 64. As a final example, if it is desired to calculate the simple interest for a term of 2 years on $500 at 7%, the user would first enter 500, followed by the MULTIPLY key, followed by 7, followed by the PERCENT key, followed by the MULTIPLY key, followed by 2, terminated by the EQUALS key, to give a result of $70.

The output printer unit is associated with several keys which control its operation. The PRINT OFF key suppresses tallying of keyboard operations on the printer, but allows printing of the diagnostic notes plus CLEAR. Actuation of the PRINT key prints the current contents of the X-register, regardless of whether the PRINT OFF mode is in effect. The symbol # accompanies each number printed by actuating the PRINT key. The PAPER key is used to quickly advance the printer paper. When the calculator is turned on the display and print format is automatically set to ROUND 2. This means that each number displayed and/or printed is shown with two digits to the right of the decimal point. This format can be altered to indicate from zero to six decimal point digits by actuating the ROUND key followed by the appropriate number. Printed and displayed numbers may be shown in floating point, or scientific notation by actuating the ROUND key followed by the DECIMAL POINT key.

Some of the calculator keys represent dual functions, distinguished by whether actuation has been preceded by actuation of the SHIFT key. Actuation of the SHIFT key followed by the EXPONENT key operates to calculate the reciprocal of the contents of the X-register. Actuation of the SHIFT key followed by the DIVIDE key results in calculating the common logarithm of the number in the X-register. Actuation of the SHIFT key followed by the MULTIPLY key is used to calculate the natural logarithm of the contents of the X-register.

Actuation of the SHIFT key followed by the ADD key operates to raise the Naperian logarithm base e to the power indicated by the contents of the X-register. Actuation of the SHIFT key followed by the SUBTRACT key acts to divide the number in the X-register by 12.

When solving problems involving the entry of many numbers in the same form, such as dollars and cents, the AUTO DECIMAL POINT key may be used to automatically place the decimal point at a specified position in each number entry. This eliminates physically depressing the DECIMAL POINT key at the proper point during entry of each number. The place at which the decimal point is automatically located is specified by the current rounding format. For instance, if the calculator is operating in round 2 format and the automatic decimal point feature is being used, the decimal point will be placed so that two digits will be indicated to the right thereof.

The RT-register accumulates results that are placed in the X-register each time the EQUALS key is actuated. To recall the contents of the RT-register to the X-register, and at the same time display and print the new contents of the X-register, the user simply actuates the SHIFT key followed by the EQUALS key.

As described in detail earlier in this specification, the user may plug into the calculator optional data storage units. This option is available to expand the single C-register of the basic calculator in increments of 30 or 100 registers. The extra registers are numbered zero through 29 or zero through 99. To store the data currently in the X-register into one of the registers of the data storage option the SHIFT key is first actuated, followed by the STORE key, followed by the desired register number, terminated by the EQUALS key. To recall a number from optional data storage into the X-register, the same key sequence is followed except that the RECALL key is actuated instead of the STORE key. It is possible to obtain a printed listing of all the data stored in the optional registers by means of the following key sequence: SHIFT, START PROGRAM, PRINT, EQUALS. The register contents are printed in blocks of ten, beginning at register zero. To erase all of the optional data storage registers, the following key sequence is observed: SHIFT, START PROGRAM, ZERO, EQUALS. The optional data storage registers may be incremented or decremented, respectively, by actuating the SHIFT key, followed by the START PROGRAM key, followed by either the ADD key or the SUBTRACT key.

As discussed above, a plug-in read-only memory (ROM) or programmable read-only memory (PROM) may be employed with the calculator. Such a ROM or PROM may contain one or more programs written in a user level language which may be run from the calculator keyboard. The programs stored within a plug-in ROM or PROM may be generated by either the user or factory personnel by means of instruction routines stored within ROM A-ϕ of the basic calculator ROM group. Each of these routines has a starting address in ROM A-ϕ associated with it. When generating a program for implementation in a plug-in ROM or PROM, the starting address of each routine to be performed is placed in the ROM or PROM bit patterns in the order in which such routines are to be performed by the program. The available routines from which the user may select in creating a program to be implemented in a plug-in ROM or PROM include many which are not represented as keyboard functions executable in the manual mode. The table below lists each available instruction, together with its starting address in ROM A-ϕ of the basic calculator ROM group.

| INSTRUCTION ROUTINE STARTING ADDRESS | MNEMONIC | INSTRUCTON DESCRIPTION |
|---|---|---|
| 064 | START | START PROGRAM EXECUTION |
| 012 | / | FLOATING POINT DIVISION |
| 013 | * | FLOATING POINT MULTIPLICATION |
| 014 | STOX | POWER FUNCTION ($X^Y$) |
| 016 | ) | RIGHT PARENTHESIS |
| 020 | = | EQUAL |
| 022 | . | DECIMAL POINT |
| 023 | ϕ | DIGIT ZERO |
| 026 | ( | LEFT PARENTHESIS |
| 032 | 3 | DIGIT 3 |
| 033 | 2 | DIGIT 2 |
| 034 | 1 | DIGIT 1 |
| 036 | % | PERCENT |
| 040 | + | FLOATING POINT ADDITION |
| 042 | 6 | DIGIT 6 |
| 043 | 5 | DIGIT 5 |
| 044 | 4 | DIGIT 4 |
| 046 | CRCL | RECALL DATA FROM USER STORAGE REGISTER TO X-REGISTER |
| 050 | – | FLOATING POINT SUBTRACTION |
| 052 | 9 | DIGIT 9 |
| 053 | 8 | DIGIT 8 |
| 054 | 7 | DIGIT 7 |
| 056 | STO | STORE DATA INTO USER STORAGE REGISTER |
| 062 | RUN | CONTINUE PROGRAM EXECUTION |
| 063 | LE | SAT LAST ENTRY FLAG |
| 066 | CANCEL | CANCEL ENTRY |
| 070 | SHIFT | SHIFT |
| 072 | RND | ROUND |
| 073 | CLR | CLEAR WORKING REGISTERS |
| 076 | PRTX | PRINT DATA IN X-REGISTER |
| 150 | JMP– | JUMP RELATIVE BACKWARD |
| 107 | NOP | PROGRAMMED PAUSE |
| 131 | CHS | CHANGE SIGN OF DATA |
| 207 | LBL | LABEL HEAD BEGINNING |
| 152 | JMP+ | JUMP RELATIVE FORWARD |
| 224 | SUBLBX | JUMP SUBROUTINE TO COMPUTED LABEL |
| 225 | SUBLBL | JUMP SUBROUTINE TO LABEL |
| 226 | SUB | JUMP SUBROUTINE TO ADDRESS |
| 237 | TBL | CALL FUNCTION BLOCK TABLE FUNCTION ( ) |
| 240 | Fϕ1 | CALL FUNCTION BLOCK KEY FUNCTION # 1 |
| 241 | Fϕ2 | CALL FUNCTION BLOCK KEY FUNCTION # 2 |
| 242 | Fϕ3 | CALL FUNCTION BLOCK KEY FUNCTION # 3 |

-continued

| INSTRUCTION ROUTINE STARTING ADDRESS | MNEMONIC | INSTRUCTON DESCRIPTION |
|---|---|---|
| 243 | Fϕ4 | CALL FUNCTION BLOCK KEY FUNCTION # 4 |
| 224 | Fϕ5 | CALL FUNCTION BLOCK KEY FUNCTION # 5 |
| 245 | Fϕ6 | CALL FUNCTION BLOCK KEY FUNCTION # 6 |
| 246 | Fϕ7 | CALL FUNCTION BLOCK KEY FUNCTION # 7 |
| 247 | Fϕ8 | CALL FUNCTION BLOCK KEY FUNCTION # 8 |
| 250 | Fϕ9 | CALL FUNCTION BLOCK KEY FUNCTION # 9 |
| 251 | F1ϕ | CALL FUNCTION BLOCK KEY FUNCTION # 10 |
| 252 | F11 | CALL FUNCTION BLOCK KEY FUNCTION # 11 |
| 253 | F12 | CALL FUNCTION BLOCK KEY FUNCTION # 12 |
| 254 | F13 | CALL FUNCTION BLOCK KEY FUNCTION # 13 |
| 255 | F14 | CALL FUNCTION BLOCK KEY FUNCTION # 14 |
| 256 | F15 | CALL FUNCTION BLOCK KEY FUNCTION # 15 |
| 263 | STOP | STOP PROGRAM EXECUTION |
| 267 | 1/X | RECIPROCAL OF X-REGISTER |
| 270 | EXP | EXPONENTIAL FUNCTION ($e^x$) |
| 275 | IFϕ | IF DATA IS ZERO TEST |
| 300 | STEP | PROGRAM EXECUTION STEP |
| 312 | IF+ | IF DATA IS POSITIVE TEST |
| 316 | IF− | IF DATA IS NEGATIVE |
| 322 | IFLE | IF LAST ENTRY FLAG SET TEST |
| 140 | PRTACC | PRINT GRAND TOTAL FROM ACCUMULATOR |
| 325 | PRTDS | LIST DATA STORAGE OPTION REGISTERS |
| 326 | CLDS | CLEAR OPTIONAL DATA STORAGE REGISTER |
| 327 | DS+ | INCREMENT DATA STORGE GIVEN BY (C) |
| 330 | DS− | DECREMENT DATA STORAGE GIVEN BY (C) |
| 331 | STO | STORE DIRECT IN DATA STORAGE ADDRESS ( ) |
| 332 | ACC+ | CHANGE STORE TO ACCUMULATE + |
| 333 | ACC− | CHANGE STORE TO ACCUMULATE − |
| 334 | ACC* | CHANGE STORAGE TO ACCUMULATE × |
| 335 | ACC/ | CHANGE STORAGE TO ACCUMULATE ÷ |
| 336 | RCL | RECALL FROM DATA STORAGE ADDRESS ( ) |
| 337 | EXCH | EXCHANGE WITH DATA AT ADDRESS ( ) |
| 342 | RET | RETURN FROM SUBROUTINE |
| 346 | SFLG | SET FLAG ( ) |
| 347 | IFFLG | IF FLAG ( ) SET TEST |
| 353 | JMPLBX | GO TO COMPUTED LABEL |
| 354 | JMPLBL | GO TO LABEL |
| 355 | JMP | GO TO ADDRESS |
| 362 | X/12 | X-REGISTER DIVIDED BY 12 |
| 363 | ADV | PRINTER PAPER ADVANCE |
| 373 | END | PROGRAM END |
| 374 | LOGX | COMMON LOGARITHM |
| 375 | LNX | NATURAL LOGARITHM |
| 376 | CALL | CALL I/O UNIT ( ) |

Even though a plug-in ROM or PROM is employed, the calculator may still be used in the manual mode. A plug-in ROM or PROM may contain any number of separate programs, limited only by the capacity of the ROM or PROM. Separate programs may be designated by any number between zero and 900. To run a program which is the only one contained in a particular ROM or PROM it is only necessary to actuate the RUN PROGRAM key. If the program contains halts for data entry from the keyboard the user must, after each data entry, actuate the RUN/STOP key. If the ROM or PROM currently employed contains several programs, the user may begin execution of any one of them by actuating the RUN PROGRAM key, followed by the program designation number, followed by actuation of the RUN/STOP key. During execution of a ROM/-PROM program successive actuations of the RUN/-STOP key will first halt and then resume program execution.

In implementing a program in plug-in ROM or PROM, those instruction routines residing in ROM A-ϕ of the basic calculator may be utilized, as shown and described above. In addition, when one of the plug-in keyboard function blocks is employed with the calculator, additional instruction routines residing within each function block are also available for use in constructing a program in plug-in ROM or PROM.

The instruction routines available in the MATH-/USER DEFINABLE plug-in keyboard function block are shown in the table below. These functions are called by the function block table call routine TBL, located at address 237 of ROM A-ϕ and shown in the table above, by specifying the key code accompanying each instruction routine listed below.

INSTRUCTION ROUTINES IN THE TABLE OF MATH/USER DEFINABLE FUNCTION BLOCK

| KEY CODE | INSTRUCTION ROUTINE |
|---|---|
| 00 | ANGLE ENTRY (DEGREES, MINUTES, SECONDS) |
| 01 | SINE |
| 02 | COSINE |
| 03 | TANGENT |
| 04 | ARC SINE |
| 05 | ARC COSINE |
| 06 | ARC TANGENT |
| 07 | SQUARE ROOT OF X-REGISTER |
| 09 | $X^2$ |
| 10 | π (PI) |
| 11 | INTEGER OF X |
| 12 | ABSOLUTE VALUE OF X |
| 13 | RECTANGULAR TO POLAR CONVERSION |
| 14 | POLAR TO RECTANGULAR CONVERSION |
| 15 | DISPLAY DATA STORAGE REGISTER ϕ |
| 16 | VECTOR ACCUMULATE + |
| 17 | VECTOR ACCUMULATE − |
| 18 | RECALL VECTOR ACCUMULATE ± |
| 19 | CLEAR VECTOR ACCUMULATE ± |
| 20 | CONVERT DEGREES, MINUTES, SECONDS TO DECIMAL DEGREES |
| 21 | CONVERT DECIMAL DEGREES TO DEGREES, MINUTES, SECONDS |
| 22 | CONVERT GRADS TO DECIMAL DEGREES |
| 23 | CONVERT DECIMAL DEGREES TO GRADS |
| 24 | CONVERT RADIANS TO DECIMAL DEGREES |
| 25 | CONVERT DECIMAL DEGREES TO RADIANS |
| 26 | CONVERT MILS TO DECIMAL DEGREES |
| 27 | CONVERT DECIMAL DEGREES TO MILS |
| 28 | ENTER EXPONENT |

-continued

INSTRUCTION ROUTINES IN THE TABLE OF MATH/USER DEFINABLE FUNCTION BLOCK

| KEY CODE | INSTRUCTION ROUTINE |
|---|---|
| 30 | PRINT DATA STORAGE REGISTERS φ & 1 WITH X,Y LABELS |
| 31 | PRINT DATA STORAGE REGISTERS φ & 1 WITH R,A LABELS |
| 4N | STORE IN N* $0 \leq N \leq 9$ |
| 5N | RECALL FROM N* $0 \leq N \leq 9$ |

*Where N is one of the 10 data storage registers within the function block.

In addition to their availability in constructing programs for plug-in ROM or PROM, the above listed instruction routines may be called from the basic calculator keyboard in the manual mode. This is accomplished by successively actuating the SHIFT key and the DECIMAL POINT key followed by the key code of the desired instruction routine (function).

Each of the 15 keys on the MATH/USER DEFINABLE plug-in function block is associated with a particular address in a plug-in ROM or PROM. Therefore, a program written in a ROM or PROM may be arranged so that its starting address corresponds to that associated with one of the function block keys. Such a program may then be executed by simply depressing the related function block key. These keys have removable transparent caps, within which the user may insert labels identifying the program or function associated therewith.

DIAGNOSTIC NOTES

As discussed above, user errors occurring during operation of the calculator are indicated by means of a printed note. A listing of these notes with corresponding error description is given below.

| | |
|---|---|
| NOTE φφ | TOO MANY SUBROUTINE CALLS OR RETURNS |
| NOTE φ4 | FIVE PARENTHESES LEVELS ALREADY ASSIGNED |
| NOTE φ5 | RIGHT PARENTHESIS NOTE PRECEDED BY LEFT PARENTHESIS |
| NOTE φ8 | NEGATIVE NUMBER RAISED TO A NON-INTEGER POWER |
| NOTE φ9 | LOG OR LN OF A NEGATIVE NUMBER |
| NOTE 11 | BEFORE RESULT MEANS REGULAR OVERFLOW |
| | AFTER RESULT MEANS RT-REGISTER OVERFLOW |
| NOTE 12 | LOG OR LN OF ZERO |
| NOTE 15 | ZERO TO A NEGATIVE POWER |
| NOTE 16 | ATTEMPTED DIVISION BY ZERO |
| NOTE 20 | LABEL NOT FOUND |
| NOTE 21 | 1φ UNIT NOT FOUND |
| | PROGRAM MEMORY EXCEEDED |
| | PROGRAM MEMORY NOT READY |
| | DATA STORAGE SOFTWARE NOT READY |
| | FUNCTION BLOCK NOT READY |
| NOTE 22 | RIGHT PARENTHESIS AFTER AN OPERATION |
| NOTE 24 | EQUAL SIGN INSIDE PARENTHESES |
| NOTE 26 | DATA STORAGE ADDRESS NOT FOUND |

We claim:

1. In an electronic calculator including a keyboard input unit for entering information into the calculator, a memory unit for storing sequences of instructions to be performed by the calculator in making selected calculations, computing means responsive to information from the keyboard input unit and to operating states within the calculator itself for selectively performing selected ones of the sequences of instructions stored in the memory unit to make selected calculations employing data entered from the keyboard input unit and to give an output indication of the results of those calculations, wherein the improvement comprises a plug-in modular keyboard section, integrally including at least one key and an associated read-only memory containing additional sequences of instructions, for providing the user with additional keyboard functions.

2. An electronic calculator comprising:

a keyboard input unit for providing the user with a plurality of keyboard functions and for entering into the calculator commands used to initiate selected ones of those keyboard functions and data used in making selected calculations to perform the selected keyboard functions;

means for storing commands and data entered into the calculator;

a memory unit for storing sequences of instructions to be performed by the calculator in making the selected calculations to perform the selected keyboard functions;

a plug-in modular keyboard section, integrally including read-only memory means storing additional sequences of instructions, for providing the user with additional keyboard functions and for entering into the calculator commands used to initiate selected ones of those additional keyboard functions; and computing means responsive to commands from the keyboard input unit and to operating states within the calculator itself for selectively performing selected ones of the sequences of instructions stored in the memory unit to make the selected calculations employing data entered from the keyboard input unit and to give an output indication of the results of those calculations, said computing means being responsive to commands from the plug-in modular keyboard section and to operating states within the calcuator itself for selectively performing selected ones of the additional sequences of instructions stored in the read-only memory means to make selected calculations employing data entered from at least one of the keyboard input unit and the plug-in modular keyboard section and to give an output indication of the results of those calculations.

3. An electronic calculator as in claim 2 wherein said keyboard input unit includes a receptacle into which said plug-in modular keyboard section may be removably plugged, and said keyboard input unit and said plug-in modular keyboard section include electrical connection means for electrically connecting said keyboard input unit and said plug-in modular keyboard section.

4. An electronic calculator as in claim 3 wherein said plug-in modular keyboard section includes a plurality of keys, each of which is associated with a predetermined one of said additional keyboard functions.

5. An electronic calculator as in claim 3 wherein said plug-in modular keyboard section includes a plurality of keys, each of which may be associated with a function defined by the user.

6. An electronic calculator as in claim 2 wherein:

said keyboard input unit includes a plurality of command keys and a plurality of data keys for entering into the calculator keyboard commands and data associated with separate mnemonic codes;

said memory unit is employed for storing microprogrammed sequences of instructions to be performed by the calculator in executing selected keyboard commands;

said read-only memory mens of the plug-in modular keyboard section comprises first read-only memory means;

said calculator includes second read-only memory means coupled to said keyboard input unit and storing keyboard mnemonic codes representing a program of selected keyboard commands and data; and said computing means is responsive to actuation of a command key for performing at least one microprogrammed sequence of instructions stored in said memory unit to execute the keyboard command entered into the calculator by actuation of that command key, said computing means being further responsive to the keyboard mnemonic code associated with a keyboard command, when that keyboard mnemonic code is encountered in processing a program stored in said second read-only memory means, for performing at least one microprogrammed sequence of instructions stored in said memory unit to execute the keyboard command represented by that keyboard mnemonic code.

7. An electronic calculator as in claim 6 wherein said second read-only memory means comprises a programmable read-only memory.

8. An electronic calculator as in claim 2 wherein:

said keyboard input unit includes a plurality of command keys and a plurality of data keys for entering into the calculator keyboard commands and data associated with separate mnemonic codes;

said modular keyboard section includes a plurality of definable keys;

said read-only memory means of the plug-in modular keyboard section comprises first read-only memory means storing microprogrammed sequences of instructions representing a table of predetermined mathematical functions;

sid calculator includes second read-only memory means coupled to said keyboard input unit and storing keyboard mnemonic codes representing at least one program employing selected keyboard commands and data;

said computing means is operable for associating a selected one of said definable keys with a selected program stored in said second read-only memory means and for associating at least one of the mathematical functions of the table stored in said first read-only memory means with the selected program; and said computing means is responsive to actuation of the selected definable key for executing the selected program, including each associated mathematical function of the table stored in said first read-only memory means.

9. An electronic calculator as in claim 8 wherein said second read-only memory means comprises a programmable read-only memory.

10. An electronic calculator as in claim 2 wherein said calculator includes logic means responsive to designation of an automatic decimal point mode for automatically placing a decimal point at any predetermined one of a plurality of positions in noninteger data subsequently entered into the calculator from said keyboard input unit without the necessity of manual entry of the decimal point in that noninteger data by the user.

11. An electronic calculator as in claim 10 wherein said keyboard input unit includes:

decimal point control means for designating placement of the decimal point at any one of said plurality of positions; and automatic decimal point mode control means for designating the automatic decimal point mode and causing said logic means to automatically place the decimal point at the one of said plurality of positions designated by said decimal point control means in noninteger data subsequently entered into the calculator.

12. An electronic calculator as in claim 2 wherein:

said keyboard input unit includes a percent key for entering a percent operator into the calculator and a plurality of keys for entering numerical data and arithmetic operators, including an addition operator, into the calculator; and said computing means is responsive to entry of a sequence of numeral data and operators, including entry of a first number followed by entry of the addition operator followed by entry of a second number followed by entry of the percent operator, for calculating the sum of the first number and a percentage thereof as specified by the second number.

13. An electronic calculator as in claim 2 wherein:

said keyboard input unit includes a percent key for entering a percent operator into the calculator and a plurality of keys for entering numerical data and arithmetic operators, including a subtraction operator, into the calculator; and said computing means is responsive to entry of a sequence of numerical data and operators, including entry of a first number followed by entry of the subtraction operator followed by entry of a second number followed by entry of the percent operator, for calculating the difference between the first number and a percentage thereof as specified by the second number.

14. An electronic calculator as in claim 2 wherein:

said keyboard input unit includes a percent key for entering a percent operator into the calculator and a plurality of keys for entering numerical data and arithmetic operators, including a multiplication operator, into the calculator; and said computing means is responsive to entry of a sequence of numerical data and operators, including entry of a first number followed by entry of the multiplication operator followed by entry of a second number followed by entry of the percent operator, for calculating the percentage of the first number specified by the second number.

15. An electronic calculator as in claim 2 wherein:

said keyboard input unit includes a percent key for entering a percent operator into the calculator and a plurality of keys for entering numerical data and arithmetic operators, including a division operator, into the calculator; and said computing means is responsive to entry of a sequence of numerical data and operators, including entry of a first number followed by entry of the division operator followed by entry of a second number followed by entry of the percent operator, for calculating the number a percentage of which as specified by the second number equals the first number.

16. An electronic calculator comprising:

keyboard input means for providing the user with a plurality of keyboard functions and for entering into the calculator commands used to initiate selected ones of those keyboard functions and data used in making selected calculations to perform the selected keyboard functions;

a memory unit for storing sequences of instructions to be performed by the calculator in making the selected calculations to perform the selected keyboard functions;

a plug-in modular keyboard section, integrally including read-only memory means storing additional sequences of instructions, for providing the user with additional keyboard functions and for entering into the calculator commands used to initiate selected ones of those additional keyboard functions;

processing means responsive to commands from the keyboard input means and to operating states within the calculator itself for selectively performing selected ones of the sequences of instructions stored in the memory unit to make the selected calculations employing data entered from the keyboard input means, said processing means being responsive to commands from the plug-in modular keyboard section and to operating states within the calculator itself for selectively performing selected ones of the additional sequences of instructions contained in the read-only memory means to make selected calculations employing data entered from at least one of the keyboard input means and the plug-in modular keyboard section; and output means for providing an output indication of the results of the selected calculations performed by the processing means.

17. An electronic calculator as in claim 16 wherein:

said keyboard input means includes a receptacle into which said plug-in modular keyboard section may be removably plugged; and said keyboard input means and said plug-in modular keyboard section include electrical connection means for electrically connecting said keyboard input means and said plug-in modular keyboard section.

18. An electronic calculator as in claim 17 wherein said plug-in modular keyboard section includes a plurality of keys each of which is associated with a predetermined one of the additional keyboard functions.

19. An electronic calculator as in claim 17 wherein said plug-in modular keyboard section includes a plurality of keys each of which may be associated with a function defined by the user.

20. An electronic calculator comprising:

keyboard input means, including a plurality of command keys and a plurality of data keys, for entering into the calculator keyboard commands and data associated with separate keyboard mnemonic codes;

main memory means for storing microprogrammed sequences of instructions performed by the calculator in executing selected keyboard commands;

read-only memory means for storing keyboard mnemonic codes representing a program of selected keyboard commands and data;

output means for providing an output indication of the results of selected keyboard commands executed by the calculator; and processing means coupled to said keyboard input means, read-only memory means, and main memory means, said processing means being responsive to actuation of a command key for performing at least one microprogrammed sequence of instructions stored in said main memory means to execute the keyboard command entered into the calculator by actuation of that command key, said processing means being further responsive to the keyboard mnemonic code associated with a keyboard command, when the keyboard mnemonic code is encountered in processing a program stored in said read-only memory means, for performing at least one of the microprogrammed sequence of instructions stored in said main memory means to execute the keyboard command represented by that keyboard mnemonic code.

21. An electronic calculator as in claim 20 wherein:

said main memory means is employed for storing microprogrammed sequences of instructions performed by the calculator in executing library commands, each library command being associated with a separate mnemonic code;

said read-only memory means is employed for storing, as part of a program, mnemonic codes associated with selected ones of said library commands; and said processing means is responsive to the mnemonic code associated with a selected one of said library commands, when that mnemonic code is encountered in processing a program stored in said read-only memory means, for performing at least one microprogrammed sequence of instructions stored in said main memory means to execute that library command.

22. An electronic calculator as in claim 21 wherein at least one of said library commands differs from any of the keyboard commands.

23. An electronic calculator as in claim 20 wherein said read-only memory means comprises a programmable read-only memory.

24. An electronic calculator as in claim 20 wherein:

said read-only memory means comprises first read-only memory means;

said keyboard input means includes a plug-in modular keyboard section having a plurality of command keys for entering into the calculator associated keyboard commands, each of which is associated with a separate mnemonic code;

said plug-in modular keyboard section integrally includes second read-only memory means for storing microprogrammed sequences of instructions performed by the calculator in executing keyboard commands associated with the command keys of said plug-in modular keyboard section;

said first read-only memory means is employed for storing, as part of a program, keyboard mnemonic codes associated with selected ones of the keyboard commands associated with the command keys of said plug-in modular keyboard section; and said processing means is responsive to the keyboard mnemonic code associated with a selected one of the keyboard commands associated with the keys of said plug-in modular keyboard section, when that keyboard mnemonic code is encountered in processing a program stored in said first read-only memory means, for performing at least one of the microprogrammed sequences of instructions stored in said second read-only memory means to execute the keyboard command associated with that keyboard mnemonic code.

25. An electronic calculator as in claim 24 wherein:

said main memory means is employed for storing microprogrammed sequences of instructions performed by the calculator in executing first library commands, each first library command being associated with a separate library mnemonic code;

said second read-only memory means is employed for storing microprogrammed sequences of instructions performed by the calculator in executing second library commands, each second library command being associated with a separate library mnemonic code;

said first read-only memory means is employed for storing, as part of a program, library mnemonic codes associated with selected ones of said first and second library commands; and said processing means is responsive to the library mnemonic codes associated with selected ones of said first and second library commands, when those library mnemonic codes are encountered in processing a program stored in said first read-only memory means, for performing selected ones of the microprogrammed sequences of instructions stored in said second read-only memory means to execute those selected first and second library commands.

26. An electronic calculator as in claim 25 wherein at least one of said second library commands differs from any of the keyboard commands associated with the command keys of said plug-in modular keyboard section.

27. An electronic calculator as in claim 26 wherein at least one of said second library commands differs from any of said first library commands and from any of the keyboard commands.

28. An electronic calculator as in claim 24 wherein:

said second read-only memory means also stores microprogrammed sequences of instructions performed by the calculator in executing function block library commands, each function block library command being associated with a separate function block library mnemonic code;

said first read-only memory means also stores, as part of a program, a function block library mnemonic code associated with a selected one of said function block library commands; and said processing means is responsive to the function block library mnemonic code associated with a selected one of said function block library commands, when that function block library mnemonic code is encountered in processing a program stored in said first read-only memory means, for performing at least one of the microprogrammed sequences of instructions stored in said second read-only memory means to execute that function block library command.

29. An electronic calculator as in claim 28 wherein at least one of said function block library commands differs from any of the keyboard commands associated with the command keys of said plug-in modular keyboard section.

30. An electronic calculator comprising:

keyboard input means, including a plurality of command keys and a plurality of data keys, for entering into the calculator keyboard commands and data associated with separate keyboard mnemonic codes, said keyboard input means further including a plurality of definable keys;

main memory means for storing microprogrammed sequences of instructions performed by the calculator in executing selected keyboard commands;

first read-only memory means coupled to said keyboard input means and associated with said plurality of definable keys, said first read-only memory means being employed for storing microprogrammed sequences of instructions performed by the calculator in executing library commands, each library command being associated with a separate library mnemonic code;

second read-only memory means, coupled to said keyboard input means, for storing selected ones of the keyboard and library mnemonic codes representing at least one program of selected ones of the keyboard and library commands, each program being associated with a separate one of said definable keys;

output means for providing an output indication of the results of selected ones of the keyboard and library commands executed by the calculator; and processing means coupled to said keyboard input means, main memory means, and first and second read-only memory means, said processing means being responsive to actuation of a selected one of said definable keys for executing the selected ones of the keyboad and library commands of the program associated with that definable key.

31. An electronic calculator as in claim 30 wherein said plurality of definable keys and said first read-only memory means comprise an integral modular keyboard section that mey be removably plugged, as a unit, into the calculator.

32. An electronic calculator as in claim 30 wherein:

said library commands comprise first library commands;

said main memory means also stores microprogrammed sequences of instructions performed by the calculator in executing second library commands, each of said second library commands being associated with a separate library mnemonic code;

said second read-only memory means also stores, as part of a program, library mnemonic codes associated with selected ones of said second library commands; and said processing means is responsive to the library mnemonic code associated with a selected one of said second library commands, when that library mnemonic code is encountered in processing a program stored in said second read-only memory means, for performing at least one of the microprogrammed sequences of instructions stored in said main memory means to execute that second library command.

33. An electronic calculator as in claim 32 wherein at least one of said second library commands differs from any of the first library commands and from any of the keyboard commands.

34. An electonic calculator as in claim 30 wherein said second read-only memory means comprises a programmable read-only memory.

35. An electronic calculator comprising: keyboard input means, including a plurality of command keys and a plurality of data keys, for entering into the calculator keyboard commands and data associated with separate keyboard mnemonic codes, said keyboard input means further including a plurality of definable keys;

main memory means for storing microprogrammed sequences of instructions performed by the calculator in executing selected keyboard commands;

read-only memory means coupled to said keyboard input means for storing keyboard mnemonic codes representing at least one program of selected keyboard commands and data, each program being associated with a separate one of said definable keys;

output means for providing an output indication of the results of selected keyboard commands executed by the calculator; and processing means coupled to said keyboad input means, read-only memory means, and main memory means, said processing means being responsive to actuation of a selected one of said definable keys for executing the keyboard commands of the program associated with that definable key.

36. An electronic calculator as in claim 35 wherein:

said main memory means also stores microprogrammed sequences of instructions performed by the calculator in executing library commands, each library command being associated with a separate library mnemonic code;

said read-only memory means also stores, as part of a program, library mnemonic codes associated with selected ones of said library commands; and said processing means is responsive to the library mnemonic code associated with a selected one of said library commands, when that library mnemonic code is encountered in processing a program stored in said read-only memory means, for performing at least one of the microprogrammed sequences of instructions stored in said main memory means to execute that library command.

37. An electronic calculator as in claim 36 wherein at least one of said library commands differs from any of the keyboard commands.

38. An electronic calculator as in claim 35 wherein said read-only memory means comprises a programmable read-only memory.

39. An electronic calculator comprising:

keyboard input means for entering information including commands and data into the calculator;

memory means for storing microprogrammed sequences of instructions performed by the calculator in executing selected commands;

microprogrammed processing means responsive to information entered into the calculator from the keyboard input means and to operating states within the calculator for selectively performing selected ones of the sequences of instructions stored in said memory means to execute selected commands employing input data and and to provide an output indication of the results of execution of those selected commands; and interface means for coupling a selected external input/output peripheral unit to the calculator, said interface means comprising a single unit physically including both logic means for transferring data between the calculator and the selected input/output peripheral unit and microprogrammed read-only memory means for enabling said processing means to perform logic operations associated with the selected input/output peripheral unit.

40. Electronic processing apparatus comprising:

a basic keyboard input unit including a first plurality of keys for entering information into the apparatus;

a plug-in keyboard input module including a second plurality of keys for entering information into the apparatus;

plug-in adaptor means positioned within a portion of the basic keyboard input unit for mechanically receiving and electrically engaging the plug-in keyboard input module;

memory means for storing information entered into the apparatus from either the basic keyboard input unit or the plug-in keyboard input module;

computing means for processing information entered into the apparatus; and output means for providing an output indication of at least some of the information processed by said computing means.

41. Electronic processing apparatus as in claim 40 wherein one or more of the keys of either the basic keyboard input unit or the plug-in keyboard input module includes a removable transparent cap portion within which the user may interchangeably insert a key identification label.

42. Electronic processing apparatus as in claim 40 wherein said plug-in keyboard input module also includes a read-only memory associated with said second plurality of keys.

* * * * *

UNITED STATES PATENT AND TRADEMARK OFFICE

CERTIFICATE OF CORRECTION

PATENT NO. : 3,971,925

DATED : July 27, 1976

INVENTOR(S) : Freddie W. Wenninger; Donald E. Morris; Jindrich Kohoutek; David S. Maitland, Douglas M. Clifford, etc It is certified that error appears in the above-identified patent and that said Letters Patent are hereby corrected as shown below:

Column 13, line 56, "known" should read --know--;

Column 19, line 11, "columns 1-4" should read --columns 1-14--;

column 19, line 25, "putput" should read --output--;

Column 21, line 52, "decoded a" should read --decoded as a--;

Column 21, line 60, "dta" should read --data--;

Column 24, line 54, "pick up" should read --pick-up--;

Column 26, in the Table of Instruction Types (X = Don't Care), under the subheading Fields, "BRANCH ADDRESS 1 1
5 3"

should read --BRANCH ADDRESS 1 1
$I_9$ $I_0$
5 3--;

Column 30, line 56, "(5a-b A-B" should read --(5) A-B --;

Column 36, in the Table of Wait Loop Algorithm, under the subheading Comment, line 14 of that table, "NOT" should read --<u>NOT</u>--;

Column 215, line 41, "substraction" should read --subtraction--;

Column 223, line 18, "mens" should read --means--;

UNITED STATES PATENT AND TRADEMARK OFFICE
CERTIFICATE OF CORRECTION

PATENT NO. : 3,971,925 Page 2 of 2

DATED : July 27, 1976

INVENTOR(S) : Freddie W. Wenninger, et al.

It is certified that error appears in the above-identified patent and that said Letters Patent are hereby corrected as shown below:

Column 223, line 57, "sid" should read --said--;

Column 224, line 37, "numeral" should read --numerical--;

Column 228, line 51, "mey" should read --may--;

Column 229, line 15, begin a new paragraph after the word "comprising"; and

Signed and Sealed this

*Seventeenth* Day of *January 1978*

[SEAL]

*Attest:*

RUTH C. MASON
*Attesting Officer*

LUTRELLE F. PARKER
*Acting Commissioner of Patents and Trademarks*